United States Patent [19]

Gregg et al.

[11] Patent Number: 4,977,529

[45] Date of Patent: Dec. 11, 1990

[54] TRAINING SIMULATOR FOR A NUCLEAR POWER PLANT

[75] Inventors: Gerald L. Gregg, Monroeville; Richard E. Putman; John W. Gomola, both of Pittsburgh, all of Pa.

[73] Assignee: Westinghouse Electric Corp., Pittsburgh, Pa.

[21] Appl. No.: 333,901

[22] Filed: Feb. 23, 1973

[51] Int. Cl.[5] .............................................. G06F 15/52

[52] U.S. Cl. .................................... 364/578; 364/492; 364/300

[58] Field of Search .............. 444/1; 235/184; 176/19, 176/24; 35/10, 13, 10.2; 364/578, 494, 492, 300

[56] References Cited

U.S. PATENT DOCUMENTS

| | | | |
|---|---|---|---|
| 3,061,945 | 11/1962 | Hawkins | 35/10 |
| 3,237,318 | 3/1966 | Schager | 35/10 |

OTHER PUBLICATIONS

Reactor Simulator Utilizing a Vacuum System; Harry Reese, Jr.; RCA Technical Notes; RCA TN No.: 493, Sep. 1961.

Dynamic Simulation of a Fast Reactor; R. G. Olson; Nucleonics, May, 1957; pp. 76–79.

An Electronic Reactor Simulator; Ross Cameron & D. A. Austin; Nuclear Power; Apr. 1957; pp. 146–151.

PWR Training Simulator; J. P. Franz & W. H. Alliston; Nucleonics, May, 1957; pp. 80–83.

*Primary Examiner*—Edward J. Wise

*Attorney, Agent, or Firm*—H. W. Patterson

[57] ABSTRACT

A training simulator for the full-scope real-time dynamic operation of a nuclear power plant utilizes apparatus that includes control consoles having manual and automatic devices for operating simulated plant components and indicating devices for monitoring physical values in the simulated plant. A general purpose digital computer configuration is connected to the control consoles to accept input data indicative of the operated condition of the console control devices and perform dynamic real-time simulation calculations for providing output data to the monitoring devices. An instructor's console, which has control and indicating devices, is connected to the computer configuration to perform functions that include initializing and "replaying" selected operational states of the simulated plant. The majority of the control components of the simulated plant, such as valves, pumps and controllers, are simulated separately from the simulated system they control. The computer organization is structured to perform a combination of sequential data processing at predetermined repetitive time intervals; and to perform event oriented data processing with the capability of recognizing and processing data immediately upon the occurrence of an event. When the simulated plant is initialized or "replayed," the computer functions provide indications of the plant control devices which do not positionally correspond to the plant status. A plural digital computer arrangement is disclosed wherein the data in each computer is processed by its own control arrangement; and the interdependent data is synchronized by the control function on one computer and data link communication between computers.

49 Claims, No Drawings

Microfiche Appendix Included
(41 Microfiche, 2471 Pages)

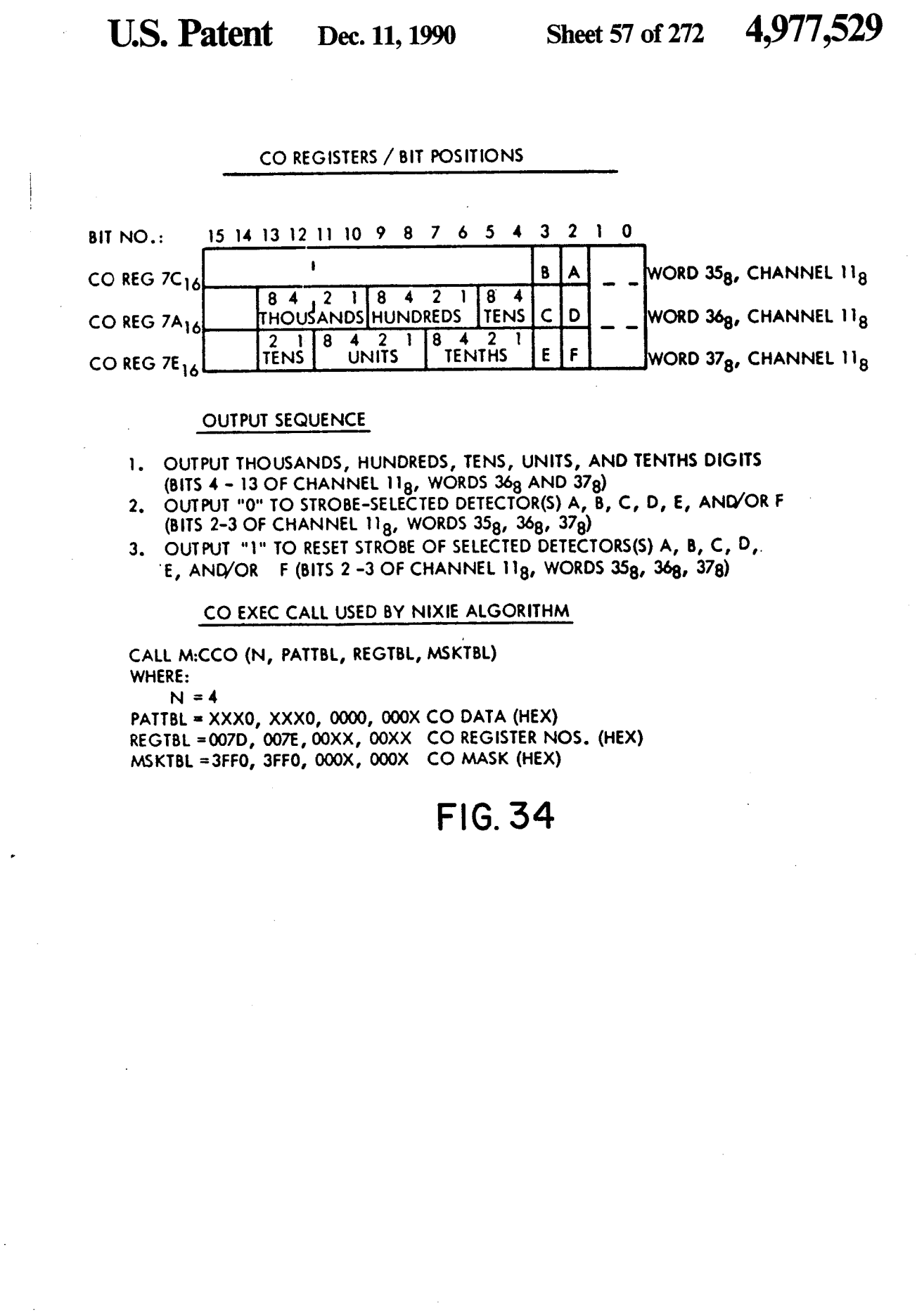

CO REGISTERS / BIT POSITIONS

| BIT NO.: | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|
| CO REG $7C_{16}$ | | | | | | | | | | | | | B | A | – | – | WORD $35_8$, CHANNEL $11_8$ |
| CO REG $7A_{16}$ | | | 8 | 4 | 2 | 1 | 8 | 4 | 2 | 1 | 8 | 4 | C | D | – | – | WORD $36_8$, CHANNEL $11_8$ |
| | | | THOUSANDS | | | | HUNDREDS | | | | TENS | | | | | | |
| CO REG $7E_{16}$ | | | 2 | 1 | 8 | 4 | 2 | 1 | 8 | 4 | 2 | 1 | E | F | | | WORD $37_8$, CHANNEL $11_8$ |
| | | | TENS | | UNITS | | | | TENTHS | | | | | | | | |

OUTPUT SEQUENCE

1. OUTPUT THOUSANDS, HUNDREDS, TENS, UNITS, AND TENTHS DIGITS (BITS 4 - 13 OF CHANNEL $11_8$, WORDS $36_8$ AND $37_8$)
2. OUTPUT "0" TO STROBE-SELECTED DETECTOR(S) A, B, C, D, E, AND/OR F (BITS 2-3 OF CHANNEL $11_8$, WORDS $35_8$, $36_8$, $37_8$)
3. OUTPUT "1" TO RESET STROBE OF SELECTED DETECTORS(S) A, B, C, D, E, AND/OR F (BITS 2 -3 OF CHANNEL $11_8$, WORDS $35_8$, $36_8$, $37_8$)

CO EXEC CALL USED BY NIXIE ALGORITHM

```
CALL M:CCO (N, PATTBL, REGTBL, MSKTBL)
WHERE:
    N = 4
PATTBL = XXX0, XXX0, 0000, 000X CO DATA (HEX)
REGTBL =007D, 007E, 00XX, 00XX  CO REGISTER NOS. (HEX)
MSKTBL =3FF0, 3FF0, 000X, 000X  CO MASK (HEX)
```

FIG. 34

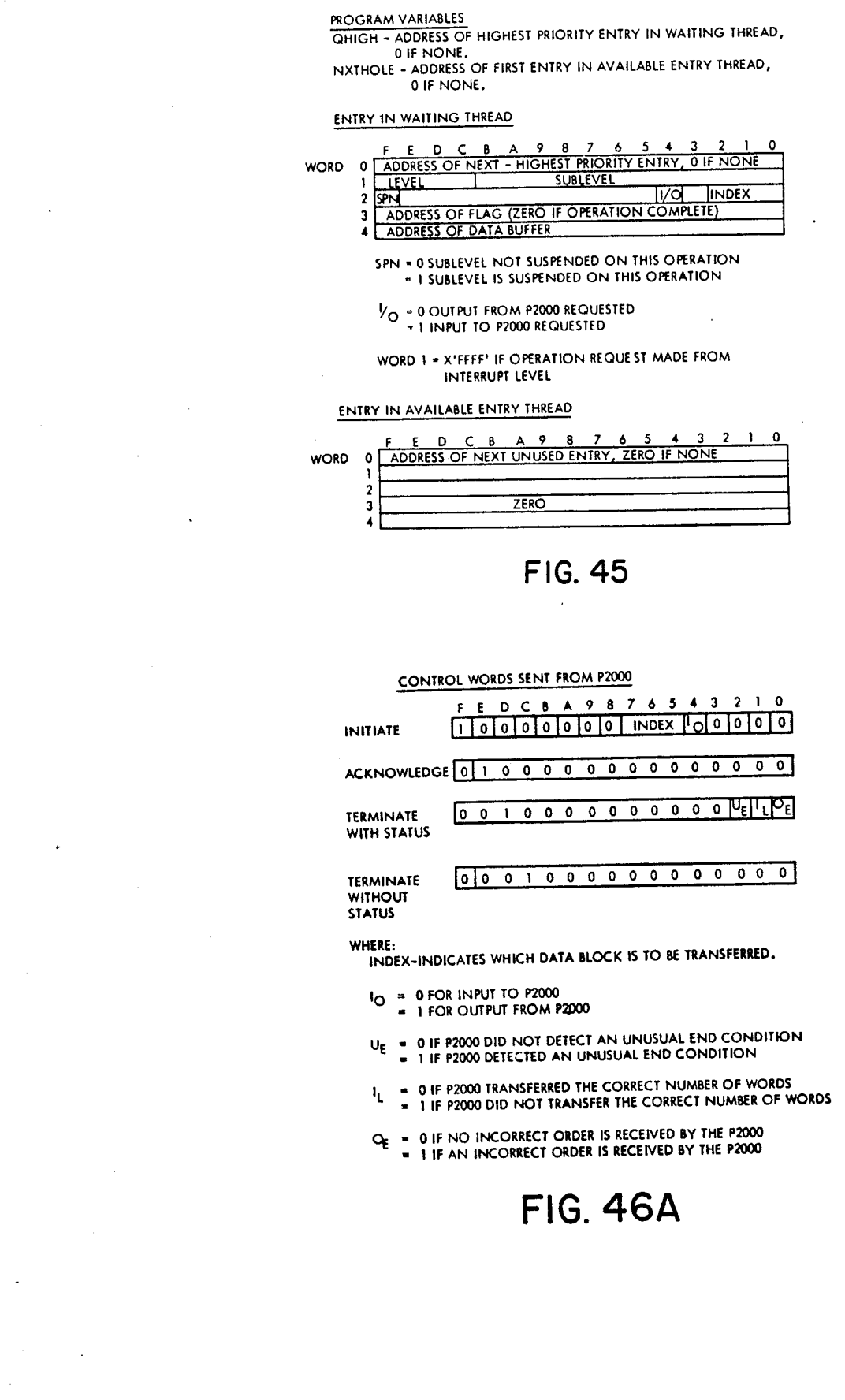

PROGRAM VARIABLES

QHIGH - ADDRESS OF HIGHEST PRIORITY ENTRY IN WAITING THREAD, 0 IF NONE.

NXTHOLE - ADDRESS OF FIRST ENTRY IN AVAILABLE ENTRY THREAD, 0 IF NONE.

ENTRY IN WAITING THREAD

| WORD | F E D C B A 9 8 7 6 5 4 3 2 1 0 | | | |
|---|---|---|---|---|
| 0 | ADDRESS OF NEXT - HIGHEST PRIORITY ENTRY, 0 IF NONE | | | |
| 1 | LEVEL | SUBLEVEL | | |
| 2 | SPN | | I/O | INDEX |
| 3 | ADDRESS OF FLAG (ZERO IF OPERATION COMPLETE) | | | |
| 4 | ADDRESS OF DATA BUFFER | | | |

SPN = 0 SUBLEVEL NOT SUSPENDED ON THIS OPERATION
= 1 SUBLEVEL IS SUSPENDED ON THIS OPERATION

I/O = 0 OUTPUT FROM P2000 REQUESTED
= 1 INPUT TO P2000 REQUESTED

WORD 1 = X'FFFF' IF OPERATION REQUEST MADE FROM INTERRUPT LEVEL

ENTRY IN AVAILABLE ENTRY THREAD

| WORD | F E D C B A 9 8 7 6 5 4 3 2 1 0 |
|---|---|
| 0 | ADDRESS OF NEXT UNUSED ENTRY, ZERO IF NONE |
| 1 | |
| 2 | |
| 3 | ZERO |
| 4 | |

FIG. 45

CONTROL WORDS SENT FROM P2000

| | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| INITIATE | 1 | 0 | 0 | 0 | 0 | 0 | 0 | 0 | INDEX | | | $I_O$ | 0 | 0 | 0 | 0 |
| ACKNOWLEDGE | 0 | 1 | 0 | 0 | 0 | 0 | 0 | 0 | 0 | 0 | 0 | 0 | 0 | 0 | 0 | 0 |
| TERMINATE WITH STATUS | 0 | 0 | 1 | 0 | 0 | 0 | 0 | 0 | 0 | 0 | 0 | 0 | 0 | $U_E$ | $I_L$ | $O_E$ |
| TERMINATE WITHOUT STATUS | 0 | 0 | 0 | 1 | 0 | 0 | 0 | 0 | 0 | 0 | 0 | 0 | 0 | 0 | 0 | 0 |

WHERE:
INDEX-INDICATES WHICH DATA BLOCK IS TO BE TRANSFERRED.

$I_O$ = 0 FOR INPUT TO P2000
= 1 FOR OUTPUT FROM P2000

$U_E$ = 0 IF P2000 DID NOT DETECT AN UNUSUAL END CONDITION
= 1 IF P2000 DETECTED AN UNUSUAL END CONDITION $I_L$ = 0 IF P2000 TRANSFERRED THE CORRECT NUMBER OF WORDS
= 1 IF P2000 DID NOT TRANSFER THE CORRECT NUMBER OF WORDS $O_E$ = 0 IF NO INCORRECT ORDER IS RECEIVED BY THE P2000
= 1 IF AN INCORRECT ORDER IS RECEIVED BY THE P2000

FIG. 46A

CONTROL WORDS RECEIVED BY P2000

| | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| INITIATE | 1 | 0 | 0 | 0 | 0 | 0 | 0 | 0 | INDEX | | | $S_R$ | 0 | 0 | 0 | 0 |
| ACKNOWLEDGE | 0 | 1 | 0 | 0 | 0 | 0 | 0 | 0 | $\phi$ | $\phi$ | $\phi$ | $\phi$ | $\phi$ | $\phi$ | $\phi$ | $\phi$ |
| TERMINATE WITH STATUS | 0 | 0 | 1 | 0 | 0 | $P_E$ | 0 | 0 | 0 | 0 | 0 | 0 | 0 | $U_E$ | $I_L$ | $O_E$ |
| TERMINATE WITHOUT STATUS | 0 | 0 | 0 | 1 | 0 | 0 | 0 | 0 | $\phi$ | $\phi$ | $\phi$ | $\phi$ | $\phi$ | $\phi$ | $\phi$ | $\phi$ |
| SIGMA 5 OUT OF SERVICE | 0 | 0 | 0 | 0 | 0 | 0 | 0 | 0 | $\phi$ | $\phi$ | $\phi$ | $\phi$ | $\phi$ | $\phi$ | $\phi$ | $\phi$ |

WHERE

INDEX - INDICATES WHICH DATA BLOCK TO BE TRANSFERRED $S_R$ = 0 FOR THE P2000 TO SEND DATA TO THE SIGMA 5
= 1 FOR THE P2000 TO RECEIVE DATA FROM THE SIGMA 5

$\phi$ - INDICATES THAT BIT IS NOT USED AND MAY HAVE EITHER VALUE $P_E$ = 0 NO PARITY ERROR IN DATA RECEIVED FROM SIGMA 5
= 1 PARITY ERROR IN DATA RECEIVED $U_E$ = 0 NO UNUSUAL END RECEIVED FROM SIGMA 5
= 1 UNUSUAL END RECEIVED FROM SIGMA 5

$I_L$ = 0 NO INCORRECT LENGTH RECEIVED FROM SIGMA 5
= 1 INCORRECT LENGTH RECEIVED FROM SIGMA 5

$O_E$ = 0 NO ORDER ERROR RECEIVED FROM SIGMA 5
= 1 ORDER ERROR RECEIVED FROM SIGMA 5

FIG. 46B

CONTROL WORDS SENT FROM P2000 B

| | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| INITIATE | 1 | 0 | 0 | 0 | 0 | 0 | 0 | 0 | INDEX | | | $I_O$ | 0 | 0 | 0 | 0 |
| ACKNOWLEDGE | 0 | 1 | 0 | 0 | 0 | 0 | 0 | 0 | 0 | 0 | 0 | 0 | 0 | 0 | 0 | 0 |
| TERMINATE WITH STATUS | 0 | 0 | 1 | 0 | 0 | 0 | 0 | 0 | 0 | 0 | 0 | 0 | 0 | $U_E$ | $I_L$ | $O_E$ |
| TERMINATE WITHOUT STATUS | 0 | 0 | 0 | 1 | 0 | 0 | 0 | 0 | 0 | 0 | 0 | 0 | 0 | 0 | 0 | 0 |

WHERE

INDEX - INDICATES WHICH DATA BLOCK IS TO BE TRANSFERRED $I_O$ = 0 FOR INPUT TO P2000 B
= 1 FOR OUTPUT FROM P2000 B $U_E$ = 0 IF P2000 B DID NOT DETECT AN UNUSUAL END CONDITION
= 1 IF P2000 B DETECTED AN UNUSUAL END CONDITION $I_L$ = 0 IF P2000 B TRANSFERRED THE CORRECT NUMBER OF WORDS
1 IF P2000 B DID NOT TRANSFER THE CORRECT NUMBER OF WORDS $O_E$ = 0 IF NO INCORRECT ORDER IS RECEIVED BY THE P2000 B
= 1 IF AN INCORRECT ORDER IS RECEIVED BY THE P2000 B

FIG. 46C

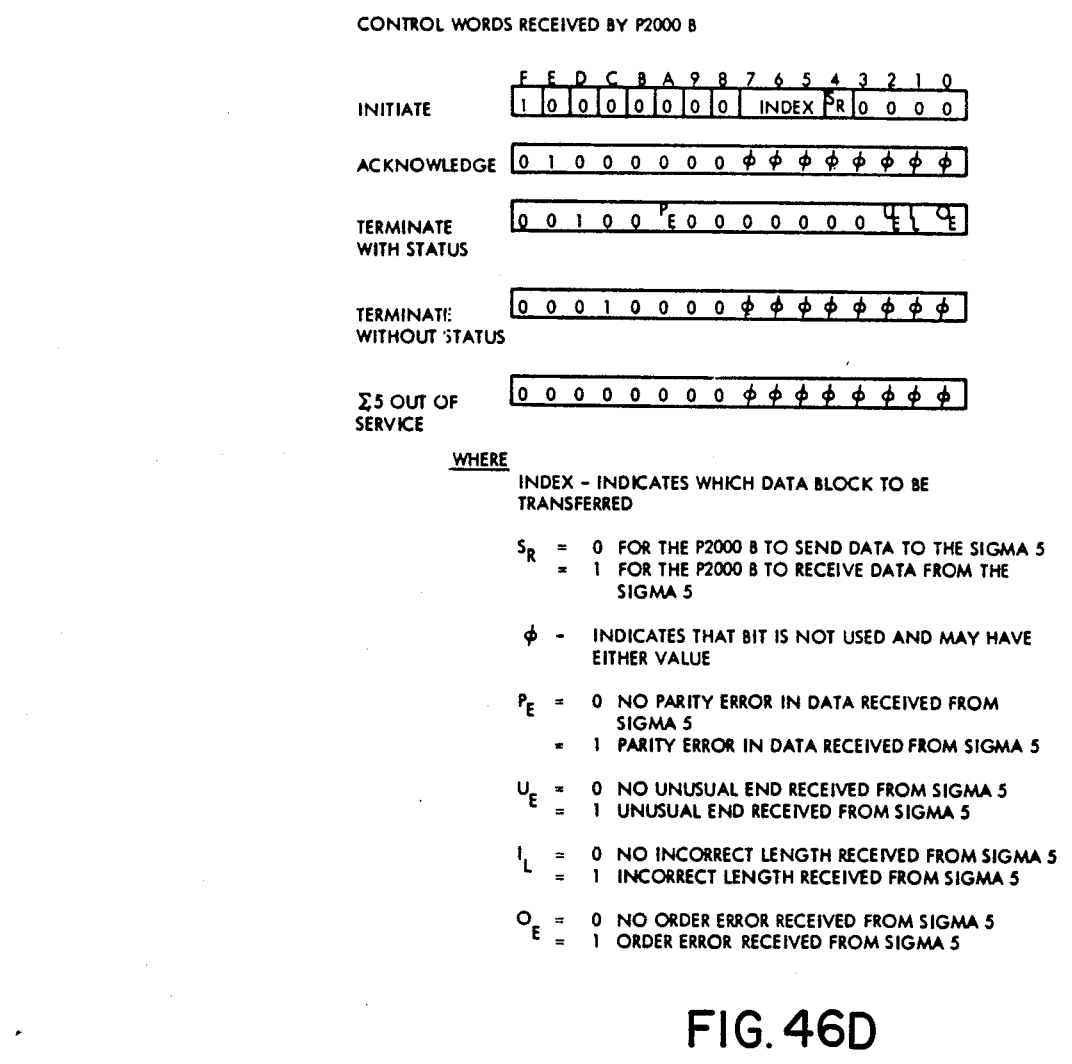

CONTROL WORDS RECEIVED BY P2000 B

| | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| INITIATE | 1 | 0 | 0 | 0 | 0 | 0 | 0 | 0 | INDEX | | | $S_R$ | 0 | 0 | 0 | 0 |
| ACKNOWLEDGE | 0 | 1 | 0 | 0 | 0 | 0 | 0 | 0 | φ | φ | φ | φ | φ | φ | φ | φ |
| TERMINATE WITH STATUS | 0 | 0 | 1 | 0 | 0 | $P_E$ | 0 | 0 | 0 | 0 | 0 | 0 | 0 | $U_E$ | $I_L$ | $O_E$ |
| TERMINATE WITHOUT STATUS | 0 | 0 | 0 | 1 | 0 | 0 | 0 | 0 | φ | φ | φ | φ | φ | φ | φ | φ |
| Σ5 OUT OF SERVICE | 0 | 0 | 0 | 0 | 0 | 0 | 0 | 0 | φ | φ | φ | φ | φ | φ | φ | φ |

WHERE

INDEX - INDICATES WHICH DATA BLOCK TO BE TRANSFERRED $S_R$ = 0 FOR THE P2000 B TO SEND DATA TO THE SIGMA 5
= 1 FOR THE P2000 B TO RECEIVE DATA FROM THE SIGMA 5

φ - INDICATES THAT BIT IS NOT USED AND MAY HAVE EITHER VALUE $P_E$ = 0 NO PARITY ERROR IN DATA RECEIVED FROM SIGMA 5
= 1 PARITY ERROR IN DATA RECEIVED FROM SIGMA 5

$U_E$ = 0 NO UNUSUAL END RECEIVED FROM SIGMA 5
= 1 UNUSUAL END RECEIVED FROM SIGMA 5

$I_L$ = 0 NO INCORRECT LENGTH RECEIVED FROM SIGMA 5
= 1 INCORRECT LENGTH RECEIVED FROM SIGMA 5

$O_E$ = 0 NO ORDER ERROR RECEIVED FROM SIGMA 5
= 1 ORDER ERROR RECEIVED FROM SIGMA 5

FIG. 46D

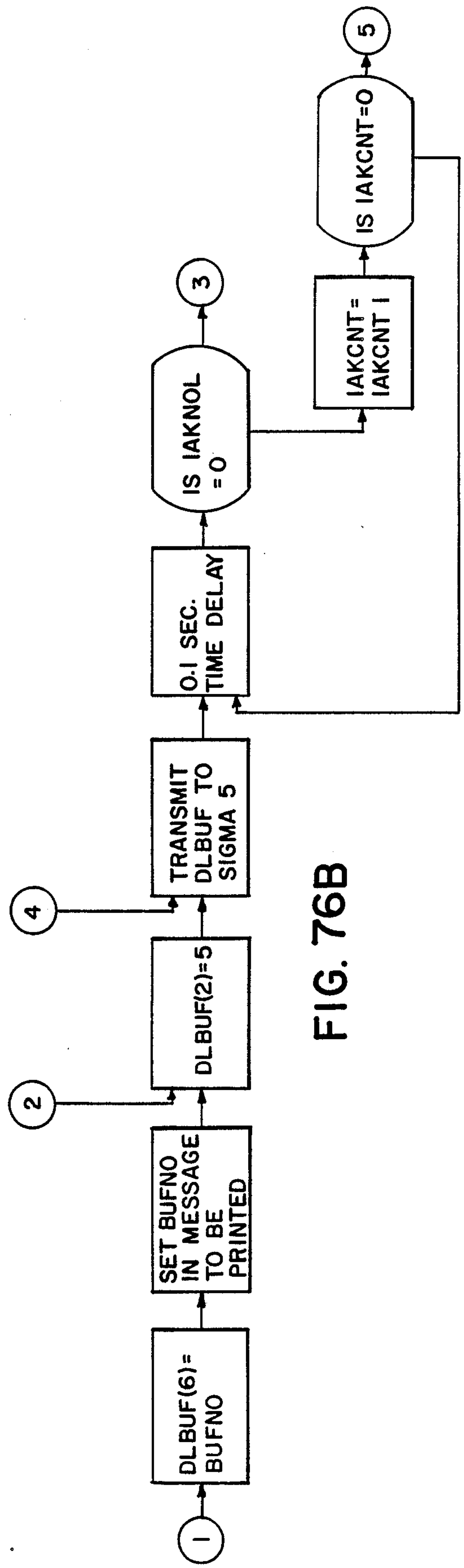
FIG. 76B
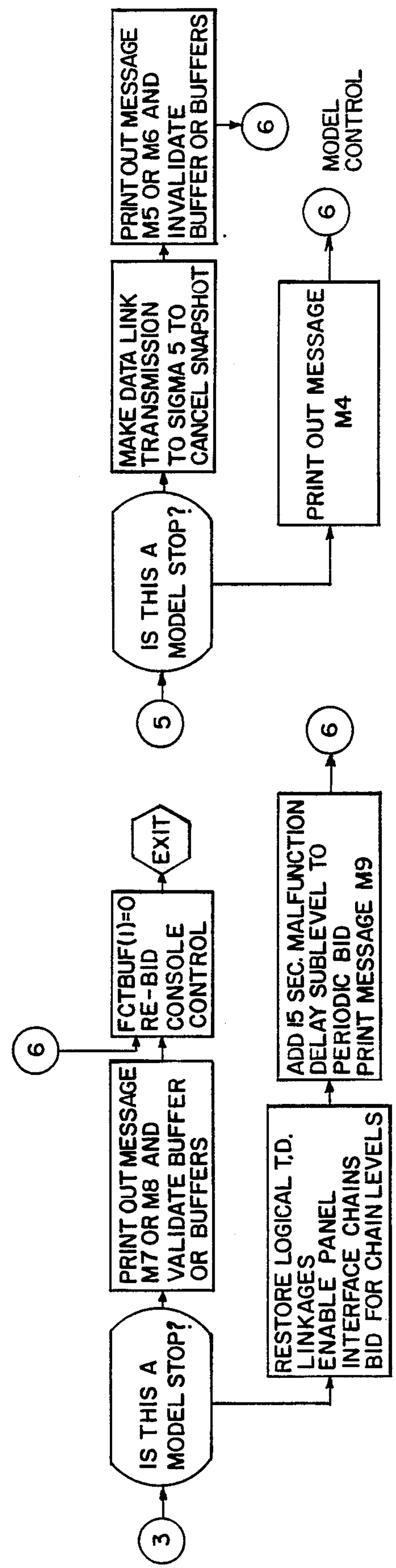
FIG. 76C
FIG. 76D

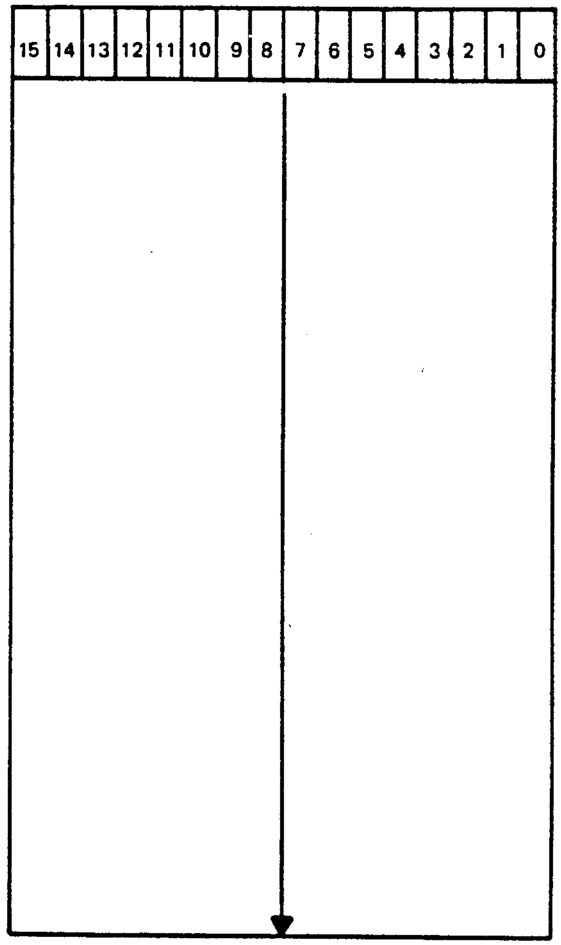

BIT

0 – V2 required
1 – V3 required
2 – V2 not allowed
3 – V3 not allowed
4 – Cannot turn malfunction off
5 – Cannot turn malfunction off
6 – Spare
7 – Malfunction in Preselect mode
8 – V2 or V3 required
9 – Invalid malfunction

BIT

10 – V2 previously entered
11 – V3 previously entered
12 – Malfunction in Delay mode
13 – V2 or V3 required (V2 = -1 or V3 = -1 if not entered)
14 – Special Action needed on V2 (Valve Handler)
15 – Special action needed on V3 (Valve Handler)

FIG. 78

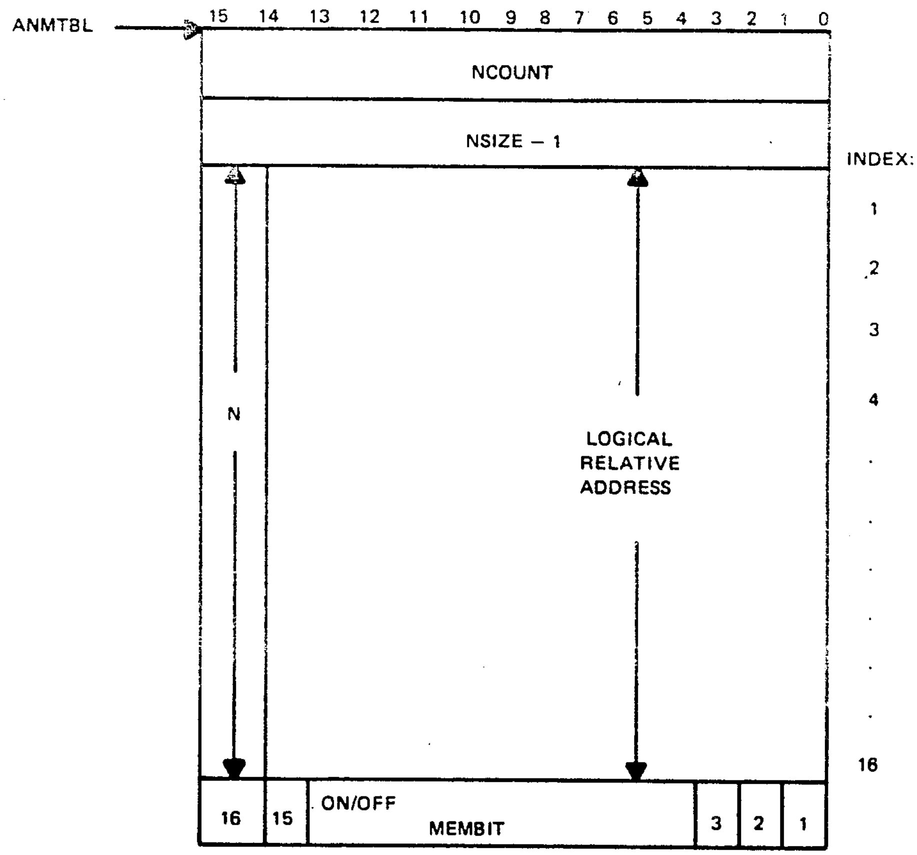

NCOUNT = 0, when no annunciators are malfunctioned
= -1 through -16, when 1-16 annunciators are malfunctioned.
Is decremented each time an annunciator goes from normal to malfunctioned; is incremented each time it goes from malfunctioned to normal.

NSIZE = The number (1-16) of annunciators which can malfunction; number is currently = 10

N = 1, when the annunciator (whose logical address is in bits 0 - 14) is not failed N = 0, when the annunciator is failed ON/OFF bit i = 1, when annunciator i is failed on
0, when the annunciator i is failed off (i = 1 - 16 = index number)

FIG. 79

SIZE: 10 words
ENTRY CONTENTS: Bit entries as shown below
USE: To provide status information for execution when annunciator failure is Preselected or is in Delay mode.

BIT(S)

0 : Open Contact (V2 = 1)
1 : Closed Contact (V2 = 2)
2 : Annunciator on P2000 A
3 : Failure in Delay mode
4 : Preselect bit
5-15: Spares

| | |
|---|---|
| SIZE: | 10 words |
| ENTRY CONTENTS: | Bit entries as shown below |
| USE: | To provide status in formation for execution when indicator failure is Preselected or is in Delay mode. |

*BIT(S)

| | | |
|---|---|---|
| 0 | = | Stuck reading (V2 = 1) |
| 1 | = | Downscale reading (V2 = 2) |
| 0,1 | = | Upscale reading (V2 = 3) |
| 2 | = | Spare |
| 3 | = | Instrument on P2000 A |
| 4 | = | Failure in Delay mode |
| 5 | = | Preselect bit |
| 6-15 | = | Spares |

*when set = 1

| | | | | | |
|---|---|---|---|---|---|
| SAFETY INJ. PUMPS TRIP | COMPONENT COOLING PUMPS INLET TEMP. HIGH | RESIDUAL HEAT REMOVAL PUMP IA COOLING WATER FLOW LOW | RESIDUAL HEAT REMOVAL PUMP IB COOLING WATER FLOW LOW | REACTOR TRIP BKR A/B TRIPPED | REACTOR CNMT. PRESS CHANNELS I, II, III, IV PRESS HIGH |
| CMPT. COOLING PUMPS ON LOCAL CONTROL | COMPONENT COOLING PUMPS DISCH. PRESS LOW | RESIDUAL HEAT REMOVAL PUMP IA DISCH PRESS HIGH | RESIDUAL HEAT REMOVAL PUMP IB DISCH PRESS HIGH | TRAIN A BYPASS BREAKER IN OPERATE POSITION | REACTOR CNMT. PRESS CHANNELS I, II, III, IV PRESS HIGH HIGH |
| SAFETY INJECTION PUMPS COOLING WATER FLOW LOW | COMPONENT PUMPS COOLING OE, OD, OC NOT AVAILABLE | RESIDUAL HEAT REMOVAL PUMPS IA, IB TRIP | LOW AUTO-STOP OILPRESS OR TURBINE STOP VLV'S CLOSED | TRAIN B BYPASS BREAKER IN OPERATE POSITION | |
| | COMPONENT COOLING SURGE TANK LEVEL HIGH LOW | RESIDUAL HEAT EXCHANGERS RHRA & RHRB COOLING WATER FLOW LOW | RESIDUAL HEAT REMOVAL PUMPS IA & IB NOT AVAILABLE | | |
| | CMPT. COOLING HEAT EXCHANGERS DISCH. TEMP HIGH | COMPONENT COOLING PUMPS OE, OD, OC TRIP | CMPTR. ALARM NIS RAD. TILT ROD DEV/SEQ. | | |

FIG. 91L

| | | | | | | | | | |
|---|---|---|---|---|---|---|---|---|---|
| SOURCE RANGE LOSS OF DETECTOR VOLTAGE | INTERMEDIATE RANGE LOSS OF DETECTOR VOLTAGE | NIS POWER RANGE LOSS OF DETECTOR VOLTAGE | | PROC. PROT. RACKS CHANNEL TEST SEQUENCE VIOL. | | ROD CONTROL SYSTEM URGENT FAILURE | ROD CONTROL BANK'S LIMIT LOW | ROD CONTROL PART LENGTH ALERT | |
| SOURCE RANGE HIGH FLUX LEVEL AT SHUTDOWN | INTERMEDIATE RANGE NO. I LOSS OF COMPENSATE VOLTAGE | NIS POWER RANGE FLUX LEVEL HIGH | | | | ROD CONTROL SYSTEM NONURGENT FAILURE | ROD CONTROL RANK'S LIMIT LOW LOW | | |
| SOURCE RANGE HIGH SHUTDOWN FLUX ALARM BLOCKED | INTERMEDIATE RANGE NO. 2 LOSS OF COMPENSATE VOLTAGE | | | PROC. PROT. RACKS >1 PROT. SET DOOR OPEN | | ROD POSITION D.C. AUXILIARY POWER ON | OVERPOWER ΔT AUTO TURBINE RUNBACK BLOCK ROD WITHDRAWAL | BOP ANNUNCIATOR D.C. SUPPLY FAILURE | |
| NUCLEAR INSTR. SYSTEM TRIP BYPASS | INTERMEDIATE RANGE HIGH FLUX LEVEL ROD WITHDRAWAL STOP | NIS POWER RANGE OVERPOWER ROD WITHDRAWAL STOP | NIS POWER RANGE UPPER DETECTOR HIGH FLUX DEVIATION OR AUTO DEFEAT | ROD DROP TURBINE RUNBACK DEFEAT | ROD BOTTOM ROD DROP AUTO WITHDRAWAL STOP | BANK D ROD WITHDRAWAL LIMIT | ROD CONTROL M-G SETS TRIPPED OR GROUNDED | FIELD CONTACT SUPPLY REDUNDANCY LOSS | |
| NUCLEAR INSTR. SYSTEM CHANNEL TEST | | NIS POWER RANGE CHANNEL DEVIATION | NIS POWER RANGE LOWER DETECTOR HIGH FLUX DEVIATION OR AUTO DEFEAT | OVERTEMP ΔT AUTO TURBINE RUNBACK BLOCK ROD WITHDRAWAL | | ROD POSITION SYSTEM IN TEST | | | |

FIG. 92N

| | | | | | | | | | |
|---|---|---|---|---|---|---|---|---|---|
| SUB15<br>FIG.93A | SUB15<br>FIG. 93C | SUB15<br>FIG.93F | SUB15<br>FIG.93H | SUB7<br>FIG.93I | SUB12<br>FIG.93L | SUB26<br>FIG.93O<br>(SEE FIG.93R) | FIG.93S | FIG.93V | ELBUS1,2<br>FIG.93Y |
| SUB10,11<br>FIG.93B | SUB10,12,23<br>FIG.93D | SUB12,23<br>FIG.93G | | SUB15,28,38<br>FIG.93J | SUB7,12,17<br>FIG.93M | SUB17,26,27<br>FIG.93P | SUB1,24<br>FIG.93T | SUB1,<br>ELBUS1,2<br>FIG.93W | ELBUS1,2<br>FIG.93Z |
| | | | | SUB6,9<br>FIG.93K | SUB6<br>FIG.93N | SUB25<br>FIG.93Q | SUB3,5,24,38<br>FIG.93U | SUB2,3<br>ELBUS1,2<br>FIG.93X | |

FIG.93

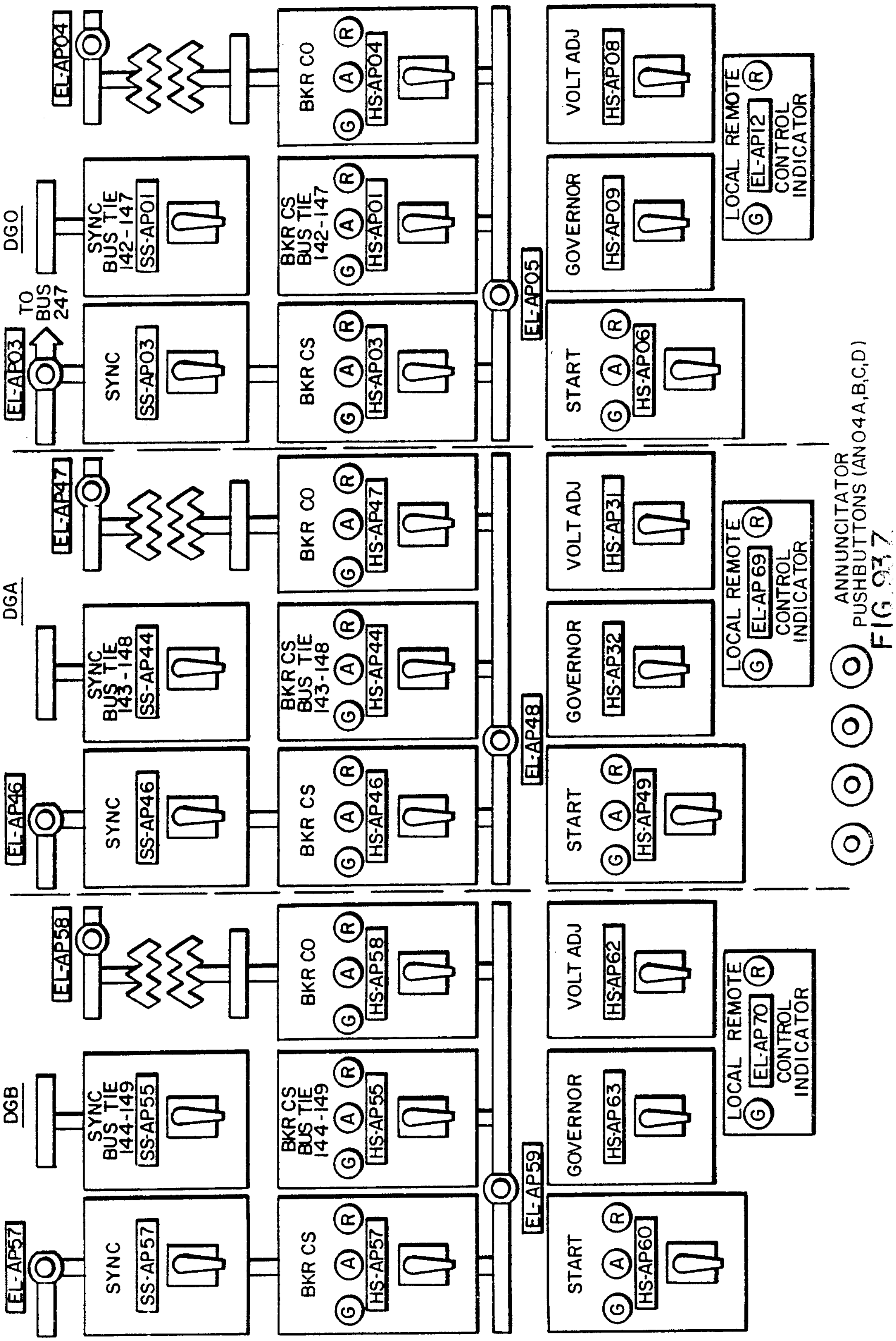
FIG. 93.7

BTOFIV END ACTION (FROM B) IN SIGMA 5

PART OF LEV2 (ASSOCIATED WITH SNAPSHOT)

| Efficiency | Change In Efficiency (FPKE3) | Flow (Gal/Min/1000) At 3800 rpm | Change In Flow At 3800 rpm (FPKE1) | Flow (Gal/Min/1000) At 5000 rpm | Slope-Flow vs. Transf. SPD (FP2FA) | Change In Slope (FPKE2) |
|---|---|---|---|---|---|---|
| .60 | | 3.5 | | 4.5 | .25 | |
| | .05 | | .80 | | | .125 |
| .65 | | 4.3 | | 5.8 | .375 | |
| | .10 | | 1.80 | | | .125 |
| .75 | | 6.1 | | 8.1 | .50 | |
| | .08 | | 2.60 | | | .125 |
| .83 | | 8.7 | | 11.20 | .625 | |
| | .025 | | 2.00 | | | .200 |
| .855 | | 10.7 | | 14.0 | .825 | |
| | -.025 | | 2.30 | | | .125 |
| .83 | | 13.0 | | 16.8 | .95 | |

FIG. 111

GENERATOR LINKED TO 345 SYSTEM

SYSTEM TRANSFORMER LINKED TO 345 SYSTEM

POWER AVAILABLE AT GENERATOR OUTPUT TERMINALS - NOT NECESSARILY AT 60 Hz

TRAINING SIMULATOR FOR A NUCLEAR POWER PLANT

A microfiche Appendix B, consisting of 41 microfiche having a total of 2,471 frames is included in this specification.

BACKGROUND OF INVENTION

The present invention relates to the full-scope real-time simulation of the dynamic operation of a nuclear powdered electrical generating plant for training plant operators.

The increasing demand for well trained power plant operators together with the complexity of modern day power plants, has led to the realization that the simulator is the nost effective tool for such training.

Also, with advancements in nuclear power plant technology, experienced opertors from time-to-time need retraining in order to be competent. An actual nuclear plant cannot provide the operator with the required experience, such as starting up, changing load, and shutting down, for example, except after years of experience; and even then it is unlikely that he would observe the effect of important malfunctions and be able to take the best corrective procedures.

Although simulators have been used for many years, in power plant design, it is only recently that they have been used for power plant operator training. An article in the July 22, 1968 issue Electrical World, entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October 1969 is an article entitled "Training Nuclear Power Plant Operators With Computerized Simulators", and in the June 1972 issue of the publication "Power Engineering" there is an article entitled "Simulators" which describes a number of power plant operator training simulators presently in use or proposed.

Design simulators usually cover only a small part of the process, and may run slower or faster than real-time; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator. These computers have been of the same type used for aircraft training in some instances, and process control in another.

Full-scope simulators, which involve the entire range of operation under normal, abnormal and emergency conditions; and simulate the entire plant from the reactor to the generator including all the auxiliary systems, involve in the neighborhood of from four thousand to five thousand contact inputs and outputs, and require thousands of calculations every fraction of a second. Thus, the system and organization for handling the data becomes of paramount importance.

More specifically, a training simulator, include control consoles that include levers, switches, and pushbuttons identical to those that operate remotely the control devices of the plant; and includes indicating lights, meters, pen recorders, and other devices for monitoring the physical condition of the plant.

In actual training programs, the simulator is first "initialized"; that is, the meters on the control board and the physical values in the digital computer are set for a certain steady-state condition of the entire plant. At the end of a training session the computer is shut off, or may be reinitialized to a different set of conditions for another training class. Each time it is initialized, the various levers on the control consoles, must be operated to correspond to the condition of the simulated plant. Because of the multitude of such levers, and the many different sets of possible initial conditions, it is desirable that the instructor be able to determine quickly and accurately those devices on the control consoles which do not correspond to the applicable set of initial conditions. Thus, it is desirable for the simulator to detect any out-of-correspondence condition upon completion of initialization.

Further during simulation of the actual dynamic operation of the plant, the control devices where appropriate should cause the computer to operate the appropriate indicating device in the same manner and same real-time as the actual plant. The operation of some of these devices require an instantaneous response, while others necessitate a pattern of indication that can extend over long periods of time. For example, when switching on a pump, the needle on the appropriate indicating meter should respond instantaneously. In contrast, the operation of certain valves can take up to several seconds after the operation of the switch to indicate a fully operated position. A system as complex as a power plant has many changes occurring simultaneously through various parts of the process during transient conditions. At times when the simulated system is in a relatively steady-state, the number of sequential calculations in each repetitive calculation cycle is relatively minor. However, during start up, or under emergency or abnormal conditions, the number of calculations in each cycle becomes extreme. An effective power plant simulator should provide an instantaneous response, and render indiscernable to the operator the incremental changes occurring during each repetitive memory cycle; and at the same time, have a time interval of sufficient duration such that the calculation can be complete under all conditions prior to the end of each repetitive cycle or time step. A conventional method of accomplishing the foregoing is to provide a fast repetition rate, with the more active models being calculated at the higher rate, and some of the less active models being calculated at the slower rate. In some instances, this reconciliation does not permit as complete a simulation as is desired for the computers utilized. In known simulators utilizing a digital computer, with this type of arrangement the repetition rate or time step of the major active portions of the simulated plant is in the neighborhood of one-tenth of a second.

In addition to realistic real-time simulation, the simulators must be reliable and readily adaptable to program modification. It is also desirable that a portion of the plant simulator be capable of being operated, while another portion may be temporarily shut down for testing or modification.

It is desirable to use general purpose digital computers written in a program language, such as FORTRAN. This permits the building of a simulator that can use many types of computers, and the programs can be modified easily should the actual system being simulated be modified or changed. Also, it is desirable to achieve the instantaneous response, when required by the system, and to achieve the highest degree of realism in simulation, with a computer organization that has a calculation repetition rate or time step as slow as practicable while maintaining stability of operation. Further, the computer system organization should be such that a full-scope complete simulation of the nuclear power plant can be realized; and at the same time keep the computer space requirements and instructions to a minimum.

The foregoing desirable features can be achieved with a computer organization that performs periodic sequential calculations for some of the dynamic simulation, and performs other dynamic calculations on a demand basis only, with the additional capability of instantaneous response. The data should also be preprocessed prior to dynamic calculation and post-processed subsequent thereto, . to reduce the required calculations. The pre-processing and post-processing can be occurring at the same time as the dynamic calculations. It is also desirable to be able to use the same set of instructions for different data to conserve space in the computer.

Throughout all of the systems of a nuclear power plant are a multitude of fluid control devices, such as valves, pumps and manual/automatic controllers, for example. In simulating a system or subsystem, the effect of the operated condition of these devices must be considered in the calculations. In order to use the same set of instructions for different data and to reduce the number of calculations in the dynamic modeling, it is desirable to program the fluid control devices separately, so that only their ultimate affect on the simulation is entered prior to required dynamic calculations, and the data can be arranged in an optimum manner. Moreover, in order to isolate portions of the simulated system for testing and shutting down for repairs, it is desirable to utilize a plural computer organization. This further simplifies the programming by pre-processing data for panel logic or protective logic simulation likely, for example, in one computer prior to the transmission of the data for dynamic calculation to another computer. With such an arrangement the data processing can be carried on in both computers simultaneously. In a plural computer organization the synchronization of the functions of each computer becomes critical. It is desirable that the timing control means on each computer be operated such that no data will be transferred between computers, except at the proper time during each cycle.

SUMMARY OF THE INVENTION

In accordance with the broad principles of the invention, an improved method and system for simulating the real-time dynamic operation of a nuclear power plant wherein a digital computer arrangement accepts input data from manually operable devices corresponding to simulated plant control devices, calculates physical values relating to the dynamic operation in real-time of the simulated plant to provide output data for operating indicating devices for monitoring the operation of the plant.

The computer organization is so structured that the control components are simulated separately from the systems which they control. Upon initialization to one of a plurality of simulated plant conditions, the manually controllable devices, the positions of which may be out-of-correspondence with such initial conditions, are recognized by the simulator. In another aspect, the simulator processes simulation data sequentially during predetermined time steps in combination with event oriented data having the capability of recognizing and processing data immediately upon the occurrence of an event.

In a more specific aspect, the simulator preprocesses input information prior to simulation calculation and post-processes output data subsequent to each calculation permitting the arrangement of logicals in an optimum manner.

In a still more specific aspect, the simulator includes a plural computer configuration employing a system wherein the dynamic simulation calculations are effected on one computer separate from the pre-processing and post-processing computer organization with only bit logicals and integers transmitted between computers. The data is processed on each computer under its own control structure with synchronization and control of interdependent tasks being performed through a combination of the control arrangement on one of the computers and data link transmission means between computers.

The simulator also includes a provision for informing the operation of the particular control mechanisms which are out-of-correspondence with a selected simulated operational state.

BRIEF DESCRIPTION OF THE DRAWINGS

FIG. 34 illustrates the NIXIE display contact output summary;

FIG. 45 is a description of the format of the data link Queue entries for the A and B machines;

FIGS. 46A through 46D inclusive is a description of the format of data link control words for the A and B machine;

FIGS. 76A, 76B, 76C and 76D illustrate the flow chart for the model control function of the instructor's console;

FIG. 78 is a pictorial representation of the series of checks that are performed to determine the validity of an instructor's console request;

FIG. 79 is a pictorial illustration of the annunciator failure table ANMTBL;

FIGS. 91A through 91L inclusive when arranged according to FIG. 91 illustrate the front view of the engineered safeguards system portion of the control and monitoring panels of the simulator;

FIG. 111 is a tabulation of the feed pump efficiency constant utilized in the simulation;

FIG. 117 is a graphical illustration of the vibration output as a function of time;

FIG. 118 is a pictorial representation of the turbine heat up model;

Figure 120:
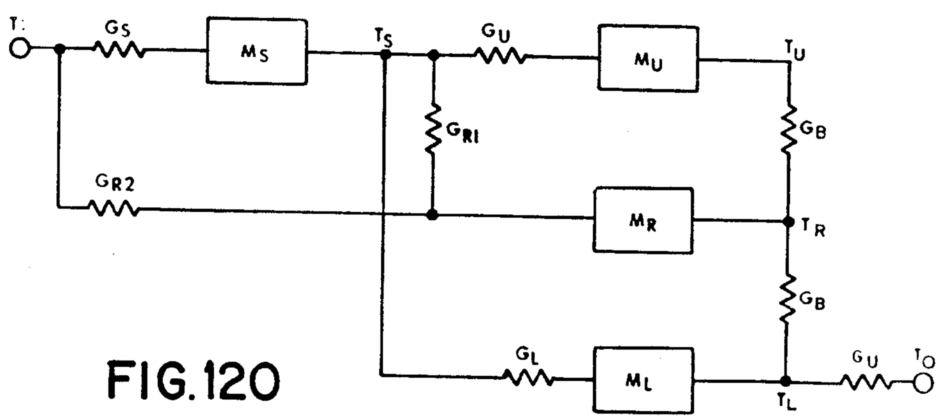
Figure 121:
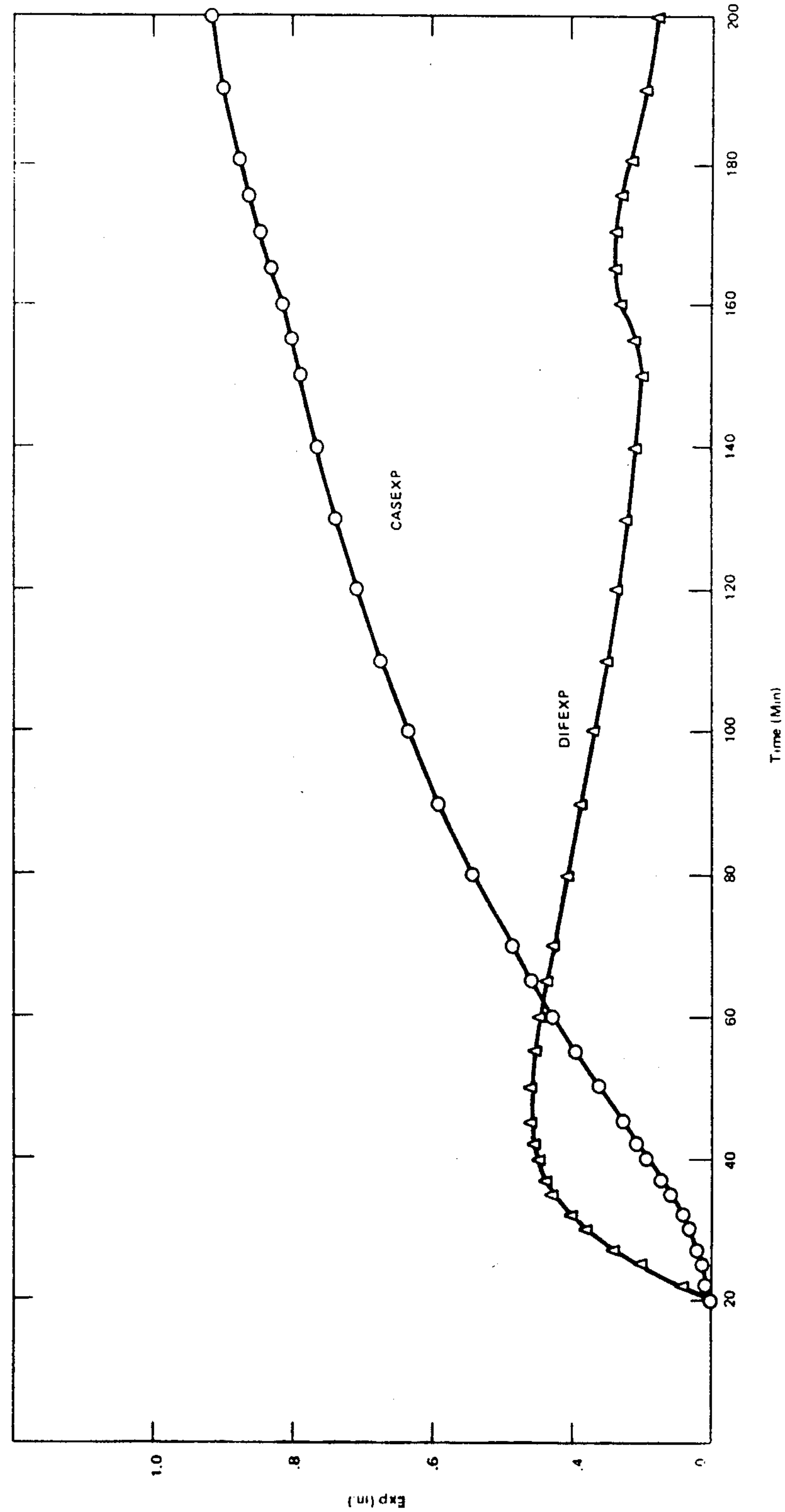
Figure 122:
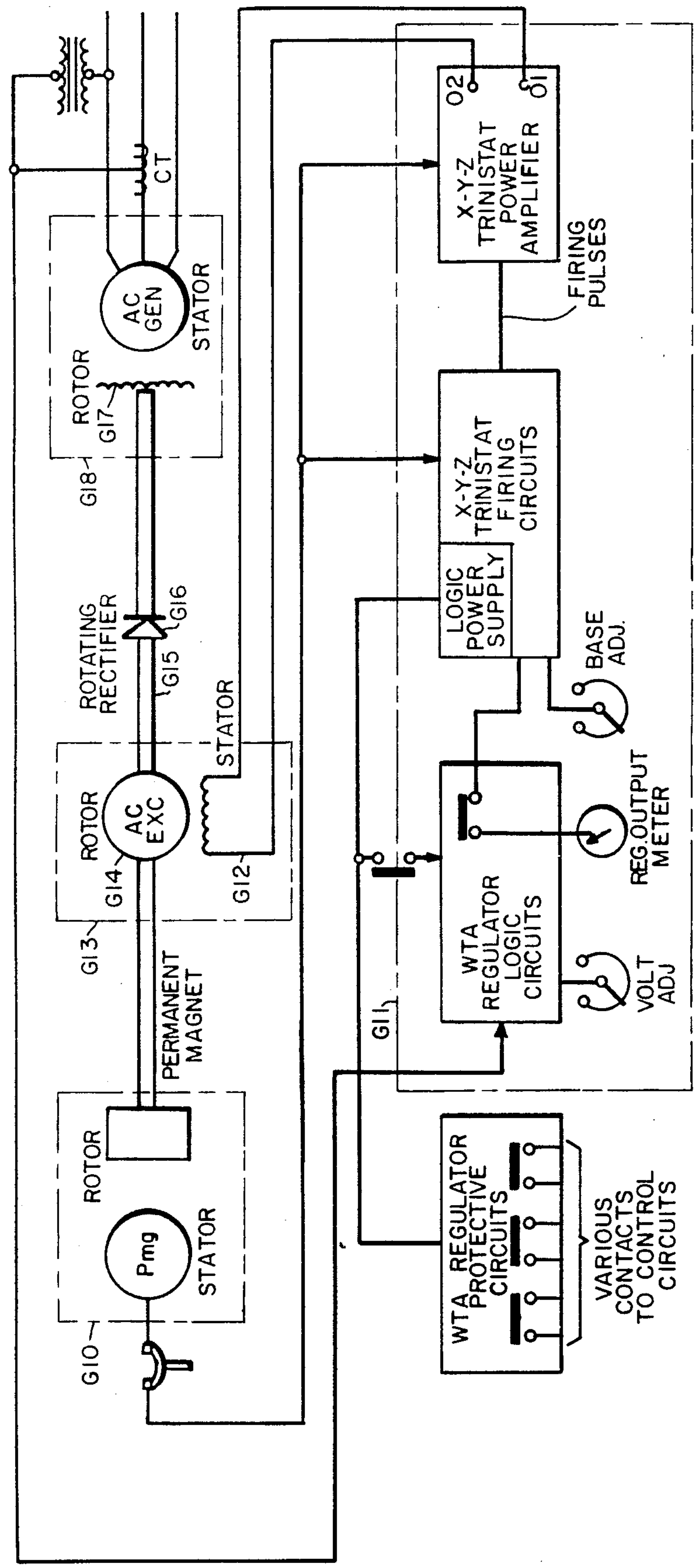
Figure 123:
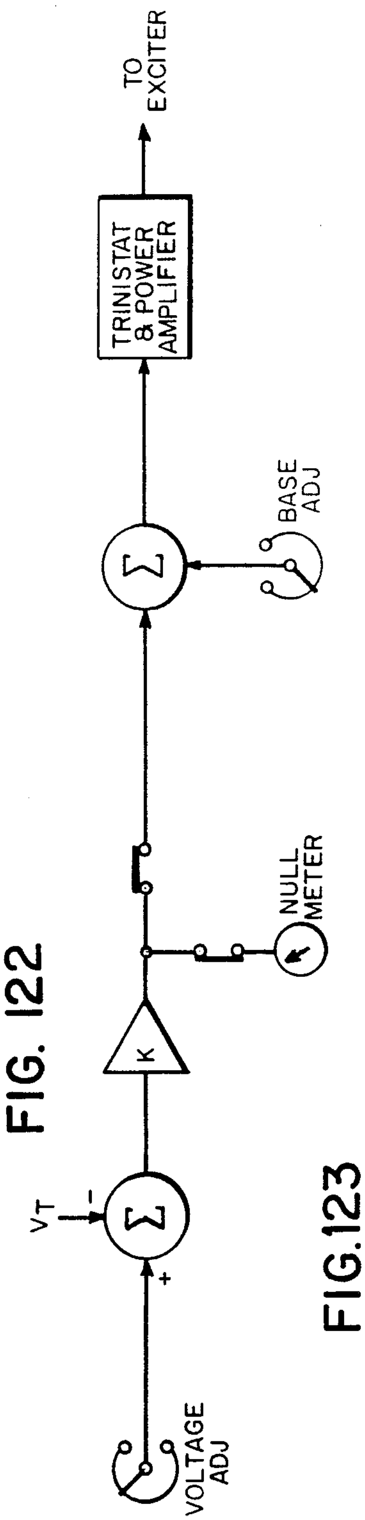
Figure 124:
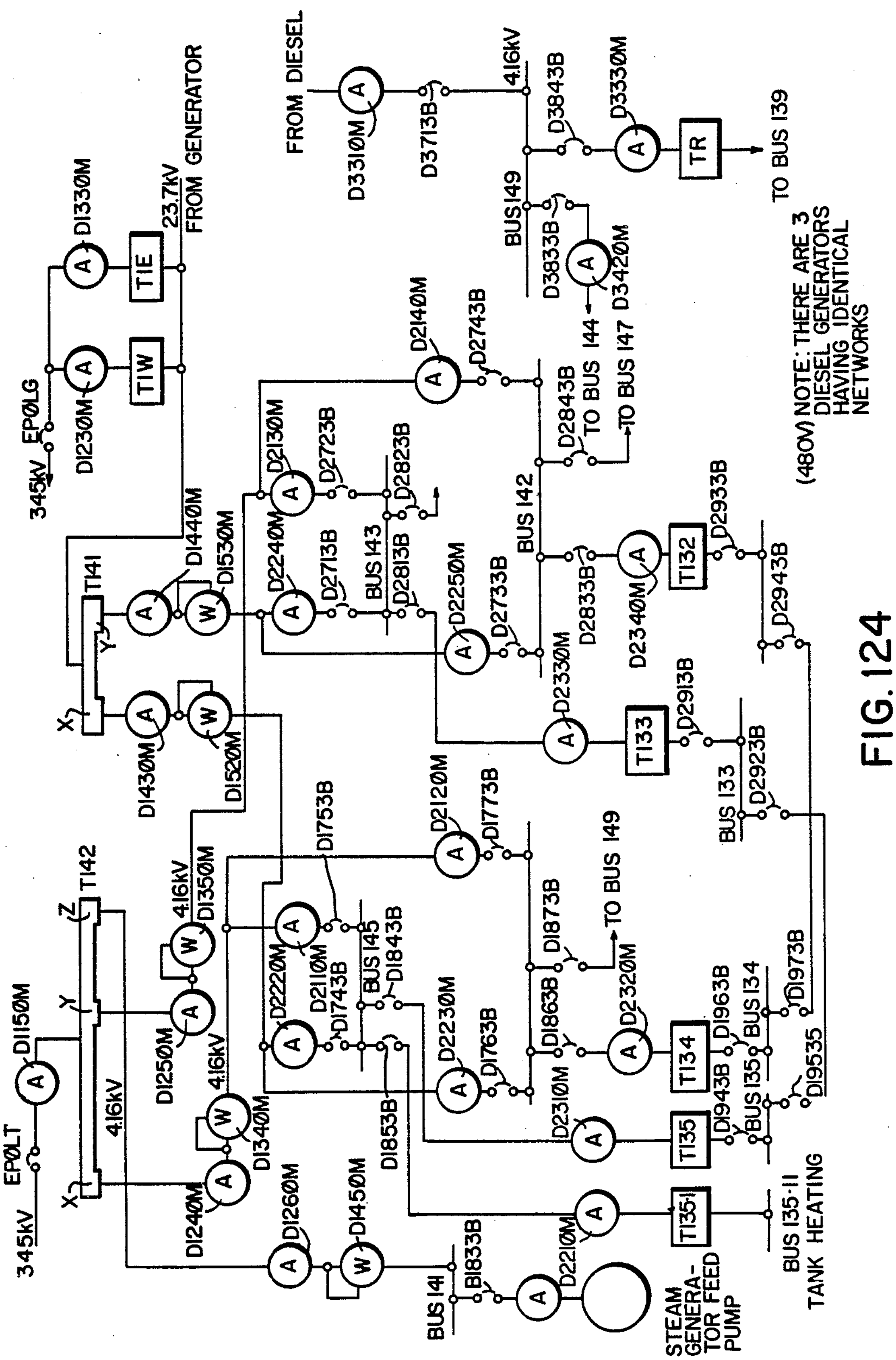
Figure 125:
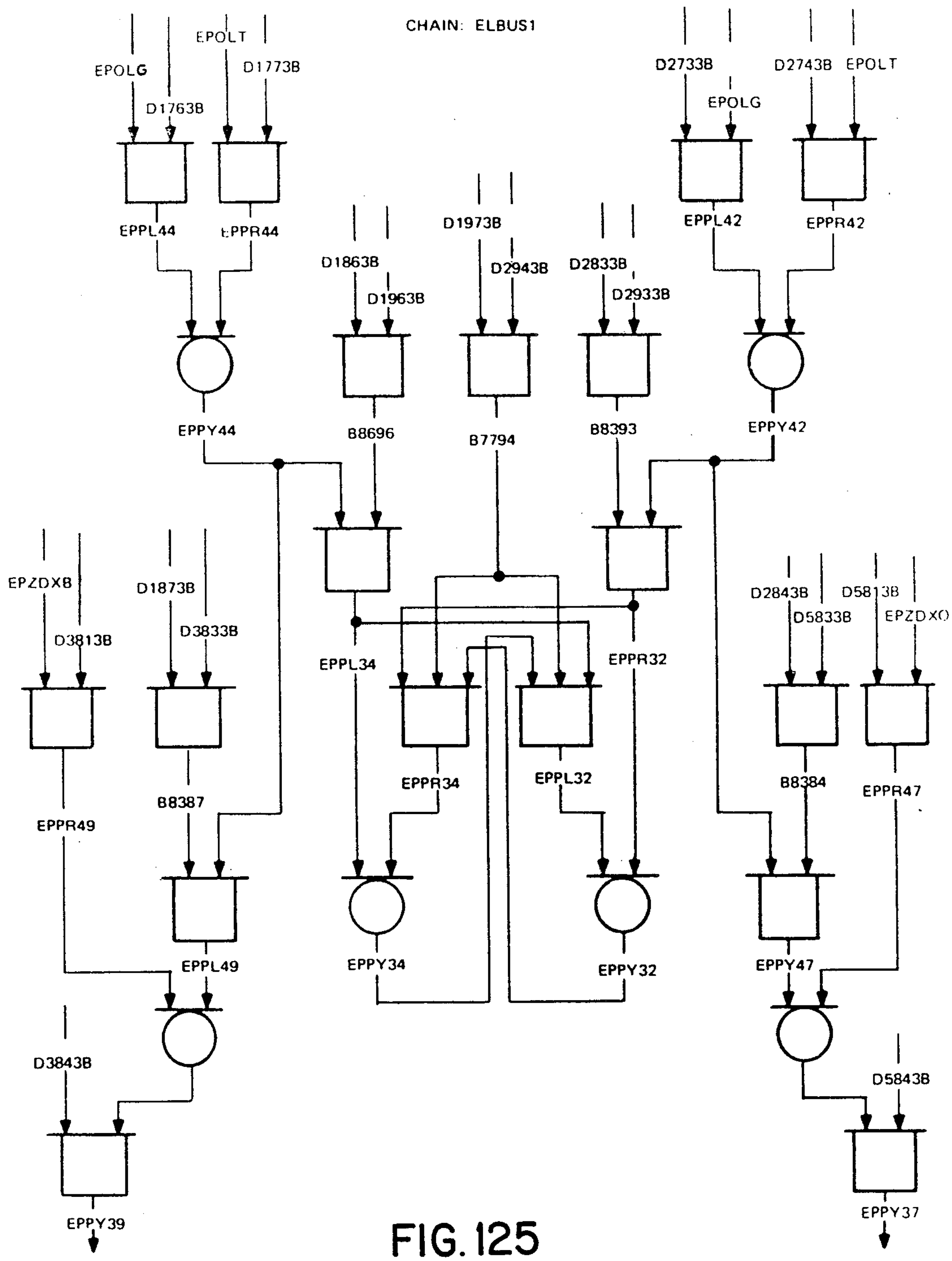
Figure 126:
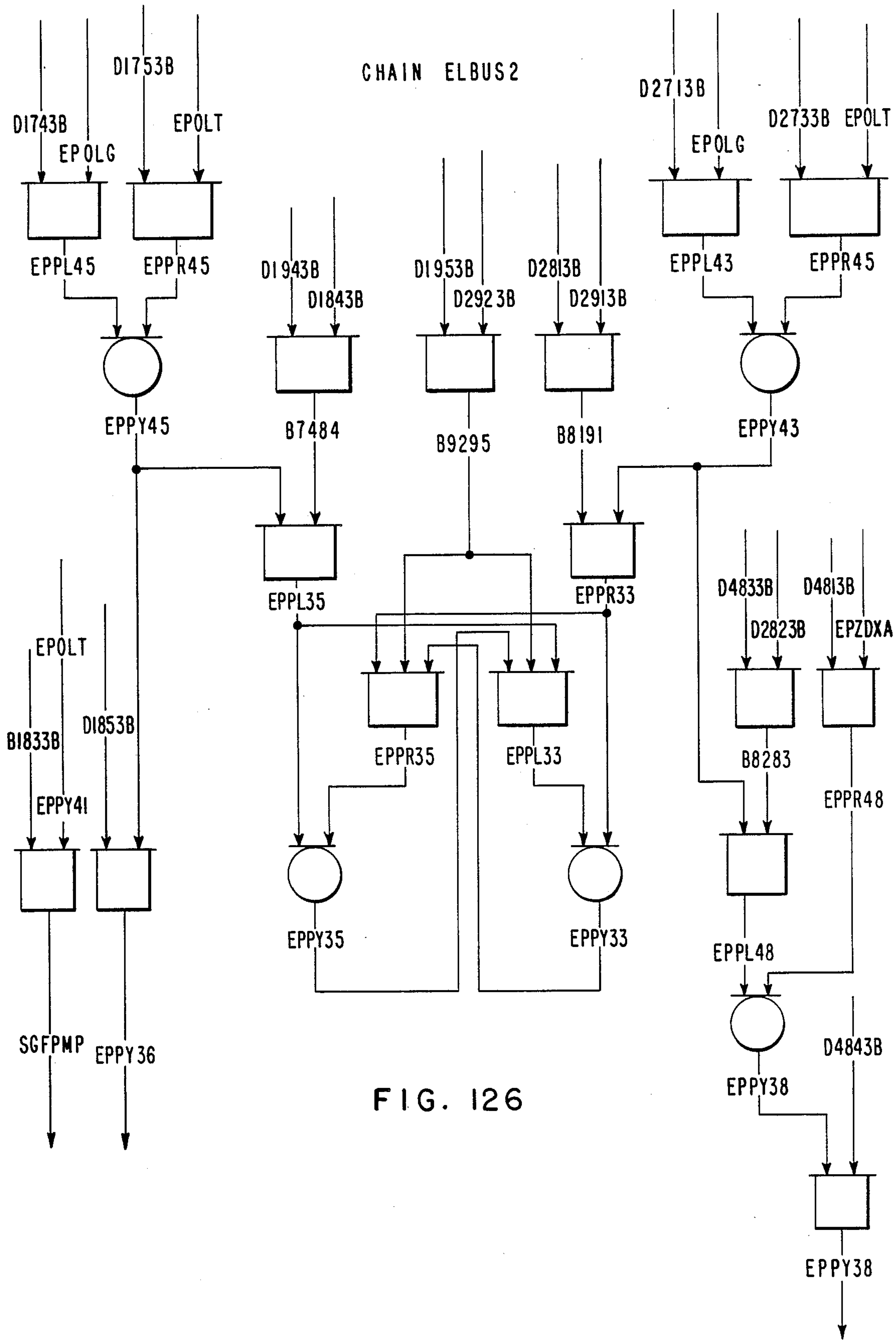
Figure 127:
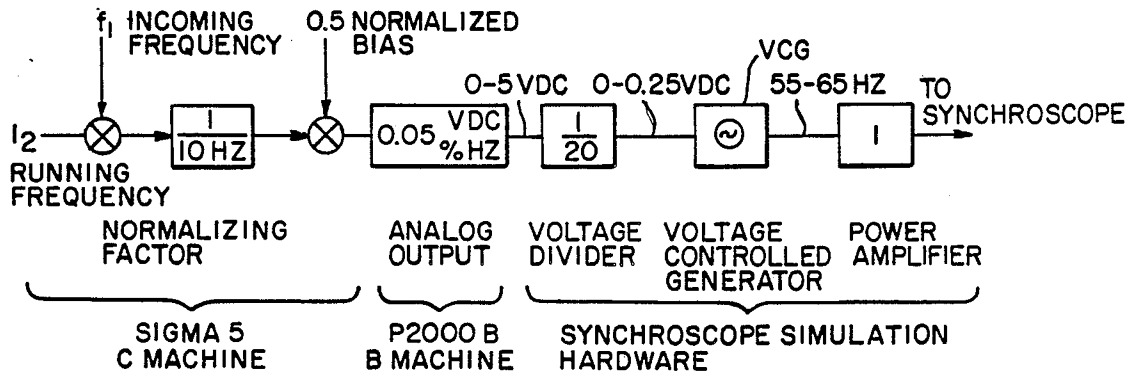
Figure 128:
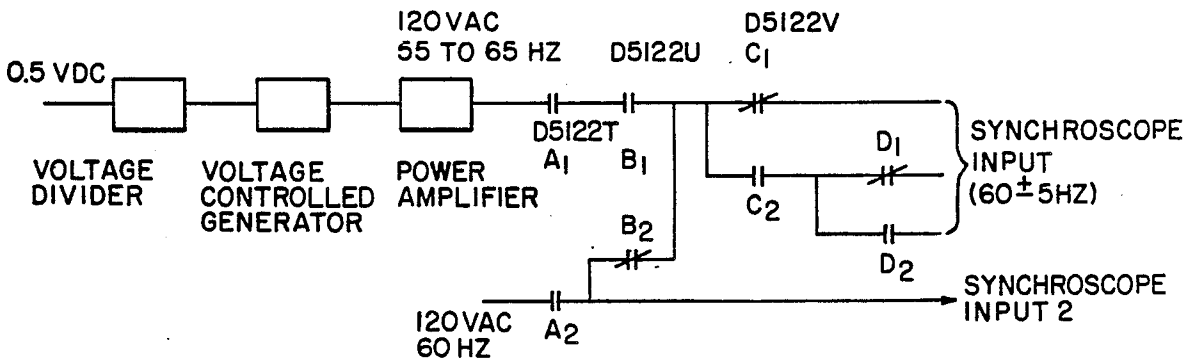
Figure 148:
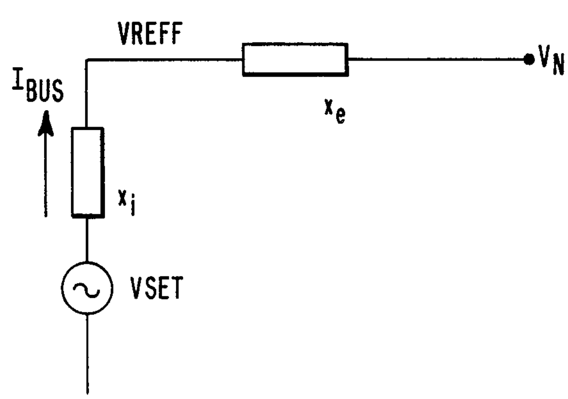
Figure 147:
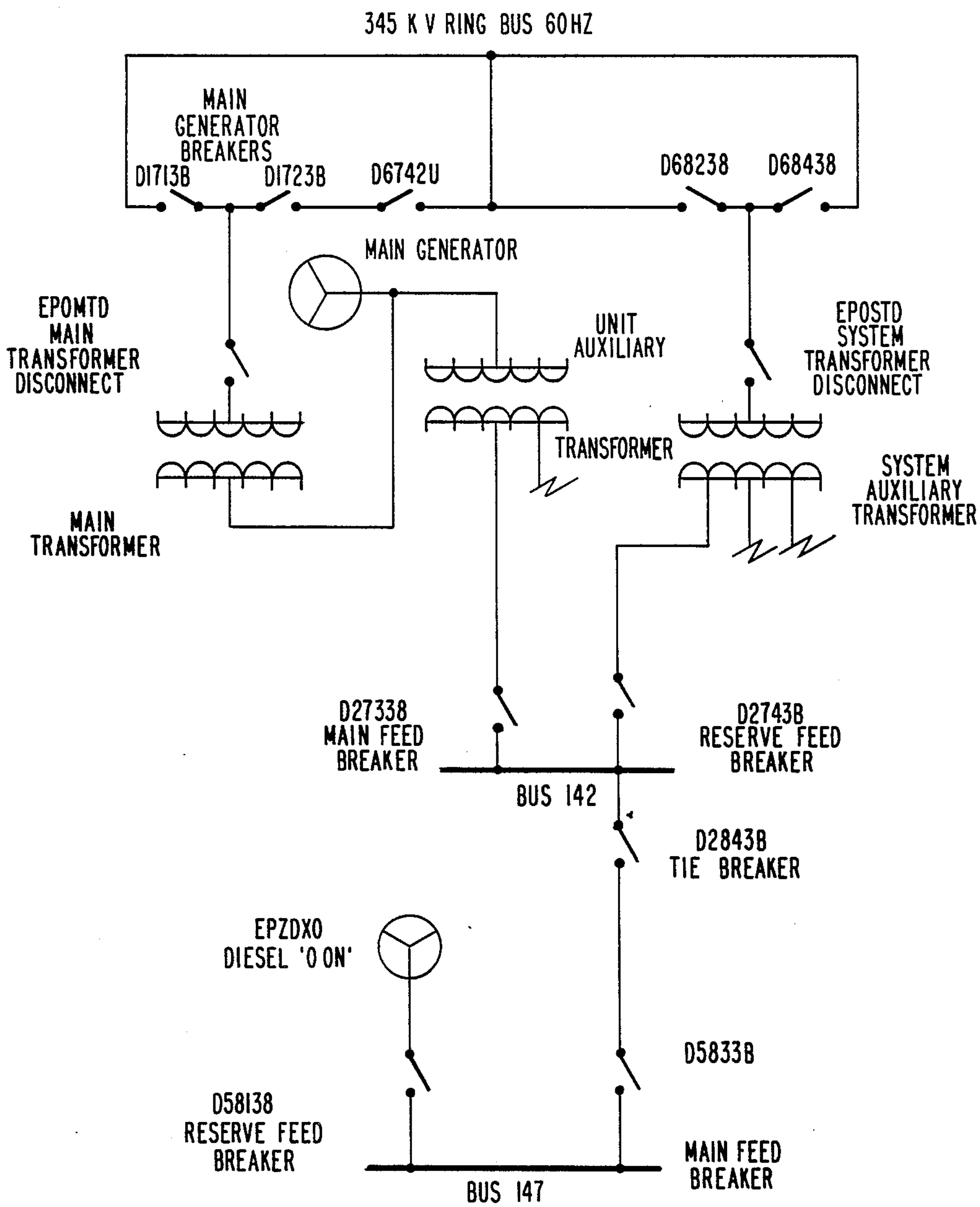

Page 119 illustrates an analogous electrical network of the calculations utilized in simulating the turbine heat up model;

FIG. 120 illustrates an analogous electrical network in simulating the thermal model for the rotor and turbine casing;

FIG. 121 is a graphical representation of the casing expansion and differential expansion in accordance with the present simulation;

FIG. 122 is a schematic diagram of a typical main generator and exciter for a system of the type simulated in accordance with the present embodiment of the invention;

FIG. 123 is a schematic diagram illustrating the functions of the simulated generator voltage regulator;

FIG. 124 is a schematic diagram of the station electrical network configuration in the system being simulated;

FIG. 125 is a logic diagram of the chain ELBUS1 for calculating the power status in the various busses;

FIG. 126 is a logic diagram of chain ELBUS2 for calaculating logic variables denoting power status;

FIG. 127 is a schematic block diagram illustrating the numerical calculations in the C machine and the analog signal flow that porduces the variable frequency signal in accordance with the simulation;

FIG. 128 is a schematic diagram of the hardware utilized in the simulation of the synchroscope;

FIGS. 129 through 146 inclusive diagrammatically illustrate the synchroscope logic simulated in accordance with the present embodiment of the invention;

FIG. 147 is a single line schematic diagram to illustrate the possible synchronizing operations that can occur on a particular bus in accordance with the present embodiment of the invention;

FIG. 148 represents an analogous electrical network to illustrate the calculations of the reactive power and current in the tie bus;

GENERAL DESCRIPTION OF SIMULATED NUCLEAR POWER PLANT

Figure 1:
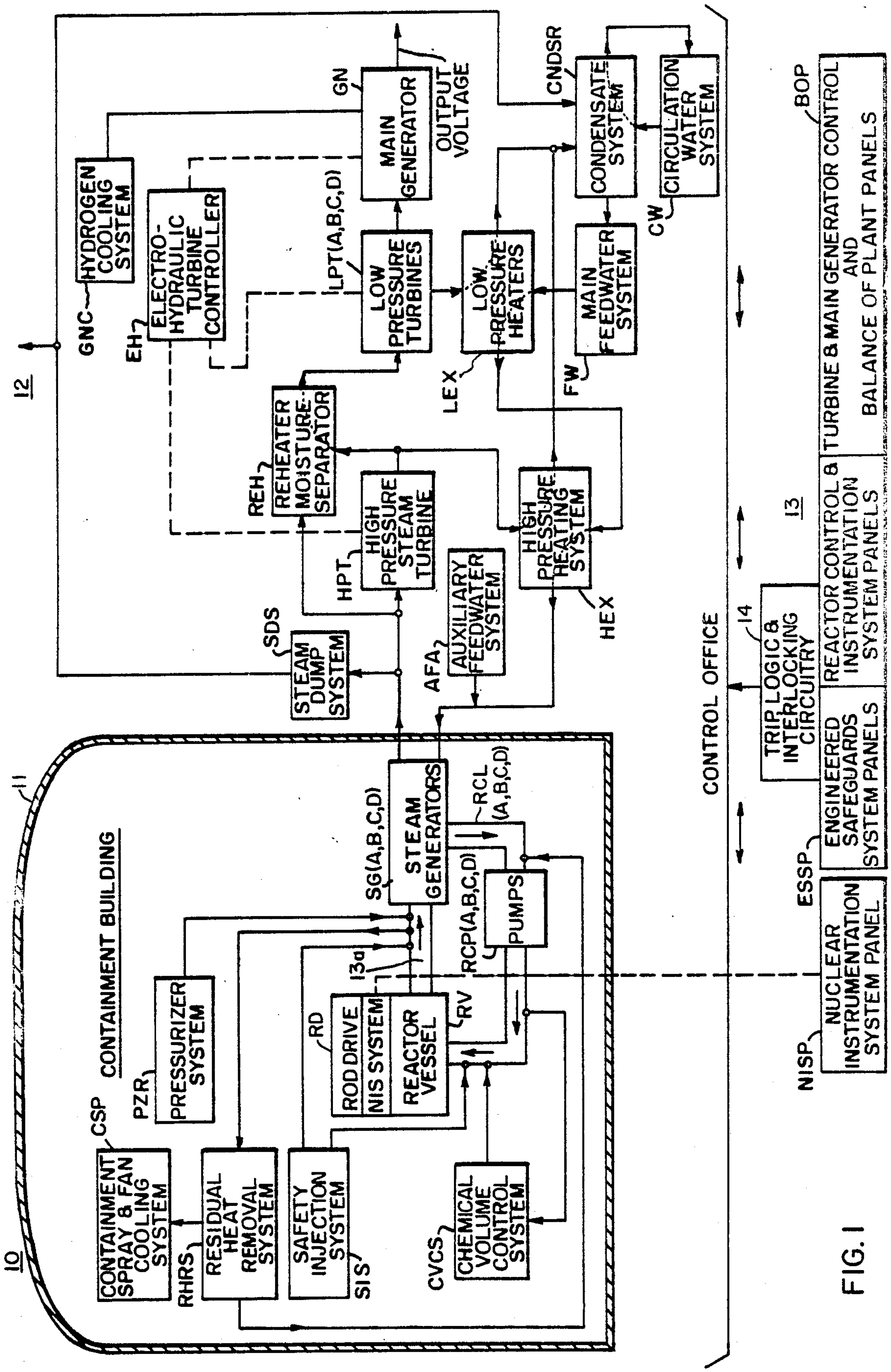
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system cf safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressure is measured and used as a load measurement for use in reactor control.

On leaving the last row of high pressure blades, the steam has a moisture content of approximately 10%. Thus, the steam is then passed through a moisture separator and reheater REH to improve the turbine efficiency and reduce the low pressure turbine exhaust moisture The exhaust steam from the high pressure turbine when first passed through the moisture separator portion REH removes approximately 10% of the flow which is extracted as moisture. The remaining 90% flows through steam heated reheater portion of REH where it receives approximately 100° F. superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annunciators on the central office panel 13.

Among the rector parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Figure 2:
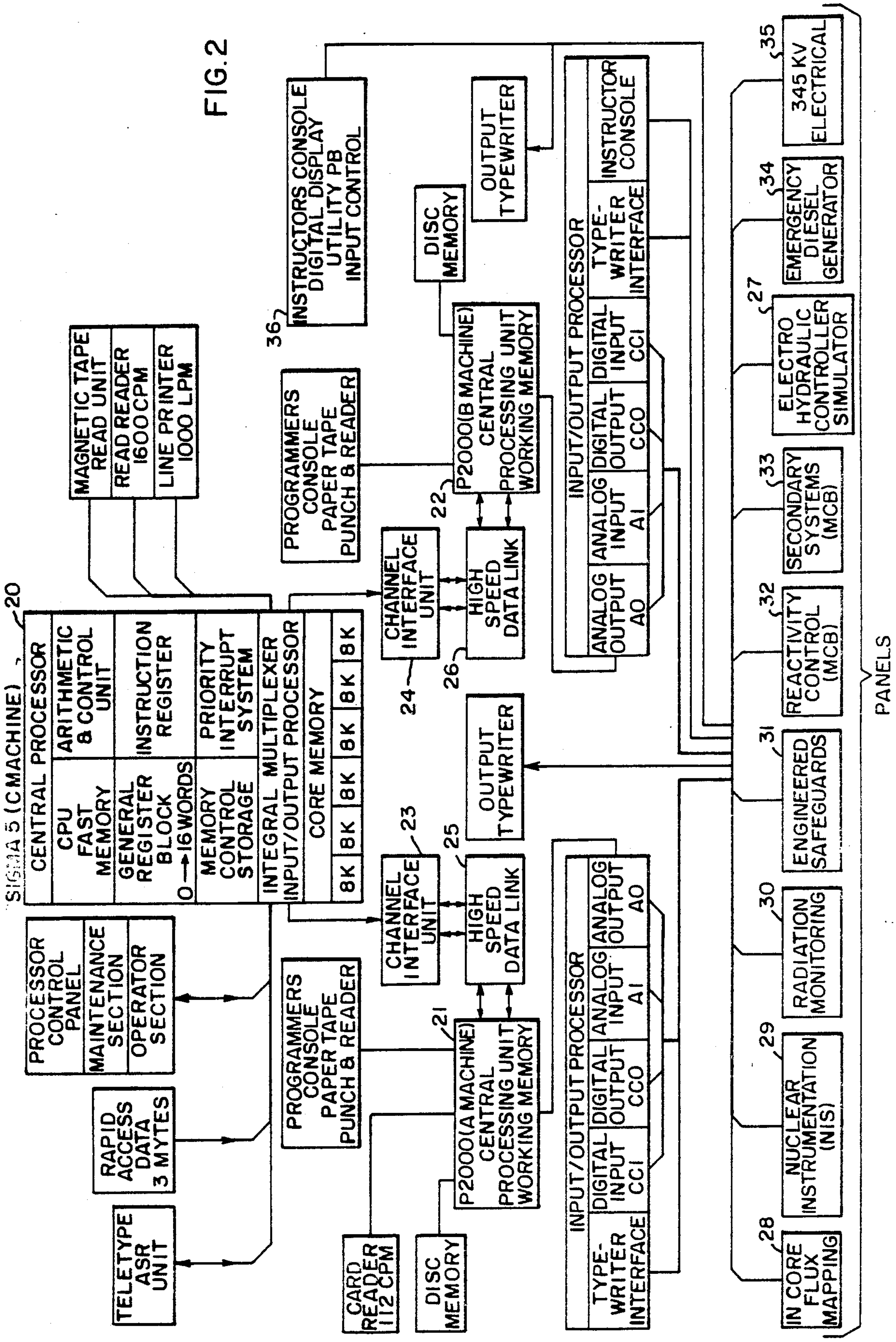
FIG. 2 shows a schematic block diagram of the apparatus used in simulating the operation of the plant shown in FIG. 1.

Specifically, and referring to FIG. 2, the simulation system includes a Sigma 5 digital computer 20 referred to at times in this specification also as the "C" machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the "A" machine and "B" machine, respectively and associated peripheral equipment of the type manufactured and sold by Westinghouse Electric Corporation, and which is known as model P2000, and which computers have been in general use for over one year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program. The significant hardware features associated with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

Figure 3:
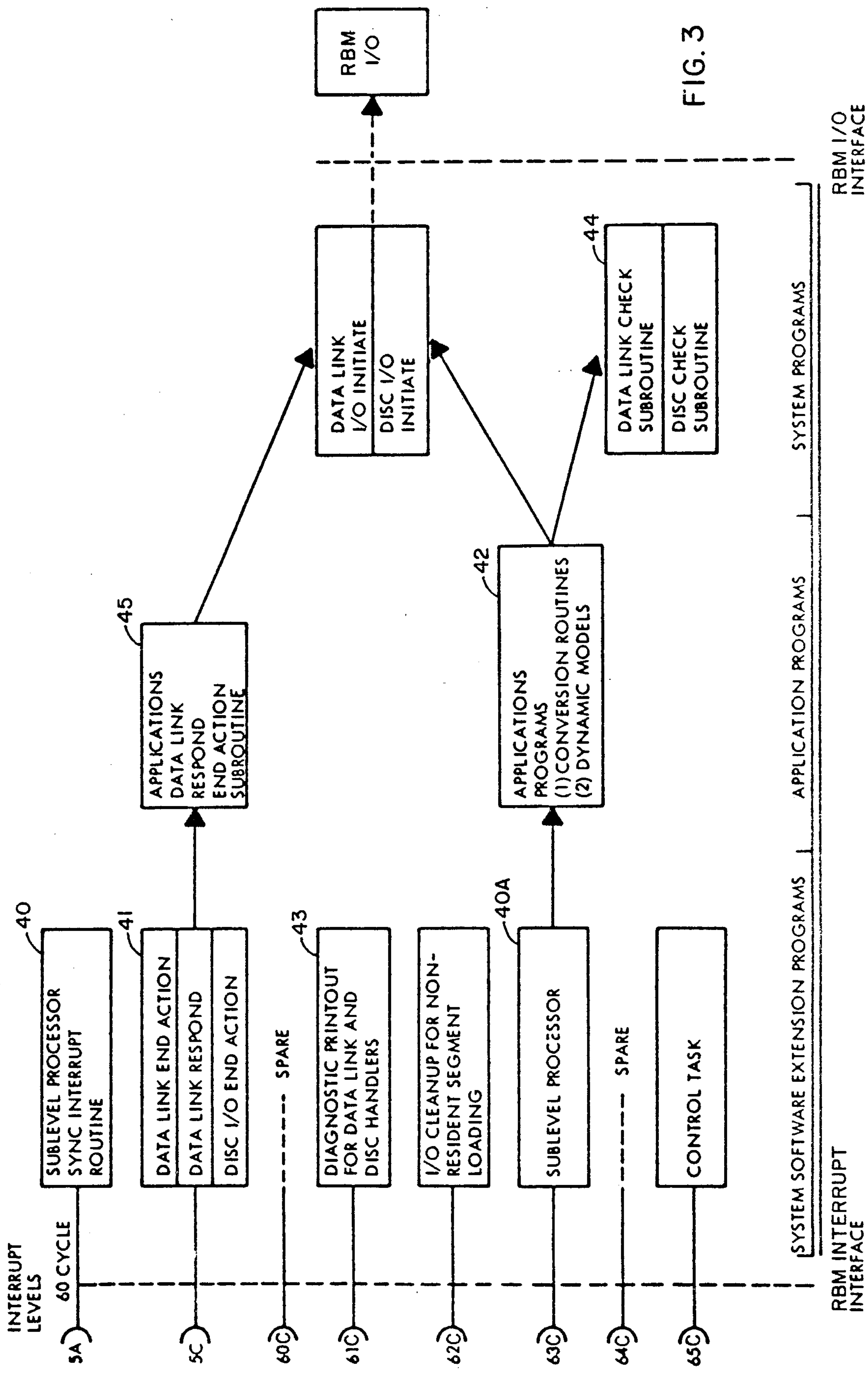
FIG. 3 is a schematic functional block diagram of foreground programs for the C machine shown in FIG. 2.

Referring to FIG. 3 the foreground programs are visualized as being a three layer structure which comprise the system software extension programs, that include the sublevel processor 40 and 40A, and the data link handler and disc handlers 41. Also, such foreground programs include the application programs which are made up of the data conversion routines represented in block 42 that include the logical and integer conversion routines and an analog output handler. Such on-line foreground programs also include the dynamic models referred at block 42.

The sublevel processor 40 and 40A expands an interrupt into 32 sublevels. The periodic order of the execution of the various sublevels enables the synchronization of the three machine (A, B, and C machine) configuration. The disc handlers operate within the RMB file structure and provide a direct access-no wait transfer; and the data link handlers provide the capability of transferring two way information between the C machine and the A and B machines.

The data transmitted among the three computers is of two types, logical and integer. The dynamic models are programs preferably executed mainly on a periodic basis, in this instance one group at four times per second, and a second group at two times per second. Prior to the execution of each of the above groups of programs a request for transmission of data from the A and B machines pertinent to that set of programs is made. After the data is received, and in order to provide usable data for the models, the logical conversion routine must be executed to transform bit logicals to word logicals for use by the models; then the integer conversion routine must be executed to transform 16 bit integers to 32 bit integers; and finally routines which simulate plant pumps, valves, and controllers are run to provide new values for such variables as pump speed and head, valve position, and so forth. In making updated calculations, the pump and valve routines make use of transmitted logicals which have been established by the interlock logic in the A and B machines. The controller routines make use of transmitted raise or lower logicals where applicable and also integer data which represents potentiometer settings on the auto/manual control stations on the control panels. After the execution of each group of model programs, the logical and integer conversion routines are called to perform the reverse process to that previously described. In addition to these routines, an analog output handler must be executed to take the floating point numbers generated by the model for analog outputs, that is for meters, recorders, and so forth, and prepare them for transmission as integer half words to the A and B machines.

The software for the A and B machines perform the function of control and optimization of the input/output communication with the control panels, instantaneous response to operator action, simulation of plant systems such as the plant interlock logic and reactor protection system logic, and reactor control rod and synchroscope simulation. Also, the A and B machine software functions as an interface between the instructor's console 36 (see FIG. 1) and the plant dynamic model. The means for executing the functions for the A and B machine software, is provided by an automatic programming system, hereinafter referred to as PROGEN. The software modules contained within the automatic programming or PROGEN system for the A and B machines include the monitor system, sublevel processor, interpreter and algorithms, digital scan, analog input scan, analog output scan, instructor console control, and the data link handler.

Figure 4:
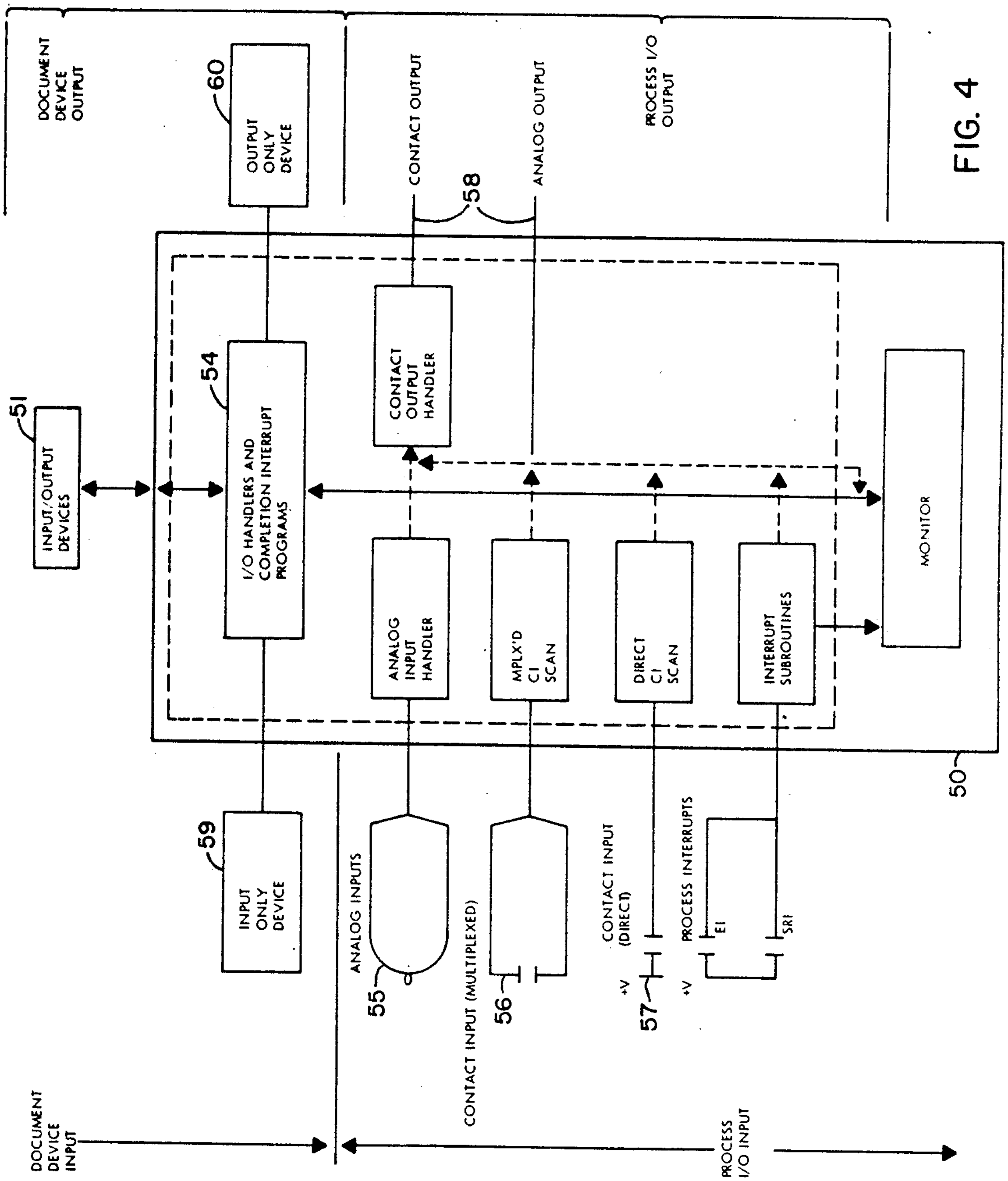
FIG. 4 is a functional block diagram of the monitor structure for the A and B machines shown in FIG. 2.

Referring to FIG. 4 the monitor 50 is a collection of routines which provide for time sharing of the central processing unit (see FIG. 2) and the input/output devices 51. A task scheduler routine in the monitor provides the capability for task scheduling on a priority basis for 16 levels. Input/output handler routine referred to as block 54 implements communication between the central processing unit and the process input/output such as the analog input 55, contact inputs 56 and 57 and outputs 58. The input/output handler 54 also implements communication between the central processing unit and the document devices (see also FIG. 2) 59 and 60, which include a paper tape input/output, a card reader, and a Selectric 735 input/output typewriter. Also, it implements communication with the disc memory. The sublevel processor of the A and B machines expands the priority structure provided by the A and B machine monitors. Each of the sixteen priority task levels may be expanded to 256 sublevels.

Figure 5:
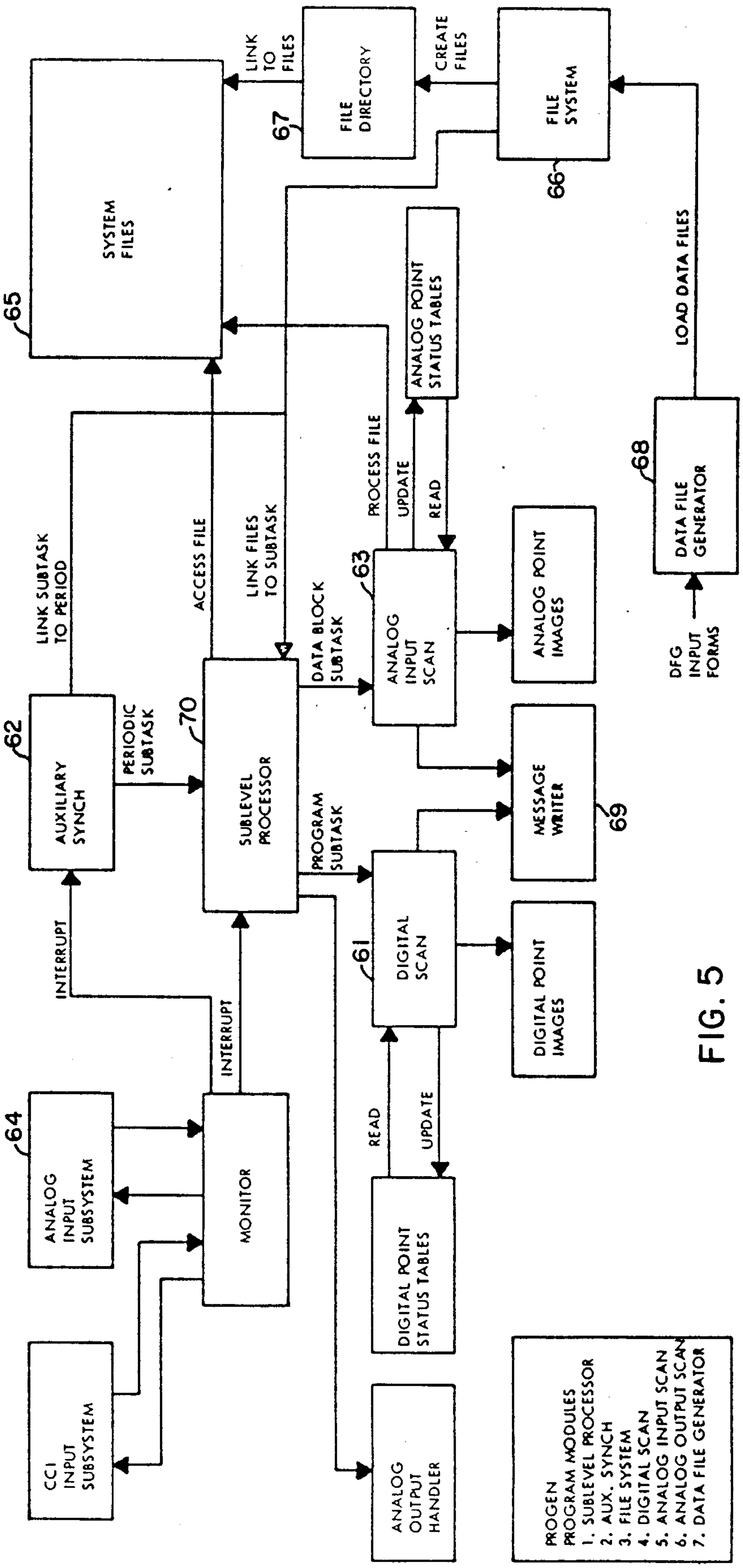
FIG. 5 is a functional block diagram of the data acquisition and alarm function routines for the A and B machines.

Referring to FIG. 5, data acquisition and alarm function routines are made up of program modules that include a digital scan 61, which function is actually performed by several programs with each handling a particular block of logicals. The functions performed by each routine are identical, but are performed as individual tasks because of different timing requirements for scanning the different blocks of logical. For example, a routine which scans the multiplex inputs must be run periodically every one-quarter second, and it is therefore triggered by the auxiliary synch routine 62. In contrast, bi-directional contact inputs cause an interrupt to occur which in turn causes a scan routine to eventually be run to scan the block of logicals associated with that particular interrupt.

The digital scan routines read the actual hardware image of all specified contact inputs and update a users image of these points. The points are scanned to detect a change of state. A change of state will, depending on the logical, trigger alarm messages and/or other programs.

The data acquisition and alarm function routines also include an analog scan 63 which calls the analog input handler 64 periodically to input the analog points, scales the input values for use by the models, and produces an alarm message for a point which changes beyond a certain deadband and remains in a stable position for a period of time.

The data acquisition and alarming function relies on a data file system 65 and 66 and 67, in which data files exist for most process variables in the system. The process variables include analog inputs 64, which include analog input points whose values are read into the computer by way of the subsystem hardware; calculated values which are values calculated and stored by a program; logical variables, which are logical values (true or false) as set by a program; and contact outputs, which are contact outputs in the subsystem hardware. The data files 65 contain information such as flags indicating normal status for logical points, alarm flags indicating that, upon change in status of the variable, a message should be printed, and an English description of each variable. The data files 65 are originally written in a PROGEN format and are generated offline by a PROGEN data file generator program 68 and loaded into the computer system by a file loader program.

A message writer program 69 handles communication with the instructor's console typewriters (see FIG. 2). The program 69 enables programs to be serviced with a print-out to continue running instead of going into suspension waiting for a message to be printed.

An auxiliary synchronizer program 62 provides the basic time keeping for all programs which require time-based actions or initiations. This program is actuated at every system base period from the synchronizer interrupt. During each system base period it executes functions which include bidding a sublevel after the expiration of time delay, periodically bidding specified sublevels, counting down active logical time delays, rumming the time-delay countdown routine in sublevel processor 70, and counting down active contact output (CCO) time delay outputs.

The analog outputs on both the A machine and the B machine are updated at either 2/second or 4/second intervals. The handlers which update the analog outputs are particular sublevels which are bid and run after the analog outputs have been transmitted from the C machine. The actual frequency of running these programs is therefore determined by the frequency that the analog outputs are transmitted from the C machine.

The data link handler routine implements data transfer between the A and B machine and the C machine. The data link handler is capable of accepting request for data transfer from both computers. It has the flexibility of transmitting fixed data blocks with fixed core addresses and also of transmitting fixed length output of data located anywhere in core to and from both the A and B machines. With the exception of the instructor console functions, all data transmission between computers is implemented with fixed length buffers with the transfer initiated by the C machine. The buffer transfer of instructor's console functions is not initiated by the C machine, but by the function programs that reside in the A or B machine.

Figure 6:
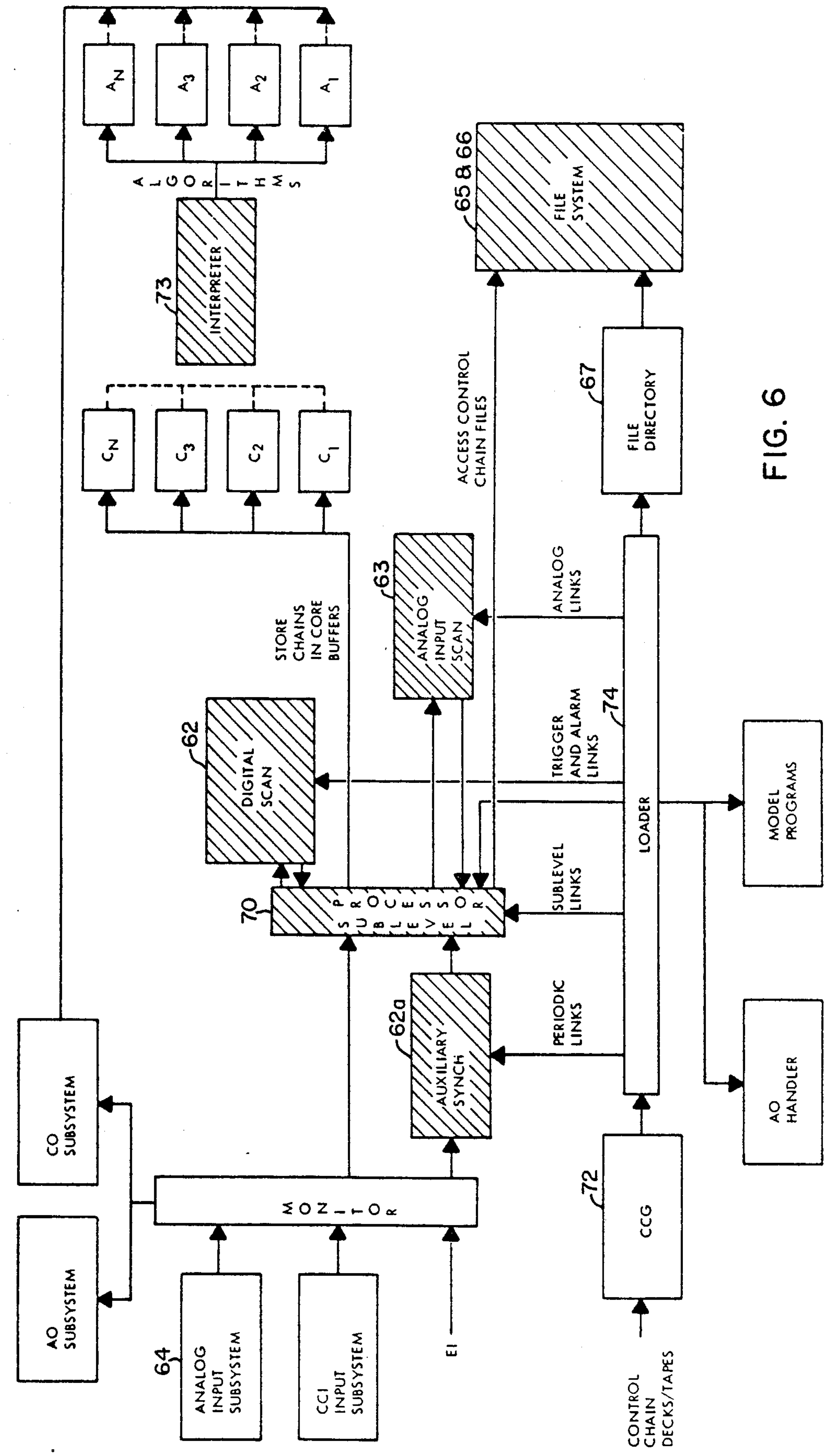
FIG. 6 shows the configuration of the PROGEN application programs.

FIG. 6 illustrates the structure and manner by which the PROGEN system application programs. The previously described data acquisition and alarm system provides the data base for the application programs which comprise assembly language, FORTRAN IV, and PROGEN language routines. Routines written in PROGEN are referred to as chains. This designation is given because the code generated by a PROGEN control chain generator 72 in response to a program writer's input in an interpretive code consisting of a series of links which designate stored algorithms to be executed. All chains are disc resident and are read into core buffers by the sublevel processor 70 when they are scheduled for execution. An interpreter program 73 executes a chain through interpretion of the code and calling of core resident algorithms.

As in the case of data files, the chains are loaded by PROGEN loader 74. The loading process comprises providing links with the auxiliary synchronizer program 62 for those chains which are to be bid periodically, providing links with the sublevel processor 70 on information necessary for execution, providing links where necessary with the digital scan 62 and analog scan 63 routines on triggering and alarming functions, creating entries in the file directory 67, and actually loading the chains in disc files.

The reactor protection system logic, control panel interface logic, flux mapping logic, and synchroscope logic are all written in the PROGEN language. Special routines which model the reactor control rods are written in FORTRAN IV and loaded into the computer system to be operable in the PROGEN system. These routines take data from the control panel and from the C machine to continually calculate the position of the control rods. This information is then transmitted to the C machine and also displayed on the control panels.

Figure 7:
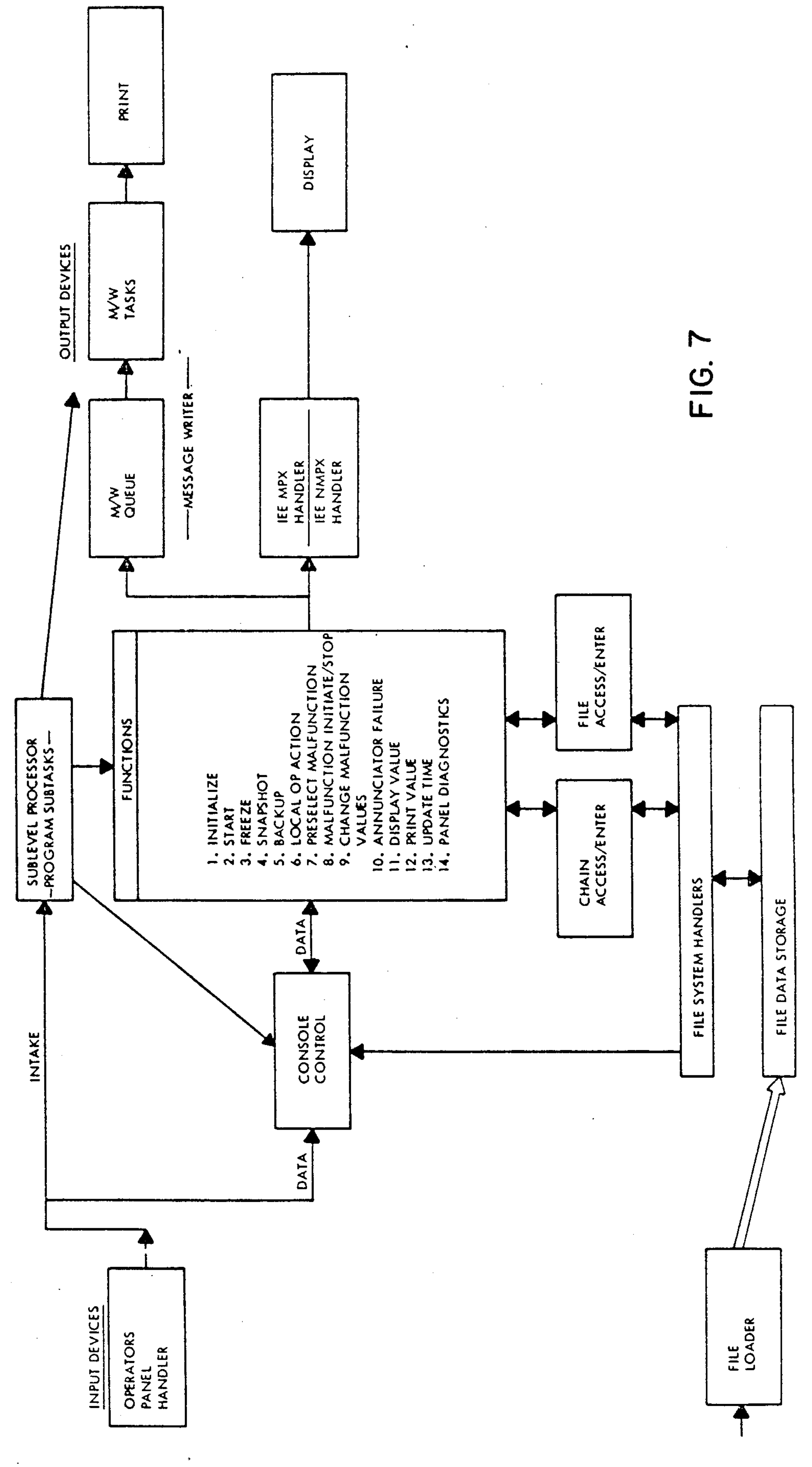
FIG. 7 is a functional block diagram of the instructor's console system of FIG. 2.

Referring to FIG. 7, the instructor's console system provides a tool for the instructor to manipulate and control the plant simulator. The software structure which interfaces with the instructor's console resides in the B machine.

Figure 8:
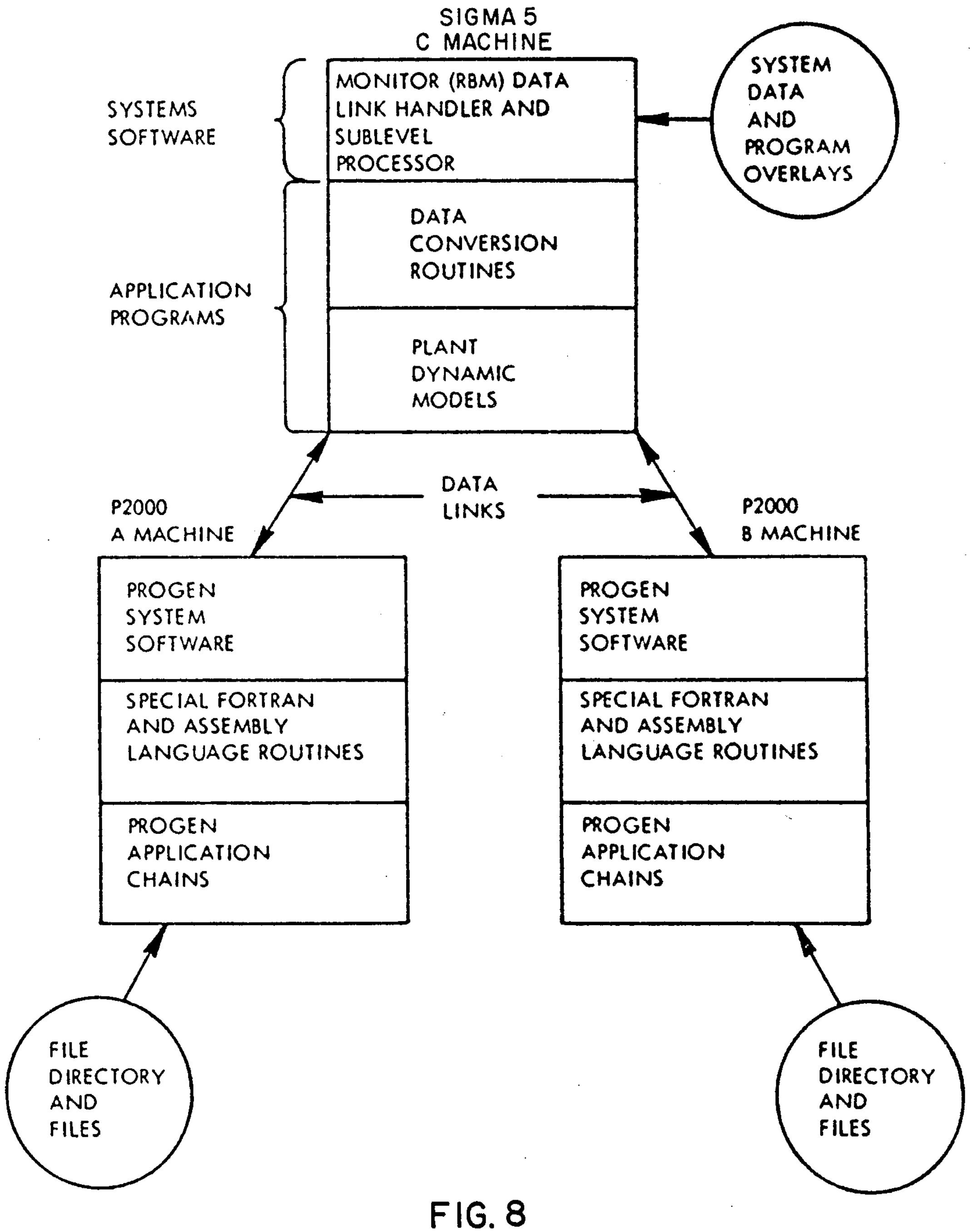
FIG. 8 shows the structure of the simulation software for the A machine, B machine, and C machine shown in FIG. 2.

As shown in FIG. 8, the plant simulator employs software which is interrelated in a three machine configuration. Most of the application type programs require the execution of several programs on two or on all three computers.

U.S. Pat. No. 3,903,403 issued Sept. 2, 1975 entitled "Nuclear Power Plant Training Simulation and Method" is incorporated herein by reference for a detailed description of the software system control as accomplished by the execution of various sublevel programs in a fixed sequence in the C machine.

C MACHINE SIMULATOR PROGRAMS

Figure 9:
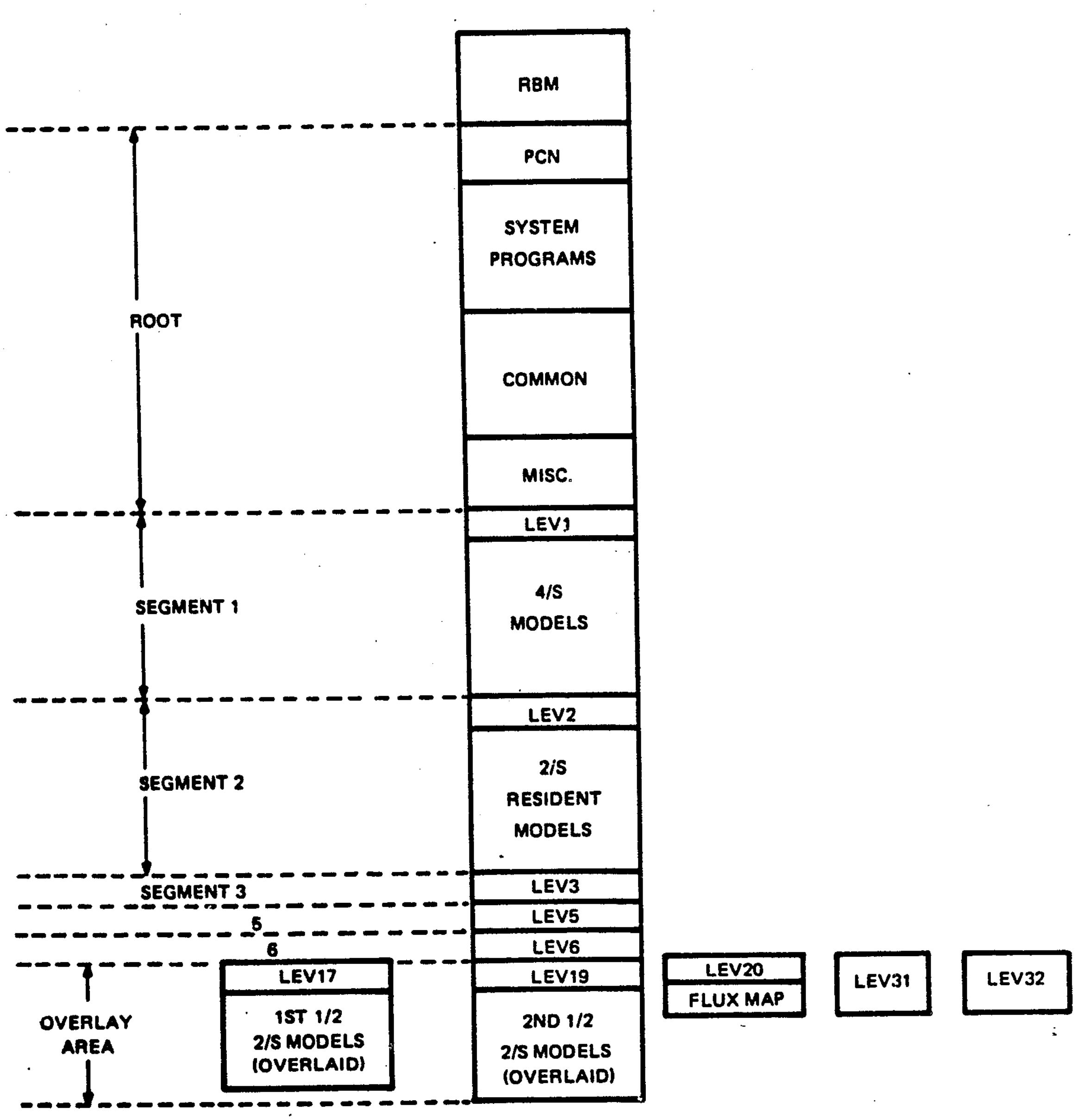
FIG. 9 illustrates the core diagram of the C machine.

Referring to FIG. 9, the core diagram of the Sigma 5 or C machine shows the sublevels LEV1, LEV2, LEV3, LEV5, LEV6, LEV17, LEV19, LEV20, LEV31, and LEV32 which are handled by the sublevel processor for the C machine program system which in this embodiment provides most of the simulation or modeling of the nuclear power generating apparatus (FIG. 1). Each sublevel includes respective calling subroutines LEV which perform subroutine calls and function calls to the sublevel processor, data link handler, and disc handler. The sublevel ca-ling routines LEV are executed in a fixed order based on a one quarter second period. The programs in the plant model or simulation program system, invention, are called by the aforementioned sublevel calling routines. Some of the model programs are executed on every run or cycle of the sublevel processor, that is, every one quarter second (4/S models); and other model programs are executed on every other run or cycle, that is, every one-half second (2/S models). Other models are non-periodic, and are executed only in response to a specific set of input conditions.

The 4/S model subroutines, which are called from LEV1, and are always resident in core, are as follows:

| | |
|---|---|
| THERMO | FCALC |
| BOP | DETOUT |
| BOPAOA | XETOUT |
| STMGEN | CHAMBR |
| RHMSEP | PLTLT |
| BOPCTL | RODGO |
| ELCRNT | SETTMP |
| SECOND | RCSLOP |
| PADE | RCSLP2 |
| HWATER | PREZCON |
| SIGMAS | PRSRZR |
| TWATER | EXGENM |
| HWPSAT | |

The 2/S models, are segregated into resident and non-resident groups. The resident 2/S models which are called from LEV2 are as follows:

| | |
|---|---|
| AUXFED | SIS2 |
| ACUMM | SIS3 |
| SIMAIN | SIS4 |
| CONPRS | SIS5 |
| FWFLUD | SIS6 |
| SIS1 | SIS7 |

The 2/S models which are non-resident are in turn segregated into two halves, which each half executing on alternate runs. The first half of the non-resident 2/S models, which are called by LEV17 are as follows:

| | |
|---|---|
| AUXIL | LIMP |
| HAND | RCBORC |
| POISON | PRSRFT |
| FPROD | CVCS |
| RADMON | BORECY |
| TMCPLS | SEALFW |

The 2/S models which comprise the second half and are called by LEV19 are as follows:

| | |
|---|---|
| COCOOL | BFPEFF |
| RHR | CIRWTR |
| LIMCHK | SERWTR |
| BOPAO2 | SECLIM |
| TURSUP | LIMCK2 |

The non-periodic models that are called or executed only in response to a specific set of input conditions, and are called by LEV20, are as follows:

| | |
|---|---|
| TRACE | PLCHAN |
| CURROD | RODCHN |
| TILT | |

Figure 10:
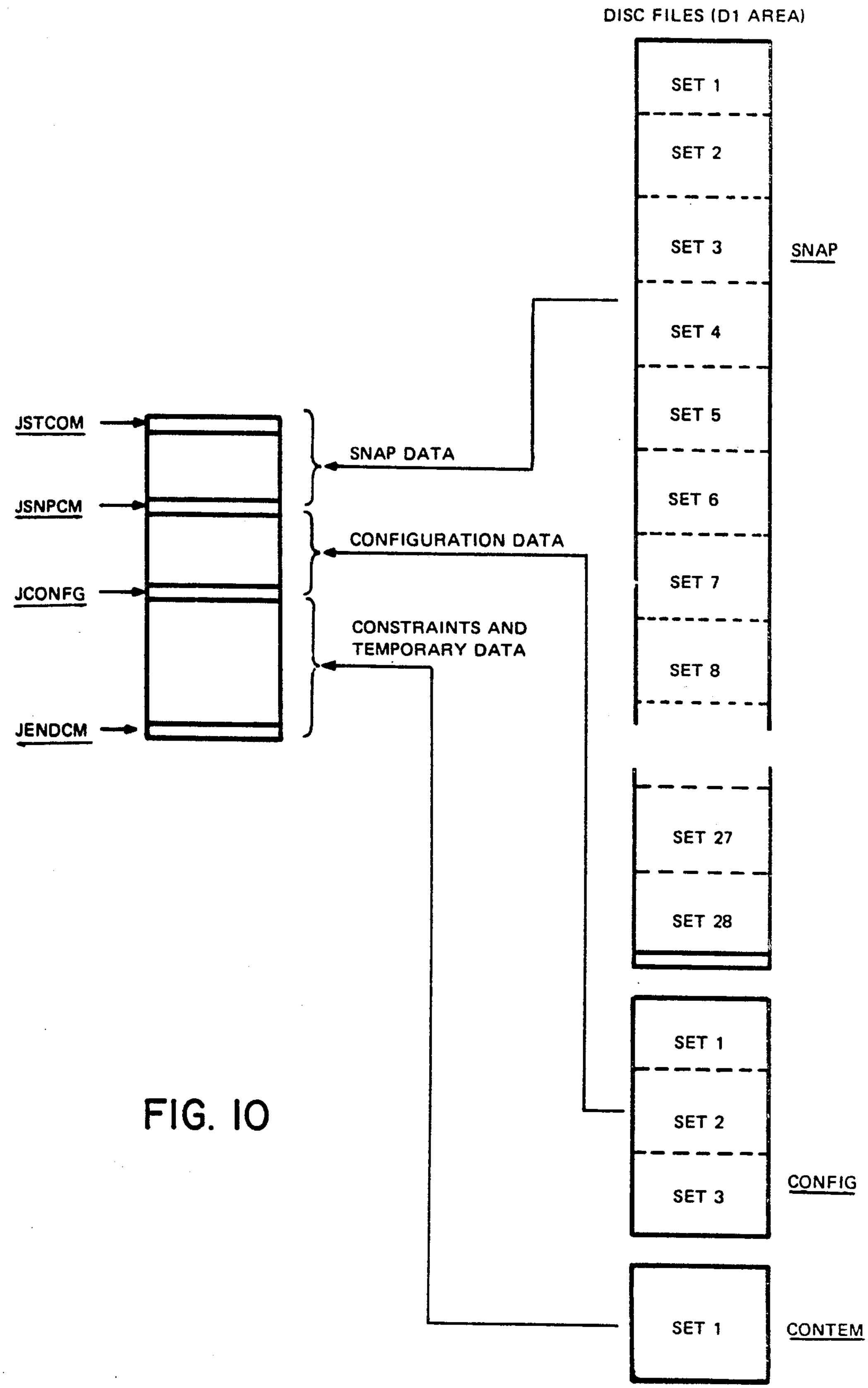
FIG. 10 shows the organization of COMMON data on disc and in-core of the C machine.

Referring to FIG. 10, the core of the Sigma 5 or C machine contains data known as COMMON data. The core is divided into three sections of COMMON data known as the snap, configuration, and constant data sets respectively. The initialization, snapshot, and data link transmission functions all depend on the organization of this COMMON data in the core of the C machine. This COMMON data is data which is referenced by more than one program or over a period of more than one quarter second.

The first section contains snap data, which data is necessary to define a specific operating condition of the entire power plant. This snap data represents each operating parameter of the plant and is highly dynamic, varying from one run to the next. It remains continuous, however, with the value generated by the models in the previous run often representing the input values for model calculations in the current run.

The second section of COMMON data of the core is configuration data, which is constant with respect to any point in the life of the reactor core. In the present embodiment of the invention there are three separate points in the life of the core, beginning of life, middle of life, and end of life. Once initialized, this configuration data does not change in the computer core, but it can be initialized to represent any of the three mentioned points in the reactor core life span. The third section of COMMON consist of data which never changes, known as constant data, plus temporary data which is referenced by two or more programs during the execution of the current run only.

Two FORTRAN subroutines are used to allocate all COMMON data in the system. Subroutine BLOCK allocates all snap data. Subroutine BLKDAT allocates the configuration and constant data. When loaded into the system as part of the root these two routines BLOCK and BLKDAT ensure that each COMMON variable remains in the same location relative to the other COMMON data even if the location and size of the routines generating or referencing the data are changed for system additions or corrections.

Referring again to FIG. 10, buffers with sizes equal to the snap, configuration, and constant data sets are allocated on files on the Sigma 5 disc. At snapshot time, images of all three sets of COMMON data are stored from core into the disc file buffers. At on-line initialization time, the proper COMMON data set images are loaded from the disc file buffers into the core. The disc file SNAP contains 28 buffers referred to as set 1 through set 28 inclusive, with each buffer being capable of storing a snap data set. Of these 28 buffers, 20 are for storage of initial condition sets, 6 are for back track sets, and there is one each for freeze and snapshot sets. Disc file CONFIG contains three sets of the configuration data, representing beginning-of-life, end-of-life, and an intermediate condition of the reactor core. The disc file CONTEM contains one set of constants and temporary data.

DATA-LINK END-ACTION SUBROUTINES

Figure 10A:
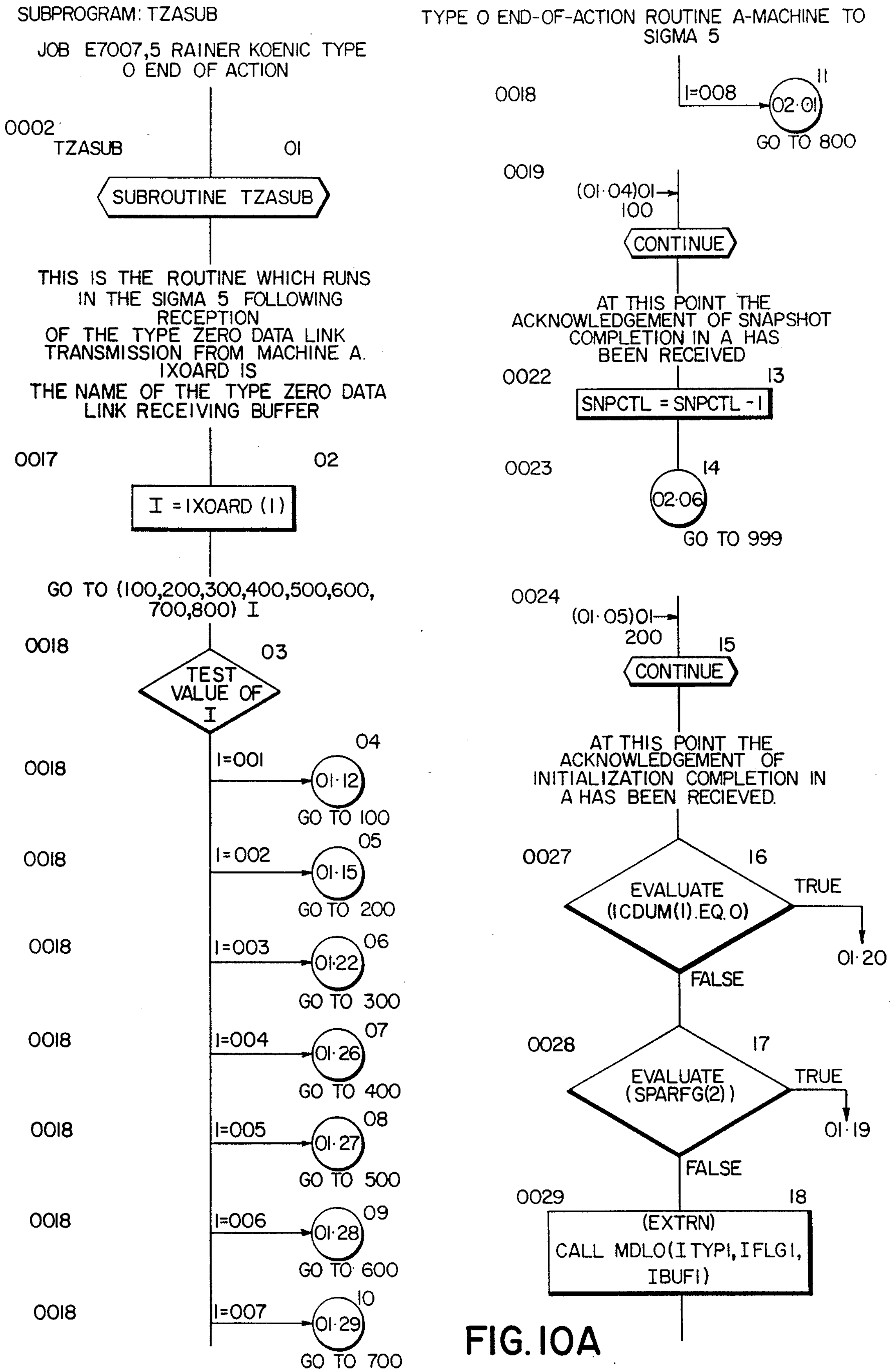
FIGS. 10A and 10B illustrate computer print-out flow charts of a data link end action routine TZASUB.
Figure 10B:
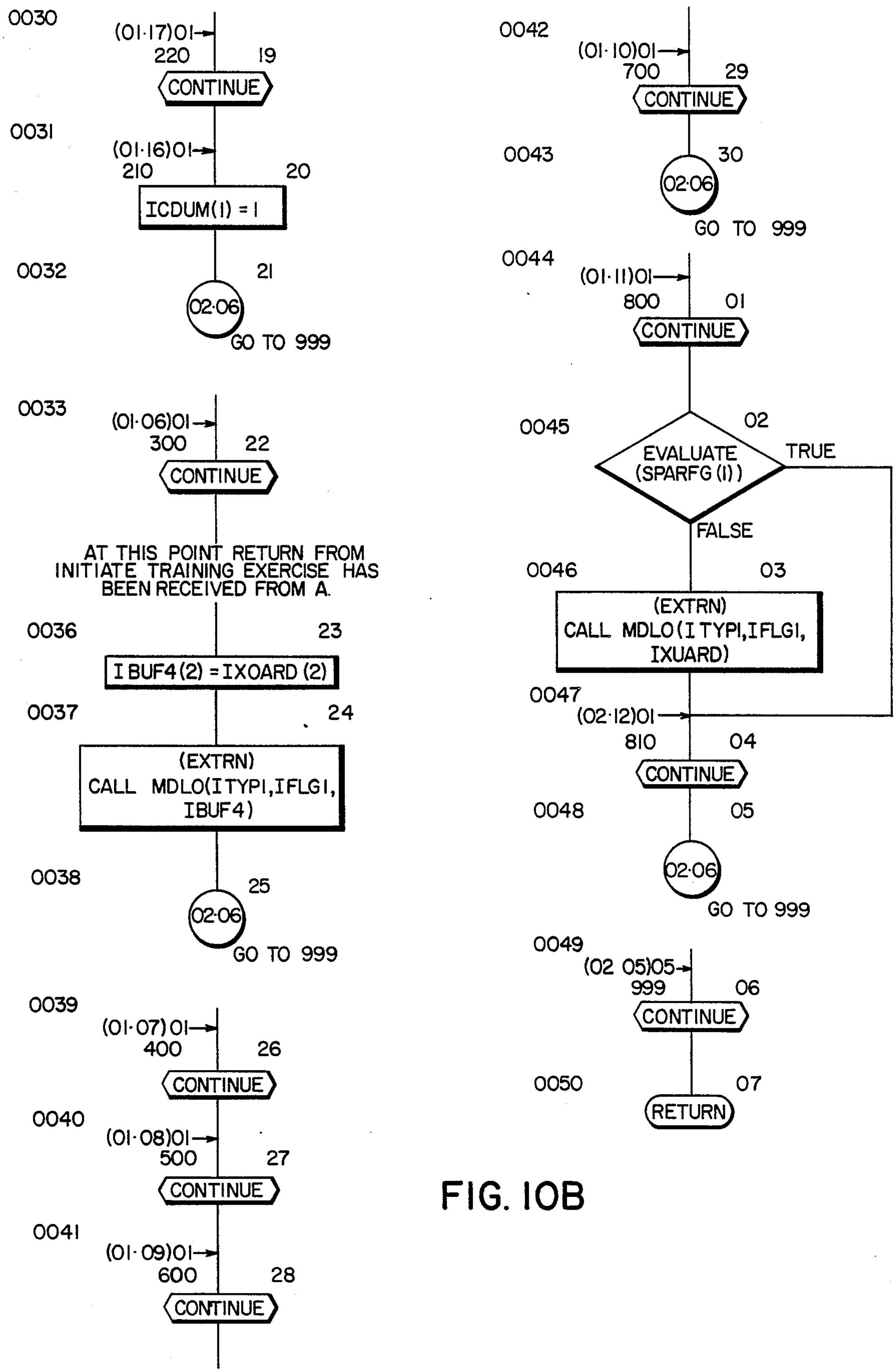

Data link end-action routines are used to indicate the completion of a data link transmission and to either process or initiate further necessary action. Upon completion of a type zero data link transmission from the A machine to the C machine in the present embodiment, the end-action subroutine TZASUB, is called by the data link handler. The flow chart for this subroutine is illustrated in FIGS. 10A. and 10B and does any necessary processing of the transmitted data, and initiates any further necessary action. The first word of the received data from a type zero transmission which is a function initiated from the instructor's console, is an index to identify the source of the transmission. The indexes which are used are 1, 2, 3, and 8. These indexes are used as an index for a computed GO TO statement to branch to the proper part of the end-action routine.

Index 1 indicates that a snapshot complete record of the physical state of the simulation for a point in time has been taken in the A machine and stored in the specified buffer or buffers. Snapshots are used to permit an instructor to set the simulation at some specified point in time and to print-out a record of the physical state of the power plant if required. Location SNPCTL is then decremented by 1 return which is made from the subroutine TZASUB.

Index 2 indicates that initialization has been completed in the A machine. A check is then made to see if initialization has been completed in the C machine. If initialization in the C machine is complete, ICDUM(1) will be equal to one; if not, it is equal to zero. If no initialization is complete, ICDUM(1) is set equal to one, and return is made from TZASUB. If initialization is complete in the C machine, a type zero transmission is made to the B machine with an index of 2. This signifies completion of initialization in the A machine and the C machine. ICDUM(1) is then set equal to one and return is made from the subroutine TZASUB.

Index 3 indicates that the checks necessary to initiate training exercise have been completed in the A machine. A type zero transmission is made to the B machine with an index of 3. The second word in the buffer transmitted from the C machine is zero if the A machine is ready. Return is then made from the subroutine TZASUB.

Index 8 indicates a request from the A machine to turn off a malfunction, which is done in the type zero end of action routine in the B machine. On the C machine the data (malfunction index equals IXORD(2)) is moved through a transmission buffer (XMTBUF), and a transmission to the B machine using that buffer is inhibited.

As shown in the microfiche Appendix B, the subroutine OFIV is called whenever a type zero data-link transmission is made from the B machine to the C machine. The initiating program on the B machine sends 25 locations of 16 bits each via the data link handler to a Sigma 5 or C machine COMMON data location called IXOBRD, which location consist of 13 locations with 32 bits each. Each pair of B machine locations is placed in one C machine location, with the first B machine location going into the left half of the first C machine location, and the second B machine location going into the right half of the first C machine location, and so on.

For convenience, the "odd" locations on the B machine are not used; thus all the left-halves of the C machine locations are zeros. There are two exceptions to this; one being the case of negative numbers, in which case the odd location is loaded with "FFFF" such that the C machine location contains a 32 bit negative number equivalent to the negative number in the even location of the B machine. The second exception occurs when the numbers are not used on the C machine and are just transmitted on to the A machine.

For all type zero transmissions, the second location on the B machine and the first location in the Sigma 5 or C machine COMMON contain an index. This index is decoded in a GO TO statement indicating that action is to be taken.

When the first word of the buffer RECBUF in the COMMON data location IXOBRD contains the integer 1, a snapshot has been completed in the B machine. SNPCTL, which was set to 3 in level LEV2, is decremented by 1 and exit is made from the end-action routine. When the first word of the buffer RECBUF contains the integer 2, a snapshot request has been made in the B machine. The second and third words of the buffer RECBUF contain the number of the buffer or buffers in which the snapshot is to be stored. Word SNPREQ in COMMON is set equal to 1. Word two of the buffer RECBUF is stored in SNPBFl, and word three is stored in SNPBF2. SNPBFl and SNPBF2 are then used in the C machine to indicate where the snapshot is to be stored. They are also transmitted to the A machine and the B machine with the 4/S data.

When the first word of buffer RECBUF contains the integer 3, it indicates that an initialization request has been made. The second word of this buffer contains the number of the initial condition buffer to which the system is to be initialized. A word (ICDUM(2)) in COMMON is then set equal to the buffer number, and a flag (ICDUM(1)) is set to zero. A check is then made to see if a data link to the A machine is operative. If so, a request for initialization in the A machine is made via a type zero data link call to the A machine, and the requested buffer number is set to the A machine. The sublevel LEV31 is then made active and exit is made from the end-action routine.

When the first word of the buffer RECBUF in the location IXOBRD contains the integer 4, a request for model control start has been made. A check is then made to see if the data link to the A machine is operative. If so, a type zero transmission to the A machine is made to request model start. The active bits are then set for LEV1 and LEV17, and level LEV5 is enabled in the periodic bid. A data link transmission is then made back to the B machine to acknowledge completion of the model start. If such first word contains the integer 5, a request for model control stops or freeze has been made. Then the word SNPREQ and COMMON is set equal to 2. Also, SNPBF1 and SNPBF2 in the COMMON core are then set equal to the buffer numbers in which the snapshot is to be stored. These buffer numbers are in the second and third words of the buffer RECBUF. The setting of SNPREQ to 2 indicates that the model is not to be started again following completion of the snapshot.

If the integer 6 is contained in the first word thereof, a request for either display value or print value has been made. The second and third words of RECBUF, the index to the value within a COMMON block and an index to the COMMON block, are used to determine the address of the value in the C machine. This address is then used to pick up the value in question and send it back to the B machine for display or print provided that the data link is operative. If an integer 1 is in the fourth word of the buffer RECBUF wherein the first word contains the integer 6, a display value request is indicated and the address of the value is stored in a location ICDUM(3) in COMMON to provide for periodic accessing of the value, which is for periodic display if requested.

If the integer 7 is contained in the first word, it indicates that an acknowledgment of snapshot completion has not been received, and the snapshot request is to be canceled. In such case, SNPCTL is set to zero which permits the model to continue. If the integer 8 is contained in the first word of the buffer RECBUF in the location IXOBRD, a malfunction is being initiated or terminated. The second word of the buffer contains an index to one of the 100 major malfunctions. The third word of the buffer RECBUF contains a copy of the PROGEN logical on the B machine corresponding to the index in the second word. If bit 15 of this logical is set greater than 32767, then the malfunction is being initiated; otherwise it is being terminated. Either one is accomplished by setting or resetting the malfunction flag in COMMON location MACTBL corresponding to the index in the second word of the buffer RECBUF. Along with initiation or termination of the malfunction, parameters V2 and V3 or loaded with the fourth and fifth words of the buffer RECBUF, respectively. Again the entries of the V2 and V3 arrays in MACTBL are defined by the index of the second word of RECBUF. Finally a copy of the RECBUF is sent to the A machine from the buffer XMTBUF with another type zero data-link transmission.

When the integer 9 is contained in the first word, it indicates an annunciator malfunction is to be initiated or terminated on the A machine. Since this has nothing to do with the C machine, a copy of RECBUF is sent to the A machine from the buffer XMTBUF with another type zero data link transmission. The implementation of the malfunction is then accomplished on the A machine. When the integer 10 is contained in the first word, an indicator malfunction is to be initiated or terminated on the A machine. Since this has nothing to do with the C machine, it is thereafter handled in the same manner as when the first word contains an integer 9 as previously described.

When the integer 11 is contained in the first word, it indicates that a local plant operation is to be simulated. The second word of the buffer RECBUF is used as a secondary index pointing to a particular location in COMMON that can be modified from the instructor's console.

For A machine transmissions, the indices 1 through 7 are used for constant modifications in the C machine. Index 8 is used for a logic modification on the A machine, which is accomplished by transmitting a copy of RECBUF to the A machine from the buffer XMTBUM with another type zero data link transmission. The actual modification is then done by the FIVTOA end-action routine for the A machine. Indices 9 through 12 are used for setting or resetting logicals in the C machine.

A request to update the current data and a request for the time of day are indicated as having been made on the B machine if the first word of the buffer RECBUF in the location IXOBRD contains the integer 12. If it contains the integer 13, indicates that a request to run the panel diagnostic program on the A machine was made. Since either of these actions has nothing to do with the C machine, a copy of RECBUF is sent to the A machine from the buffer XMTBUF with another type zero data link transmission. The actual changing of the locations containing time and the actual bidding for the diagnostic program is then accomplished on the A machine.

When the first word contains the integer 14 a request for print control, start or stop, has been made. The second word is transmitted to the A machine and contains an instruction to either inhibit or enable calls to the message writer from the digital scan and the analog scan program. If the first word contains the integer 15, a request for initiate training exercise has been made.

In applications of the invention where fewer or more computers are employed to embody various features of the invention, computer data link needs could be entirely different from the present case. In a single computer embodiment, computer data link requirements may be eliminated altogether. The end-of-action subroutines described herein may be varied according to needs of any particular computer data link arrangement and according to the various possible data link arrangements in varying computer configurations.

DATA CONVERSION ROUTINES

Figure 11A:
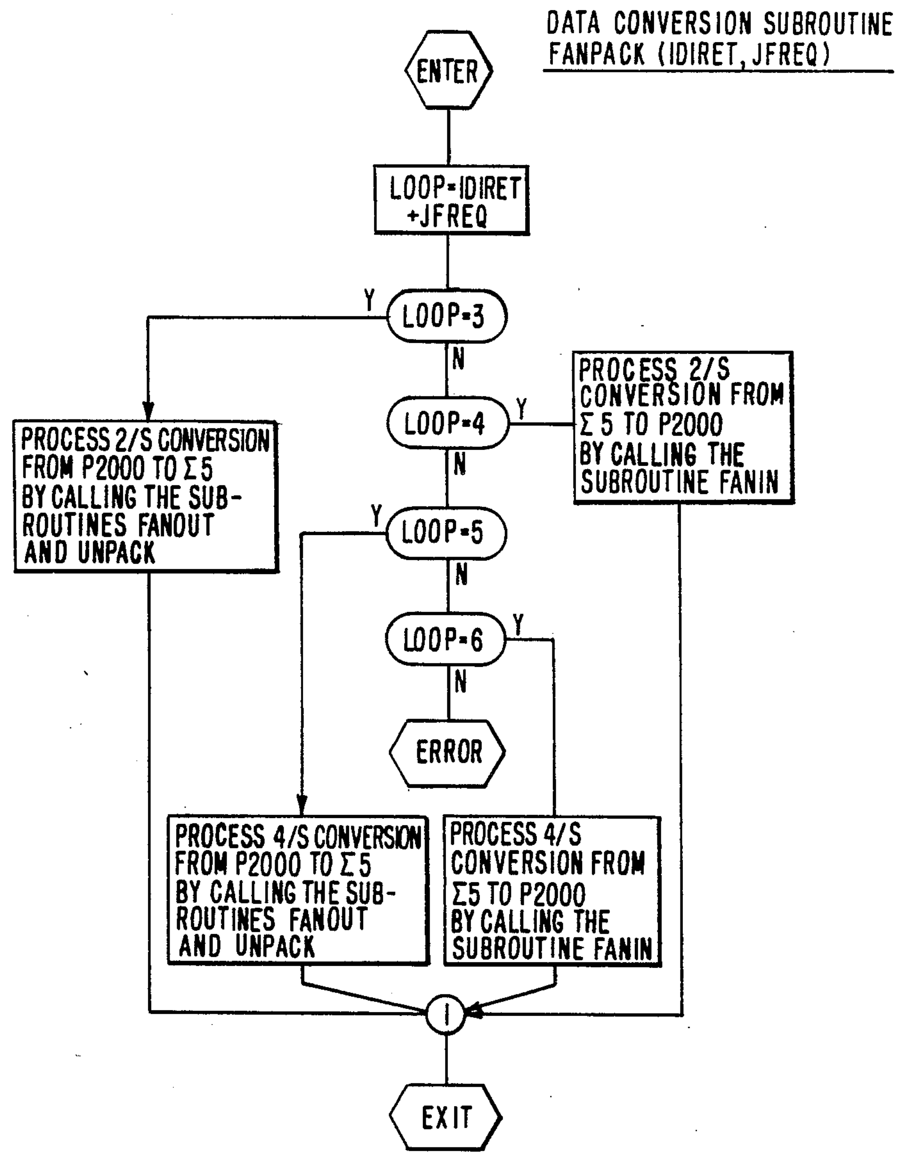
FIGS. 11A, 11B and 11C illustrate flow charts for the data conversion subroutines.
Figure 11B:
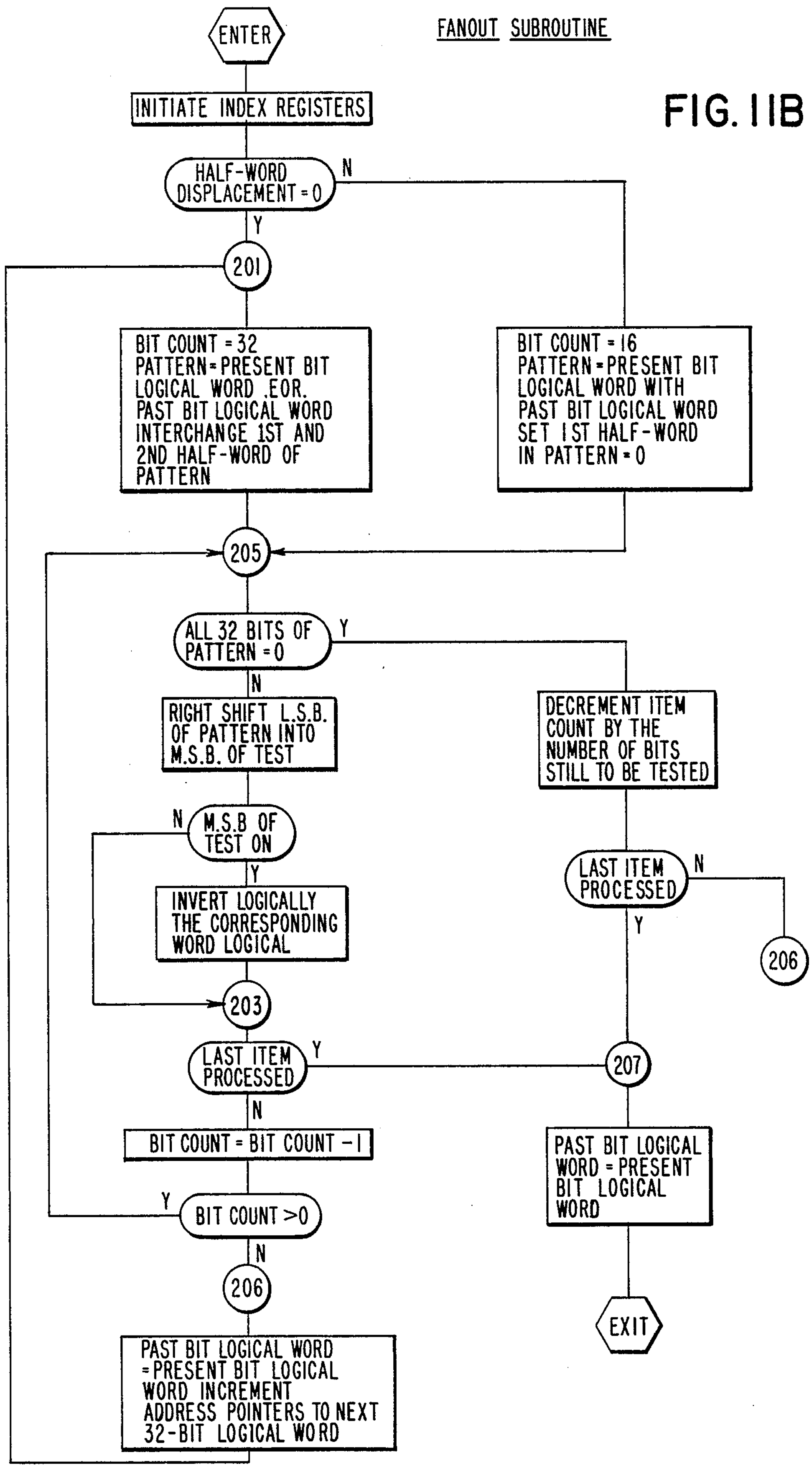
Figure 11C:
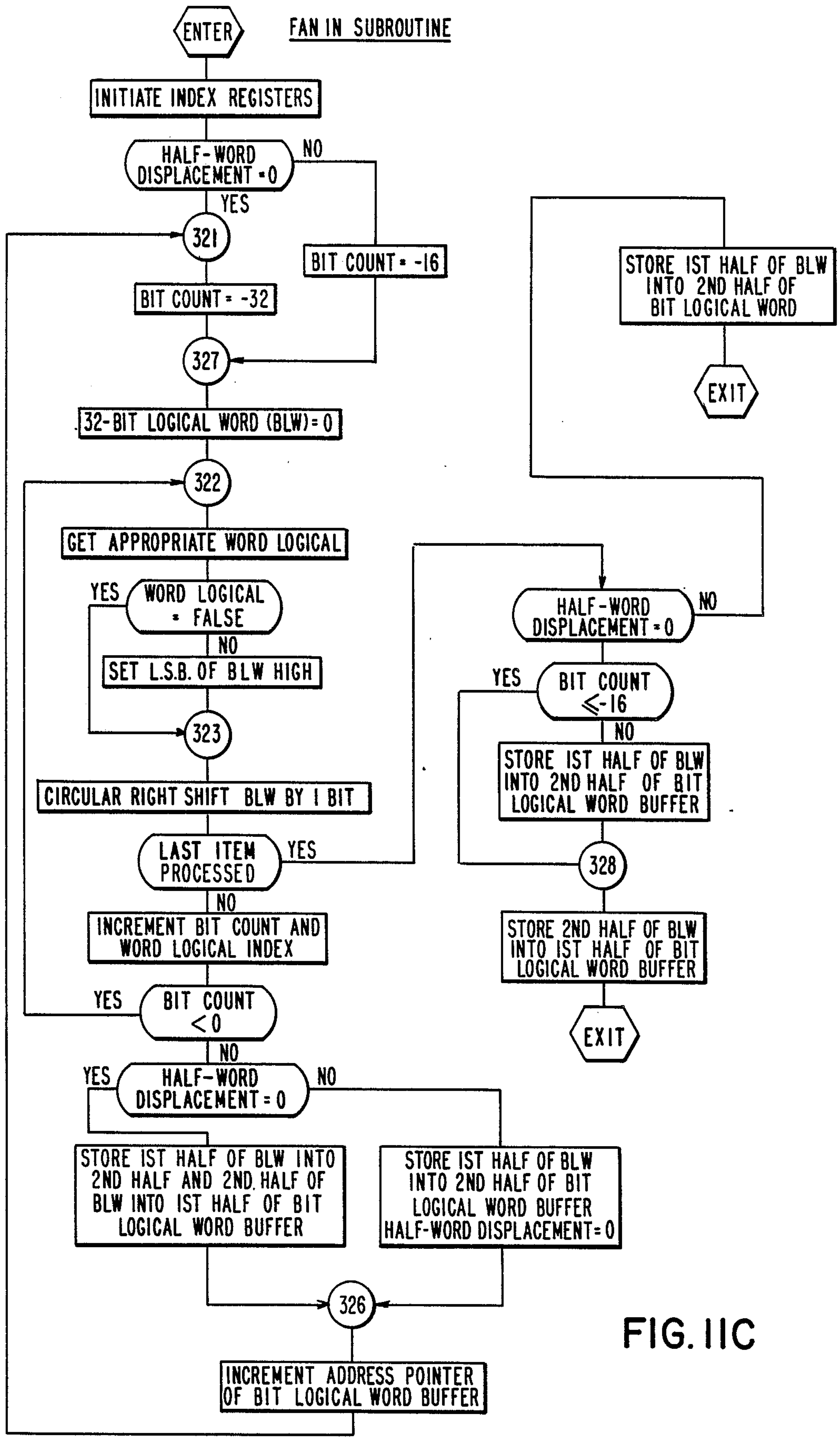

The FANPAK subroutine, the flow chart for which is illustrated in FIGS. 11A, 11B and 11C, performs data conversion between the data link buffers and the simulation model variables. The program FANPAK is executed in the C machine each time before a data link transmission from the C machine to the A or B machine, and after a data link transmission from the A or B machine to the C machine.

There are a large number of status communications between the simulator programmed models and the various control panels. This communication is achieved via the data link transmission, at fixed time intervals between the C machine and the two A and B machines. The simulator models are written in a high level language, FORTRAN, and the logical status of one variable is expressed as a 32-bit word logical which is the size of a word in the C machine. To conserve transmission time, these word logicals are transmitted in both directions as bit logicals. The function of the subroutine FANPAK is to convert the 32-bit word logicals into bit logicals (FAN-IN), and to convert bit logicals into 32-bit word logicals (FAN-OUT); a bit logical being a true or false designation, while a word logical is an integer or a binary word code. Moreover, the A and B machines are 16-bit machines while the C machine is a 32-bit machine. This incompatability implies that the integer transmission between the C machine and the A and B machines has to be packed or unpacked. It is also the function of the subroutine FANPAK to pack 32-bit integers into 16-bit integers for transmission from the C machine to the A and B machines, and to unpack 16-bit integers into 32-bit integers from the A and B machines to the C machine. This subroutine also performs limit checks in the conversion from 32-bits into 16-bits.

Figure 12:
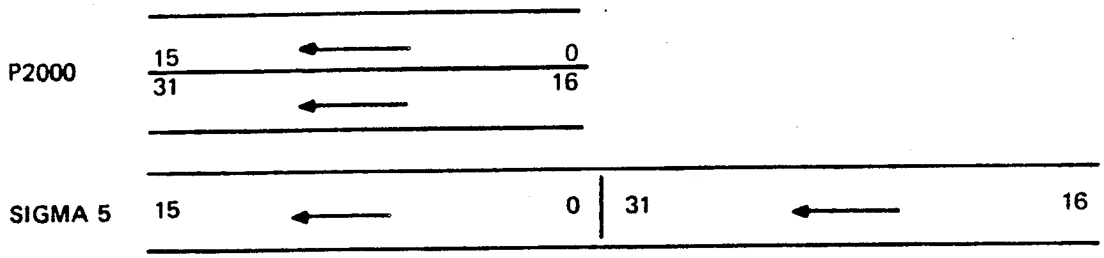
FIG. 12 illustrates the order of the bits of 32-bits that are used in the subroutine FANPAK.

FIG. 12 illustrate the bit ordering of 32-bits that are currently used in the program FANPAK. In the A and B machines, these 32-bits correspond to two consecutive words. For illustration, the bit ordering in the second A or B machine word is labeled from 16 to 31. This bit ordering is used to show that a block of 32 consecutive word logicals, with the order of word zero to word 31, has the corresponding bit logical locations for both the A and B machines and the C machine word logicals. FIG. 12 shows that the bit ordering within the Sigma 5 or the C machine is not contiguous. However, the bit ordering is contiguous if the order of the two half words within the Sigma 5 word is interchanged. The first 16-bit word of interest may be located in the second half word of the C machine by utilizing a half word displacement indicator contained in the data conversion routines.

Referring to the flow chart of FIGS. 11A through 11C the subroutine FANPAK contains a set of conversion routines for conversion from word-to-bit logical, bit-to-word logical, and 16-bit to 32-bit integer. Each conversion routine is written as an internal subroutine and requires only a few arguments to be passed on from the main control portion of FANPAK. As structured, a particular conversion routine can be called a number of times. Each time it is called, the associated variables are assumed to be contiguous within a block. However, different blocks can be located in different areas.

The program FANPAK is called by the synchronization and control program and the status information to be transmitted is divided into two groups according to the frequency of transmission; that is, four times per second and two times per second. Consequently, FANPAK has two arguments, IDIRET and JFREQ, on which the synchronization and control program passes. The first argument, IDIRET, is the indication for the direction of data link transmission. An integer value of 1 denotes that transmission is from the P2000 A or B machine to the Sigma 5 or C machine; and an integer value of 2 denotes a transmission from the C machine to the A and B machines. The second argument, JFREQ is used to denote the frequency of transmission. JFREQ has an integer value of either 2 or 4, to indicate a frequency of transmission of either two times per second or four times per second, respectively.

Once FANPAK is called, it checks with the arguments of IDIRET and JFREQ, and then branches to the portion which will serve the particular request. The main control portion of FANPAK picks up the required arguments for the service and then calls for the appropriate conversion routine. The required arguments are the starting address of the various data blocks to be converted, the number of items involved, and the half word displacement. The conversion is repeated until all the data blocks have been processed. FANPAK then returns control to the synchronization and control program.

In the conversion routine to convert bit logicals to word logicals, the past image of the bit logicals is used. If the state of the present bit logical has not changed since the last transmission, the bit logical is not converted. This is accomplished by doing an exclusive OR operation between the present and the past image. The resultant bit is then set, if and only if, there is a change in the logical state of the bit logical. The implication is that the state of the word logical changes, if and only if, the resultant bit is set. Invariably, the approach as described above is practicable only if the past image and the associated word logical have been initialized such that their states do correspond. After the conversion has been completed, the past image is updated.

In performing the conversion from word logical to bit logical any past image of the word logical is not used. Instead, the routine assumes that all the word logicals are false and sets all the bit logicals to zero. The routine then examines the word logicals, one by one. If a word logical is true, the corresponding bit logical is set to one; otherwise, the bit logical is a zero. The final bit logical words are then stored in the data link buffer, ready for transmission. As previously mentioned, the bit logical words to be stored may start at the second half word, and/or finish at the first half word of the Sigma 5 or C machine word. The routine is written such that the half words which are not used by the routine remain undisturbed. The routine to convert 16 bit integers to 32 bit integers picks up the 16 bit integers one by one and converts them directly into 32 bit integers.

The only part of FANPAK which has to be initialized, is the past image of bit logicals such that their states will be the same as the corresponding word logicals. A program called VCINIT performs the initialization. The necessary constants, such as number of items involved, and half word displacements, are built in the program via data statements.

Figure 13A:
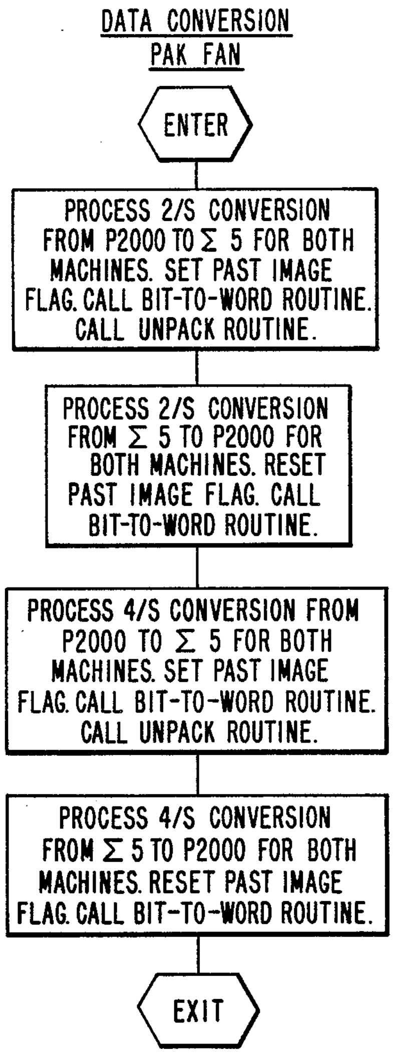
FIGS. 13A, 13B and 13C illustrates a flow chart for the data conversion routine PAKFAN UNPACK and BIT-TO-WORD.
Figure 13B:
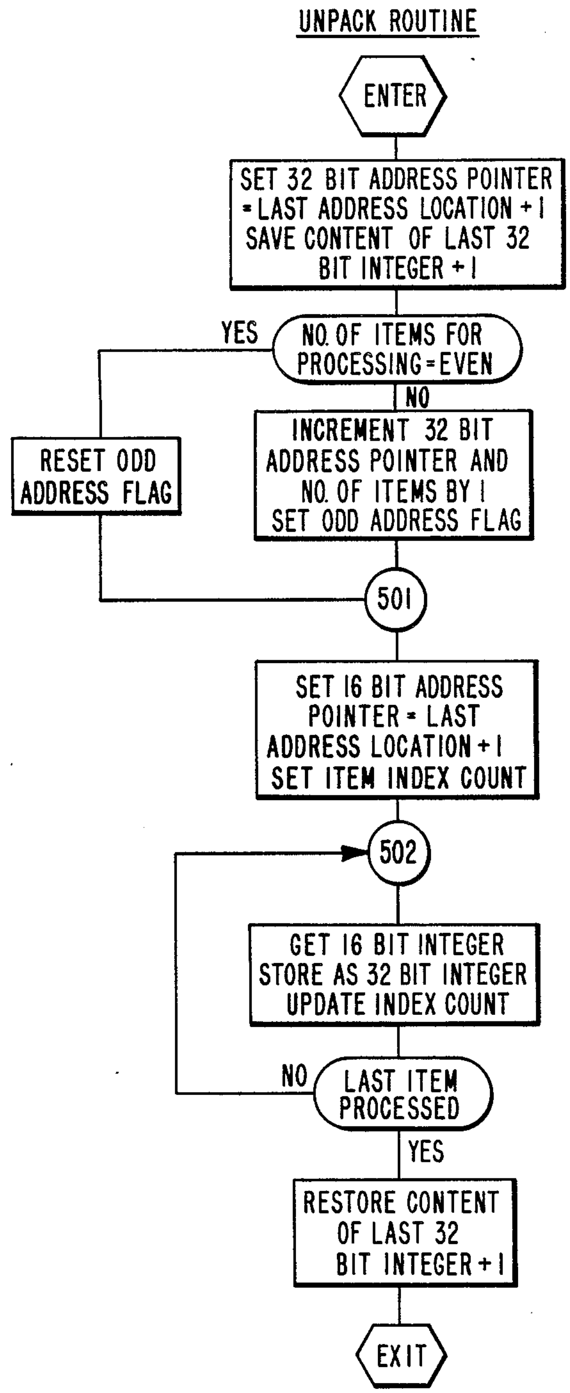
Figure 13C:
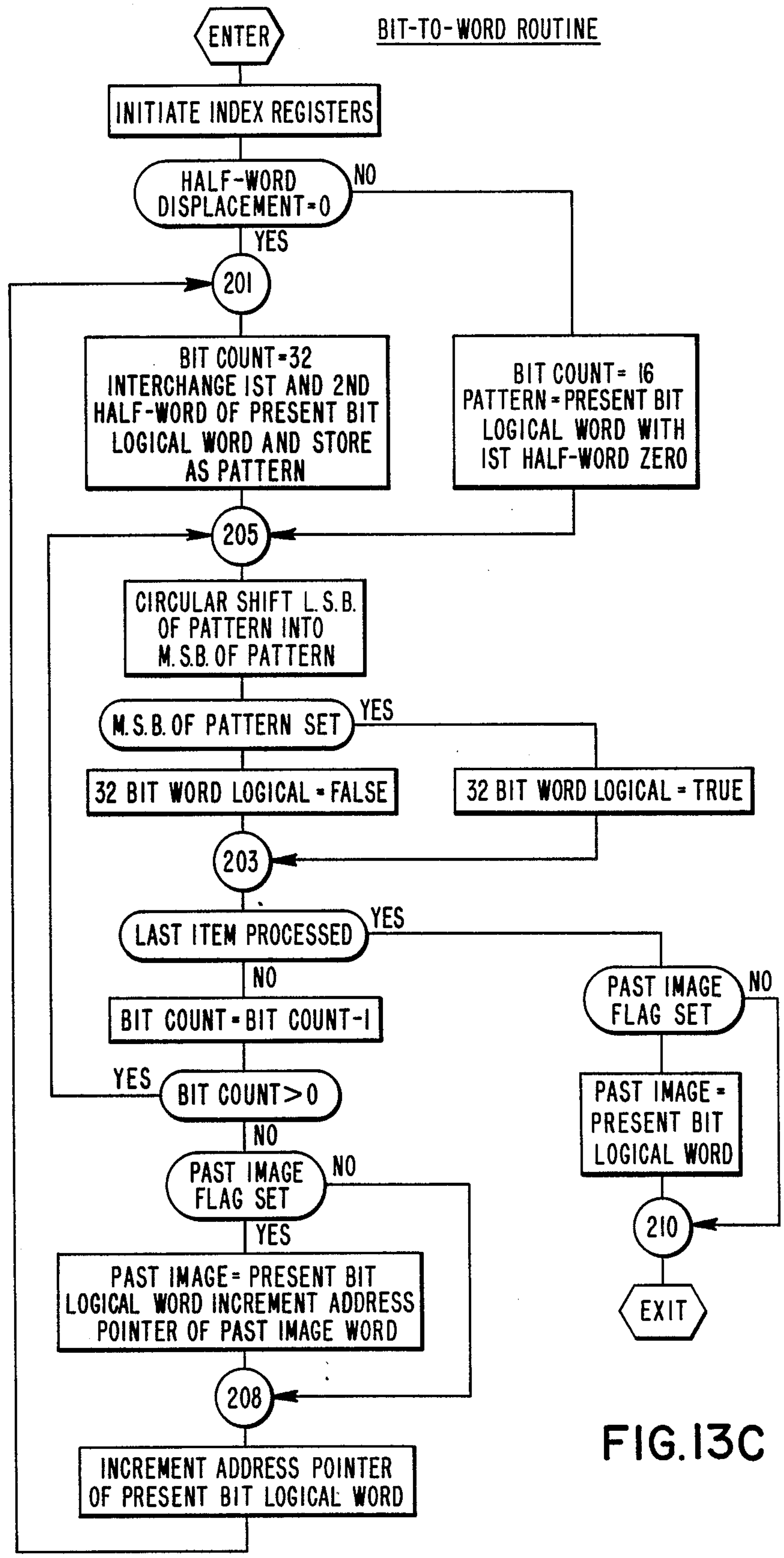

Referring to the flow charts of FIGS. 13A, 13B and 13C, routine PAKFAN restores the model status buffers to the state corresponding to the state of the data link buffers, so that a given state of the system can be simulated again. The program PAKFAN is executed after snapshot data has been brought into the core and before the execution of the simulator models. The data conversion from the data link buffers to the model buffers requires only two types of conversion: bit logical to word logical, and 16 bit integer to 32 bit integer. PAKFAN also updates the past image of the bit logicals so that the past image and the word logicals correspond. The program PAKFAN contains two subroutines for the necessary data conversion, a bit-to-word routine, and an unpack routine. The structure of PAKFAN is similar to FANPAK; and after the program PAKFAN is called, it calls up the subroutines, with the appropriate arguments, until all conversion has been completed (see FIGS. 16A and 16B).

The analog output handler subroutine, ANHAND, converts appropriate model variables in the Sigma 5 or C machine into a format suitable for the analog output handlers of the P2000 A and B machines. After data transmission, the handler for the A or B machine outputs the quantized values to the corresponding meters on the control and indication panels.

The C machine analog outputs to be converted are stored as floating point numbers by the appropriate mathematical model in array in labeled COMMON dedicated to the analog output set of numbers. There is associated with each analog output a set of constants for scale factor, bias value, and voltage range indication. These constants are initialized by a program called ANINIT during the initialization phase. The subroutine ANAHANT converts the floating point analog outputs to an integer scale of 0 to 255 according to the scale factor, the bias value, and the voltage range. The value of 0 to 255 corresponds to a voltage range of 0 to 5 volts from a digital to analog converter, referred to hereinafter as a D/A converter.

The analog meters on the control and indication panels are all voltage dependent. They can have a voltage range from either 0 to 5 volts or 1 to 5 volts for a minimum to maximum deflection. Part of the function of the program ANHAND is to limit the analog output to within the minimum and maximum deflection.

Figure 14:
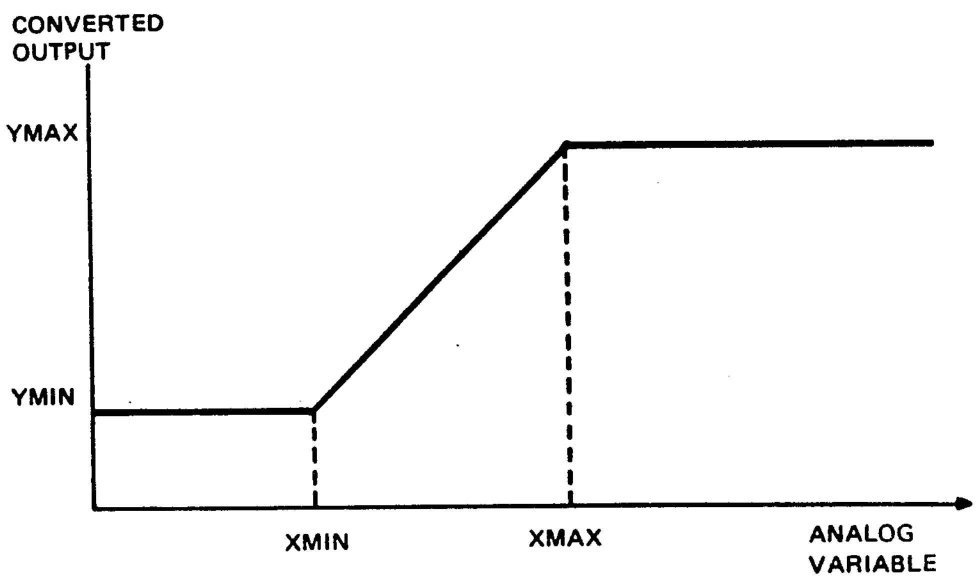
FIG. 14 is a graphical illustration of the relationship between converted output and analog variable.

Referring to FIG. 14, with every analog output variable, there is an associated maximum value XMAX, and an associated minimum value XMIN. These two values corresponds respectively to the values for maximum deflection YMAX and minimum deflection YMIN on the meter. The output YMAX and YMIN is in effect the maximum and minimum converted output values from the program ANHAND which correspond to the maximum and minimum deflection. These two values are the integer values for the D/A converter which provides an output range of either 0 to 5 volts or 1 to 5 volts.

In addition to the values XMIN and XMAX for the analog output, a constant bias, BIAS, is also attached to the analog variable. The effect of the bias is to make the final value of the variable as the sum of the variable and the bias. This bias value is used to account for the constant displacement between the desired scale and the actual variable scale; for example, the difference of 14.7 psia between the calculated absolute pressure and the displayed gauge pressure.

From FIG. 14, it is apparent that the formula for th straight line conversion is:

$$\text{Converted Output} = YMIN + (YMAX - YMIN)^* (X + BIAS - XMIN)/(XMAX - XMIN)$$

where X is the model analog output value. For a voltage range of 0 to 5 V, YMIN is 0 and YMAX is 255. Similarly, for 1 to 5 V, meter range, YMIN is 51.

Since all variables are constants except for X, the conversion formula can be expressed as:

$$\text{Converted Output} - \text{Scale Factor}^* X + TBIAS$$

where for 0 to 5 V range:

$$\text{Scale Factor} = 255/(XMAX - XMIN)$$

$$TBIAS = 255(BIAS - XMIN)/(XMAX - XMIN)$$

and for 1 to 5 V range:

$$\text{Scale Factor} = 204/(XMAX - XMIN)$$

$$TBIAS = 51 + 240(BIAS - XMIN)/(XMAX - XMIN)$$

The scale factor and TBIAS for each of the analog outputs are initialized by the initialization program ANINIT. The conversion formula is used by the subroutine ANHAND, and the meter range indicator is used to limit the minimum output to either 0 or 51.

Figure 15:
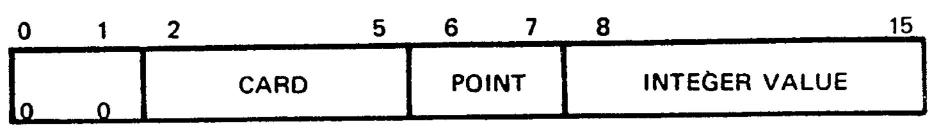
FIG. 15 shows the format of an analog output half-word.

As already noted, an initialization program ANINIT initializes the various constants. ANINIT reads in data cards which are arranged in the same order as the variables in the model variable array. The order of these variables within the array, which are stored in labeled COMMON, has been preselected and organized from the model. Three arrays of the same dimension as the model analog output array have been assigned. The first array is for the scale factor floating point constants, the second array is for the TBIAS floating point constants, and the third array is an array of half words for the converted output and the card and point numbers. The format of the third or half word array is shown in FIG. 15. Bits 0 and 1 are the malfunction bits, these two bits are set to zero in the Sigma 5 or C machine, and the appropriate bit values are inserted by the A and B machines. Bits 2 to 5 contain the card number (0 to 15). Bits 6 and 7 contain the point number 0 to 3. Bits 8 through 15 contain the converted integer output value, 0 to 255.

Each data card which is read in by ANINIT contains the following information for the variable:

| Column(s) | Contents |
|---|---|
| 30 | 0 to 1 for meter range indicator (0 to 5V, 1 to 5V) |
| 47–53 | Maximum Value (F7.1) |
| 55–60 | Minimum Value (F6.1) |
| 62–67 | Bias Value (I6) |
| 70–71 | Card Number (I2) |
| 72 | Point Number (I1) |

ANINIT calculates the scale factor and the TBIAS constants according to the conversion formula. In order to account for the loss of the fractional value during the real-to-integer conversion, a compensation factor of 0.5 is added to the floating point constant TBIAS. The meter range indicator is stored as the least significant bit (LSB) in the scale factor floating point constant. Since the converted output is a quantized integer between 0 and 255, the loss of the LSB in the scale factor will not affect the final value of the converted output. ANINIT also inserts the card and point numbers into the appropriate half words.

Figure 16A:
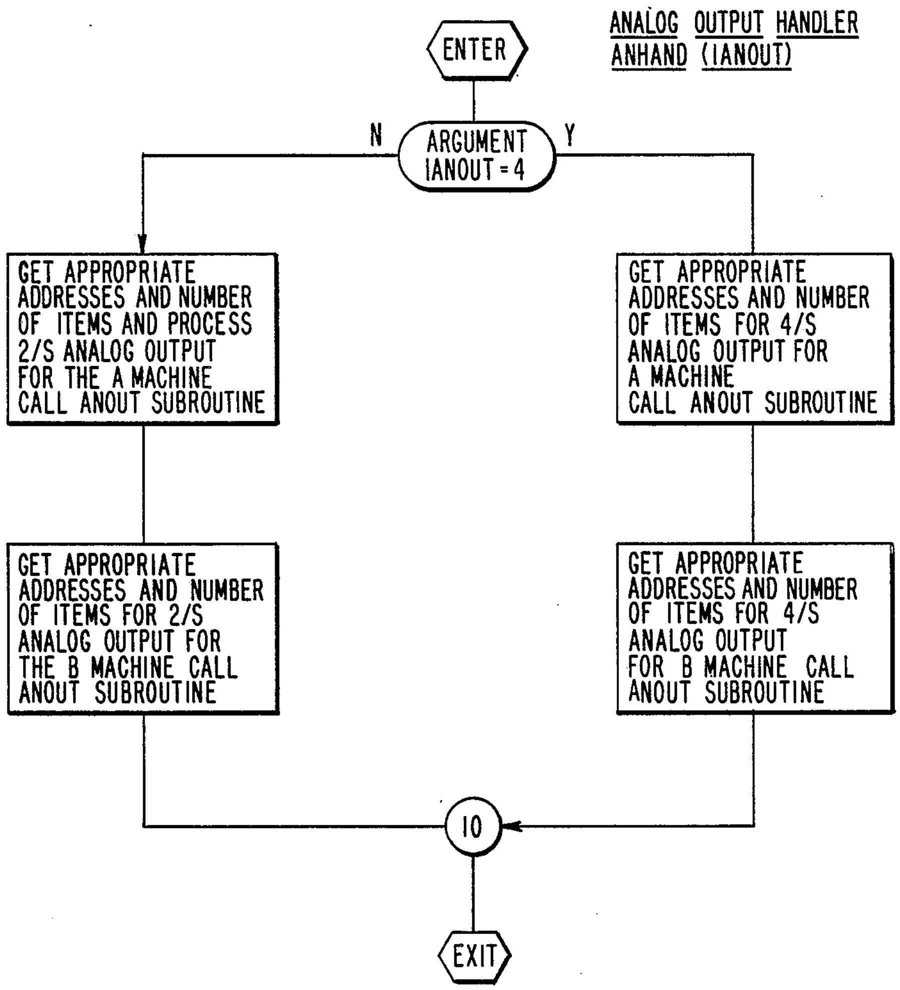
FIGS. 16A and 16B illustrate the flow charts for the analog output handler program ANHAND and ANOUT.
Figure 16B:
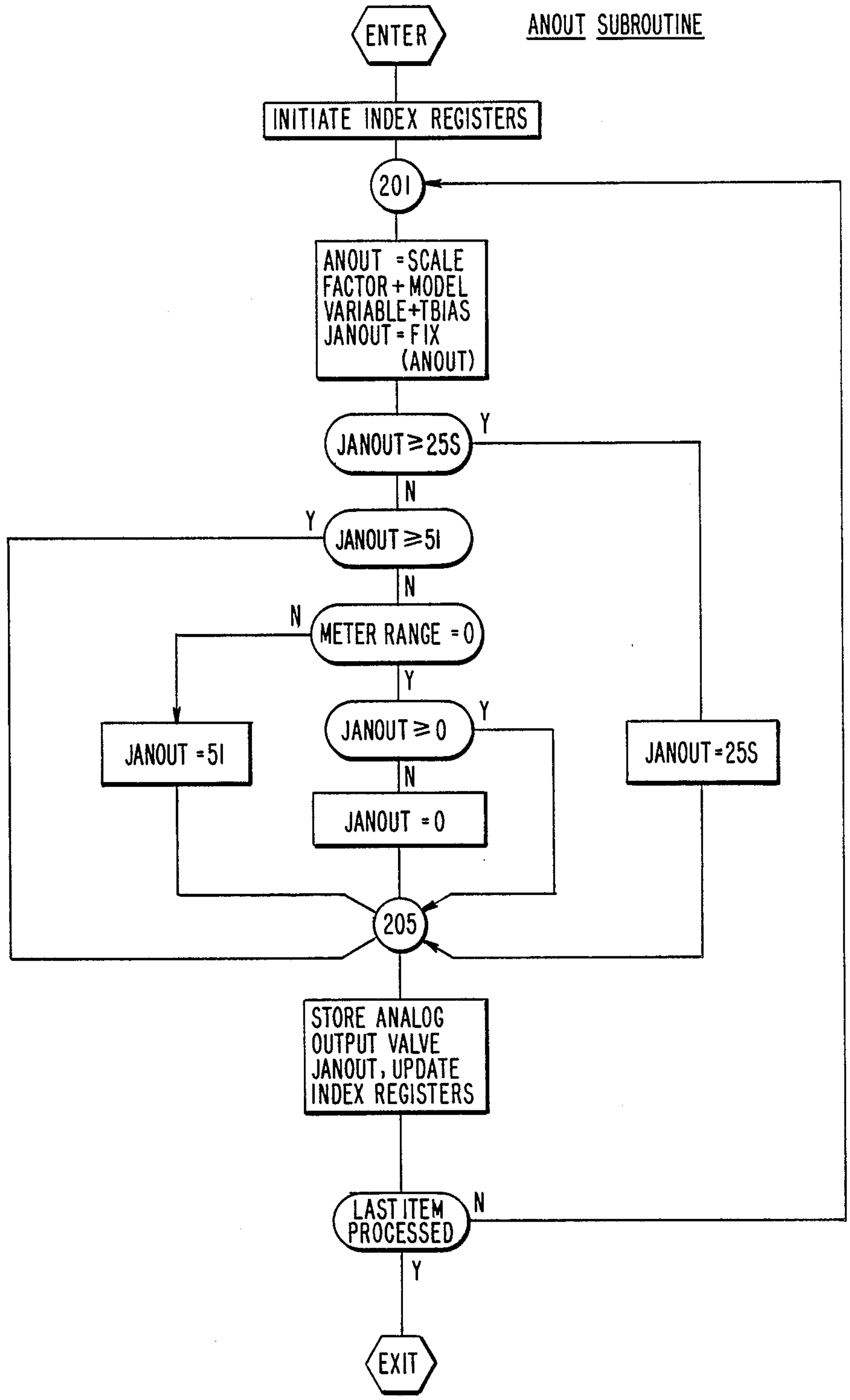

Referring to the flow chart of FIGS. 16A and 16B, the analog outputs handled by ANHAND are subdivided into four groups. They are 4/S analog outputs for A machine, 4/S analog outputs for B machine, 2/S outputs for the A machine, and 2/S outputs for the B machine. Each of the four groups has its own set of arrays for the model variable, scale factor, TBIAS, and converted output.

The controller program, in addition to calling ANHAND before the data link transmission to the A and B machine is initiated, also passes on an argument called IANOUT. This integer, IANOUT, has either the value 2 or 4, and is used to indicate which set of frequency outputs is required. If IANOUT is four, the results for 4/S for the A and B machines are to be calculated; otherwise 2/S results are assumed to be required. The 4/S and 2/S results are stored into the appropriate data link buffers for the corresponding A or B computer.

Figure 61A:
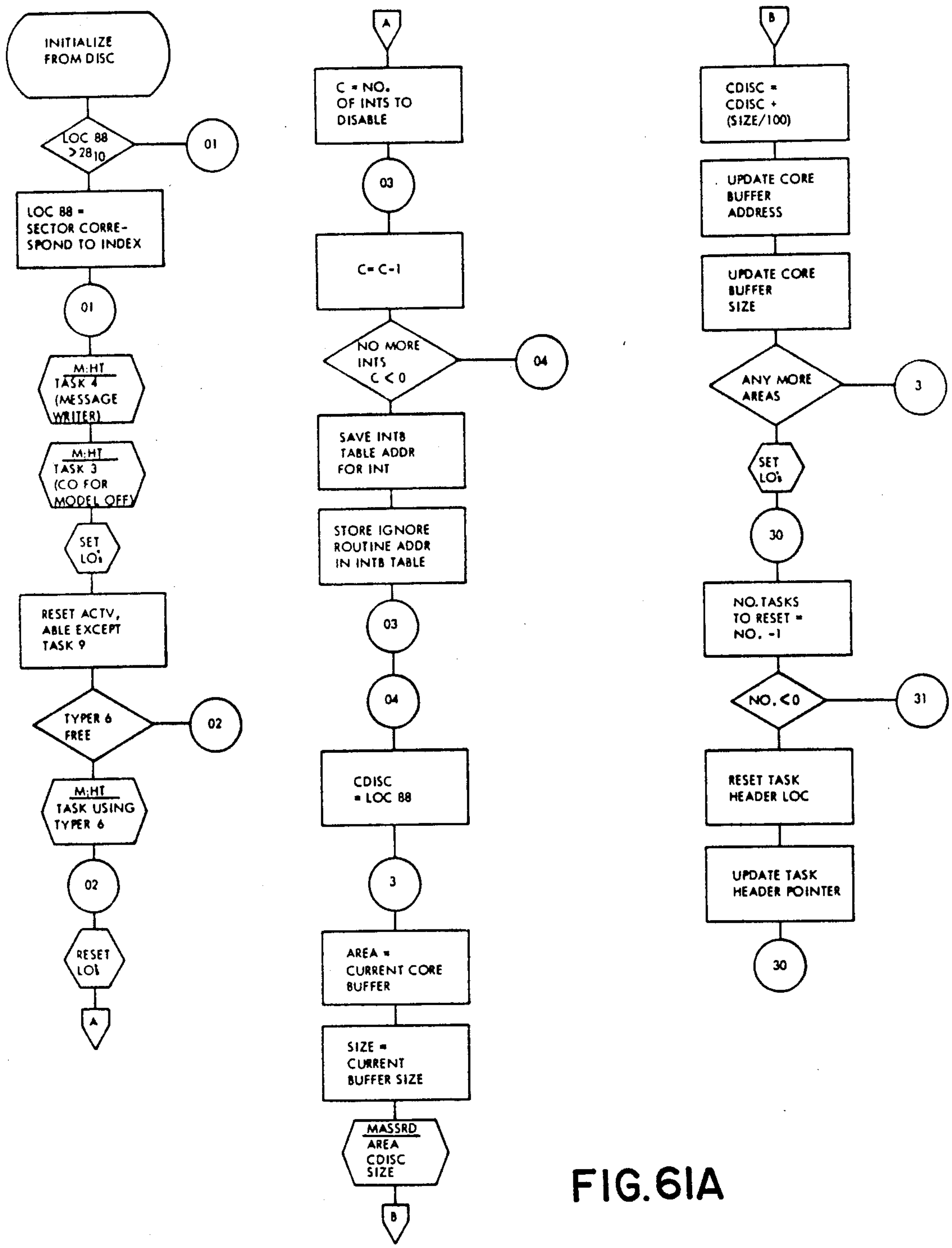
FIGS. 61A through 61D inclusive illustrate the flow charts for the "initialize from disc" program of the B machine.
Figure 61B:
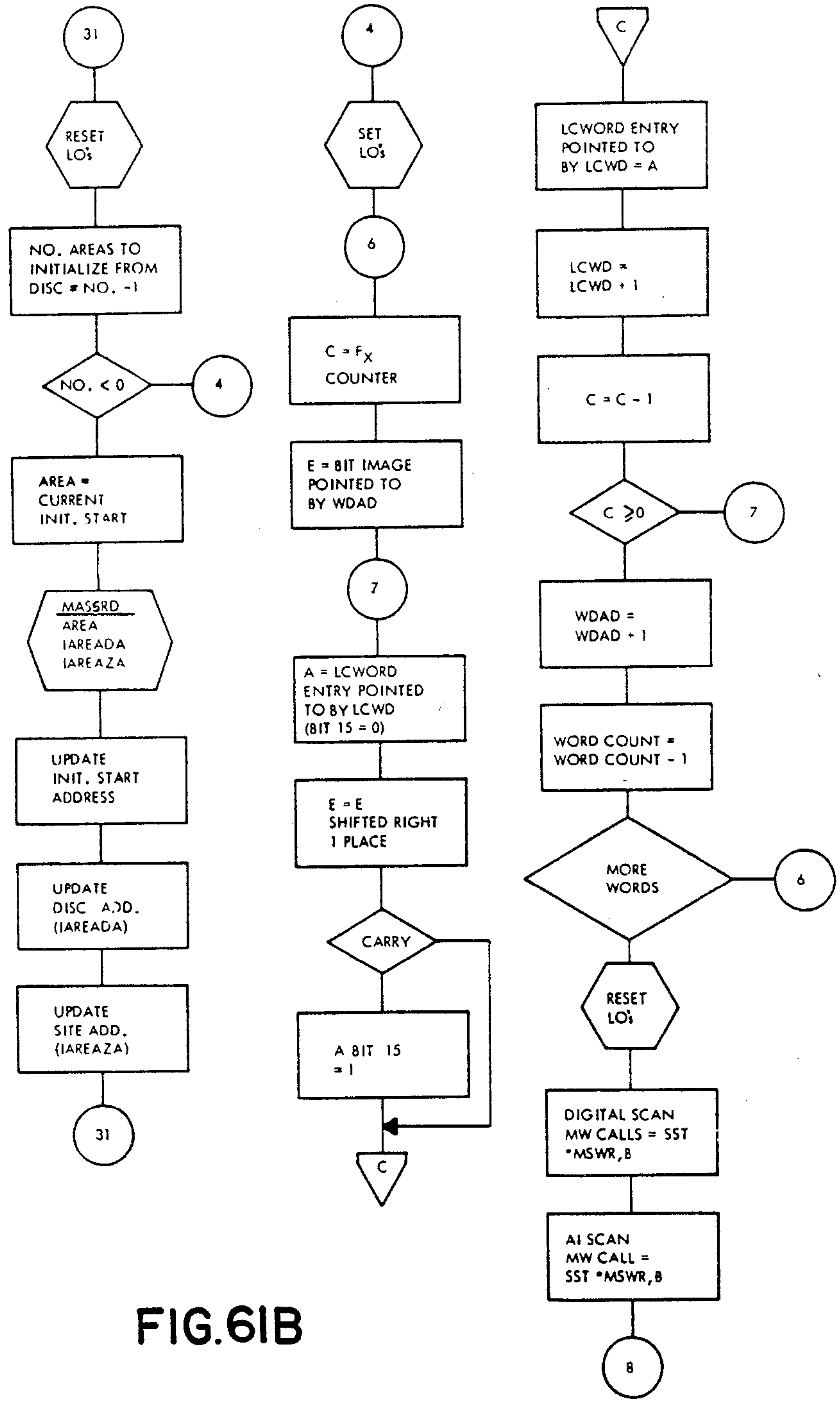
Figure 61C:
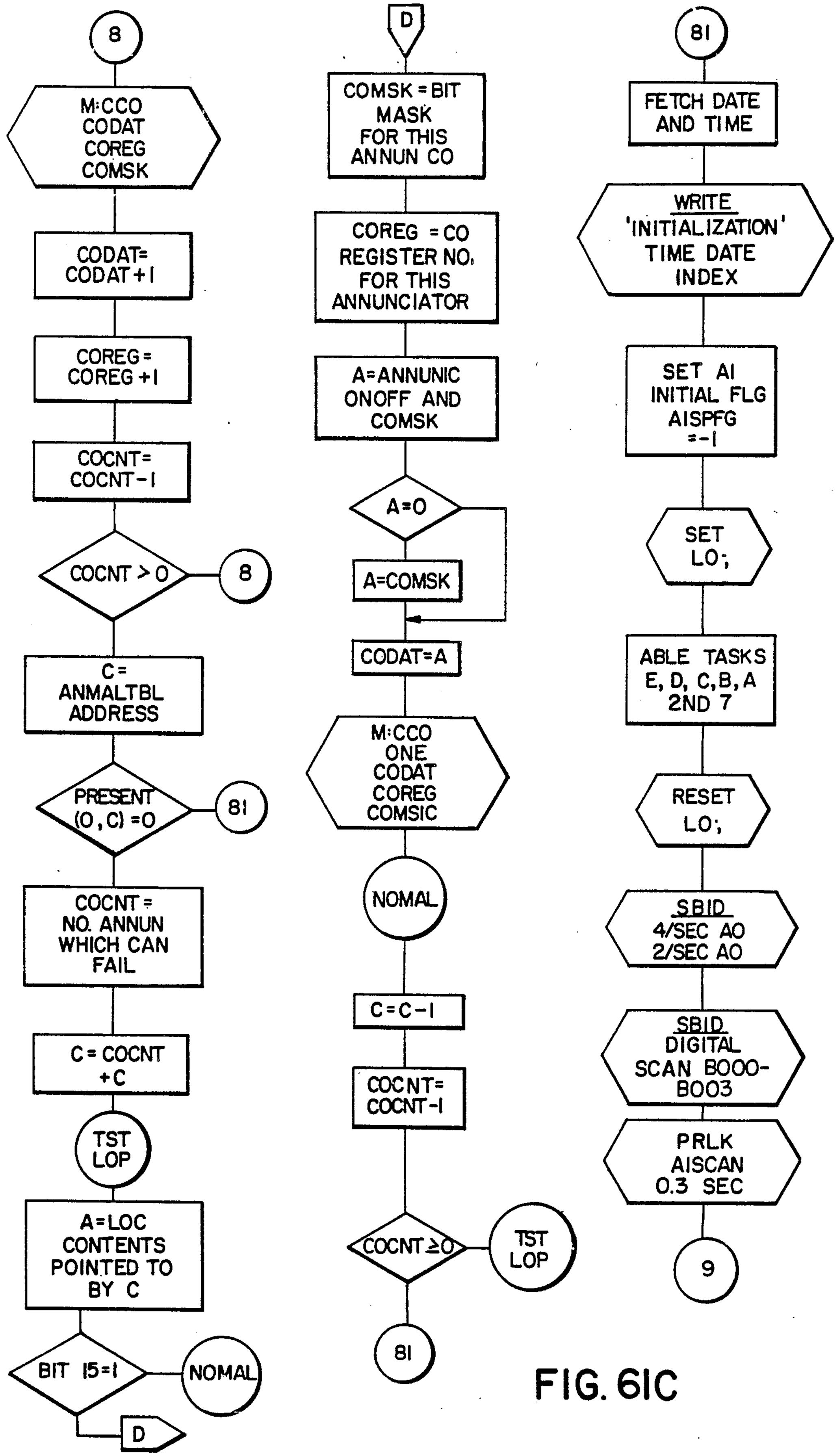
Figure 61D:
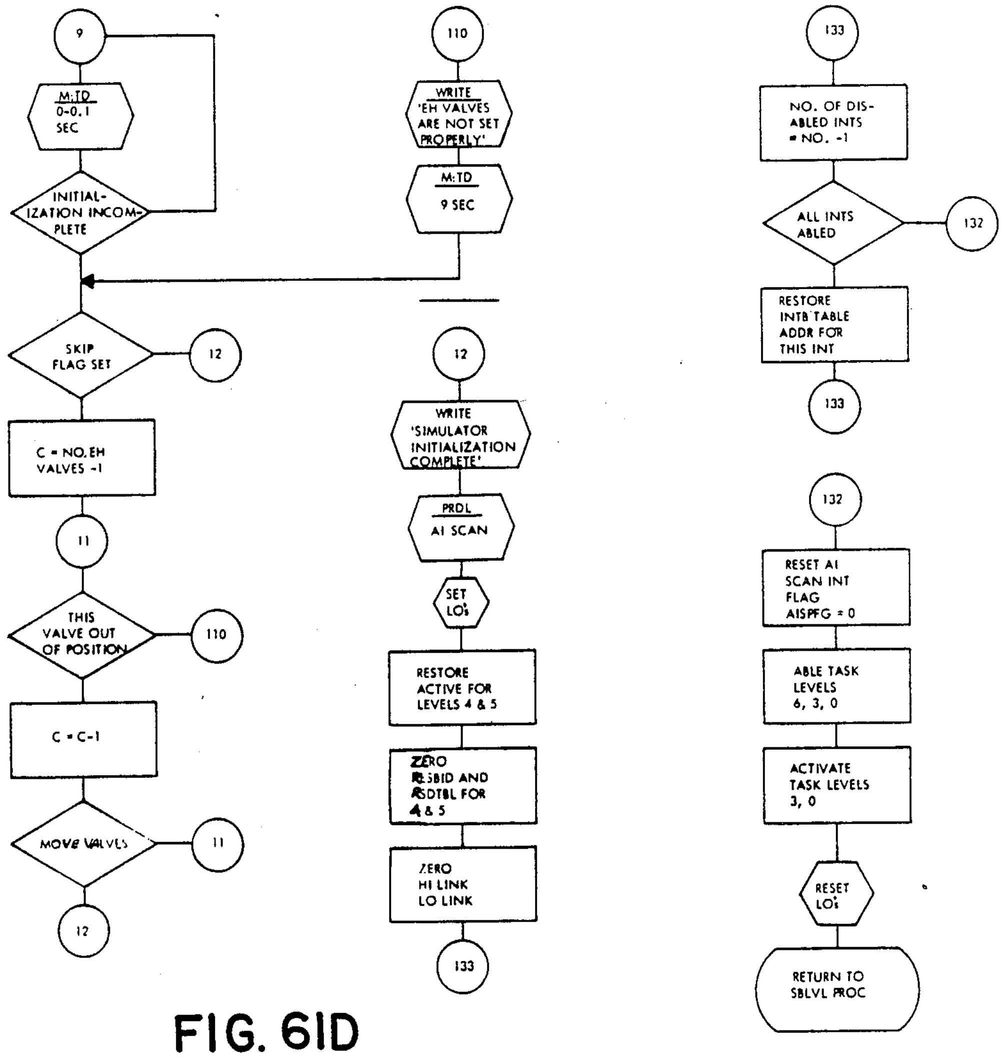

As shown in FIG. 61B, the controller program checks for the argument IANOUT and performs the conversion for the 4/S or 2/S results accordingly. A routine called routine 200 performs the conversion according to the conversion formula. Each output result is limited to within the maximum and minimum value. Because of the ordering structure of the four arrays, model variable, scale factor, TBIAS, and converted output, the routine requires the starting address of these arrays and the total number of items involved. It can then step through the array for the conversion and limit check until the number of items is exhausted.

In other applications of the invention, similar or different apparatus configurations may be employed, and analog output or other data conversion routines different from those described herein can be employed in such alternative embodiments consistently with the employment of various features of the present invention described herein.

SYSTEMS MAINTENANCE AND PROCEDURES FOR THE SIGMA 5 OR C MACHINE

In the specific embodiment, system generation, SYSGEN, refers to a generally conventional process for loading the real time batch monitor program, RBM, and batch processors (job control processor JCP), Fortran compiler and libraries, MACRSYS assembler, overlay loader and rapid access data RAD editor, into the C machine with blank core and disc. A SYSGEN loader deck is loaded into the C machine by boot strapping from the card reader. This loader then allows rapid loading of the RBM and JCP decks in the core and then to disc. When these two programs RBM and JCP are in the computer, the remaining SYSGEN programs can be loaded using standard batch control cards and procedures.

After loading the SYSGEN LOADER decks and RBM decks into the card reader, and boot strapping is commenced, the cards will be read in and the following message printed on the typewriter:

```
RBM SYSGEN
IN,OUT DEVICES
```

Then the operator will type in:

```
SYSGEN (IN,CRA03), (OUT,LPA02)(EOM)
```

Card reading then resumes. When both the SYSGEN and RBM decks have been completely loaded, the JCP deck is available to load all other programs in the usual method for batch jobs; that is, place the deck in the card reader, press INTERRUPT, type in C(NL). After the decks RADEDIT, OLOAD, FORTRAN compiler, MACRSYM, and FORTRAN libraries are all loaded in the order mentioned, the loading of the operating system program is completed.

Many of the variables in COMMON data sets must be set to some initial value before the subroutines of the online programs can execute. These initial values arrive in the proper core location through a two step process. First the values are generated and stored in a buffer in the proper file on disc, and then this data is transferred from disc to core. There are two ways of accomplishing the storing of the values on disc. First, command a previous execution of the on-line system to store its current COMMON data sets on appropriate buffers via a snapshot, or use an off-line initialization program to generate the data sets from a set of operator entered input parameters. The off-line program then stores the values it generates on the proper disc file buffer.

The first method is through the snapshot process whereby the data existing in the simulator at a particular point in time is generated by the on-line model programs, stored in core, and transferred to disc through execution of the snapshot command at the instructor's console. The process of reading the proper map, configuration, and constant sets from disc to core by the running system occurs in response to an initiate command from the instructor's console. Snap data only is stored by this procedure.

Off-line initialization consists of generating the necessary values for variables making up the snap, configuration and constant data sets, and storing these values on disc. This is accomplished by an off-line foreground program entirely divorced from the running system. This program accepts as input a set of parameters defining a desired steady state operating condition of the plant power level, condition of core; that is, beginning of life, end of life, or intermediate life, and boration level. The output of the program is the entire set of COMMON data for the system at values which cause the on-line system to simulate the desired plant operating condition. This output data is then stored on disc. Included in the initialization program are the same two routines used in the on-line system to allocate COMMON. Thus the organization of COMMON data is exactly the same for both programs.

The off-line initialization program consists of a dummy "main" program, two subroutines to allocate COMMON, a disc handler subroutine, a calling subroutine, a series of subroutines to read in parameters and calculate and store initialization values for the model programs, subroutines to read in parameters and calculate and store initialization data for the analog output handler ANHAND, the valve handler VCHAND, and the pump handler PHAND, and subroutines to convert values calculated by previous routines into packed format for efficient storage in the A and B machine.

When the combined deck is loaded as a foreground program on the C machine and run, the following steps are executed in the order mentioned. First, the dummy "main" calls the calling subroutine CONTROL. Then, CONTROL reads in a card specifying power level for use by the balance of plant model initialization subroutines. Next CONTROL calls INIT, BOPDAT, GETGO, and EXGENI, which subroutines and others called by INIT, generate initial values for variables to be referenced by the models and stored in COMMON. Then CONTROL calls subroutines ANINIT to generate initial values for the analog output handler ANHAND. Then CONTROL calls subroutine DCINIT to generate initial values for the valve handler VCHAND. Following this, CONTROL calls subroutine PHINIT to generate initial values for the pump handler PHAND. Then CONTROL calls FANPAK to pack the 2/S and 4/S data into packed A and B machine format.

Next CONTROL reads in a card to specify which snap data set number is to be generated, and a card to specify which configuration set is to be generated. Then CONTROL calls the disc handler to write the snap data from COMMON on to the proper sector is specified by the card in the previous step, of the proper disc file, which is specified by an :ASSIGN card in the load deck. Subsequently CONTROL calls the disc handler to perform the previous step function for configuration data. Then, CONTROL calls the disc handler to write the constant and temporary data on to the proper disc file which is specified by an :ASSIGN card in the load deck. CONTROL then calls the disc handler to close all three data files on disc, returns to the "main" program, and then exits. The following list of subroutines generate under the initial values for variables to be referenced by the models and stored in COMMON as mentioned above:

| | |
|---|---|
| ADMON | ASIGMA |
| HWATER | BRNSET |
| TEMPS | CVCSIN |
| RCSINN | SISINN |
| FLXSET | VALUE |
| DETECT | ALUE |
| SETPTS | PRSAT |
| OPUSSY | SOLVE |
| SETLIM | SVWSAT |
| INIT | FWFLUD |
| BOPDAT | OUTPUT |
| GETGO | CROUT |
| EXGENI | |

The off-line initialization program is loaded as a foreground program by the overlay loader in the same manner as the on-line system programs. The initializer load deck is as follows:

```
! JOB
! PAUSE KEY-IN FMEM 0 AND FSC
! ALLOBT (FILE' GO), (FSIZE,0)
! ALLOBT (FILE'X2), (FSIZE,500)
! ALLOBT (FILE,X3), (FSIZE,10)
! ALLOBT (FILE,X4), (FSIZE,10)
! ALLOBT (FILE,X5), (FSIZE,10)
! ALLOBT (FILE,X6), (FSIZE,10)
! ALLOBT (FILE,XI), (FSIZE,ALL)
! OLOAD (MAP,ALL), (UDCB,5), (FORE,3000),
  (FILE,FP,TEST)
: ROOT (DEVICE,CRA03,EOD)
< Dummy "main" program binary deck>
< Subroutine BLOCK binary deck>
< Subrouting BLKDAT binary deck>
< Disc Handler binary deck>
< Subroutine CONTROL binary deck>
< Model Initialization subroutine binary decks>
< Valve Handler Initialization binary deck>
< Pump Handler Initialization binary deck>
< Analog Output Handler Initialization binary deck>
: ASSIGN (F:201,D1,SNAPIC),(TRIES,3)
: ASSIGN (F:204,D1,CONFIG),(TRIES,3)
: ASSIGN (F:205,D1,CONTEM),(TRIES,3)
: ASSIGN (F:101,TYA01)
: ASSIGN (F:102,TYA01)
```

It is noted that the final option on the !OLOAD card specifies where on disc the program resides. If there is no room in the FP area of disc for the initialization program the last option on the !OLOAD card is omitted. The program then is loaded on to the OV file.

In the specific embodiment, the dummy "main" program binary deck, the subroutine BLOCK binary deck, and the subroutine BLKDAT binary deck, in that order must be the first three decks in the load deck. The order of succeeding binary decks is not critical. The first three :ASSIGN cards specify on which disc file the initialization program will store the data sets which it generates. These are the snap, configuration, and constant-temporary data sets respectively. The last two :ASSIGN cards assign device numbers 101 and 102 to the typewriter for input/output.

To run the initialization program, all data card decks are read into the card reader in the following order. First, there is one card which specifies the power level for BOP(F5.1) which is followed by the reactor data input card, then the primary-secondary data input cards, the analog output handler data input cards, the valve handler data input cards, and the pump handler input cards. Next, one card is read in which specifies which snap data set this run of the initialization program is generating, and then one card that specifies which configuration date set this run of the initialization program is generating.

After turning on the card reader and boot strap, INTERRUPT is pressed, and TY is keyed in NL. Again INTERRUPT is pressed and RUN XXXXXX NL is keyed in, where XXXXXX is the name of the file where the initialization program was loaded, as specified on the !OLOAD card at load time. If no file is so specified, XXXXXX is OV. The program will run to completion without further operator action.

When the Sigma 5 is directed to run the simulator program by a programmer's console key-in, or in other words on-line initialization, the sublevel processor initiates execution of sublevel 32. This sublevel performs various functions, all related to debugging features on the system, and then exits and deactivates. The Sigma 5 or C machine then enters a WAIT condition until an initiate model command is detected from the instructor's console.

The initiate model command initiates a data link transmission from the B machine to the C machine, causing BTOFIV, a program on the data link interrupt level to execute. BTOFIV, previously described, bids sublevel 31, which executes as soon as the data link interrupt level is released. Sublevel 31, LEV3l, uses data entered by the instructor in the initiate model command to read the proper snap data set from disc into core. The first location in the snap data set contains the number of the configuration data set associated with this snap data set. LEV31 uses this number to read the proper configuration data set from disc into core, and then reads the constant data set in from disc to core, picks up addresses of COMMON blocks used by the display value command from the instructor's console and stores them in the proper buffer. Then LEV31 picks up the addresses of COMMON blocks used by the valve handler and stores them in the proper buffer, enters an instruction loop until initialization is completed on the A machine, and calls the data link handler to send 2/S data from the A machine to the B machine and vice versa, and to fetch 2/S and 4/S data from the A and B machine to the C machine. Finally, LEV31 calls PAKFAN to convert initialization data stored in packed format to C machine or Sigma 5 format, calls the data link handler to signal the B machine that initialization is complete on the A machine and the C machine, and then exits and deactivates. At this point initialization is complete in the A machine and the C machine. The C machine now enters a WAIT condition until a model start command is initiated at the instructor's console.

The described data initialization is preferably employed in implementing the invention. However, many invention features are usable with initialization procedures different from those described herein.

UTILITY AND DEBUGGING FEATURES

There are several debugging aids available in the on-line system. The basic tool is the programmer's console program PCN, which enables the programmer to dump out or modify core locations in hexadecimal, integer, or real format. This program PCN can be bid on demand by pressing the INTERRUPT pushbutton on the typewriter or automatically at the beginning of each one quarter second run of the model.

When PCN is bid, all model computation on the C machine ceases. However, the data link end action programs are on a higher interrupt level and run even when PCN is running. It is possible to eliminate request for data link transmissions to and from the A or B machines or both. This modified procedure permits the programmer to modify initial condition data on disc. In operation, when the on-line system is run on the C machine, a message is printed on the typewriter:

ENTER 1 IF STANDARD RUN DESIRED If no debugging features are to be used on this simulation, 1 EOM is typed in. No further messages are output, and the C machine awaits an initiate model command from the instructor's console. Upon receiving this command and a start model command, the models begin periodic execution, four times per second.

As indicated, model execution is halted and core locations are dumped or modified by pressing PCN on the typewriter. Models will resume execution upon release of the PCN program as hereinafter described. To use one or more of the debugging features a 0 EOM is typed in response to the above printed message.

A series of additional messages are then typed out asking the programmer which features he desires to use, for example ENTER 1 IF CONTINUOUS RUN DESIRED. If a 1 EOM response is typed in, the models called for after a start model command, execute periodically in a normal "continuous-run" mode. A 0 EOM response bids the programmer's console function at the beginning of each one quarter second execution run, allowing critical variables to be monitored or modified. This is called the "single-step" mode. To return to a continuous-run mode, the address of the first word of the SPARFG COMMON block is located from the load map and changed to zero.

When the message is typed as follows:

ENTER 1 IF DATA LINK TO P2000 A IS DOWN

ENTER 1 IF DATA LINK TO P2000 B IS DOWN and if it is desired to run the models with no communication to the P2000 A machine or the P2000 B machine, 1 EOM is typed in, or otherwise 0 EOM is typed in. The Sigma 5 or C machine enters a wait condition following a response to the last message and awaits an initiate model command, unless a 1 was typed in response to the last message. In that case, the B machine, including the instructor's console, is isolated from the system.

An additional message may be printed as follows:

ENTER INIT BUFFER NUMBER (12 FORMAT)

In response to this message, a number typed in between 01 and 28 EOM causes the C machine to simulate and initiate model command on the specified buffer number 1 through 28.

The foregoing debugging features are all implemented in the sublevel calling subroutine LEV32, while the following debugging features are all contained in the calling subroutine LEV31.

If a standard run is not called for, an initiate model command causes the following message to be typed:

DISC FILES TO BE MODIFIED (ENTER Y OR N) To modify variables in the initial condition data sets stored on disc, Y EOM is typed. The programmer's console program is then bid, allowing the programmer to change the core values of the variables he wishes to modify. Upon release of the program PCN, the core values of all initial condition data set variables are written on disc. To skip this "modify" function, N EOM is typed in. Then, the following message is printed.

CHANGE IN CONTROLLERS (YES OR NO)

To modify or tune up parameters to the controllers, YES EOM is typed. Further messages are typed out requesting specific changes, as described in connection with the controller handler CONHAND. If no changes are to be made, NO EOM is typed in. If the C machine is in a single step mode, the program PCN is then bid. Upon release, or if the system is in continuous run mode, the C machine enters a WAIT condition until receipt of a start model command. If the B machine is isolated from the system, the C machine simulates a start model command and begins execution of the models.

The first location of COMMON block SPARFG is a logical flag PCN FLG which is initially set to false in LEV32. This flag is set true, if, and only if, the programmer types in a 0 in response to the following message:

ENTER 1 IF CONTINUOUS RUN DESIRED

Otherwise, the flag remains false. At the end of LEV31, a check is made and if PCN FLG is true, the program PCN is bid. The same action is taken at the beginning of LEV5, prior to the execution of any models. If PCN FLG is false, the call to PCN at both places is jumped over.

The second through fifth locations of COMMON plot SPARFG constitute a logical array, also called SPARFG, which is initialized to false at the start of LEV32. If the programmer typed a 1 in response to the message:

ENTER 1 IF DATA LINK TO P2000 A IS DOWN

SPARFG(1) is set true. The same action occurs for SPARFG(2) if the programmer enters a 1 in response to the corresponding B machine message.

Data link calls requesting transmission to and from the A and B machines are scattered throughout the sublevels and the data link end action routines on the interrupt level. Before these calls are executed, the proper flag is checked; that is, SPARFG(1) if the call is for transmission to or from the A machine, SPARFG(2) if the call is for transmission to or from the B machine, and if true, the data link call is skipped over. SPARFG(4) is a logical flag used to determine whether or not debug features are to be activated on LEV31. This flag is initialized false; and in this state, all debug features are activated in LEV31 whenever it executes. However, SPARFG(4) can be set true by two methods, a 1 response to the LEV32 message:

ENTER 1 IF STANDARD RUN DESIRED or upon release of the controller tune-up feature in LEV31.

To load the on-line running system into the C machine, the deck is run through the card reader in a conventional manner. This is accomplished by placing the deck in the card reader, pressing the INTERRUPT lever on the maintenance panel, and entering C NL on the typewriter. These cards are read in before the C machine enters a WAIT condition and the card reader halts. Then the INTERRUPT pushbutton is pressed and FMEMO NL is entered on the typewriter. The INTERRUPT pushbutton is pressed again and FSC NL is entered on the typewriter. The card reader now resumes operation and reads in the entire deck without further halts. The Sigma 5 or C machine load deck is as follows:

```
        ! JOB
        ! ATTEND
D(1)    ! PAUSE KEY-IN FMEM) AND FSC
D(2)    ! ALLOBT (FILE,GO), (FSIZE,0)
        ! ALLOBT (FILE,OV), (FSIZE,0)
        ! ALLOBT (FILE,X2), (FSIZE,1200)
        ! ALLOBT (FILE,X3), (FSIZE,14)
        ! ALLOBT (FILE,X4), (FSIZE,15)
        ! ALLOBT (FILE,X5), (FSIZE,25)
        ! ALLOBT (FILE,X6), (FSIZE,1)
        ! ALLOBT (FILE,X1), (FSIZE,6000), (FORMAT,B), (RSIZE,30)
D(3)    ! OLOAD (FORE,2A30), (TASKS,4), (MAP,ALL), (TEM,1000);
        : (FILE,FP,TEST), (UDCB,6)
        : ROOT (DEVICE, CRA03, EOD)
D(4)    < Sublevel Processor binary deck>
        < Subroutine BLOCK binary deck>
        < Subroutine BLKDAT binary deck>
        < Sublevel Processor Initialization binary deck>
        < Disc Handler binary deck>
        < Subroutine ANHAND (Analog Output Handler) binary deck>
        < Subroutine FANPAK binary deck>
        < Subroutine PHAND binary deck>
        < Subroutine BTOFIV binary deck>
        < Subroutine TZASUB binary deck>
        < Subroutine STORE binary deck>
        < Miscellaneous Model function binary decks>
EOD
SEG(LINK,1,ONTO,0), (DEVICE,CRA03,EOD)
        < Subroutine LEV1 binary deck>
        < 4/S Model subroutine binary decks>
EOD
SEG(LINK,2,ONTO,1) (DEVICE,CRA03,EOD)
        < Subroutine LEV2 binary deck>
        < Subroutine CONHAND (Controller Handler) binary deck>
        < 2/S resident model subroutine binary deck>
EOD
SEG(LINK,3,ONTO,2), (DEVICE,CRA03,EOD)
        < Subroutine LEV3 binary deck>
EOD
SEG(LINK,5,ONTO,3), (DEVICE,CRA03,EOD)
        < Subroutine LEV5 binary deck>
EOD
SEG(LINK,6,ONTO,5), (DEVICE,CRA03,EOD)
        < Subroutine LEV6 binary deck>
```

-continued

```
EOD
SEG(LINK,17,ONTO,6), (DEVICE,CRA03,EOD)
        < Subroutine LEV17 binary deck>
        < Subroutine VCHAND (Valve Handler) binary deck>
        < First half of non-resident 2/S model subroutine binary deck>
EOD
SEG(LINK,19,ONTO,6), (DEVICE,CRA03,EOD)
        < Subroutine LEV19 binary deck>
        < Second half 2/S model subroutine binary decks>
EOD
SEG(LINK,20,ONTO,6), (DEVICE,CRA03,EOD)
        < Subroutine LEV20 binary deck>
        < Non-periodic model subroutine decks>
EOD
SEG(LINK,31,ONTO,6), (DEVICE,CRA03,EOD)
        < Subroutine LEV31 binary deck>
EOD
SEG(LINK,32,ONTO,6), (DEVICE,CRA03,EOD)
        < Subroutine LEV32 binary deck>
EOD
D(5)    : ASSIGN (F:201,D1,SNAP), (TRIES,3)
        : ASSIGN (F:204,D1,CONFIG), (TRIES,3)
        : ASSIGN (F:205,D1,CONTEM), (TRIES,3)
        : ASSIGN (F:101,TYA01)
        : ASSIGN (F:102,TYA02)
        : ASSIGN (F:105,CRA03)
          FIN
```

With reference to the items in the load deck D(1) above, it is necessary to key in FMOEMO to ensure sufficient background core to enable the overlay loader to load this large program. An FSC key-in is needed to specify that a foreground program is being loaded. With reference to item D(2) in the deck the cards ALLOBT are needed to juggle the sizes of files in the background temporary area of the disc. These files are used by the loader as scratch files. Referring to item D(3) of the load deck, the simulator programs execute in core at hexadecimal location 2A30, and are stored on disc on file TEST. With reference to item D(4) of the load deck, the first four binary decks following the :ROOT card must be in the order indicated in the above deck. Succeeding binary decks can be in any order as long as they are loaded before the !EOD card. Binary decks in segments other than the root, that is, loaded after a :SEG card, can be loaded in any order as long as they remain between the :SEG card and the !EOD card specified. With reference to items D(5) in the load deck, the cards :ASSIGN are used to tie file numbers or device numbers used in the FORTRAN subroutines to specify disc files or input/output devices. For example, a statement calling for output might read:

75 WRITE(102,1004)A,B,C

The :ASSIGN card now present in the deck causes device number 102 to refer to the typewriter, TYA01. In the same manner, a call to the disc handler referencing file number 201 reads or writes from SNAP, a file in the D(l) area. SNAP, CONFIG, and CONTEM are the files on which the initialization data is stored.

Among other utility programs, three separate off-line programs are provided to punch COMMON data from disc on to cards, verify these cards against the disc data from which they were punched, and then read these cards back on to discs. Each of the off-line programs consist of a dummy "main" program, subroutines BLOCK and BLKDAT, which are the same two subroutines used in the initializer and the nuclear simulator program to allocate COMMON, an application subroutine, and the disc handler. Each of the three separate off-line programs are identical except for the application subroutine portion.

The program for punching COMMON data from disc on to cards operates by calling subroutine ICREAD which, in the following order, computes the number of words in the snap, configuration, and constant-temporary data sets; request inputs from the typewriter specifying what type of data is to be punched, and which set number; determines which file and with which file number the specified data begins on disc; reads proper buffer from disc into core; computes card sequence number; punches 26 words from core to cards; punches sequence number on cards; prints the same 26 words on the line printer; repeats the computing of the card sequence number and the punching of the 26 words from core to cards until the entire data set is punched out; request inputs from the typewriter specifying whether more decks are to be punched; and if more decks are to be punched, it returns to the first mentioned request; then returns to the "main" dummy program and ends.

The program to verify the punched cards against the disc data from which they were punched operates by calling subroutine ICREAD which, in the following order, computes the number of words in the snap, configuration, and constant-temporary data sets; reads two cards to determine what type of data is to be verified and which set number; determines which file and with which sector the specified data begins on disc; reads the proper buffer from disc into core; reads a card and returns to "main" if there is a "X" in column 1; checks the sequence number on the card; compares each word on card to its corresponding word in core and prints a message if not equal; prints "END OF RECORD" message after the last card is processed; then returns to the "main" dummy program and ends.

The program which reads these verified punch cards back on to disc operates by calling subroutine ICREAD, which, in the following order computes number of words in the snap, configuration, and constant-temporary data set; reads two cards to determine what type of data set and which set number, and returns to the "main" if "X" in column 1; determines which file and with which sector number the specified data begins on disc; reads the card; checks card sequence number;

stores 26 words from the card into the proper core area for all cards in the IC set deck; writes complete data set from core on to disc; repeats the sequence from the step of reading the two cards mentioned above; then returns to "main" dummy program, and ends.

The program for the Sigma 5 or C machine used to test the data links to the A and B machines is a separate utility program that is not resident in the C machine. The data link is tested by continuously transmitting a fixed 24 word (32 bit) buffer and then requesting that it be retransmitted back to the sending computer. The buffer received is checked, word for word, against the buffer sent, and all errors are printed on the initiating computer. To run the test, a data link test program in the A or B machine must be initiated. The test programs on both computers are interactive and permit either computer to be designated as the initiator of the data link transfers, through the interactive messages.

Figure 19:
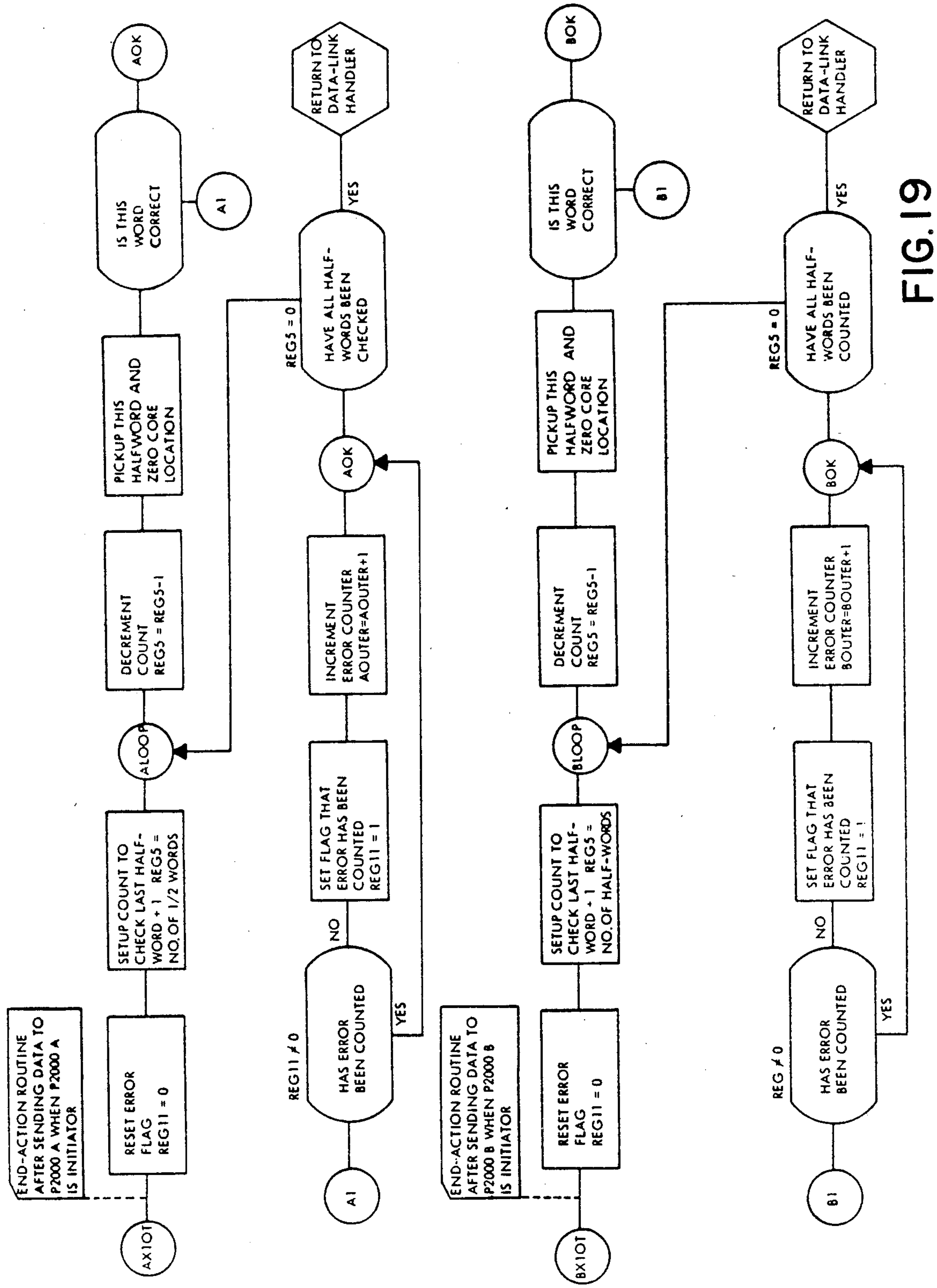
FIG. 19 illustrates the flow chart for the data link test program end action routines.

The Sigma 5 or C machine data link program comprises three separate sub-programs as follows: the sub-level processor, including the Sigma 5 or C machine data link handlers, the channel interface unit CIU initialization program, which is revised to permit only index 1 data link operations. Index 1 operations are set up to transfer the 24 word pattern from and to the test buffers which are also resident within the CIU initialization program. Referring to FIG. 19, the flow chart for the end action routines for the index 1 output, when the initiator is either the A or the B P2000 machine, which are also located in the CIU initialization program, is illustrated. These routines check the data received against the correct values. When the data is incorrect, the transmission from the P2000 A or B machine has failed and an error counter, AOUTER from the A machine and BOUTER from the B machine, is incremented. These counters are located at location 2F6C(AOUTER) and 2F7E(BOUTER) in the Sigma 5 memory. If errors occur during operations initiated by the P2000 A or B machine, the counts for that computer can be interrogated from the maintenance panel to determine whether the error occurred on output from or input to the P2000 machines. In this modified routine, LEV3 is the initial sublevel to be run; and it is marked able and resident. Thus, LEV32 is run when the program is loaded and initiated.

Figure 20A:
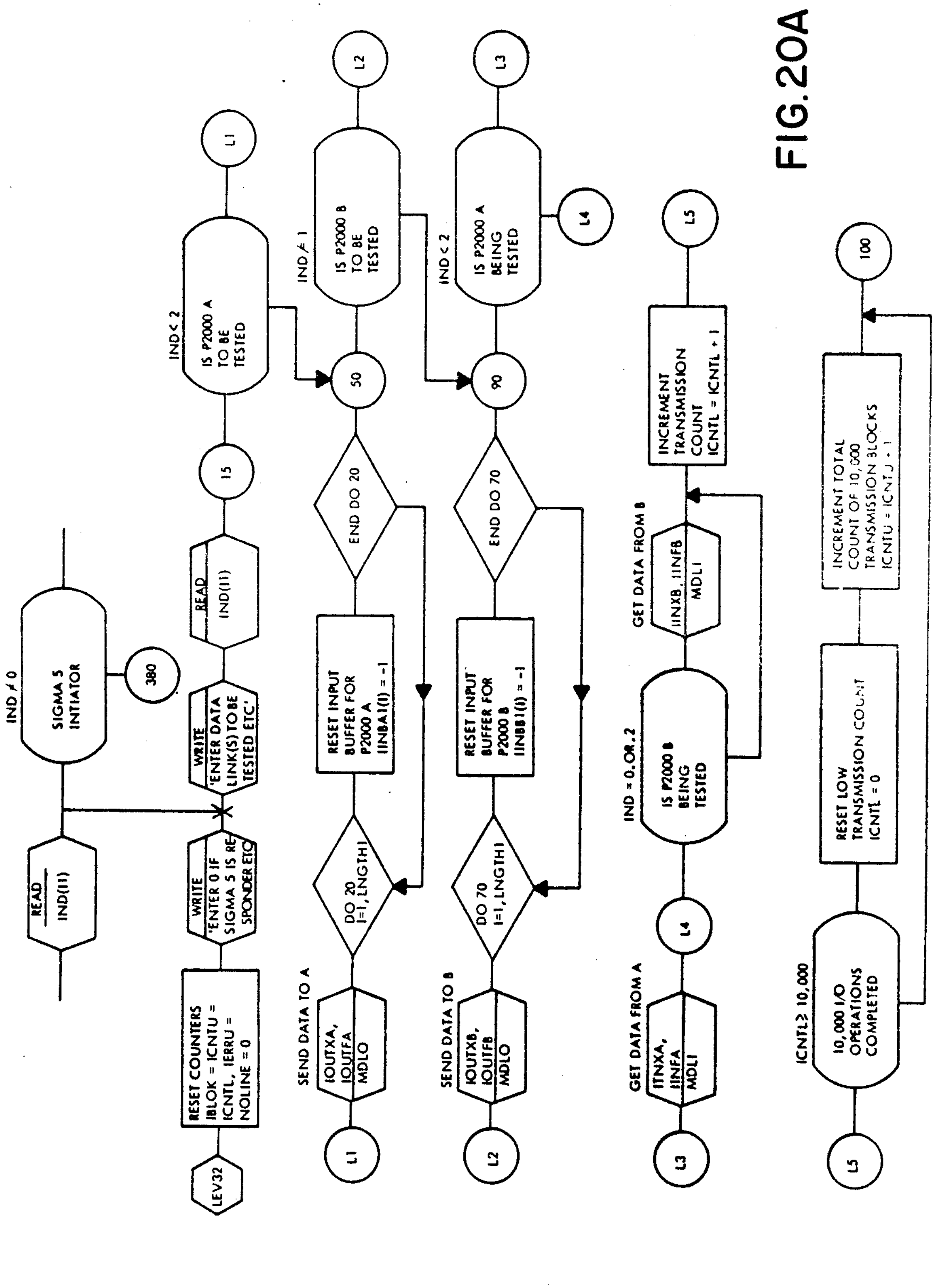
FIGS. 20A, 20B and 20C inclusive illustrates the flow chart for the data link test program of the C machine.
Figure 20B:
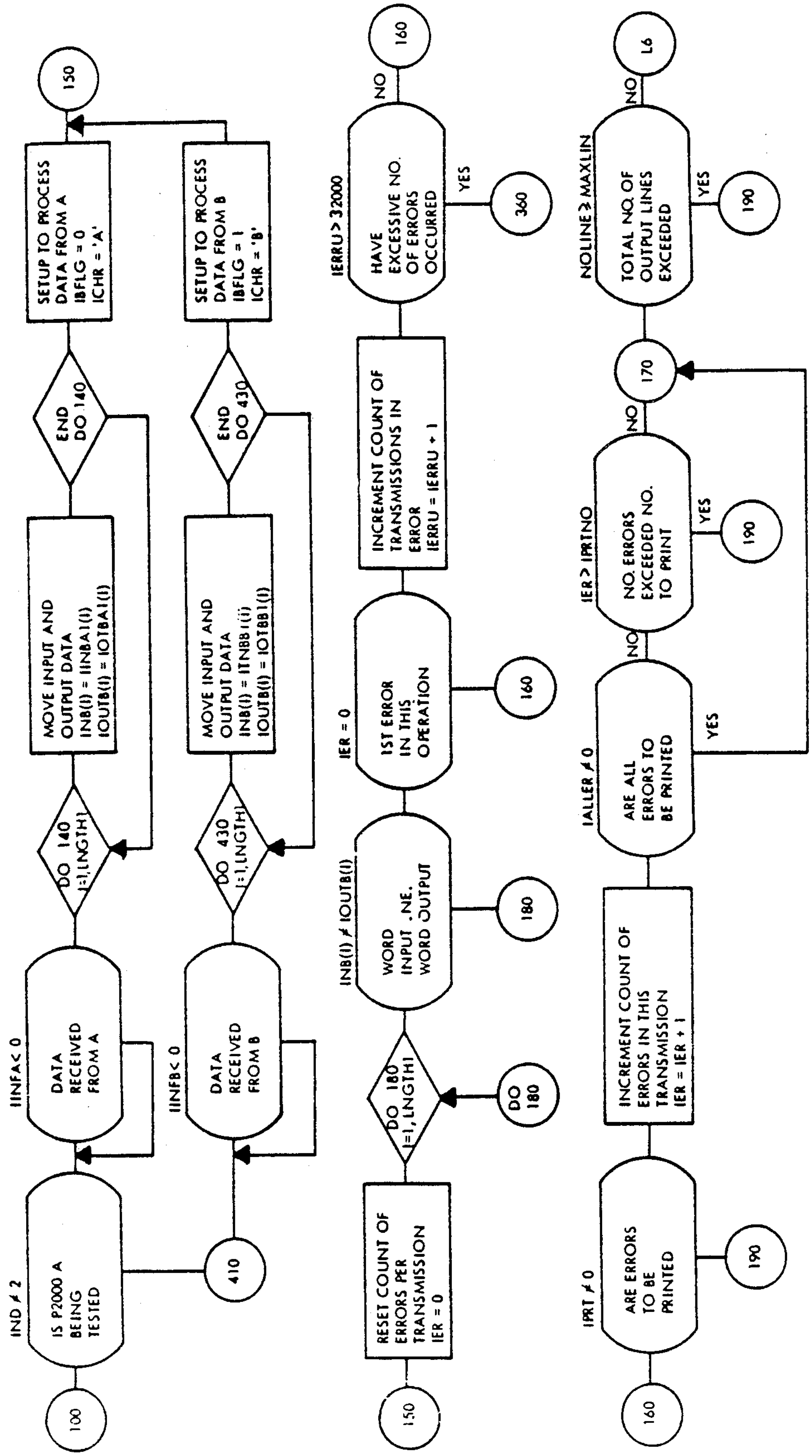
Figure 20C:
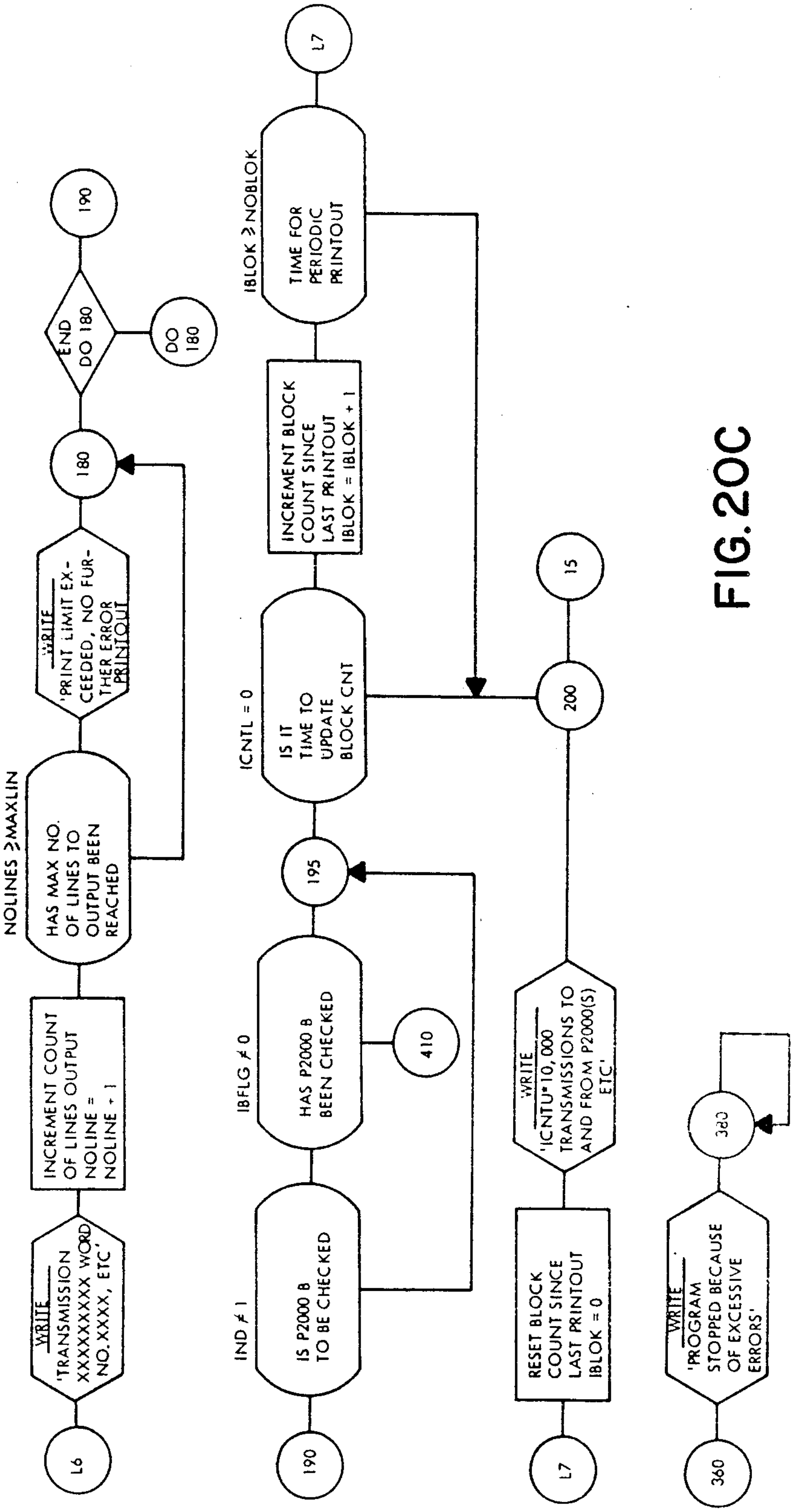

Referring to the flow chart of FIGS. 20A, 20B and 20C, the C machine data link test program is contained in subroutine LEV32. This subroutine contains the interactive software which permits the operator to indicate which data link, either A or B is to be tested; and which computer is to initiate the data transfer. When the C machine is the initiator, LEV32 calls the data link input/output routines, performs the word for word comparison between words sent and received, and prints an error message on the line printer when the words do not agree. A message is also output periodically, normally after every 10,000 transmit/receive cycles, indicating the number of cycles completed and the number of cycles in which an error was detected. If an incorrect link error or an error in the sequence of control commands is detected, the standard error messages output by the sublevel processor, when the simulator system is running, are output during the data link test. Several different output options have been included in the test program, these options are selected with DATA cards when the program is compiled, but can easily be changed through the maintenance panel at run time.

SYSTEMS SOFTWARE FOR P2000 A AND P2000 B COMPUTERS

The P2000 A and P2000 B computers (A and B machines respectively) are input/output data oriented in the present embodiment of the invention. Functionally, they generally act as an input/output controller and an extension to the Sigma 5 (C machine). Input is collected from the control panels, translated via a minimum of logic, and transmitted to the C machine. Data received from the C machine is output directly to the control panels via the A and B machines, or used in calculations which results in output to the control panels. This input-/output data includes contact inputs, and outputs and analog inputs outputs.

Figure 21:
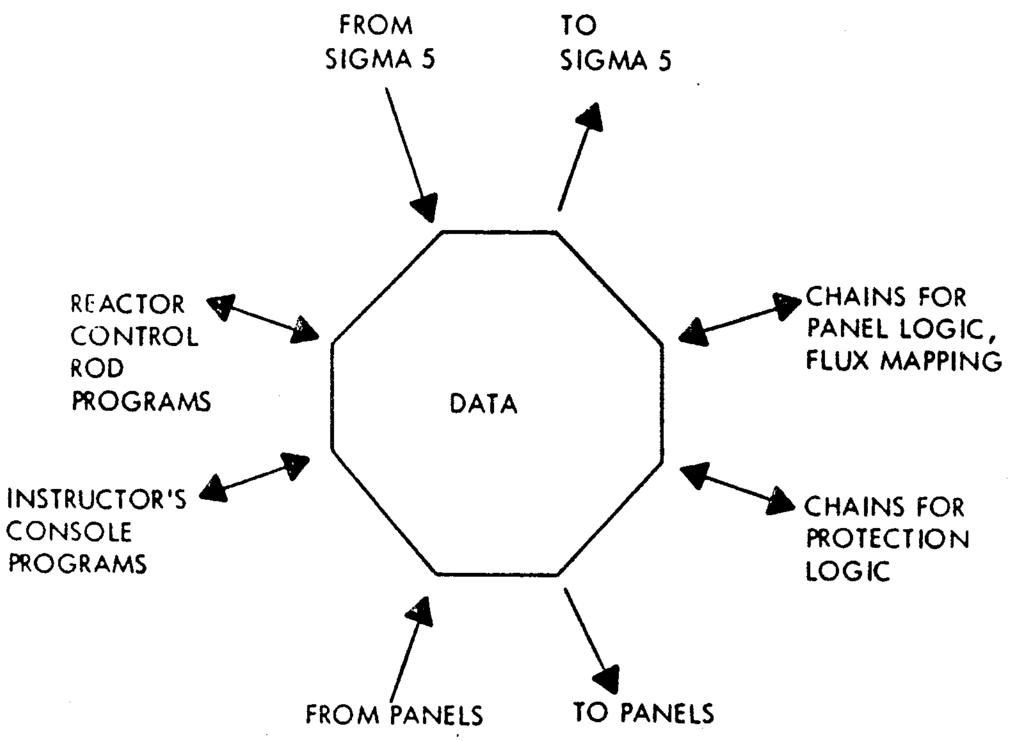
FIG. 21 is a pictorial illustration of the A and B machines as a data mass.

FIG. 21 illustrates generally the A and B machines as a data mass. The operation of the A and B system software is essentially a matter of data organization and handling. Data is classified as either bit logical, that is, one equals true, zero equals false, or integer, that is, 16 bits equals one integer word. Contact inputs and outputs are classified as bit logical data, while analog inputs and outputs are classified as integer.

Figure 22:
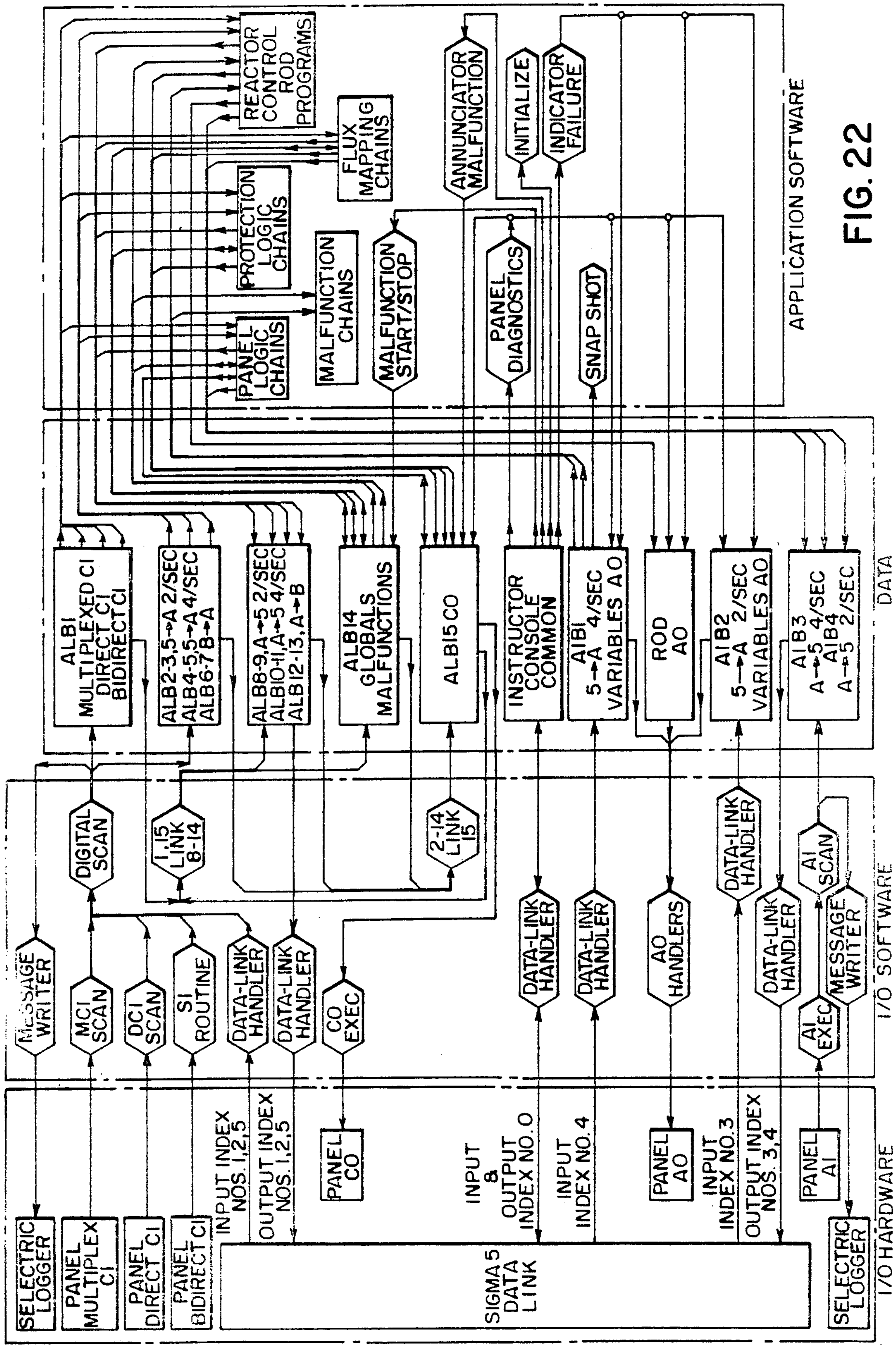
FIG. 22 is a diagram showing the program and data interaction of the A machine.
Figure 23:
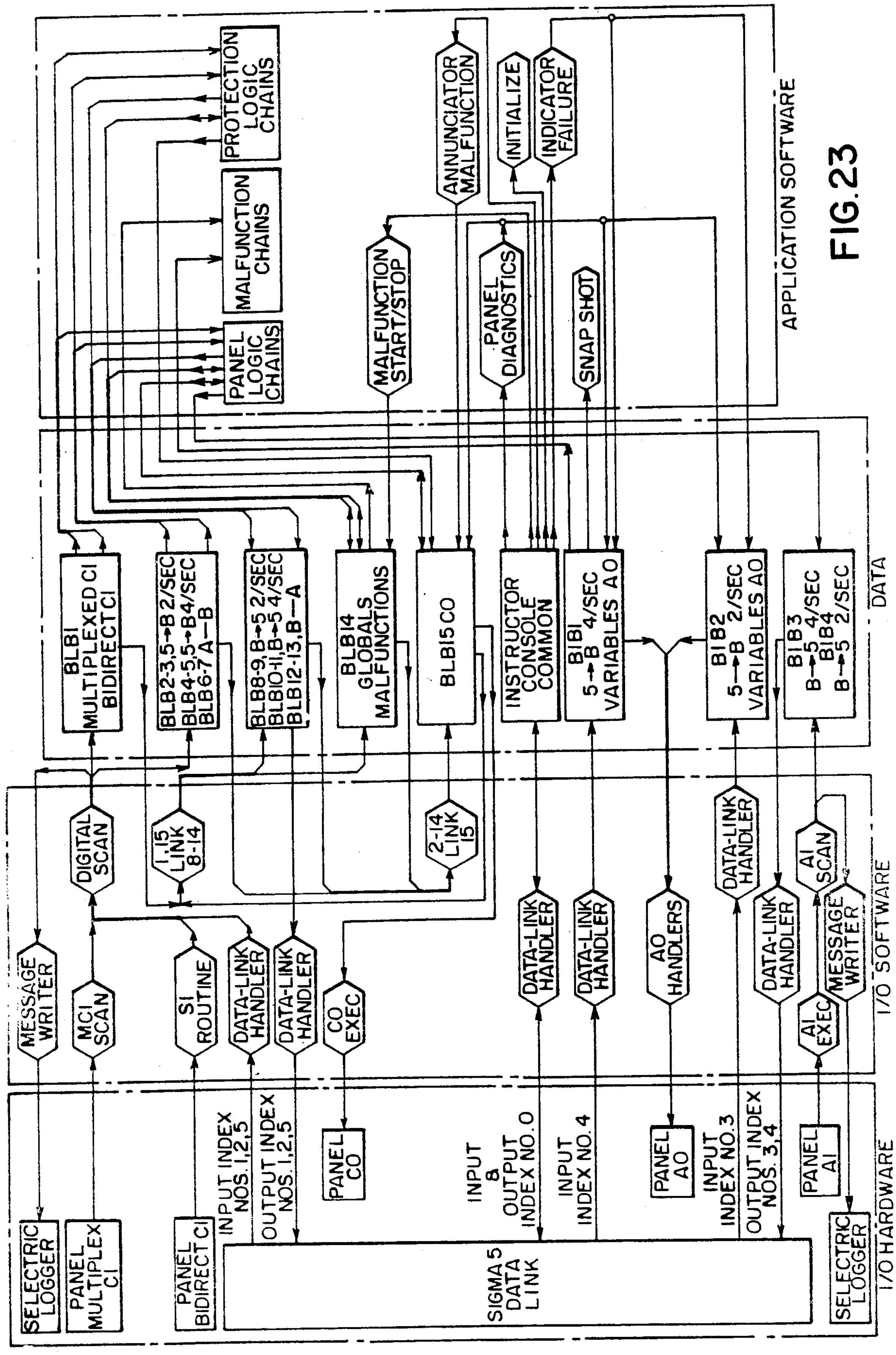
FIG. 23 is a diagram showing the program and data interaction of the B machine.

Referring to FIGS. 22 and 23, the manipulation of data is done by input/output programs and application programs. That portion of the program organization diagram of FIGS. 22 and 23 within the dashed lines and labeled I/O software includes basic system programs which operate independently of data values. That portion of the diagram of FIGS. 22 and 23 within the dashed lines labeled application software, contains those programs and PROGEN chain files whose actions are controlled by the data values.

Figure 24A:
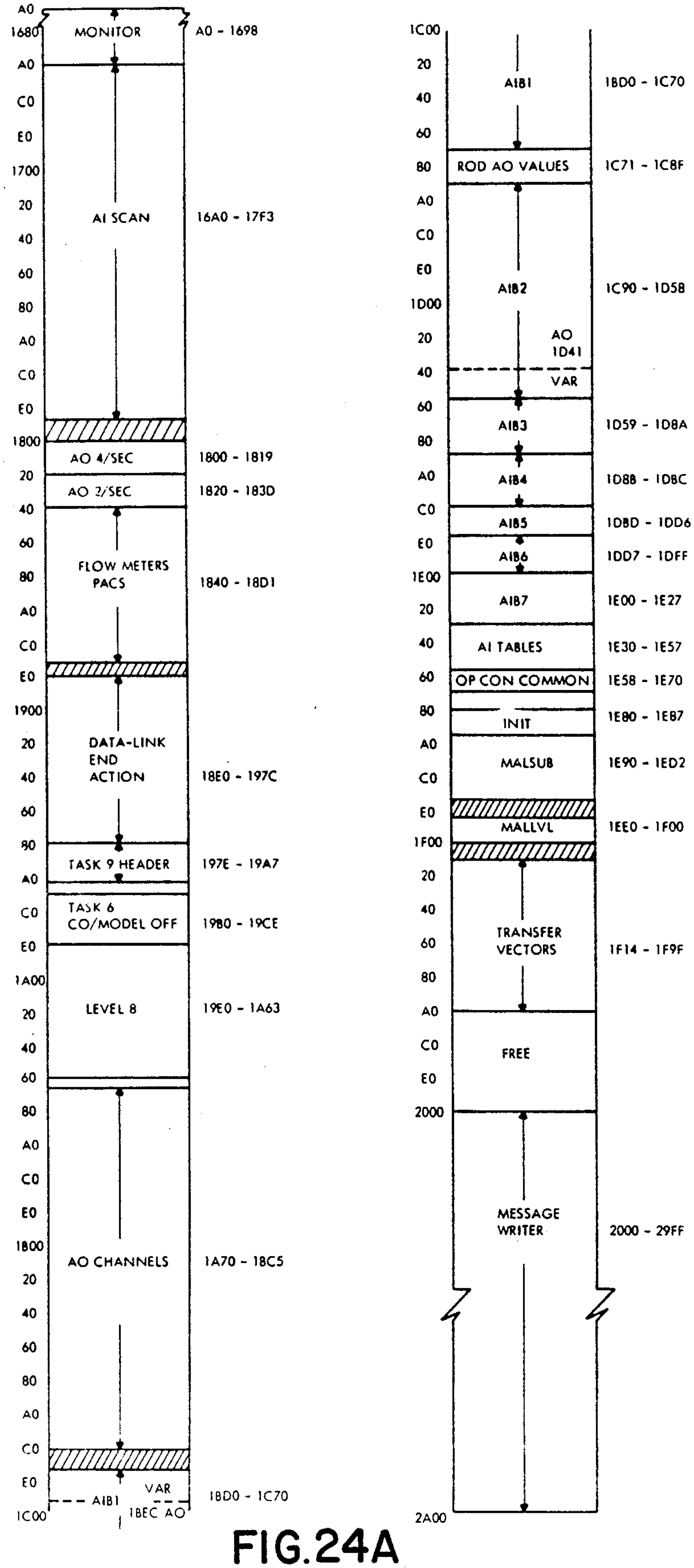
FIGS. 24A, 24B and 24C illustrate a core map of the A machine.
Figure 24B:
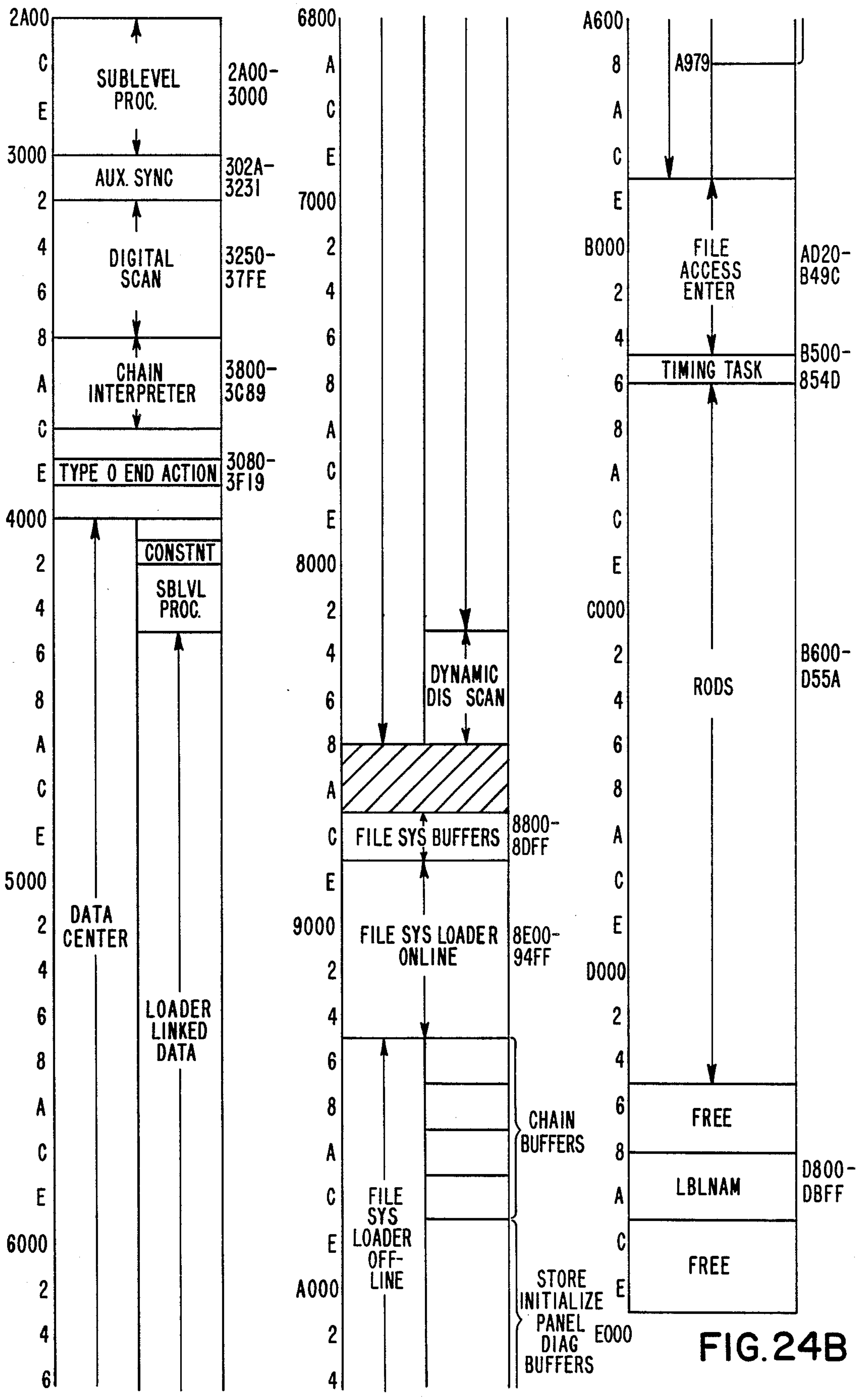
Figure 24C:
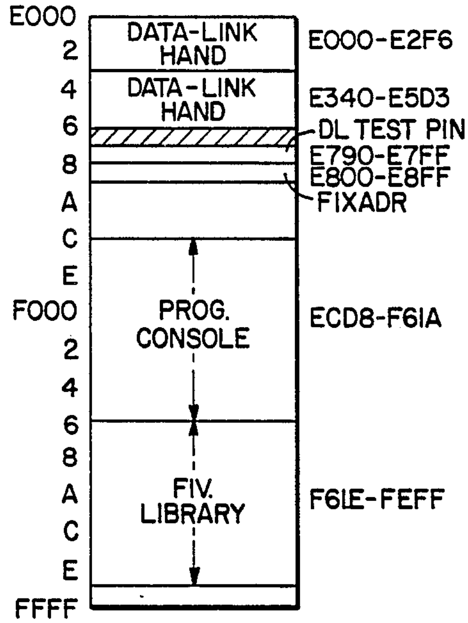
Figure 25A:
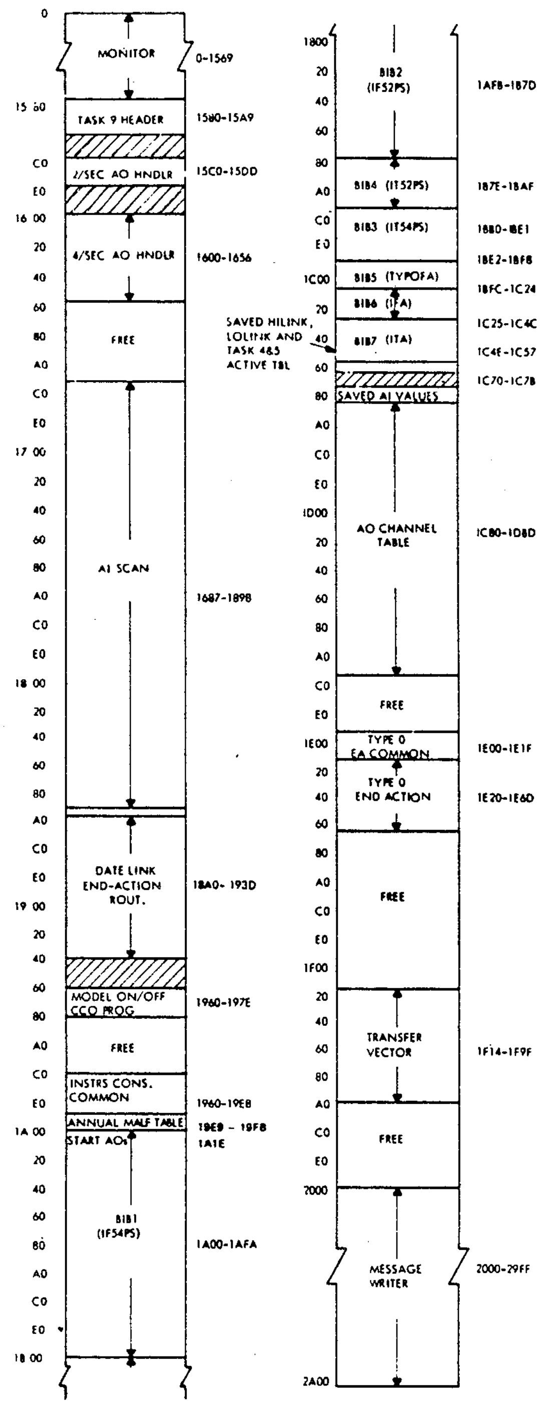
FIGS. 25A, 25B and 25C illustrate a core memory map of the B machine.
Figure 25B:
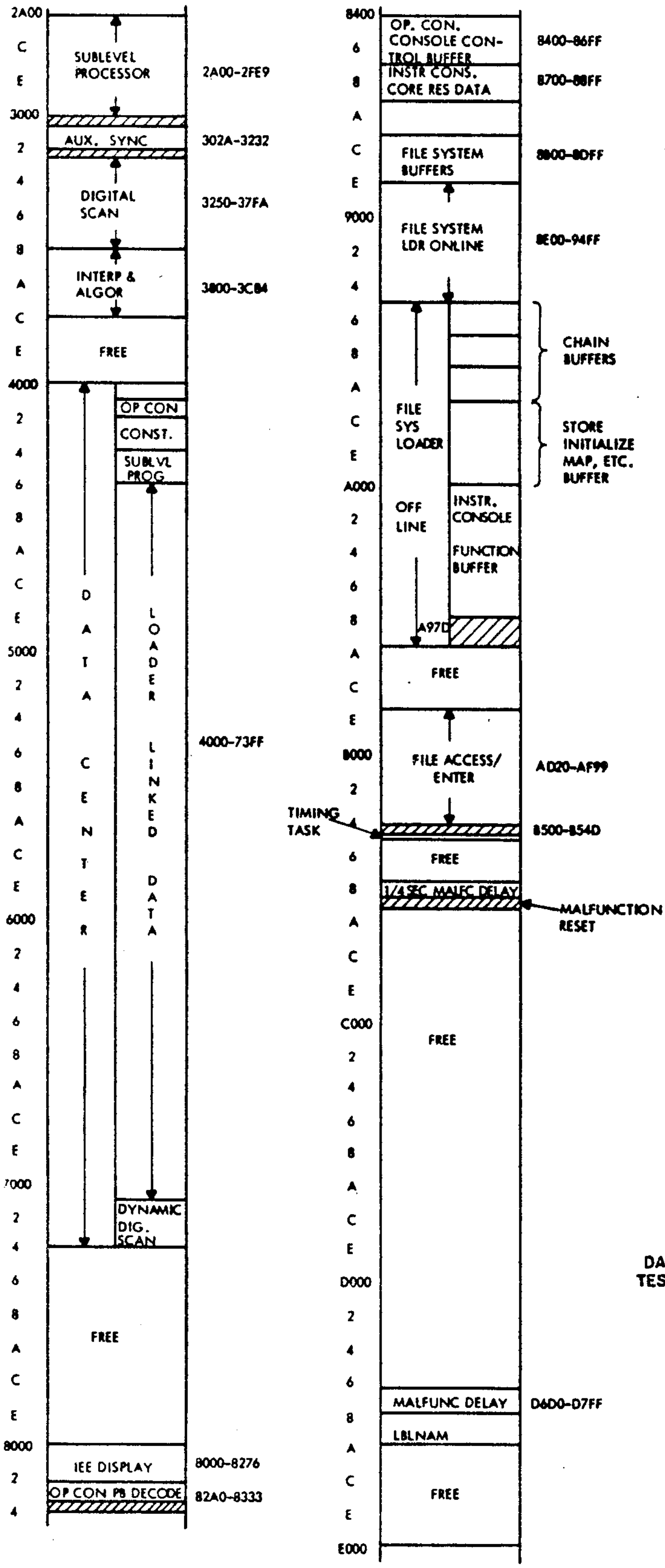
Figure 25C:
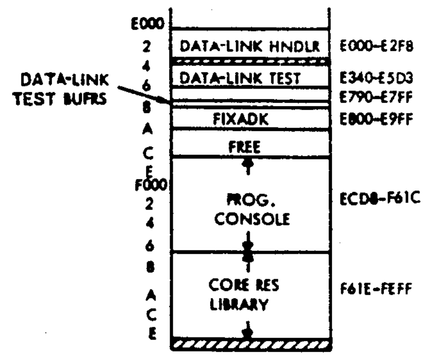
Figure 26A:
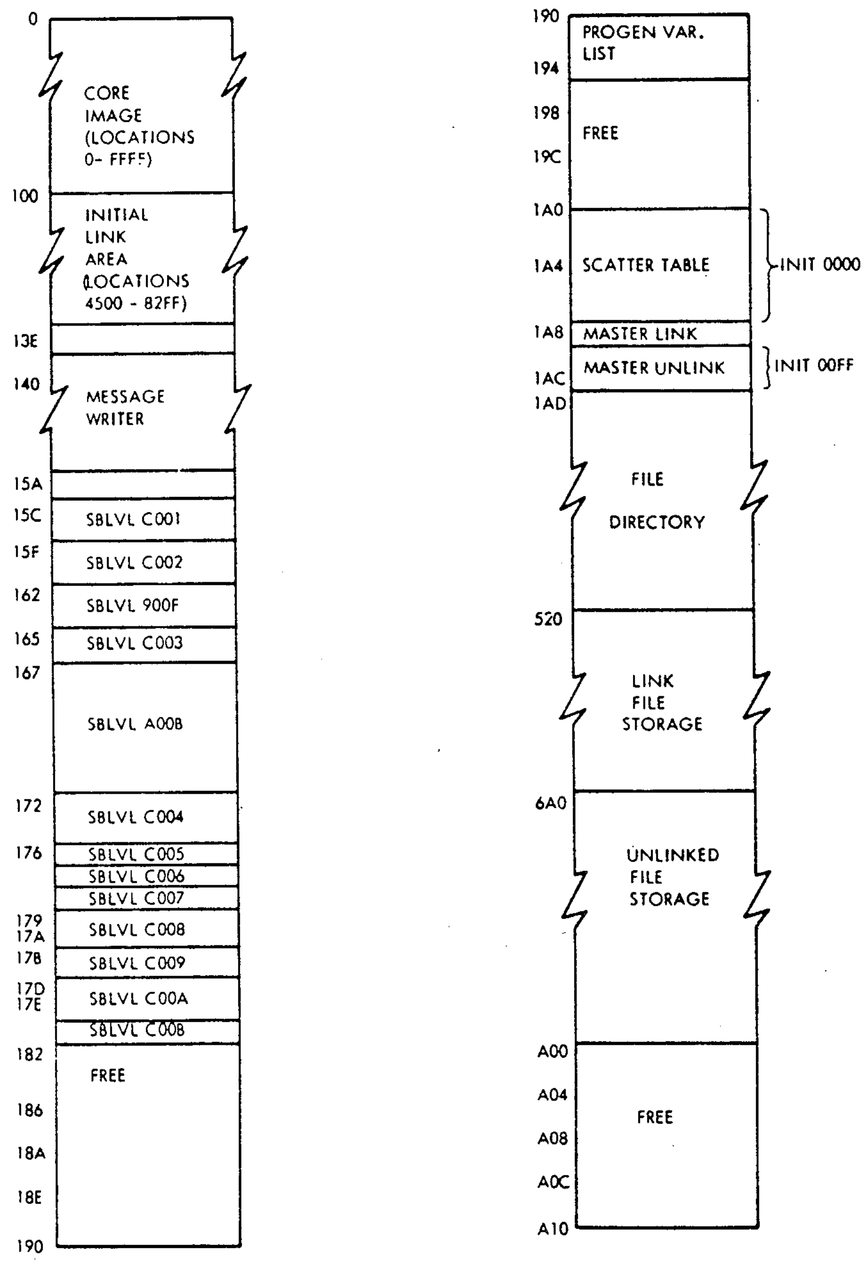
FIGS. 26A and 26B illustrate a disc map of the A machine.
Figure 26B:
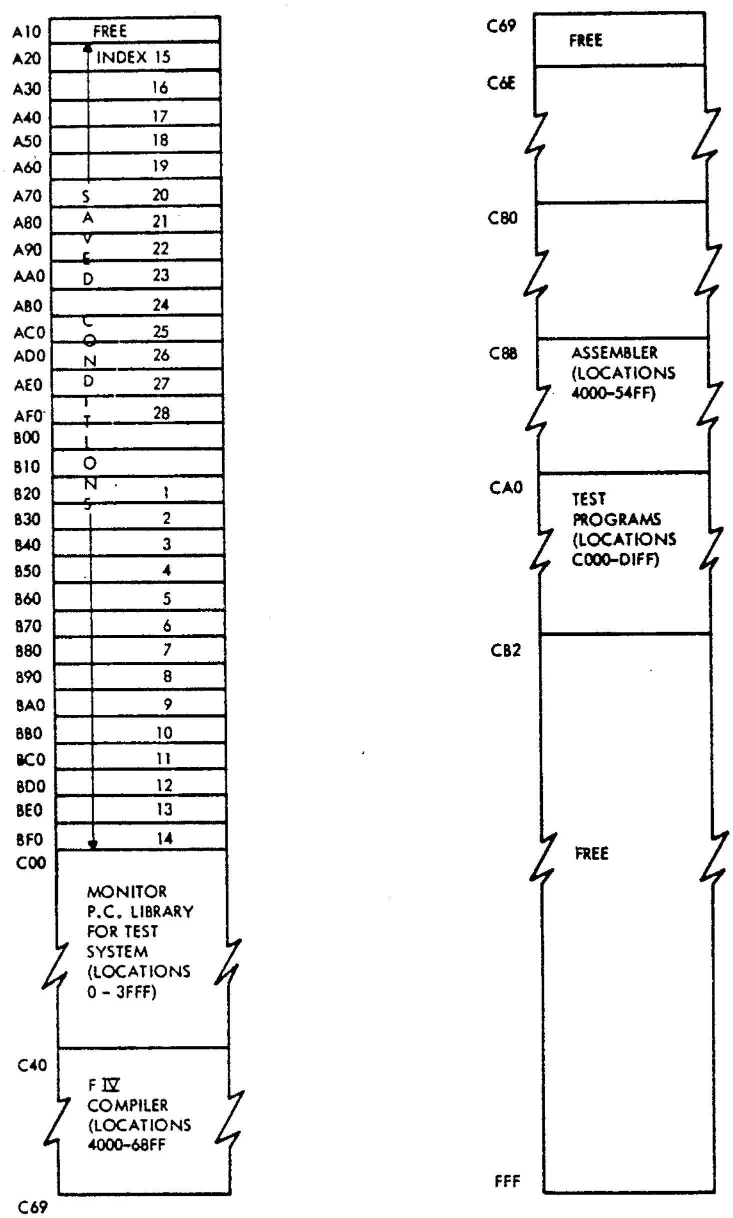
Figure 27A:
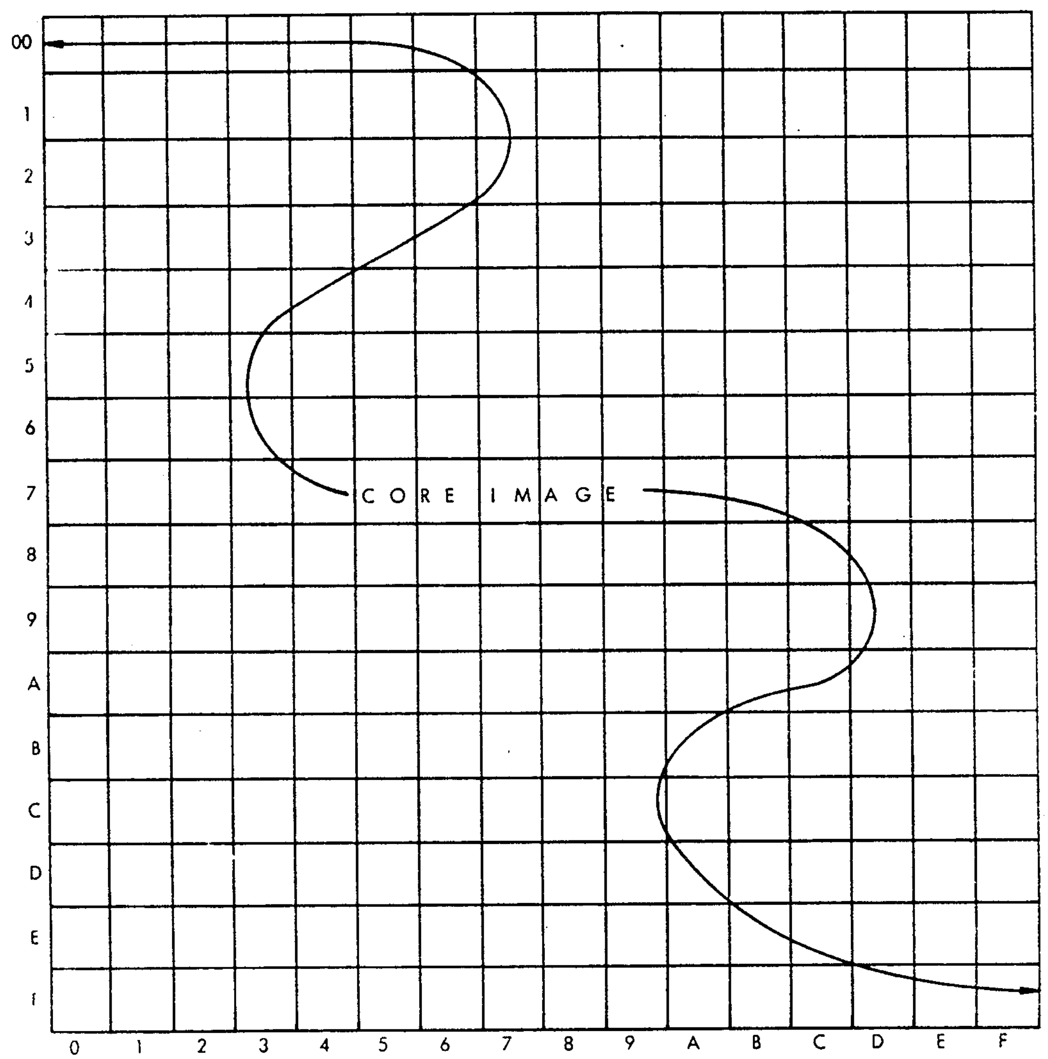
FIGS. 27A, B, C, D, E, F, G, H inclusive illustrate a disc map of the B machine.
Figure 27B:
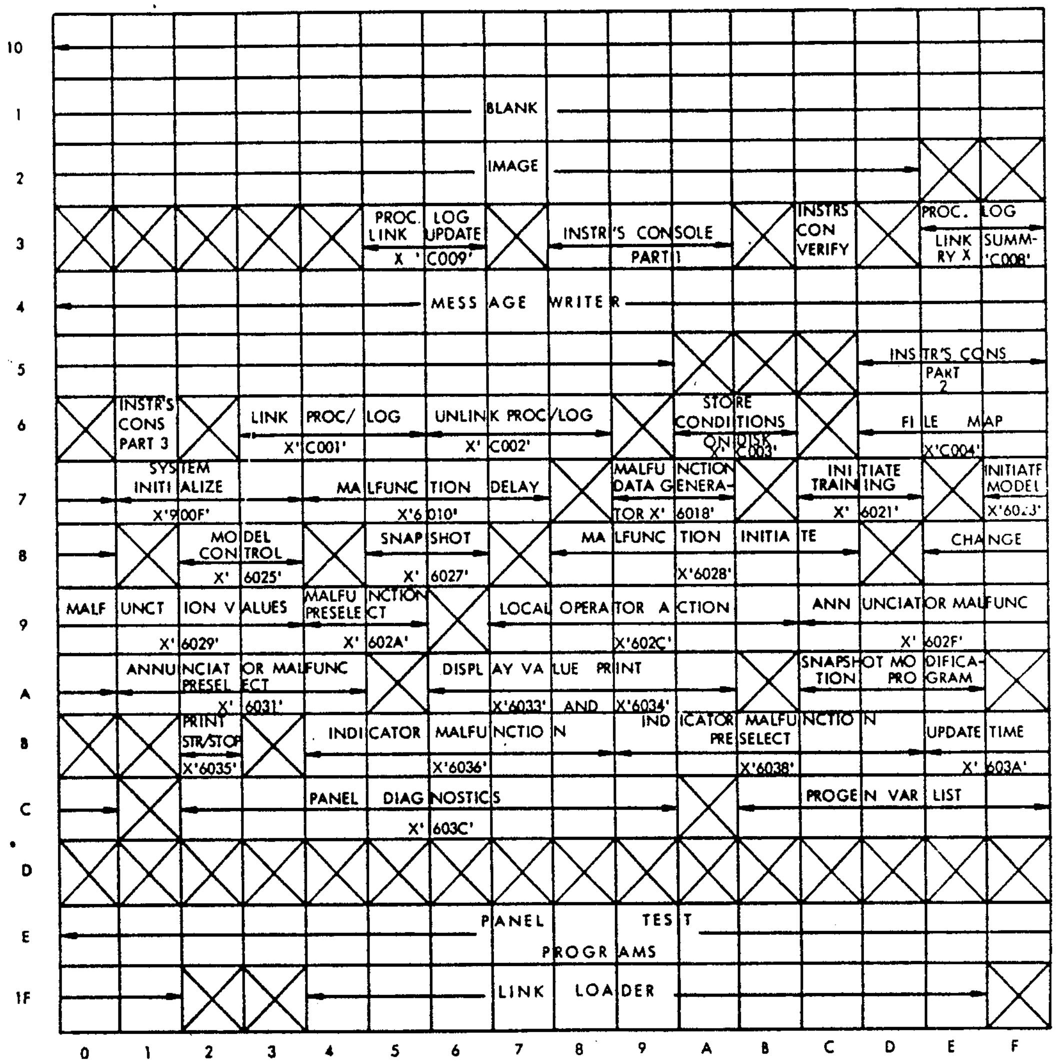
Figure 27C:
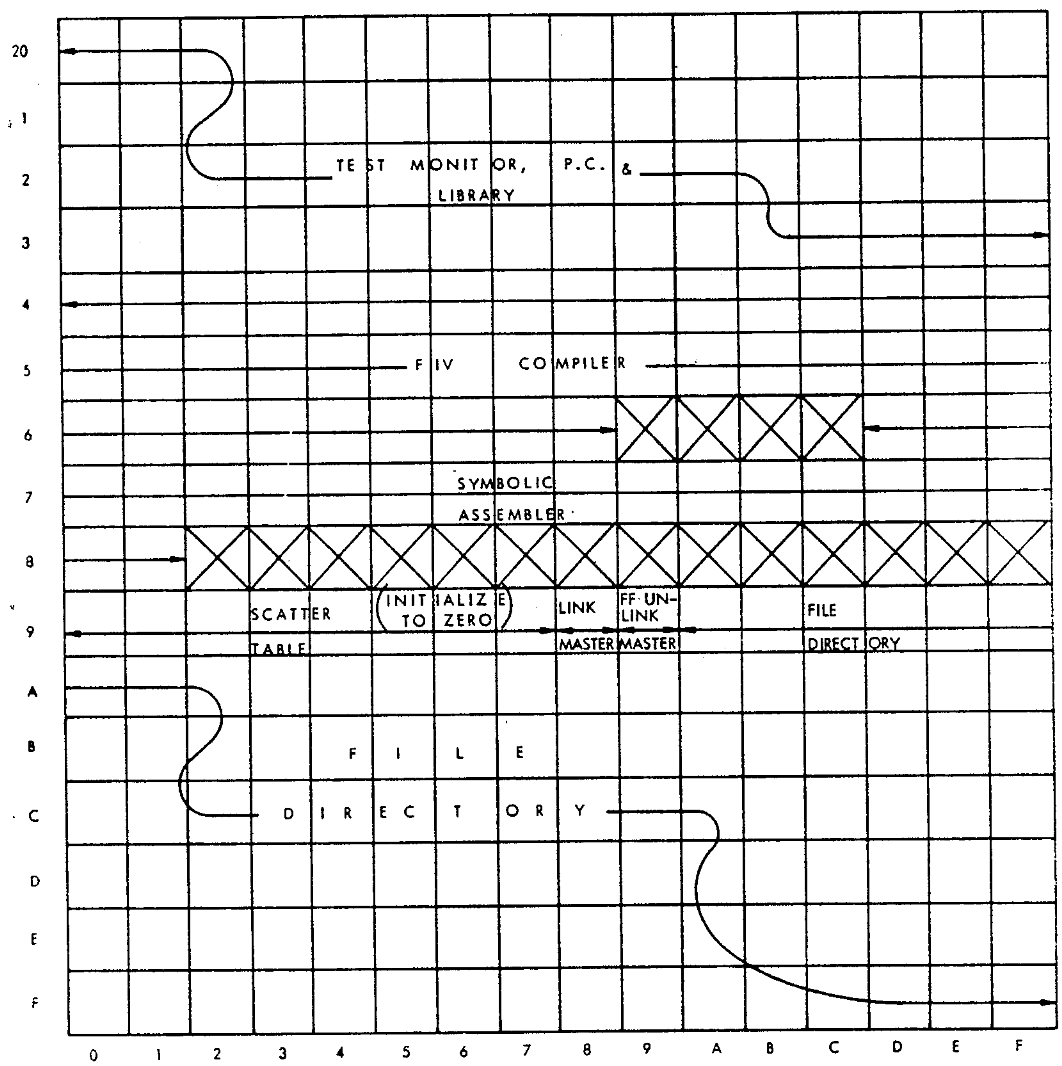
Figure 27D:
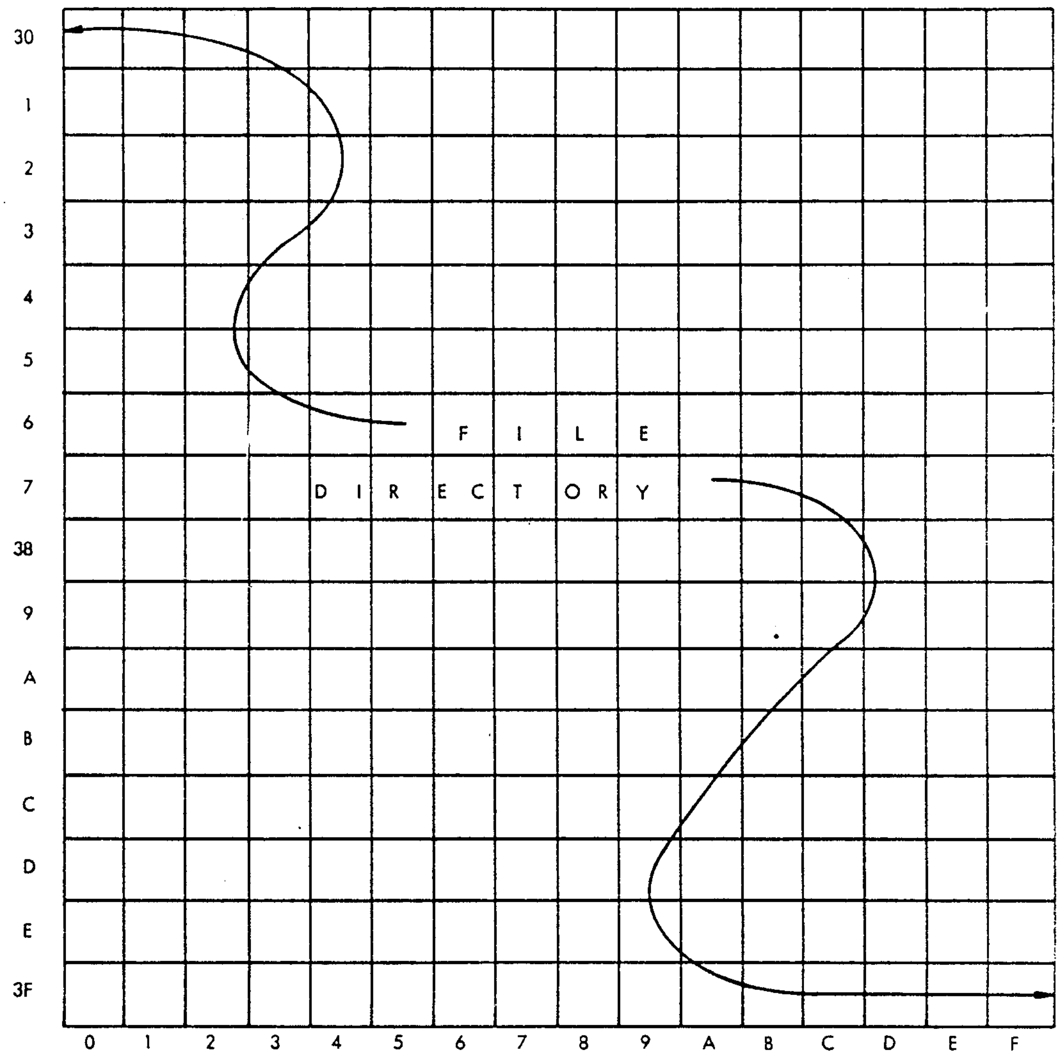
Figure 27E:
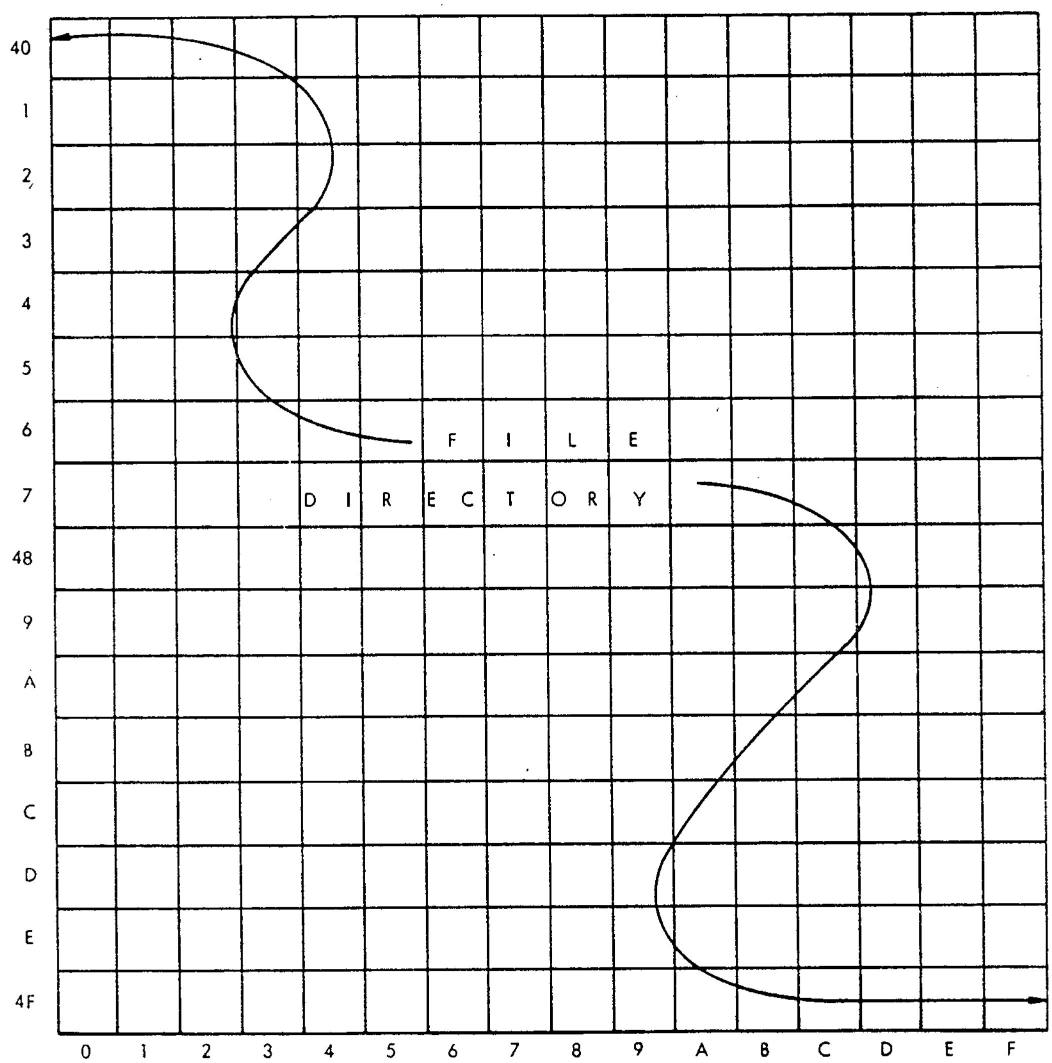
Figure 27F:
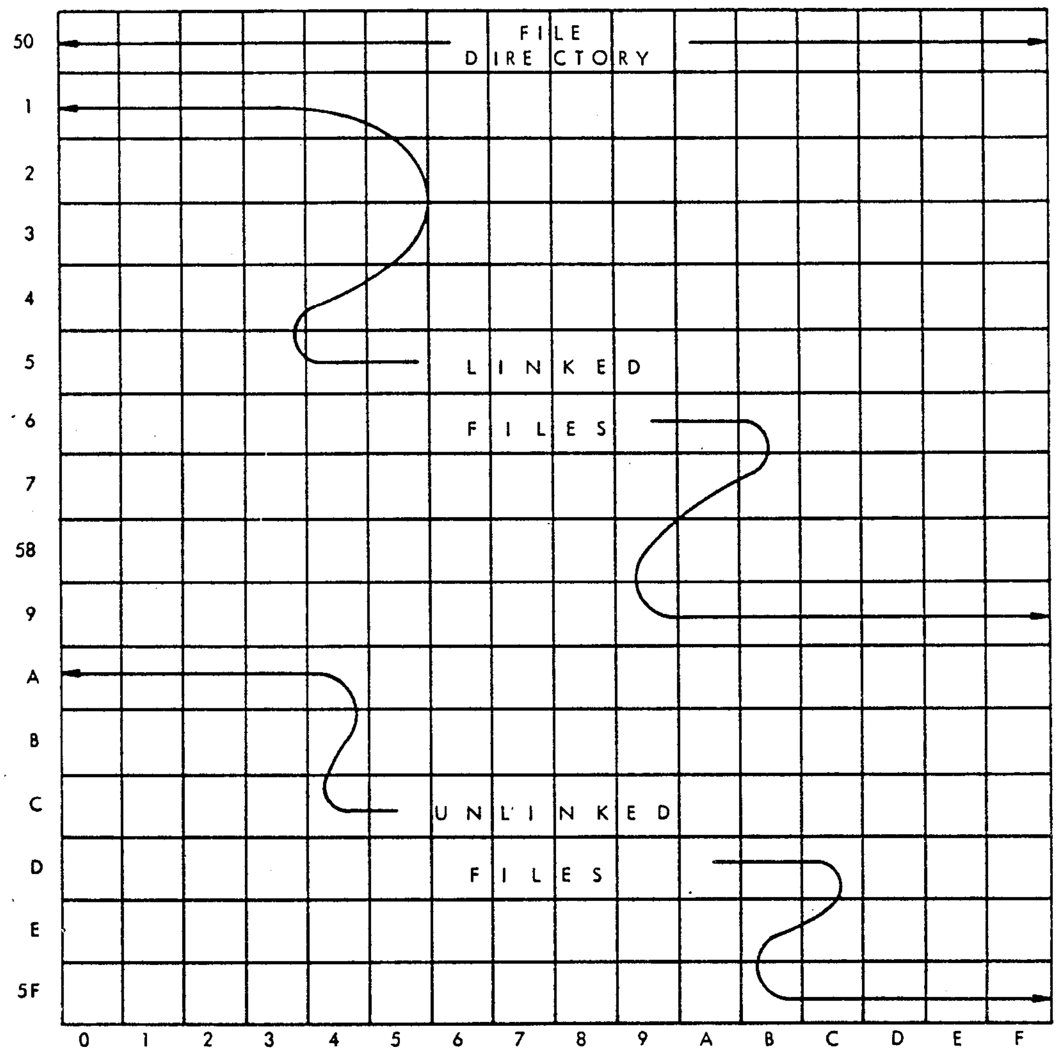
Figure 27G:
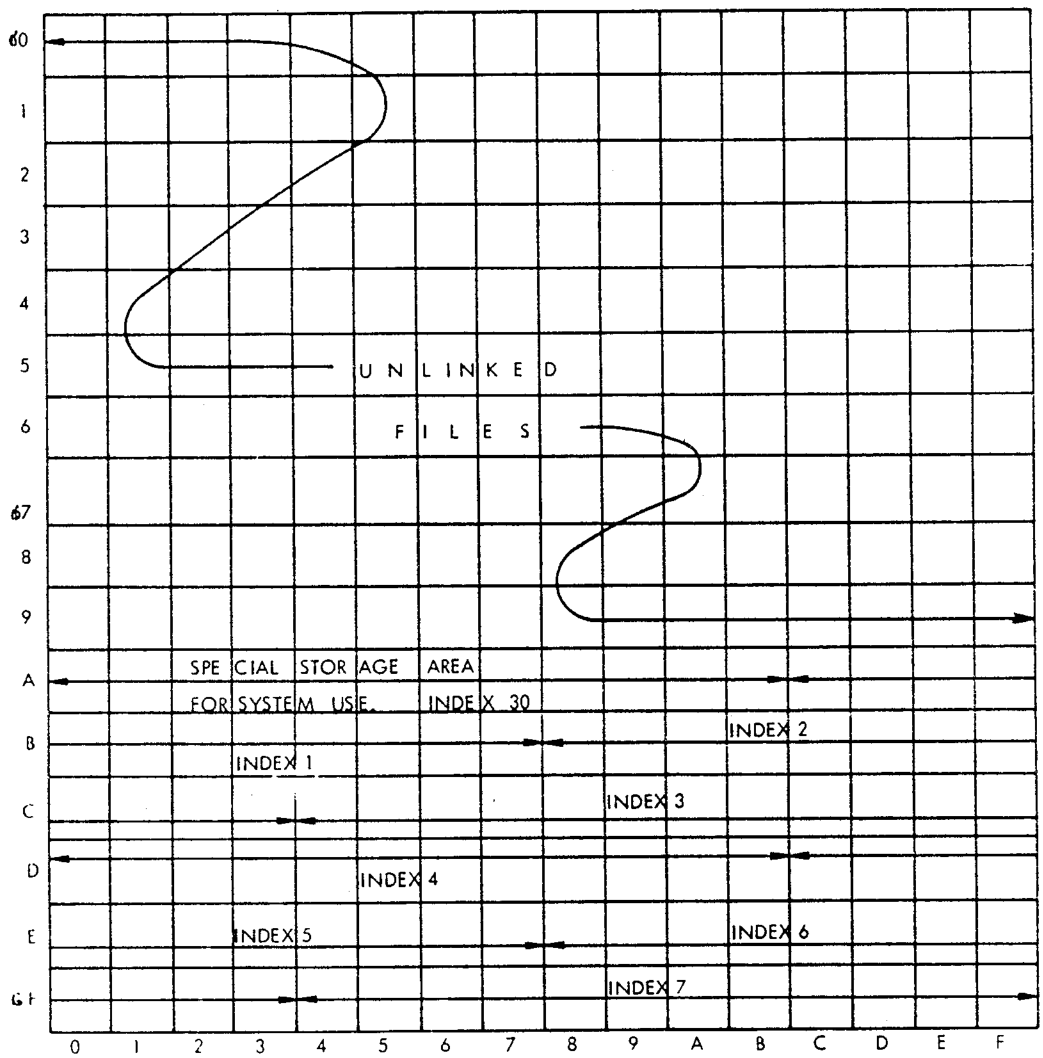
Figure 27H:
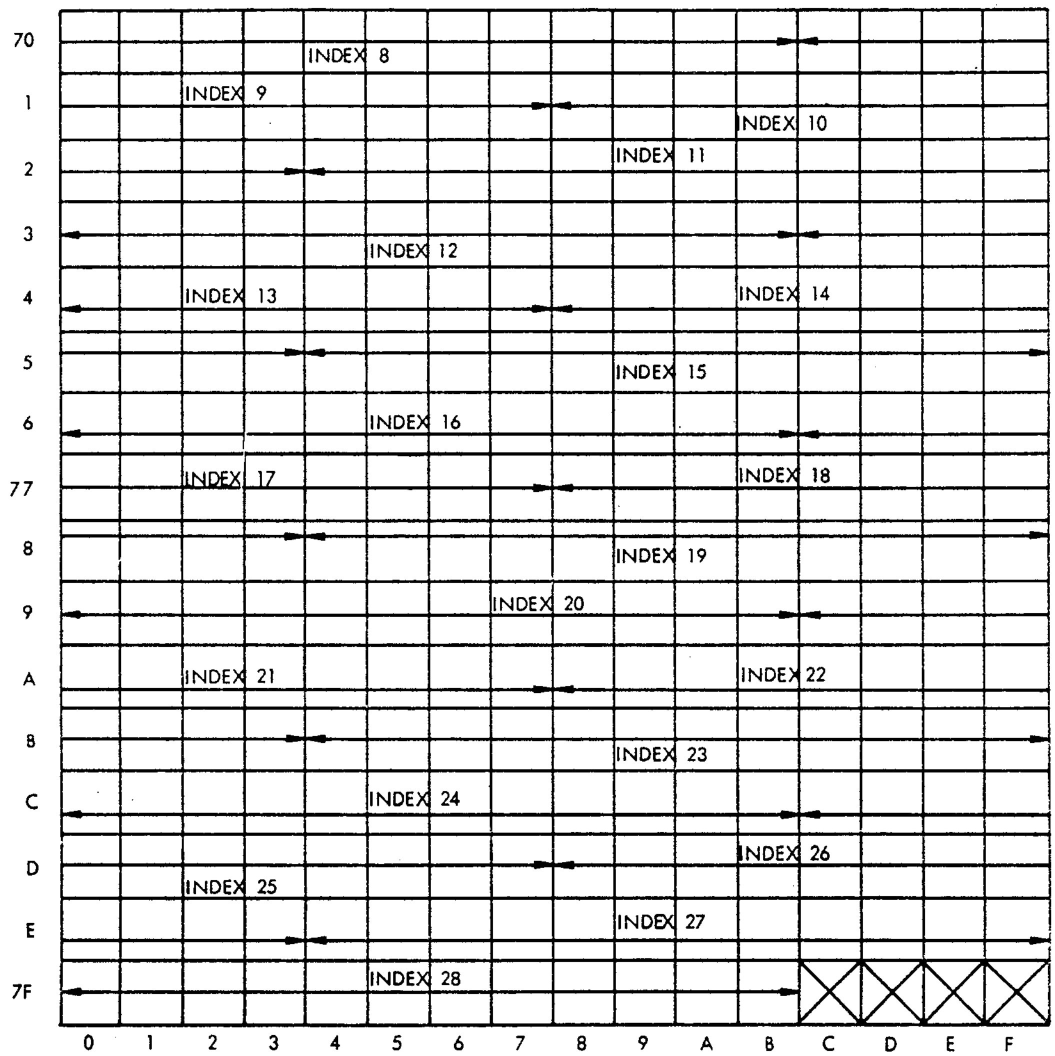

FIGS. 24A, 24B and 24C is a core map of the A machine; and FIGS. 25A, 25B and 25C is a core map of the B machine. FIGS. 26A and 26B is a disc map of the A machine; and FIGS. 27A through 27H is a disc map of the B machine.

Generally, the software hereinafter described for the A and B machines is concerned with the scheduling of the execution of programs, document input/output, process input/output, real-time features, programmer's console, mass memory input/ output, and data link input/output. Additionally, for the B machine the software includes the instructor's console interface.

The system software includes standard programs, PROGEN-70 extensions to the standard programs, and application programs which extend the basic system. The PROGEN programming concept is described generally in the Appendix beginning on Page A198 and is described in detail in copending application Ser. No. 250,826, filed on May 5, 1972 in U.S. Patent Office by J. Gomola et al and entitled "A Digital Computer Monitor And/Or Operated System or Process Which Is Structured For Operation With An Improved Automatic Programming Process and System".

The P2000 monitor which is described in detail in the aforementioned publication entitled P2000 Computer Systems Reference Manual to which reference is made for a detailed understanding thereof, is used with the optional feature of task scheduling. The task scheduling employs an error table, a task time-delay feature, a forematter suspend, and a confidence check. Further, the IOCS feature is used that includes debug checks and page eject. Also, with respect to input/output devices, a 60 CPS paper tape punch, 60 CPS paper tape reader, selectric I/O typewriter and logger, buffer line printer, and 112 CPM card reader are used. Additionally, the monitor features include the power fail request routine, the buffer overflow request routine, the 60 Hertz synchronizer request routine with a base time of 3/60 seconds, direct CI scan and subroutine, multiplex CI scan, contact output handler, analog input handler, and fixed head disc handler. The 60 Hertz synchronizer request routine is used with a base time 3/60 seconds, a task time delay countdown at 6/60 seconds, a multiplex CI scan at 15/60 seconds, time and date counters, and dead computer check.

The 60 Hertz synchronizer routine for the B machine also provides for an initiate rod counter sublevel when the preset counter becomes zero, and decrements the preset counter if greater than zero at 3/60 seconds.

Additions to the monitor at monitor generation also include the bi-directional CI scan routine which is entered upon receipt of SI to input the appropriate registers and initiate digital scan for processing. Also, a buffer overflow request routine is provided which determines if the data link input/output transfers are completed. Finally, there is system boot strap from disc, which verifies the good status of boot strap completion, causes input of all direct and bi-directional CI's; and outputs the typewriters for lower case and black color mode.

The P2000 programmer's console routine, which is also described in the previously mentioned publication entitled Prodac 2000 Computer Systems Reference Manual, is used with available basic functions, task control functions, mass memory, and PROGEN. The basic end functions include hexadecimal modify HM, hexadecimal dump HD, load binary LB, and punch binary PB. The task control function includes initiate task IT, halt task HT, and resume (able) task RT. The mass memory includes mass memory read MR, mass memory write MW, verify binary disc and core VB, load binary disc and core LB, and punch mass memory PM. The automatic programming function PROGEN includes general PROGEN GP, read file RF, write file WF, and purge or delete file PF.

A disc version of the PROGEN-70 sublevel processor is used with the time delay and limit check options.

The digital scan is used with the alarm CI, and trigger on variable change option. The trigger on variable change option includes not only the provision to initialize a sublevel when a variable changes state; but also, the ability to link one variable to another so that the target variable is set the same as the source variable whenever the source variable changes state. The digital scan normally operates only on contact inputs, but by defining the logical buffers which are input from the C machine as sequence of event interrupt buffers, these data link buffers are processed in the same manner as panel contact inputs or CI's.

The digital scan package is modified in the SET1 and SET0 routines, which are used to set a variable true or false. One modification permits the setting of the panel contact inputs or CI's, which is useful for debugging. Another modification prohibits the actual contact output or CO to an annunciator which is malfunctioned. Thus, a table of up to 16 relative addresses of annunciators which can malfunction according to the present embodiment of the invention, is examined by the SET1/0 routine when the variable to be set is a CO, and an annunciator malfunction is in effect. Bit 15 of this table is zero if the annunciator is malfunctioned. If the current variable address matches the malfunction table entry, no CO is performed.

The PROGEN control chain interpreter and certain standard algorithms are used. In addition thereto other algorithms according to the present embodiment of the invention are utilized as set forth herein.

Figure 28A:
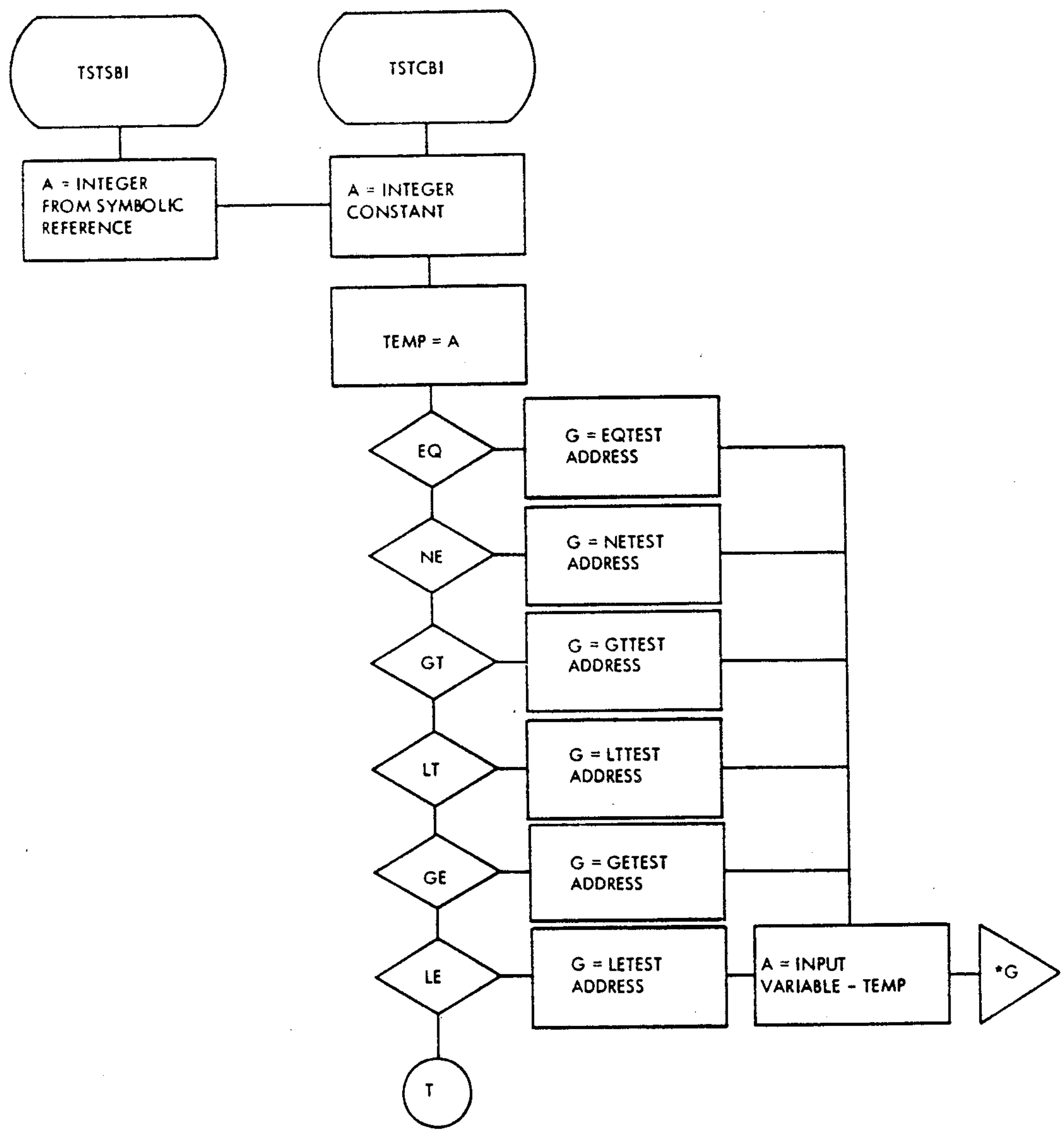
FIGS. 28A and 28B illustrate the flow charts for the integer and branch algorithms TFTCBI and TFTSBI for the A and B machines.
Figure 28B:
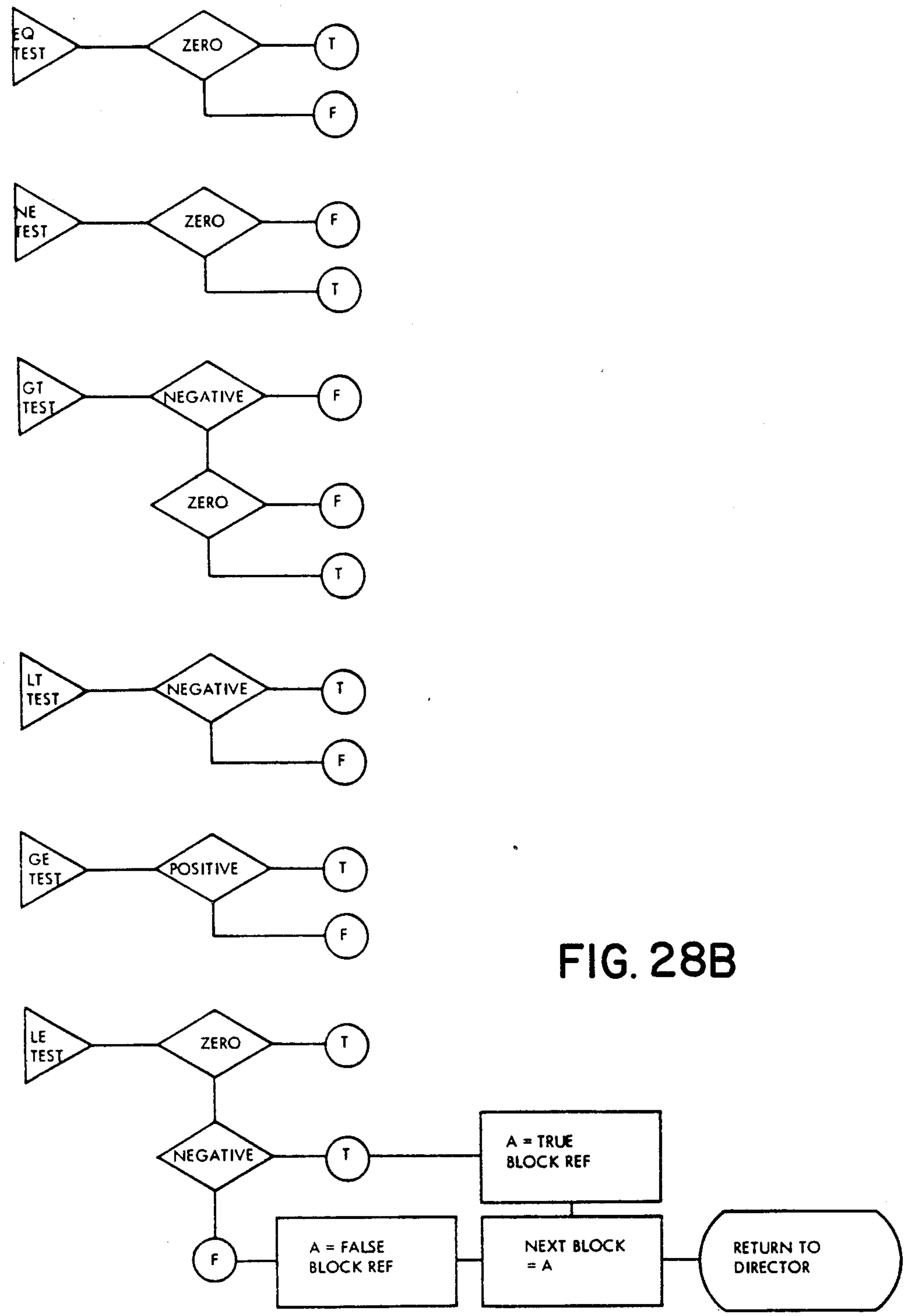

Referring to the flow chart FIGS. 28A and 28B for the A and B machines, the test with integer and branch algorithm TSTCBI and TSTSBI compared two integers and branches, depending on the true/halt results of the comparison. The input to these algorithms include the absolute address of the input integer variable, the pneumonic comparison code, EQ, NE GT, LT, GE, and LE; the true branch block number, and address relative to the chain beginning; the fault branch block number, an address relative to the chain beginning; and an integer constant, if TSTCBI, or absolute address of an integer variable, if TSTSBI. The subroutines TSTSBI and TSTCBI set the integer constant and enter a common routine to store the constant. The routine then converts the pneumonic code to an action index. The integer constant is subtracted from the input integer variable. The action index is used to transfer to an appropriate designator check. The conditions for a true branch are: equal EQ is true if the zero designator is set; not equal NE is true, if the zero designator is not set; greater than GT is true if negative or zero designator is not set; less than LT is true if the negative designator is set; greater than or equal GE is true if the positive designator is set; less than or equal LE is true if the negative or zero designator is set.

Figure 29:
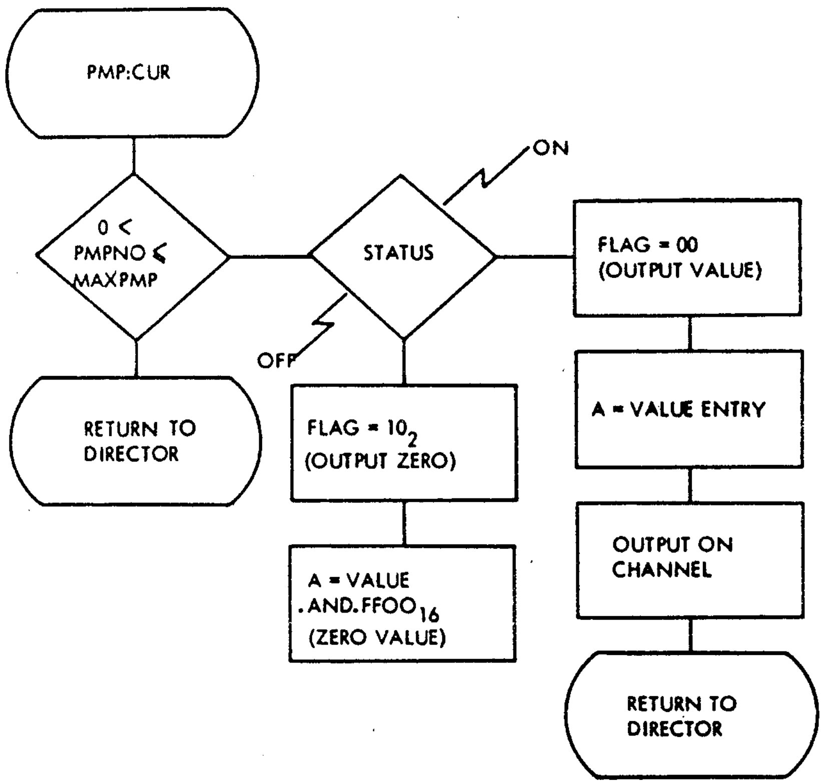
FIG. 29 illustrates the flow chart for the pump current algorithm PMP:CUR for the A and B machines.

Referring to the flow chart in FIG. 29 for the A and B machine, the pump current algorithm PMP:CUR provides for an immediate change in meter displayed current in response to turning a simulated plant pump on or off by operation of the associated lever on the control console for example. The input to the algorithm PMP:CUR is the relative address of the status logical defining on or off (true or false); and the pump number, which is an integer in the range 1 minus the maximum pump number. This algorithm verifies that the pump number is valid using the maximum pump number contained in location $\mathbf{93}_{16}$ of memory. The algorithm exits immediately if the pump number is invalid. The algorithm PMP:CUR modifies flag bits used by the analog output handler, hereinafter described, for normal analog output scan. When the status is true, the algorithm sets the flag bits in the analog output channel table corresponding to the pump so that the current value is output as it is received from the C machine pump handler; and the current value is also output to the appropriate meter on the control panel. Thus, when a pump is turned on, the current value immediately rises from zero to its calculated position. When the status is false, the algorithm sets the flag bits in the analog output channel corresponding to the pump, such that zero will be output to the meter, regardless of the current value calculated by the C machine pump handler routine. Thus, the current immediately becomes zero when a pump is turned off.

Figure 30:
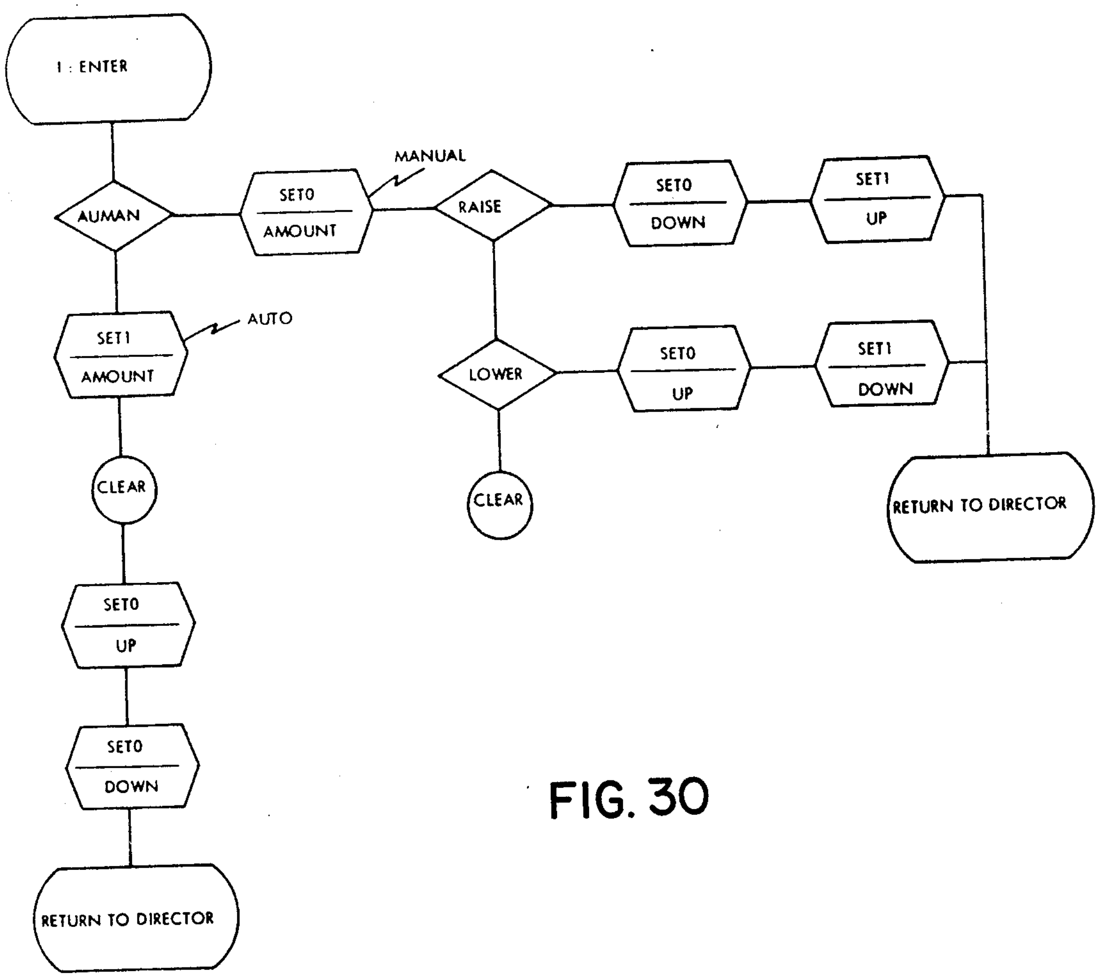
FIG. 30 illustrates the controller logic algorithm I:ENTER for the A and B machines.

Referring to the flow chart of FIG. 30 for the A and B machines, the controller logic algorithm I:ENTER generate controller logical variables for plant control systems controllers which are simulated in the C machine in response to either the manual or automatic operation of the controller. The inputs to this algorithm are the relative address of the input variables "raise" and "lower"; the relative addresses of the output variables "up" and "down" for the C machine; the relative address of the input variable auto/manual (true equals manual, false equals automatic); and the relative address of the output variable auto/manual for the C machine (true equals automatic, false equals manual). The algorithm I:ENTER first sets the output variable to the C machine for auto/manual to indicate the same state as the input auto/manual variable. Then, if the controller is in its automatic position, or if the controller is in its manual position, and both the "raise" and "lower" variables are false, the "up" and "down" variables for the C machine are set false. When the controller is in manual, and the "raise" variable is true, the C machine logical for "up" is set true, and the logical for "down" is set false. Also, when the controller is in manual and the variable "lower" is true, the C machine logical for "down" is set true, and the logical for "up" is set false.

Figure 31:
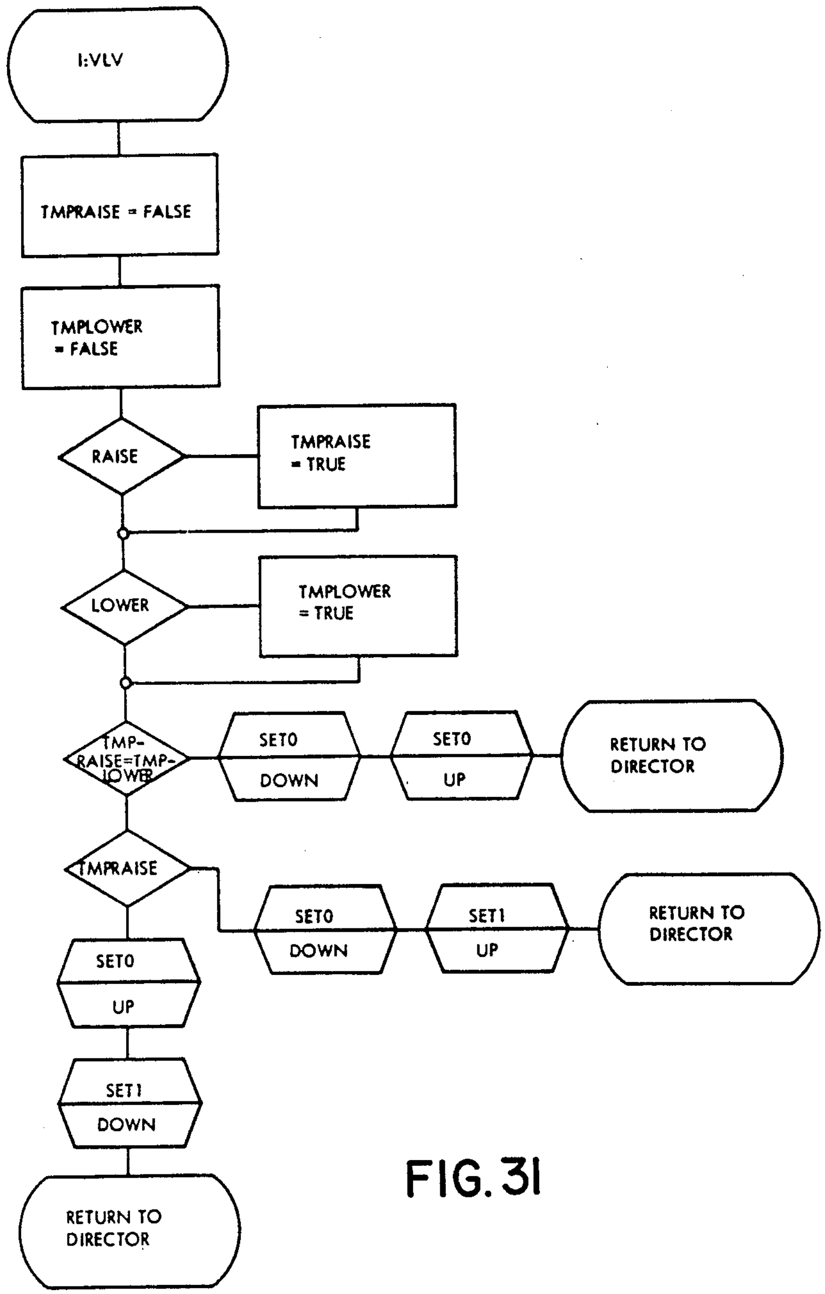
FIG. 31 illustrates the valve logical variable transformation algorithm I:VLV for the A and B machines.

Referring to the flow chart of FIG. 31 for the A and B machines, the valve logical variable transformation algorithm I:VLV generates variables in response to the operation of an associated air-operated valve switch on the control panel, for example, for the C machine program VCHAND which handles the simulation of valves in the nuclear plant. The inputs to this algorithm include the relative address of the input variables "raise" and "lower"; and the relative address of the output variables "up" and "down" for the C machine. If the input variables "raise" and "lower" are both true or both false, the "up" and "down" variables for the C machine are both set false. If the "raise" and "lower" variables are not set to the same state, the "up" is set the same as the "raise" variable, and the "down" variable is set the same as the "lower" variable.

Figure 32:
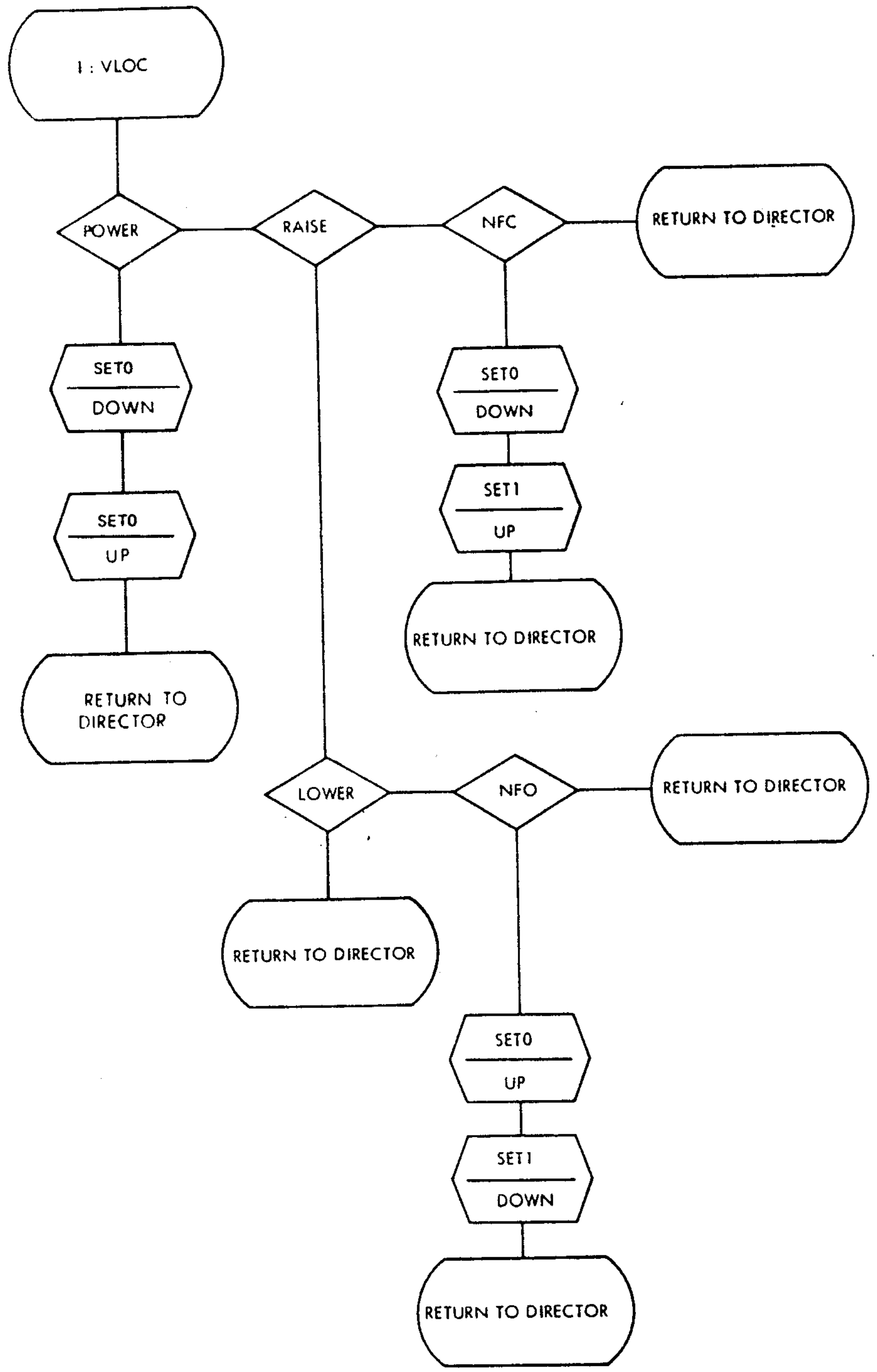
FIG. 32 illustrates the flow chart for the valve open-close algorithm I:VLOC for the A and B machines.

Referring to the flow chart of FIG. 32 for the A and B machines, the valve open-close algorithm I:VLOC also generates variables for the C machine valve handler VCHAND in response to the operation of switches associated with motor-operated valves, for example. The inputs to this algorithm include the relative address of the power variable, the input variable "raise" and the input variable "lower". The inputs also include the relative address of the not-fully-open NFO variable, and the not-fully-closed NFC variable. Finally, the inputs include the relative address of the output variable "up" and "down" for the C machine. If the variable "power" is false, or if both "raise" and "lower" are false, the algorithm I:VLOC exits without modifying the output variables. If the input variable "raise" is true, but NFC is also true, no output variables are changed. When the input variable "raise" is true and NFC is false, the output variable "up" is set true and the output variable "down" is set false. If the input variable "lower" is true, but NFO is also true, no output variables are changed. If the input variable "lower" is true and NFO is false, the output variable "down" is set true and the output variable "up" is set false.

Figure 33A:
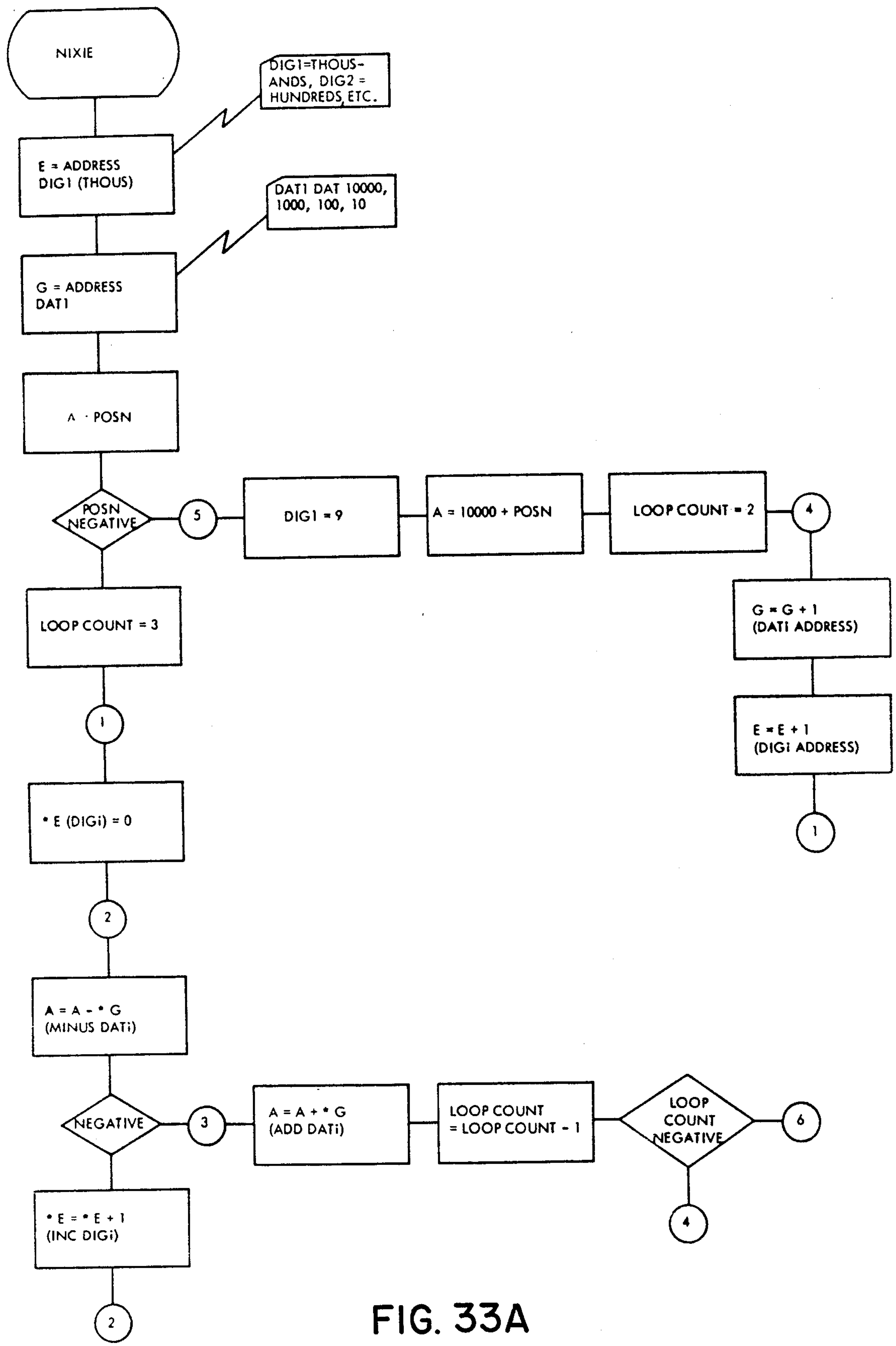
FIGS. 33A and 33B illustrate the flow charts for the nixie display algorithm NIXIE.
Figure 33B:
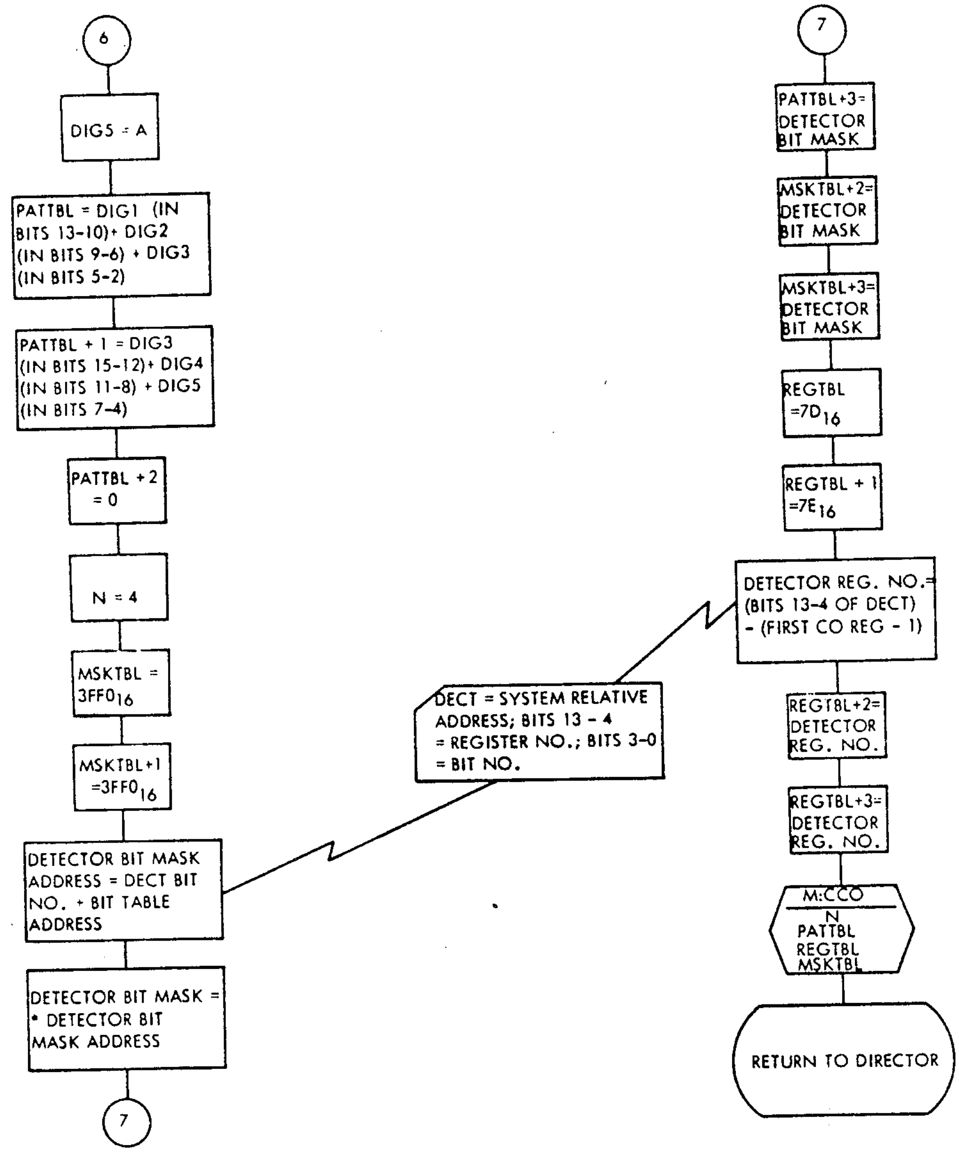

Referring to the flow chart of FIGS. 33A and 33B the display algorithm NIXIE, which formats and outputs the position of the simulated flux map detectors to inform the operator of the shape of the nuclear flux in the simulated reactor core, is only provided on the B machine. The input to this algorithm is the absolute address of the detector position, POSN, as an integer; and the relative address of the CO strobe for the particular detector DETC. The detector position POSN is an integer number expressing tenth of inches. WHen $0 \leqq POSN < 32767$, the position range is $0.0 \leqq position \leqq 3276.7$. When POSN is negative, $100000 + POSN$ is used to define the position. For example, if POSN is $FFFE_{16}(-2)$, the position is $10000.0 + (-0.2)$ or 9999.8.

Referring to FIG. 34, the algorithm NIXIE converts the detector position to five decimal digits, using repeated subtractions of 10000, 1000, 100, and 10 for the thousands, hundreds, tens, and units digits respectively. The remainder of the subtraction operation is the tenths digit. The digits are then packed together for the actual output. The stroke for the specified detector A, B, C, D, E, or F is given by the relative address DECT. This address is unpacked to form a CO register number, which is the system register number minus the first CO register number plus 1, and a CO bit mask. A CO executive call is constructed and executed so that the position digits are output; then, the selected detector is strobed and reset.

Figure 35:
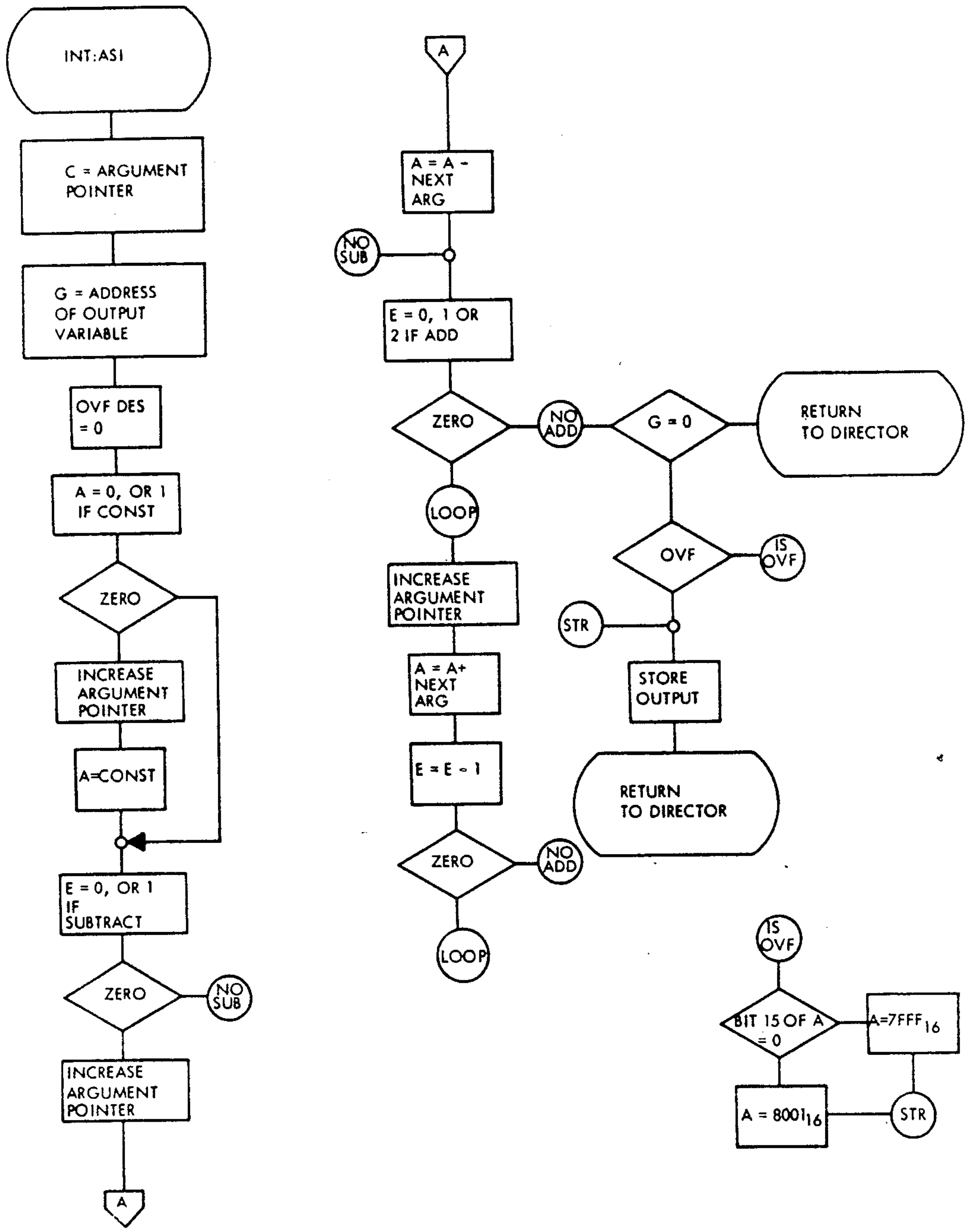
FIG. 35 illustrates the integer arithmetic algorithm INT:ASI for the A and B machine.

Referring to the flow chart of FIG. 35 for the A and B machines, the integer arithmetic algorithm INT:ASI performs integer arithmetic. The inputs to this algorithm are the absolute address for the output storage; an integer 0 or 1, 0, no constant is present and the next input is item 4, or 1, if a constant is present as the next input; an integer constant an integer 0 or 1, no subtraction is to be performed and the next input item is item 6 if the integer is 0, and subtraction is to be done and the address of the variable to subtract is present as the next input if the integer is one; the absolute address of an integer variable to subtract; and an integer 0, 1, or 2, if the integer is 0, no additon is to be done and no further input is present, if the integer is 1 or 2, addition is to be done and the address or addresses of the variables to add follow this word; and the absolute address of an integer variable to add. The algorithm INT:ASI initially clears the overflow designator. Then the output is calculated as an integer constant, or 0 if none, minus the subtract variable, if any, plus one or two add variables, or none, as the case may be. If overflow occurs, the output result is set to $7FF_{16}$ for positive overflow or to $8001_{16}$ for negative overflow. No storage is performed if the output variable is undefined.

The message writer is in the PROGEN type. Two types of messages are output via the message writer on this subsystem, analog input scan alarms and digital scan CI alarms. All analog scan alarms are output in red. Digital scan CI alarms are output in red when a CI is 1, and output in black when a CI is 0.

Figure 36:
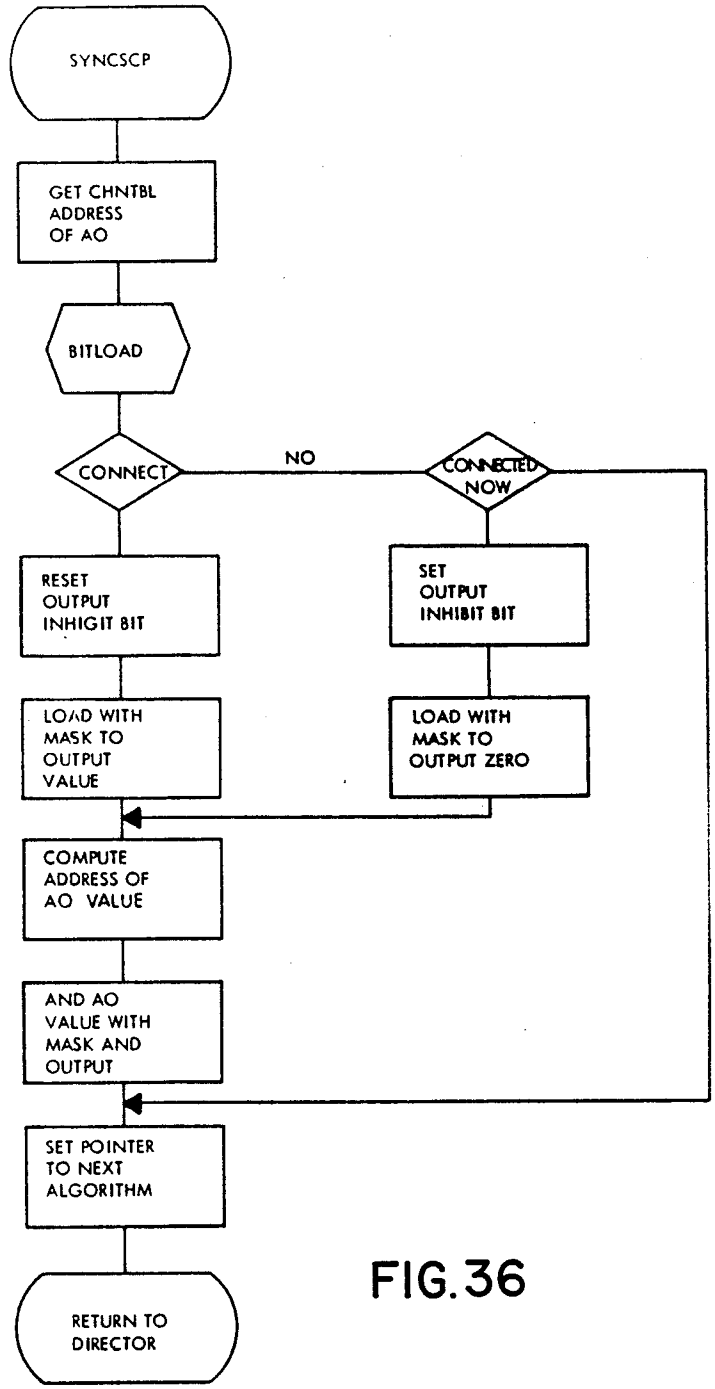
FIG. 36 illustrates the flow chart for the synchroscope algorithm SYNC:SCP for the B machine.

Referring to FIG. 36, the synchroscope algorithm SYNC:SCP is provided on only the B machine. This algorithm provides the ability to connect or disconnect any one of several analog outputs from one of the computers to a synchroscope, or other meter, based on the status of a logical variable. The input to this algorithm is the relative address of the logical defining the operation to be performed, either connect or disconnect (true or false respectively); and the index to the position of the analog output in the analog output table in the range 1 minus total number of analog outputs. The algorithm SYNC:SCP computes the channel table address of the analog output to be operated on, and then determines the type of operation requested by interrogating the logical variable. When the logical is false, indicating that a disconnect is requested, the algorithm SYNC:SCP determines that this analog output was previously connected by checking the inhibit output bits for this output contained in the channel table. If the output was already disconnected, the algorithm exits; if it is connected, the inhibit bit in the channel table is set and zero is output to the synchroscope. When the logical is true, indicating that a connect is requested, the algorithm resets the inhibit output bits for this analog output, and outputs the present value to the synchroscope. In order to make use of the synchroscope algorithm, all analog outputs which drive the synchroscopes must have their inhibit output bit set in their channel table entry.

The PROGEN auxiliary synchronizer program is used to periodically bid sublevels, bid sublevels after time delays, count down logical time delays, and call the sublevel processor time delay countdown routine. The options selected in the auxiliary synchronizer program in the present embodiment are the logical time delay disc version, sublevel processor time delay, bid sublevel after time delay, and periodic bid sublevel. The size of the periodic bid buffer is 400 words. The size of the sublevel time delay countdown buffer is 100 words.

The PROGEN-70 data center is employed. Task level 9 is used for the "initialize from conditions on disc sublevel", and it must accordingly be outside the data center area. The PROGEN file access and enter is used with the selected options.

The system library routines which are selected from the Fortran IV library utilized to be core-resident are documented in the Fortran IV Library Reference Manual for P2000 computer system, to which reference is made for a more detailed description thereof.

Figure 37A:
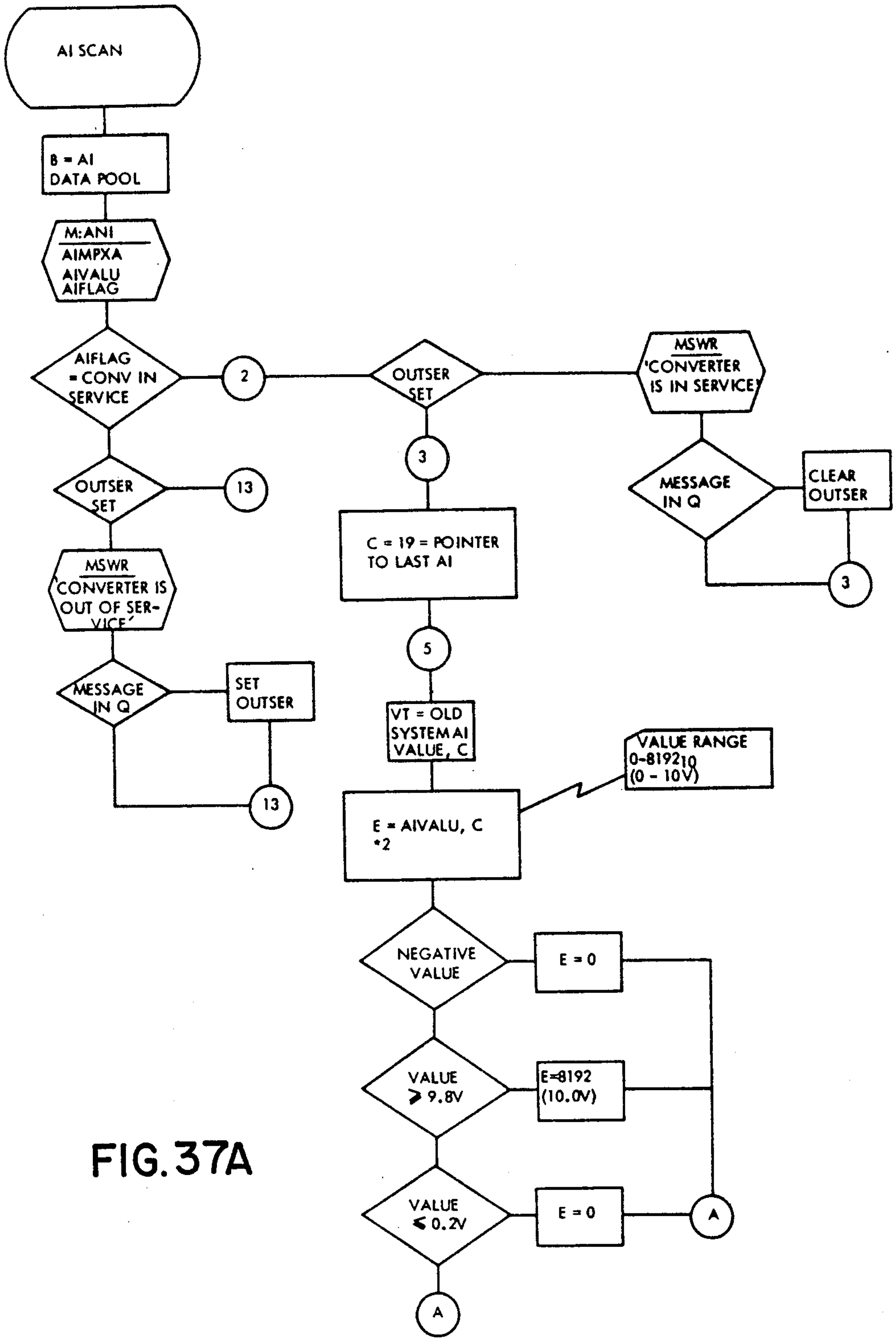
FIGS. 37A, 37B and 37C illustrate the flow charts for the analog input scan program AISCAN for the A machine.
Figure 37B:
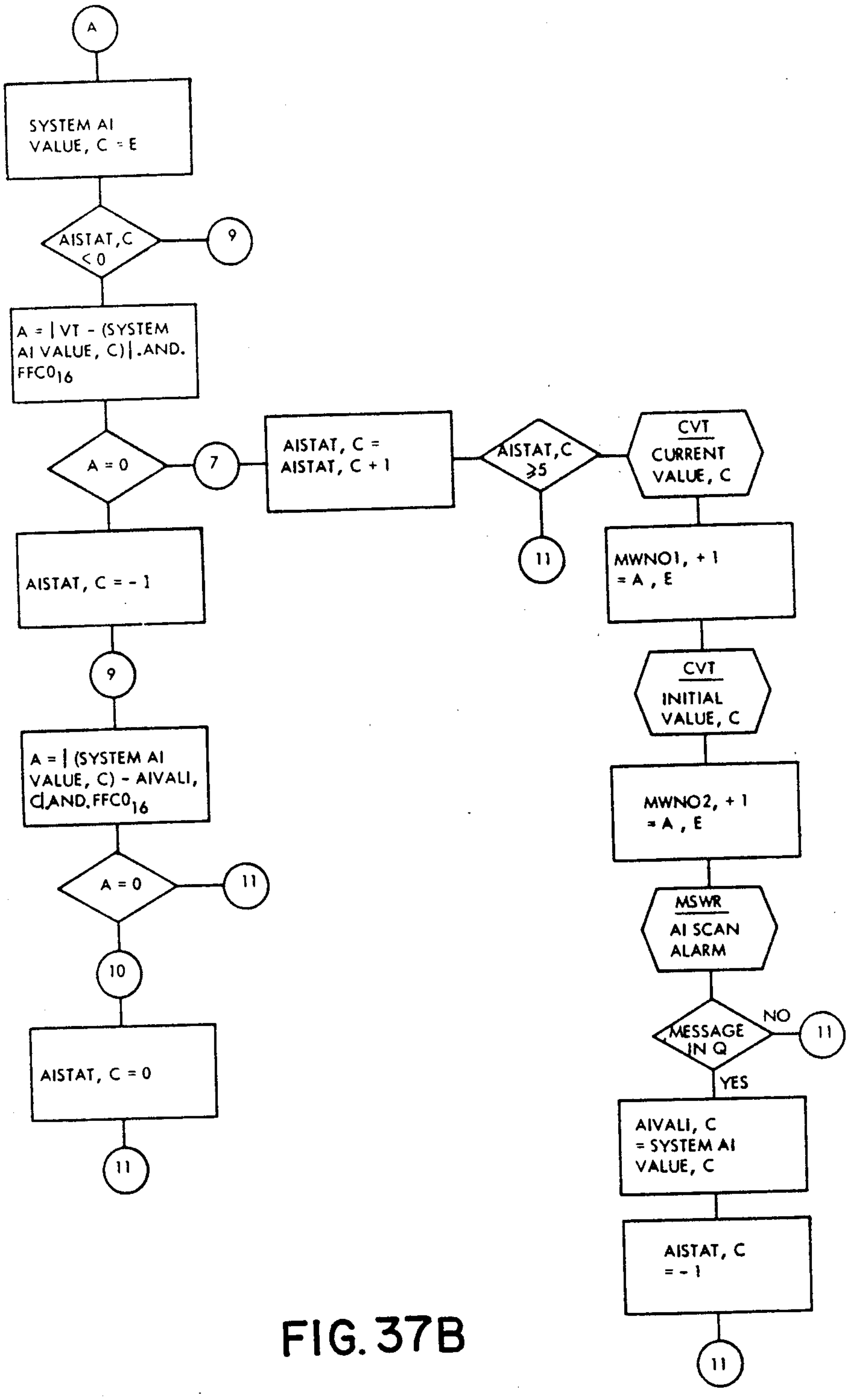
Figure 37C:
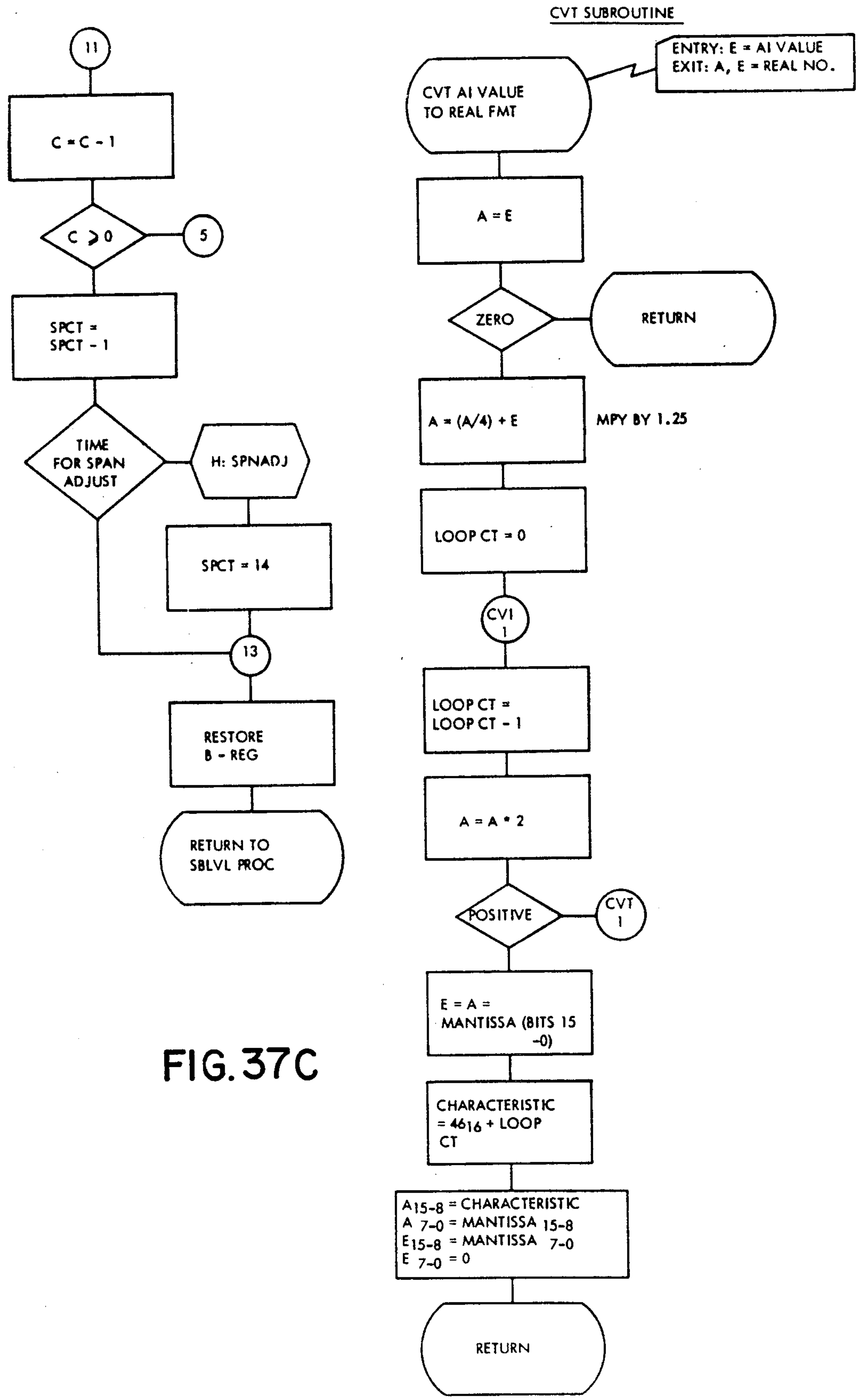
Figure 38A:
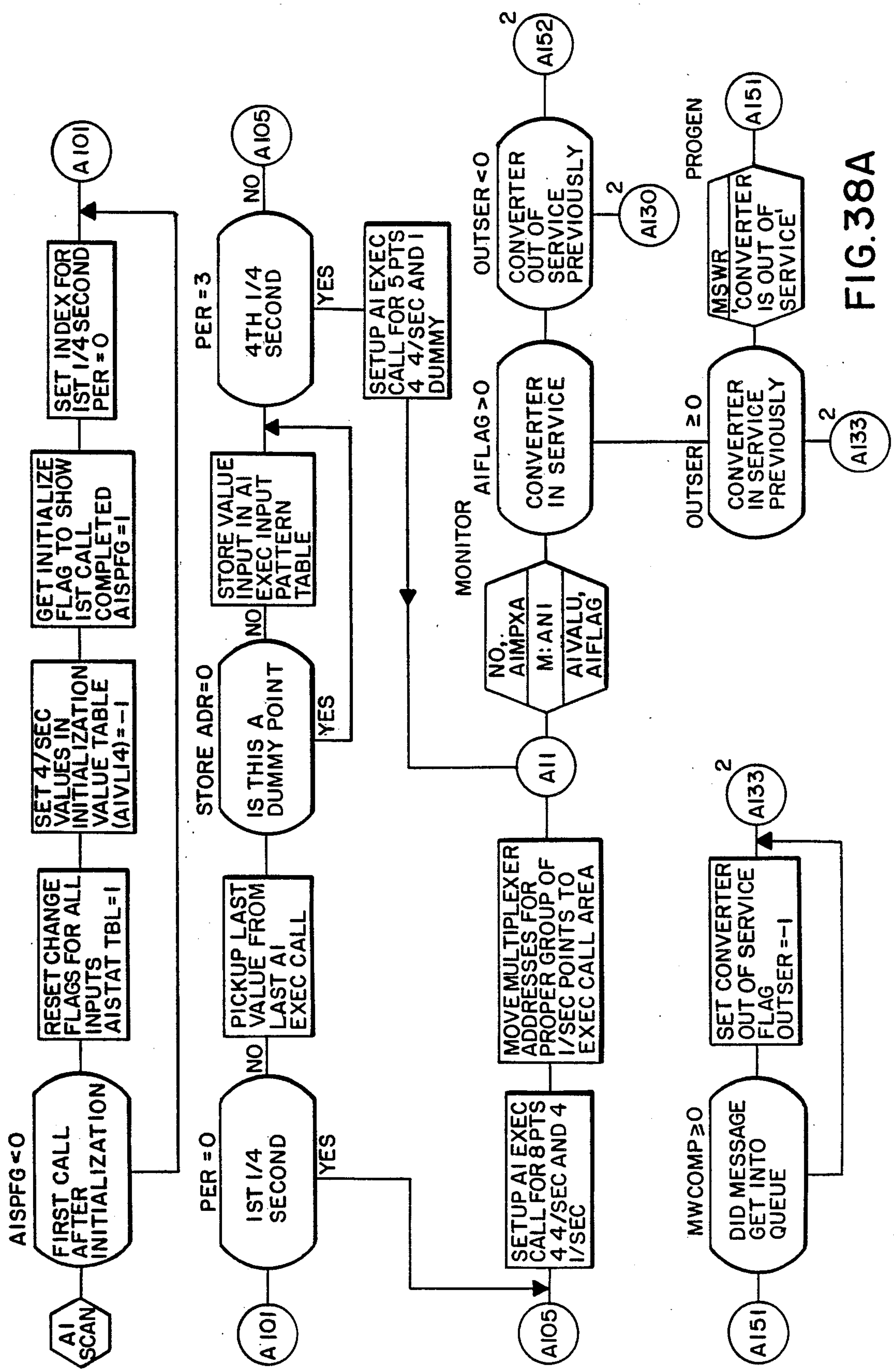
FIGS. 38A, 38B, 38C, 38D 38E and 38F illustrate the flow charts for the analog input scan program for the B machine.
Figure 38B:
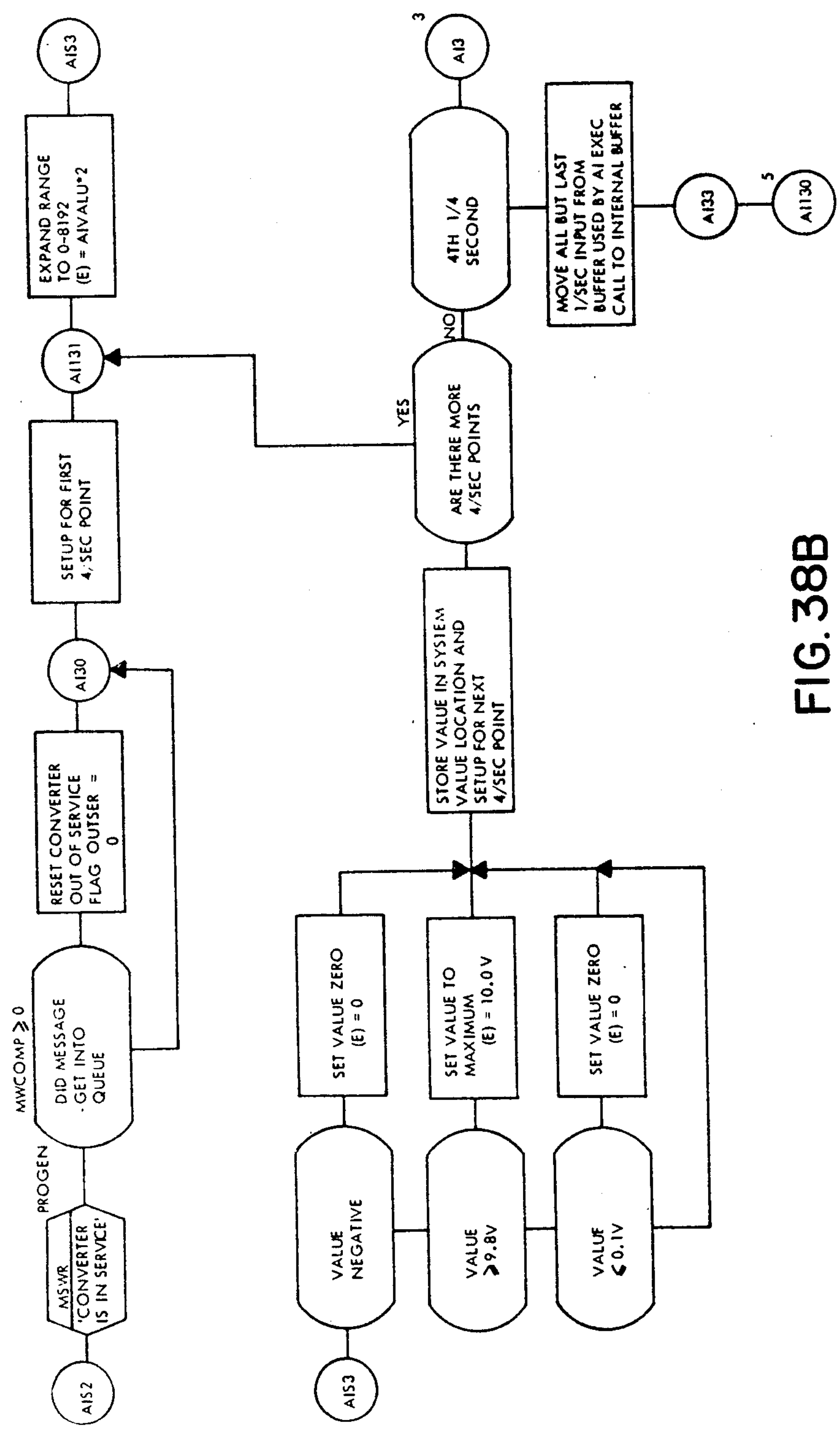
Figure 38C:
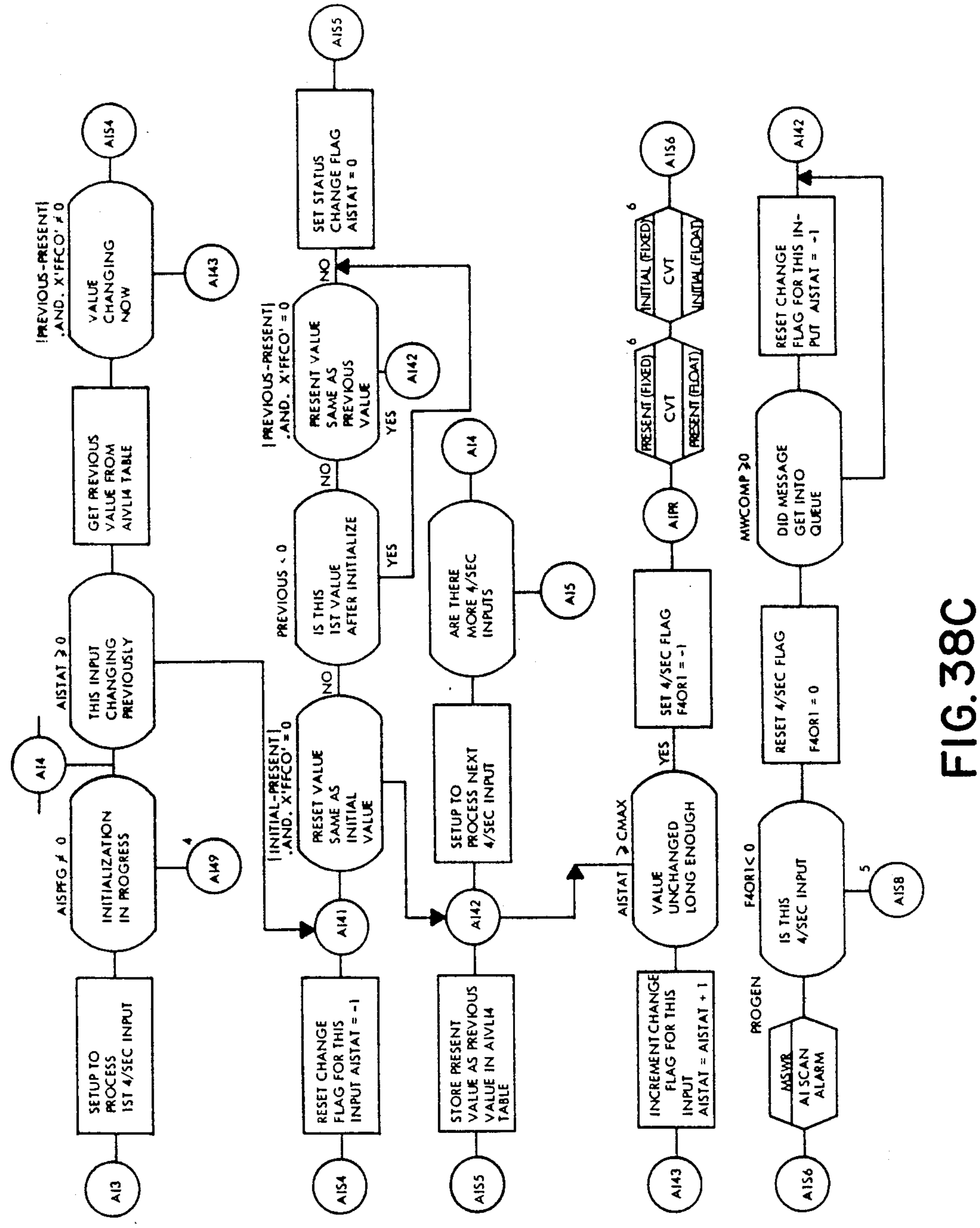
Figure 38D:
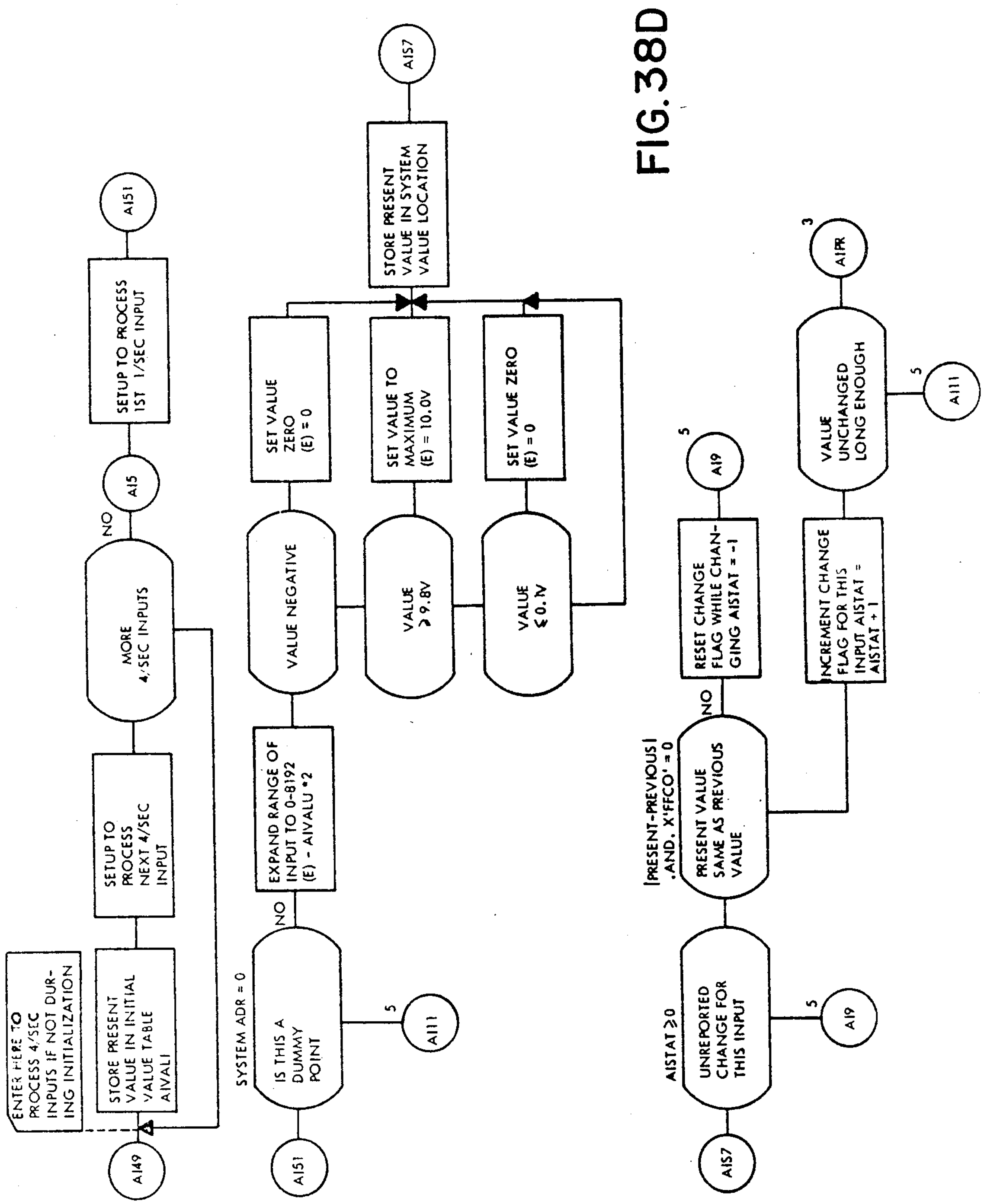
Figure 38E:
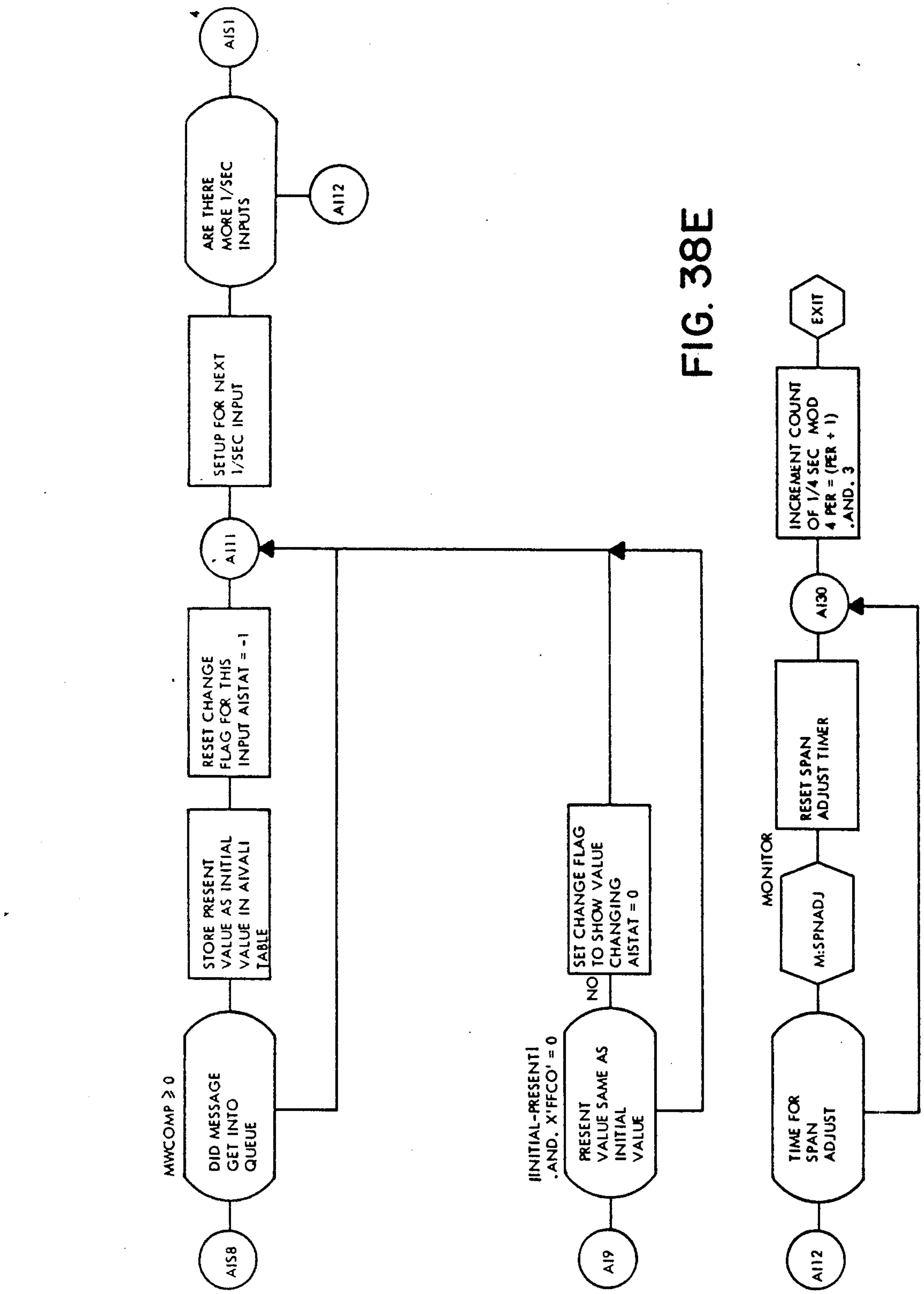
Figure 38F:
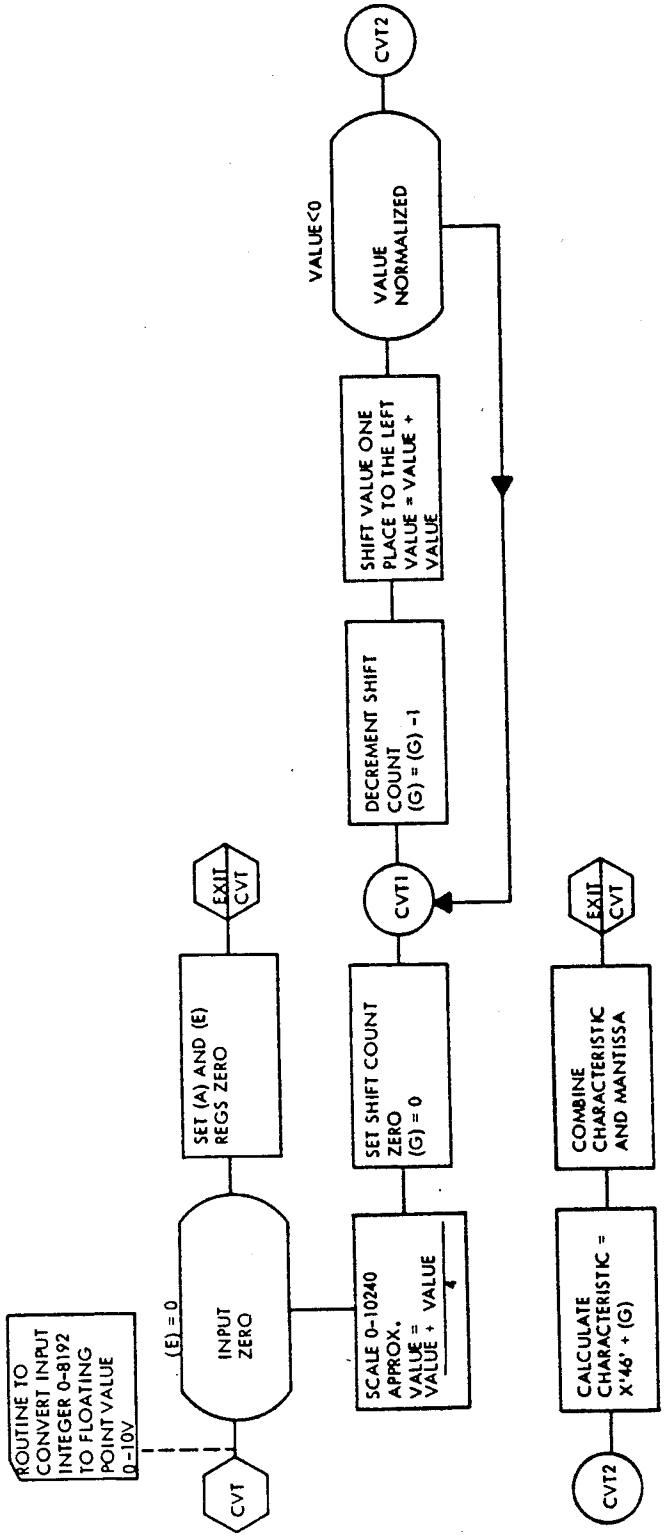

Referring to the flow chart of FIGS. 37A, 37B and 37C, the analog input scan program AISCAN for the A machine calls the AI executive once every second to input to the computer the 20 system AI points, scales the input values so they lie in the range $0\text{–}8192_{10}$ (0–10.0 volts), stores the values in system location, and generates an analog input scan alarm message if a point value changes above a certain deadband and the value remains changed and stable for 5 seconds.

Referring to FIGS. 38A through 38F, the analog input scan program for the B machine calls the AI executive every one quarter second to input to the computer the four system AI points which must be sampled four times a second, scales them so they lie in the range 0–8192 (0-10.0 volts), and stores them in system location. During three of these four one quarter second execution, the AI executive is called to request four of the twelve system AI points which must be sampled once per second, in addition to the four per second points. The once per second variables are stored in a table within the analog input scan, and during the fourth one quarter second execution, when no once per second points are input, all the values in the table are scaled to lie in the range 0-8192 (0–10.0 volts) and are stored in system locations. The analog input scan program also generates an analog input scan alarm message for a four per second point if, and only if all of the following are true: a system initialization is in progress, and the present value differs from the initial value by more than the deadband, the present value differs from the last value printed by an amount greater than the deadband, no value has been printed since the start of the system initialization, and the present value has been stable for 5 seconds. It also generates an analog input scan alarm message if a once per second value changes above a certain deadband and the value remains changed and stable for 5 seconds. It inhibits the updating of the system locations for the four per second inputs while the initialization flag is set.

Figure 39:
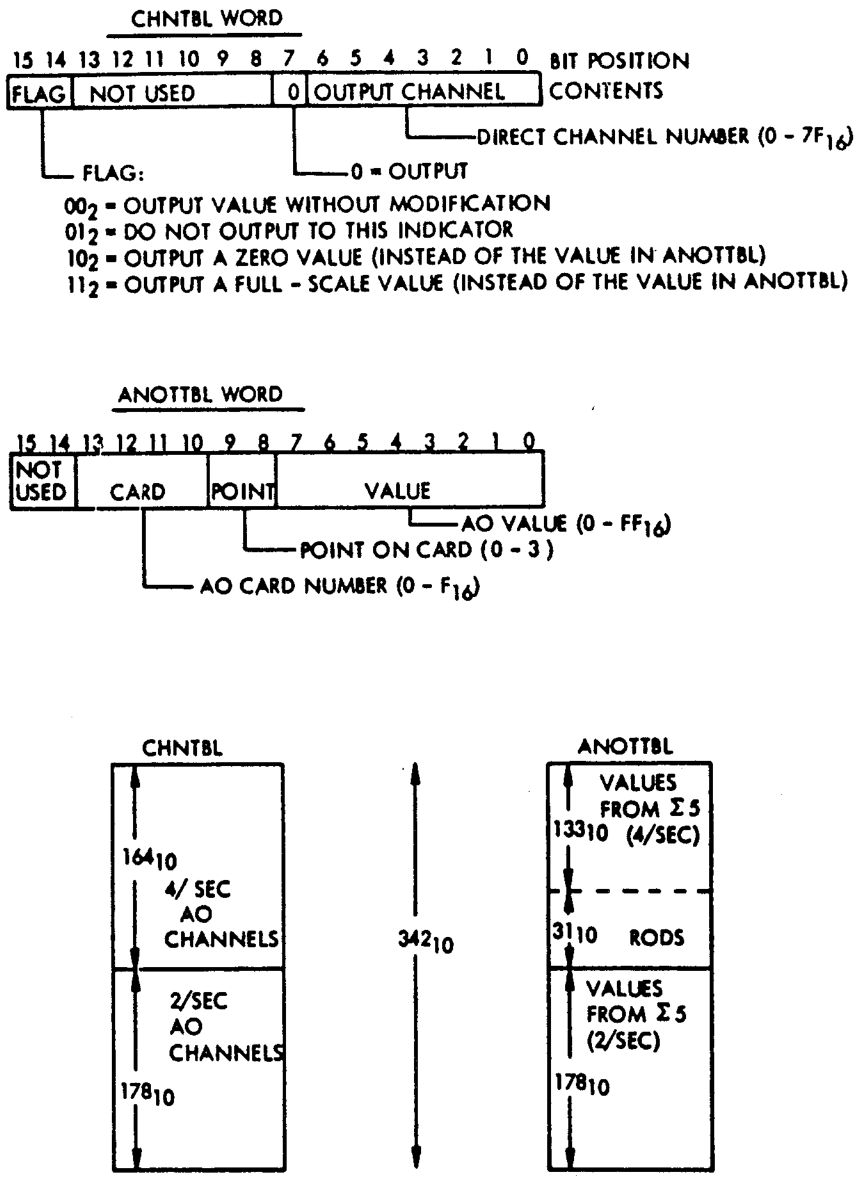
FIG. 39 illustrates the analog output table structure for the A machine.
Figure 41:
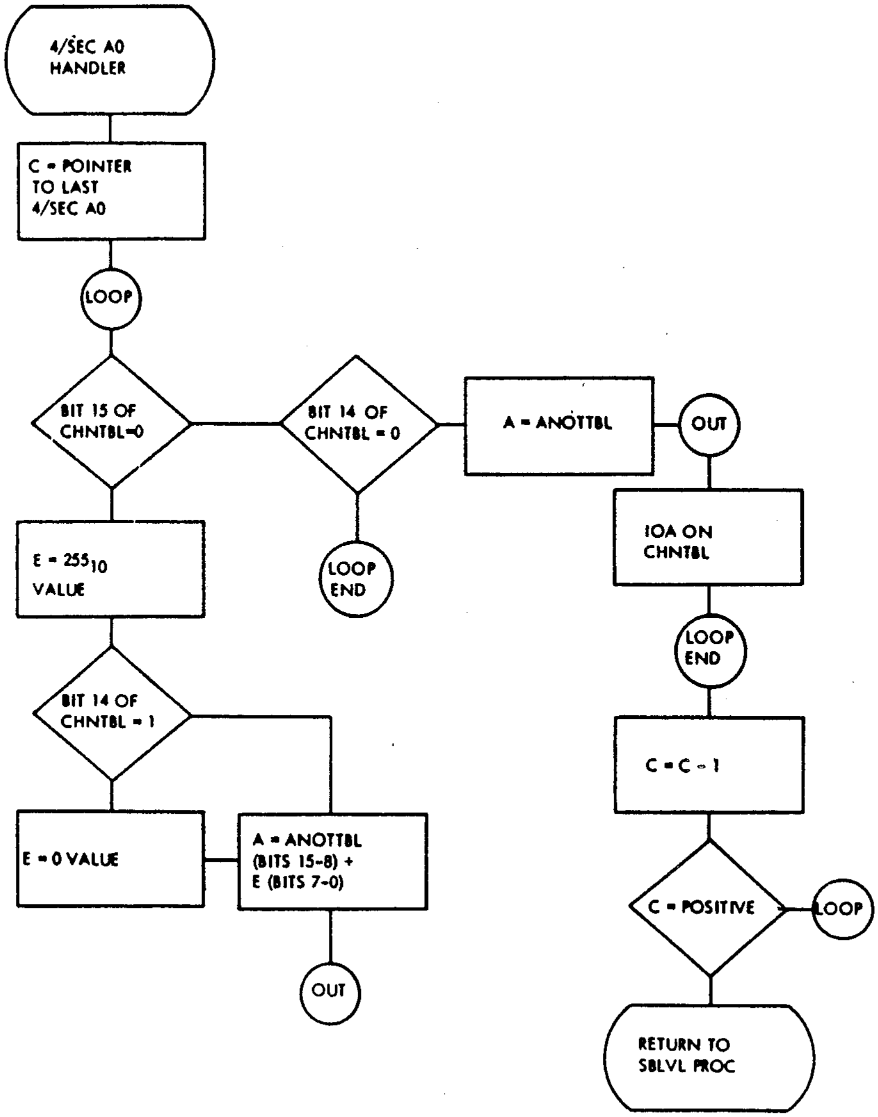
FIG. 41 illustrates the four per second analog output handler flow chart for the A machine.
Figure 43:
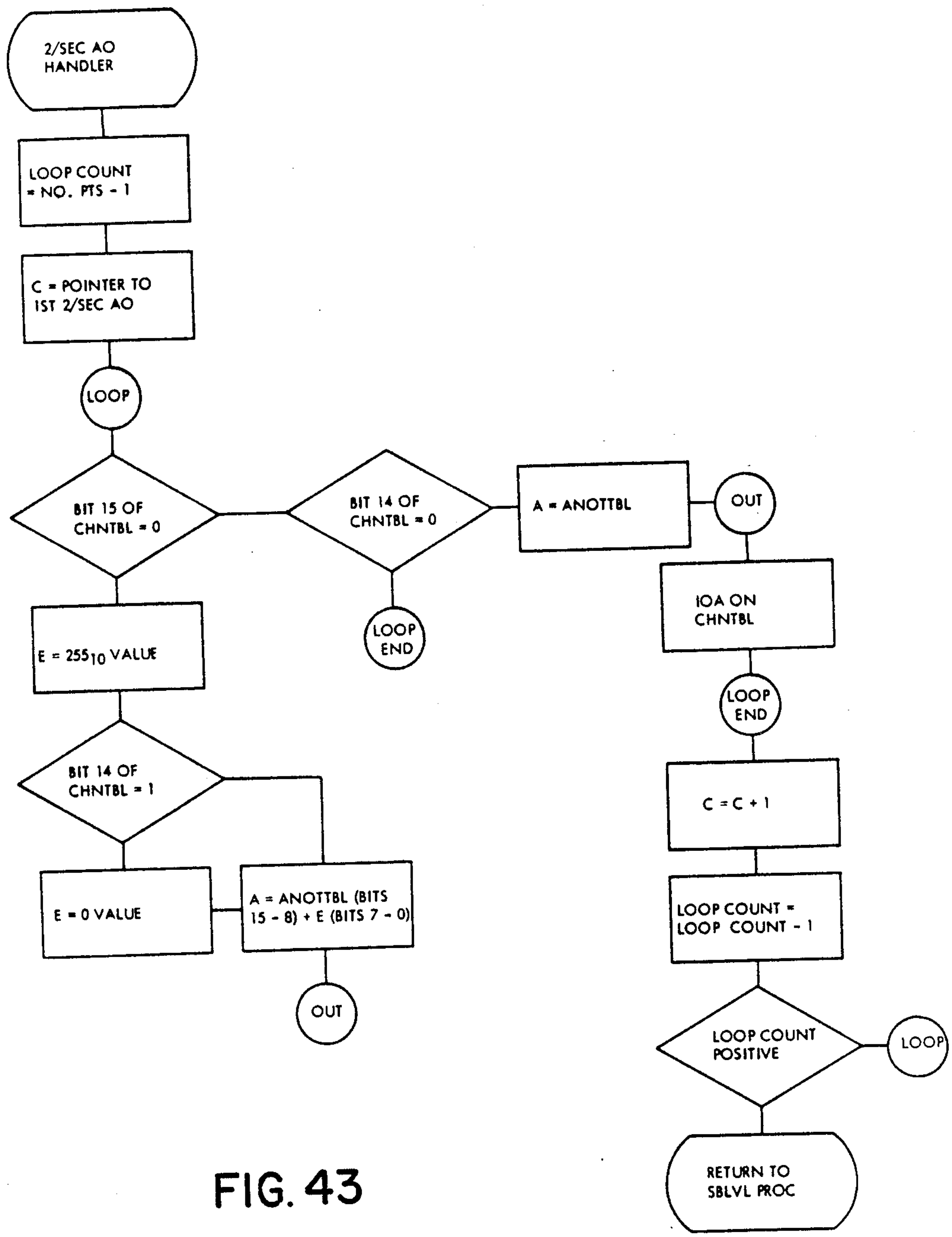
FIG. 43 illustrates the two per second analog output handler flow chart for the A machine.
Figure 44:
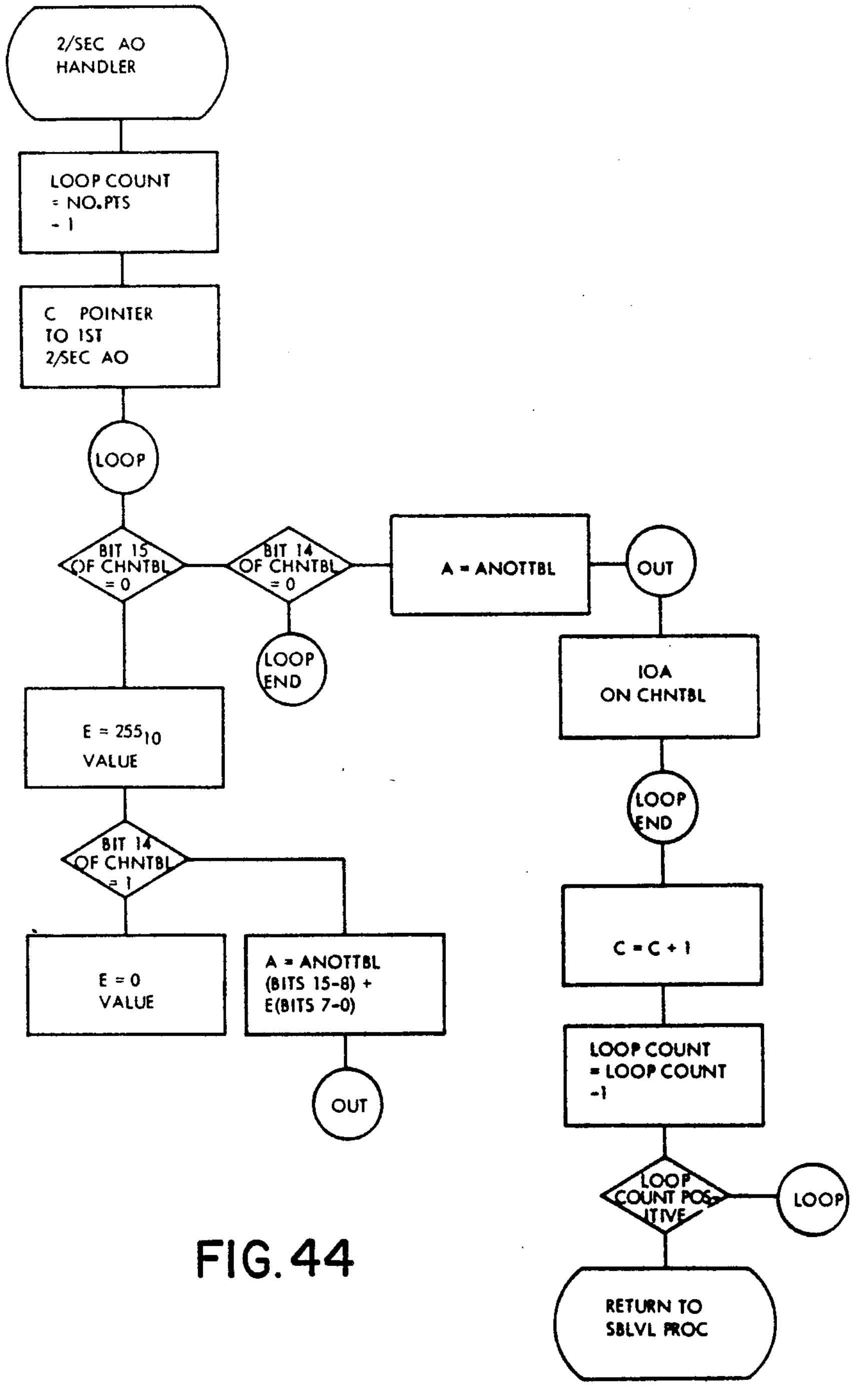
FIG. 44 illustrates the two per second analog output handler flow chart for the B machine.

Referring to FIG. 39, and the flow charts of FIGS. 41 and 43, the A machine system contains two analog output handlers. One of the analog output handlers is executed four times per second and the other is executed twice per second. Each AO handler operates using one word in the value table ANOTTBL, and one word in the channel table CHNTBL.

Figure 40:
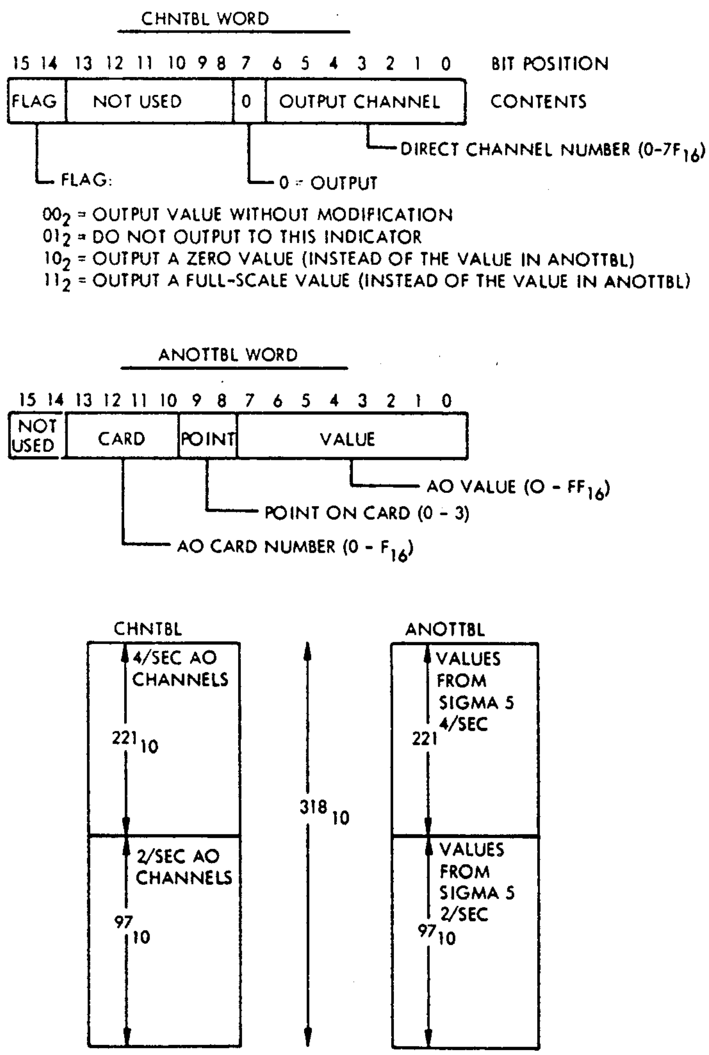
FIG. 40 illustrates the analog output table structure for the B machine.
Figure 42A:
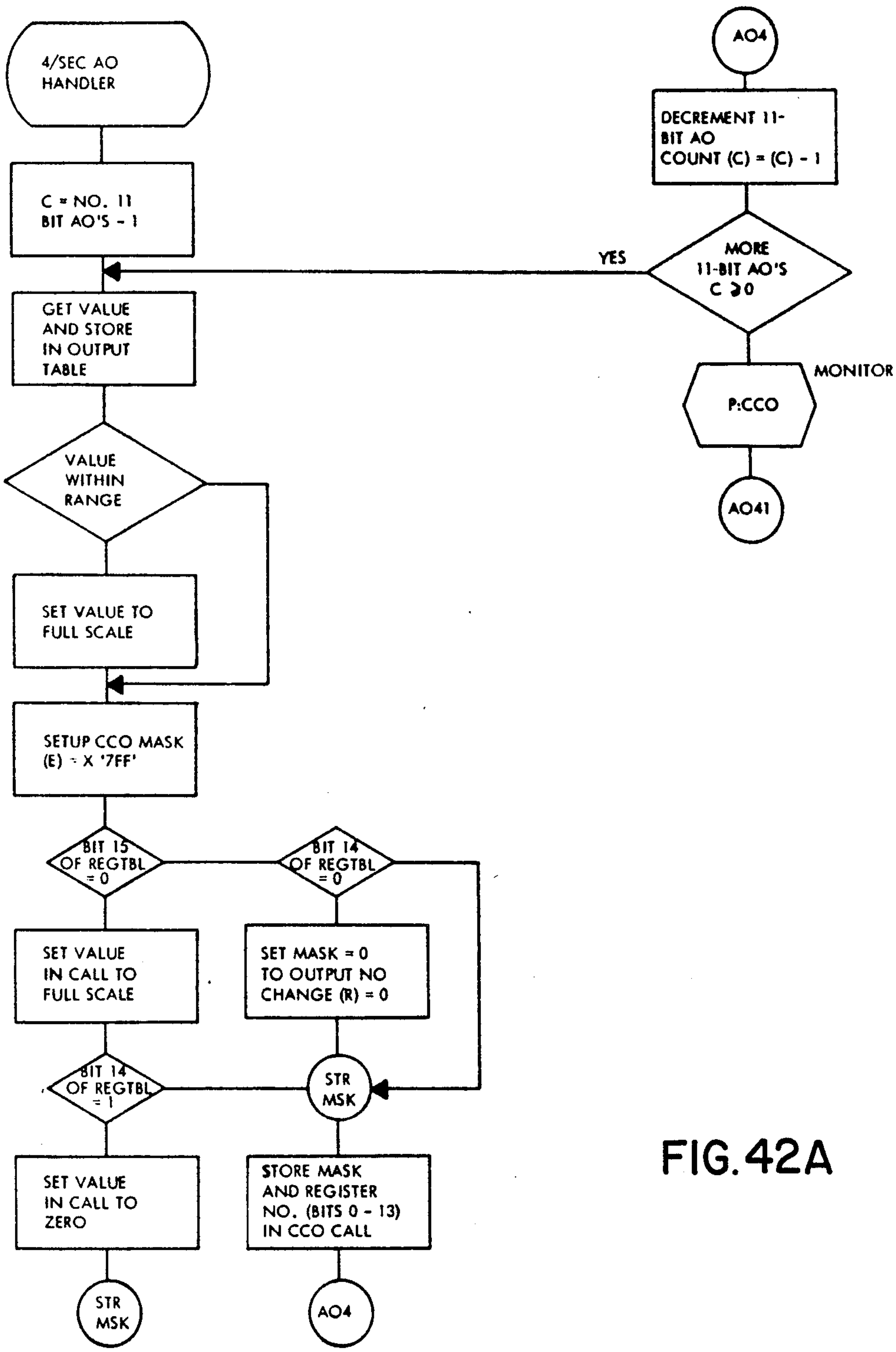
FIGS. 42A and 42B illustrate the four per second analog output handler flow charts for the B machine.
Figure 42B:
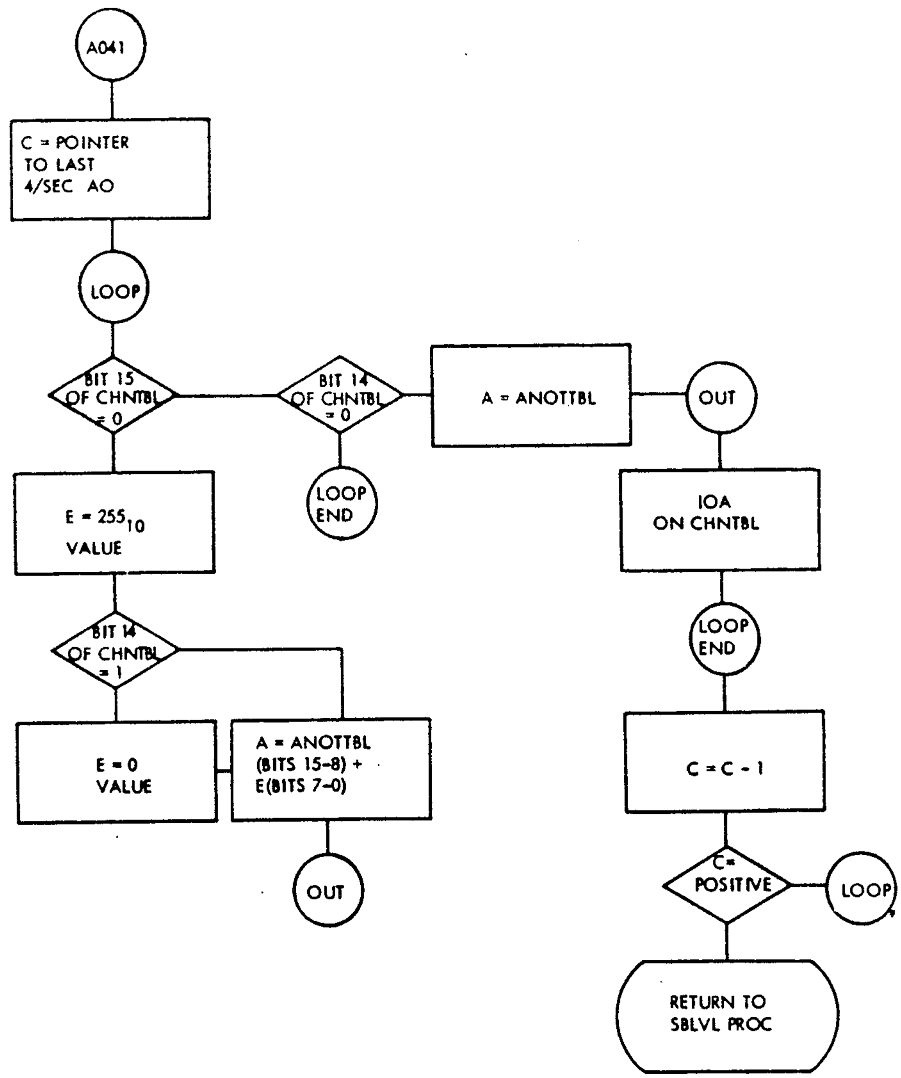

Referring to FIG. 40, and the flow charts of FIGS. 42A. 42B and 44, the B machine system contains two analog output handlers. One AO handler is executed four times per second and the other AO handler is executed twice per second. Each AO handler operates using one word on the value table ANOTTBL, and one word in the channel table CHNTBL per analog output. In addition, the program which is executed four times per second, outputs the special 11-bit analog outputs using the contact closure output routine in the monitor. Bits 14 and 15 of the register table entries REGTBL for the 11-bit analog outputs are used as flags in the same manner as bits 14 and 15 of the channel table.

The instructor's console interface is only provided on the B machine, and is composed of several standard interrelated PROGEN-70 programs. These programs include the pushbutton decode, a core resident interrupt handler, display routines to visually display alphanumeric, real, and integer values; and console control parts 1, 2, and 3 to connect and check information entered through the console. The purpose of these programs is to handle the input/output associated with the instructor's console, and to convert the data entered to a six character ASCII array. After checking that the correct values were entered, the requested function is called. The functions called are application programs described in connection with the description of the instructor's console. The console functions required are selected at data center generation time and include the options forced data for all functions, non-multiplex visual display, invalid request light, verified display, key locks, and reset console.

The data link handler provides the software interface between the A and B machines and the Sigma 5 computers in the present three computer embodiments of the invention. The handler for the A machine does not use the P2000 A IOCS, and is designed to service only one data link. Also, the handler for the B machine does not use the P2000 B IOCS and is designed to service only one data link. In order to make use of the suspend feature, the handler must be called from a PROGEN-70 sublevel.

Figure 47A:
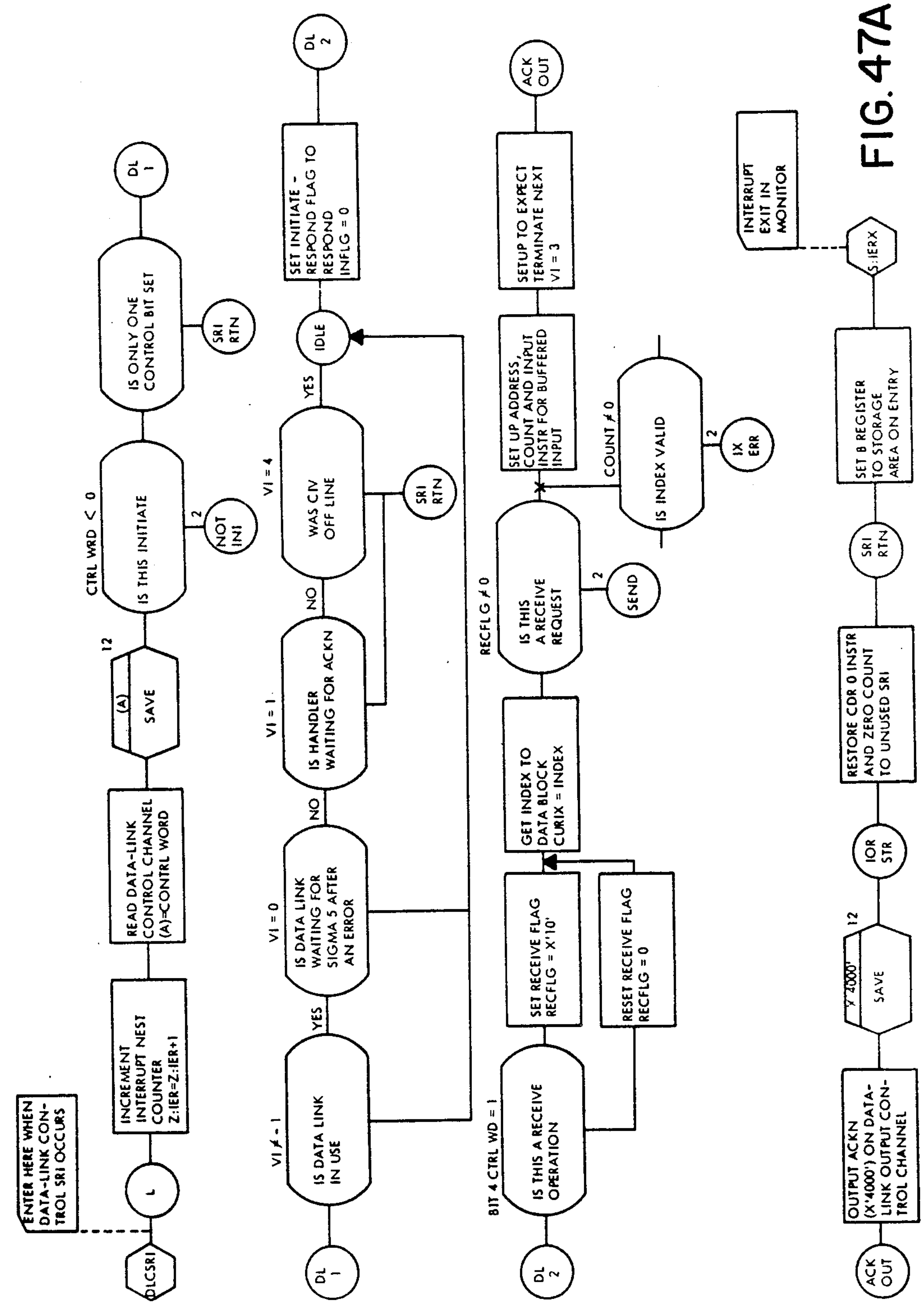
FIGS. 47A, B, C, D, E, F, G, H, I, J, K, L, M and N illustrate the data link handler flow charts for the A and B machines.
Figure 47B:
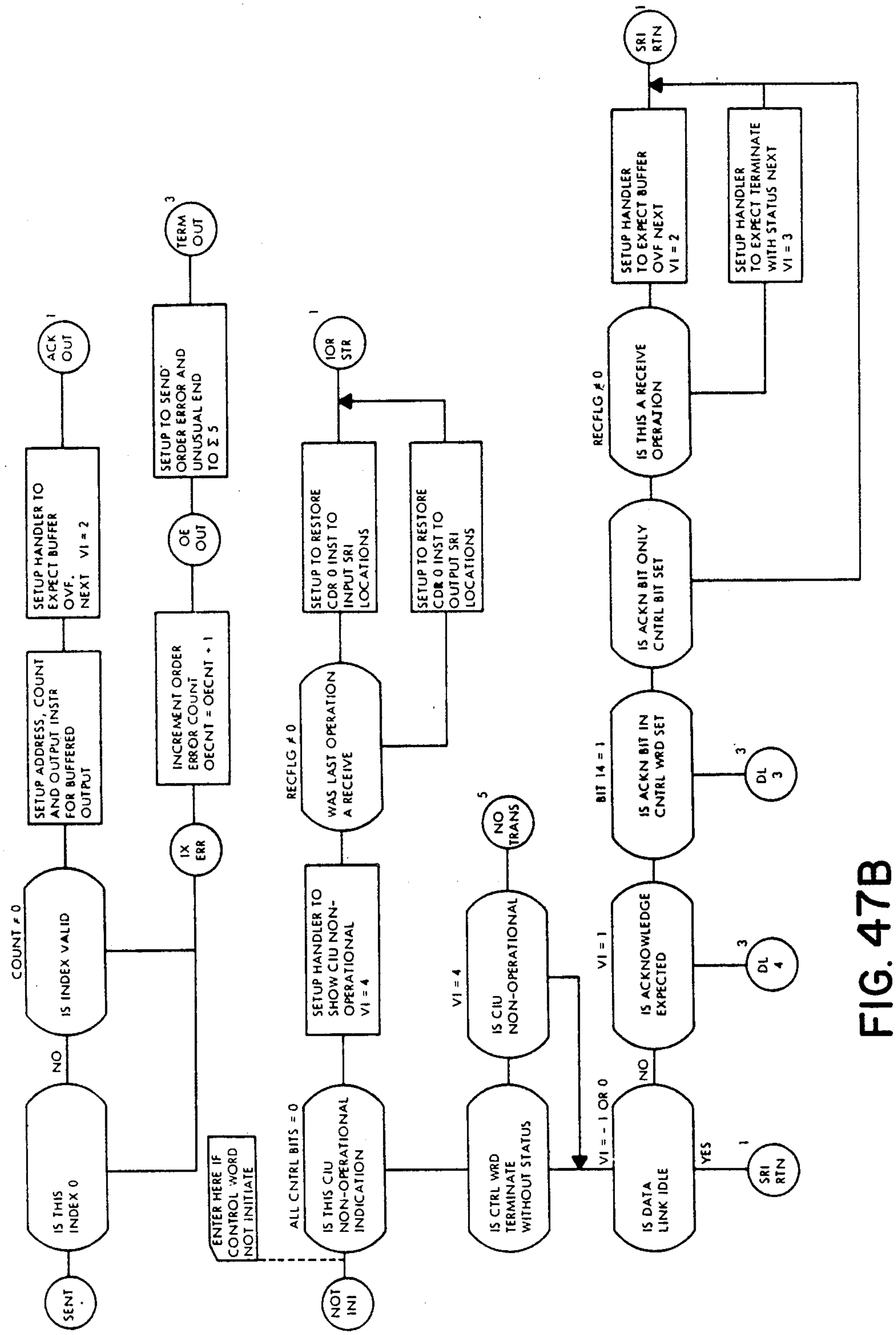
Figure 47C:
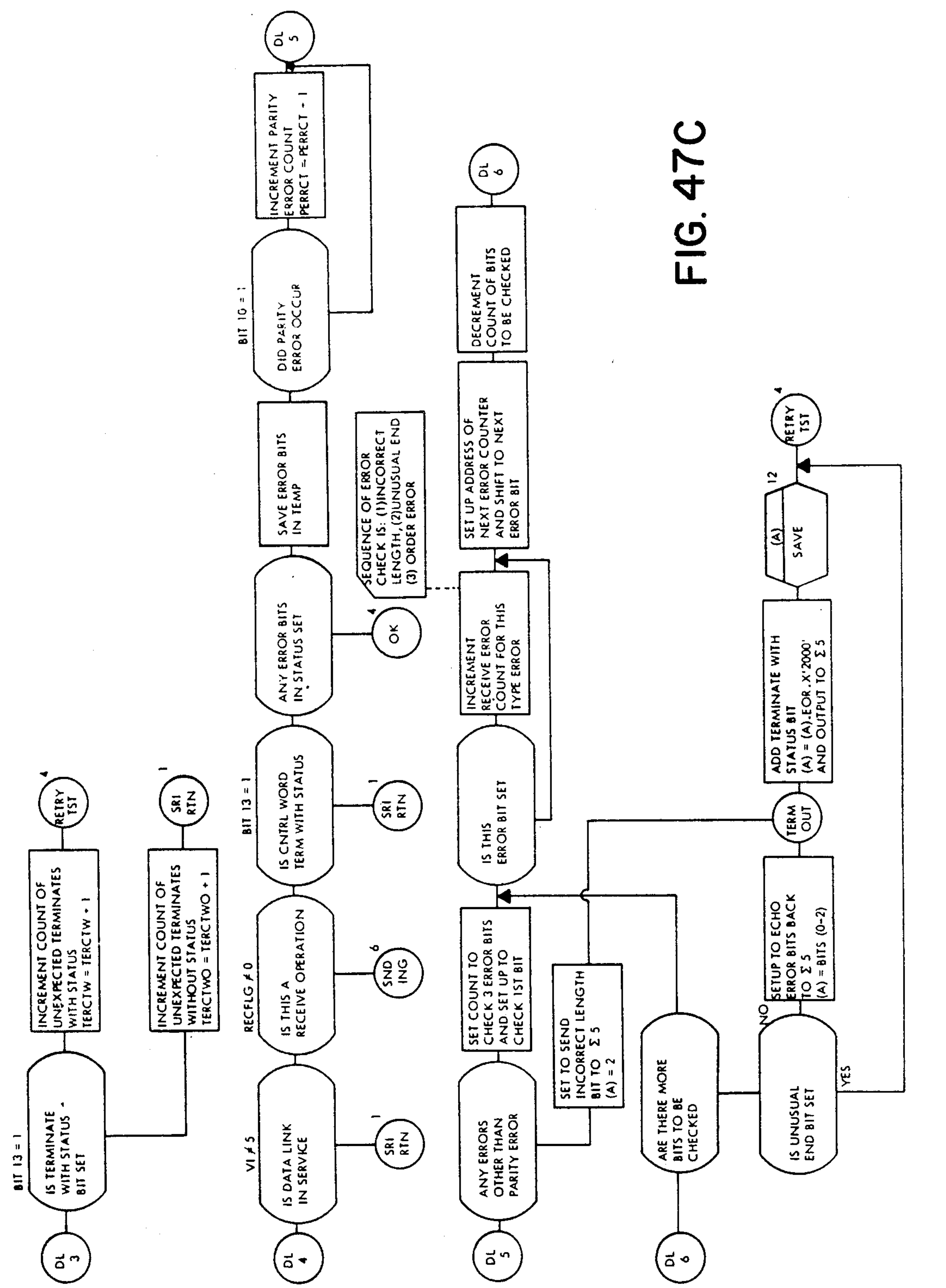
Figure 47D:
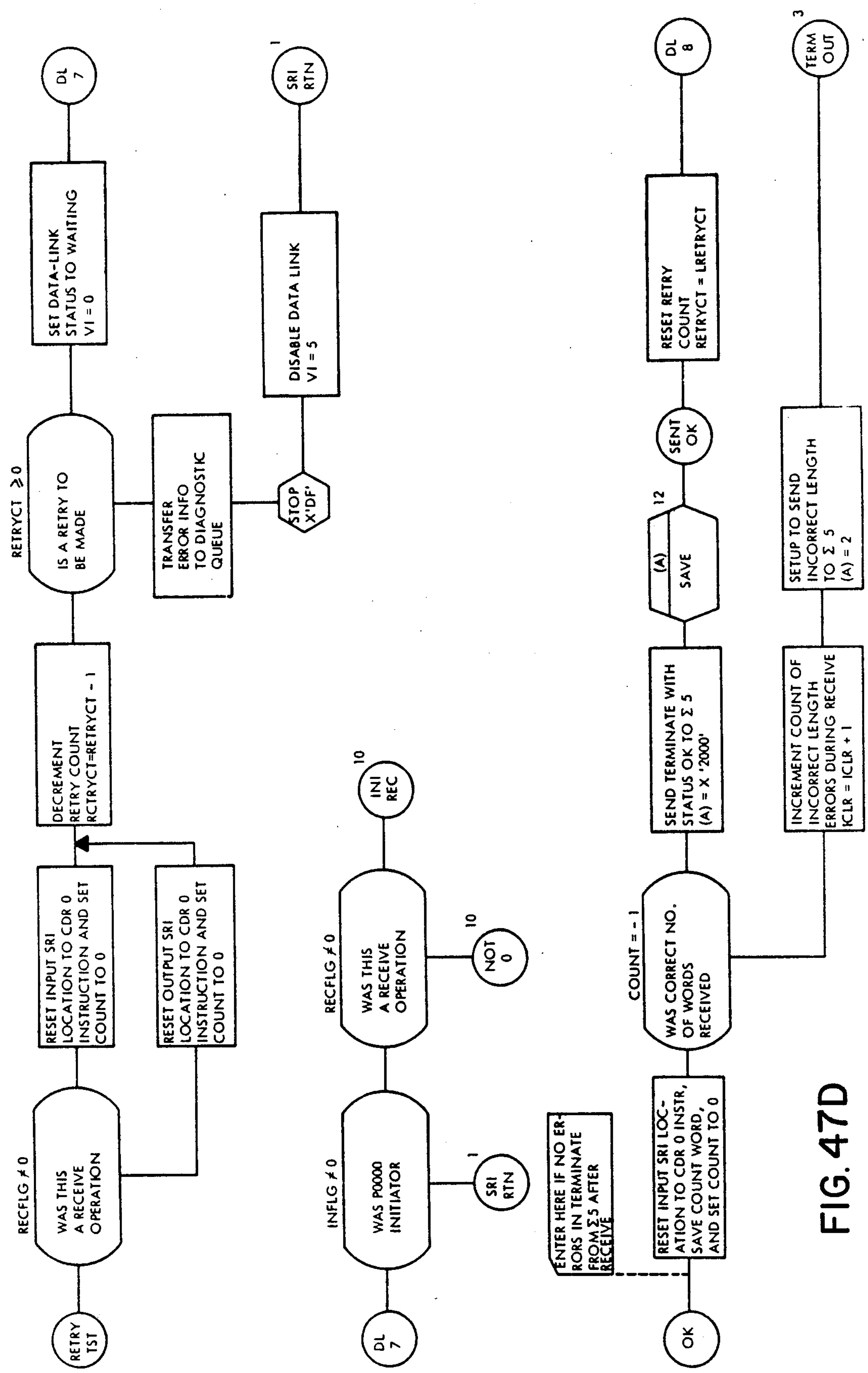
Figure 47E:
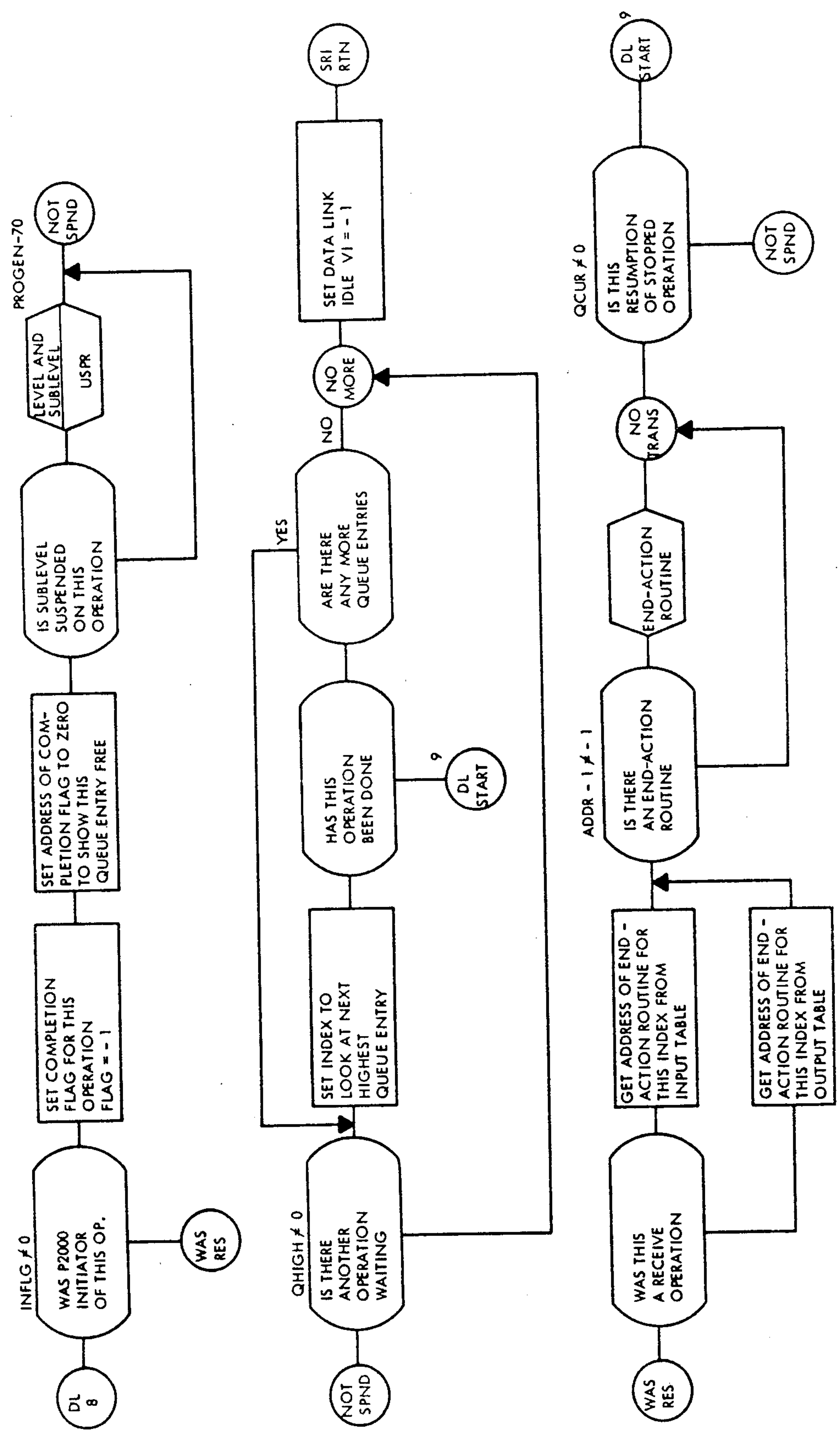
Figure 47F:
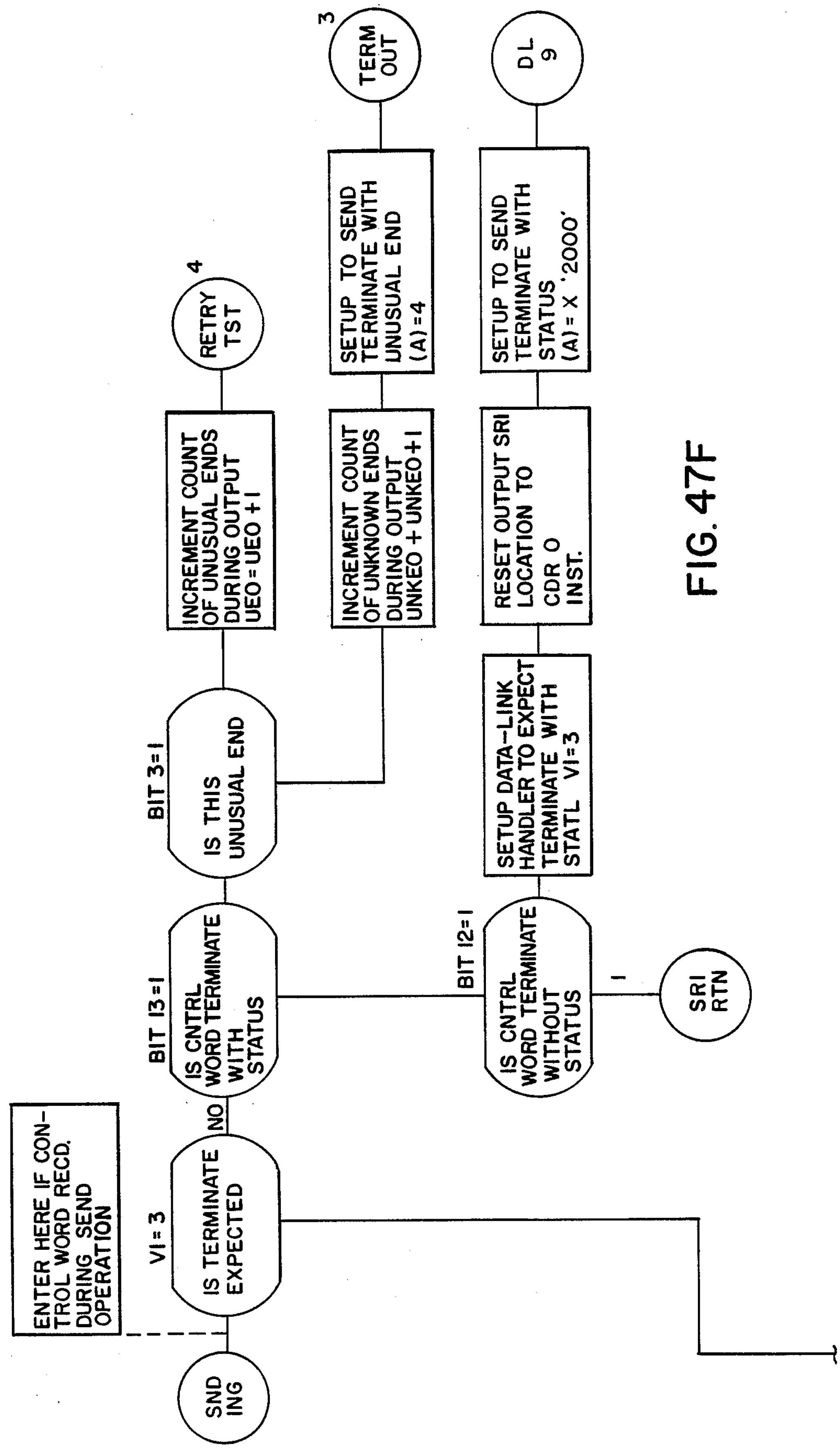
Figure 47G:
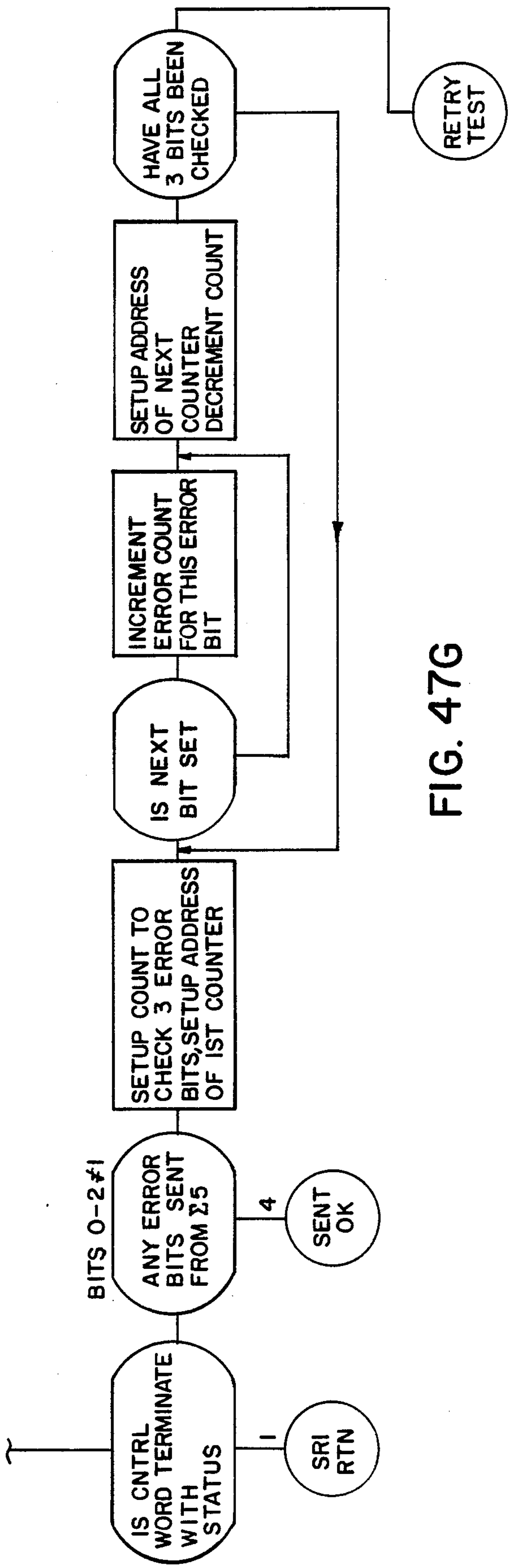
Figure 47H:
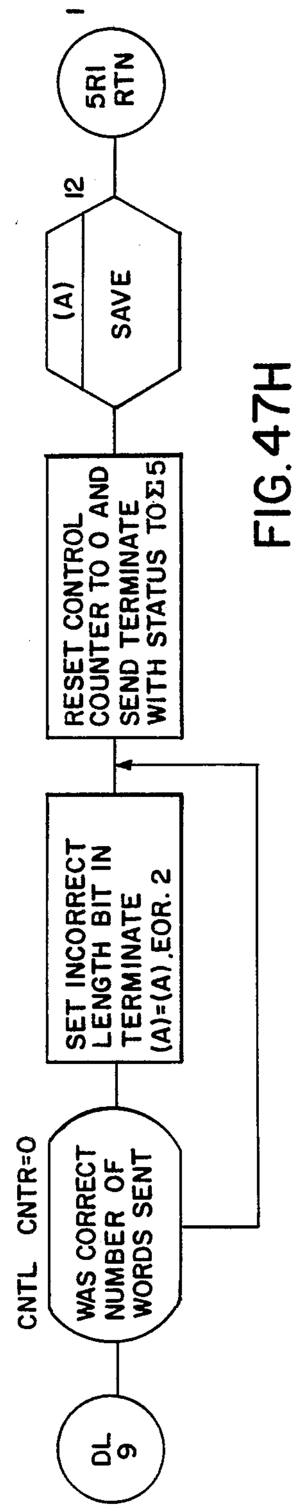
Figure 47I:
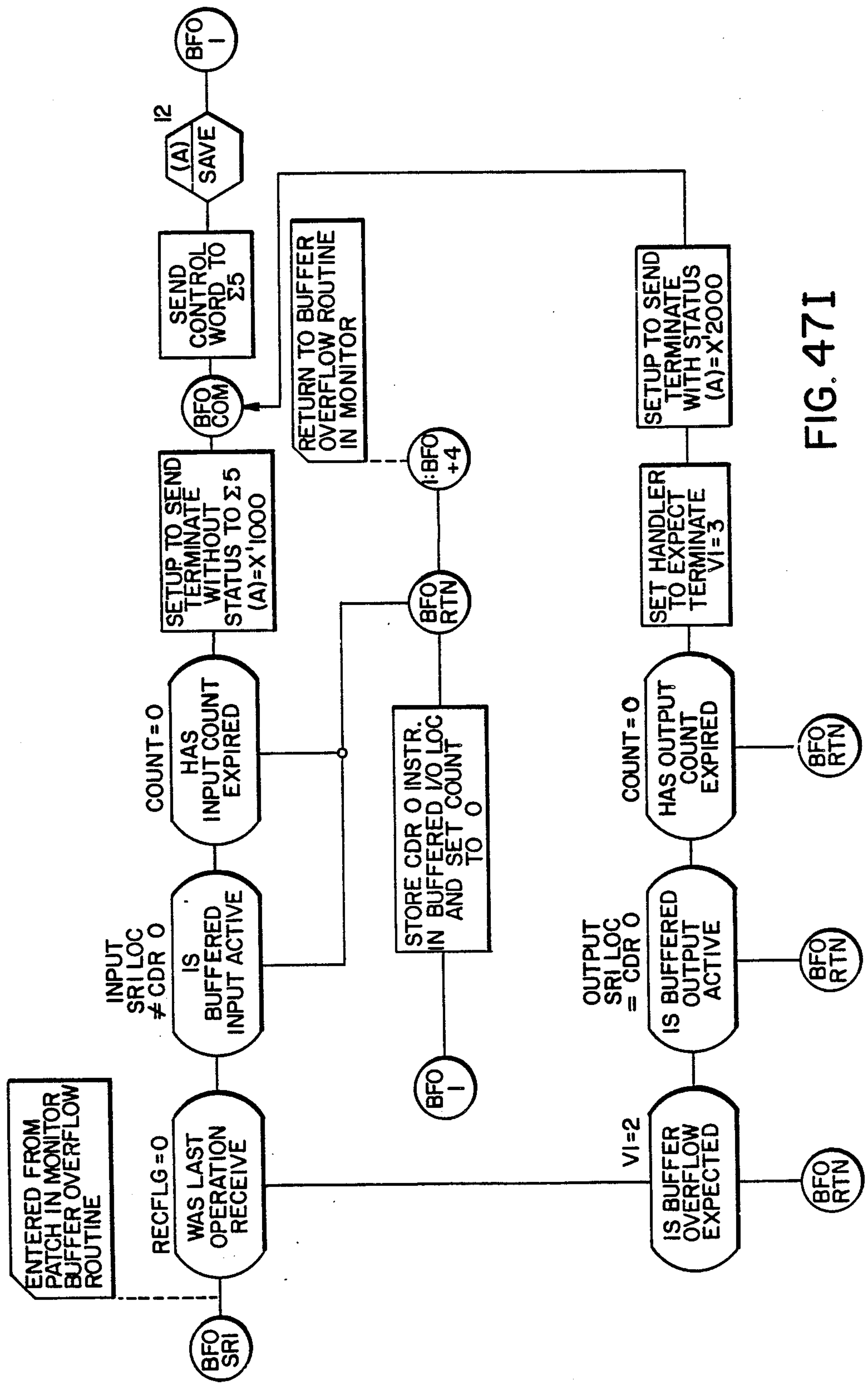
Figure 47J:
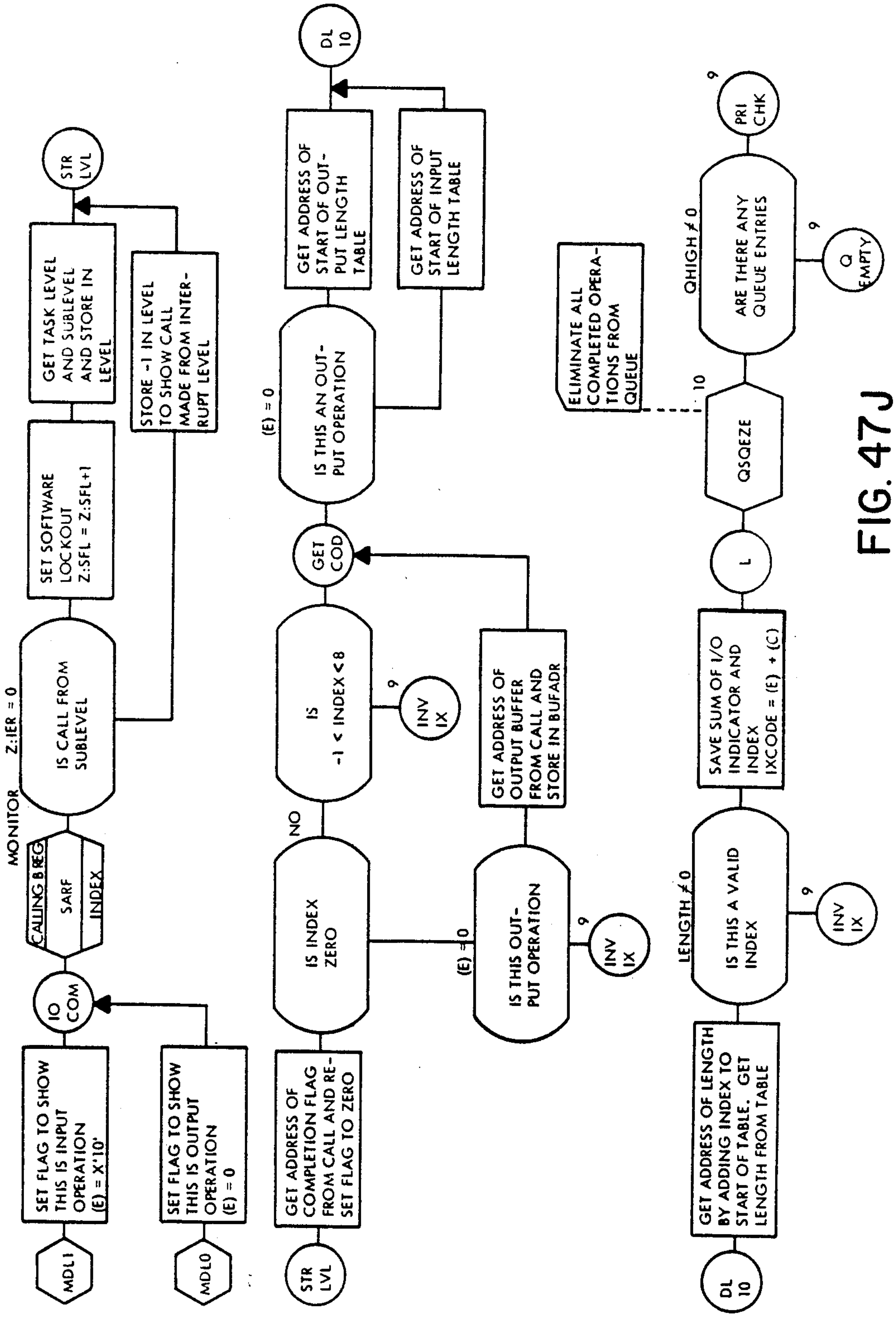
Figure 47K:
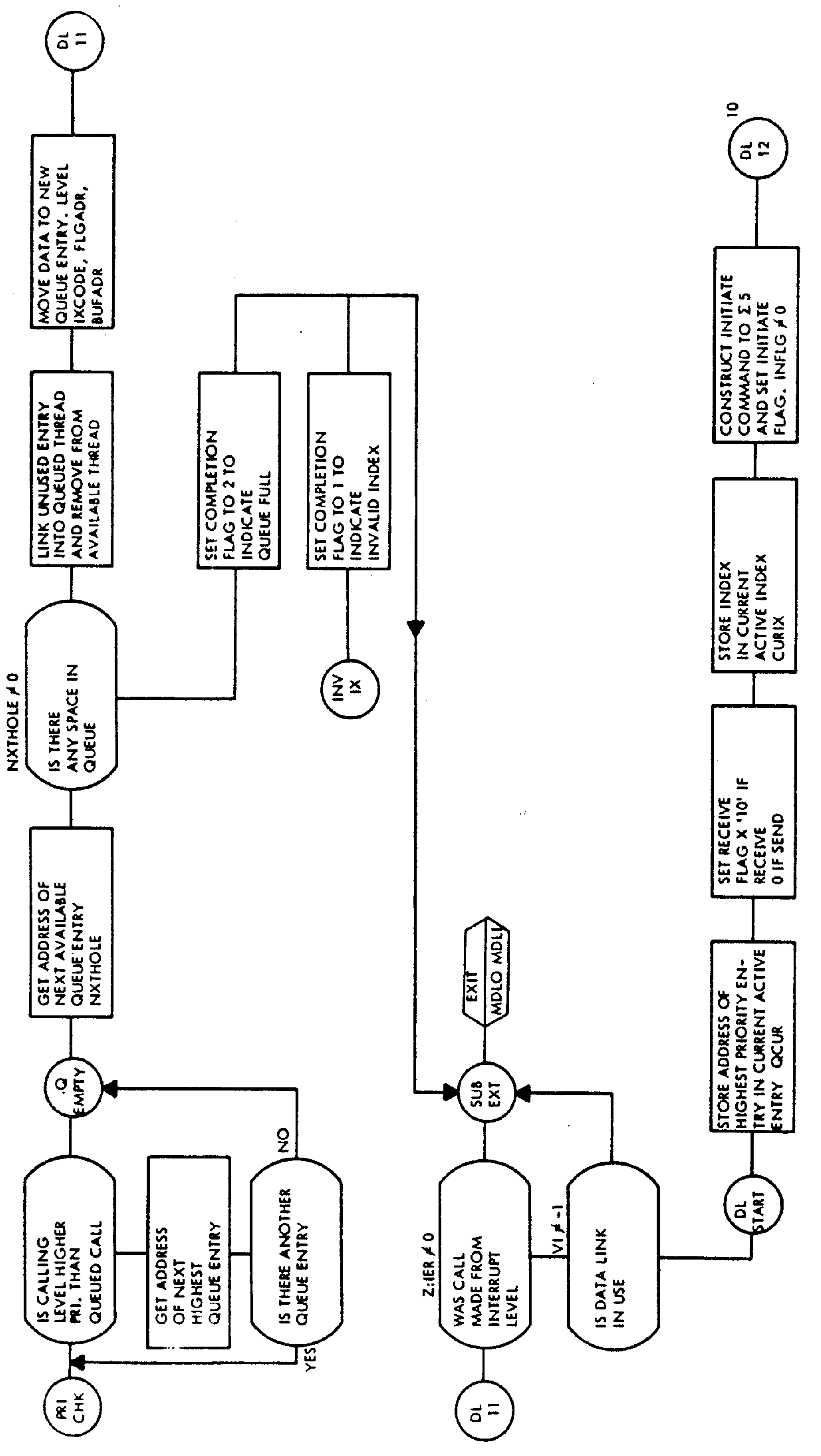
Figure 47L:
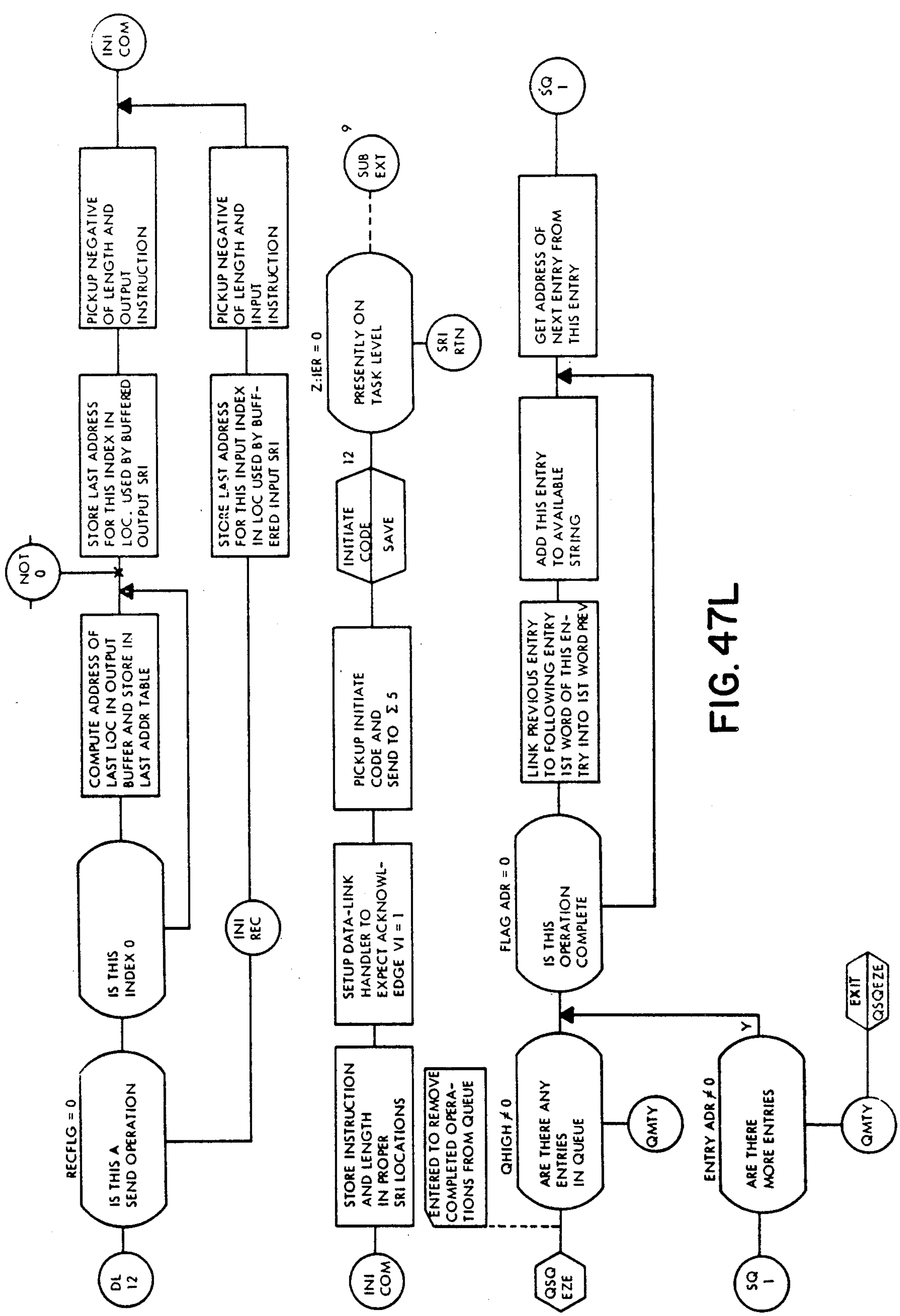
Figure 47M:
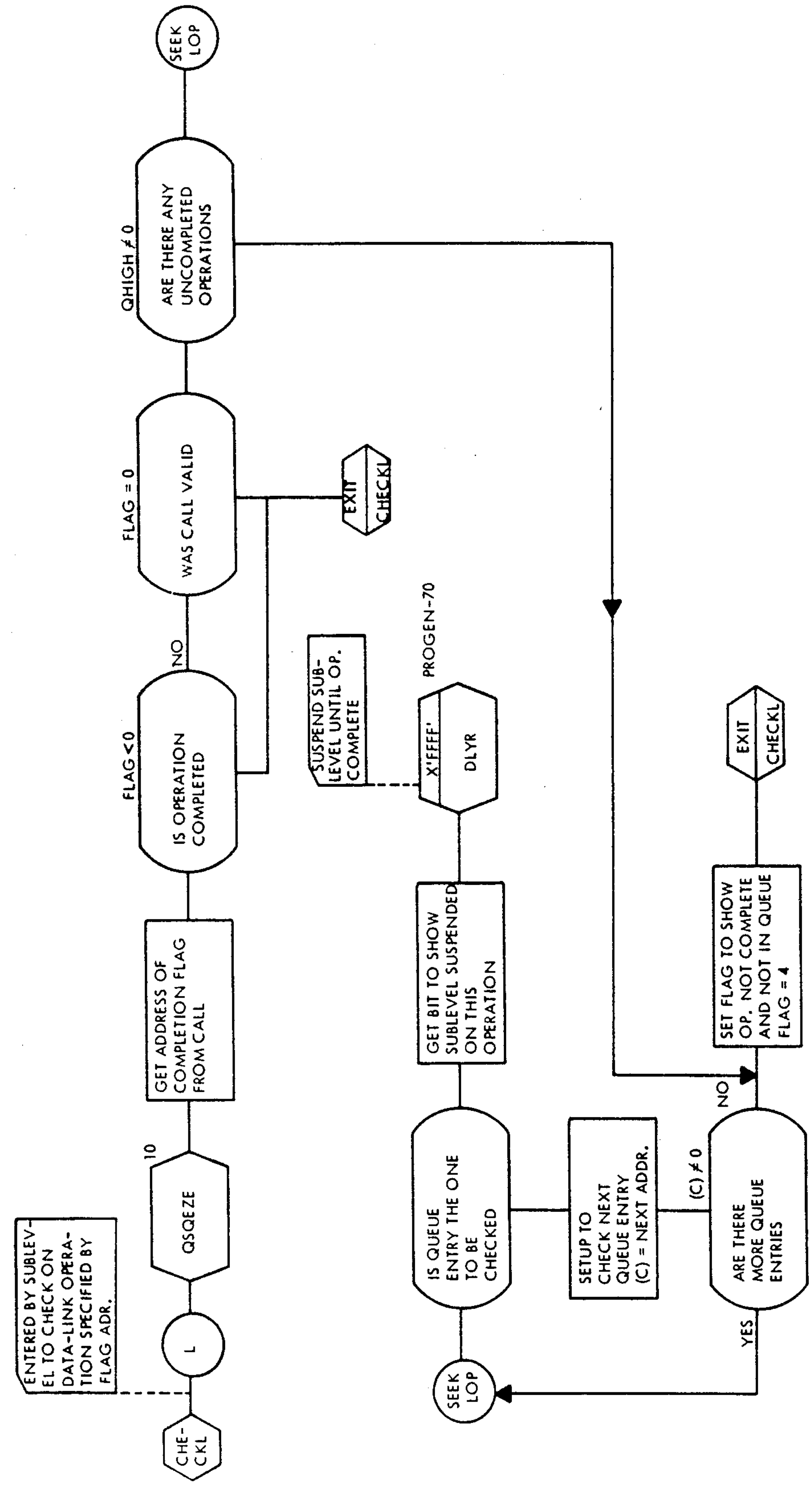
Figure 47N:
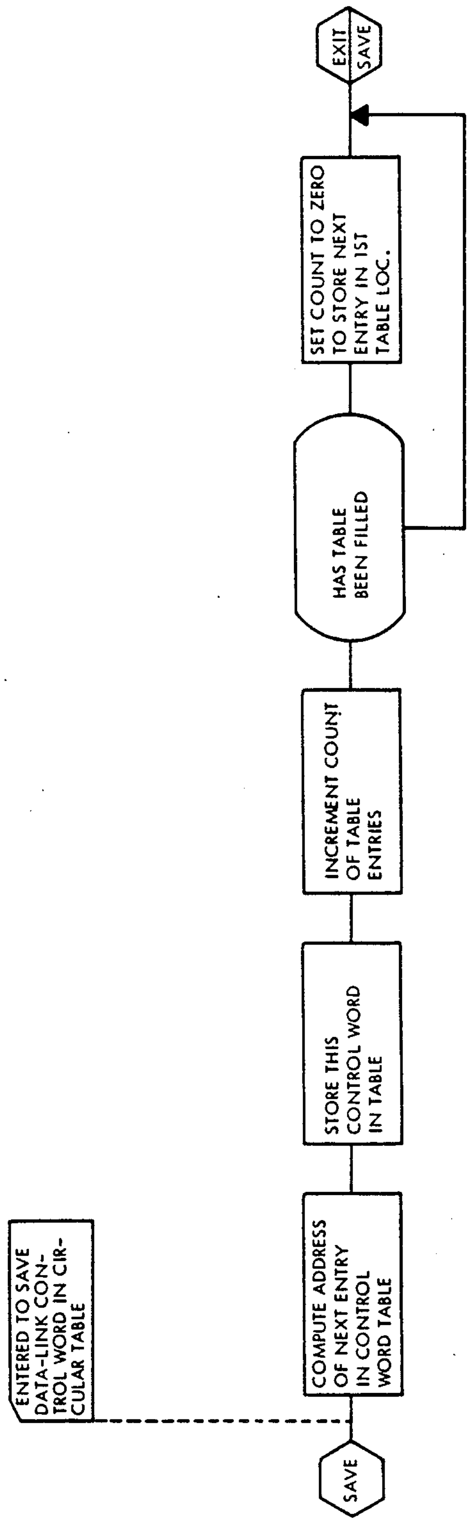

Referring to FIG. 45 for A and B machines, FIGS. 46A and 46B for A Machine, and 46C -and 46D for the B Machine, and the flow charts of FIGS. 47A through 47N the data link handlers for both the A and B machines are capable of accepting input and output requests initiated by the other two computers in the system. Seven different data blocks having fixed core addresses and links can be input and seven others output by both the other P2000 computer and the C machine. Since the addresses and links used when the A or B machine initiates the operation can be different than the ones used when the C machine performs the initiation, a total of 28 different fixed data blocks are available. In addition, both the A or B machine and the C machine may initiate a fixed length output of data located anywhere in the core of the initiating computer.

Data link operations initiated by the A and B machine programs are entered into a queue which is processed by the data link handler. Request made on the interrupt level are given the highest priority, and other requests are given the priority of the sublevel making the request. Calls made from the same level are processed using a first-in-first-out priority. The data link handler does not suspend the calling sublevel when the request is made, but continues a subroutine which, when called after making the request, will suspend until a given operation is completed. The handler also provides the ability to transfer to an end action routine before releasing the data link after all operations are initiated by the C machine. A different routine may be called for each different data block.

When a data link operation is to be initiated from the A machine or the B machine, one or more of the following subroutines are called:

1. MDLI - Request input from Sigma 5 to P2000 A or B
Calling Sequence

| | | |
|---|---|---|
| FORTRAN IV: | CALL MDLI (INDEX,IFLAG) | |
| SYMBOL: | SST | MDLI,B |
| | ADL | INDEX - BPOOL |
| | ADL | IFLAG - BPOOL |

2. MDLO - Request output from P2000 A or B to Sigma 5
Calling Sequence

| | | |
|---|---|---|
| FORTRAN IV: | CALL MDLO (INDEX,IFLAG,IBUF) (only when INDEX = 0) | |
| SYMBOL: | SST | MDLO,B |
| | ADL | INDEX - BPOOL |
| | ADL | IFLAG - BPOOL |
| | ADL | IBUF - BPOOL (only when INDEX = 0) |

3. CHECK - Determine status of data link request
Calling Sequence

| | | |
|---|---|---|
| FORTRAN: | CALL CHECK (IFLAG) | |
| SYMBOL: | SST | CHECK |
| | ADL | IFLAG -BPOOL |

where INDEX is an integer 0–7 which indicates to both ends of the data link which block of data is to be transferred. The value INDEX=0 is a special case indicating that the data transmitted is in a variable format and the format is defined within the data itself. MDLI subroutine may not be called with INDEX=0. When the subroutine MDLO is called with INDEX=0, a third argument IBUF must be present. The argument must not be present when INDEX does not equal 0. IBUF is the buffer containing the data to be transmitted. The use of this argument permits more than one INDEX=0 type transmission to be pending simultaneously. However, when this type of transmission is used and the data buffer to be transferred is part of a disc resident sublevel, care must be taken to insure that the data link operation is complete before the sublevel exits. This is accomplished by using the CHECK subroutine. The argument IFLAG is a word which indicates the status of the requested data link operation.

To initiate a data link transfer to or from the C machine, the MDLO, or MDLI subroutine is called. The subroutine resets the flag word IFLAG to zero indicating that the transfer has not yet been completed. The arguments in the call are checks. If an error is found, IFLAG is set to one and the subroutine returns to the calling program. If there are no argument errors, the queue is checked for an available entry. If there is no available entry, a return is made to the calling program where IFLAG sets to two. When there is space in the queue, the data for this call is stored in the queue. The queue entries are threaded in such a way that the highest priority sublevels have their operations performed first (see FIG. 45).

If the data link is presently in use, the subroutine returns immediately to the calling program. If the data link is idle, the requested operation is initiated and the subroutine returns to the calling program. The calling program can continue to run, but it cannot assume that the requested data link operation is complete. When the calling program reaches a point where it must be certain that the requested operation is complete before it can continue, the CHECK subroutine is called with the status flag of the operation in question as an input argument. The CHECK subroutine must be called from the same sublevel from which the data link operation was requested, and must never be called from the interrupt level. If the operation being checked is completed, a return will be made to the calling program immediately. If the operation is not complete, the calling program is suspended until it is complete.

When a transfer operation is complete, the status flag one is set to minus one to indicate a successful completion. If a sublevel has been suspended pending the completion of this operation, it is unsuspended. The waiting thread of the queue is checked for other transfer operations to be performed. The highest priority entry, that is, the first one in the thread, is then initiated.

In addition to handling data link operations initiated by the P2000 A and B machine in calls to the subroutines MDLI and MDLO, the data link software also handles operations initiated by the Sigma 5 or C machine. When the C machine initiates a transfer operation, the index defining the operation is received by the A machine or the B machine as the case may be together with the initiate request. Using this index the A machine or the B machine can determine the origin and length of the data block to be transferred. After . the successful completion of every operation initiated by the C machine, the data link software transfers to an end action routine under lockout on the interrupt level. The routine called is a function of the index, and whether or not the operation was a transmit or receive. The calling sequence is:

LDG P
JMP SUBI(INDEX)

If no routine is to be called for a given index, a zero can be entered in the table of subroutine addresses for that index and handler generation time. The subroutines called can set flags, bid for sublevels to process data just transferred, transfer data, etc. These routines can also make calls to MDLI and MDLO to request other data link operations. Since calls can be made from the interrupt level to make entries in the queue, the queue should be defined large enough so that there is always space available in the queue. The end action routines must always return to the data link handler when they are finished. The return sequence is:

INC G
JMP *G

The end action routines used in the A and B machines are described hereinafter. The actual data link transmissions are accomplished through the use of three service request interrupts SRI's and two direct input/output channels, one input and one output. One SRI and the direct channels are used to transfer control commands between the A and B machines and the C machine. The other two SRI's are used for data transfer, one for output, the other for input. (See FIG. 46A).

The sequence of input/output operations which occur when the A or the B machine initiates the data link transfer are as follows. When the A or B machine initiates an input transfer, buffered input SRI is activated, and "initiate" is sent to the C machine; "acknowledge" is received from the C machine; and data is input through input SRI. Then, terminate with "status" is received from the C machine after it has sent the required number of words. The data link handler for the A or B machine is initialized to expect one word more than the number actually transferred for all input transfers. This is done so that the time required to process the buffer overflow SRI can be eliminated on input transfers. The input buffers should also include this extra unusable location at the end of the buffer in case an extra word should be received. If the counter associated with the input SRI indicates that the A or B machines-:expects one more word when the "terminate with status" is received from the C machine, the correct number of words have been received. Finally, a "terminate with status" is sent to the C machine.

When the A or B machine initiates an output transfer, buffered output SRI is activated and "initiate" is sent to the C machine; "acknowledge" is received from the C machine; data is output through output SRI; buffer overflow SRI occurs to indicate that last word has been output, and the A or B machine sends a "terminate with status"; and finally, "terminate with status" is received from the C machine.

The sequence of input/output operation which occur when the C machine initiates the data link transfer are as follows. When the C machine initiates an input transfer to the A or B machine, "initiate" is received by the A or B machine and input SRl is activated; "acknowledge" is sent by the A or B machine; data is input through input SRI; "terminate with status" is received from the C machine; and "terminate with status" is sent by the A or B machine. When "terminate with status" is received from the C machine, the A or the B machine should be expecting one more word.

When the C machine initiates an output transfer from the A or B machine, "initiate" is received by the A or B machine, and output SRl is activated; "acknowledge" is sent by the A or B machine; data is output through output SRI; buffer overflow SRI occurs to indicate that the last word has been output and the A or B machine sends "terminate with status"; and terminate with status is received from the C machine.

During all phases of the transfers, the data link handler knows which control command is expected next. Should an error occur, one of twelve different error counters is incremented and the C machine is also informed of the error via the "terminate with status" command. The data link handler then checks the re-try counter to determine whether the maximum number of consecutive transmission errors, which are defined at handler generation time, has been reached. If not, the transmission which fails is re-initiated by the original initiator. If the maximum number of consecutive errors has been reached, the program executes a STP X'DF' under lockout to shutdown the simulator. Before the STP is performed, data concerning the data link transfer which failed is stored in a diagnostic buffer DIQBF. Another diagnostic aid which is provided by the program is a 32 word circular buffer GOTTBL, which contains the most recent 32 control commands received or sent.

Since the data link is a half-duplex system and both ends are capable of initiating operations, a master-slave priority relationship must be established for simultaneous initiations. The data link handler software designates the P2000 A and P2000 B machine as the master and the C machine as the slave. The hardware switches in the C machine channel interface unit CIU must also be set to designate the C machine as the slave.

The Zero table is the first 256 words of core memory. It comprises those locations which are accessed by the P2000 A or B instruction mode "ZERO". The Zero table is mainly used for routine addresses. This provides independence among programs because a connecting address location will remain constant even if the program changes. Locations $1S9S_{16}$ of core memory are used in conjunction with the Zero table addresses. Location 1F14 contains the instruction JMP**$14_{16}$, etc.

APPLICATIONS SOFTWARE FOR THE P2000 A MACHINE

Generally, the four functional categories of application software in the A machine are instructor-console-related software, simulation information software, control panel software, and reactor control rod simulation software. In alternative embodiments, other software arrangements can be employed in single or multiple computers consistently with many invention features.

The instructor-console related software is comprised of data-link end-action routines, store conditions on disc, initialize from conditions on disc, initiate training exercise, and malfunction chains and sublevels.

The simulation-information software comprisess a task to set a CO when the model is off, timing task for computer duty cycle, and task to print variable true/-false status.

The control panel software is comprised of flow counter sublevels, flux mapping chains and sublevels, protection logic chains, and panel logic chains, which are considered in connection with the description of the control panel and models hereinafter.

Data-Link End-Action Routines

Referring to FIG. 22, when a data link transmission initiated by the C machine is complete, the data link handler optionally transfers control to an end action routine. The types of data link transmissions for which end action routines can be included are index numbers 0 through 6 and output index numbers 1 through 6. The end action routines initiate programs to process inputs from the C machine and the B machine and to generate additional output for the C machine and the B machine.

Data is transmitted to the A machine as a result of the operation of switches on the instructor's console, using input index 0 on demand; that is, it is not periodic. The data is input into a 25 word block labeled AIB5. The nature of the 25 words is contingent on the second word in the buffer. The second word contains an integer indicating the specific function to be executed.

When the second word of the AIB5 block contains the integer 1, the A machine is to be initialized for simulation from a condition set stored on disc, which may be any one of the initialized or snapshot conditions of the simulator. The particular condition set is designated by the fourth word of the AIB5 block, and is an integer in the range 1 through 28. The end action routine stirs the integer specifying the selected condition set in location $88_{16}$ of memory and bids for the "Initialized From Conditions On Disc" sublevel.

When the second word of the input index zero buffer contains an integer 2, print control from the instructor's console is indicated. Printing of the digital scan sublevels and the analog input sublevel is started or stopped by the end action routine merely by modifying, in these sublevels, the calls to the message writer. Thus, the fourth word of the AIB5 block contains an instruction "SST ** MSWR, B" or "JMP $+ 8". This instruction is moved to appropriate locations in the digital scan and analog input scan, and thus these sub-levels either call the message writer or bypass the call execution.

When the second word of the AIB5 buffer contains the integer 3, the end action routine bids for the "Initiate Training Exercise" sublevel.

When word 2 of the input index zero buffer contains the integer 4, the "Model Start" function is executed in response to the operation of the appropriate levers on the instructor's console. Model start is accomplished in the end action routine by enabling and activating task levels 4 and 5 which contain all the chains in the A machine. Also, the end action routine enables and activates the sublevels for the flow meter counters hereinafter described, and for the control rod counter malfunctions hereinafter described; and these routines run periodically, initiated by the auxiliary synchronizer once they are abled, if appropriate flags are set. Further, the end action routine restores the saved contents of locations HILINK and LOLINK which point to active logical delays so that they will be resumed.

When word 2 of the input index zero buffer contains an integer 5, the panel diagnostics in the A machine are activated in response to the request from the instructor's console. The end action routine transfers words 4,6, 8 and 10 from the AIB5 buffer into common locations OPT, VAL1, VAL2, and STRT, and then bids for the panel diagnostic sublevel, hereinafter described.

When the second word of the type zero input index buffer contains the integer 8, Malfunction start/stop is indicated which is initiated at the instructor's console. In this instance, the block AIB5 also contains the malfunction index (1–100) in word 4, the malfunction state (true or false) in word 6, the integer V in value 2 in word 8, and the integer V in value 3 of word 10. The end action routine transfers the data to common locations. The relative address of the malfunction logical M00–M99, corresponding to index 1–100, is calculated and stored in location IPAR4; and the state of the logical is tranferred to location IPAR6. The integers value 2V and 3V are moved to the appropriate system integer locations which depend upon the malfunction index; that is, to locations in M00–V2, M99–V2 and M00–V3 depending on the index number 1–100. Finally, the malfunction sublevel MALLVL is initiated. This sublevel calls SET1/0 as appropriate, for the malfunction logical.

When the second word of the AIB5 block contains the integer 9, annunciator failure start/stop request from the instructor's consolde is indicated. In this event, the buffer AIB5 also contains an index to the specific annunciator (1–16) in word 3, and a control word in word 4 for failure termination (code equals zero), off failure initiation (code equals one), and on failure indication (code equals two). Annunciator failure uses a table called ANMTBL for its operation. This table is also used by the digital scan so that a failed annunciator remains "failed". When failure is initiated, the specified annunciator is set "on" or "off" by a M:CCO call. Then, the corresponding bit in on/off is set to one or zero for failure on or off. If the annunciator was not failed previously, NCOUNT is decremented by one and the N bit corresponding to the annunciator is reset to zero. When failure is terminated, NCOUNT is incremented by one and the N bit corresponding to the annunciator is set to one. The system location which contains the logical value of the annunciator is accessed, and M:CCO call is executed to set the annunciator to its logical value.

When the second word in the input index zero buffer AIB5 contains the integer 10, on indicator failure malfunction is indicated. In this instance, the buffer AIB5 also contains an analog output table index (1–342 with exceptions) in word 3, and analog output flag (0–3) in word 4. The end action routine calculates the proper analog output channel entry and sets the flag bit according to the contents of the word 4 (see FIG. 34).

When the second word of the input index zero of the buffer AIB5 contains the integer 11, the end action routine executes "LOCAL OPERATOR ACTION" as a result of the instructor operating simulated devices not from the control panels operable by resetting the logical variable for "part-length rod motion stop" IPLSTP to "fault" so that simulated part length control rods of the simulated reactor are able to move.

When the second word of the input index zero buffer AIB5 contains the integer 12, the "update time" option which is controlled by a clock mechanism is executed in the end action routine. The actual update of time locations in the A machine depends on the further contents of the AIB5 buffer; such that if word 3 is true, word 4 is transferred to IMIN, the minute of hour counter, and if word 5 is true, word 6 is moved to IHOUR, the hour of day counter. If word 7 is true, word 8 is moved to IDAY, the day of week counter; if word 9 is true, word 10 is transferred to IWEEK, the week of year counter; if word 11 is true, word 12 is transferred to IMONTH, the month of year counter; if word 13 is true, word 14 is transferred to IDATE, the day of month counter; if word 15 is true, word 16 is moved to IYEAR, the current year location; and if word 17 is true, word 18 is transferred to IDSMO, the number of days in the current month. In all of the above instances, no date of modification takes place if the odd numbered word is false.

Input index 1 is used for logical data transmitted from the C machine twice per second into the buffers ALB2 and ALB3. The end action routine bids for the digital scan sublevel B007 to process the input.

Input index 2 is used for logical data transmitted from the C machine four times per second into buffers ALB4 and ALB5. The end action routine bids for digital scan sublevel B008 to process the input. The "control rod main" sublevel hereinafter described is also bid by this end action routine.

Input index 3 is used for integer data transmitted from the C machine twice per second into buffer AIB2. The end action routine bids for the 2 per second analog output handler hereinbefore described, The routine also moves 6 integers to system integer location which are CCVPV1 and 2, RCVP2A, B, C and D.

Input index 4 is used for integer data transmitted from the C machine four times per second into buffer AIB1. In this event, the end action routine bids for the four per second analog output handler described in connection with the A machine system software. The input index 4 end action routine also examines words 4 and 6 of buffer AIB1, which words are used for "snapshot", "freeze", and "periodic snapshots". If word 4 is zero, no action is taken. If word 4 is non-zero, it contains an index number 1–28 which is moved to locations $86_{16}$ and $87_{16}$ of memory. Then, if word 6 is non-zero, it is transferred to location $87_{16}$ of memory. Also, the "store conditions on disc" sublevel is bid.

Input index 5 is used for logical data transmitted from the B machine to the C machine to the A machine into buffers ALB6 and ALB7. The end action routine bids for "digital scan" sublevel B00A to process the input.

Input index 6 is intended for integer data transmitted from the B machine to the C machine to the A machine into buffer AIB6. However, in the present embodiment no data is being transmitted using this index number.

Output index 1 is used for logical data transmitted to the C machine twice per second from the buffers ALB8 and ALB9. The end action routine transfers integers MSVPO1, 2, 3, and 4 from system integer locations to the two per second integer buffer AIB4 to the C machine.

Output index 2 is used for logical data transmitted to the C machine four times per second for buffers ALB10 and ALB11. The end action routine is not used.

Output index 3 is used for integer data transmitted to the C machine twice per second from buffer AIB4. The end action routine bids for the "analog input scan" sublevel; and this sublevel is actually executed only once per second since it takes longer than one-half second to input all analog input points.

Output index 4 is used for integer data transmitted to the C machine four times per second from buffer AIB3. The end action routine is not used.

Output index 5 is used for logical data transmitted to the C machine and then to the B machine from buffers ALB12 and ALB13. The end action routine is not used.

Output index 6 is intended for integer data transmitted to the C machine and then to the B machine from the buffer AIB7. However, in the present embodiment, no data is being transmitted using this index number.

Store/Initialize Conditions On Disc

Two complementary sublevels are used to achieve the "snapshot" and "replay" functions required in the nuclear plant simulator. The complementary sublevels must save and restore, respectively, all variables which change as the plant dynamic simulation progresses, as time progresses, and as the instructor acts. The sublevels work together so that a replay of the simulation conditions as of 5 minutes ago, ten minutes ago, and so forth, can be a reality.

Figure 48A:
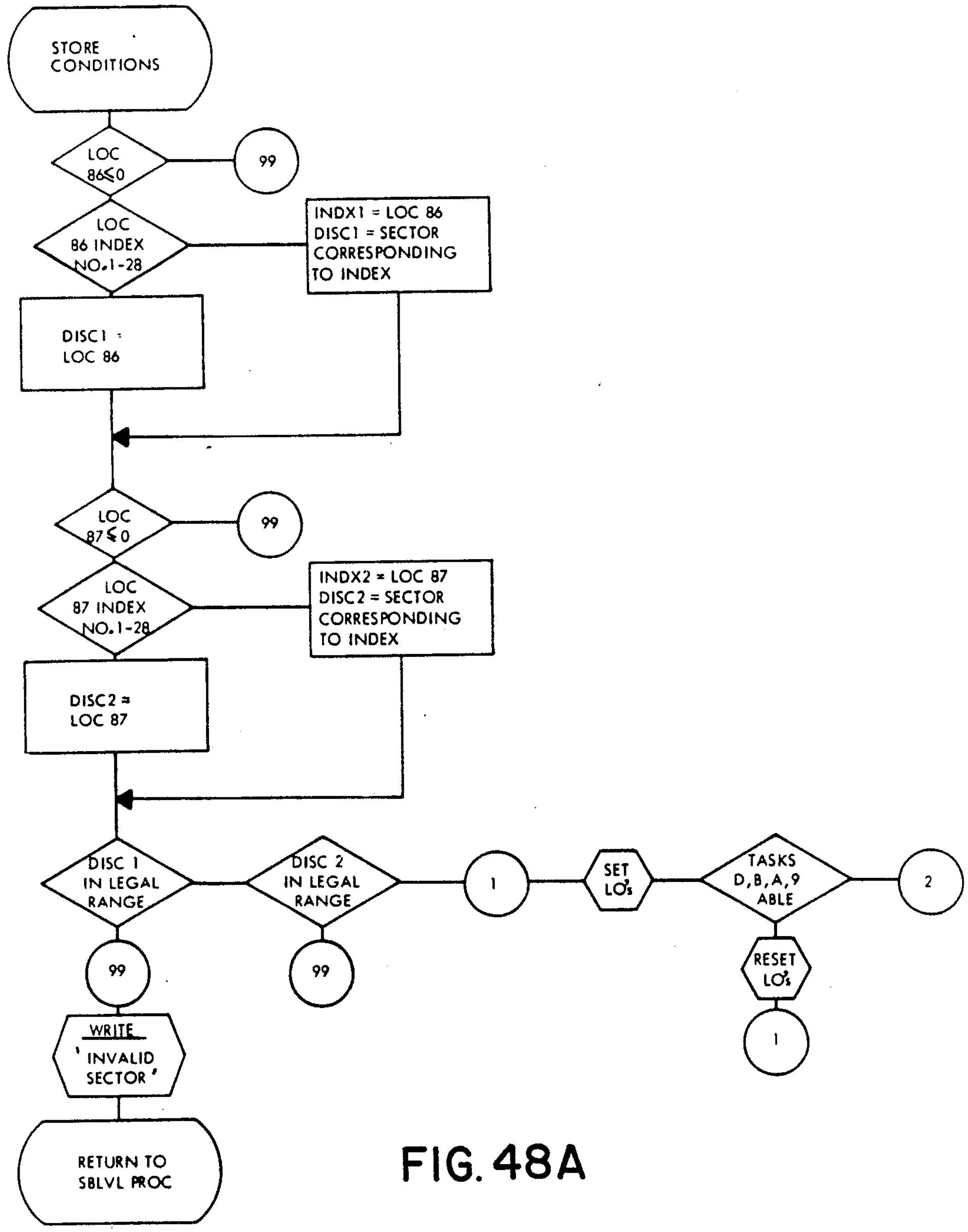
FIGS. 48A and 48B illustrate the store conditions on disc flow chart of the A machine.
Figure 48B:
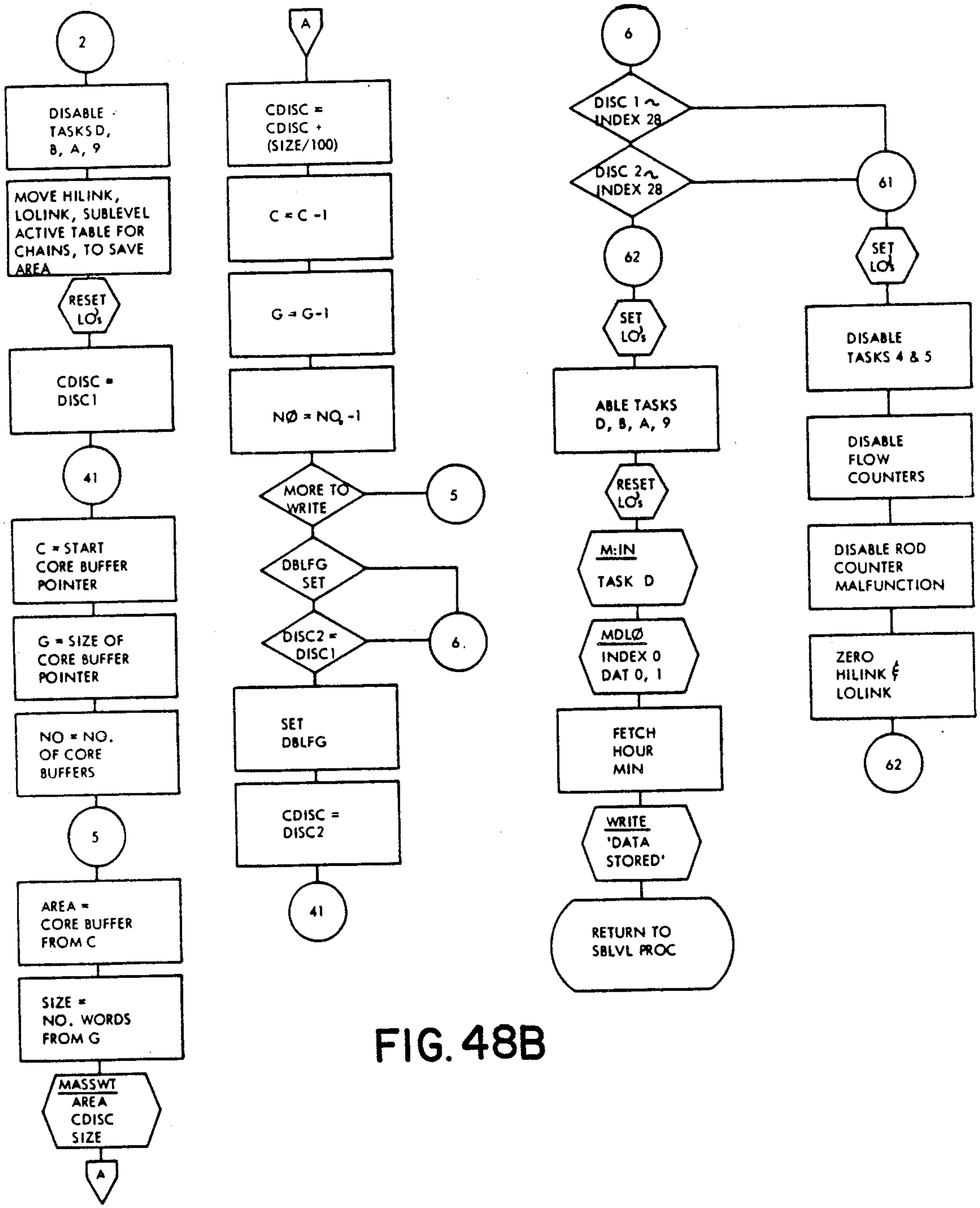
Figure 49A:
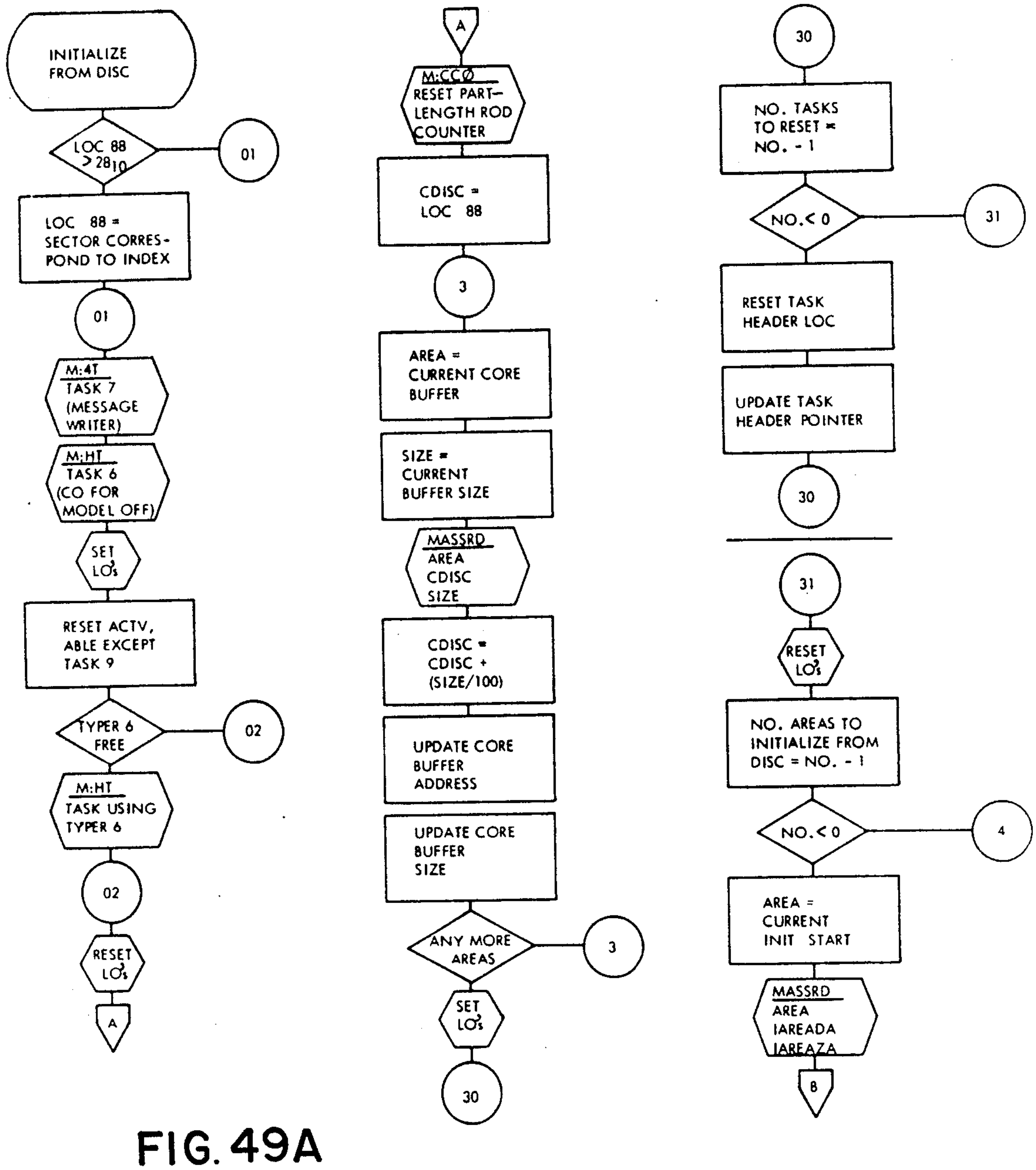
FIGS. 49A, 49B, 49C, 49D and 49E illustrate the flow charts for the initialize from disc subroutine for the A machine.
Figure 49B:
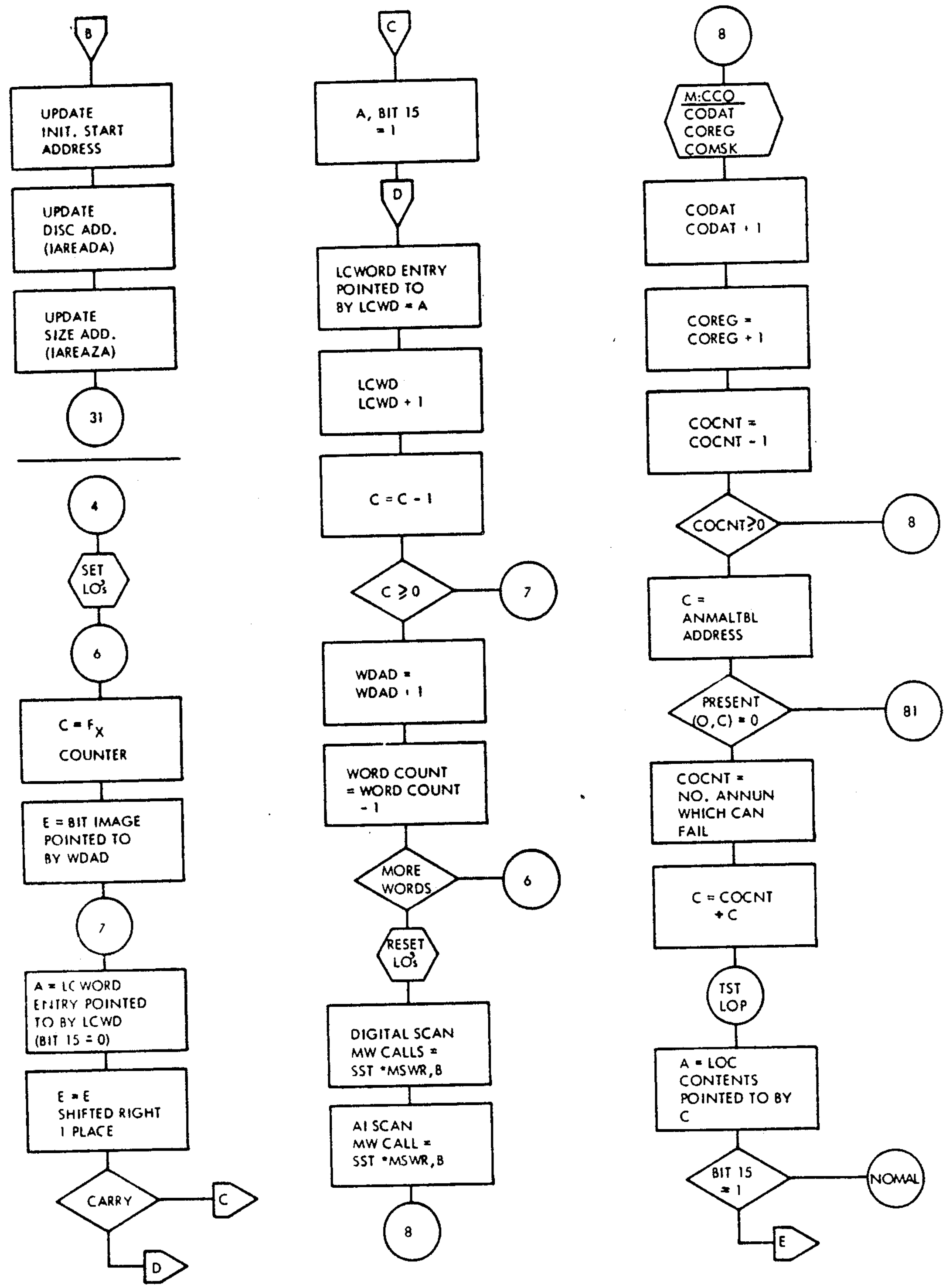
Figure 49C:
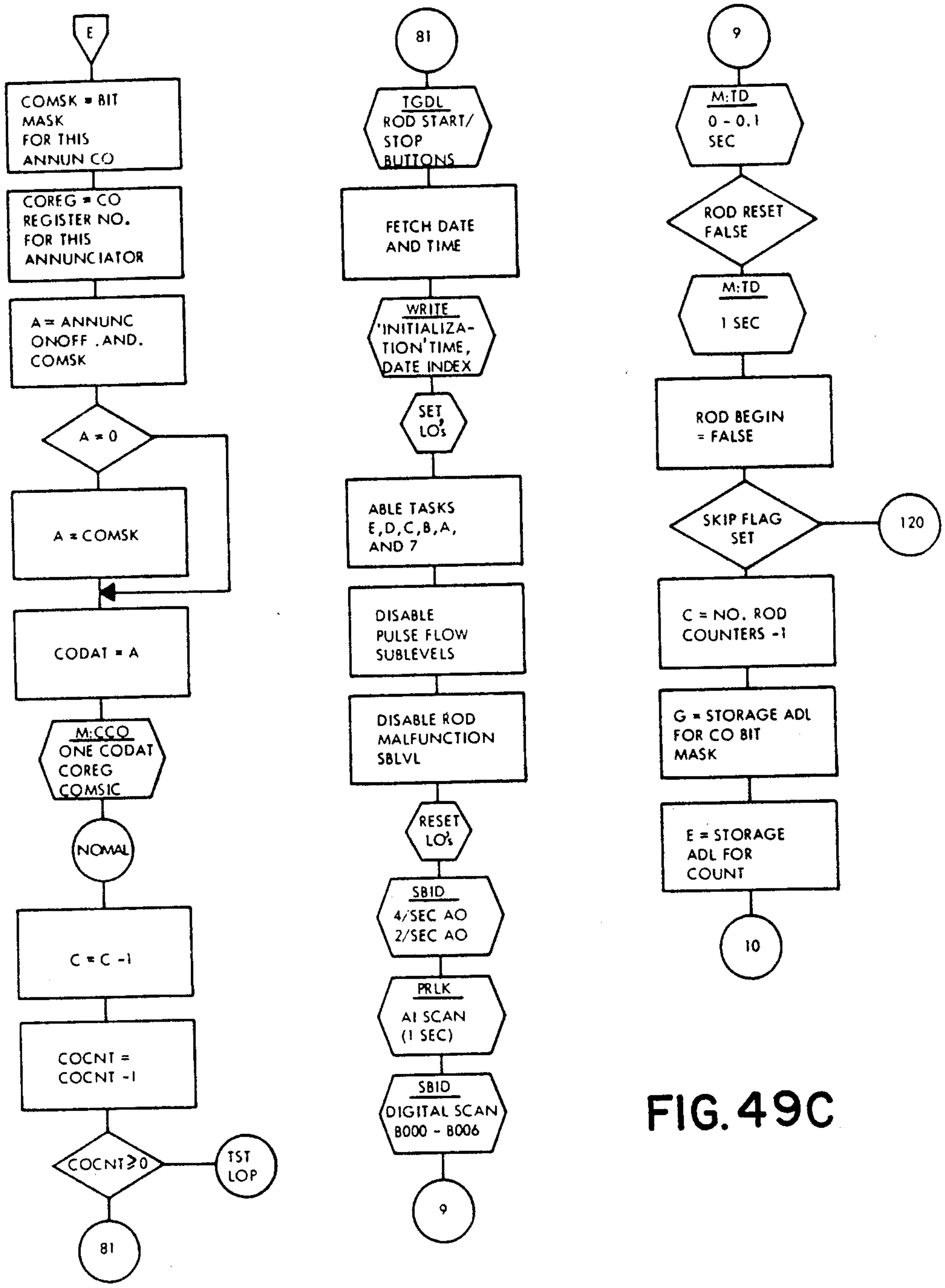
Figure 49D:
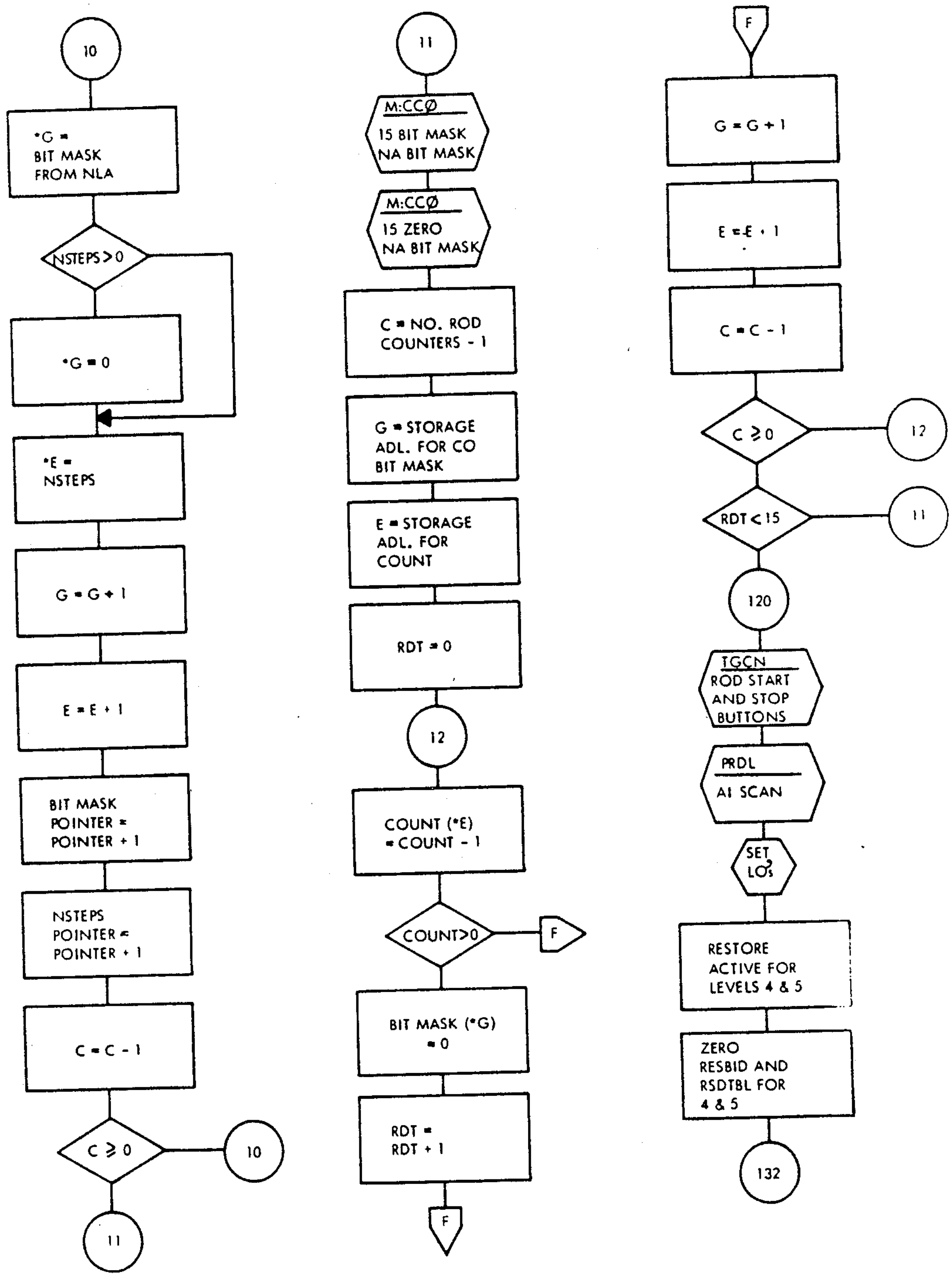
Figure 49E:
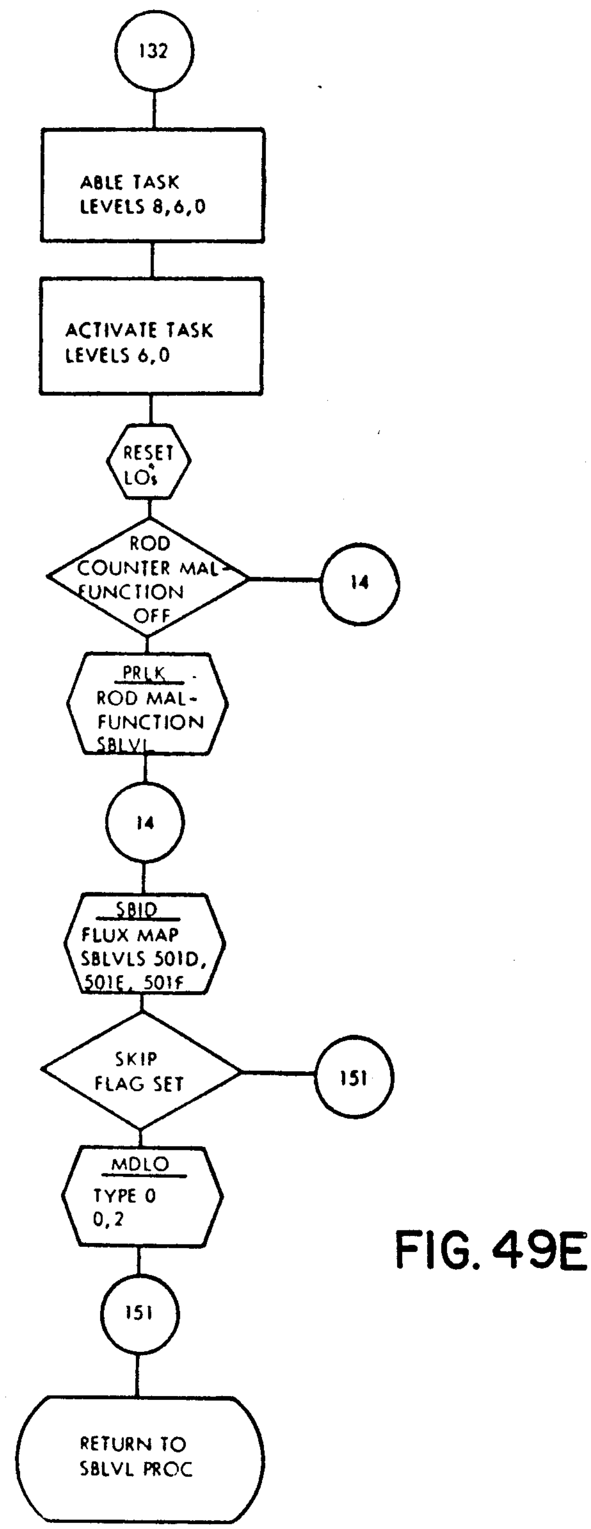

The "store conditions on disc" sublevel, the flow chart for which is shown in FIGS. 48A and 48B, is executed for snapshots on demand, periodic snapshots, and simulation freeze. Index numbers 1 through 28 are used to identify the various condition sets. Each index number corresponds to a unique disc area on which the condition set is saved. In case a periodic snapshot and a demand snapshot occur simultaneously, provision has been made to store two sets of conditions at once, using locations $86_{16}$ and $87_{16}$ of memory. If these two locations contain the same index number or starting disc sector, one set of data is saved. If the location contents are different, two sets of data are saved.

The data which is saved on disc consists of 6 core areas. The cores areas are the logical variable bit image tables, LIUSER, CBIT and LOUSER, location 839F-352$B_{16}$, 18$D_{16}$ words which area includes all bit logicals, contact inputs, and contact outputs; the system integers table FIXADK, locations E800-E8FF$_{16}$, 100 words; the "in alarm" bit table "LIALRM" locations 8668-87F4$_{16}$, 18$D_{16}$ words, which is used by the digital scan to indicate messages waiting to be printed; the integer table and buffers at locations 1A70-1E70$_{16}$, 401$_{16}$ locations, which area includes the analog output channel table, the data link integer buffers, etc.; the common for the reactor control rod simulation locatons B600-B7F2$_{16}$, 1F3$_{16}$ words; and the logical time delay buffers LBLMAM at locations D800-DAFF$_{16}$, 300$_{16}$ words. The aforementioned saved data occupies a total of 15 disc sectors.

Referring to the flow chart of FIGS. 48A and 48B , during the sublevel execution, task levels D, B, A and 9 are disabled. Since level D is the sublevel processor, no disc-resident sublevels can be initiated. Task levels B, A, and 9 include the digital scan, flow meter sublevels, and reactor control rod programs.

Index number 28 is used for simulation freeze. When this index is used, the chain task levels are disabled and programs which run periodically are also disabled. These disabled programs are abled by "model start".

The initialization sublevel, the flow chart for which is shown in FIGS. 49A through 49E , sets up the A machine according to one of 28 condition sets which have been saved on disc for initial conditions, or by snapshots. In initializing, first the running system must be disabled so that a new system can be input. This is accomplished by halting the message writer to stop any input/output in progress, halting task level 6 which sets a CO when the simulator is not running, and disabling and deactivating all task levels except 9 which is the initialization level. The part-length reactor control rod counter is also reset to zero. Then, the tables are initialized. The six areas saved by the "store conditions" sublevel previously described are input to their respective areas. The task Z:STRT table is initialized to be the same as the Z:ORIG tables for task levels 0, 4, 5, 6, 7, 8, A, B, C, D, and E so they restart at the beginning. The message writer tables are initialized by reading them from discs. The data center task headers are also input from disc. Since only the logical variable bit tables were saved on disc, the word table is constructed to be the same as the bit table. Thus, the tables LIUSER, LCBIT, and LOUSER with 16 variables per word, are used to set up the table LCWORD with one variable per word.

The switches and dials on the control panels must be manipulated by the operator to correspond to the conditions set. The light and indicators are output according to saved data.

With respect to setting up the control panels, in case the printout from the digital scan and analog input scan has stopped, the locations are restored so that messages can be output; all CO's are output according to the saved data; if any annunciators are malfunctioned, they are then output according to the malfunctions rather than according to their logical value; and as part of the operator action, the "rod control start up" pushbutton is pressed when the operator completes setting up the panels. This pushbutton, which normally causes a reactor rod simulator program to be executed, is "disconnected" from the rod program. Further, in setting up the control panels, a message is output specifying the dates, time, and conditions set; the tasks necessary for the printout of incorrect switches and dials are abled, which are task levels E, D, C, B, A, and 7; periodically running sublevels for the flow counters and for the rod counter malfunctions which are disabled, and are abled by the "model start" sublevel; and the sublevels for the analog output meters, digital scan and analog input scan are bid for; and the programs will print messages. Finally, a time delay is executed. Each time the program runs, it examines the status of the "rod control startup pushbutton". If the pushbutton has not been pressed, the time delay is executed again.

In initializing, and while the initialization program is "waiting" nothing is done until the printout of the incorrect switches is complete. Then, after the printout of the incorrect switches the operator changes the state of the switches and dials which appear on the printout. When this is accomplished, the operator presses the "rod control startup" pusbbutton.

The rod counters are reset to zero when the "rod control startup" pushbutton is operated. Thus, the final section of the initialization sublevel consists of stepping the rod counters to the proper value determined by the initialization. These rod counters are not stepped up if location $9D00_{16}$ is cleared to zero after initialization starts and before the "rod control startup" pushbutton is operated. Then, the "rod control startup" pushbutton is again "connected" to the rod program. The analog input scan, which is normally bid by a data link end action routine, is removed from a periodic bid. Then, in case chains on levels 4 and 5 have been activated by panel switch manipulation, the tables for these levels are cleared. The "active" table locations for the chains ware saved on disc as part of the integer buffer area; and these are restored. The special "debug type" tasks on levels 8, 6 and 0 are abled. If a control rod counter malfunction was in progress prior to initialization, a periodic bid for this sublevel is made. The initialization chains for the flux mapping system are bid. Finally, if locations $9D00_{16}$ is non zero, a data link output is accomplished to indicate successful initialization of the A machine.

Initiate Training Exercise

The "Initiate training exercise" sublevel determines whether or not the A machine is ready for simulation. This sublevel tests to make sure that the necessary task levels are able to run, and that the 60 Hertz synchronizer request is entering the A and B machines. This sublevel executes a data link call to transmit zero or non zero (okay or not okay) back to the B machine by way of the C machine.

Malfunction Chains and Sublevels

In the simulation of malfunctions such as the opening or closing of valves, or dropping of rods, for example, chain M35TRG on sublevel 401D, M35CHN on sublevel 401B, M63TRG on sublevel 401E, and M63CHN on sublevel 401C are executed according to the various functions or malfunctions involved.

Figure 50A:
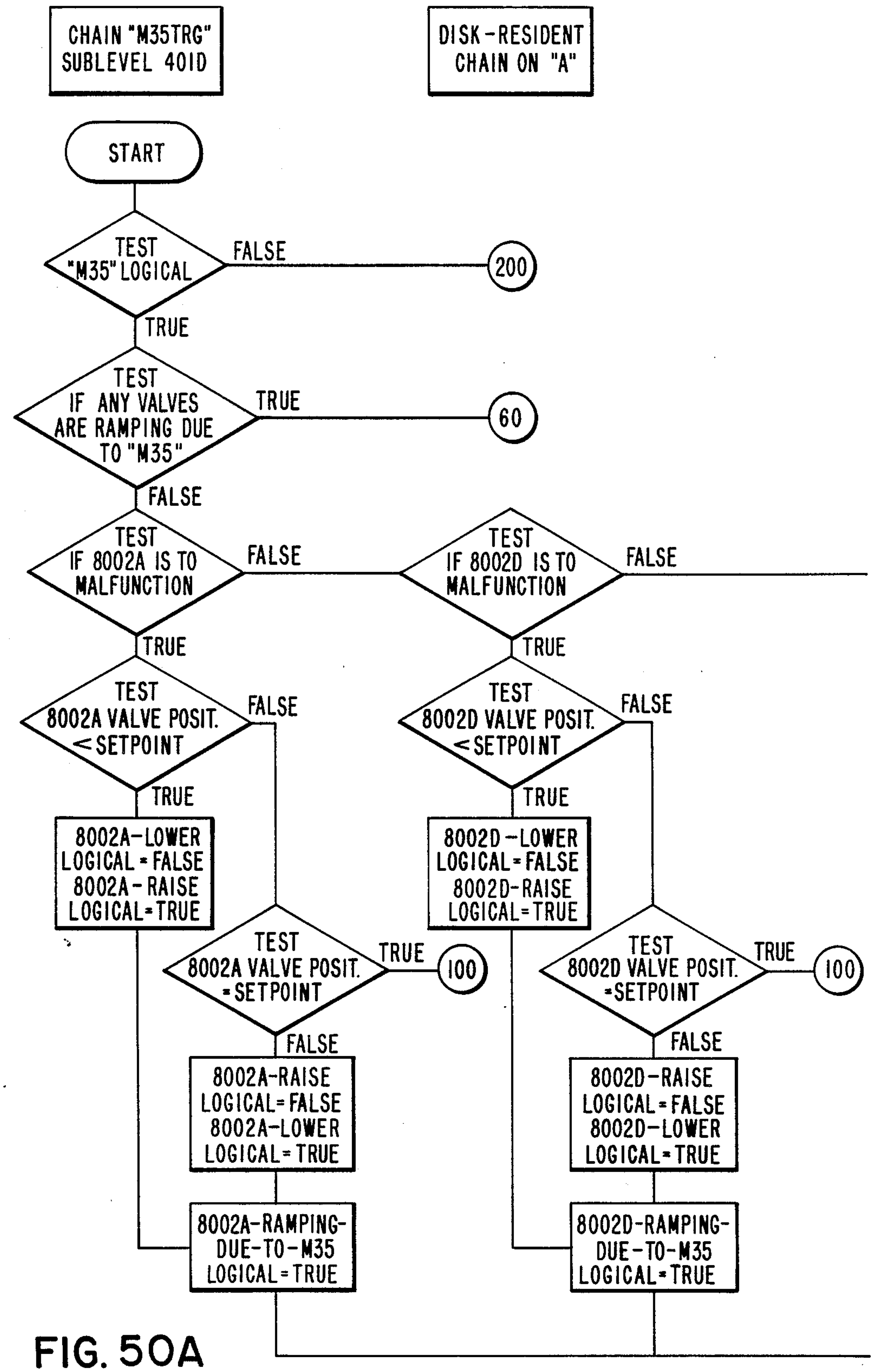
FIGS. 50A, 50B and 50C illustrate the flow charts for the malfunction PROGEN trigger chain M35TRG.
Figure 50B:
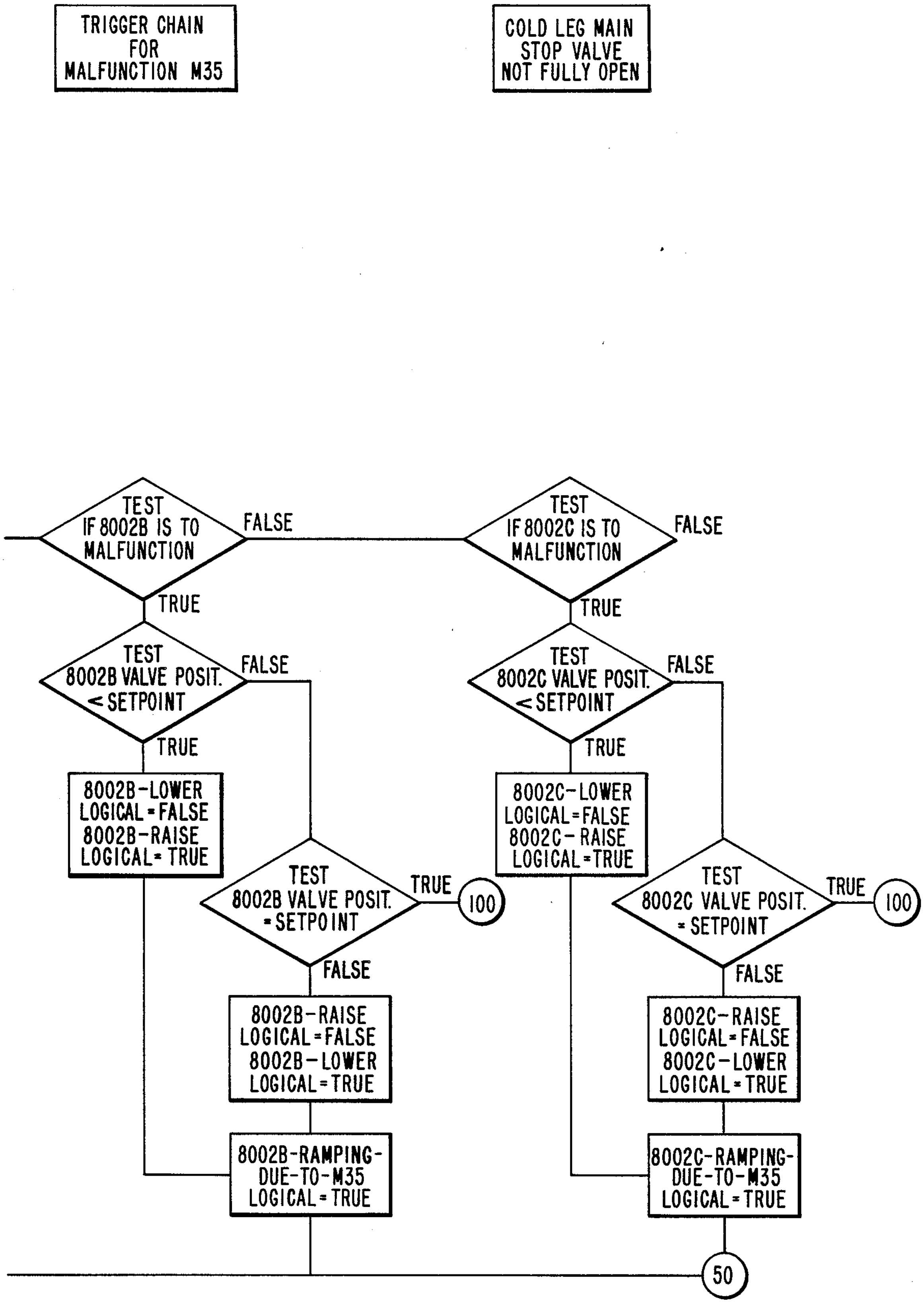
Figure 50C:
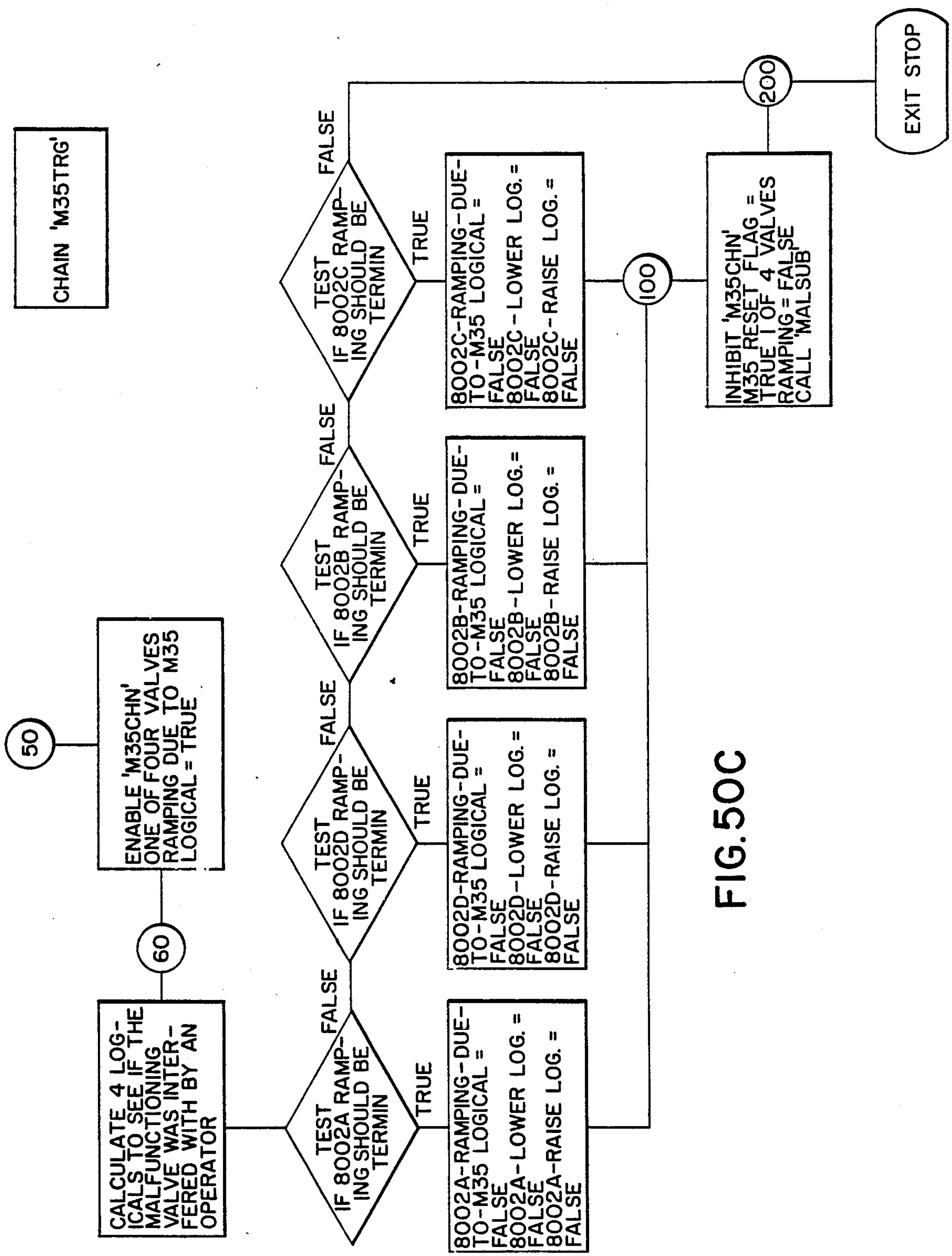

Referring to the flow chart of FIGS. 50A, 50B and 50C, the PROGEN chain M35TRG is triggered by the activation of malfunction M35. The malfunction M35 involves one of the cold leg stop valves in any of the four loops of the RCS system; that is, either valve 8002A, 8002B, 8002C, and 8002D as not being fully open. The actual trigger is the setting of the A machine logical M35 by the malfunction sublevel MALLVL. This chain initiates the ramping of one of the four cold leg stop valves 8002A, B, C or D. This is accomplished by comparing the valve position corresponding to the index M35V2; namely, RCVP2A, RCVP2D, RCVP2B, or RCVP2C, to the setpoint M35V3; and setting the approprite "raise/lower" logicals for the C machine valve handler. The index and setpoint are specified by the instructor, using the VALUE2 and VALUE3 pushbuttons on the instructor's console, respectively. The index varies from one to four, corresponding to the switch location of these valves on the control panel. The setpoint is given as percent of the full open position by the instructor, and is then converted to a percent of 8192, which is the full open position, to be compatible with the valve position sent to the A machine from the C machine valve handler. Both the index and the setpoint are transmitted from the B machine by the instructor's console programs MALINT or MALDEL in the VALUE2 and VALUE3 positions of the data buffer. After initiating the ramping, the chain M35TRG enables the chain M35CHN, which continues the operation on a periodic basis.

If the operator takes appropriate action to terminate the malfunction by setting the proper switch, chain M35TRG is again triggered for the purpose of terminating the ramping. This is accomplished by the resetting of the associated "raise/lower" logicals for the valve handler, disabling M35CHN, and sending a message to the B machine to terminate malfunction M35. This transmission to the B machine is accomplished by calling MALSUB, a FORTRAN IV Program operating on sublevel 9003, which sends a type index 0 and code 8 transmission message.

Figure 51A:
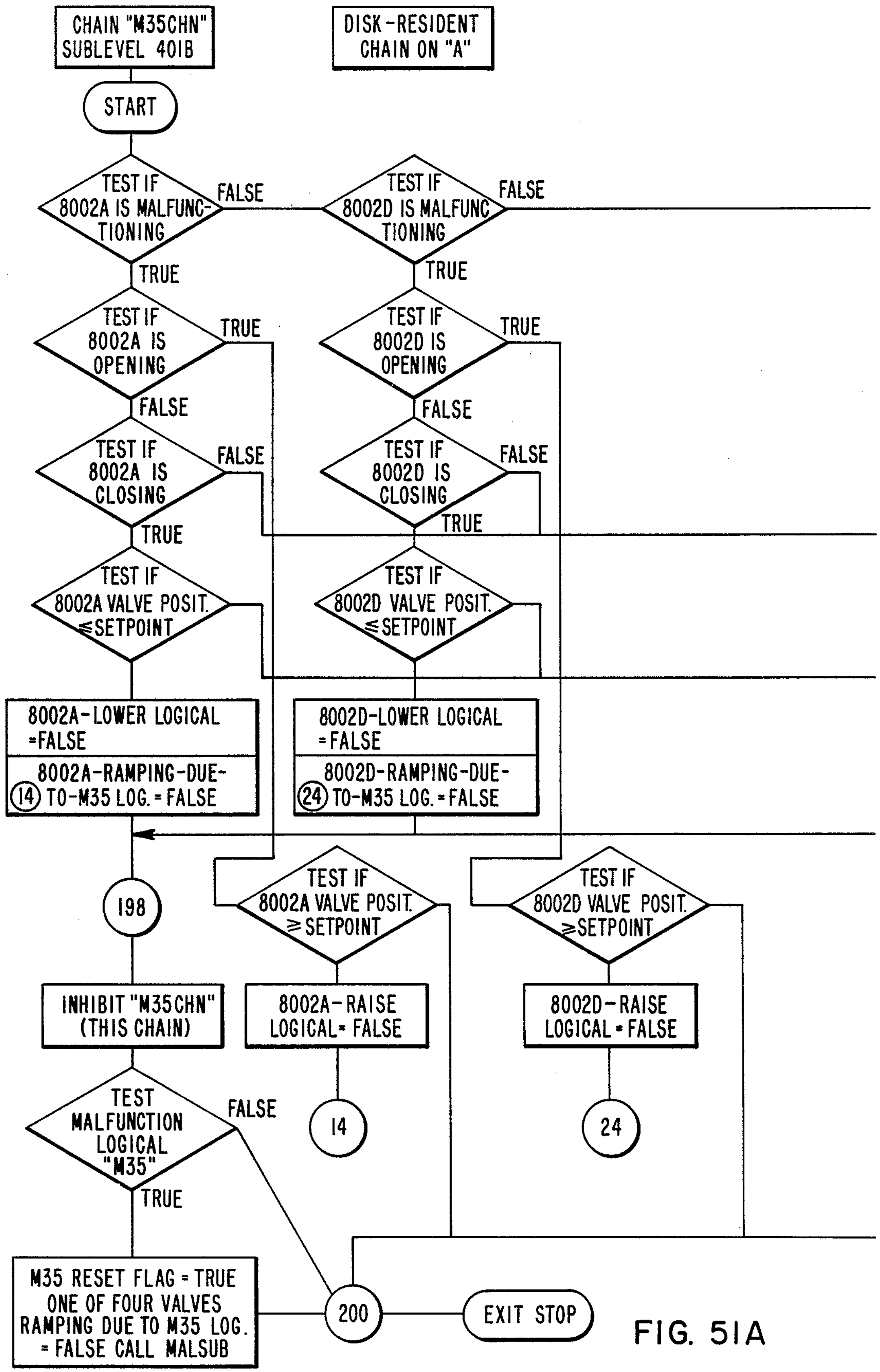
FIG. 51 illustrates the flow chart for the malfunction chain M35CHN.
Figure 51B:
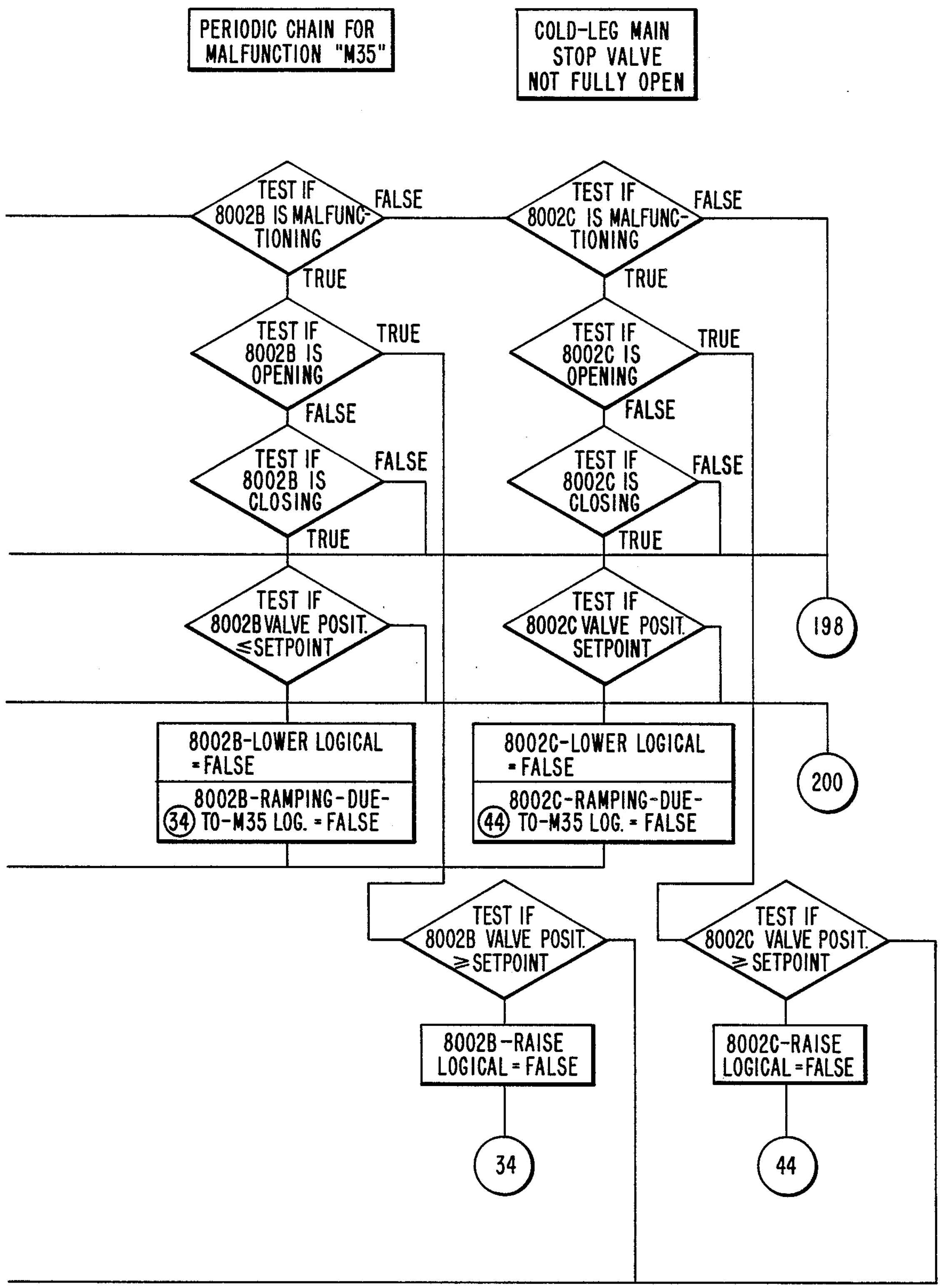

Referring to the flow chart of FIGS. 51A and 51B, the chain M35CHN for the cold leg stop valves, is periodic; that is, it is initiated every one-half second, and starts to run when enabled. Two events enable the chain M35CHN, the M35TRG chain enable call, and the startup of the simulator. At the startup, since all chains are initialized "enabled" M35CHN will run. At this time, it will disable itself unless a legitimate call for its function exists; that is, a flag for malfunction M35 is set. When enabled by the malfunction chain M35TRG, it continues the supervision of the ramping of one of the four cold leg stop valves initiated by M35TRG for malfunction M35. This is accomplished by comparing the valve positions with the setpoints as described in connection with the description of the chain M35TRG. Whenever the valve position reaches or passes the setpoint, the appropriate raise/lower logicals are reset to terminate the movement of the valves as simulated by the C machine valve handler. Also, the B machine is notified via the routine MALSUB to terminate malfunction M35.

Figure 52:
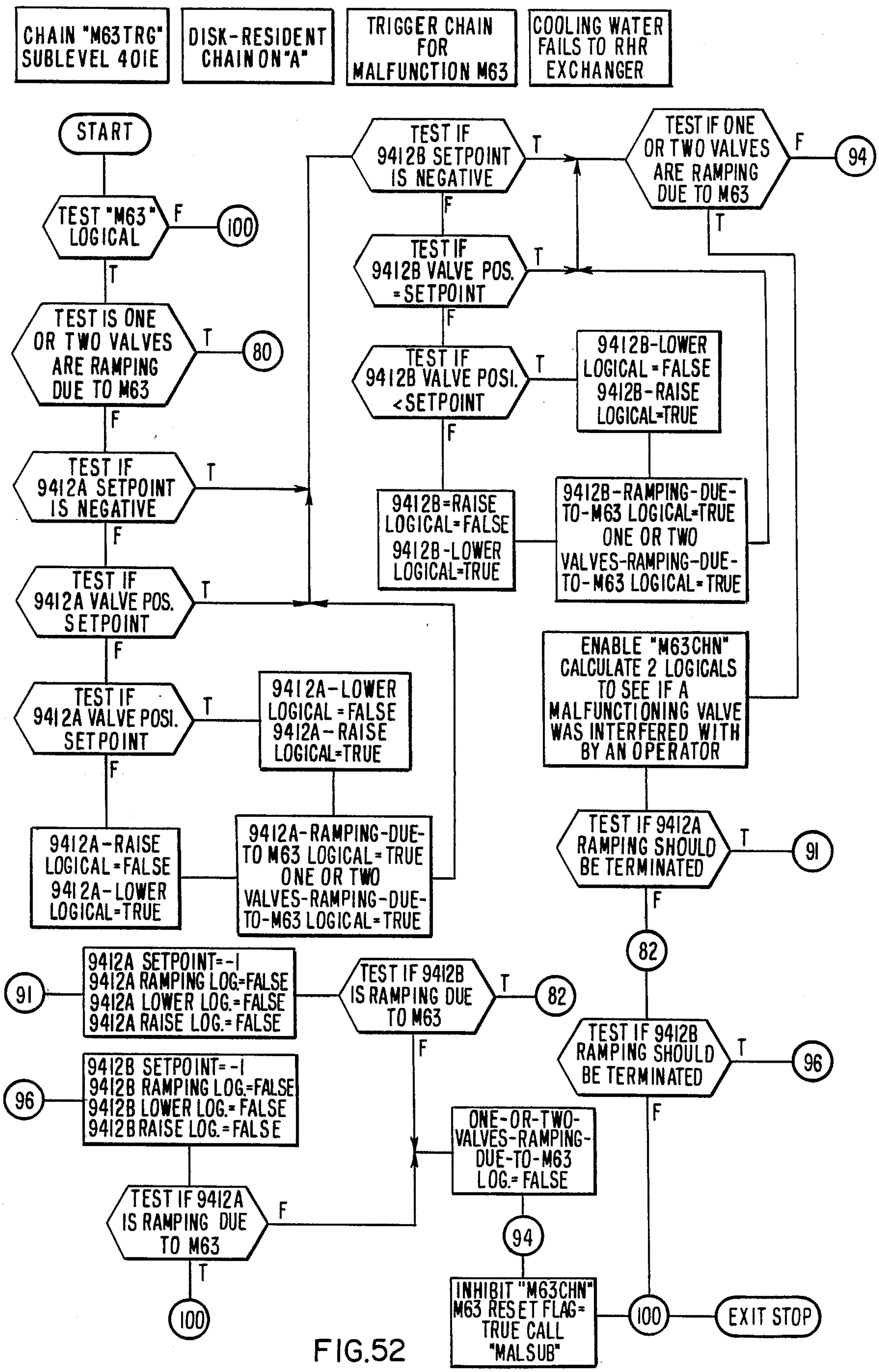
FIG. 52 illustrates the flow chart for the malfunction trigger chain M63TRG.

Referring to the flow chart of FIG. 52, the chain M63TRG, which is the trigger chain for the malfunction M63, which involves the failure of the cooling water to the residual heat removal heat exchangers, operates in a manner like the trigger chain M35TRG for the malfunction M35. The malfunction M63 is concerned with the simulated operation of the valves 9412A and 9412B at the inlet of the RHR heat exchangers. The trigger mechanism is the setting of the M63 logical by the malfunction sublevel MALLVL. When triggered by M63, the chain M63TRG initiates the ramping of motor operated valves 9412A or 9412B singly or together. The ramping is accomplished by comparing the valve positions CCVP1 and/or CCVPV3 with the corresponding setpoints M63V2 and M63V3, and setting the appropriate raise/lower logicals for the C machine valve handler. After initiating the ramping, it then enables chain M63CHN which continues the operation on a periodic basis. This chain M63TRG is also triggered if an operator takes action to correct the malfunction M63 by setting the appropriate switch. When triggered by this action, the chain terminates the malfunction by resetting the associated raise/-lower logicals, disabling M63CHN, and sending a message via MALSUB to the B machine to terminate malfunction M63.

Figure 53:
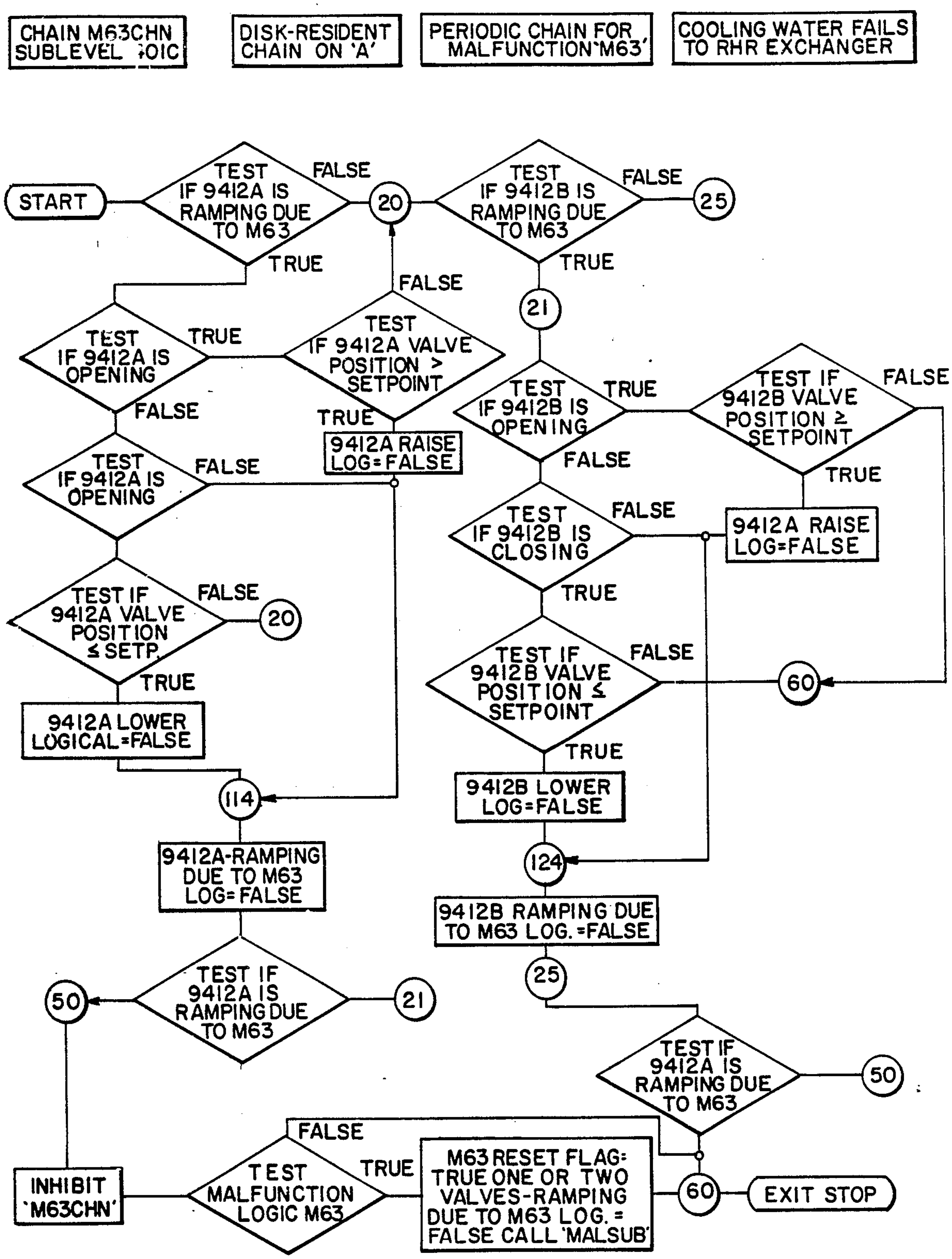
FIG. 53 illustrates the malfunction chain M63CHN flow chart.

Referring to FIG. 53, the chain M63CHN is initiated every one-half second, which corresponds to the operation of the time step of the valve handler and starts to run when enabled. The events which enable the chain M63CHN are like the events that enable the chain M35CHN previously described. When enabled by the chain M63TRG, it continues the supervision of the ramping of one or both of the valves 9412A and 9412B. Such ramping is accomplished in the same manner as it is for the malfunction M35 previously described.

Simulation Information

The A machine contains several programs which are not essential to the nuclear plant simulation, but provide information for the simulator user about simulation on the A machine. The first program is CO for model "off". Task 6 is used to light an indicator R4EA2S whenever the model is not running. A location called TESTLOC is used to determine the state of the model. Task 6 stores minus one in TESTLOC before it executes a one second time delay. Then, if TESTLOC still contains minus one, a CO call is made to light the indicator. If TESTLOC is zero, that is, cleared by the logical 5 to A, two per second end action routine, a CO call is made to turn off the indicator. Task 6 repeats this action after the CO call.

Another of the information tasks is the timing task termed task zero which is used to calculate the system duty cycle. This task runs continuously when no other tasks, sublevels, or interrupts want to run. It calculates and stores an integer representing the average main frame time used by the remainder of the system in a five minute period. The duty cycle integer is stored in location $\mathbf{B500}_{16}$. Finally, the task to print variables true/-fault status or the variable change printout is task 8, which is used to print a change in state of up to 16 logical variables, each triggering a different sublevel, $\mathbf{8000\text{–}800F}_{16}$ on level 8. Whenever a sublevel on level 8 is initiated, the sublevel number is used as an index to tables containing names of variables and addresses. The variable state is set and a message is then output as "varname-xxxxx" where "xxxxx" is true or false. The tables used by this task level 8 are NAMETB and ABSLC. NAMETB contains $3\times16$ words, where each group of 3 words contains a logical variable name. ABSLC contains 16 words, where each word contains the absolute address of the logical variable; that is, the LCWORD address.

Protection Logic

The plant protection logic is implemented in the simulator by PROGEN chains. The A machine includes 40 of the PROGEN chains to provide the logic equivalent for the various trips and protective devices which are included in the embodiment of the power plant being simulated. These chains are designed to run only on change-of-values for an input logical, which is the normal operating mode for the PROGEN system. Analog controls for the protection logic are programmed with the model. The power relief valve, and reactor coolant pump and stop valve interlocks, and certain coordinates of the secondary side trips are programmed with the panel interface logic. Pressurizer heater controls and limit checks, which set contact outputs only, are programmed with the models.

Control Panel Interface Logic

The interface logic chains, which are included in the A machine, simulate the function associated with the interlock logic of the described embodiment of the invention being simulated, which is associated with the reactor control and engineering safeguards panel. Each item containing contacts on the control panels, with the exception of all the pushbuttons which are interfaced directly with the protection logic, has a corresponding logic sheet. The panel items are divided into functional groups, which in turn are programmed as PROGEN chains. A description of examples of selected chains, insofar as is necessary to an understanding of the present embodiment of the invention are described hereafter.

Off-Line Utility Software For The A Machine

The off-line software, which is executed when simulation is not running is divided into three categories: data manipulation, print programs, and test programs.

The data manipulation software includes the PROGEN file system loader, link logical variables, and unlink logical variables. The print program software includes the file map in alphabetical order, logical linkage summary, and logical variable list in numeric order. The test program includes the data link test.

Figure 54A:
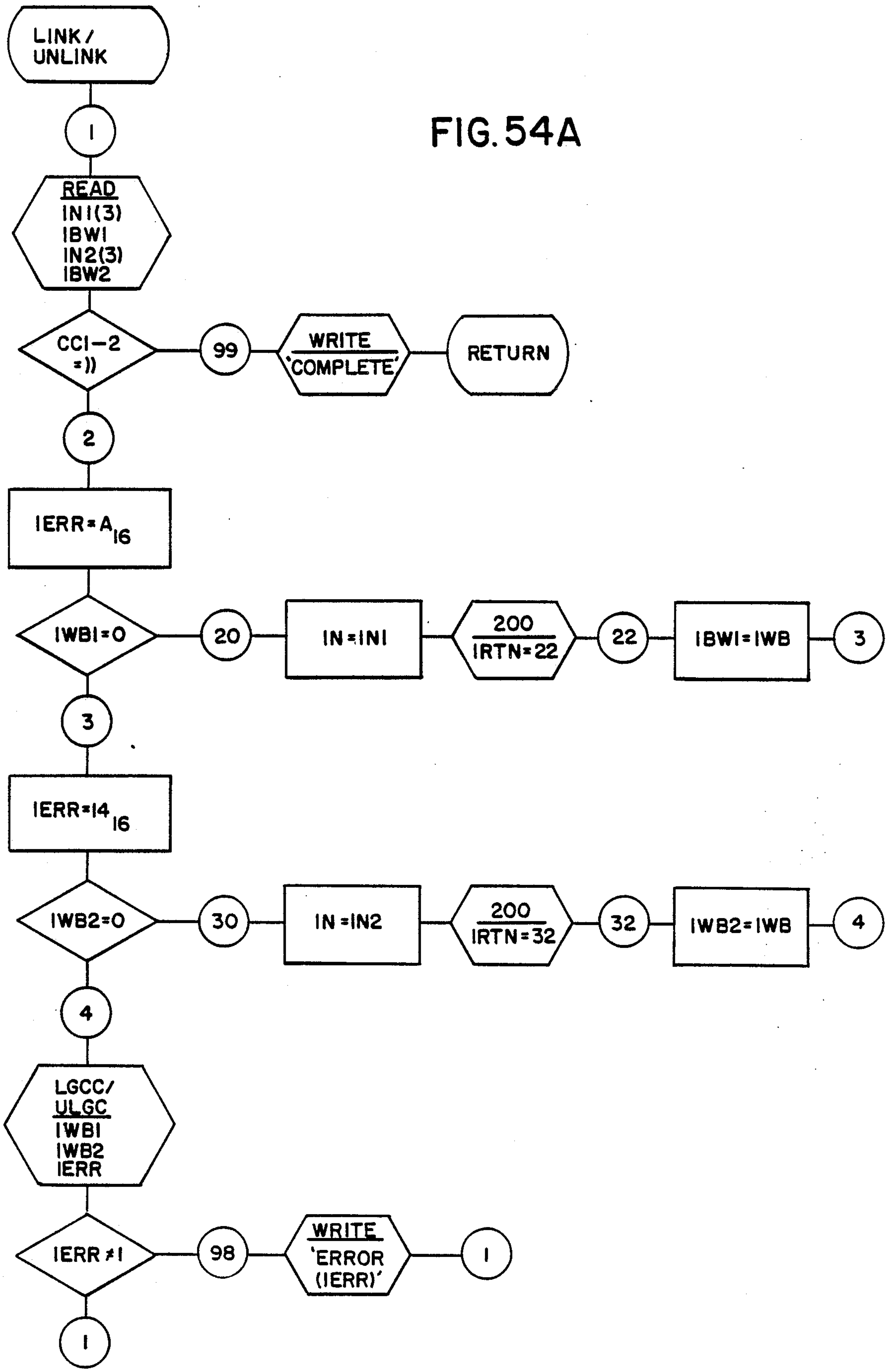
FIGS. 54A and 54B illustrate the flow charts for the logical variable link and unlink sublevels.
Figure 54B:
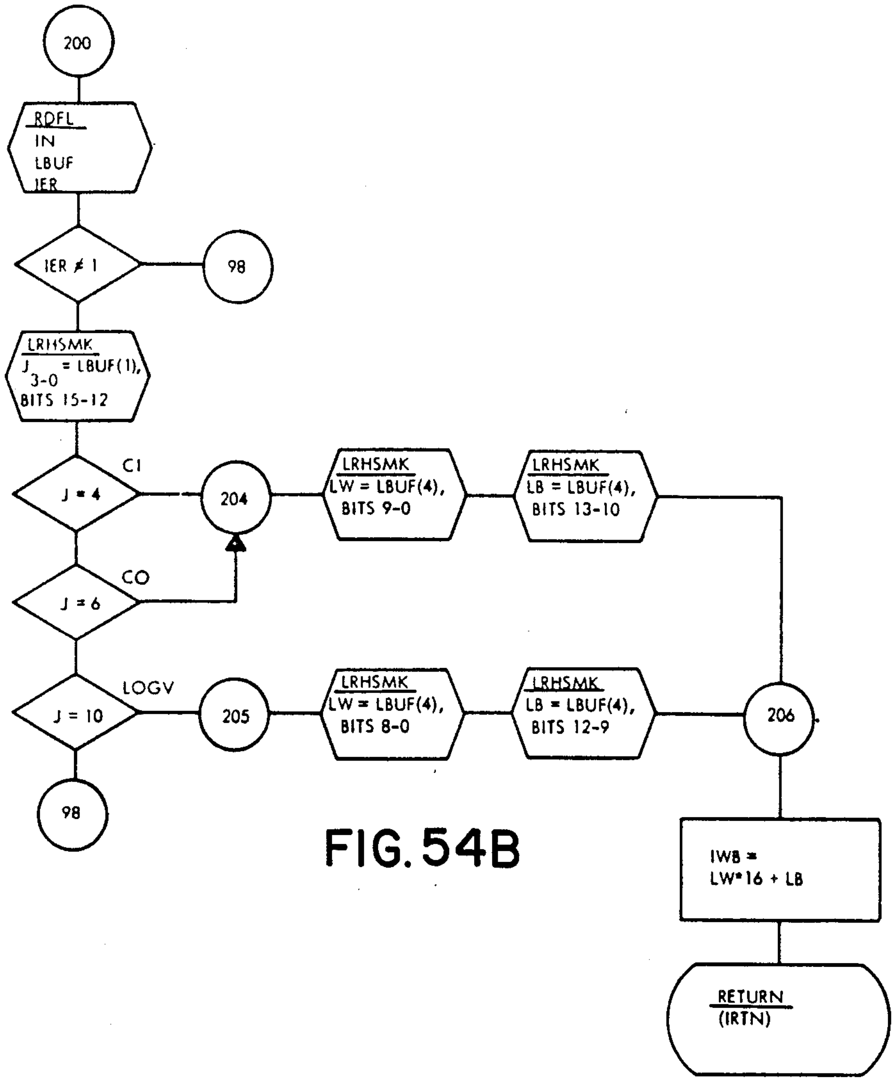

Referring to the flow chart of FIGS. 54A and 54B, the logical variables are linked and unlinked using a subroutine in the digital scan whose entry arguments are the source relative address, the target relative address and an error flag word. The link and unlink sublevel accept card reader input describing the desirable and undesirable linkage by names or relative addresses, performs error checking, and calls the digital scan subroutine.

Figure 55A:
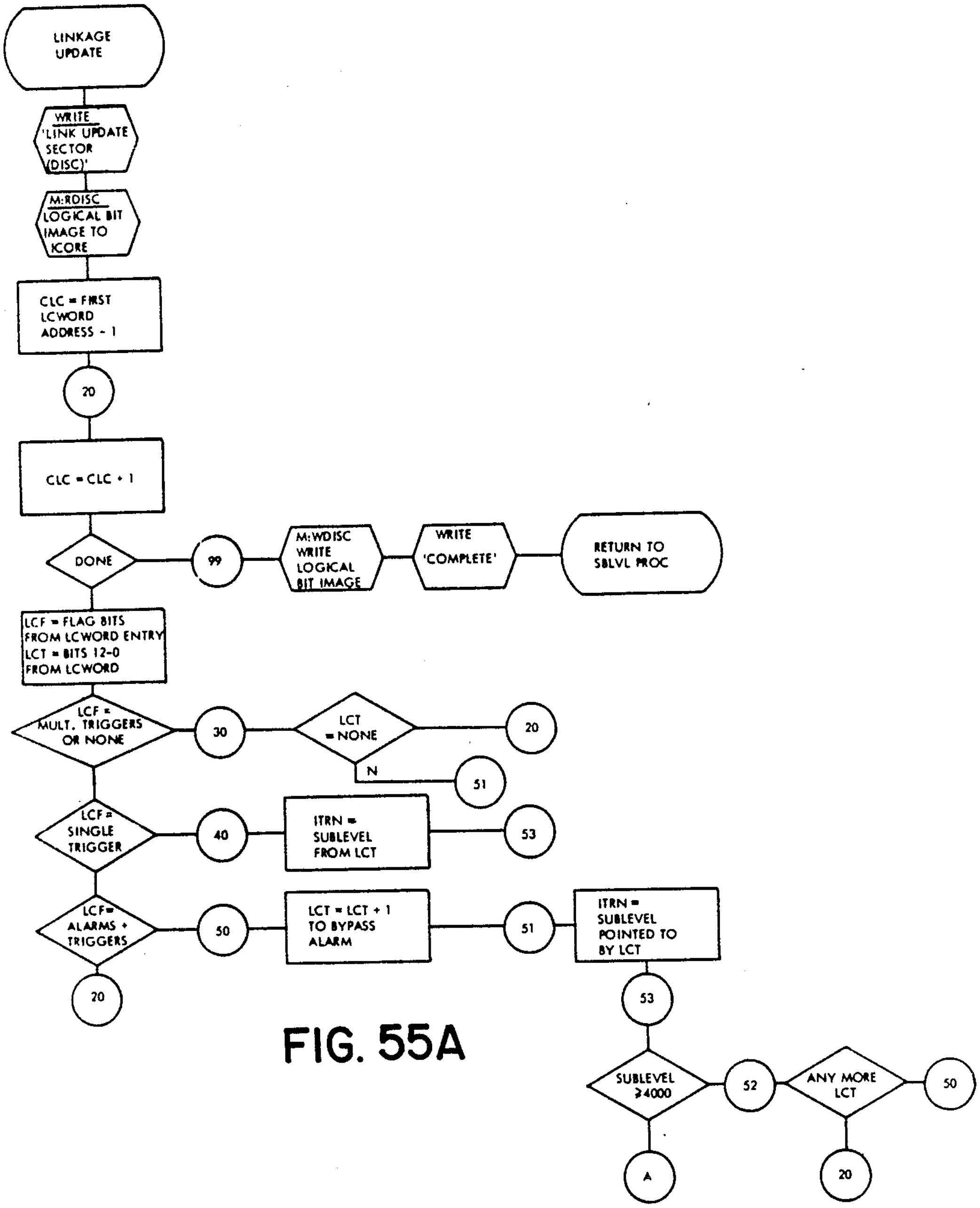
FIGS. 55A and 55B illustrate the flow charts for the linkage update sublevel.
Figure 55B:
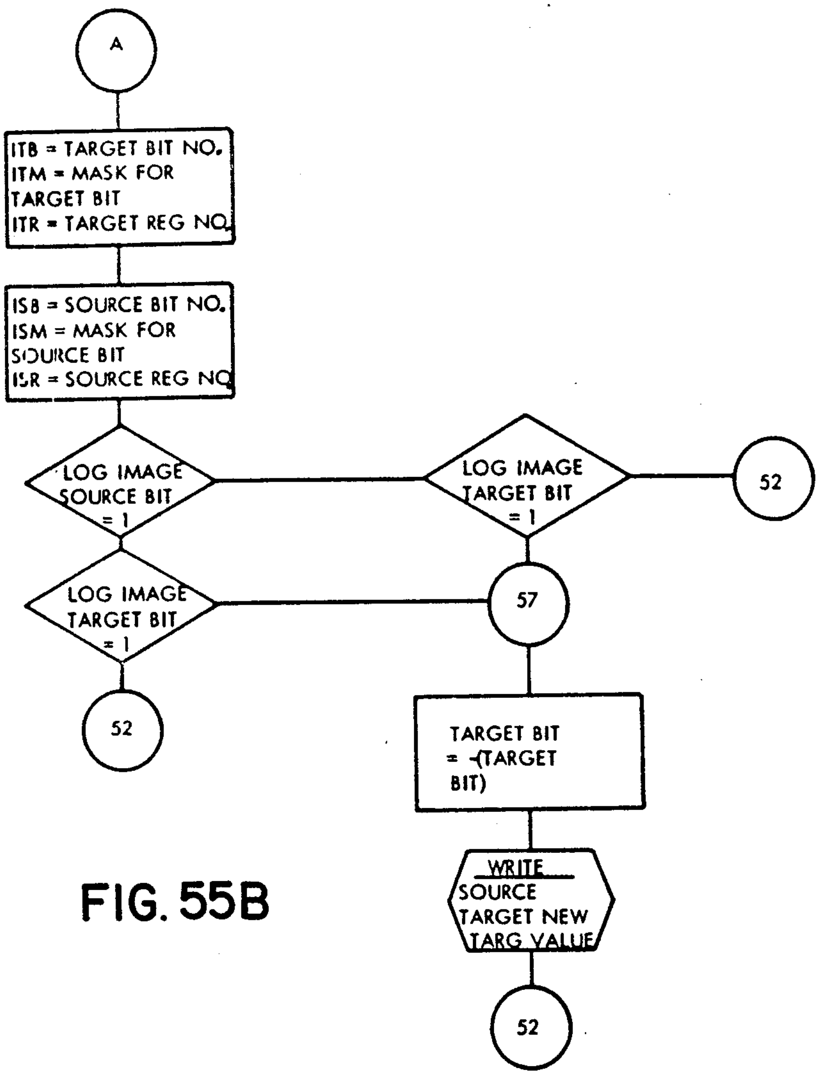

Referring to the flow chart of FIGS. 55A and 55B, when logical variable linkages are updated using the link and unlink sublevels previously described, the saved conditions pertaining to initial conditions and snapshots must also be modified. The linkage update sublevel examines all linkages in a particular condition set, and if a discrepancy is found, the linkage update sublevel changes the target variable so that it has the same state as the source variable.

The initial condition/snapshot modification program provides the ability to list any word and change in bit in all of the initial condition and snapshot data set. This program uses three tables to define the locations to be changed and the new values to be used. The output includes the relative sector number, the absolute sector number, the relative location in the sector, the old value, and the new value. The user may, at run time, elect to print out the changes in all the data sets or only in the first sets, actually change the information on disc or not, and select the output device.

Figure 56A:
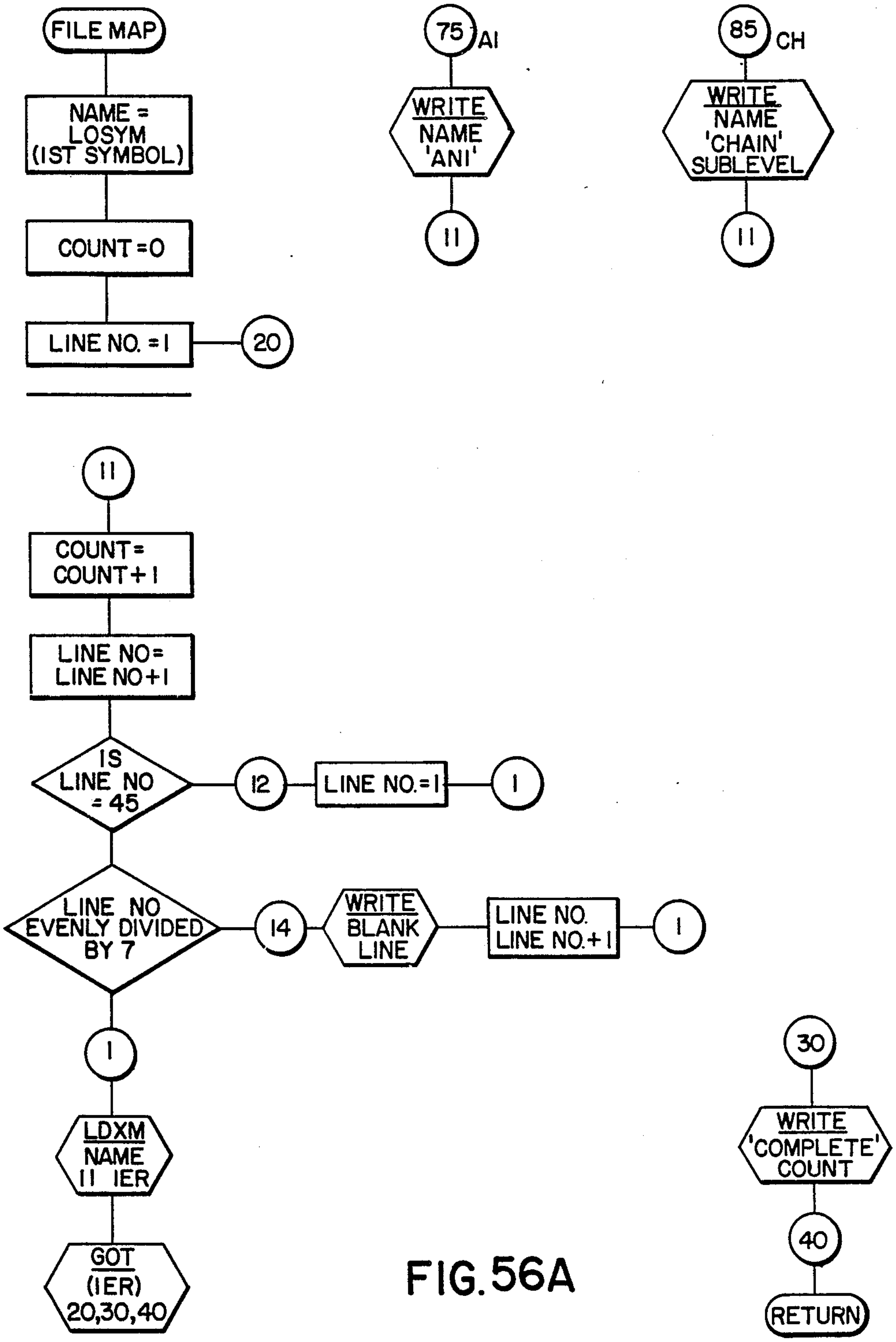
FIGS. 56A and 56B illustrate the flow charts for the file map of the A machine.
Figure 56B:
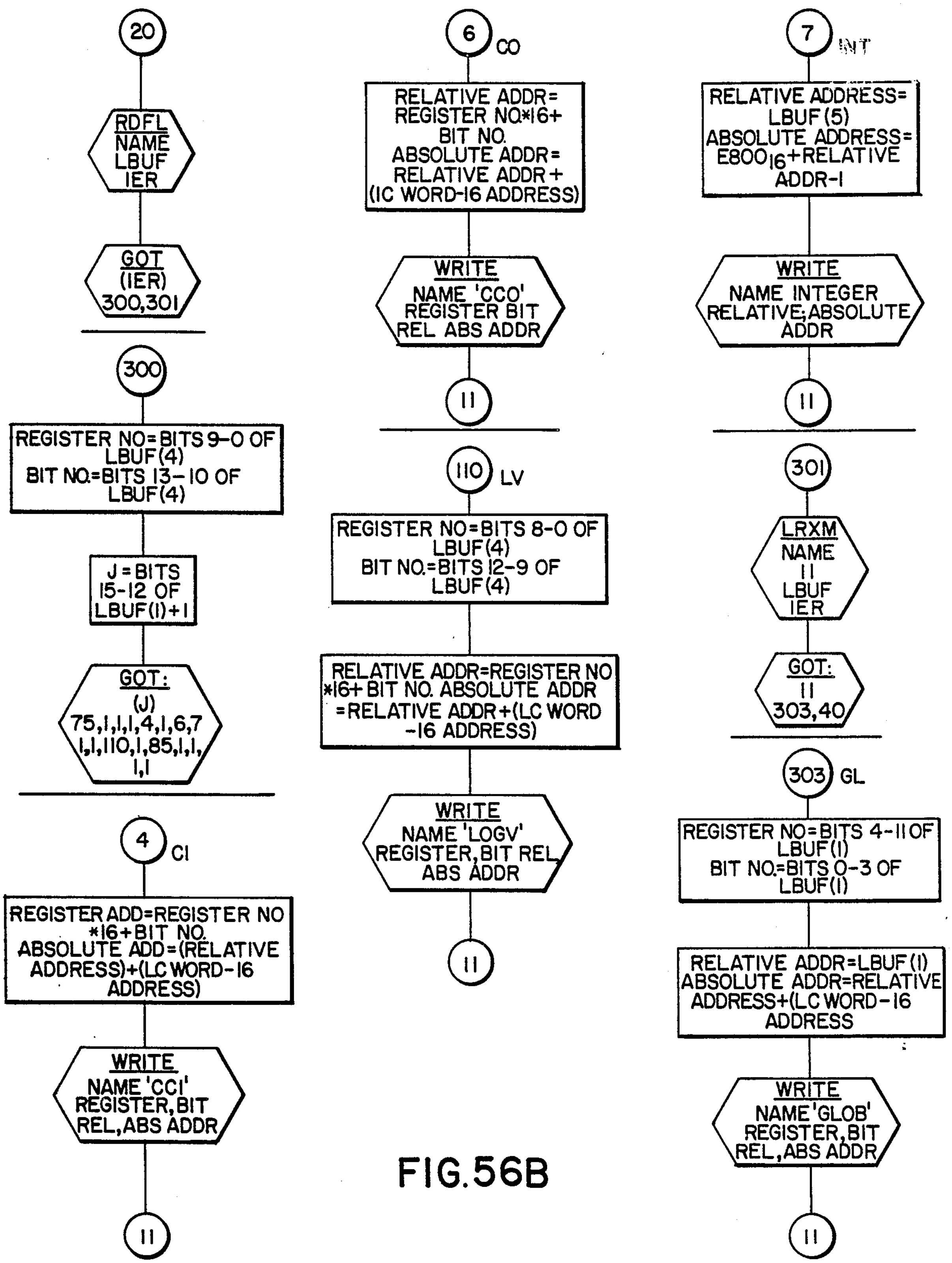

Referring to the flow chart of FIGS. 56A and 56B, the file map sublevel produces a listing of all files in the PROGEN file system. The listing is in alphabetical order and includes contact inputs (CO's), contact inputs (CI's), logical variables, integer variables, analog inputs, globals, and chains. For CO's, CI's, logical variables, and globals, the print out includes the register number, bit number, relative address, and absolute address. The integer print out contains the relative numbers of the integer and its absolute address. The chain print out contains the sublevel number.

Figure 57:
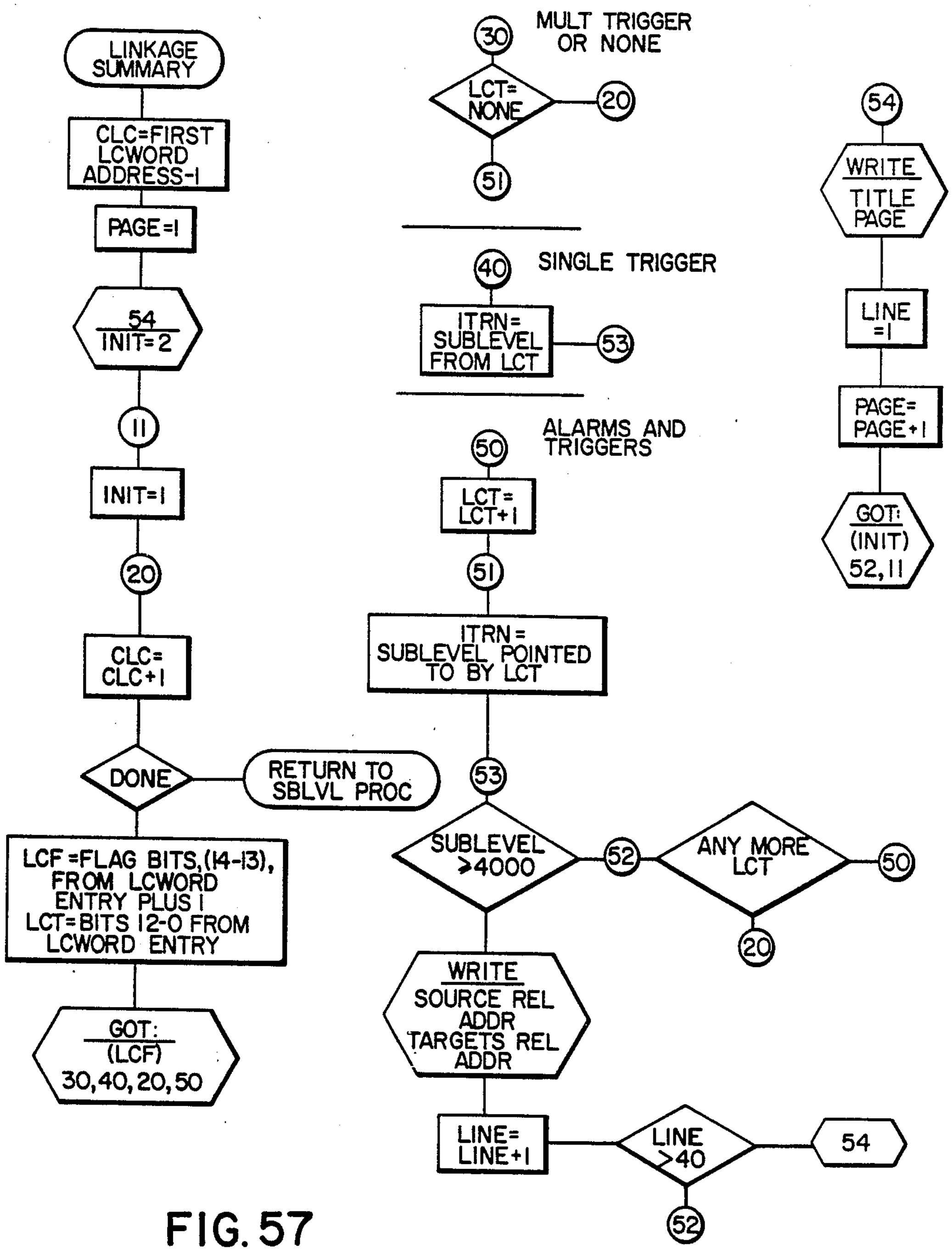
FIG. 57 illustrates the flow chart for the linkage summary program.
Figure 58A:
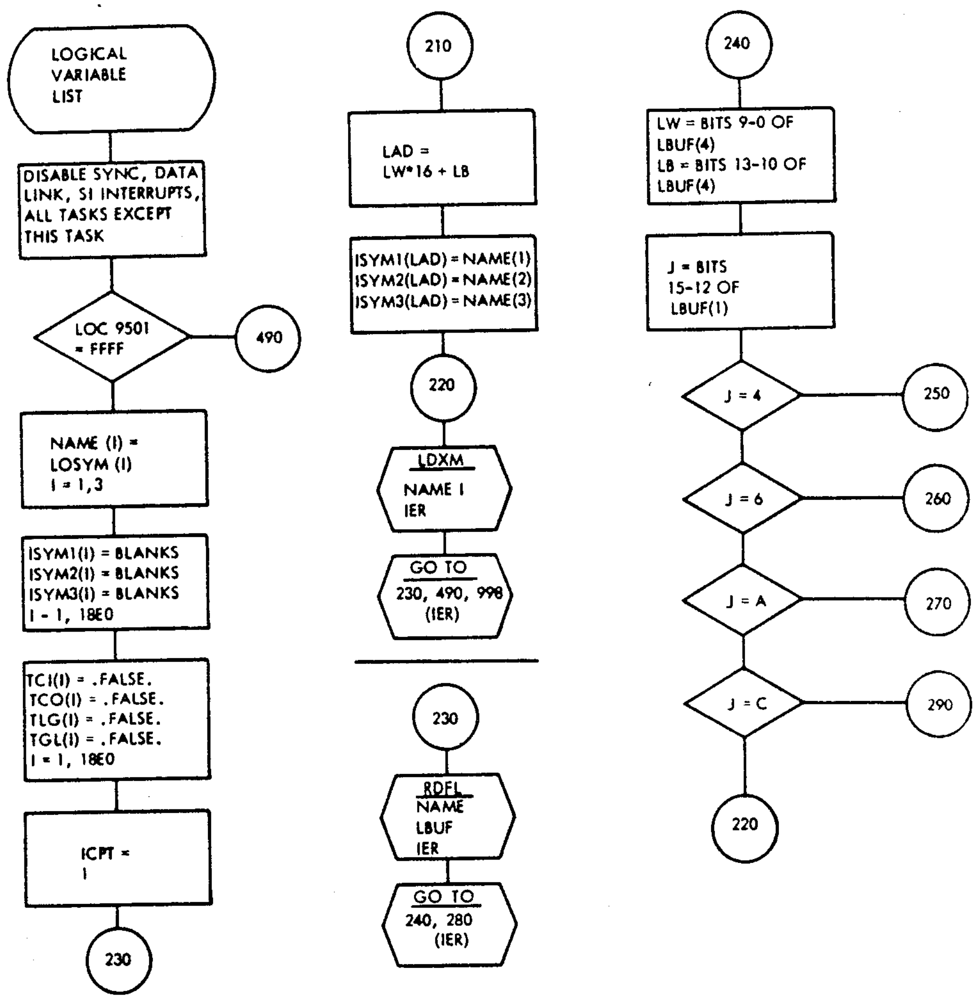
FIGS. 58A through 58F inclusive illustrate the flow chart for the logical variable list of the A machine.
Figure 58B:
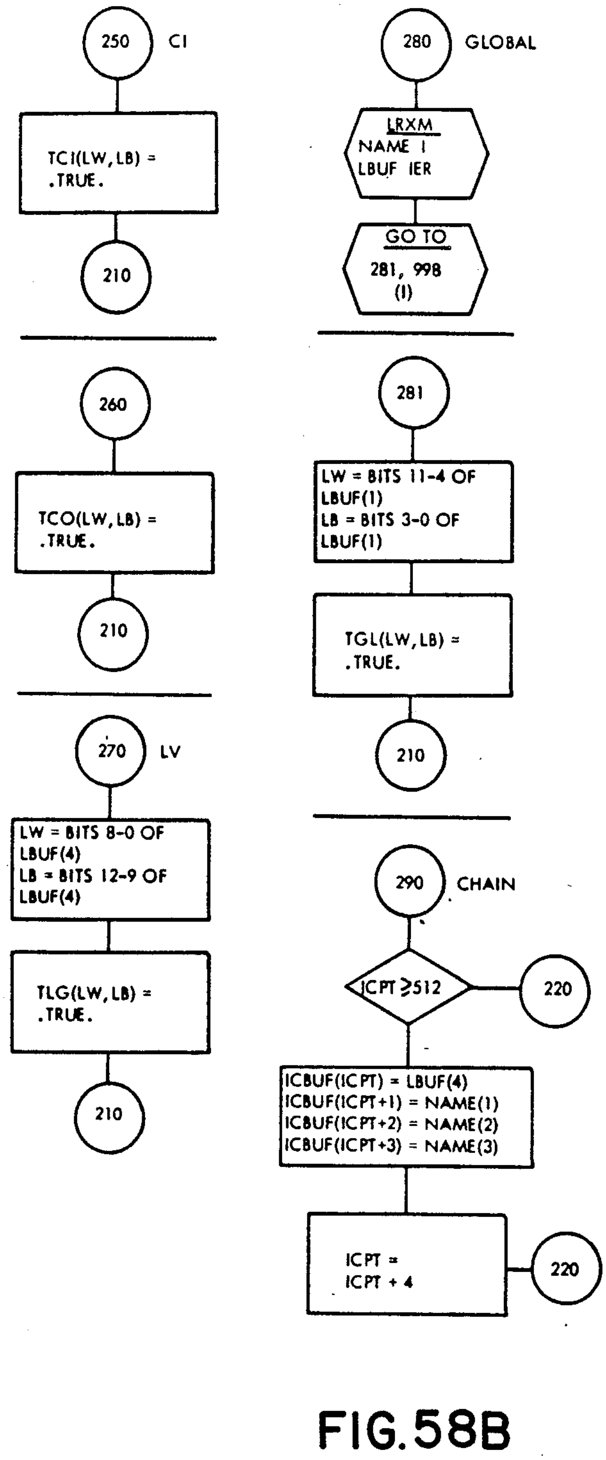
Figure 58C:
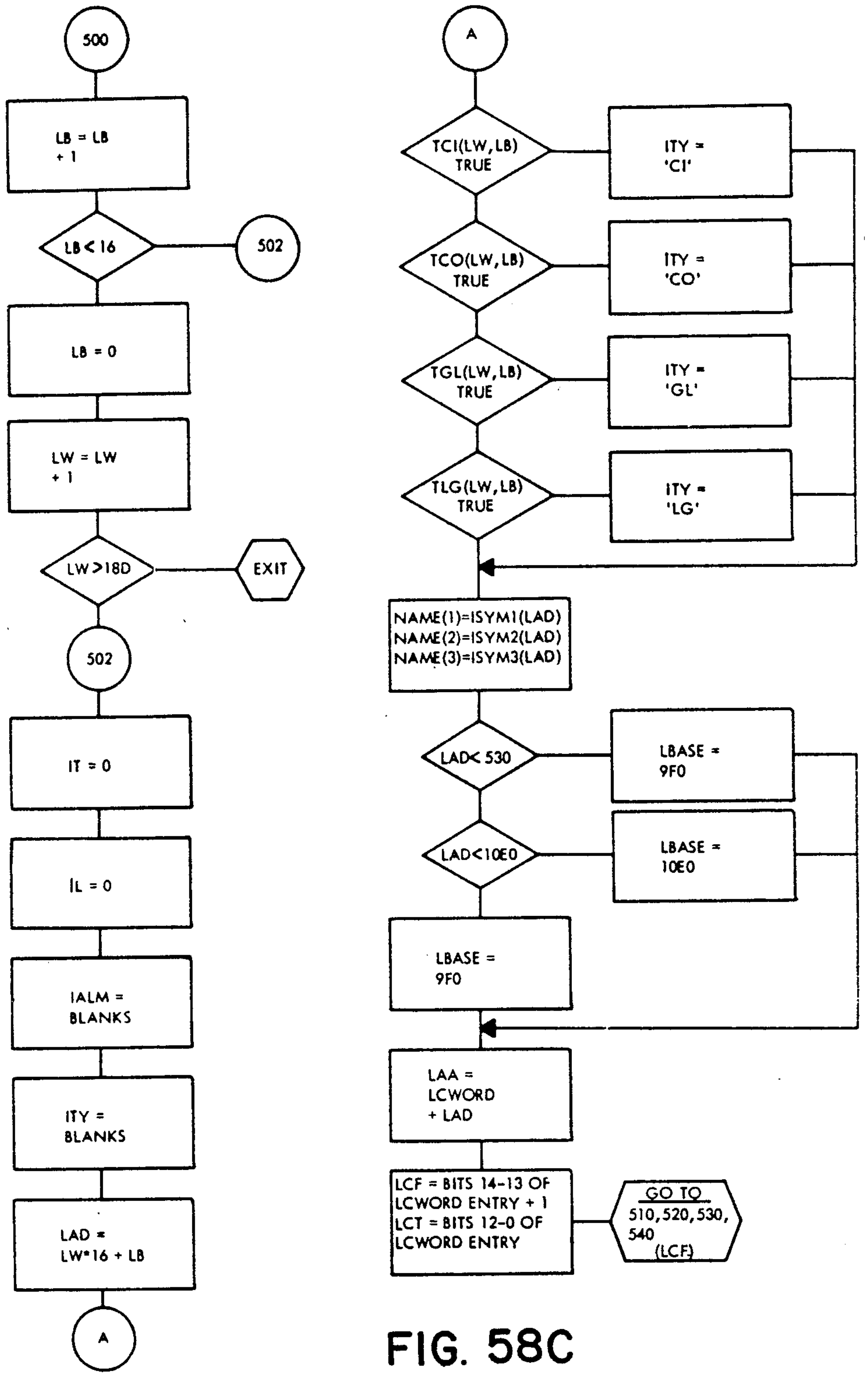
Figure 58D:
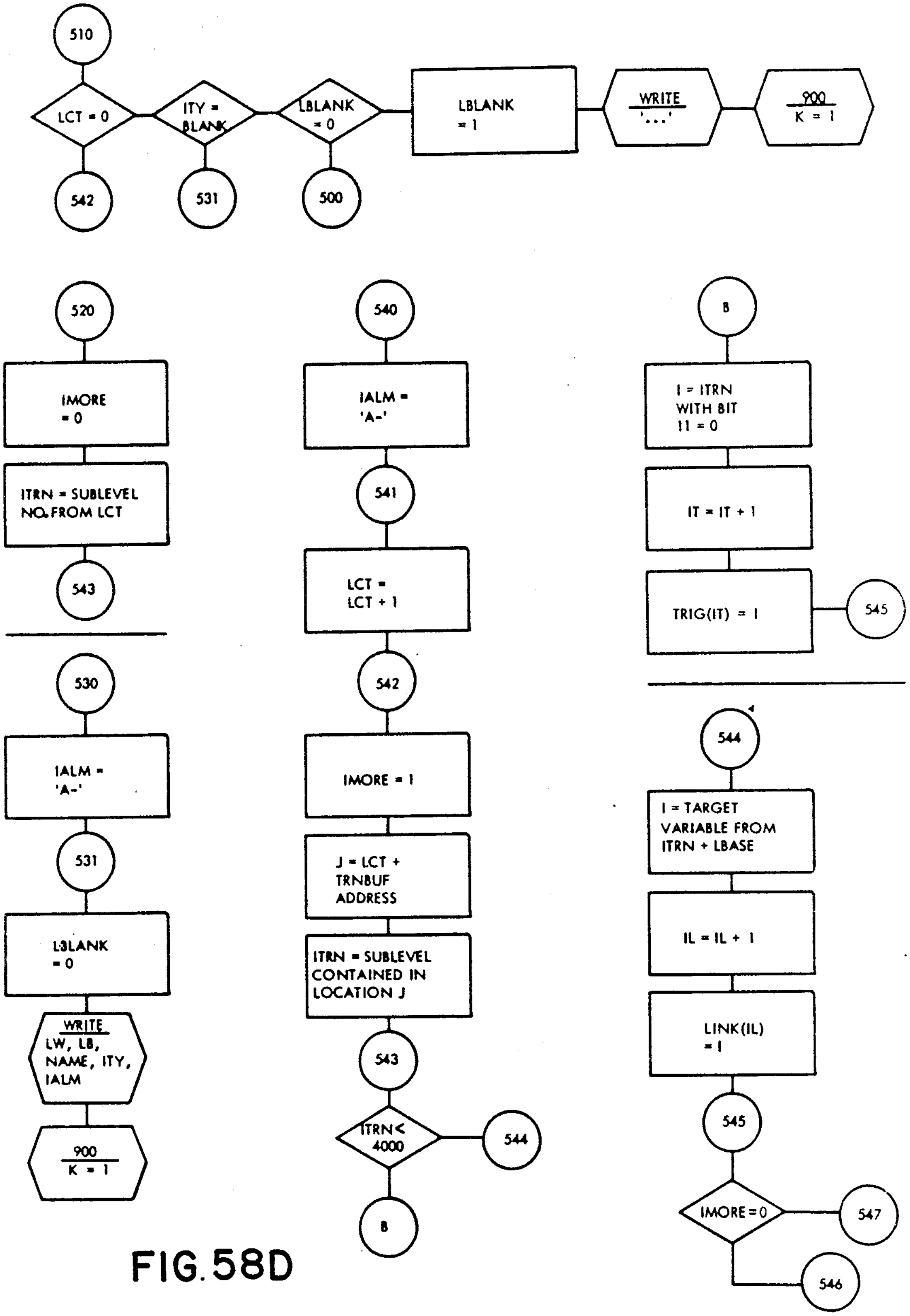
Figure 58E:
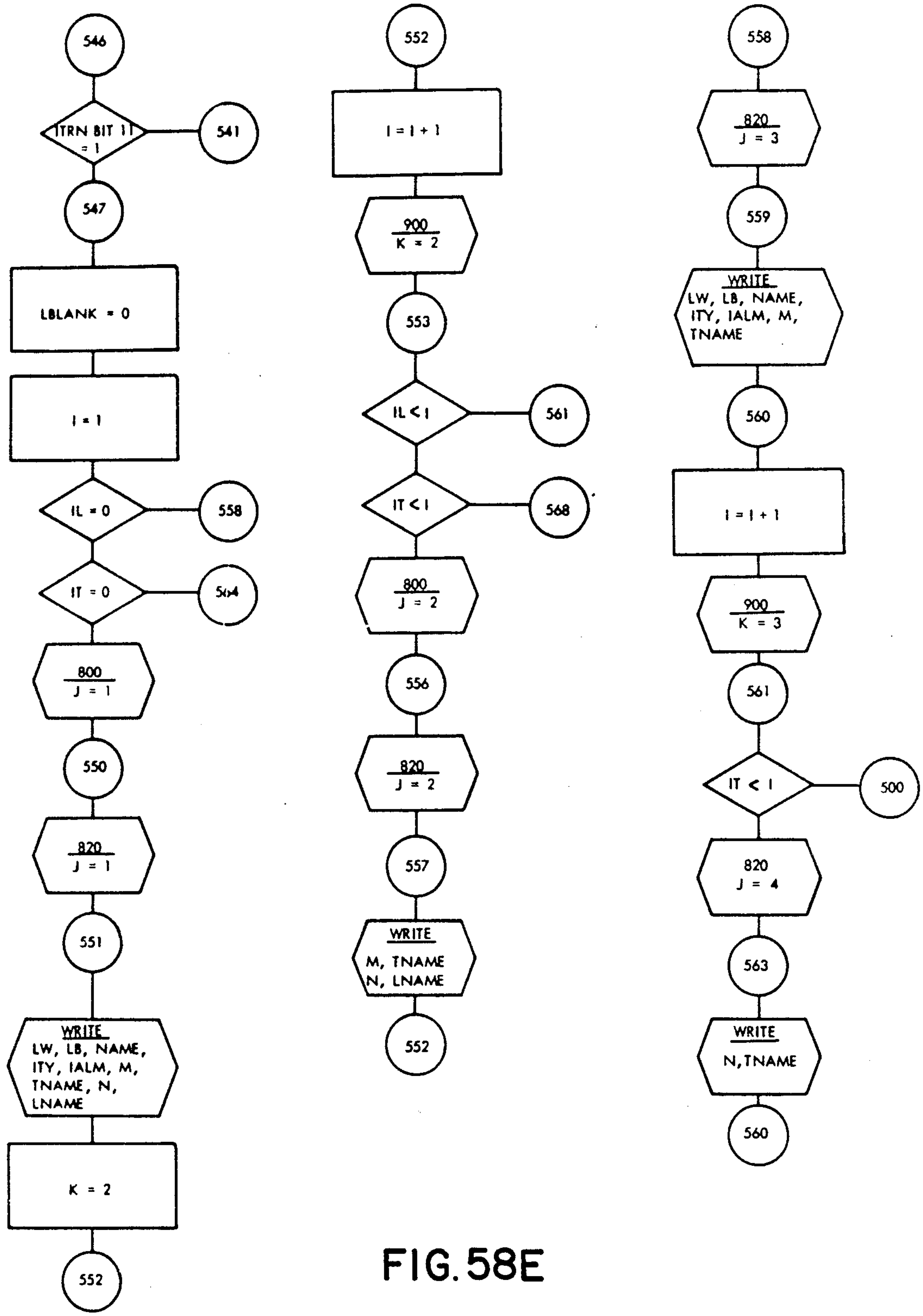
Figure 58F:
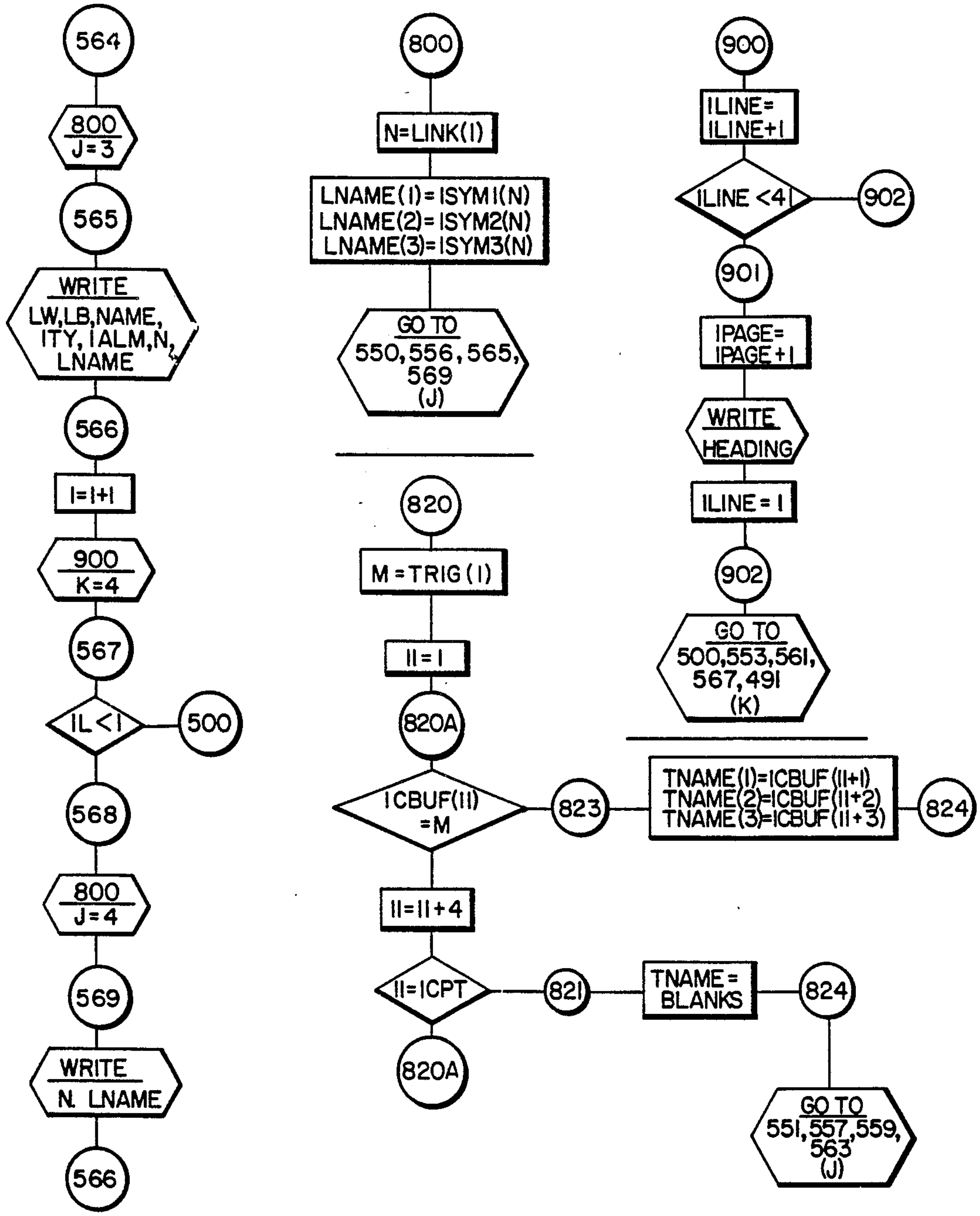
Figure 59A:
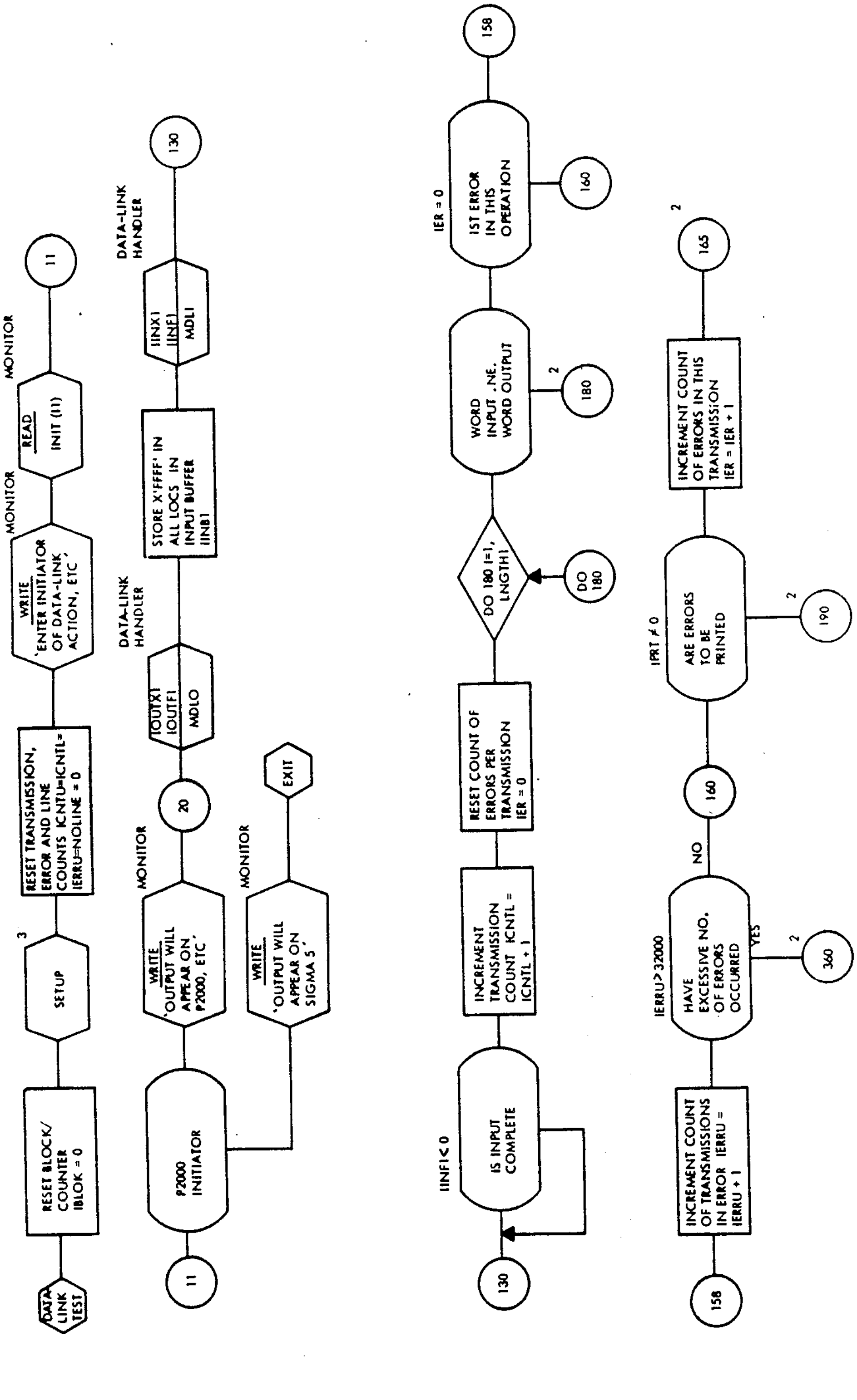
FIGS. 59A through 59D illustrate the flow charts for the data link test program.
Figure 59B:
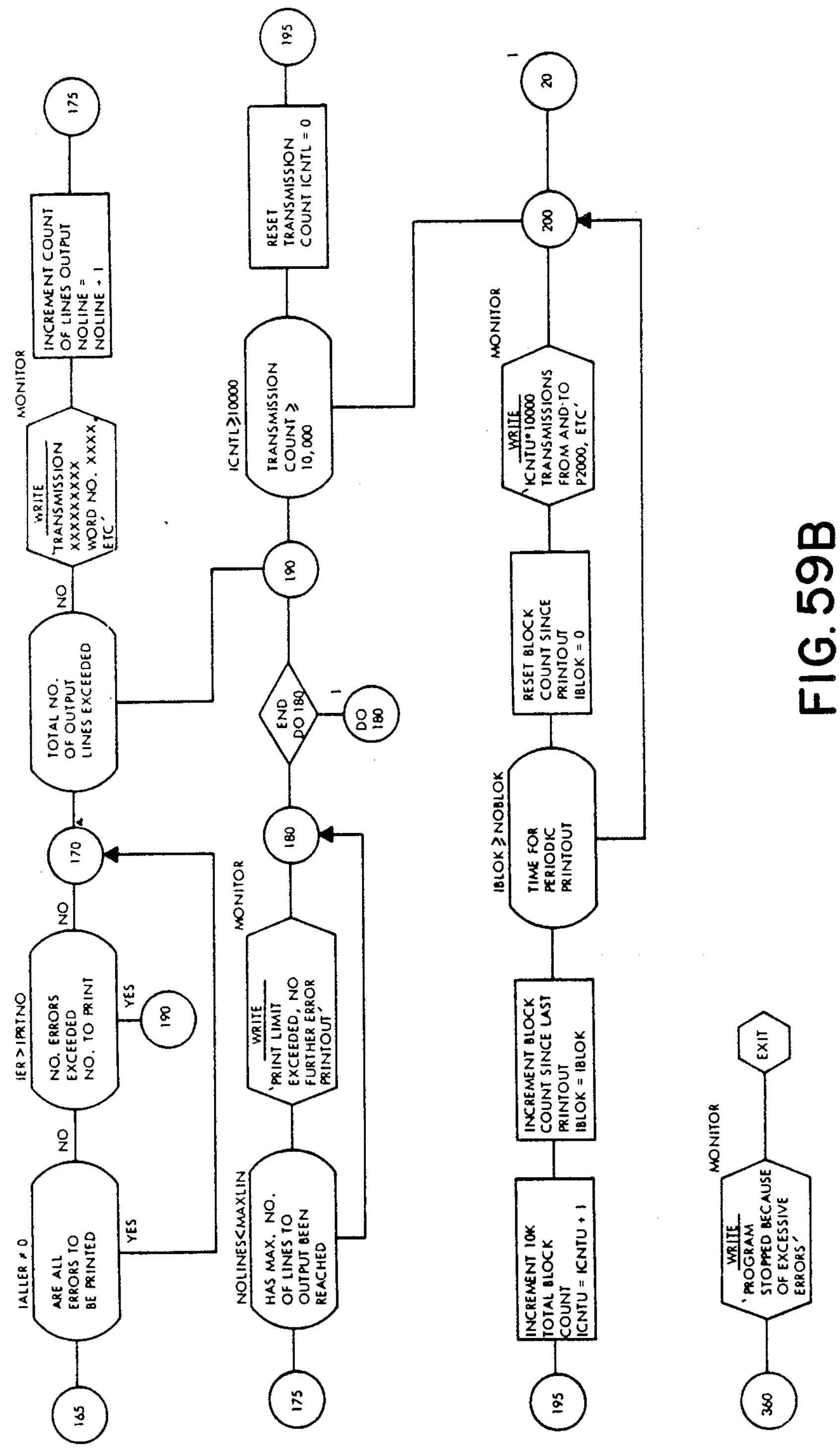
Figure 59C:
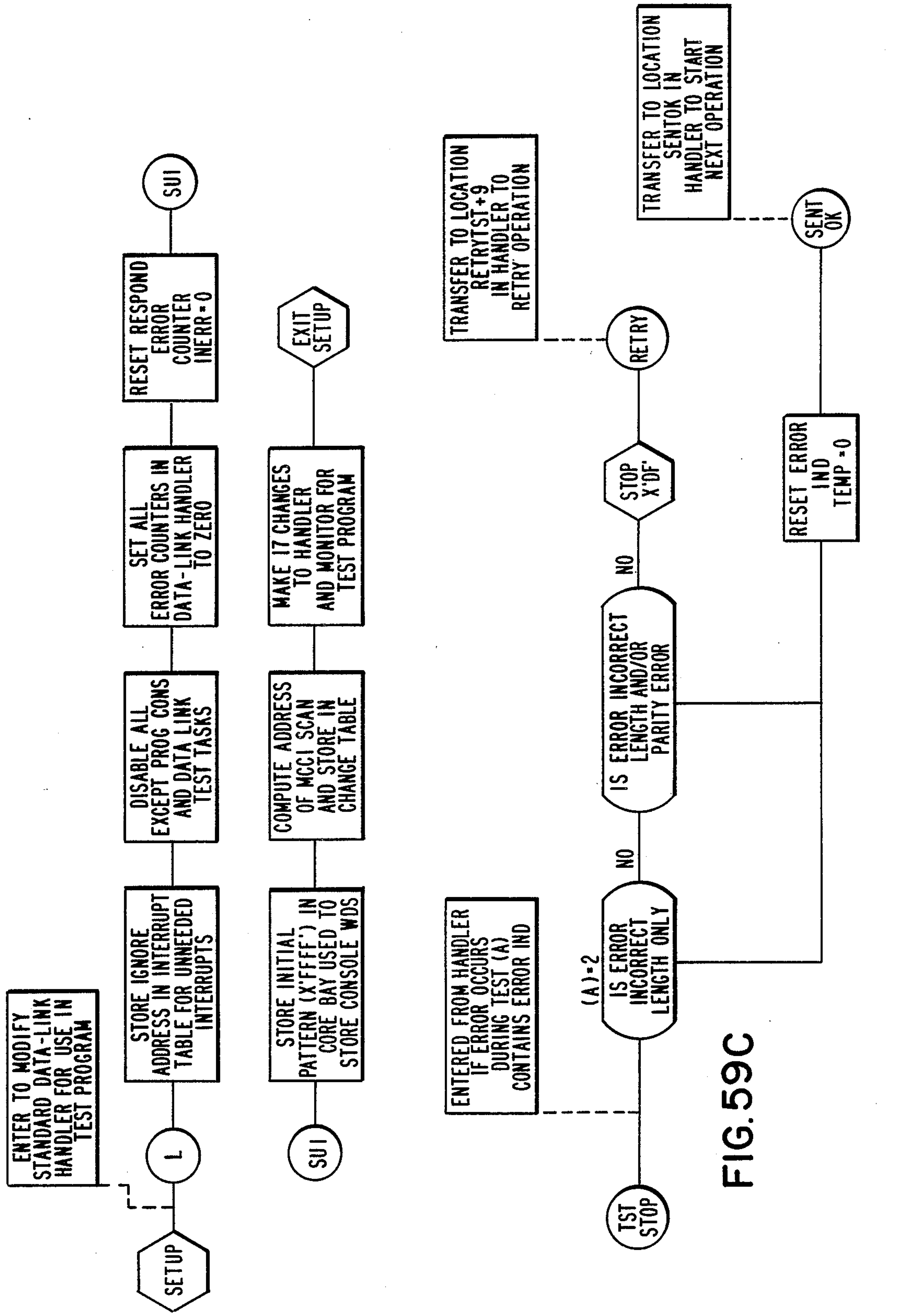
Figure 59D:
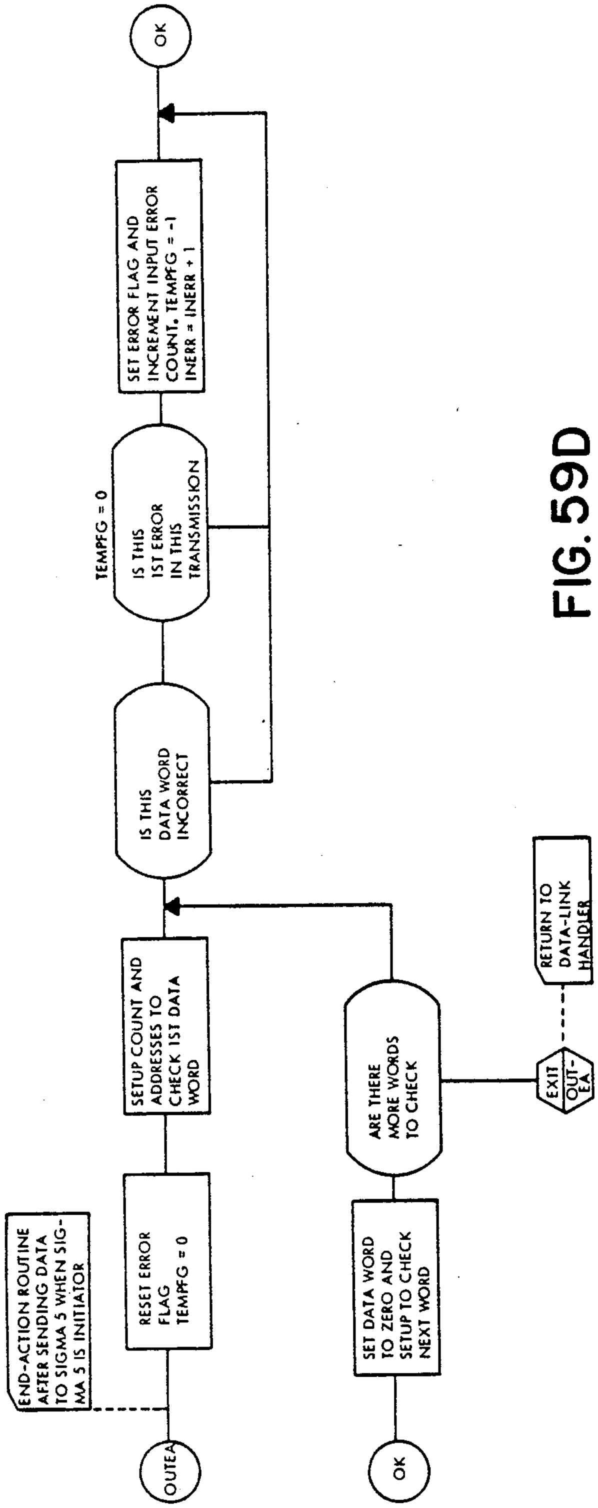

Referring to the flow chart of FIG. 57, the logical linkage sublevel produces a summary listing of logical variable linkages, which are ordered according to relative source logical address.

Referring to the flow chart of FIGS. 58A through 58F, the logical variable list program runs as a task in the system. The program produces a list of all logical type variables in the system, ordered according to relative address. The column headings of relative address, name, type, A, trigger for and linked TO. The relative address includes the bit number, register number in decimal, register number, bit number in hexadecimal and the symbol ". . . " if all other column entries are blank to conserve print out. The symbol "... " is printed only once for consecutive blank variables. Under the column "name" a logical variable name is produced if a PROGEN data file exists, or if none then a blank is produced. Under type heading, a CI, CO, GL, LG or a blank is printed to represent contact input, contact output, global, logical variable, or no PROGEN data file. Under the column heading A, the A is printed out if the variable causes an alarm message on contact input only or if none then a blank. The "trigger for" provides the sublevel number in hexadecimal, followed by the name in case of change, or blank. The "linked TO" provides the target variable relative address and name, if available, or if not, then blank. The entries under "trigger for" and/or "linked TO" continue if there are multiple triggers and links. This program uses most of the core memory during its execution for tables; and is divided into two sections. The first section collects data and the second section prints the collected data. All data files are read in alphabetical order, and the symbol names are moved to symbol tables ordered numerically. Variable types are transferred to bit logical tables accessed by relative register and bit. Chain names and sublevel numbers are saved in another buffer.

Referring to FIGS. 59A through 59D, the data link between the A machine and the C machine is tested by continously transmitting a fixed format 48 word (16-bit) buffer; and then requesting that it be transmitted back to the sending computer. The buffer received is checked word for word against the buffer sent, and all errors are printed out on the initiating computer.

In order to perform the test, the data link test program for the C machine must also be loaded. The test programs on both computers are interactive and permit either computer to be designated as the initiator of the data link transfers through the interactive messages. The data link test program on the A machine makes use of the data link handler previously described.

The data link handler is modified by the test program when it is initiated such that, the data associated with data block index 1 is modified so that 48 word buffers in the test program will be used. The transfer address for output operations from the A machine, which was initiated by the C machine, is modified to enter the end action routine of the test program. This end action routine checks the data it has received and retransmitted against the correct data. If an error is found in any transmission, the location INERR in the program is incremented to indicate the data as input to the A machine with an error. The re-try counters are set to zero so that no re-tries are made in case of error. The section of the data link handler which normally stops under lockout when an error occurs and the re-try count is exhausted is modified to transfer to the test program. The test program causes the data link handler to ignore incorrect length and parity errors (it is assumed that they will show up in the word by word check) and execute a X'DF' stop under lockout for further errors. If the "run" pushbutton is pressed after a stop, the operation will be re-tried. Also, the data link handler is further modified in that the "save" subroutine which saves all the control words transferred between the computer A and the computer C is modified to expand a circular buffer in which the control words are stored from X'TO' to X'1000' words. The area used, X'D000' to X'DFFF', is also initialized to X'FFFF'.

The data link test program has several different output options, which can be selected by the use of data cards at compile time, but can be changed by modifying the corresponding core location before initialization at run time. In addition to the various actions provided by the data link handler, it maintains 12 error counters and the circular buffer of the most recent X'1000' control words which are useful in diagnosing data link problems.

APPLICATION SOFTWARE FOR P2000 B MACHINE

The functional categories of application software in the B machine generally comprised of instructor-console-related software, simulator information software, control panel software and synchroscope simulation software. As noted in connection with the A machine application software, other software arrangements can be employed in single or multiple computers consistently with many invention features.

The instructor-console-related software for the B machine comprises an initialize from condition on disc sublevel, store conditions on disc sublevel, and data link end action routines which are similar to such routines of the A machine. In addition, the instructor-console-related software of the B machine comprises a verify data entry sublevel, and an instructor's console function sublevel. The simulator information software of the B machine comprises the task to set a CO when the model is off, and a timing task for the computer duty cycle. The control panel software which comprises panel logic chains, and protection logic chains; and synchroscope simulation is described in connection with the control panels and models.

Data-Link End-Action Routines

Similar to the A machine and referring to FIG. 23 data link end action routines for the B machine provide for the initiation of programs to process input from the C machine and the A machine, and the initiation of programs to generate more output for the C machine and the A machine. Also, the types of data link transmissions for which end action routines are included are input index numbers 0 through 6 and output index numbers 1 through 6. Data is transmitted to the B machine using index 0 on demand; and such data is input to a 25 word block labeled BIB5. The data transmitted is contingent on the second word of the buffer, which contains an integer indicating the specific function to be executed Most of the functions are acknowledgment that the C machine and the A machine have completed some operation previously requested by the B machine.

When the second word of BIB5 block contains the integer 1, the data stored acknowledgment flag IAKNOL in the type zero end action COMMON block is set to zero. The instructor's console program which initiated the data stored operation waits until this flag is zero before printing the "buffer XX validated" message. The printing of this message indicates that the data is successfully stored on disc in all three computers; that is, the A machine, B machine, and the C machine.

When the second word of BIB5 block contains the integer 2, the initialization of the C machine and the A machine is complete. The end action routine sets bit zero of the acknowledgment flag IAKNOL to zero. Bit 1 of the flag is set to zero when the initialization of the B machine is complete. This is accomplished by pressing "BOP initialize complete" pushbutton on the instructor's console. When both bits are zero and the simulated turbine valves are in the correct position the "initialize from condition on disc" program provides an output message "SIMULATOR INITIALIZATION COMPLETE".

When the second word of the BIB5 block contains the integer 3, the acknowledgment flag IAKNOL is set to zero. The "model control start" program, which is initiated through the instructor's console monitors this flag, and when it is set to zero, the "MODEL STARTED" message is printed on the instructor's console typewriter.

When the second word of the BIB5 buffer contains an integer 4, the C machine acknowledges that it has received a request display or print a value by a type zero data link transmission. The third and fourth words of the BIB5 buffer contain the real values to be displayed or printed. The end action routine transfers the value to be output to the real value location VALWRD in the type zero end action COMMON block, and sets the acknowledgment flag IAKNOL to zero. The display or print value program then outputs the value in VALWRD.

When the second word of the BIB5 block contains the integer 5, the C machine and the A machine have attempted the "INITIATE training exercise" function. The end action routine resets the acknowledgment flag IAKNOL to zero, and stores the fourth word of the BIB5 block in SNPWRD in the type zero end action COMMON block. If SNPWRD is zero, the C machine and the A machine have successfully completed the "initiate training exercise" function; if not, a problem exists and the complete system is not ready.

A type zero transmission is sent and the second word received into the BIB5 block contains an integer 8, when the C machine or the A machine indicates that a malfunction is to be terminated as a result of the operation of appropriate switches on the instructor's console. The fourth word in the BIB5 block indicates which malfunction is to be terminated, and this value is stored in location MALIND in the instructor's console COMMON area. The end action routine then bids for the "MALFUNCTION RESET" MALRES sublevel which updates the malfunction tables.

Each of the input indices 1 through 6 for the B machine are used for data transmission like that described in connection with the input indices 1 through 6 of the A machine. In the B machine, the end action routine for input index 1 resets the flag used by the "model on/off CO" program and bids for the digital scan sublevel $BOO4_x$ to process the input data. The end action routine for input index 2 bids for digital scan sublevel $BOO5_x$ to process the input data. The end action routines for input indices 3 and 4 bid for the two per second and the four per second analog output handlers, respectively. Input indices 5 and 6 are used for logical data and interdata respectively transmitted from the A machine to the C machine to the B machine into buffers BLB6 and BLB7 for the logical data and BIB6 for the integer data. The input index 5 end action routine bids for digital scan sublevel B006 to process the input.

The output indices 1 through 6 of the B machine are used for the functions like those described in connection with the same indices for the A machine. The output indices 1 and 2 are used for logical data transmitted to the C machine two times and four times per second respectively from buffers BLB8 and BLB9 for index 1 and BLB10 and BLBll for index 2. The end action routine for index 2 transfers EHVPI 1, 2, 3, 4, 5, and 6 from system integer locations to buffer BIB3 which is the four per second integer buffer to the C machine. The output index 3 which is used for integer data transmitted to the C machine twice per second from buffer BIB4 has the end action routine which resets the flag used by instructor's console program to determine whether or not the simulator is running, maintains the periodic snapshot timer, and maintains the periodic display timer when a periodic display is active. When the periodic snapshot timer and the display timer expires they are reset and a bid is placed for the periodic snapshot and display sublevel respectively. The bid is not placed for the periodic display sublevel if the display is being used by the instructor's console program for initiating another function.

Output index 5 is used for logical data transmitted to the C machine and then to the A machine from buffers BLB12 and BLB13; and output index 6 is used for integer data transmitted to the C machine and then to the A machine from buffer BIB7. The end action routine for output index 5 is not used; and no data is being transmitted using output index 6.

Instructor's console interface program converts the data entered by the instructor as ASCII or real variables, stores them in the console function buffer FCTBUF which is located in the PROGEN data center, and bids for the requested function program. The function program uses this data, and when it is finished, sets an indicator that it is no longer using the console function buffer. Part 2 of console control is then called to initiate any waiting function and the complete function exits to the sublevel processor.

The verify data entry program is used to output on the instructor's console typewriter the data entered for the function presently selected. The program is called by pressing the "verify" action pushbutton on the instructor's console before pressing the "start" or "stop" pushbuttons. If the instructor has not entered data for a value, "none" is printed in place of the value. After the output is complete, the values may be arranged, if necessary, and the function initiated by pressing the "start" or "stop" action pushbutton.

Store/Initialize Conditions On Disc

The "store/initialize conditions on disc" program utilizes two complementary sublevels which function in a manner like the store/initialize conditions on disc program for the A machine.

Figure 60A:
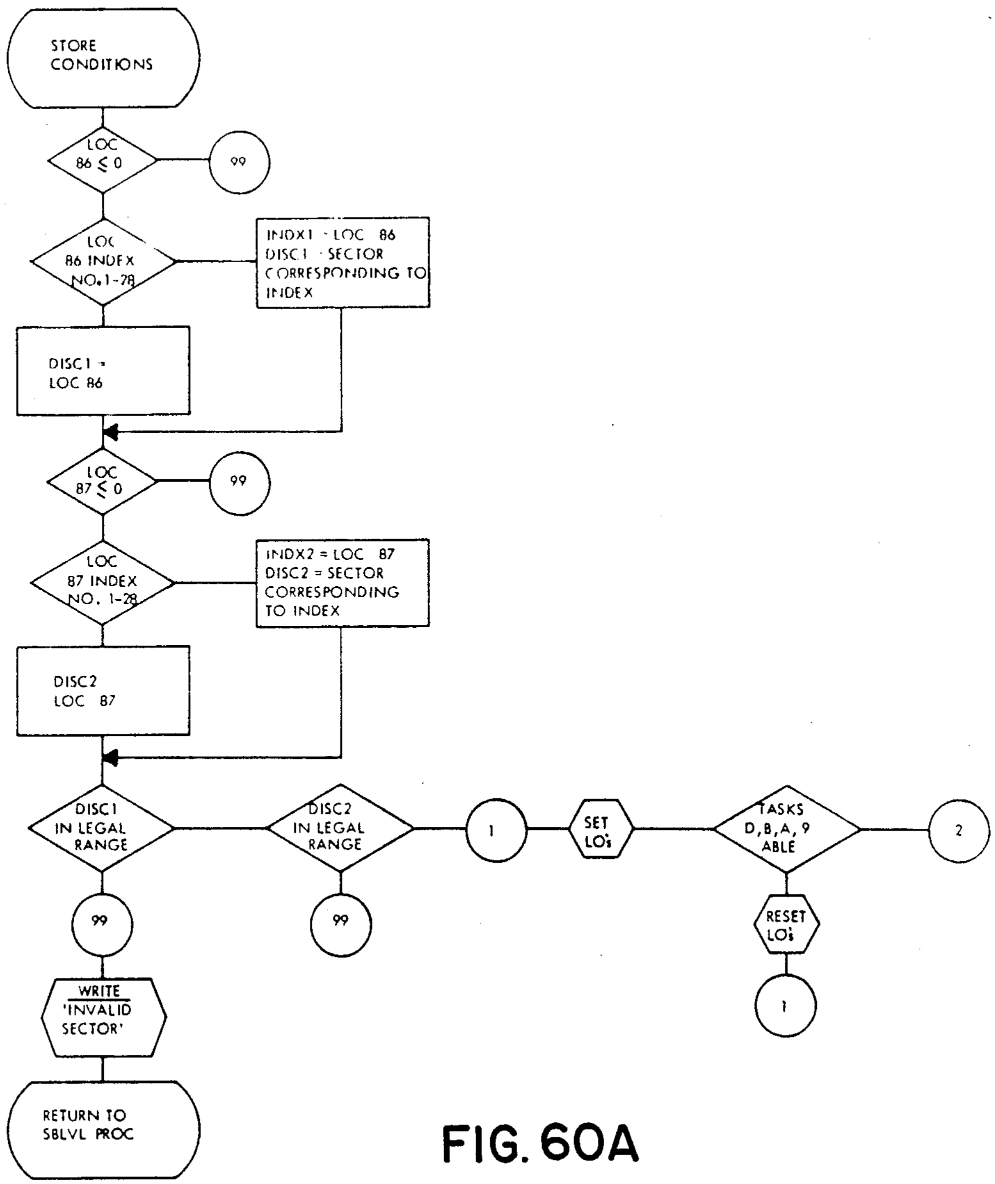
FIGS. 60A and 60B illustrate the flow chart for the "store conditions on disc" sublevel for the B machine.
Figure 60B:
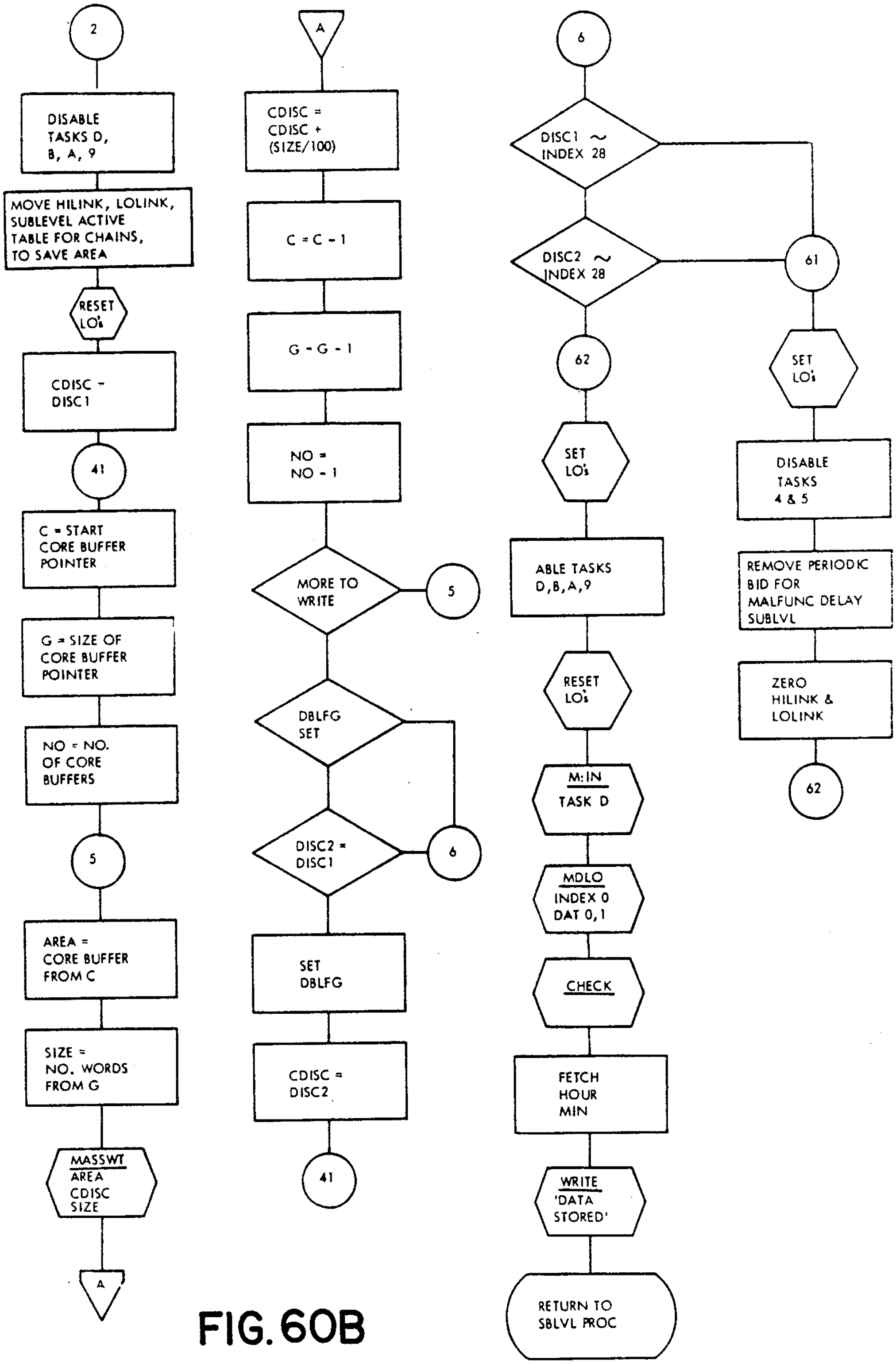

Referring to the flow chart FIGS. 60A and 60B, the "store conditions on disc" sublevel for the B machine is like that described in connection with the A machine. On the B machine, the disc areas on which condition sets are saved, of course, are different. The data which is saved on disc for the B machine is obtained from five core areas which are the logical variable bit image tables LIUSER, LCBIT, and LOUSER at locations $714F\text{-}7249_{16}FB_{16}$ words, which area includes all bit logicals, contact inputs, and contact outputs; system integers, table FIXADK at locations E800-E $E8FF_{16}$, $100_{16}$ word; the "in alarm" bit table LIALRM at location $72E6\text{-}73EO_{16}$, $FB_{16}$ words, which table is used by the digital scan to indicate messages waiting to be printed; the malfunction time delay variables and the logical time delay buffers LBLNAM at locations V690-$V9FF_{16}$, $370_{16}$ locations; and the integer tables, buffers, and instructor's console COMMON areas at locations 19CO-1DBD, $3FE_{16}$ locations. The last mentioned areas includes the COMMON area used by the instructor console malfunction programs, the annunciator malfunction table data link integer buffers, most recent steady state analog input values, analog output channel table, and the COMMON area used by the index 0 data link end action routines. Additionally, the HILINK and LOLINK time delay pointers and the active sublevel bit tables for task levels 4 and 5 are transferred from the data center to this area before it is written on disc. The save data occupies $11_{10}$ disc sectors.

During the sublevel execution, task levels D, B, A, and 9 are disabled. Since level D is the sublevel processor, no disc resident sublevels can be initiated. Task levels B A, and 9 include the digital scan, analog output programs, ½ second time delay program for valve malfunctions, malfunction reset, and initialize from disc program. Index number 28, which is used for simulation freeze when used, disables the chain task levels and the programs which run periodically. These disabled programs are abled by the instructor's console program "model control" when the "start" action is requested.

The initialize from conditions on disc sublevel sets up the B machine according to 1 of 28 condition sets which have been saved on disc for initial conditions or by snapshots. To initialize, the running system is disabled so that a new system can be input. This is done by halting the message writer to stop any input/output in progress, halting task level 3 which sets a CO when the simulator is not running, and disabling and deactivating all task levels except 9 which is the initialization level. The interrupts associated with the instructor's console pushbuttons are disabled by changing the interrupt transfer table in the monitor to transfer to the "ignore interrupt" routine when these interrupts occur. Next, the tables are initialized. The five areas saved by the "store conditions" sublevels are input into the respective areas and the operation is like the table initialization for the A machine. The printing of analog input and digital scan alarm messages is restored so that differences between desired and actual switch positions are printed on the typewriter. Next, the CO's are set to the desired positions, with the result that the lights on the panel reflect the desired switch positions in most instances. The annunciators which are malfunctioned in the set of conditions being requested are set to the correct state to reflect the malfunction.

Referring to the flow chart of FIGS. 61A through 61D , after the instructor is informed by a message on the typewriter to set the switches to desired positions and thereafter to press the "BOP initiate complete" pushbutton, the initialize flag used by the AI scan is set to indicate that an initialization is in progress, and task levels 7, A, B, C, D, and E are abled. This is accomplished so that the input/output handlers and the message writer may be used to output CI's and analog inputs which do not agree with the desired settings. A bid is placed for both analog output handler sublevels and the digital scan sublevels which process the multiplex and bi-direct CI's, and the AI scan sublevel is linked to the 3/10 second periodic bid. The digital scan will print on the typewriter all CI's which do not agree with the desired setting. The value of the CI printed is its present value, and the desired value is the inverse of the printed value. The AI scan messages contain the present value to the left and the desired value to the right. The instructor then waits until all the discrepancies have been printed before starting to correct them, so that the messages generated by the corrective actions are not confused with the discrepancies.

The "initialize from conditions on disc" program then enters a time delay loop and waits until an indication has been received that all three computers A, B, and C completed the initialization. This is determined by checking the flag IAKNOL and the type zero end action COMMON block. Bits 0 and 1 are set to 1 by the initiate model sublevel before the initialize from conditions on disc sublevel is called. Bit 0 is reset to 0 by the index 0 end action routine when the initialization of the A machine and the C machine is complete. Bit 1 is reset to 0 by the initialization complete interrupt handler when the BOP initialization complete pushbutton is pressed. When both bits are 0, the program checks the present position of the simulated EH turbine valves; that is, four per second AI valve position points against desired positions. If the difference between the two positions for any of the four EH valves is greater than 1.0 volts, the message "* EH VALVES ARE NOT SET PROPERLY *" is output and a nine second delay is initiated. When the delay expires, the valve positions are rechecked and the message output occurs again if any difference still exists. The program remains in this loop until the positions agree and the first location 9BOO of the program is set to zero to bypass the EH valve check.

At this point, the message "* SIMULATOR INITIALIZATION COMPLETE *" is output and the system is restored to a waiting state until the "model control start" command is given through the instructor's console. This is accomplished by removing the AI scan sublevel from the periodic bid, transferring the saved sublevel active table bits for the chain task level from the saved area to the active table, and setting the core buffer tables RSDTBL and RESBID entries to zero to indicate the buffers are not in use. The HILINK and LOLINK logical time delay pointers are also set-to zero to inhibit the countdown of any active logical time delays until the simulator is started. The instructor's console interrupts disabled previously are re-enabled, and the initialization flag for the AI scan is reset. Finally, as shown in the flow chart of FIG. 61D , the task levels 1, 3, and 6 are abled, 1 and 3 are activated, and the program exits to the sublevel processor.

Simulation Information Tasks

The B machine contains a program CO for model off whereby task 3 is used to light an indicator on the instructor's console whenever the model is not running. Location TESTLOC is used to determine the state of the model in a manner like that described in connection with the simulation information task for the A machine. Also, task 0 is used to calculate the system duty cycle in a manner like that described in connection with the A machine.

Protection Logic And Control Panel Interface Logic

The protection logic for the B machine comprises two PROGEN chains, i.e. the steam dump control logic and the auxiliary feedwater control logic. The interface logic chains, which reside in the B machine simulate the functions associated with the plant interlock logic that is concerned with the Balance Of Plant and Diesel Generator panels. This control panel interface logic is similar to and operates in a manner like that associated with the A machine for the particular portion of the plant-involved.

High Speed Data Link (HSDL)

Figure 62:
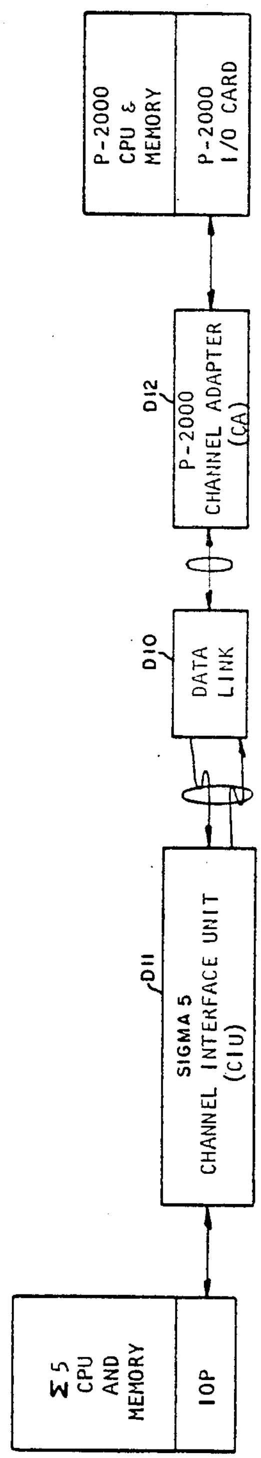
FIG. 62 is a block diagram of the high speed data link for communicating between the Sigma 5 and P2000 computers.

In the present multi-computer embodiment of the invention, the purpose of the high speed data link is to provide for high speed data linking between the Sigma 5 computer or C machine and the P2000 computers or A and B machines. Referring to FIG. 62, high speed data link D10 provides half-duplex signaling between the Sigma 5 computer which is equipped with a standard channel interface unit (CIU referred to as D11), and the P2000 computer which is equipped with a conventional channel adapter (CA) referred to as D12. The data link D10 receives signals from the channel interface unit D11 and generate the required control, data, and parity signals. The maximum data rate between the data link D10 and the unit Dll is approximately 500,000 bytes per second. The maximum data rate between the data link D10 and the P2000 channel adapter D12 is approximately 10,000 words per second. However, when including all initiations, terminations, and data transfer, the average rate approximates 5,000 words per second.

A 16 bit control word that is transmitted between D12 and the data D10 includes bits 12 through 15 which are mutually exclusive in both directions. These bits are termed "termination without status, termination with status, acknowledge, and initiate", for bits 12 through 15 respectively. Bit 10 is used only to indicate that the high speed data link D10 has detected incorrect parity from the Sigma 5 and is transmitted to the P2000 along with a bit 13 during the termination of a transmission. If bits 12 through 15 are transmitted as all false, this indicates to the P2000 that the unit Dll has become non-operational.

Figure 63:
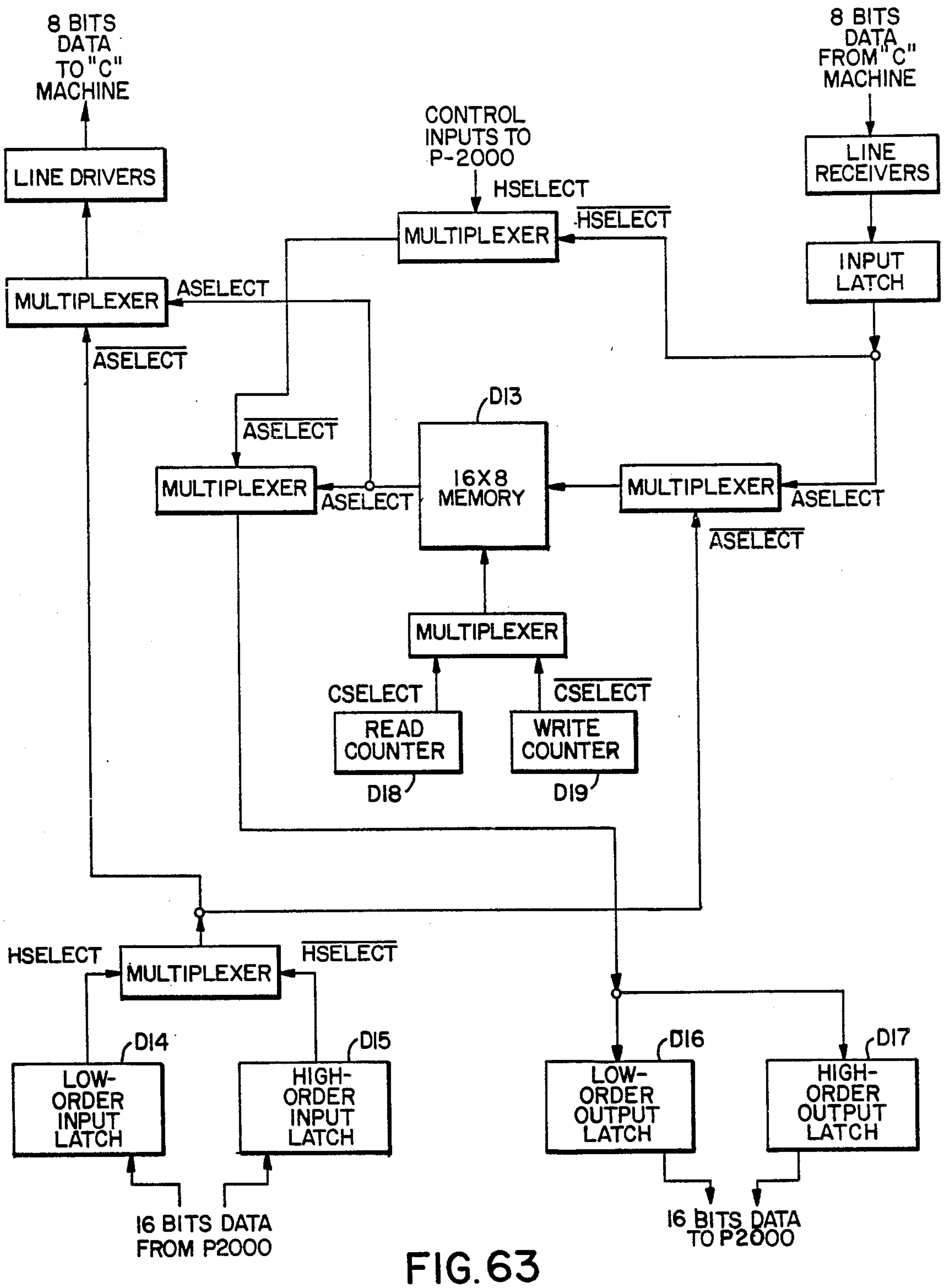
FIG. 63 is a functional diagram of the data multiplexing for the high speed data link.

The high speed data link as shown in FIG. 62 and referring to FIG. 63 comprises a programmable controller with a 256 word times 8 bit read only memory to accommodate the high speed data linking program. It also comprises a data multiplexing system containing a 16 word times 8 bit memory D13 to provide a scratch pad memory function. It further includes data steering, and pack, unpack functions. It further includes a set of control flip-flops for outputting external control signals and for internal control of the scratch pad and the programmable controller. As evidenced by the block diagram of FIG. 63, the multiplexing function serves to convert the 16 bits of data from the P2000 to 8 bits of data per word for the Sigma 5; and to convert the 8 bits of data from the Sigma 5 to 16 bits of data per word for the P2000.

The programmable controller contains read only memory up to 256 words long together with support logic to permit sequential access of the read only memory, pausing, skipping, jumping to a new sequence, and returning to a previous sequence. Outputs from this controller are short duration parallel binary statements which are 6 bits in length together with a conditional Output a Pulse signal. The specific operation includes a function JL which provides a jump to 126 locations on a single page of read only memory. More locations are provided by adding an additional page which may be accessed with an output pulse OP. A function FI provides a skip function on up to 32 different conditions. A function PP provides a pause pending up to 32 different conditions; and the function OP provides up to 64 different output pulses. In the instant application 40 output pulses OP are needed to operate the high speed data link as an interface between the unit D11 and D12 (see FIG. 62), A list of the output pulses OP is shown in Table I on page A186 of the appendix.

The multiplexing or select pulses ASELECT and CSELECT are appropriately legended in FIG. 63 . A control pulse ILATCH latches 16 bits of data from the P2000 into the low and high order input latches D14 and D15. The pulse LOLATCH latches data from the memory D13 into the low order output latch D16 to the P2000. The pulse HOLATCH latches data from the memory D13 into the high order output latch D17 to the P2000. A pulse termed RESET PARITY resets bit 10 in the control word to the P2000. A pulse RESET COUNTERS resets read and write counters D18 and D19. A pulse RCOUNT clocks the read counter D18; and pulse WCOUNT clocks the Write counter D19. A pulse STROBE causes an output of a 1 microsecond strobe pulse to the Sigma 5; and pulse 2 MICROSECONDS TIMER triggers a 2 microsecond timer.

Since the 1 megahertz clock rate of the controller and the data rate of ½ megabytes per second from the Sigma 5 are incapable, the following functions are wired into the data multiplexer and the control flip-flops. Bit 15 of the control word to the P2000 previously referred to is set by the function INITIATE, STROBE, and TERMINATE from the Sigma 5. Bit 13 of the control words to the P2000 is set by the function TERMINATE, STROBE from the Sigma 5. Eight bits of data from the Sigma 5 are written into the memory D13 by the STROBE pulse and the WRITE D19 is clocked by the trailing edge of the STROBE pulse.

In the controller, the operations or functions SI and PP previously referred to allow for 32 conditionals. These 32 conditionals are listed in Table II of the appendix. Those listed that require further explanation are as follows:

| | |
|---|---|
| T200 | A 200 μsec timer triggered by a pause pending operation. Time out of T200 also terminates the pause. |
| $\overline{\text{T2}}$ | 2 μsec timer. |
| LOCK | Flip-flop used to lock and unlock the link. |
| $\overline{\text{COUNTS =}}$ | Indicates that the read and write counters D18 and D19 are equal. |
| COUNT ≧ 8 | Indicates that the write counter D19 is ≧ 8. Bit 3 of the write counter D19. |
| RCØ | The zeroth bit of the read counter D18. |
| DB13 to DB17 | Bits 3, 4, 5, 6, and 7 from the HSELECT multiplexer (see FIG. 62/6). |
| DB04 | Bit WO3 from the Sigma 5. |
| $\overline{\text{NOP}}$ | INIT + ACKN + PROC. |
| $\overline{\text{WINIT}}$ | Bit 15 of control word to P-2000. |
| $\overline{\text{TWOS}}$ | Bit 12 of control word to P-2000. |
| TWS | Bit 13 of control word to P-2000. |

-continued

| | |
|---|---|
| ACK | Bit 14 of control word to P-2000. |
| W = 0 | $\overline{\text{WINIT + TWOS + TWS + ACK}}$ |

Figure 64:
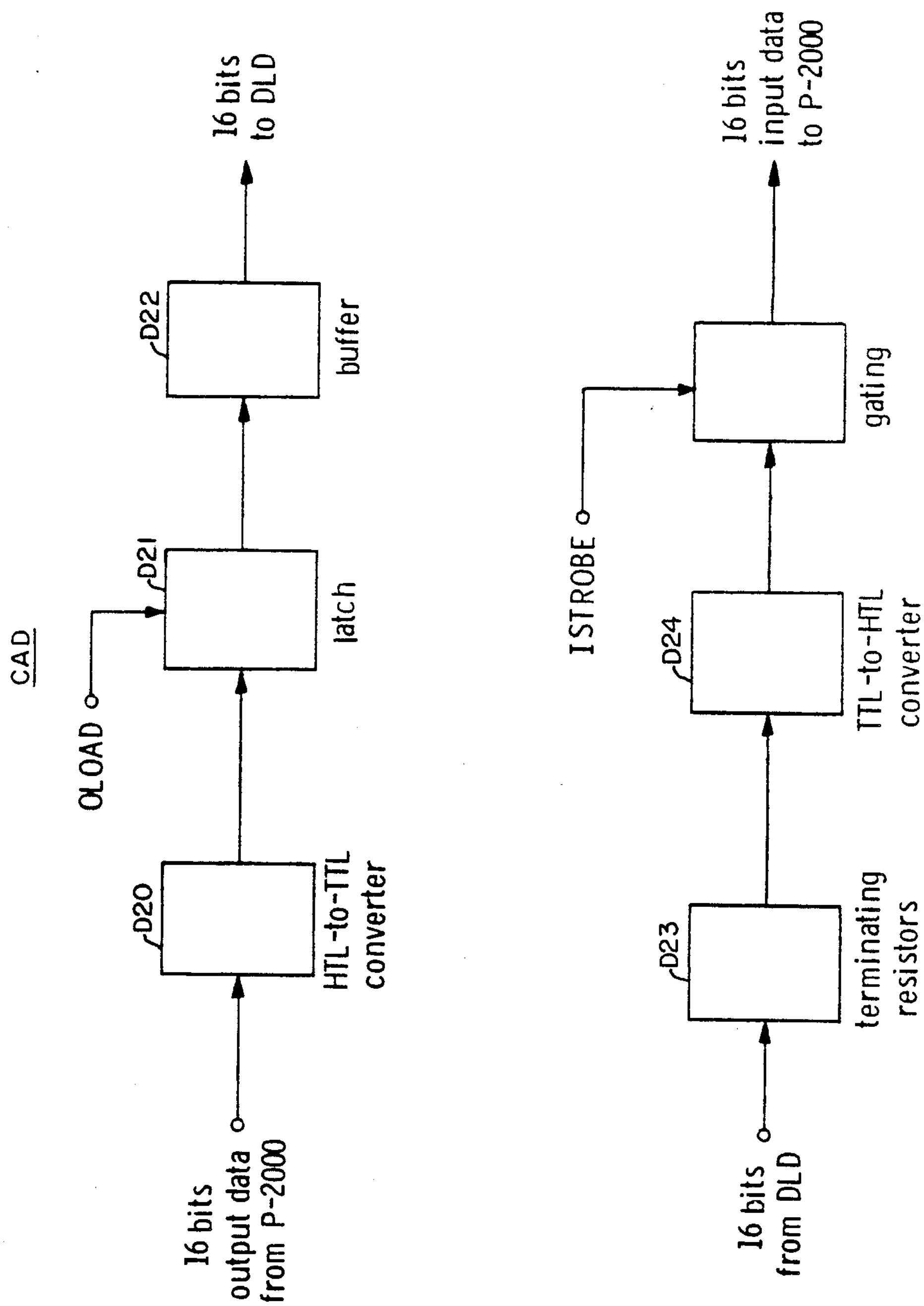
FIG. 64 is a block diagram of the channel adapter data board of the data link.

Referring to FIG. 64, a block diagram of a channel adapter data board (CAD) is shown. The function of the board CAD is that of a buffer between the high speed data link and the P2000 input/output bus. Output data from the P2000 is received by a conventional HTL-TO-TTL converter D20. This data is then stored in a 16 bit latch D21, which is clocked by a signal OLOAD from card CAC hereinafter described. The data is then buffered by TTL inverters D22 and sent to a card DLD hereinafter described. This latch is necessary because data on the P2000 output data lines is valid only during the appropriate input/output address pulses. These pulses are decoded on the card CAC hereinafter described. Data from the card DLD is received on the card CAD to be sent on the the P2000 input data bus. The data transfer is controlled by the signal ISTROBE which is generated on the card CAC from appropriate input/output address signals. The lines from the card DLD are terminated with resistors D23 and the signals are fed into converters D24. The outputs of devices D24 are strobed onto the input data bus by the signal ISTROBE. No data latch is provided for data in the direction from the card DLD to the input data to the P2000 because data from the card DLD is valid until it is read.

Figure 65:
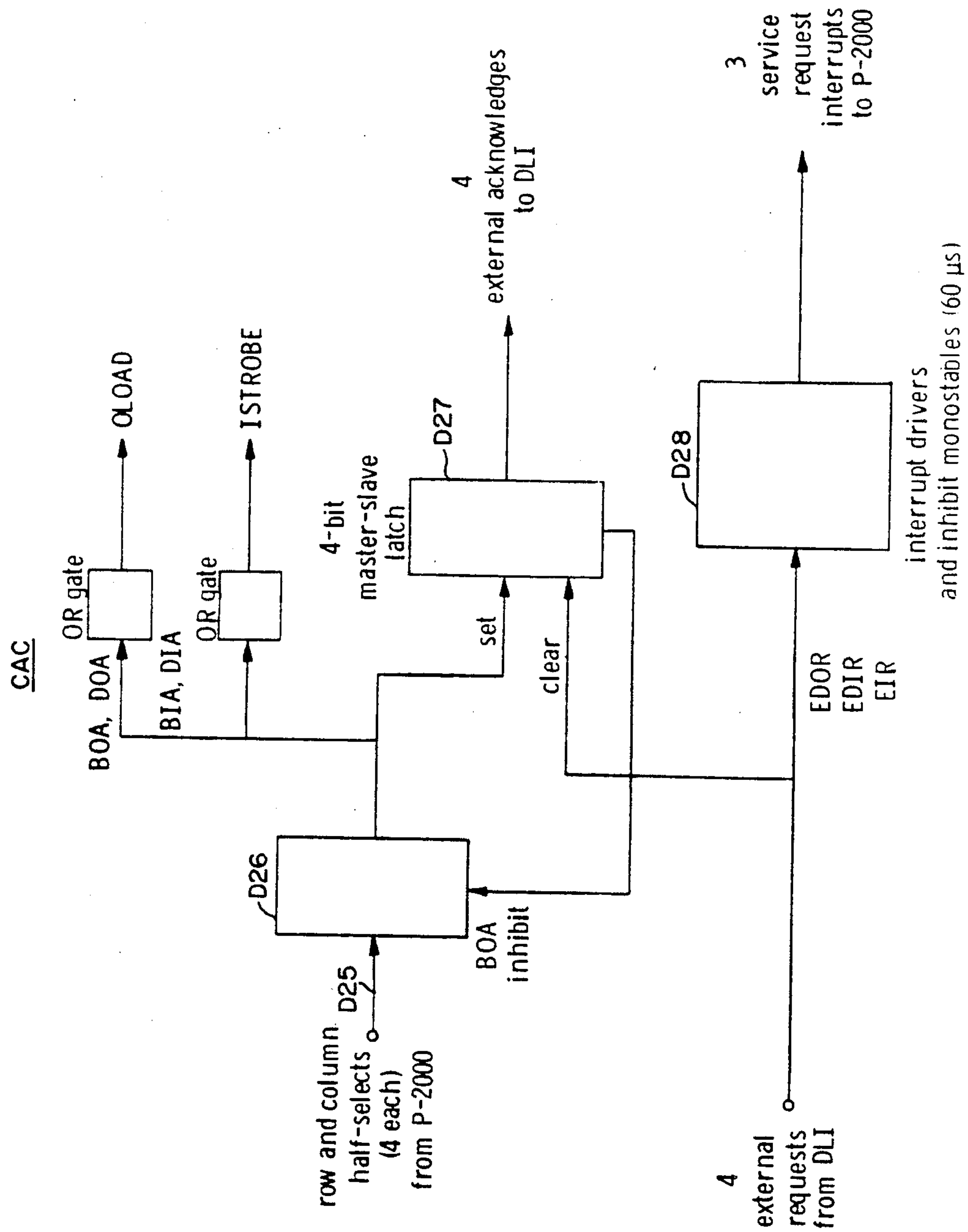
FIG. 65 is a block diagram of the channel adapter control card of the high speed data link.

Referring to FIG. 65, a functional block diagram of a channel adapter control card CAC is shown which provides the control function of the channel adapter for the P2000. The card CAC receives address signals from the P2000, controls the CAD card, sends interrupts to the P2000, and interchanges control signals with the card DLI hereinafter described. The card CAC receives input/output address signals (row and column half-selects) from four P2000 input channels illustrated diagrammatically by line D25. These signals are used for the buffered channel input, direct channel input, buffered channel output and direct channel output functions of the P2000 with respect to the high speed data link. Each of these channel acknowledge signals is decoded using a combination of passive components and converters TTL shown by block D26 that forms a buffered input acknowledge signal BIA, direct input acknowledge signal DIA, buffered output acknowledge signal BOA, and direct output acknowledge signal DOA, respectively.

The signals BIA and DIA are logically OR'ed to generate signal ISTROBE. The signals BOA and DOA are OR'ed to yield the signal OLOAD, which signals are used on the CAD (see FIG. 64). These four signals are also fed to master-slave latches D27 to generate external acknowledge signals for the high speed data link. The external acknowledge signals include external data input acknowledge EDIA, external data output acknowledge EDOA, external interrupt acknowledge EIA, and external control acknowledge ECA, are generated at the trailing or positive-going edge of the four microsecond pulses BIA, BOA, DIA, and DOA respectively. BOA is inhibited as shown in FIG. 65 when ECA or DOA is true. Thus EDOA does not respond to a buffered channel output under these conditions to ensure that a buffered channel output does not write over the data written by a direct channel output until the previous data is read. The four external acknowledge signals terminate when their corresponding external request signals go false.

There are four external request signals, external data input request EDIR, external data output request EDOR, external interrupt request EIR, and external control psuedo-request ECPR. These external request signals originate on the board DLI hereinafter described and are received on the card CAC. They all serve the purpose of terminating their associated external acknowledge signals, and, with the exception of the signal ECPR, they cause service request interrupts to be entered at the P2000. Three circuits D28 are provided on the card CAC to generate buffered output service request BOSR, buffered input service request BISR, and direct input service request DISR, from the signals EDOR, EDIR, and EIR respectively. A monostable multivibrator is provided with each interrupt circuit D28. It is triggered by the transition of the external request from true to false, and it inhibits the related service request for at least 60 microseconds. This establishes the minimum time between occurrences of each interrupt at 60 microseconds, and allows the associated silicon controlled rectifier in the P2000 interrupt system ample time to turn off.

Figure 66:
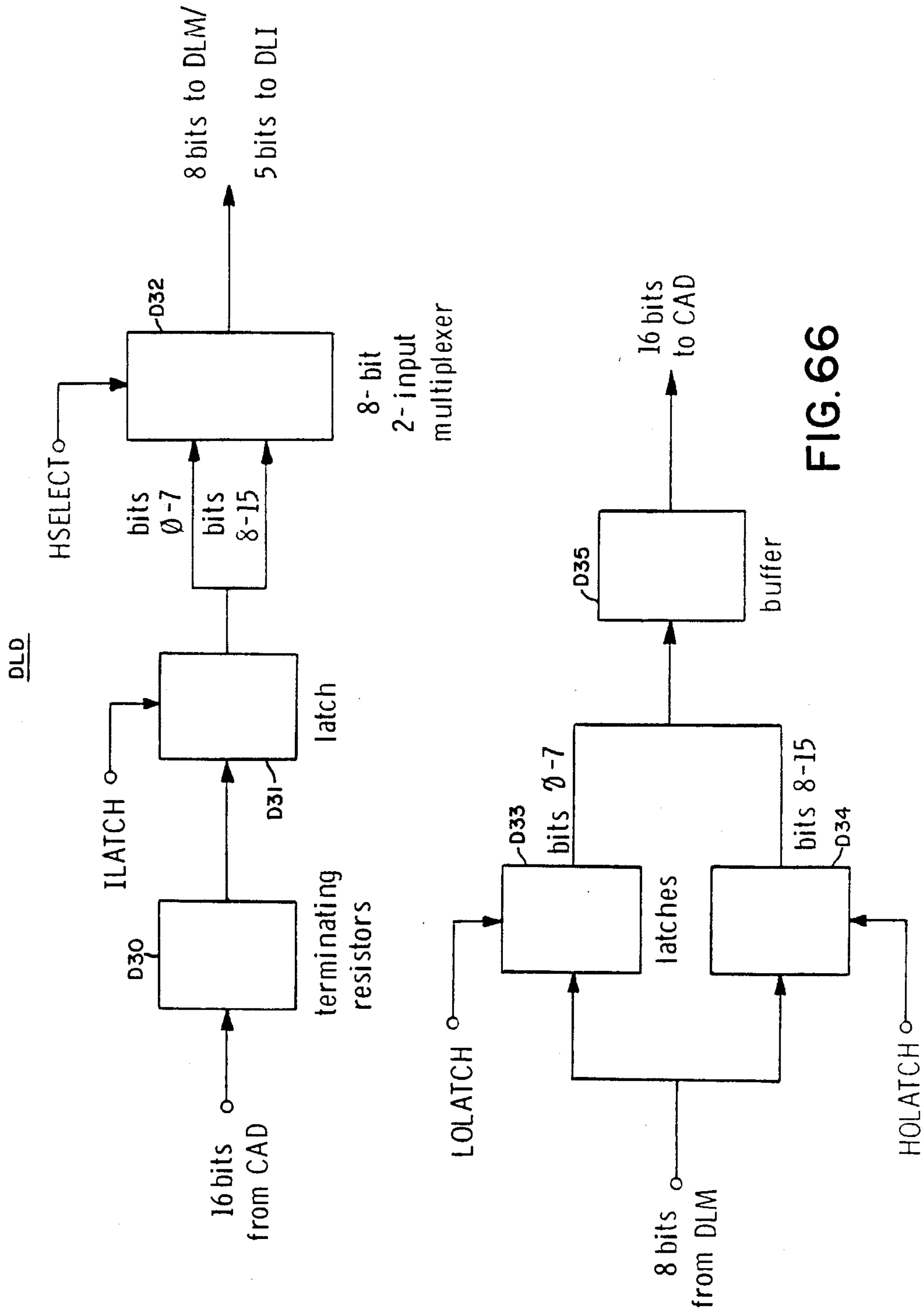
FIG. 66 is a block diagram of the data link data buffer card.

Referring to FIG. 66 data link data buffer card DLD is functionally illustrated and routes data between the card CAD and DLM. The main function is to convert the 16 bit wide data trunk of the P2000 to the 8 bit system used in the remainder of the high speed data link and the Sigma 5 computer. Sixteen bits of data are accepted from the card CAD and conducted through terminating resistors D30, and are stored in a 16 bit latch D31. The latch D31 is clocked by ILATCH, which is one of the output pulses from the card DLI under data link program control. The eight high order latch outputs are connected to one set of inputs to an 8 bit, 2-input multiplexer D32; and the low order latch outputs connect to the other input of the multiplexer D32.

The multiplexer select signal HSELECT (high-order select) is a bistable output of the card DLI. The multiplexer output signals DBIO through DB17, leave the card DLD and connect to the DLM and DLI cards. Only the signals DB13 through DB17 are received by the card DLI. The DLD card also accepts 8 bits of data, DB00 through DB07 from the card DLM. These signals feed two 8 bit latches D33 and D34. The latch D33 is clocked by low order output latch LOLATCH signal and the latch D34 is clocked by the high order output latch HOLATCH signal. Output pulses LOLATCH and HOLATCH are from the card DLI. The outputs of the two latches D33 and D34 are buffered by buffer D35 and become the 16 bit input word to the P2000 computer. The latch outputs are fed to the card CAD.

Figure 67:
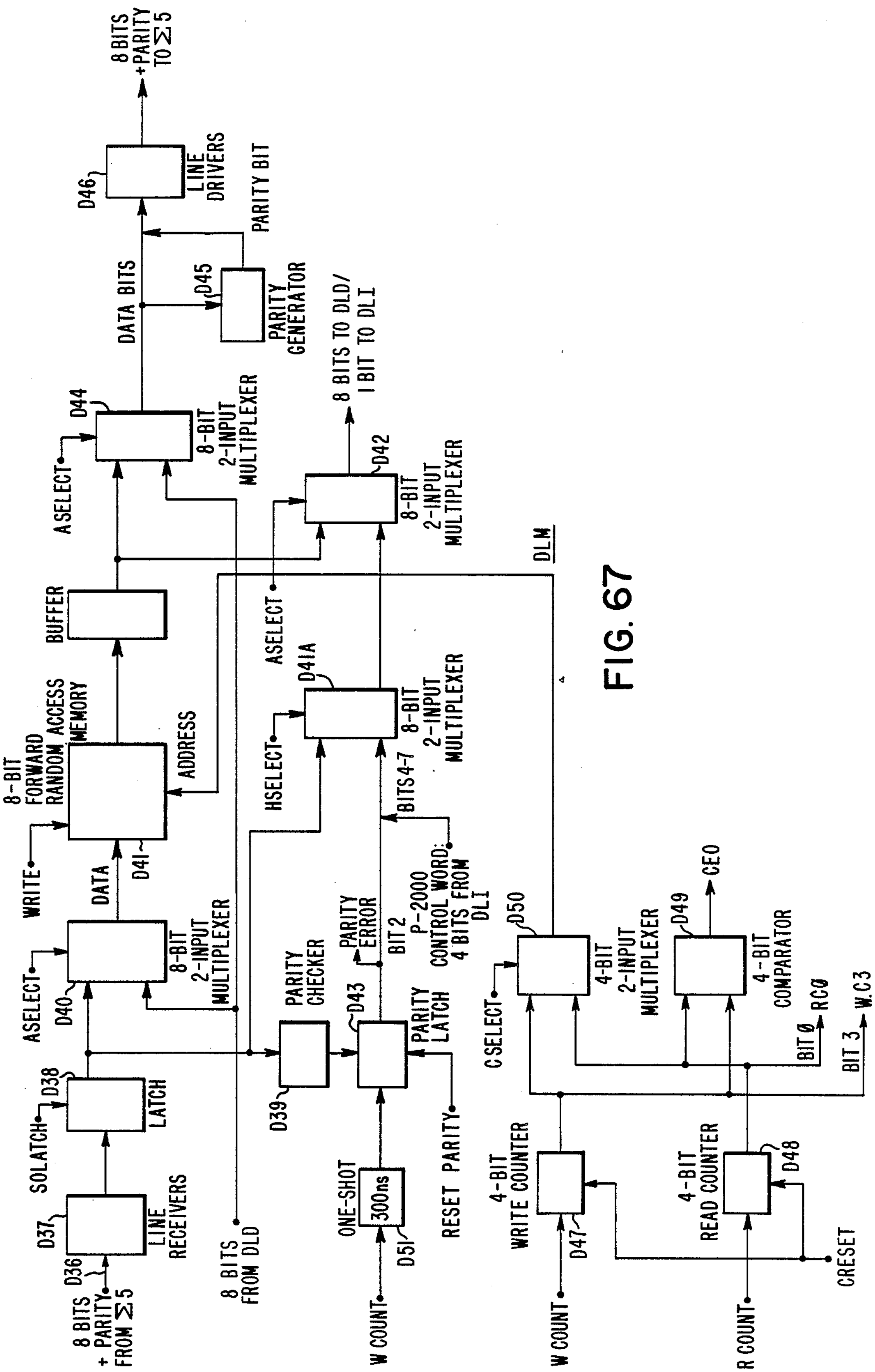
FIG. 67 is a block diagram of the data link memory and steering card.

Referring to FIG. 67, a data link memory and steering DLM is shown in block diagram which provides for the interchange of data between the Sigma 5 and the P2000 computers by way of the boards DLD and CAD. The board DLM includes buffer storage for data to be transferred, parity generation and checking, and appropriate steering circuitry.

Data signals W07 through W00 and parity signal W0P are received differentially from the Sigma 5 on line D36 and are detected by conventional differential line receivers D37 to feed a 9 bit latch D38 which is clocked by a signal SOLATCH (Sigma output latch).

The signal SOLATCH is generated on the card DLI and is derived directly from the signal STROBE-D from the Sigma 5. The nine latch outputs connect to a parity checker D39, the output of which is true when parity is incorrect.

The eight data outputs of the latch D38 also go to one set of inputs on two 8 bit, two input multiplexers D40 and D41. The multiplexer D40 controls the data input to a 128 bit bipolar random access memory D41 arranged to provide 16 words of 8 bits each. The other set of inputs to the multiplexer D40 is driven by signal DBI0 through DB17 from the card DLD. The multiplexer D40 is controlled by a bistable output ASELECT from the card DLI. Thus, under program control, either the output of the Sigma 5 or the output of the DLD card from the P2000 may be fed into the memory D41.

The output of the multiplexer D41 driven by the Sigma 5 output latch D38 feeds one set of inputs to another 8 bit to input multiplexer D42. The output of the multiplexer D42, which are signals DB00 through DB07, are connected to the card DLD for eventual transmission to the P2000. The signal DB04 also goes to the card DLI. The other set of inputs to the multiplexer D42 is the output of the random access memory D41; and the other set of inputs to the multiplexer D41A is a control word madeup of the output of the parity latch D43 and four signals from the card DLI. These signals are INIT, ACKN, TWS, and TWOS.

The multiplexer D41A is controlled by the signal HSELECT, and the multiplexer D42 is controlled by the signal ASELECT. Thus, the P2000 may be sent by way of the cards DLD and CAD the output word of the Sigma 5, the output of the random access memory D41, or the aforementioned control word.

The output of the random access memory D41 also drives one set of inputs to another 8 bit, 2-input multiplexer D44. This multiplexer is also controlled by the control word ASELECT and one set of inputs is connected to the card DLD through signals DBIO through DB17. The multiplexer D44 connects to a parity generator D45. The outputs of D44 and the resulting odd parity bit are used to drive Sigma 5 data lines through line drivers D46 using differential techniques. The multiplexer D44 allows the Sigma 5 input lines to be fed from either the memory output D41 or the output of the card DLD, under control of the high speed data link programming.

Two 4 bit ripple counters D47 and D48 are provided to control addressing of the random access memory D41. The counter D48 is clocked by signal RCOUNT, an output pulse from the card DLI. The counter D47 is clocked by a signal WCOUNT from the card DLI. The signal WCOUNT is a logical OR of a data link output pulse and a signal generated when the control signals from the Sigma 5 STROBE:D is true and signal TERMINATE:D is false. Both counters D47 and D48 are cleared by signal CRESET, which is an output pulse from the card DLI.

The outputs of the two counters D47 and D48 are fed to a 4 bit comparator D49, the output of which CEQ is used on the card DLI. The low order bit 0 of the read counter and the high order bit 3 of the write counter are also fed to the card DLI; and these signals are used by the data link operating program. The read counter D48 output also goes to one set of inputs of a 4 bit, 2-input multiplexer D50; and the other set of inputs to the multiplexer D50 comes from the counter D48. The control signal for multiplexer D50 is CSELECT, which is a bistable signal generated on the cards DLI. The multiplexer D50 outputs constitute the address inputs of the random access memory D41.

Writing in the random access memory D41 is controlled by signal WRITE which originates on the card DLI. It is the logical OR of a data link output pulse and a signal generated when the signal STROBE:D is true and TERMINATE:D is false. The signal WCOUNT is also used to trigger a monostable multivibrator D51 which produces a pulse of about 300 nanoseconds in length. This pulse is logically AND'ed with the outputs of the Sigma 5 output latch parity checker D39; and if parity is in error during this pulse a flip-flop circuit is set. The flip-flop output called PARITY ERROR can be used on the card DLI. It is also used as a bit in the control word to the P2000. The parity error flip-flop is cleared by an output pulse from the card DLI, which output pulse is called RESET PARITY.

Figure 68:
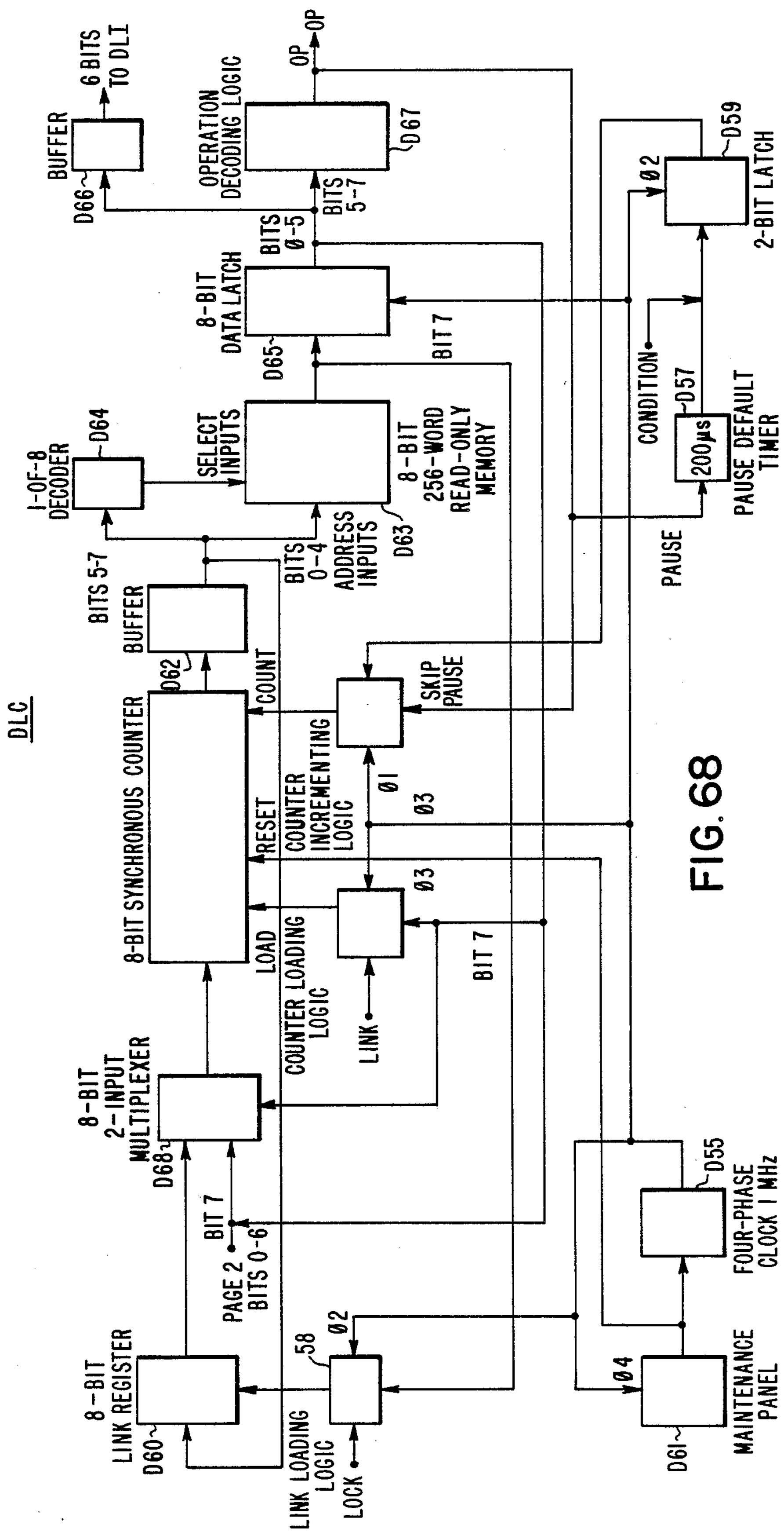
FIG. 68 is a block diagram of the data link control card.

Referring to FIG. 68, a block diagram of data link control card DLC is shown. The card DLC is a programmable sequencer; that is, a micro computer capable of executing a program stored in read only memory. In conjunction with the card DLI, the card DLC under program control adjusts the various data paths so data can be transferred back and forth between the Sigma 5 and the P2000. The card DLC is controlled by a four phase clock D55 operating at one megahertz. A crystal controlled oscillator operates at 2 megahertz, and its output is buffered and its frequency is halved using a flip-flop, and the four phases are decoded.

Only clock phase four appears when the data link is in the stop mode. Phase one of the clock D55 is used for normal incrementing of the program counter D56. There are three paths by which this may be done. Normally a pause instruction is not in effect, and the program counter is incremented by PAUSE and CLOCK1. If a pause instruction is being executed CLOCK1 does not increment the program counter until CONDITION becomes true or 200 microseconds as determined by timer D57 have elapsed since the start of the pause instruction. In the first case, counter D56 is finally incremented by CONDITION, PAUSE, and CLOCK1. In the latter instance, counterclocking is provided by RESUME, PAUSE, and CLOCK1.

The clock phase two represented at D58 serves three functions. The output of the read only memory is loaded into the data latch D59 during this phase. The CONDITION and RESUME signals are also latched by phase two, thereby synchronizing them to the data links control clock. Also, during a jump instruction when the signal LOCK is false, link register D60 is loaded with the contents of the program counter by phase two. Phase three of the clock D55 may be considered as the clock phase when the instruction is actually executed. If the instruction is an output pulse command, phase three causes signal OP to the card DLI to go true. On a jump instruction phase three loads program counter D56 with the jump address. Similarly, on a link instruction phase three causes the program counter D56 to be loaded with the link address; that is, the address of the jump instruction that loaded the link register. Finally, if CONDITION is true on a skip instruction, the program is incremented by CONDITION, SKIP, and CLOCK3.

Phase four of the clock D55 is used only in conjunction with maintenance panel D61. The RUN/STOP SWITCH and the SINGLE CYCLE and RESET P PUSHBUTTONS only operate when phase four of the clock is false, and transitions from RUN TO STOP MODE or vice versa can only occur during phase four. This is to assure completion of the cycle in progress when its switch is operated on the maintenance panel. The program counter D56 is implemented with two standard type 4 bit synchronous counters. The counter outputs are buffered by buffer D62; and the outputs of these buffers are considered to be the program counter output. The output of the buffer D62 goes to the input of the 8 bit link register D60. These outputs are also used to address read only memory D63. The five low order program counter bits are connected directly to the address inputs of eight 256 word programmable read only memories D56. The three high order bits feed a decoder D64, the eight low order outputs of which each connect to the chip select on one of the read only memories D63. The outputs of the eight read only memories are paralleled and connected to the input of an 8 bit data latch D65. The six low order data outputs are buffered by buffer D66 and sent to card DLI. These outputs are used for output pulse and condition decoding (signals A0 through A5). The three high order data latch outputs are transmitted to block D67 for decoding the instruction operation code. For example, D7 denotes the jump instruction, D6 and D7 denote an output pulse, D5, D6, and D7 denote a pause and D5, D6, and D7 denote a skip command. The seven low order data latch outputs also connect to one set of inputs of an 8 bit, 2 bit multiplexer D68. The eighth input to D68 is signal PAGEl from the card DLI.

The multiplexer D68 is used in the parallel loading of the program counter D56. The outputs of the multiplexer D68 connect to the data input of the counter D56. The other set of multiplexer inputs are the outputs of the link register D60. The multiplexer D68 is controlled by a signal D7. The load signal to the counter D56 occurs on the coincident of phase three of the clock and either signal D7 or signal LINK, which signal comes from the card DLI. Thus, on a jump command, the counters are loaded with a low order seven data latch output and the page bit. On a link command, which is an output pulse, the counters are loaded with the content of the link register D60. As mentioned previously, the data latch is clocked by phase two of the clock. The link register D60 is also loaded by phase two, but only when a jump instruction is being executed; that is, when signal M7 is used instead of D7 for timing consideration, and signal LOCK from the card DLI is true. There is an additional 2 bit latch D59 that is loaded by phase two, the inputs to which are CONDITIONED (from the card DLI) and RESUME.

The low order counter is clocked by phase one and PAUSE, CLOCK1, PAUSE and CONDITION, CLOCK1, PAUSE and RESUME or CLOCK3, SKIP and CONDITION. It can also be manually incremented by a pushbutton on the maintenance panel when the data link is stopped. The high order counter is clocked by the CARRY output of the low order counter or pushbutton on the maintenance panel when the data link is stopped. Both counters can be manually reset by operating a reset pushbutton on the control panel.

The signal OP is sent to the card DLI to control output pulses; and the signals SKIP and PAUSE are used on the cards DLC to clock the counters as described above. The pause default counter D57, which is provided with a retriggerable monostable multivibrator is triggered by the signal PAUSE. The outputs of this timer are used on the card DLI, and when the data link is in the RUN mode to generate the signal RESUME. It should be noted that dummy instructions should be inserted between consecutive pause instructions to ensure that the second of two consecutive pause instructions will not result in a premature pause to fault.

During single cycle operation, the pause default is disabled; and in order to advance the data link out of a pause, if CONDITION is false when the single cycle pushbutton is operated, a pushbutton on the maintenance panel is provided. Maintenance panel functions are also provided on the card DLC.

There are pushbuttons (not shown) for executing a single instruction, resetting the program counter, and incrementing the low order program counter and the high order program counter. There is also a switch to select run or stop modes. The circuitry provides flip-flops on all switches to prevent false operation due to contact zones; and the circuitry allows the reset, single cycle, and run/stop mode to operate only when the phase four of the clock is false. It permits the pushbuttons on the control panel for incrementing the high and low order counter to operate only when in the stop mode; and it allows the signal OPR which gates the first three phases of the clock to change state only during the fourth phase.

Four groups of light emitting diodes (not shown) are also provided as part of the maintenance panel function of the card DLC. The first group indicates the state of the program counter signals C0 through C7. The second group monitors the data latch D0 through D7, and the third reflects the link register, L0 through L7. The last group indicates the state of seven important control signals, LOCK, LINK, OUTPUT PULSE and CLOCK3, SKIP, PAUSE, CONDITION and PAGE2, or PAGE1.

Figure 69:
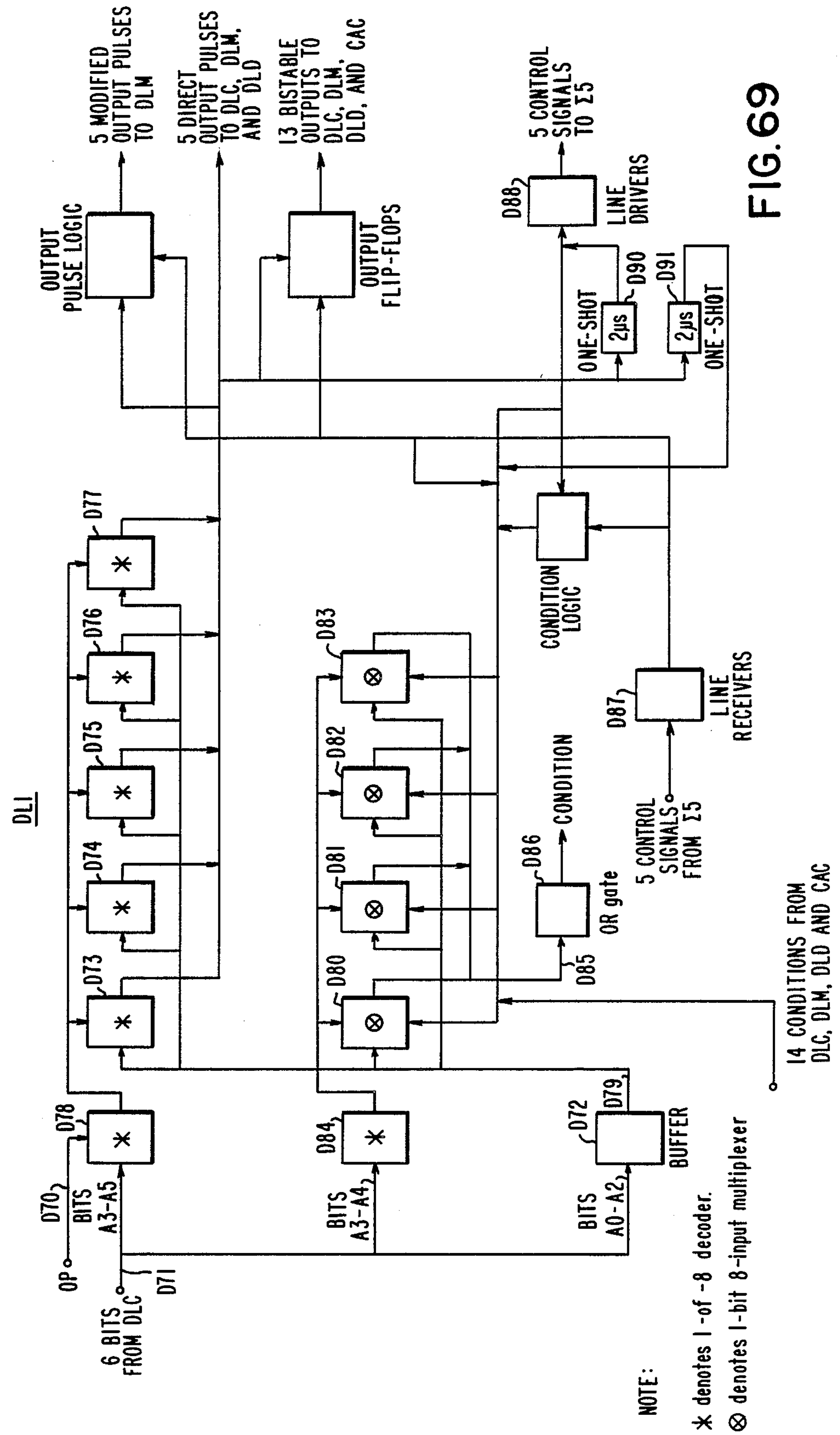
FIG. 69 is a block diagram of the data link input/output card.

Referring to FIG. 69, the data link input/output card DLI handles input to and output from the data link micro processor or card DLC. The DLI card also interchanges control signals with the cards DLD and DLM, and with the Sigma 5 computer.

Signal OP on line D70, and signals A0 through A5 inclusive on line D71, which are all received from the card DLC, control the output pulses of the card DLI. Signals A0 through A2 are buffered by buffer D72 and fed to the address inputs of five decoders D73, D74, D75, D76, and D77. The enable inputs of the decoders D73 through D77 are controlled by the outputs of a decoder D78. The decoder D78 is addressed by the signals A3 through A5 and enabled by the signal OP. The decoders D73 through D78 are conventional one of eight decoders; thus, the signal OP enables a one of forty decoder addressed by the data output of the card DLC.

The buffered signals A0, Al, and A2 on line D79 drive the address input of four conventional type 8 input multiplexers D80, D81, D82, and D83. The multiplexer D80 through D83 are enabled by the output of a one of eight decoder D84, which decoder is addressed by signals A3 and A4. The output of the four multiplexers D80 through D83 on line D85 are logically OR'ed by gate D86 and are transmitted to the card DLC as the CONDITION signal. In this manner, the card DLC looks at one of 32 input conditions.

Five control signals are received by line receivers D87 from the Sigma 5 computer. These signals are STROBE:D, TERMINATE:D, INITIATE:D, ACKNOWLEDGE:D and PROCEED:D. These signals are used as input conditions and also for some direct control function. The signal STROBE:D is used to directly signal SOLATCH for use on the card DLM. When the signal STROBE:D is true and TERMINATE:D is false signals WCOUNT and WRITE are generated; these are also used on the card DLM. When both STROBE:D and TERMINATE:D are true, control signal TWS to the P2000, by way of the card DLM, is set and control signals TWOS, INIT, ACKN are cleared. Similarly, when STROBE:D is true, INITIATE:D is true, and TERMINATE:D is false, INIT is set and ACKN, TWS, and TWOS are cleared the corresponding five control signals sent to the Sigma 5 through line driver D88 are STROBE:R, TERMINATE:R, INITIATE:R, ACKNOWLEDGE:R, and PROCEED:R. These signals are controlled by output pulses as hereinafter described.

As previously mentioned forty output pulses are required to operate the high speed data link as an interface between the Sigma 5 computer and a P2000 computer. A list of the output pulses are contained in Table I of the appendix. Output pulses 00 through 02 are used in the linking function. Pulse 00 locks the link register to prevent it from being loaded by a jump instruction via the signal LOCK to the data link control card DLC (see FIG. 68). Pulse 01 causes a link; that is, the contents of the link register are loaded into the program counter, by means of the signal LINK and unlocks the link. Pulse 02 unlocks the link without affecting the program counter.

Output pulses 03 and 04 control the page bit via signal PAGEl to the card DLC. Pulse 03 selects page 1 and pulse 04 selects page 4. Pulses 05 through 09 provides control functions for the data buffer card DLD (see FIG. 66 ). Pulse 05 sets HSELECT, which is also used for control word steering on the card DLM; and pulse 06 clears this signal. Pulse 07 pulses the signal ILATCH, pulse 08 pulses LOLATCH, and pulse 09 operates HOLATCH.

Output pulses 0A through 0D control the multiplexers 30 on the memory and steering card DLM (see FIG. 67). Pulse 0A sets ASELECT, 0B clears ASELECT, 0C sets CSELECT, and 0D clears CSELECT.

Pulses 0F through 13 are also used to control the card DLM. Pulse OF operates the RESET PARITY signal. Pulse 10 resets the memory address counters via the signal CRESET. Pulse 11 pulses signal RCOUNT; and pulses 2 and 13 operate signals WCOUNT and WRITE, respectively.

Pulses 14 through 19 are used to control the external request to the channel adapter control card CAC (see FIG. 65). Pulse 14 sets EDOR, 16 sets EDIR, and 15 resets both of these signals. Similarly, pulse 17 sets EIR, 18 clears EIR and sets ECPR, while pulse 19 clears the normally true signal ECPR.

Pulse lB sets ACKN and clears INIT, TWS, and TWOS; pulse lE sets TWOS and clears INIT, ACKN, TWS. Pulse 1D clears all four signals, which is used to denote non-operational status to the P2000.

Output pulses 1F through 25 in the Table I operate the control signals to the Sigma 5. 1F sets INITIATE:R and clears ACKNOWLEDGE:R and TERMINATE:R. Pulse 20 sets ACKNOWLEDGE:R and clears INITIATE:R and TERMINATE:R. Pulse 21 sets TERMINATE:R and pulse 24 clears all three signals. Pulses 22 and 23 set and clear PROCEED:R, respectively. Pulse 25 is used to trigger a monostable multivibrator D90 which outputs a 1 microsecond pulse to STROBE:R.

Pulse 26 triggers a 2 microsecond monostable multivibrator D91 which is used for time delay purposes under program control. This timer can also be used to space the STROBE:R pulses when sending data to the Sigma 5 computer. Output pulse 27 performs the system reset function. This resets all appropriate signals to their standby conditions. The signals which are reset by pulse 27 are LOCK, PAGEl, HSELECT, ASELECT, CSELECT, EDCR, EDIR, EIR, INIT, ACKN, TWS, INITIATE:R, ACKNOWLEDGE:R and TERMINATE:R. The pulse 27 sets the signals ECPR, TWOS, and PROCEED:R. In addition, the system resets pulse 27 operates signals CRESET and RESET PARITY to accomplish reset functions on the card DLM.

There are 32 conditionals. These conditionals, which were previously referred to are included in Table II of the appendix. The condition 00 through 02 relate to processor functions. Condition 00 is true when the pause default timer is active, condition 01 is true when the 2 microsecond timer is off, and condition 02 reflects the lock on the link register.

Conditions 03 through 05 monitors signals from the card DLM. Condition 03 is true when the read counter and write counter D48 and D47 (see FIG. 67) are unequal, condition 04 follows bit 3 of the counter D47, and condition 05 reports the state of the 0 bit of the read counter D48.

Condition 06 through 09 monitor the external knowledge signals from the channel adapter control card CAC. These conditionals follow EDOA, EDIA, EIA, and ECA, respectively. Conditionals OA through OC are feedback monitors on external request signals EDOR, EDIR, and EIR, from the card DLI to the card CAC. The next set of conditionals follow six data signals. Conditionals OD through 11 monitor DBl3 through DBl7, while condition 12 monitor signal DB04. These signals are used for decoding control outputs from the P2000 computer and for determining the direction of transmission specified by the initiate order.

The control signals from the Sigma 5 computer are checked by conditionals 13 through 18 as shown in Table II of the appendix. The non-operational state of the Sigma 5 computer is detected by condition 18. Conditions 1A and 1B are feedback monitors on two control signals to the Sigma 5, ACKNOWLEDGE:R and TERMINATE:R, respectively. The remaining conditionals monitor the control signals to the P2000. Conditionals 19, 1C, 1D, and 1E follow INIT, TWOS, TWS, and ACKN. Conditional 1F detects the fact that the Sigma 5 non-operational status has been sent to the P2000 computer.

With the exception of the hardwired functions previously explained, the computer data link software provides for interpretation, translation and transmission of all control signals from the Sigma 5 to the P2000 and from the P2000 to the Sigma 5, and provides data transfer from the P2000 to the Sigma 5 and from the Sigma 5 to the P2000, including packing of bytes into words and unpacking of words into bytes. The data link software comprises five major subroutines, idle subroutines, control word to P2000, control to Sigma 5, data transfer, Sigma 5 to P2000, and data transfer, P2000 to Sigma 5.

Idle Subroutine

The idle subroutine basically looks for control signals from the Sigma 5 or the P2000 computer. Under normal conditions this is an initiation from either end. If WINIT becomes true, the program jumps to the subroutine that transfers a control word to the P2000. If ECA becomes true, it jumps to the subroutine that sets the control signals to the Sigma 5. If the idle subroutine detects a non-operational status, it sets W to zero, and sends this control word to the P2000, and returns to the idle subroutine and waits for the non-operational status condition to go away. When this occurs, the program sets TWOS and sends this on to the P2000 to indicate sensation of the non-operational condition and again returns to idle, by way of the system reset heretofore described.

Control Word To P2000

This subroutine transfers control information from the Sigma 5 to the A or B P2000 including the 8-bit status byte. When necessary upon entering the routine by III, the controller pauses until the incoming strobe is false. It then determines if the control word is an initiate or a terminate. If it is an initiate or a TWS, the status byte is routed to LOLATCH. Also, if it is a TWS, this is remembered by locking the link. If it is an acknowledge or a TWOS, the LOLATCH is bypassed and the control word loaded into the high order latch and transferred to the P2000 by setting EIR. If WACK is true, then a data transfer determined by DB14 takes place. If not, then the controller goes into a loop waiting for ECA or a disconnect from Sigma 5.

Control To Sigma 5

This subroutine latches the control word from the P2000 (see FIG. 63 ), and routes the data directly to the Sigma 5. If DB17 is true, the controller sets INITIATE to the Sigma 5 and clears PROCEED to initially prevent data transmission, and produces a strobe which transfers the status byte to the Sigma 5. The program then awaits TERMINATE, NOP, or ACKN. When one of these is received, it is sent to the P2000. If DB16 is true, ACKN is sent to the Sigma 5 and the proper data transfer subroutine is chosen by DB04. If DB15 is true, TERM is sent to the Sigma 5 along with a status byte and a strobe. If LOCK is true, the termination with status TWS has been sent and received and the controller returns to idle. If not, it waits for TWS or a Sigma 5 disconnect. If DB14 is true, TERMINATE is sent to the Sigma 5 and then the data link waits for a TWS or a disconnect. If none of these is true, all control signals to the Sigma 5 are reset for 200 microseconds indicating a temporary non-operational condition which will send the Sigma 5 and the high speed data link back to an idle condition.

Data Transfer -- Sigma 5 To P2000

Upon entering this subroutine, note that PROCEED has previously been set false to prevent the CIU from transferring data before the HSDL is ready. ASELECT sets the multiplexer for data transfer into the memory from the CIU and out of the memory to HOLATCH and LOLATCH. The parity is reset, the read and write counters are reset, the write counter is selected, and PROCEED is set true. At this point, data transfer is hardwired and the controller only checks for TERM, NOP and COUNT ≧8. If TERM is true before COUNT ≧8, then the data is transferred to the P2000 until the memory is empty. If NOP becomes true, the routine is aborted. If COUNT ≧8 becomes true, PROCEED is cleared to stop data transfer temporarily, and 4 μsec is allowed for the last data byte to be written into memory. At this point, the read counter is chosen and RCØ is false, that memory location is loaded into HOLATCH and the read counter is clocked. If the counts are not equal, the next byte is loaded into LOLATCH and the entire word is sent to the P2000 by setting EDIR. At this point, ECA is checked to see if the P2000 wants to terminate the transmission. This loop is repeated until the counts become equal. If the counts are equal on HOLATCH, the read and write counters are incremented before setting PROCEED so as to save the last half-word. If the counts are equal on LOLATCH and if TERMINATE has not become true, the counters are reset to zero. Any time TERMINATE becomes true, this subroutine will send data to the P2000 until the counts become equal. Only ECA and NOP afford an escape without equal counts.

Data Transfer -- P2000 To Σ5

Upon entering this subroutine, PROCEED is set true since it had previously been set false and this condition is no longer necessary. Then the read and write counters are reset and ECA is checked for a P2000 termination. Here EDOR is set requesting a data output word from the P2000. Here EDOA and ECA are monitored for either a data word or a termination. If a word is received, it is written into memory a half-word at a time, with the high-order first and the low-order second. This loop is repeated until either the COUNT becomes ≧8 or ECA becomes true. At this point, the read counter is selected and PROCEED from the CIU is checked to determine if the CIU is ready to accept data. If so, strobes along with data bytes are sent from the memory until either the counts are equal or TERMINATE or NOP becomes true. When the counts are equal, TERMINATE is again checked and if not true, the HSDL returns to the start of the subroutine. TERM and NOP, when true, result in an immediate exit from the subroutine. However, when ECA is true, exit can only be accomplished by sending the remaining data from the memory to the CIU until the counts are equal.

The HSDL operating program has been designed to accomplish all interface requirements between a Sigma 5 and a P2000 under normal conditions. However, many of the loops in the software cycles have no escape time out routines to bring the high speed data link back to the idle subroutine under abnormal conditions. However, time out routines in the Sigma 5 handler and the P2000 data link program can always return the high speed data link to the idle subroutine since all loops in the software program are waiting for control signals from either the P2000 or the Sigma 5 or both.

INSTRUCTOR'S CONSOLE AND FUNCTION PROGRAM

Figure 74:
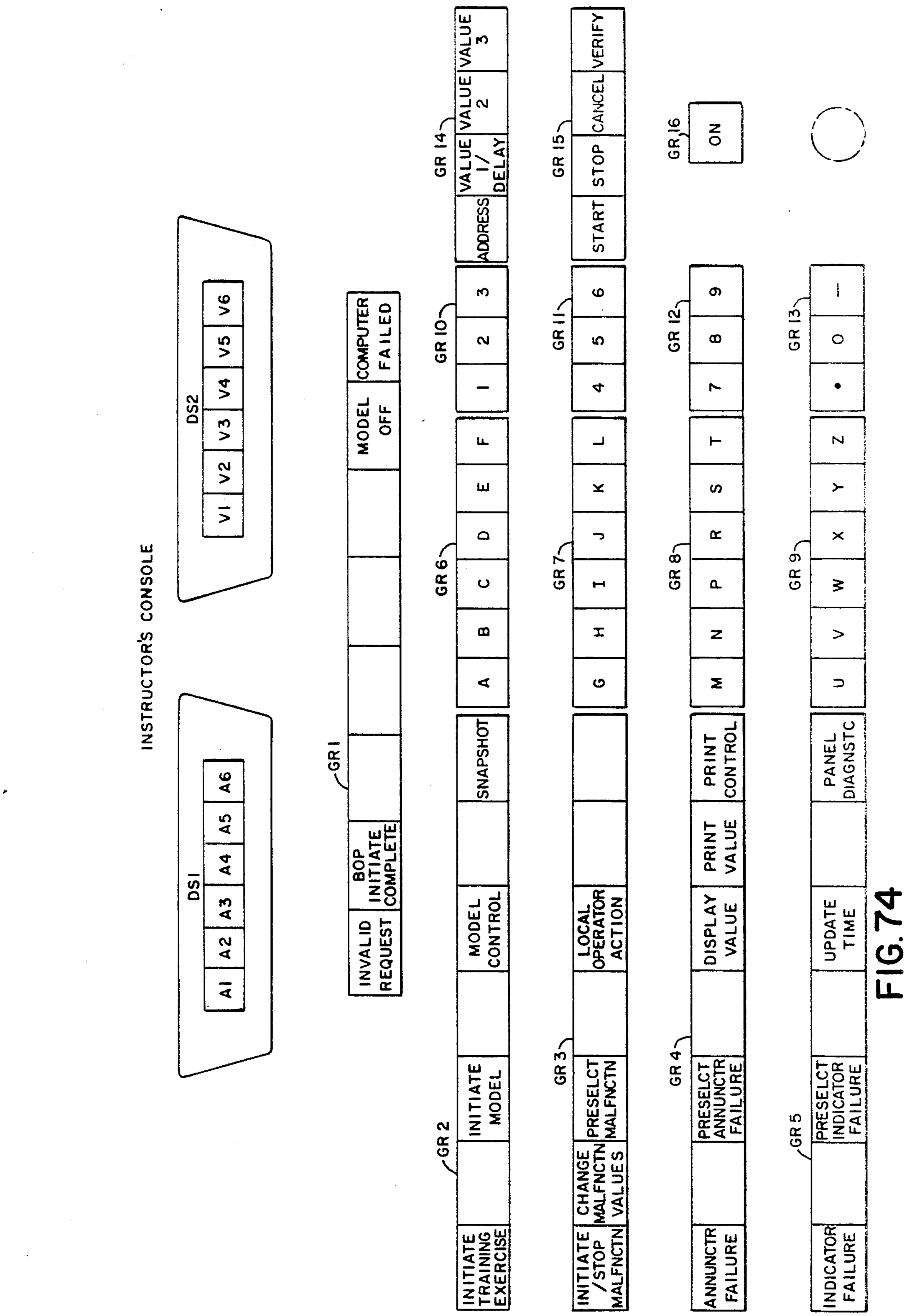
FIG. 74 is a front view of the control and indication panel of the instructor's console.

Referring to FIG. 74, the panel of the instructor's console in the preferred embodiment includes digital displays DS1 and DS2 with six windows each. Although the preferred instructor's console hardware/-software organization and its functions provide certain advantages other approaches can be employed consistently with implementation of various features of the invention. The address display DS1 displays alphanumeric symbols. Value display DS2 presents either an unsigned, six digit decimal number with decimal point, or a signed negative, five digit decimal number with decimal point.

Indicators GR1 include a lamp termed "invalid request" which is turned on when the instructor violates certain rules concerning pushbutton operation. Indicator switch "BOP initiate complete" is pressed by the instructor to indicate to the simulator the completion of the proper switch settings and electrohydraulic turbine control (EH) adjustments necessary for the selected set of initial conditions. Indicator lamp "model off" is turned on when the simulator stops functioning; and lamp "computer failed" is controlled by hardware and is illuminated in response to any event that deenergizes normally energized relays on the DD printed circuit module in the process input/output portion of the B machine. The deenergization of these relays sets the contact which turns on the lamp.

The remainder of the instructor's console panel comprises a plurality of pushbuttons which are arranged in rows and columns. Pushbuttons GR2, GR3, GR4, and GR5 refer to pushbuttons which determine a particular function of the simulator. Pushbuttons in the rows GR6, GR7, GR8 and GR9 together with the groups of pushbuttons GR10, GR11, GR12 and GR13 are provided to enter alphanumeric data into the simulator. Those pushbuttons designated as GR14 are sub-function pushbuttons and those designated GR15 are action pushbuttons. A two position "off, on" key switch is designated GR16; and when the switch is in the "off" position the snapshot function cannot be initiated.

Referring again to FIG. 2, a typewriter A is connected to the instructor's console to log messages related to operator actions on the reactor control panel, engineered safeguards panel, nuclear instrumentation panel, flux mapping panel, thermocouple panel, and radiation monitoring panel. Typewriter B in FIG. 2 is used to log messages related to operator actions on the Balance of Plant panel, electrohydraulic controller, 345 KV panel, and the Diesel generator panel. It is also used for simulator communication with the instructor on matters concerning the instructor's console function.

The instructor's console permits the instructor to communicate with, and control the simulator. In the course of operating the simulator in the training of student nuclear power plant operators or for other purposes he can enter three basic types of information: function data, sub-function data, and action data. Function data is entered by operating any of the pushbuttons in rows GR2, GR3, GR4, or GR5 of the instructor's console. Sub-function data satisfies parameters for the selected function and is entered by pressing selected combinations of pushbuttons in the rows GR6 through GR13 and GR14. Action data initiates the simulator to execute the function and is entered by operating a selected one of the pushbuttons in row GR15 of the instructor's console.

For any operation of the simulator as hereinafter described, either before simulation training, during simulation training, or both, the instructor first determines the particular operation desired; and then presses the appropriate function pushbutton to alert the simulator that a function is being entered. For a given function, there may be optional parameters to control the execution of that function. This is sub-function data, and must be entered via the alphanumeric pushbutton matrix in the appropriate sub-function pushbutton previously mentioned. Sub-function data may be overwritten or corrected on prior to operating an action pushbutton in row GR15.

When all parameters have been entered, the instructor is ready to initiate an action. This action may be "start" "stop" "verify", or "cancel". The "cancel" action erases all parameters and the current selected function. Further selections must then begin by the operation of a function pushbutton. Verify action produces a typewriter output for the instructor to check the current entries. A "start" or "stop" action indicates to the simulator that it should now respond to that function. The simulator determines whether the function should operate in the "stop" mode, the "start" mode, or the "delay" mode.

Referring to the row of function pushbuttons GR2, the "initiate training exercise" pushbutton is operated to determine if all three machines A, B, or C are in a "ready" state for running the model. If the three computers are not in a ready state, a message is printed out for the instructor. To accomplish this function, the operator first presses the "initiate training exercise" pushbutton and enters Value 1 by operating the "1" pushbutton in row GR10 and pressing the "VALUE1/-DELAY" pushbutton in row GR14 followed by the "start" pushbutton in row GR15 of the console which calls the instructor's console function program in the B machine.

When the function program is called, it first checks to see if the synchronizer is on in the B machine. If the synchronizer is not on, a diagnostic message "SYNCH NOT ON IN B" is printed and the function is canceled. Checks are made for the allowable entry "1" and to determine if the model is running in the C machine. If the model is running, a diagnostic message is printed and the function canceled. Then, a data link transmission is made from the B machine to the C machine and then to the A machine. The only data transmitted is the number VALUE1.

The function program then goes into a time delay loop, checking for the acknowledgment of the "initiate training exercise" request from the A machine. The end action routine in the A machine, after receiving this request, bids a sublevel which will determine if the A machine is ready for running the model. Two checks are made; first, to see if the necessary levels are active and able; and second to see if the synchronizer is on A flag RETCOD is then transmitted back to the B machine. This flag is zero if the A machine is ready and non-zero if it is not ready. If the B machine does not receive a return transmission from the A machine after a pres-t time, a diagnostic message is printed and the function canceled. If it does receive a return transmission, RETCOD is checked. If it is non-zero, a diagnostic message is printed to indicate that the A machine is not ready, and the function is canceled, if it is zero, a message is printed indicating that the system is ready, and return is made from the function program.

The ability to transmit to the A machine an receive a return transmission is sufficient test of the readiness of the C machine for running the model. If all three machines are not in a "ready" state, a message as appropriate is printed on the typewriter such as "EH VALVES ARE NOT PROPERLY SET" or "INFTCON ERROR—SYSTEM NOT READY" or "NO ACKNOWLEDGE RECEIVED FROM SIGMA 5" or "INSTCON ERROR —SYSTEM NOT READY" or "SYNCH NOT ON IN B".

The operation of the "initiate model" pushbutton enables the instructor to initialize the simulator to 1 of 28 possible data sets provided the set is validated. Six of the 28 data sets enable the instructor to step the simulator back in time; that is, 5 minutes, 10 minutes, 20 minutes, 25 minutes, and 30 minutes, respectively. The instructor may specify any one of these six data sets in terms of minutes of back track.

Figure 75:
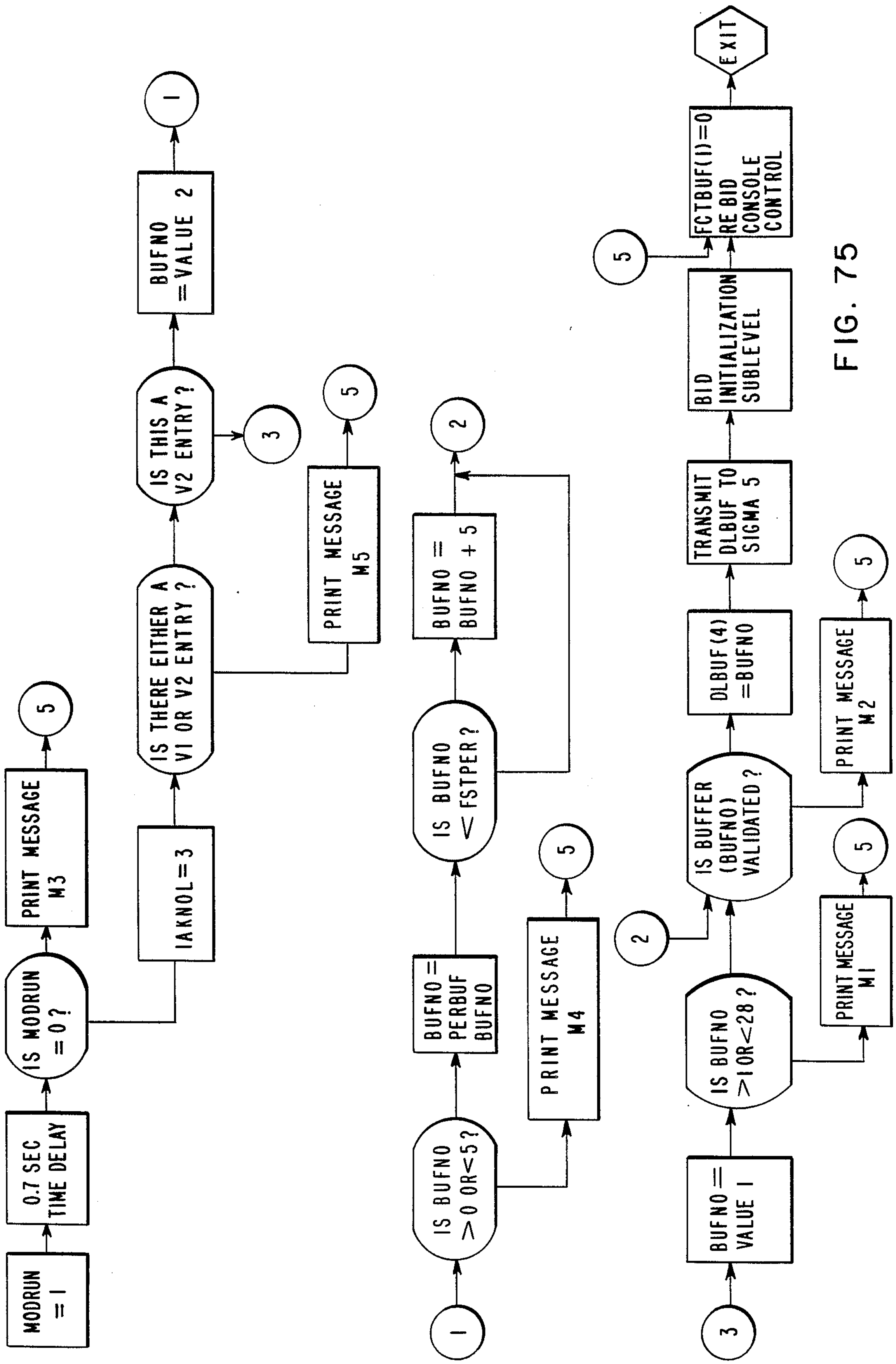
FIG. 75 illustrates the flow chart for the initialize function of the instructor's console.
Figure 76A:
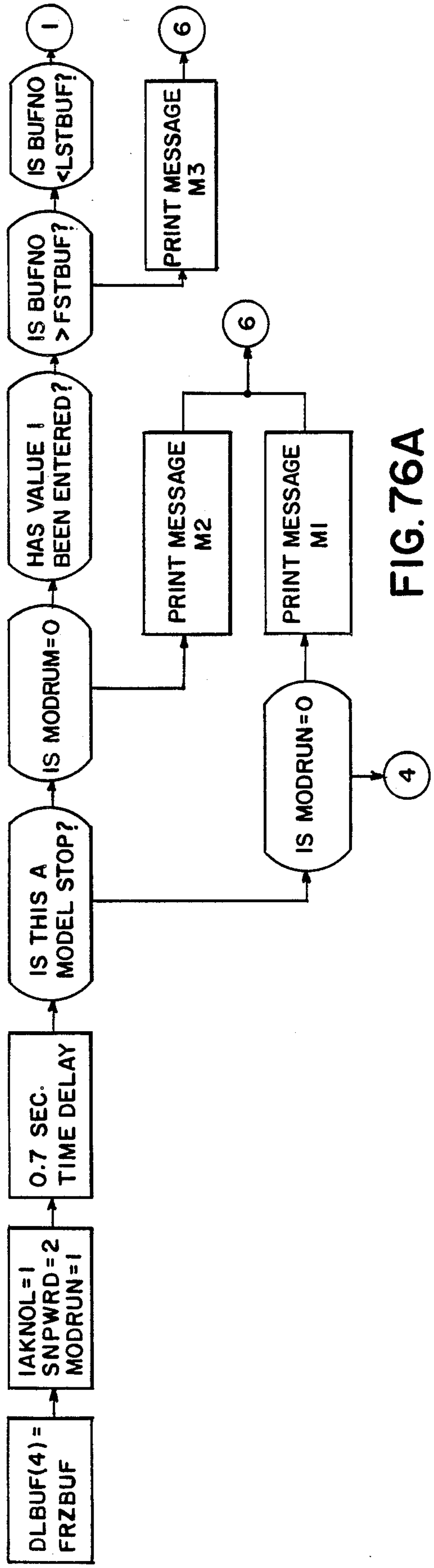
Figure 77A:
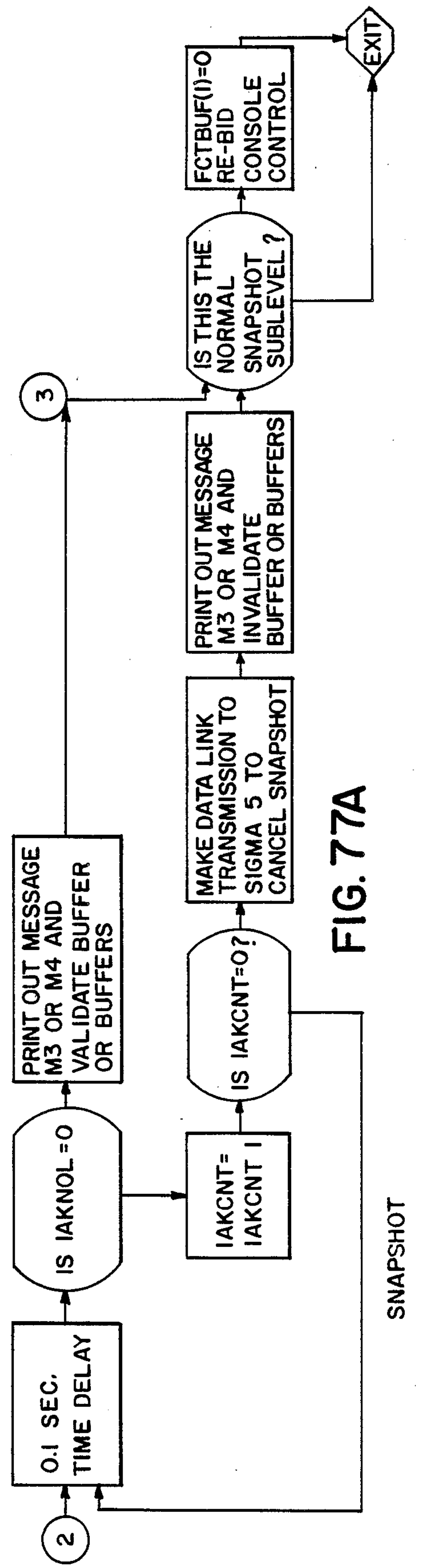
FIGS. 77A, 77B and 77C illustrate the flow chart for the snapshot function of the instructor's console.
Figure 77B:
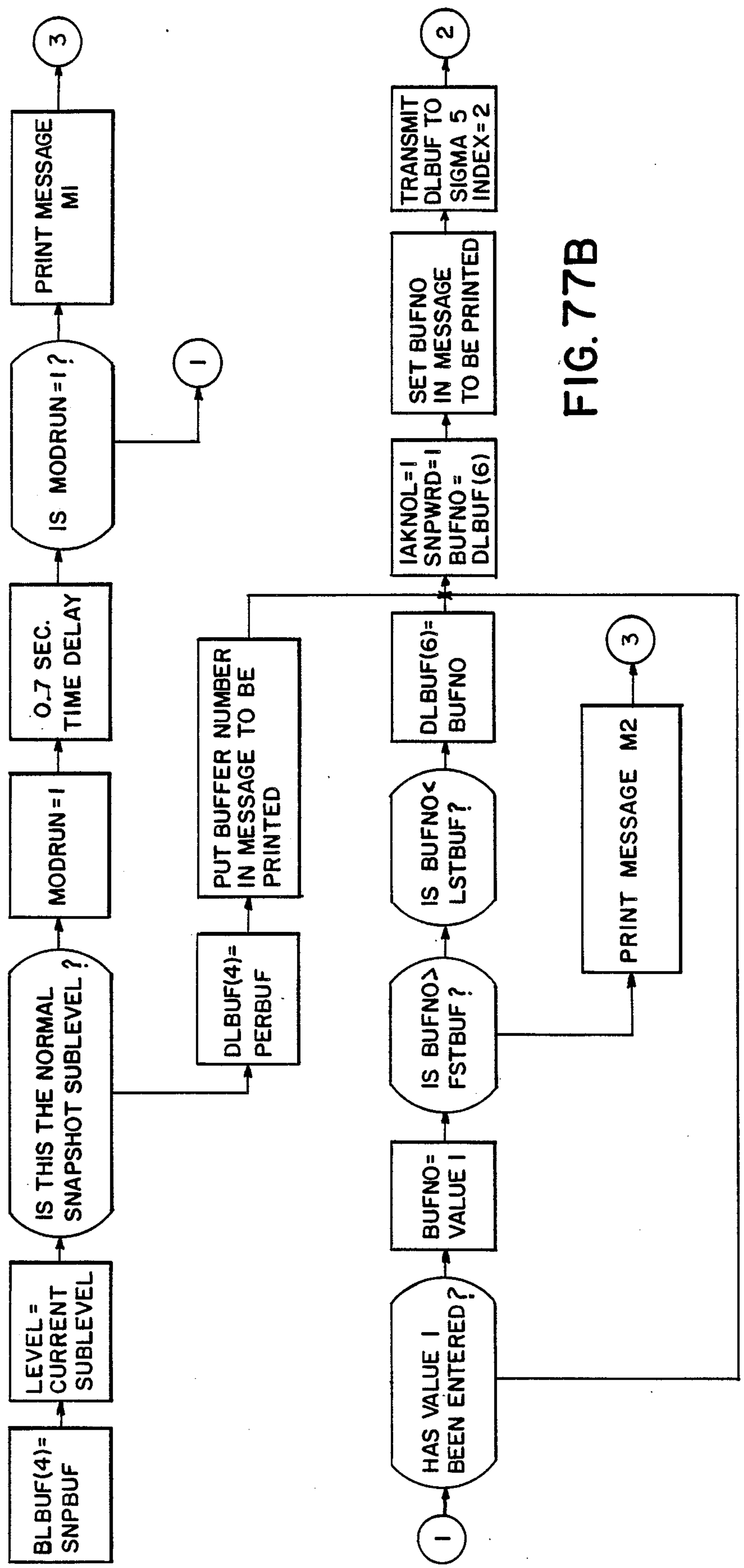
Figure 77C:
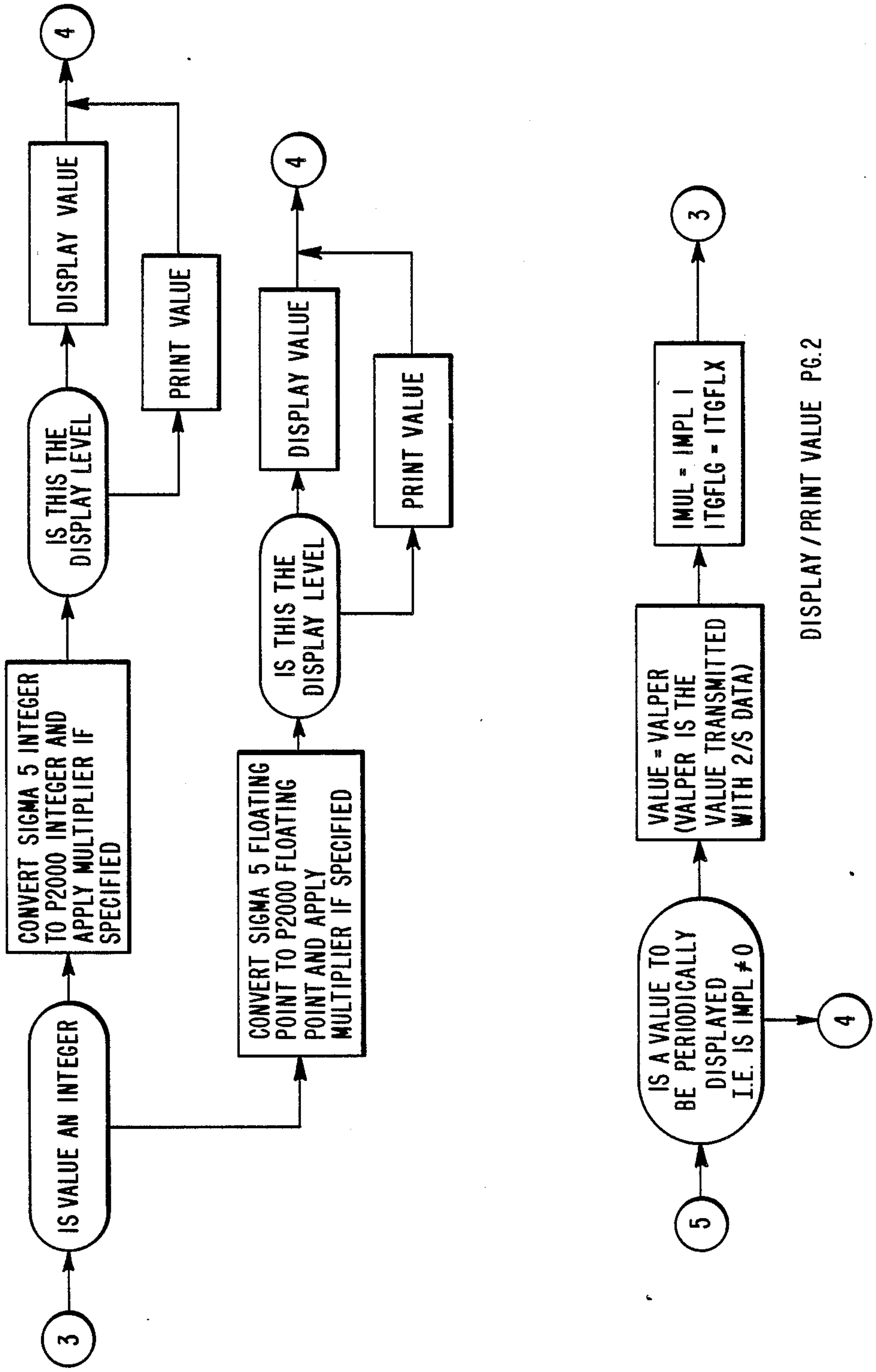

Referring to the flow chart of FIG. 75, the data set is specified by entry to the desired data set number as VALUE1. If it is desired to initialize to the data set which was saved by the back track snapshot taken in the previous 10 minutes, 10 is entered for VALUE2. On selecting the desired data set in terms of minutes of back track, it is assumed that the last back track snapshot which was taken was taken 5 minutes previously, although it could actually have been only seconds ago.

The "start" mode for the model initiate function is the only valid mode, and requires that a data set be specified through a V1 or V2 entry. The instructor's console function program, when called, first checks to see if the model is running. If the model is running a diagnostic message is printed and the function is canceled. If the model is not running a check is made to see if either the V1 or V2 was entered, and if neither was entered a diagnostic message is printed and the function is canceled. If VALUEl was entered, it is checked for validity to insure that it is between 1 and 28. If VALUE2 was entered in minutes, it is converted to the corresponding back track buffer number. The number is checked for validity; that is, an entry of less than 5 or greater than 30 is invalid, and if invalid, a diagnostic message is printed and the function is canceled.

Whether the buffer is determined from the V1 entry or V2 entry, the resulting buffer number is checked to see if the buffer has been validated. If it has not, the diagnostic is printed and the function is canceled. If the buffer has been validated, a type zero data link transmission is made to the C machine to transmit the initialization request and buffer number to the C machine. The buffer number is then stored in a specific location in the B machine and the initilization sublevel is bid. Return is then made from the function program.

The type zero transmission to the C machine results in the calling of the type zero end action routine in the C machine. This routine puts the specific buffer number, the second word in the receiving buffer, in a location in COMMON, sets the flag in COMMON to zero, and transmits the initialization request to the A machine via a type zero data link transmission. It then sets the active bit for LEV31 and exits. LEV31 reads in the specified data set, initializes COMMON block starting addresses for display/print value, and executes a valve handler initilization. It then goes into a loop, checking the flag RETCOD in COMMON for non-zero. This flag will become non-zero when an acknowledgment of initilization completion in the A machine is received.

The type zero transmission to the A machine results in the end action routine being called in the A machine. This routine stores the specified buffer number, which is the fourth word in the receiving buffer, in a specific location in the A machine and bids the initialization sublevel. The action taken by this sublevel was previously described. At the completion of initilization in the A machine, a type zero data link transmission is made back to the C machine, and the flag in COMMON being checked for non-zero by LEV31 is set to one. LEV31 then makes a type zero transmission back to the B machine, and a word IAKNOL in COMMON is decremented by one. The word IAKNOL has been previously set to 3 when the initialization request was made in the B machine.

As previously mentioned, the initialization sublevel in the B machine is bid by the instructor's console function program. The action taken by this sublevel was described previously in connection with the system software for the B machine. At the completion of initialization in the B machine, bit 1 is cleared int eh word IAKNOL in COMMON, and the program goes into a time delay loop, checking for completion of initialization in both the A and the B machines. When Iaknol is zero, initialization has been completed in all three machines, and a message indicating this fact is printed on the B machine logging type writer. This message is initiated from the B machine initialization sublevel. Thus, the simulator must be in a "freeze" condition before this function can be called.

In actual operation if the operator wishes to initialize on any one of the data set number 1 through 20, he first presses the "initiate model" pushbutton; then enters the number by operating pushbutton "1" and "5" of row GR10 and GR11 for data set 15, for example, then presses the pushbutton "VALUEl/DELAY"; then presses the "start" pushbutton. If he wishes to initialize to a condition designated in minutes of back track; that is, the condition of the plant up to 30 minutes previously, he presses pushbutton "2" of row GR10 and "0" of GR13 for 20 minutes, for example, and then presses the pushbutton "VALUE2" of row GR14.

At this point, typewriter A prints out the date and time together with the following message if all procedures are normal "set switches properly, index blank, press rod control startup when ready". Typewriter B also prints out the date and time together with the following message is all procedures are normal "SET SWITCHES PROPERLY, INDEX BLANK, PUSH B INITIALIZATION COMPLETE BUTTON WHEN READY". Then, typewriter B types out the identification of all those switches which are not set to the proper positions. After the operator has set all the designated switches to the proper position, he presses the "rod reset" push button on the reactor control panel (See FIG. 9F) and he then presses "BOP initiate complete" pushbutton of row GR1 on the instructor's console (see FIG. 74).

When the "rod reset" pushbutton on the reactor control panel is pressed, the rod step counters are incremented to their designated values. Indicator lights are set, and meters and recorders moved to their appropriate position, based on the particular initial condition set. When the "BOP initiate complete" pushbutton on the instructor's console is pressed, the EH governor valves are set properly for the requested initial condition set, and when the rod step counters reach their designated values, the message "SIMULATOR INITIALIZATION COMPLETE" is printed out on typewriter B. If procedures are not normal, error messages are printed out on type writer B to indicate that the simulator is running and the function cannot be performed ("INSTCON ERROR—INITIALIZATION REQUEST CANCELED. MODEL IS RUNNING"); to indicate an invalid VALUE1 data entry ("INSTRON ERROR—INVALID ENTRY FOR VALUE1"); a similar message to indicate an invalid VALUE2 data entry; and to indicate that the data set required does not contain valid data ("INSTCON ERROR—BUFFERS NOT VALIDATED").

The "model control" pushbutton in row GR2 provides the function for starting and stopping the simulator. A "stop" can be requested any time the simulator is running; and a "start" can be requested any time the simulator is not running. Normally, the initialize function is executed prior to "model start" to insure that a valid data set exists in core. However, the "start" mode of the function requires no data entry. If the simulator is started properly, an acknowledging message to that effect is printed out on typewriter B. The "stop" mode of the function stores the data present at the time in the freeze buffer, which is data set 28. If a value number has been specified, the same data set is stored in the buffer specified by VALUE1.

To start the simulator, the "model control" pushbutton is operated which is followed by the operation of the "start" pushbutton on the instructor's console. To stop and freeze the simulator, the "model control" pushbutton is operated then, if it is desired to freeze the present data in a buffer number in addition to buffer 28 the buffer number is specified by pressing the appropriate numerical pushbuttons; and then the "stop" pushbutton is operated. Error messages are also printed out to indicate the simulator is running and the "start" function request is ("INVALID MODEL START REQUEST"); to indicate that there is a malfunction which prohibits the simulator from starting ("NO ACKNOWLEDGE. REQUEST CANCELED"); or a message is printed out to indicate a successful start operation ("MODEL STARTED").

Referring to the flow chart of FIGS. 76A through 76D, the "model control" function first checks to see if the model is running. If it is, the function is canceled after printing a diagnostic message. If it is not running, a type zero data link transmission is made to the C machine. The function program then goes into a time delay loop waiting for a completion signal from the C machine. When the type zero data link transmission requesting model start is received in the C machine, the end action routine initiates a type zero transmission to the A machine, and then sets the active bit for levels 1 and 17. Level 5 is also enabled in the periodic bid. A data link transmission is then made back to the B machine to acknowledge completion of model start.

As a result of the data link transmission made to the A machine the type zero end action routine on the A machine is called. The end action routine, upon detecting the model start request; restores the logical time delay linkages, enables the panel interface chains, and bids for the chain levels. Also, as a result of the data link transmission made to the A machine, the type zero end action routine in the B machine is called. This end action routine detects the model start acknowledge and sets flag IAKNOL to zero. The model start function program checks IAKNOL for zero in a time delay loop. When it finds it equal to zero, it restores the logical time delay linkages, enables the panel interface chains, and bids for the chain levels. In addition, the fifteen second malfunction delay sublevel is added to the periodic bid. A message acknowledging that the model has been started is then printed, and exit is made from the function program. If no acknowledgment is received from the C machine after a preset time, a diagnostic message is printed.

The stop mode of the model control function is essentially identical to the snapshot function. The data link transmission which is made from the B machine to the C machine results in data in the type zero receiving buffer in the C machine wherein word 1 equals 5, which is the code to identify model stop; word 2, which is equal to the freeze buffer number, and word 3 which is equal to the buffer number entered as VALUEl. When the type zero end action routine of the C machine is called as a result of a model stop request, the word SNPREQ in COMMON is set to 2 to indicate that LEV5 in the C machine is not to be enabled following the snapshot completion. Thus, the model stop request is a snapshot request, with data storage in the freeze buffer, but with LEV5 not enabled, the model is stopped following completion of the snapshot.

At anytime during the course of operation, the instructor can store the condition of the simulated plant. Once stored, this condition can be recalled at anytime thereafter. This is useful, if the student operator made an error in correcting a malfunction, for example, and the instructor wished to store the simulated condition at the time error was made by the student. In addition to the instructor storing the condition of the plant, the simulator automatically stores the condition of the plant as a snapshot every 5 minutes. This permits the instructor to go back in time, for example, if he wishes to correct an error made by the student and he wishes to continue the operation from the time previous to the error. It is also useful if the instructor wishes to start a training class the next day at a time previous to that when the simulator was turned off; or if different training classes are using the same simulator, there can always be a continuity for the same class.

The operation of the "snapshot" pushbutton in row GR2 provides the capability for storing the status of the model at any time into data set or buffer 27. If a valid data set number 1 through 28 is entered for the VALUEI entry, this snapshot data is also stored in the buffer number specified. First, the operator presses the "snapshot" pushbutton. Then if it is desired to enter the snapshot data in a buffer number in addition to 27, the buffer number is entered by pressing the appropriate numerical pushbuttons; then the pushbutton "VALUEl/DELAY" is pressed; and finally the "start" pushbutton is pressed. For this function, error messages are printed out to indicate that the simulator is not running and therefore the snapshot request is invalid ("SNAPSHOT REQUEST CANCELED. MODEL NOT RUNNING"); to indicate an invalid data set number ("INVALID ENTRY FOR VALUEl"); and to indicate that the snapshot function has not been completed ("NO ACKNOWLEDGE. BUFFER 27 INVALIDATED").

Referring to the flow charts of FIGS. 77A through 77D, the snapshot function provides the capability for recording and storing the status of the model, at any time, in all three machines. The time at which a snapshot of the model status may be taken in the present embodiment occurs every ½ second. All requests for a snapshot originate in the B machine, and are then transmitted to the C machine. The snapshot request is stored in the C machine, and is executed at the appropriate time in the model calculation cycle. The only data which must be supplied with the snapshot request is the buffer number in which the data set is to be stored.

The snapshot request is able to be originated by pressing the "model control" pushbutton in row GR2 on the instructor's console; and while the model is running the snapshot request originates at the expiration of every 5 minute interval. In this event, the snapshot is stored in buffers 21 through 26 in a rotational fashion.

There is no required data entry for the snapshot function. The VALUEl entry is optional, and if entered, represents the buffer in which the data set is to be stored in addition to the snapshot buffer 27. The fourth word of the data link buffer is set equal to the snapshot buffer number. A check is then made to determine if this is a normal snapshot request; that is, not periodic, and if so, a check is made to see if the model is running. If the model is not running, a diagnostic message is printed and the request canceled. If the model is running, a check is made to see if a VALUEl was entered. If so, it is checked for validity to insure that it is a number between 1 and 20.

If an invalid entry is detected, the function is canceled. The six word of the data link buffer is then set equal to the value entered and a call is made to transmit the data link buffer to the C machine. The function program then goes into a time delay loop waiting for a snapshot completion signal from the C machine.

When the data link transmission requesting a snapshot is received in the C machine, the following data concerning snapshot is in the receiving buffer: word 1 equals 2 which is the code to identify the snapshot, word 2 is the snapshot buffer number, and word 3 is the buffer number entered as VALUEl. The end action routine for the type zero transmission from the B machine, in the C machine, puts the buffer numbers in two words SNPBF1 and SNPBF2 of COMMON. In addition, word SNPREQ in COMMON is set equal to 1.

Level LEV2 of the C machine which initiates the four per second transmissions to the A machine and the B machine checks just prior to each transmission and, if SNPREQ is not zero, and if it is the pass or cycle following the initiation of the two per second model calculations, the snapshot request is initiated. This is accomplished by setting a word SNPCTL in COMMON equal to 3 and putting the requested buffer numbers in the four per second data transmitted to both the A and the B machines. When the four per second end action routines in both the A and B machines detect that a non-zero number is present in the first of the two locations reserved for snapshot buffer numbers, they bid the snapshot sublevel. The snapshot sublevel in both the A and B machines converts the buffer number to a disc sector number and writes the required snapshot data onto the disc.

If two buffer numbers are specified, the data is written into each of the specified buffers. A type zero transmission is then made back to the C machine to acknowledge snapshot completion. In the C machine, level LEV3 detects a non-zero value SNPCTL and calls subroutine STORE to store the snapshot data in the specified buffers on disc. Following this, SNPCTL is decremented by one and LEV3 goes into a loop checking SNPCTL for zero.

When type zero end action routines from both the A and the B machine and the Sigma 5 or C machine detects snapshot completion, they each decrement SNPCTL by one. Thus, when snapshot is completed in all three machines, level LEV3 will continue. LEV3 then checks SNPREQ, and if it is not 2 it indicates that a freeze has not been requested and LEV3 unsuspends level LEV5. Until the snapshot has been completed in all three machines, LEV5 remains suspended. SNPREQ is then set equal to zero as well as both words in the four per second data to the A and B machine for snapshot buffer numbers. A type zero data link transmission is made to the B machine to acknowledge snapshot completion. The type zero end action routine in the B machine zero's out flag IAKNOL which the snapshot function program in the B machine was checking in a time delay loop.

When the instructor's console function program detects that IAKNOL is zero to indicate that the snapshot is complete, it validates the buffer or buffers in question and prints out an acknowledge message. The function program then exits. If no snapshot completion acknowledgment is received from the C machine after a predetermined time such 5 to 10 seconds, a type zero data link transmission is made to the C machine to zero out SNPCTL and remove LEV3 from the loop where it is checking for snapshot completion. A message is then printed indicating that no acknowledgment was received from the C machine and the buffers in question are then invalidated. The function program then exits.

When the snapshot function program is called by the periodic bid; that is, every 5 minutes for backtrack, the action taken is the same as for a normal snapshot except that the fourth word of the data link buffer for transmission to the C machine is set equal to the periodic buffer number instead of the snapshot buffer number. The periodic buffer number is updated by the two per second end action routine which bids the periodic snapshot every 5 minutes. Also, no check is made for a VALUE1 entry; and the console control is not rebid before exit from the routine.

In the present embodiment of the invention, provision is made for 28 model data buffers. Buffers 1 through 20 are referred to as initial condition or I.C. buffers. Buffers 21 through 26 are used as backtrack buffers that is, where the status of the simulation is stored during each 5 minutes of operation in a rotational fashion. This permits the instructor to go back in time a maximum of 30 minutes, which is practical for training purposes. Buffer number 27 is the snapshot buffer where the model status is stored in response to the operation of the "snapshot" pushbutton on the instructor's console. Buffer number 28 is the freeze buffer where the simulation data is stored when a freeze is requested. Buffers 1 through 20 are the only buffers in which the instructor has an option of storing information.

The calling of the snapshot function on a periodic basis, every 5 minutes for example, is accomplished by the two per second end action routine in the C machine. Thus, it is called only when the model is running. Two words have been assigned in core wherein the bits of these words indicate the status of a buffer. Bit zero of the first word corresponds to buffer 1, bit two to buffer 2 etc. Bit zero of the second word corresponds to buffer 17, and bit 11 corresponds to buffer 28. When a bit is set to 1, the buffer is validated. When it is set to zero, the buffer is invalidated. A bit is set when a successful storage has taken place in its corresponding buffer. A routine BITRTN is provided for setting or clearing of specified bits, and for checking the status of specified bits. The "snapshot" or "freeze" function sets or clears bits, and the "initialize" function interrogates the status of bits.

The instructor is able to introduce a malfunction by the operation hereinafter described. He can either cause a malfunction immediately or at some designated time in the future. Thus, the instructor can be at the control panel rather than at the instructor's console when a malfunction occurs, thus being able to watch a student operator's reaction to an emergency when he is least expecting it.

Referring to the row of pushbuttons GR3, the operation of the "initiate/stop MALFNCTN" pushbutton provides the function of initiating a single malfunction or preselected malfunctions. First, the operator presses the "initiate/stop MALFNCTN" pushbutton; then he enters the address data, if required, by operating the alphabetic and numeric pushbuttons; then he presses the "address" sub-function pushbutton in row GRl4; then he enters the particular malfunction by operating the numeric keyboard; then he presses either the "VALUEl/DELAY" if he wishes to start malfunction in future, "VALUE2" or "VALUE3" pushbuttons to correspond with the data entered in the preceding step; and then he presses the "start" pushbutton. The same procedure is followed if he wishes to stop a particular malfunction by operating the "stop" pushbutton instead of the "start" pushbutton. To initiate preselected malfunctions, the operator presses the "initiate/stop MALFNCTN" pushbutton; then he presses the buttons MAA as address data; he next presses the "address" sub-function pushbutton; and then he operates the "start" pushbutton. A message is printed out on typewriter B to indicate successful initiation of each malfunction, such as for example. "MALFUNCTION M21 INITIATED".

As shown in pages C2082 to C2088 of the computer print-out in the file of this application, the initiate/stop malfunction program MALINT is activated by the "initiate/stop malfunction" pushbutton on the instructor's console. The console input data is transferred to the function program as a single malfunction or a preselected table of malfunctions. In the single malfunction mode, an address M'NN' is entered where NN indicates the malfunction number and varies from 00–99 to specify one of the 100 prestored major malfunctions. For the preselected table of malfunctions, the address M AA is the code input to indicate to the program that a preselected table of malfunctions is to be executed.

Referring to FIG. 78, before any action is taken on a malfunction/initiate request, a series of checks is performed to determine the validity of the request by utilizing information in the CHCKBT array. When a delay is specified, this program activates the delay by incrementing a counter MALACT which is used by the MALDEL program for tracking the delay, and setting the "delay-made" bit in the CHCKBT array word for the proper malfunction which bit is also used by the program MALDEL. When the malfunction is to be initiated or terminated, the appropriate PROGEN logical MXX flags, where XX varies from 00 to 99 are set or reset in the C machine and a type zero transmission on index equals 8 is made to the C machine.

In the C machine, the end action routine BTOFIV sets the appropriate Fortran logicals and corresponding values based on the transmitted data. The BTOFIV routine also initiates a type zero transmission to the A machine. In the A machine, the type zero end action routine FIVTOA in conjunction with the program MALLVL, changes the appropriate PROGEN logicals and the corresponding values. Thus, all three computers contain the same information about all the malfunctions (malfunction flag VALUE2 and VALUE3) when they change states. When the preselect mode, that is, a mode whereby the instructor selects a malfunction for initiation at a later date, is selected by the instructor, the program MALINT searches the array CHCKBT to determine and implement the malfunctions with the preselect mode bit set.

At the completion of the initiation of a malfunction, or each malfunction in the case of the preselection of malfunctions, the message writer is called to type out a message to the instructor. In the case of the individual malfunction, this program terminates with the call to the message writer and in the case of the preselected malfunction group, this program is rebid until the entire group is processed. The variable NC08 in the INSTCN COMMON serves as a pointer for these three bids.

The operation of the pushbutton "change MALFNCTN values", enables the instructor to change the parameters for VALUE1, VALUE2, and VALUE3 for a single malfunction. This provides different degrees of malfunction of the same simulated component whereby the student operator would be required to take different actions or to illustrate different consequences. It also provides the capability for printing out the parameters for either a single malfunction or all of the malfunctions. Referring to the flow charts, the function program CHNGVL is triggered by the operation of pushbutton "change MALFNCTN values" then the address data is entered by operating pushbutton M followed by the numeral, such as 21, for example, for malfunction M21; then the pushbutton "address" is pressed. This is followed by the entry of new value data for VALUE1, VALUE2 or VALUE3 as the case may be by the operation of the alphanumeric pushbuttons; then the "VALUE1/DELAY", "VALUE2" or "VALUE3" pushbutton is pressed to enter the data in the appropriate location; and finally the "start" pushbutton is operated.

To print out single malfunction parameters, the pushbutton "change MALFNCTN values" is operated, then, the pushbutton for the letter M is pressed followed by the malfunction number by operating the alphabetic and numeric keyboard; then the "address" pushbutton is pressed; and finally the "start" pushbutton is pressed. To print out all malfunction parameters, the same procedure is followed with respect to the printing out of a single malfunction parameter just described except that the code address is MAA, using just the alphabetic keyboard.

The messages output on the typewriter indicating invalid data entered for the change parameter consist of "malfunction M blank not valid", or "invalid address", or "VALUE1 required for M blank" or "VALUE2 required for M blank", which messages are self-explanatory as to the type of error incurred. The print out for the single malfunction parameters, as an example, consist of "INSTCON MESSAGE - MALFUNCTION M - DELAY:6(MINS), V2:2, V3:350. The print out for all malfunction parameters, including high and low limits, as an example are as follows:

| ADDRESS | DELAY | V2 | V3 | V2LO | V2HI | V3LO | V3HI | CHECKBIT |
|---|---|---|---|---|---|---|---|---|
| M00 | 0 | 0 | 0 | 1 | 10 | 0 | 24 | 0100 |
| M01 | 0 | 0 | 0 | 1 | 10 | 1 | 24 | 0100 |
| M02 | 0 | 0 | 0 | 0 | 0 | 0 | 0 | 0200 |
| M03 | 0 | 0 | 0 | 0 | 0 | 1 | 4 | 0006 |
| | | | | ↓ | | | | |
| M98 | 0 | 0 | 0 | 0 | 0 | 0 | 0 | 0200 |
| M99 | 0 | 0 | 0 | 0 | 0 | 0 | 0 | 0200 |

The "operation of the preselect malfunction" pushbutton enables the instructor to select major malfunctions prior to starting a training class, and to obtain a print out of the preselected malfunctions. The data required for implementing preselected malfunctions is entered at initialization or must be entered prior to execution via the operation of the "change MALFNCTN values" function.

Figure 70A:
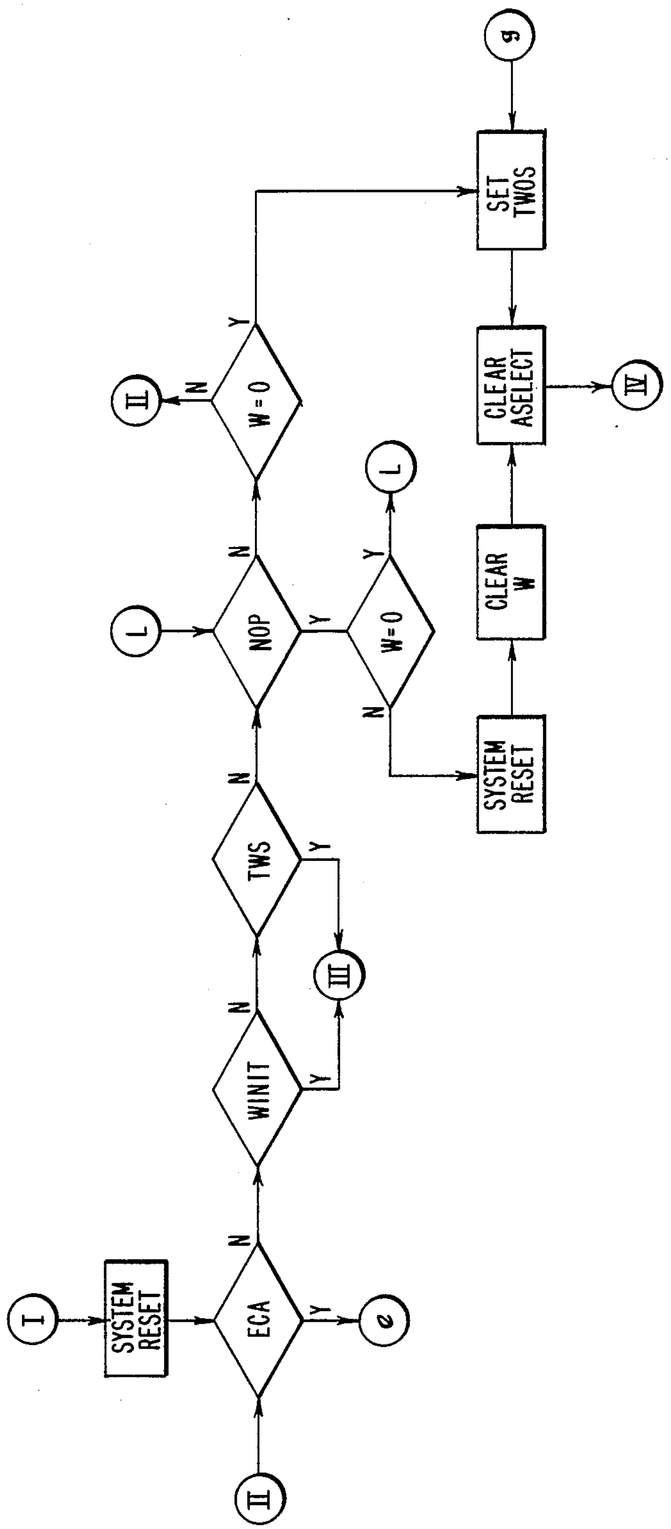
FIGS. 70A and 70B is a flow chart of the idle subroutine/control word to the P2000 computer.
Figure 70B:
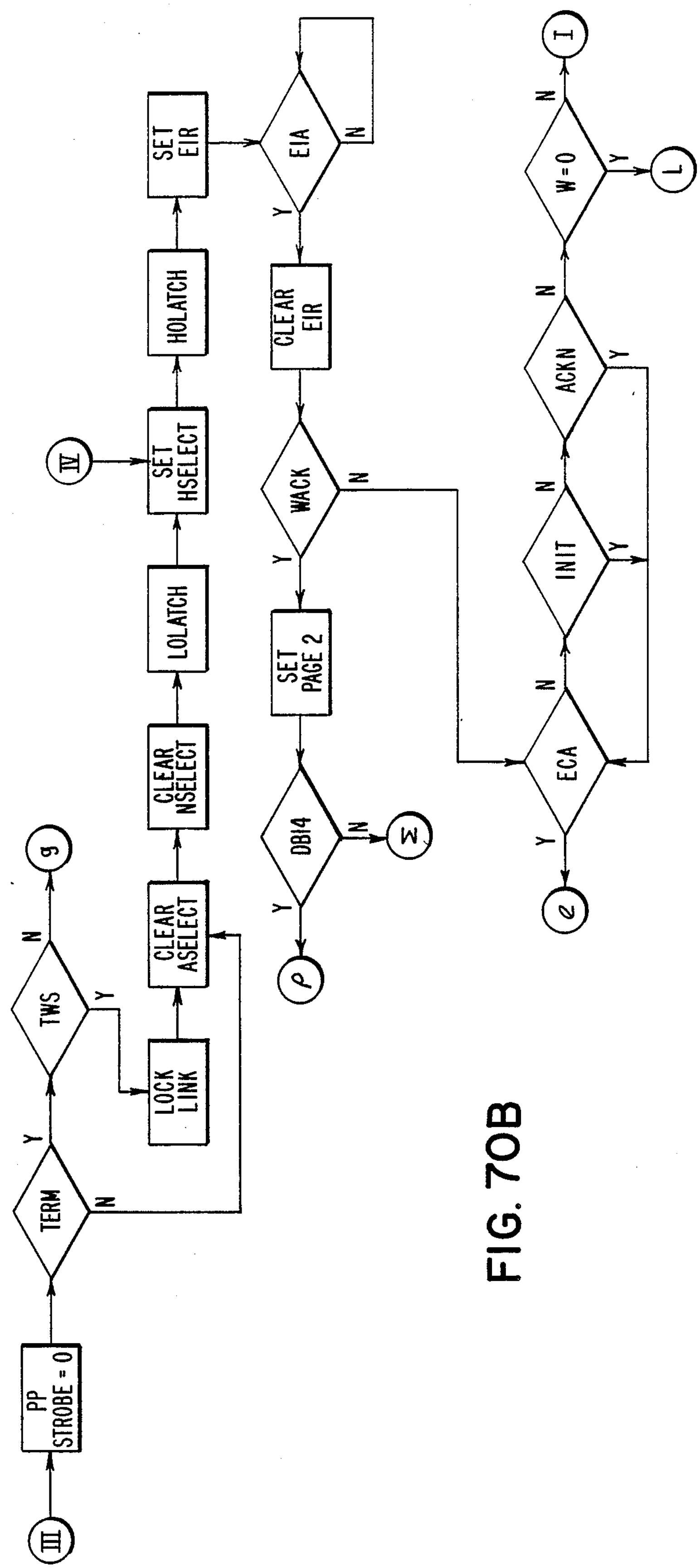

Referring to the flow charts of FIGS. 70/1 through 70/3, a preselect program MALPRE is triggered by the operation of the "preselect malfunction" pushbutton; then data address "M16" for example is entered where the numeral 16 indicates the major malfunction number; then the instructor presses the "address" pushbutton and then the "start" pushbutton. To obtain a print out of preselected major malfunctions, the operator presses the "preselect malfunction" pushbutton; enters the address data code "MAA"; and then presses the "start" pushbutton. If the input data is invalid, the "invalid request" indicator lamp in row GR1 is turned on and one of the following messages "INVALID ADDRESS" or "MALFUNCTION M16, (for example) INVALID" is printed on typewriter B.

When a malfunction is preselected, it is assumed that all data needed for execution has been or will be entered prior to the actual execution which is triggered by the program MALINT. The preselect indicator given to the MALINT program is a bit 7 of the array CACKBT corresponding to the malfunction entry specified by the MNN data entry. Information needed for the execution of each preselect malfunction can be entered by the CHNGVL program. If the address code MAA is entered, a printout of all malfunctions which have been preselected is made on the instructor's console typewriter. Each preselect entry, and a print out request, causes a print out on typewriter B of all preselected malfunction in the following format:

| ADDRESS | DELAY | V2 | V3 |
|---|---|---|---|
| M25 | 100 | 0 | 2200 |
| M35 | 0 | 1 | 90 |

In the actual plant, annunciators provide an audible and/or visual indication to the operator of a physical value or plant condition which is abnormal. The annunciators are connected in most cases to limit check routines where value limits are concerned. By failing annunciators, the student is taught to not relay on emergency indicators, but must learn to react to meters or other monitoring devices.

Figure 71:
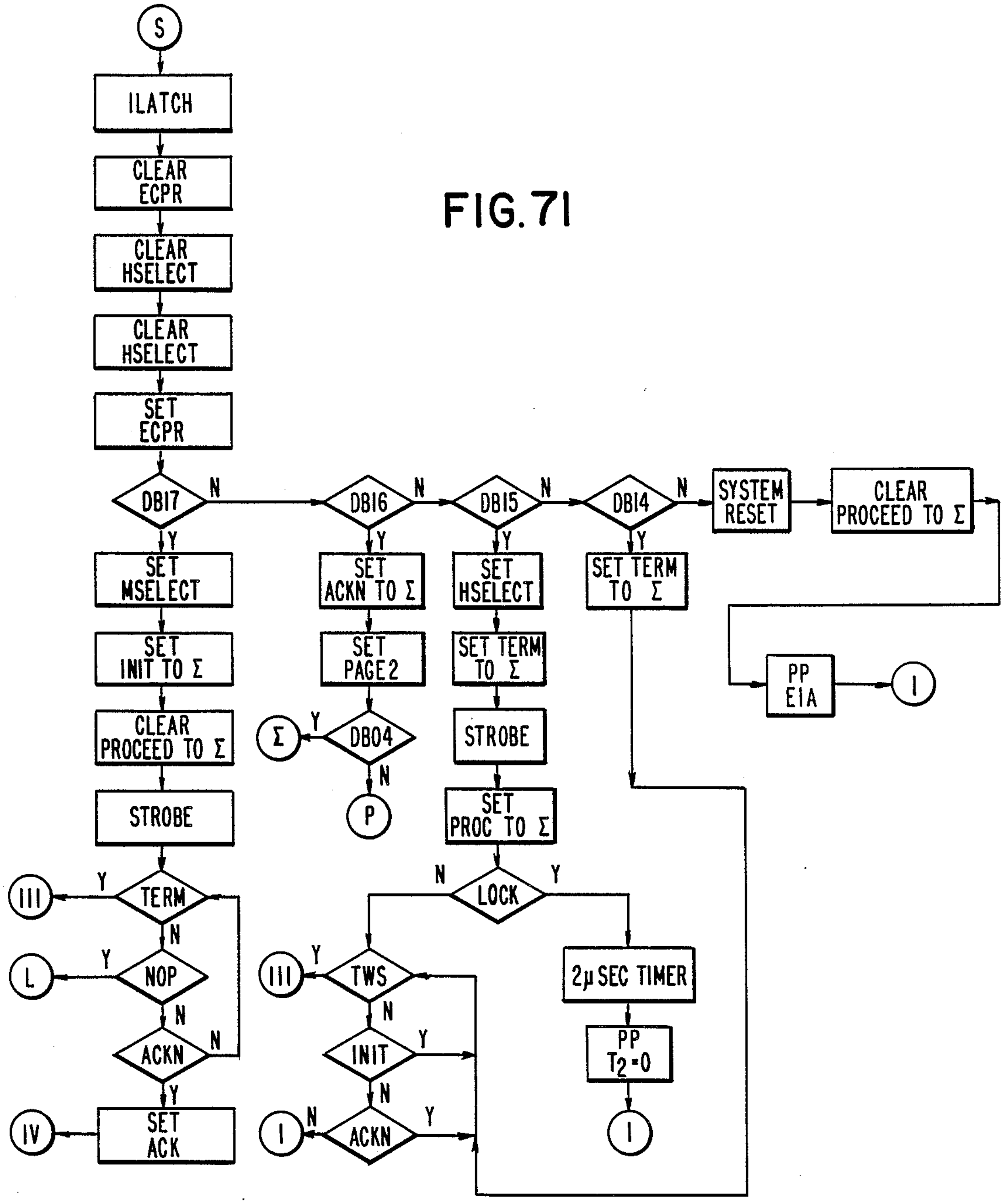
FIG. 71 is a flow chart of the subroutine for control to the Sigma 5 computer.
Figure 72:
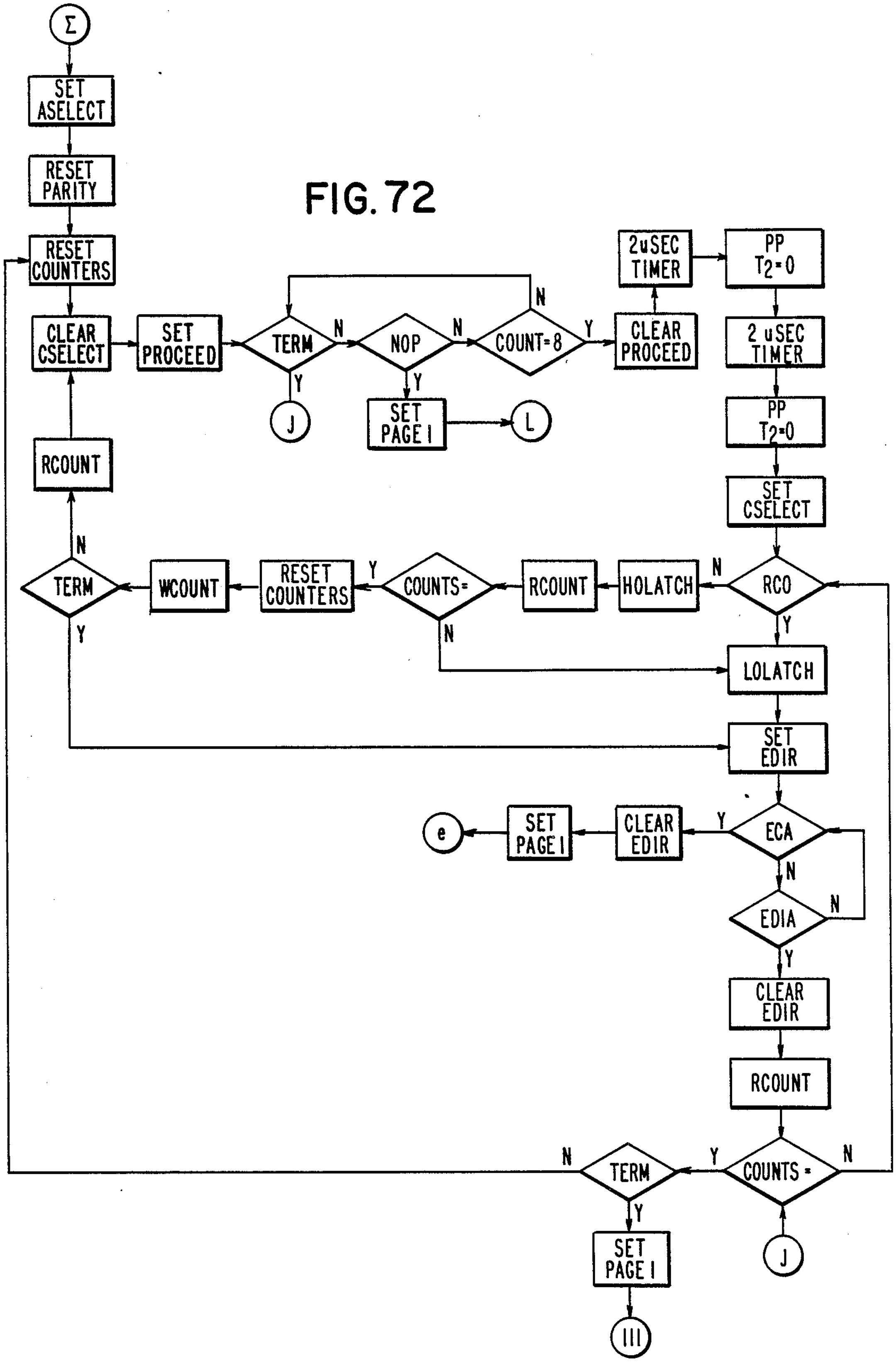
FIG. 72 is a flow chart of the data transfer subroutine from the Sigma 5 to P2000 computer.

Referring to row GR4 of the instructor's console, and flow charts of FIGS. 71/1 through 71/7, the annunciator malfunction program ANNMAL is triggered by the operation of the "ANNCTR FAILURE" pushbutton on the instructor's console; and sets up the annunciator malfunction to occur either immediately or after a specified time delay. Also the program ANNMAL initiates action on the preselected annunciator failures. In initiating annunciator failure, the address 'NN' is entered where NN indicates the annunciator number. Entry VALUE1 is used to specify that an optional time delay is required; and a number 0 to 240 is entered to specify the desired delay in minutes. VALUE2 is entered to indicate the type of failures. A numeral 1 indicates that an annunciator fails in the "off" condition and numeral 2 indicates that the annunciator fails in the "on" condition. To initiate the preselected annunciator failure, an address AAA code is entered and the "start" pushbutton is operated.

For an annunciator failure, the address entry is examined for validity and to determine whether the A or the B machine is connected to the annunciator. Addresses A01 to A020 ar implemented on the A machine; and addresses A11 to A20 are implemented on the B machine. If the annunciator is on the A machine and there is no time delay requested, a time zero transmission is made to the A machine and the end action routine implements the failure. If the annunciator is on the B machine, and there is no time delay requested, the malfunction is implemented by modifying table ANMTBL as shown in the table of FIG. 79 for the B machine.

On both machines, the table ANMTBL is used to communicate with the SET0 and SET1 routine, so that such routines will not make certain M:CC0 calls when logic states of malfunction annunciators change. This is accomplished by decrementing the counter NCOUNT in table ANMTBL by 1 for each annunciator that was not failed previously, as well as resetting bit 15 of the corresponding NANADR array entry in that table. For future reference by the system initializer, the corresponding bit location MEMBIT in table ANMTBL is set to 1 or 0 for failure "on" or "off", respectively.

Figure 80:
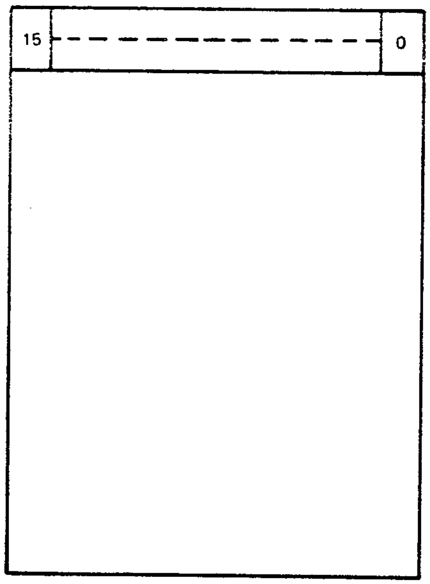
FIG. 80 is a pictorial illustration of the annunciator status flags table ANNCBT.

In the present embodiment of the invention, there are 10 annunciators on the control panels which can be failed in each of the A and B machines. Therefore, since each NANADR array has 16 locations, in table ANMTBL, are failure entries and 6 are spares. When the failure is terminated, the counter NCOUNT is incremented by 1, and bit 15 of the particular NANADR array entry is set to 1. The system location which contains the logical value of the annunciator is accessed and the M:CCO call is executed to set the annunciator to its logical value. If there is a delay associated with the requested failure, regardless of the computer location of the malfunctioning annunciator, the information is stored in the MALDT common on the B machine. With reference to FIG. 80, three tables ANNIND, ANNCBT and ANNDEL; as well as the counter MALACT are used to store this information. Availability for such storage is determined by checking counter MALACT which must be less than 10, and bit 3 and 4 in each ANNCBT array entry which correspond to the delay mode and the preselect mode, respectively. The same storage tables are also used by the annunciator failure preselect program. If both sets are false, the entry is available for storage, and four pieces of information are stored.

First, bit 3 of the first available ANNCBT array entry is set to 1; the annunciator index, as decoded from the address entry, is stored in the corresponding ANNIND array entry; the delay time in ¼ minutes, that is VALUE1 entry times 4, is stored in the corresponding ANNDEL array entry; and counter MALACT is incremented by 1. The counter MALACT has two functions. It serves as a flag to the malfunction delay program MALDEL which executes every 15 seconds; and it serves as a check such that 10 storage elements are not exceeded for both delay and the preselect modes combined.

After the specified time delay has expired, the program MALDEL initiates the failure in a manner identical to that previously described and releases the corresponding storage area by resetting bits 3 in the ANNCBT array entry which corresponds to the expired delay in the ANNDEL array entry. When the entered address code is decoded as being 'AAA', the preselect mode is initiated and bit 4 in all ANNCBT array entries is checked. If it is true, then the corresponding ANNDEL entry (delay time) is not greater than zero, the annunciator pointed to by the corresponding ANNIND entry is failed in the manner previously described. If a delay greater than zero was stored, modes are switched by resetting the preselect bit which is bit 4, and setting the delay mode bit which is bit 3, thus, program MALDEL can activate the failure when the delay time has expired. In either case, an appropriate message is printed, and when the entry in question is the tenth one, the message writer is asked to rebid this program after the message is printed out. Variable NC15 is used as a pointer to locate the program in the tables when the last message was printed out. If the input data is in error, the "invalid request" indicator lamp is turned on and a message "VALUE INVALID" or "ANNUNCIATOR ADDRESS" is printed on typewriter B. To indicate successful initiation of the annunciator failure, messages such as "ANNUNCIATOR A02 FAILURE TYPE 2 INITIATED" or "ANNUNCIATOR A09 IN DELAYED FAILURE 8 MINS" is typed out on typewriter B.

Figure 73:
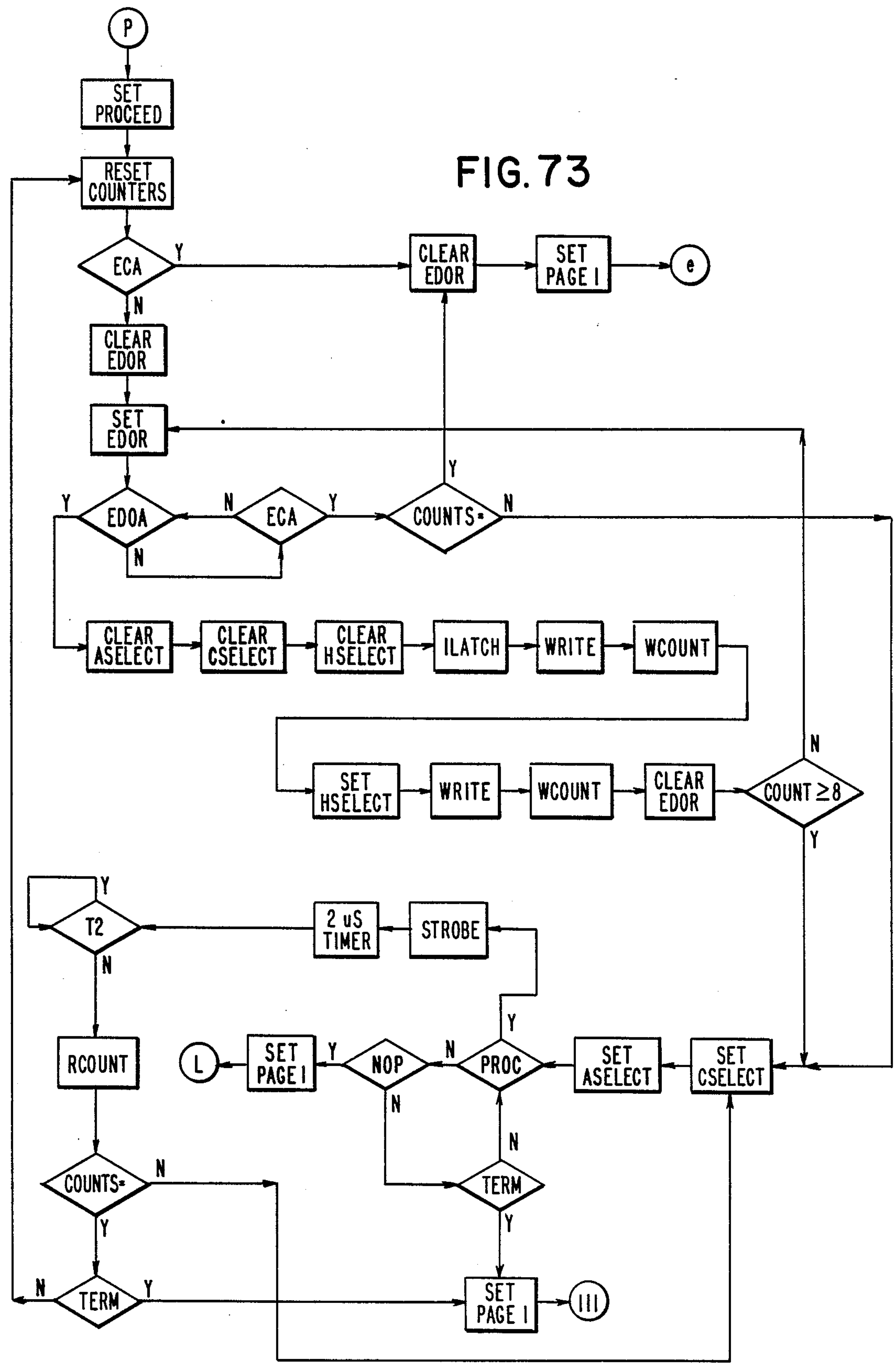
FIG. 73 is a flow chart of the data transfer subroutine from the P2000 to the Sigma 5 computer.

The "preselect annunciator failure" pushbutton on the instructor's console enables the instructor to preselect or remove preselected annunciator failures prior to a training class. Referring to the flow charts of FIGS. 73/1 through 73/4, the annunciator malfunction preselect program ANMLTR is triggered by the operatio of the "preselect annunciator failure" pushbutton. Then, the address "A09", for example is entered where 09 is an integer specifying the annunciator. Then the "address" pushbutton is operated. If a time delay is required, the 0 to 240 is entered specifying the desired delay in minutes, which is followed by the operation of the "VALUE1/DELAY" pushbutton. Then, the data indicating the type of failure such as numeral "1" or numeral "2" is entered to indicate whether the annunciator is to fail in the "off" or "on" condition. Then, the "VALUE2" pushbutton is operated and the "start" pushbutton is operated. To remove a preselected annunciator failure, the same procedure is followed up through the operation of the "address" pushbutton as described in connection with the preselection of an annunciator failure, and then the "stop" pushbutton is operated.

The program ANMLPR provides the capability of selecting and setting up annunciator malfunctions at some time prior to execution. A maximum of 10 malfunctions is able to be preselected in accordance with the present embodiment. Since annunciator malfunctions in the delay mode use the same storage area, the above maximum is reduced by the number of failures in the delay modes.

Three tables and a counter in the MALDAT common are used to store the preselected information. The preselect and delay bits 4 and 3 respectively, in the ANNCBT array are checked to determine the first available entry. If all 10 entries are used in one mode or the other, the current request is rejected. Otherwise, the preselect bit is set in the first available entry and the integer part of the address is stored in the corresponding ANNIND array entries. Also, the delay time which is zero if value 1 was not used, is stored in the corresponding ANNDEL array entry and the type of failure is coded into the check bit arrays.

If the annunciator is to fail "off" (contact open), value 2 equals 1 is entered, bit 0 of the ANNCBT entry is set, and bit 1 is reset. If the annunciator is to fail "on" (contact closed), value 2 equals 2 is entered, bit 1 of the ANNCBT array entry is set, and bit zero is reset.

To print out preselected annunciator failures, the same procedure is followed as in the removal of a preselected annunciator failure except that the address data consist of AAA and the "start" pushbutton is operated instead of the "stop" pushbutton. If input data is invalid, the "invalid request" indicator lamp in row GR1 is turned on, and one of the following error messages "INVALID ANNUNCIATOR ADDRESS" or "VALUE2 INVALID" is printed out on the typewriter B. Each preselected annunciator malfunction request causes a message to be printed out on typewriter B with the following format:

| INSTCON MESSAGE - ANNUNCIATOR A -- IN PRESELECT MODE |
|---|

The request for a print out of the table of preselected annunciator failure causes a print out on typewriter B in the following format:

| ANNUNCIATOR PRESELECT (AND DELAY) TABLE | | | | |
|---|---|---|---|---|
| ANNUNCIATOR | DELAY (MINS) | TYPE | LOGICAL DELAY | MODE PRESELECT |
| A04 | 10 | 2 | F | T |
| A19 | 2 | 1 | T | F |

The indicators or meters on the control panels can also be malfunctioned, either completely or partially. There are separate functions for indicators and annunciators because the indicator malfunctions can be varied while the annunciator malfunctions are either "on" or "off".

Referring to the flow charts of FIGS. 74/1 through 74/6, the indicator malfunction program INDMAL sets up these indicator malfunctions either directly or with a time delay. It also is capable of initiating the indicator malfunction preselect modes. To operate this function program INDMAL, and referring to row GR5 of the instructor's console, "INDICATOR FAILURE" pushbutton is operated. Then, an "I" is entered followed by a "NNN" as the address, where NNN is an integer between 1 and 660. The addresses I001 to I342 are failures for the A machine; and addresses I343 to I660 are failures on the B machine. Then, an integer between 0 and 240 is entered representing the minutes of delay time prior to implementation of the malfunction by VALUE1, which step is optional. Then, an integer 1, 2, or 3 in VALUE2 is entered which defines the failure type as either a stuck reading, a down scale reading, or an up scale reading respectively. Finally, the "start" pushbutton is operated. To stop the failure, the first two mentioned steps are performed followed by the operation of the "start" pushbutton The failure is implemented on the B machine (addresses I343 through I660) by setting the failure indicator bits in the CHNTBL table. These bits are then used by the analog output handler to implement the failure. If the indicator failure is to occur on the A machine (addresses I001 to I342), a type zero data link transmission is made to the A machine where the end action routine initiates the implementation.

Certain indicator malfunctions are not programmed to be failed because of their relative importance and the voluminous number involved in the simulator. The requested failure number entered by the instructor is checked against entries of NONMAL, a table of indicator numbers not allowed to fail. If the entry is one which should not fail, a message is printed out on the instructor's console.

Figure 81:
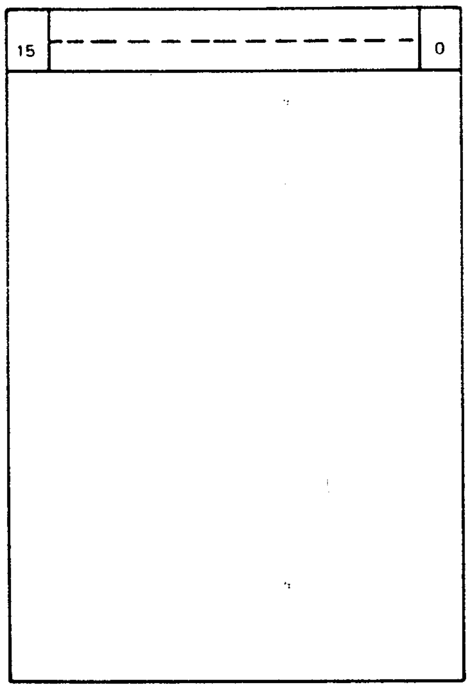
FIG. 81 is a pictorial illustration of the table INDCBT for the instrument failure check bit logicals.

If a delay time is specified, entries are made in tables INDIND, INDDEL, and INDCBT (see FIG. 81), and end counter INDACT. Availability of storage space in the tables is determined by checking INDACT and bits 3 and 4 are each INDCBT entry. INDACT is less than 10 and bits 3 and 4 of the INDCBT entries are false, then space for the requested indicator failure is available. As in the annunciator failures and major malfunctions, implementation of the time delayed function is monitored by the program MALDEL.

To initiate the preselect mode, it is necessary to press the "INDICATOR FAILURE" function pushbutton, enter IAA as an address and press the "start" pushbutton. This sequence activates the preselect mode which causes a scan of the table INDCBT to determine which of the indicator failure entries are in the preselected mode. If a preselect bit for a particular entry is set, and the corresponding time delay in INDDEL entry is set, and the corresponding time delay in INDDEL entry is greater than zero, the delay bit for the entry and the INDCBT table is set. The program MALDEL activates the malfunction when the time delay has expired. In both cases the preselect bit is reset.

If the input data is invalid, the "invalid request" indicator lamp is turned on, and an error message "VALUE2 INVALID" or "INVALID INDICATOR ADDRESS" or "STORAGE TABLE SIZE EXCEEDED" or "INDICATOR FAILURE REQUEST IGNORED" is printed out on typewriter B. If the failure request is for an indicator which should not be failed, the request is ignored, and the following message "INDICATOR I - NOT ALLOWED TO FAIL" is printed out on typewriter B. For each indicator failure initiated, one of the following messages "INDICATOR I - FAILURE TYPE II INITIATED" or "INDICATOR I - IN DELAYED FAILURE 48 MINUTES" is printed out on the typewriter B.

Referring to the flow chart of FIGS. 76/1 through 76/4, the "indicator malfunction preselect" program IMNLPR is used to set up indicator failures prior to their execution. Up to ten such malfunctions can be selected in accordance with the present embodiment. However, the indicators in a time delay mode use the same storage area in the present embodiment and therefore subtract from the maximum of ten.

To preselect an indicator for failure requires first the operation of the PRESELECT INDICATOR FAILURE function pushbutton. This is followed by an entry "I" followed by "NNN" as the address, where NNN is an integer between 1 and 660. Then, an integer between 0 and 240 is entered representing minutes of delay time for VALUE1. Then, an integer 1, 2, or 3 in VALUE2 is entered which defines the failure type as either a stuck reading, down scale reading, or up scale reading. Then the "start" pushbutton is operated. When an indicator failure is preselected, entries are made in the INDIND, INDDEL, and INDCBT tables and the INDACT counters, for use by the program INMLPR previously mentioned. The actual execution of the preselected failures is activated by the INDMAL program hereinbefore mentioned.

To removed a preselected indicator failure from the storage tables, the first and second functions listed above are operated which is followed by the operation of the "stop" pushbutton. To print out the indicator failure storage information which includes preselected failures as well as failure in the delay mode, it is necessary to press the "PRESELECT INDICATOR FAILURE" function pushbutton; then enter IAA as the address; and press the "start" pushbutton. If the input data is invalid, the "invalid request" indicator lamp is turned on and a message "INVALID INDICATOR ADDRESS" or "CANNOT TERMINATE PRESELECT MODE" is printed out on the typewriter B. For each preselected failure, a message "INDICATOR I BLANK IN PRESELECT MODE38 is printed out on typewriter B. For the print out request, messages with the following format are also printed out:

| INDICATOR PRESELECT (AND DELAY) TABLE | | | | |
|---|---|---|---|---|
| INDICATOR | DELAY (MINS) | TYPE | LOGICAL DELAY | MODE PRESELECT |
| 1650 | 0 | 2 | F | T |
| 1012 | 19 | 1 | F | T |
| 1245 | 50 | 3 | T | F |

The operation of the "update time" pushbutton enables the instructor to update the time within the nuclear power plant simulator whenever such action is needed. After pressing the "update time" pushbutton, the hours and minutes are entered on the numerical portion of the console; and then the "VALUE1/DELAY" pushbutton is operated. Next, the month and the day are entered by way of the numerical keyboard; and the "VALUE2" pushbutton is operated. Finally, the year is entered and the "VALUE3" pushbutton is operated; and the "start" pushbutton causes execution of the function. If the input data is invalid, the "invalid request" indicator lamp is turned on and the error message printed out "VALUE 2 invalid", for example; and a message indicating successful completion of the time update is printed out by printing out the actual time in hours, minutes, month, day and year.

Referring to the flow charts of FIGS. 77/1 through 77/3, the update time program UPTIME updates the time in the A machine and the B machine. This operation should be done after every boot strap of either the A or the B computers. The time, date, and year can be changed individually or all at once if needed. For example, on Jan. 15, 1972 at 2:25 P.M., the entry should be 1425 in VALUE1, 115 in VALUE 2, and 1972 in VALUE 3.

A panel diagnostic program systematically tests the operation of all lights, annunciators, recorders, boric acid and primary water counters, and rod counters on the reactor panel, engineered safeguards panel, nuclear instrumentation system panel, flux mapping panel, radiation monitoring panel, balance of plant panel, Diesel Generator panel, and 345 KV panel.

The input/output apparatus for the control panels are connected to the A machine and the B machine. The panel input/output for the A machine comprises apparatus associated with the reactor panel, engineer safeguards panel, nuclear instrumentation panel, flux mapping panel, and radiation monitoring panel. The panel input/output for the B machine comprises apparatus associated with the balance of plant panel, Diesel generator panel, and the 345 KV panel.

The panel diagnostic functions are executed through the instructor's console by the operation of the "panel diagnostic" pushbutton in the row GR5. With this function an operator can turn on or off any or all lights on the panel, test annunciator lights separately, test status lights separately, and test monitor light separately. Also, any or all counters can be incremented or decremented to a specified number, meters or recorders can be set to any variable percentage within a range of 0 to 100, meters and/or recorders can be swung between two variable percentages, and any specified contact closure output can be set or reset.

The panel diagnostic program does not operate simultaneously with any of the simulator models. If a model is running, when the panel diagnostics are initiated, a message "MODEL IS RUNNING DIAGNOSTICS PROGRAM IS ABORTED"]is typed out on the instructor's console typewriter.

In operating the diagnostics program, the "panel diagnostic" pushbutton is operated and, with respect to any of the lights on the control panel, the particular power bus is set or reset by using "option program set or reset CCO, A or B computer". After setting or resetting the power bus, the lights can be tested. With respect to the "all annunciator lights on" function after the "start" pushbutton is operated, a horn is heard. Also, after pressing the "stop" pushbutton for the "all annunciator lights off function", a bell is heard. After hearing the horn or the bell as the case may be the "silent" pushbutton, followed by the "ACK" pushbutton and the "RESET" pushbutton is operated to silence the horn or the bell. After the pressing the "start" pushbutton for the counters, the message "ATTENTION OPERATOR PROGRAM IS IN A WAIT STAGE. To continue, the rod control startup button is pushed. FIRST RESET BORIC ACID AND PRIMARY WATER COUNTERS." is typed out on the instructor's console typewriter and the operator must perform such functions.

Figure 82:
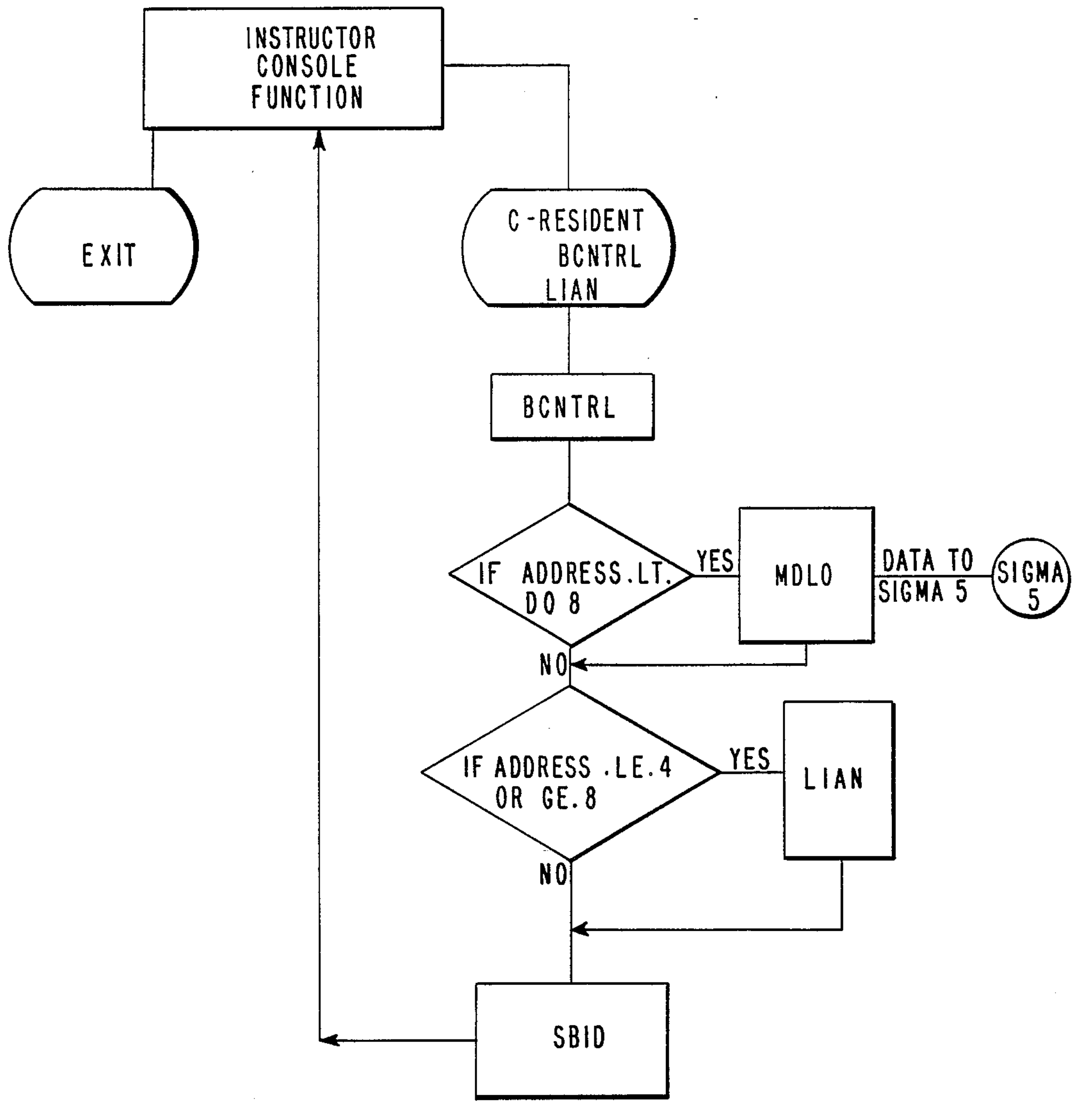
FIG. 82 illustrates a flow chart for the panel diagnostic interface program for the B machine.

Referring to FIG. 82, the panel diagnostic program is made up of two subroutines BCNTRL and LIAN. The subroutine BCNTRL, when activated, tests the address data input by the instructor to determine if the function is to be performed on the B machine or the A machine. If the address is less than D08, the input data is transmitted by a type 0 transmission to the A machine for processing. If the address is greater than D08, the subroutine BCNTRL calls subroutine LIAN (if the address is less than 4 or greater 8). Subroutine LIAN interprets the input data to determine what type of input/output operation such as test monitor lights, increment counters, reset or set or contact outputs, for example, is to be performed. After completion of the input/output operation, an exit is made via subroutine SBID. If the address is greater than 4 and less than 8 when checked by BCNTRL, subroutine SBID is called to provide the exit.

Figure 83:
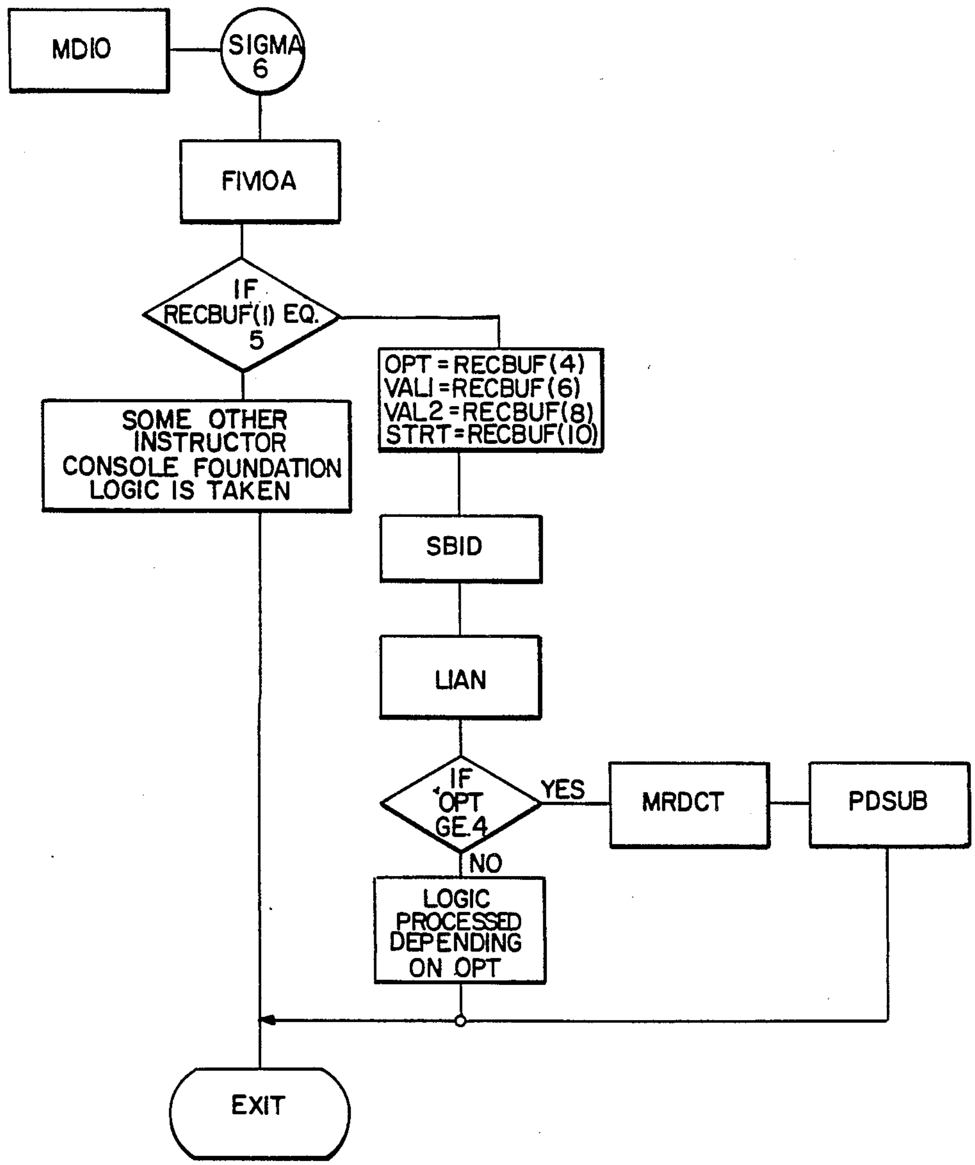
FIG. 83 illustrates the flow chart for the panel diagnostic interface program for the A machine.

Referring to the flow chart of FIG. 83, which relates to the A machine interface program, when data is received in the A machine from the B machine interface program described above, the program FIVTOA is activated. It first checks to determine if the first word in the type 0 transmission buffer is equal to 5 which indicates a panel diagnostic function. If it is a panel diagnostic function, data is taken from the transfer buffer and placed in COMMON in the following order:

| |
|---|
| OPT = RECBUF(4) |
| VAL1 = RECBUF(6) |
| VAL2 = RECBUF(8) |
| STRT = RECBUF(10) |

The SBID routine then activates the LIAN routine. When initiated, LIAN checks to determine if OPT is less than 4. If it is less than 4, the appropriate digital output operation, such as turning on or off all lights on the panel as determined by the transmitted data, is performed. If it is greater than or equal to 4, routine PDSUB is executed, which in turn executes the appropriate analog output operation such as operating the meters. After completion of either of the above actions, control is returned to FIVTOA.

Generally, with reference to the flow charts of FIGS. 80/1 through 80/5, the malfunction delay countdown program for the B machine runs periodically, that is every 15 seconds, to see if any malfunctions are in the delay mode. For major malfunctions, a malfunction counter MALACT in the delay mode is checked. If it is equal to zero, this portion of the program is bypassed. If it is not zero, all 100 malfunctions are checked for the delay mode bit CHCKBT(1,12) being set; and if it is set the corresponding ACTDEL array entry is incremented and compared with the corresponding VALUE1 array entry, which is entered by the instructor, using the function program CHNGVL. When the delay count contained in V1 is reached, the malfunction is activated provided that the bit CHCKBT(I,5) is not set. This method of counting allows the instructor to decrease or increase the total delay time while it is being counted up.

Secondly, the indicator failure counter INDACT is checked. If it is equal to zero, this section is bypassed. If not, the input/output table entries are checked for the delay mode bit INDCBT(I,4) being set; and if it is set, the corresponding INDDEL array entry is decremented and compared to zero. If it is zero, the indicator malfunction is activated. With this method, the delay time cannot be changed.

Thirdly, the annunciator failure counter NNACT is checked. Analogous to the indicator malfunctions, ANNCBT(I,4) is checked. ANNDEL is decremented, and the annunciator malfunction is activated upon completion of the countdown.

Off-Line Software

Figure 84A:
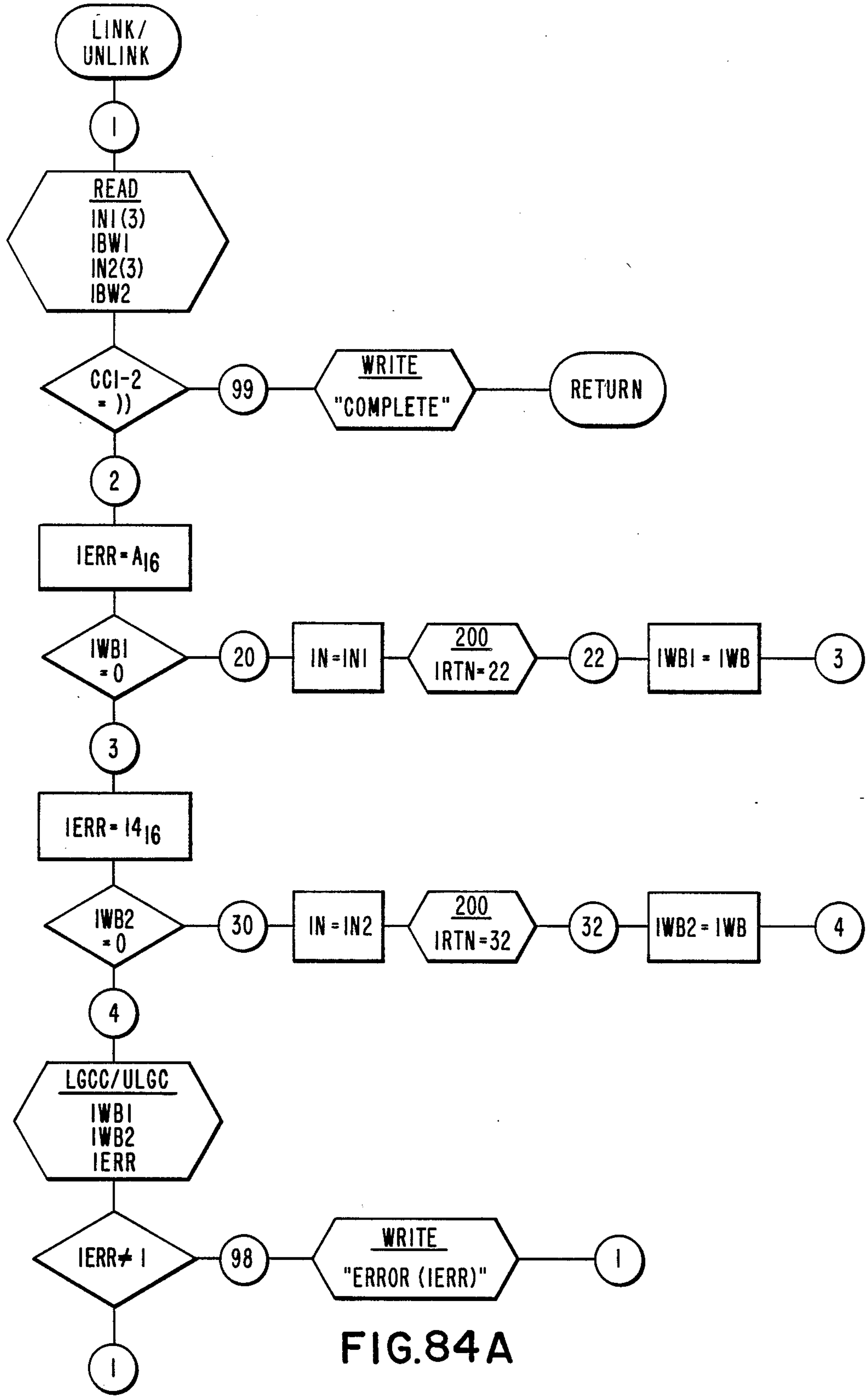
FIGS. 84A and 84B illustrates the flow chart for the logical variable link and unlink sublevels.
Figure 84B:
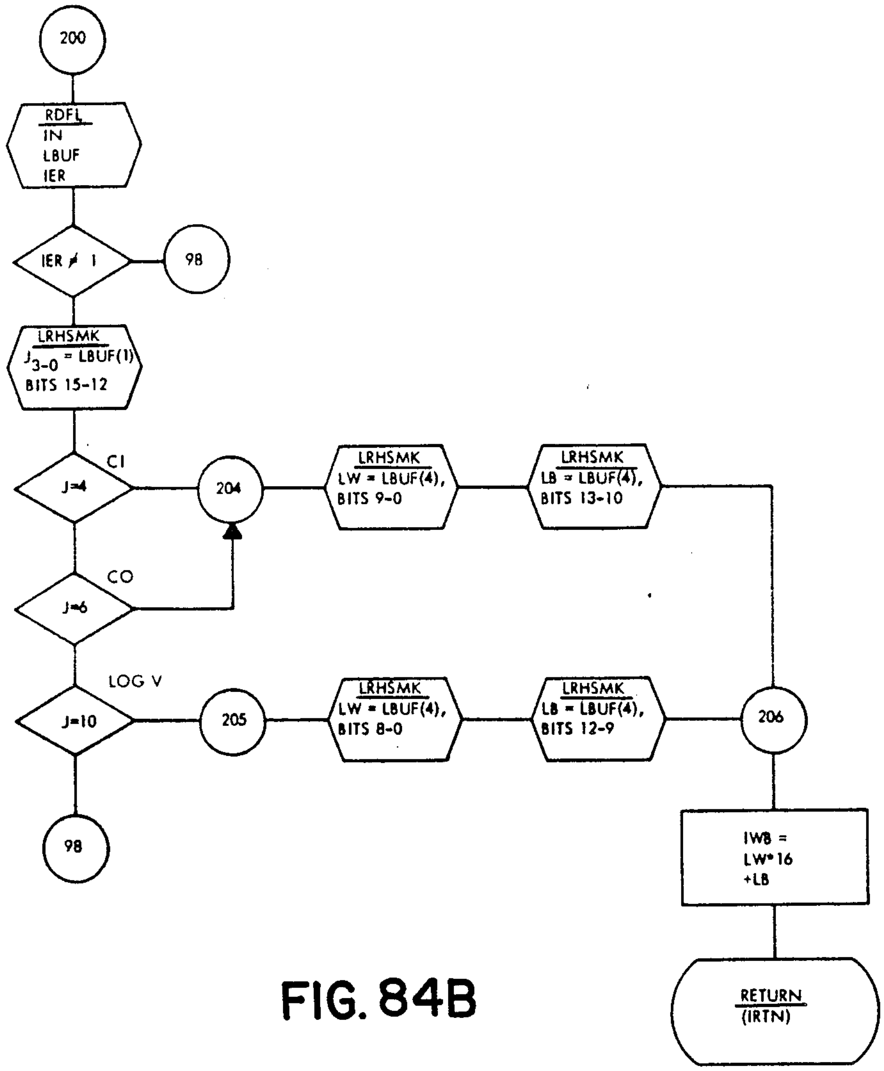
Figure 85A:
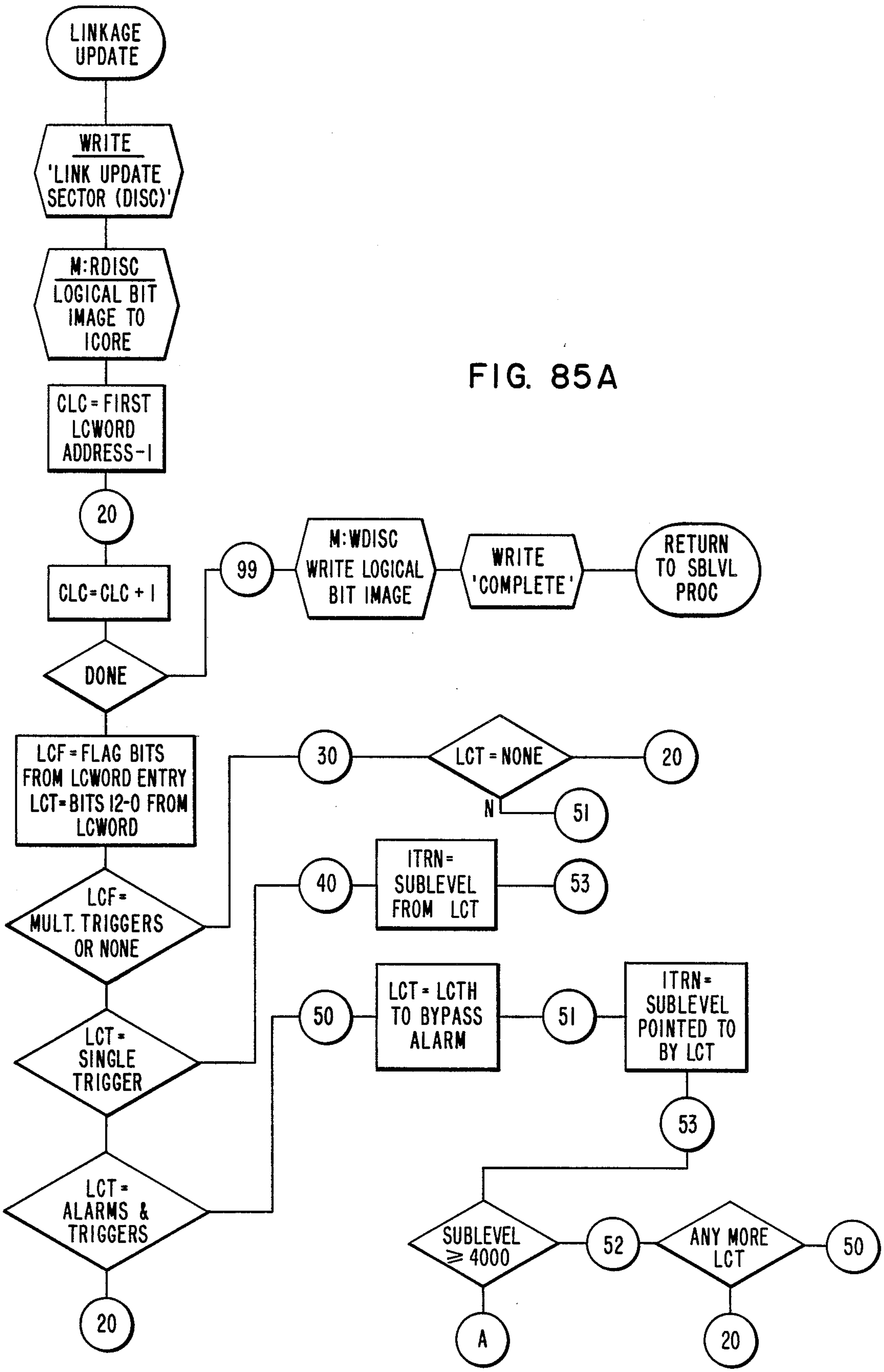
FIGS. 85A and 85B illustrates the flow chart for the linkage update program.
Figure 85B:
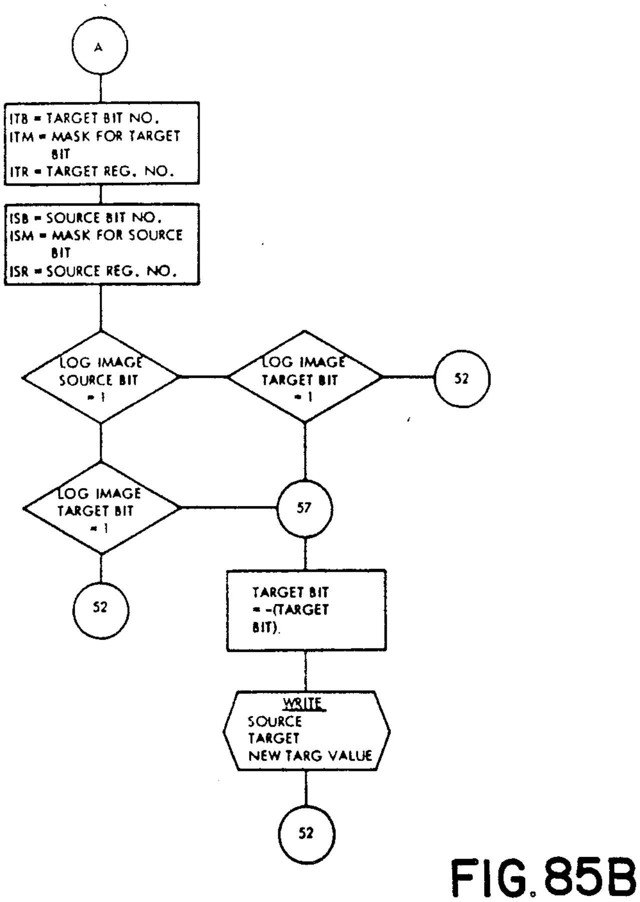
Figure 86B:
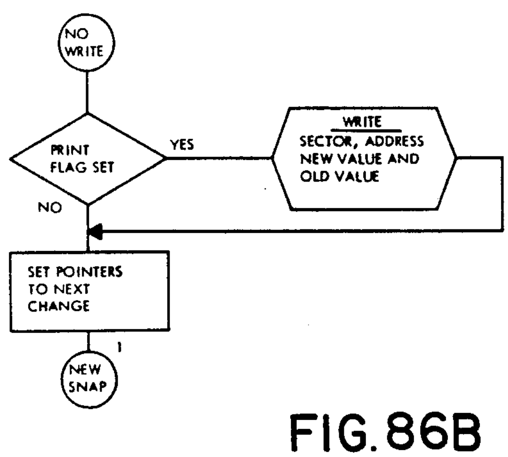
FIGS. 86A and 86B illustrates the flow chart for the initial conditions/snapshot modification.
Figure 86A:
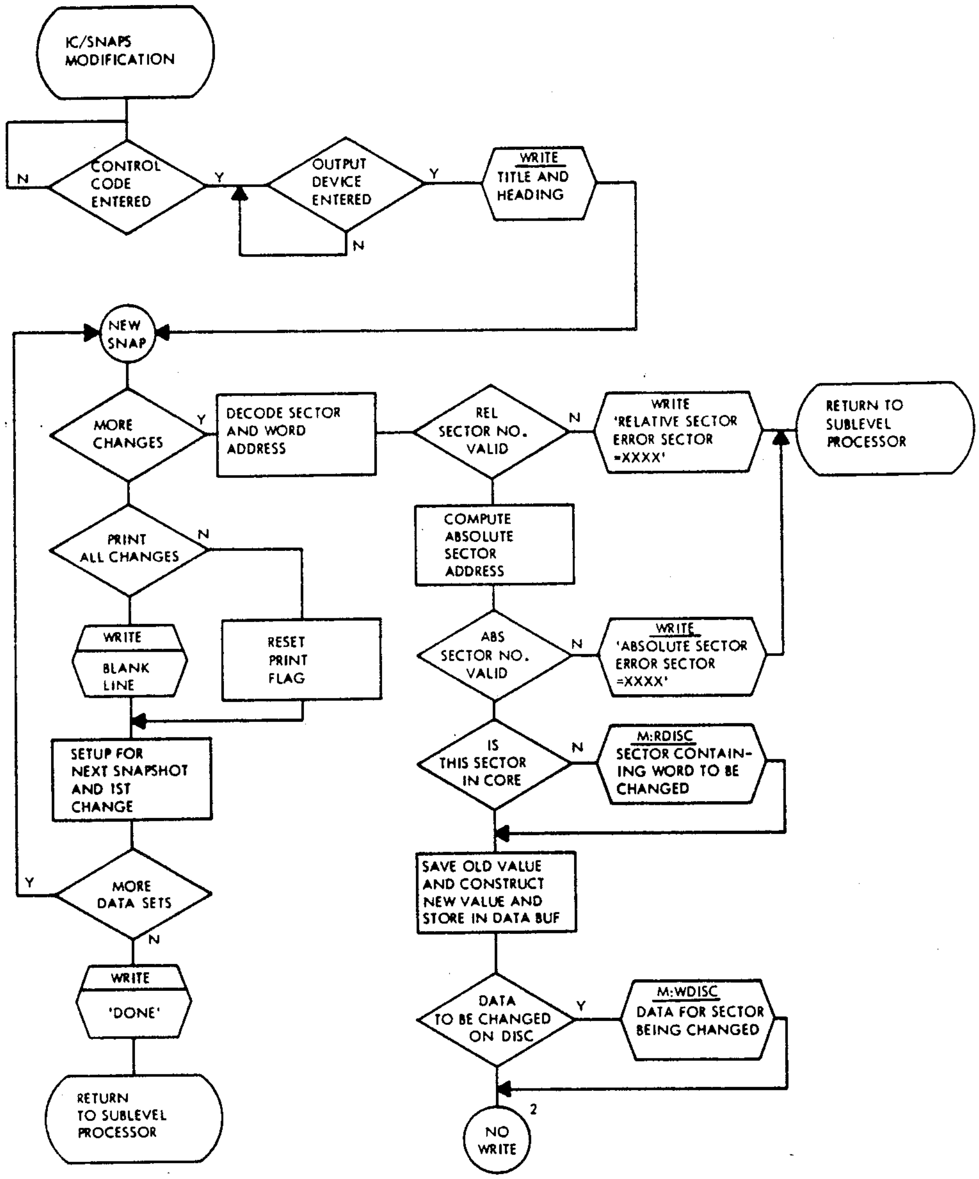
Figure 87A:
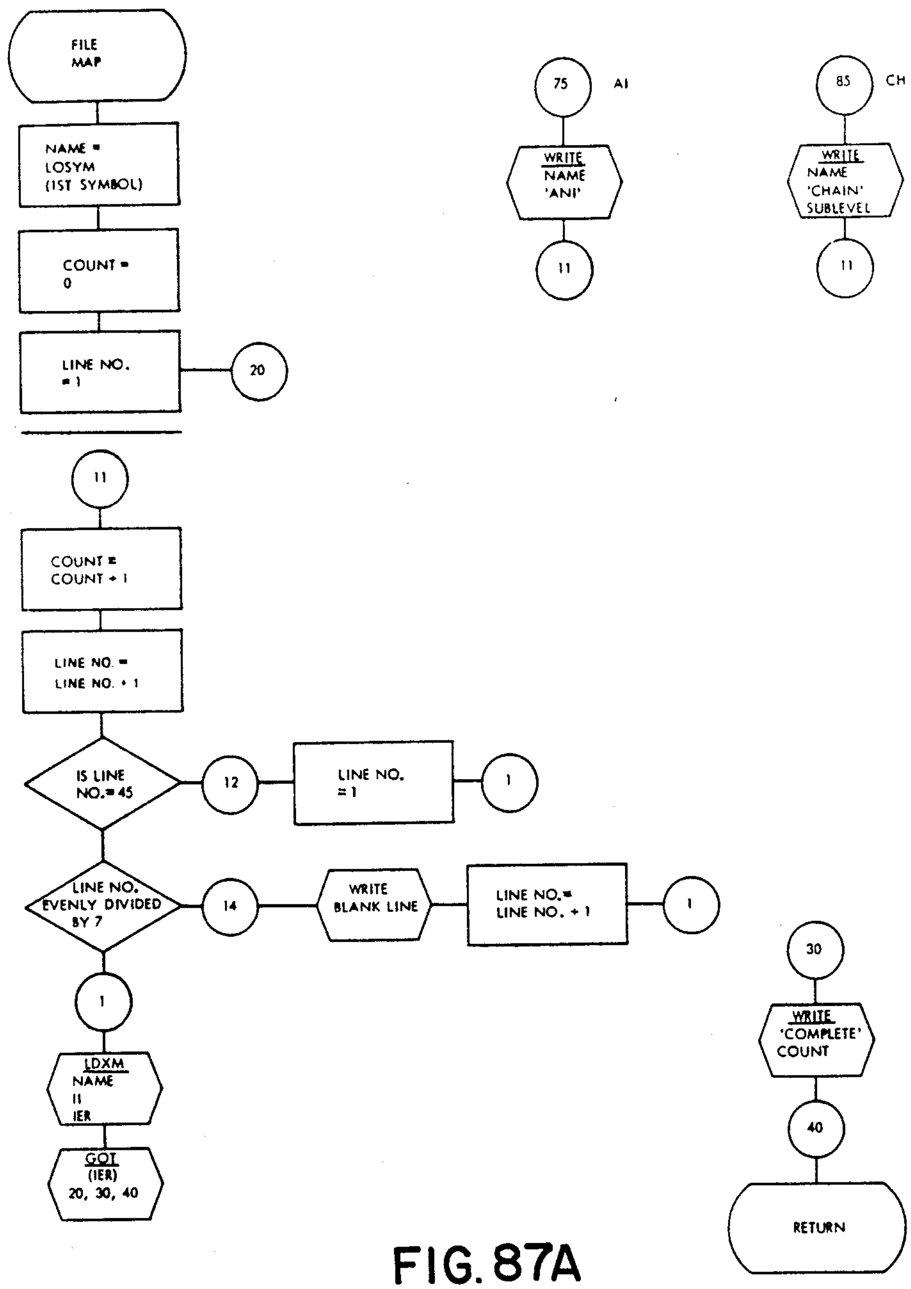
FIGS. 87A and 87B illustrates the flow chart for the file map.
Figure 87B:
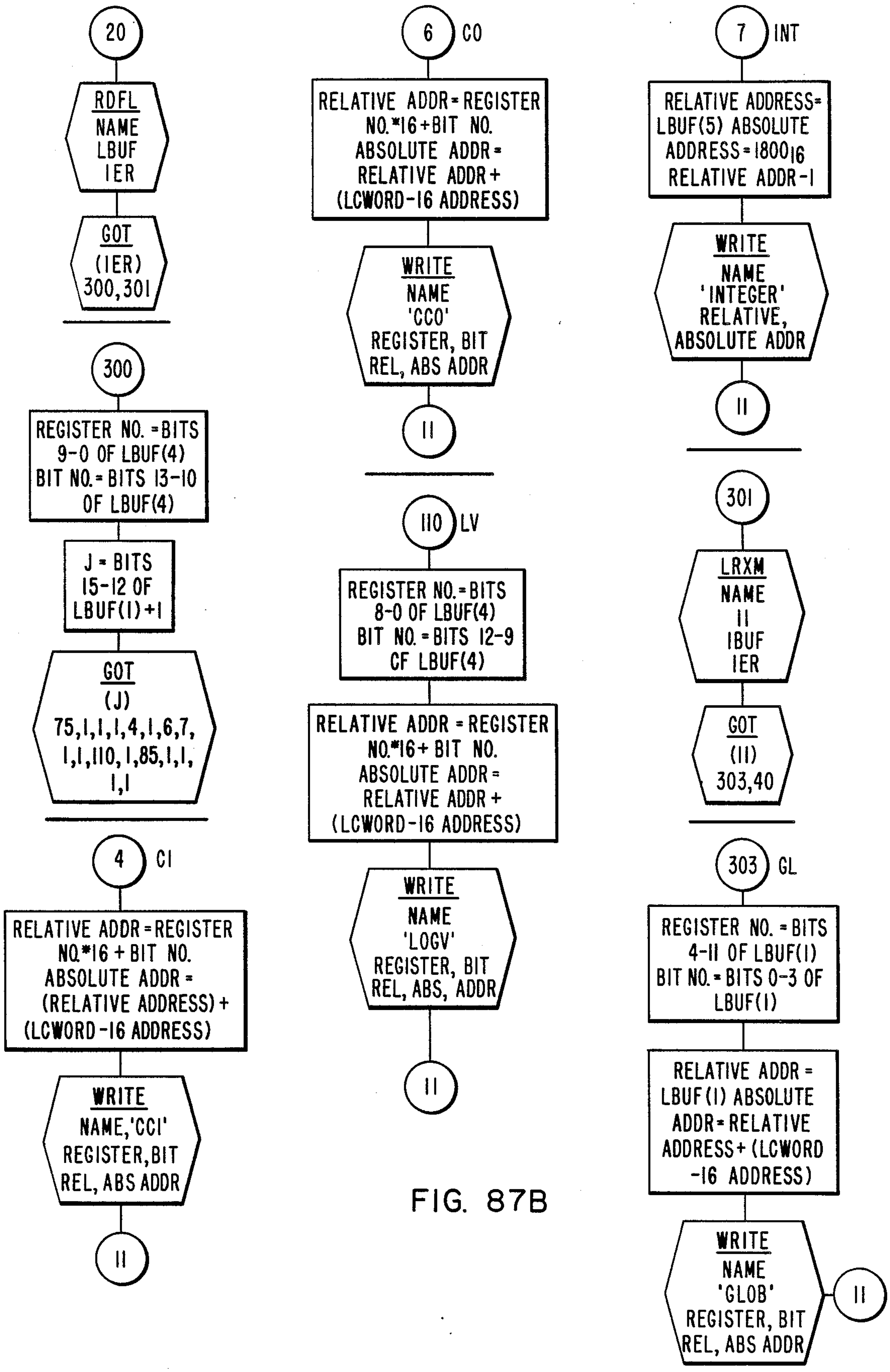
Figure 88:
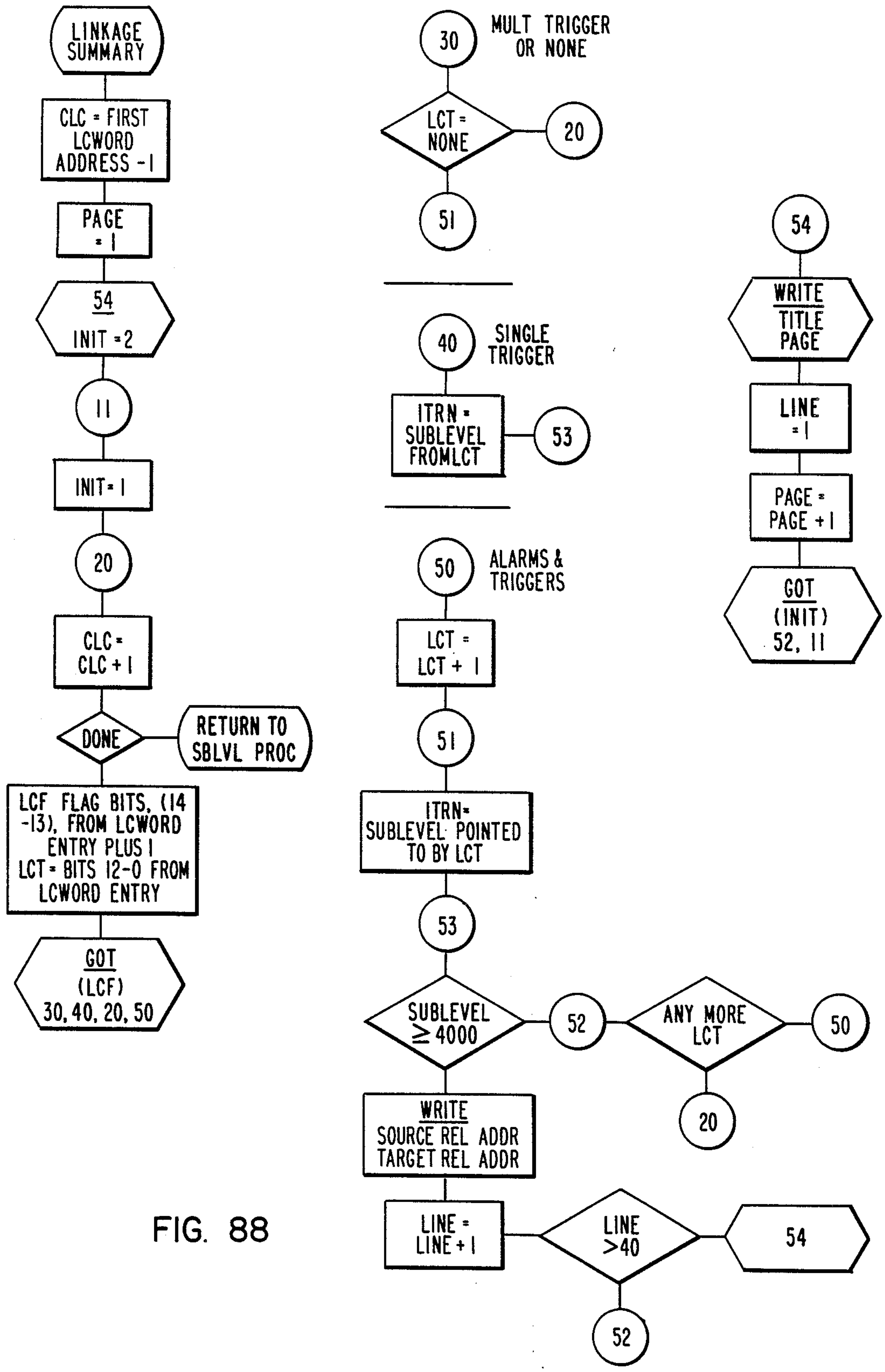
FIG. 88 illustrates the flow chart for the linkage summary.
Figure 89A:
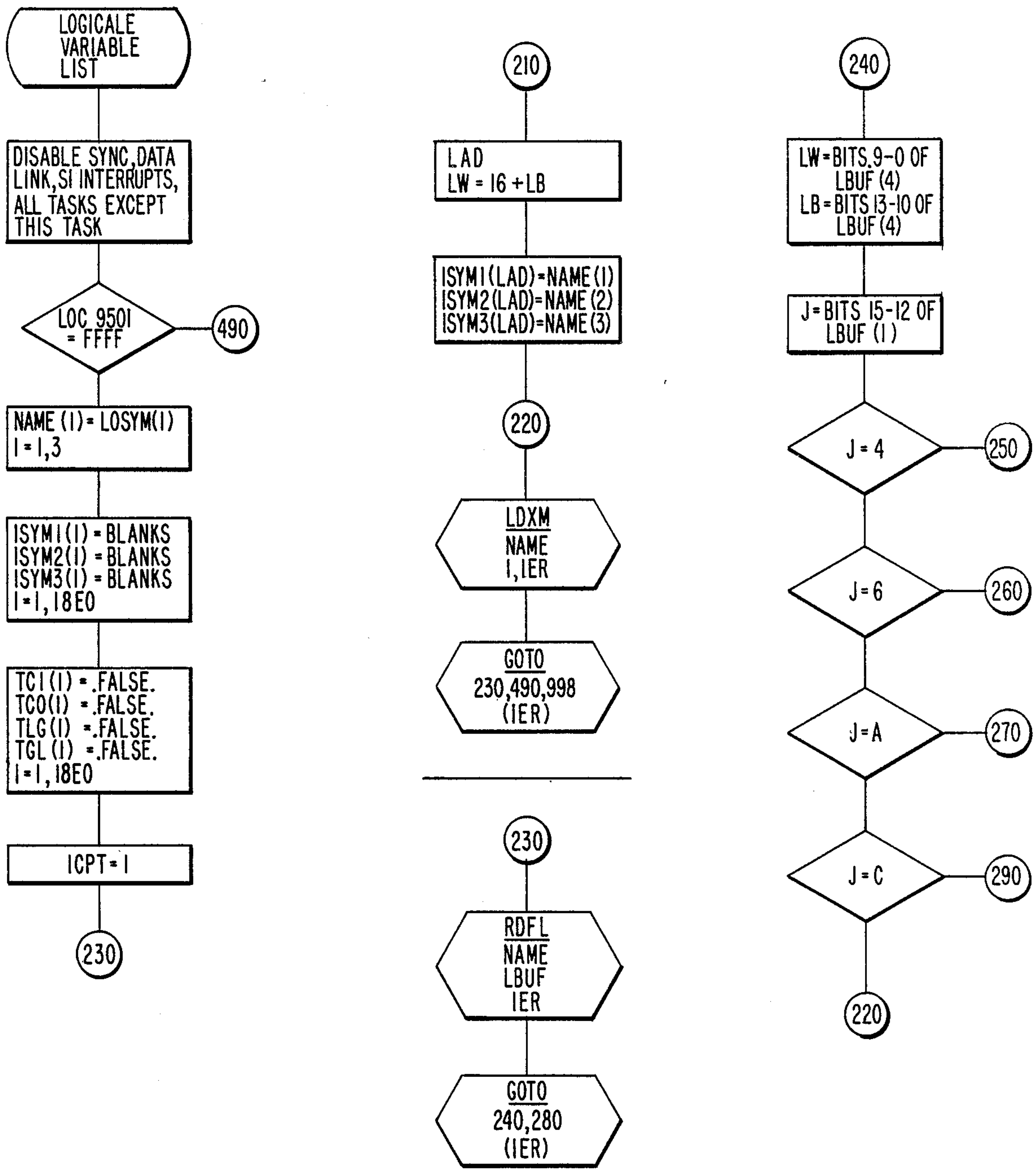
FIGS. 89A through 89F inclusive illustrates the flow chart for the logical variable list.
Figure 89B:
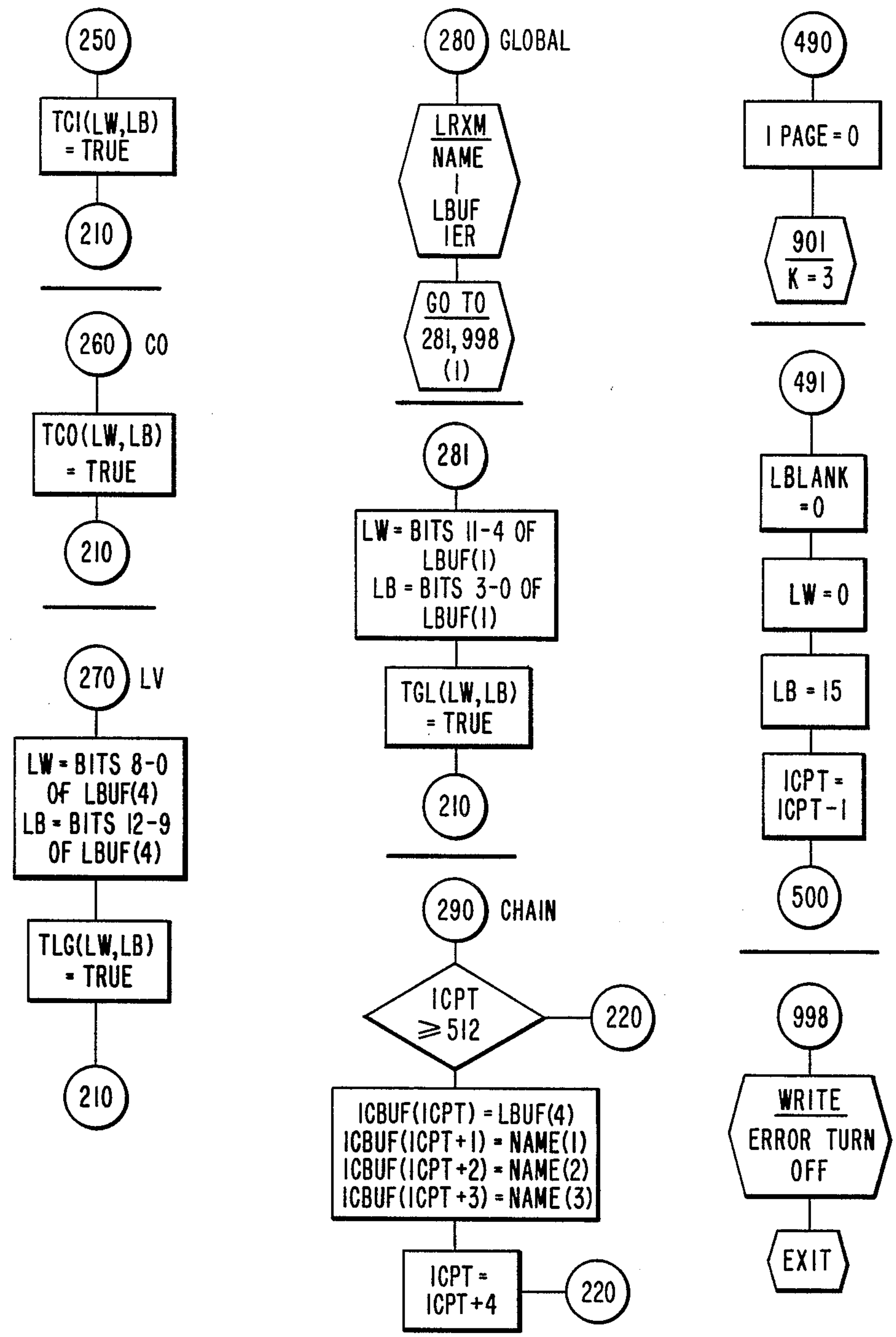
Figure 89C:
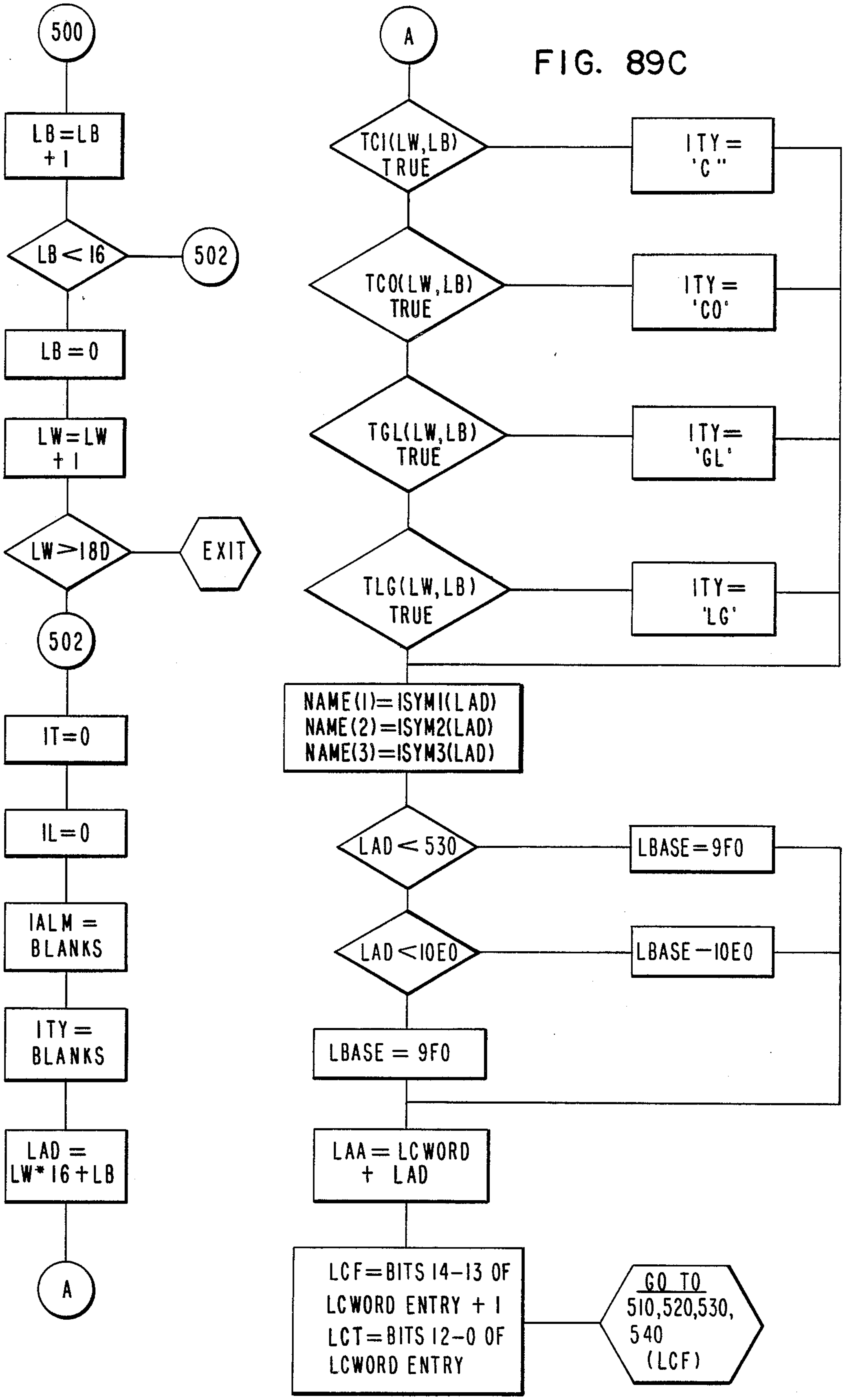
Figure 89D:
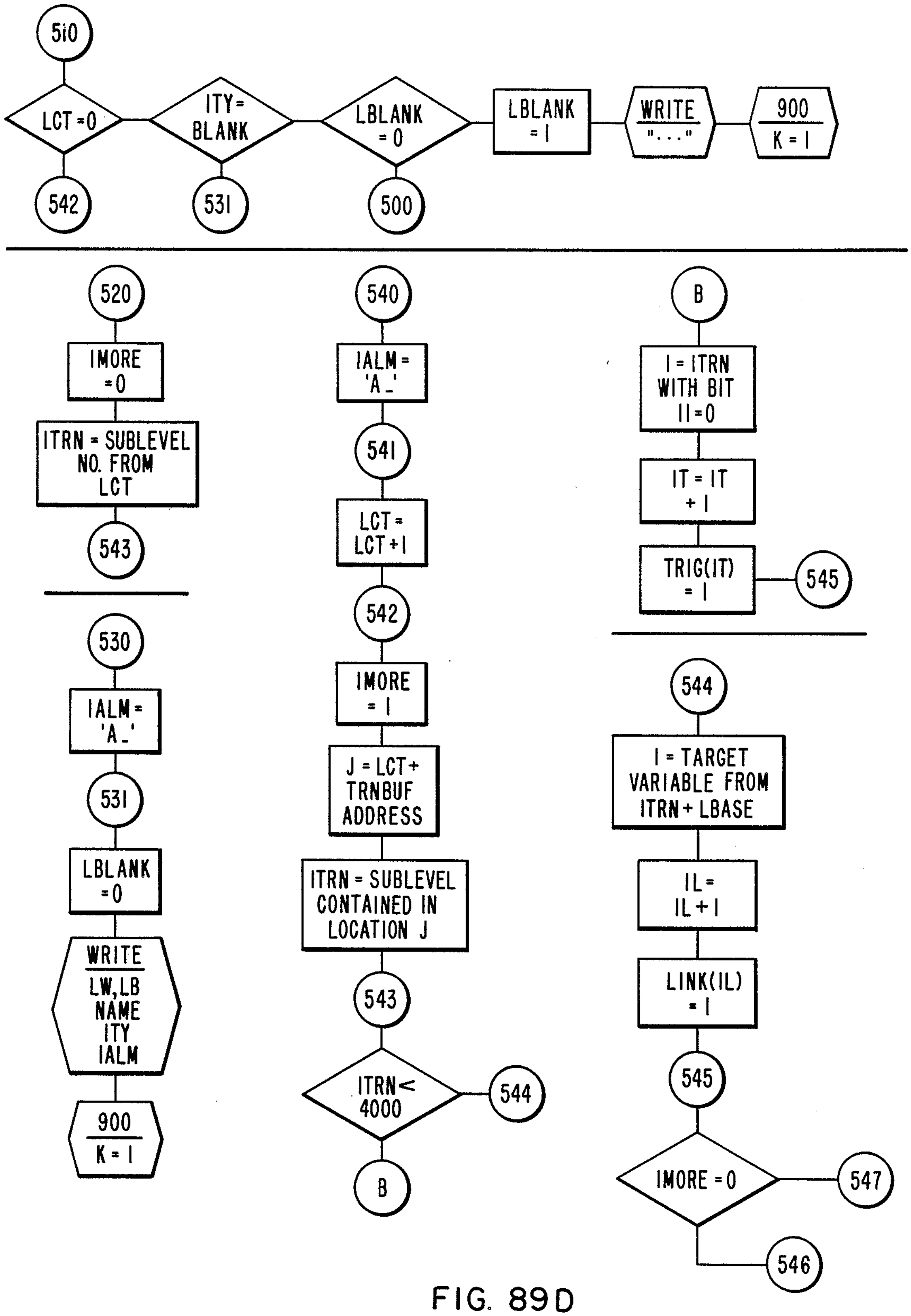
Figure 89E:
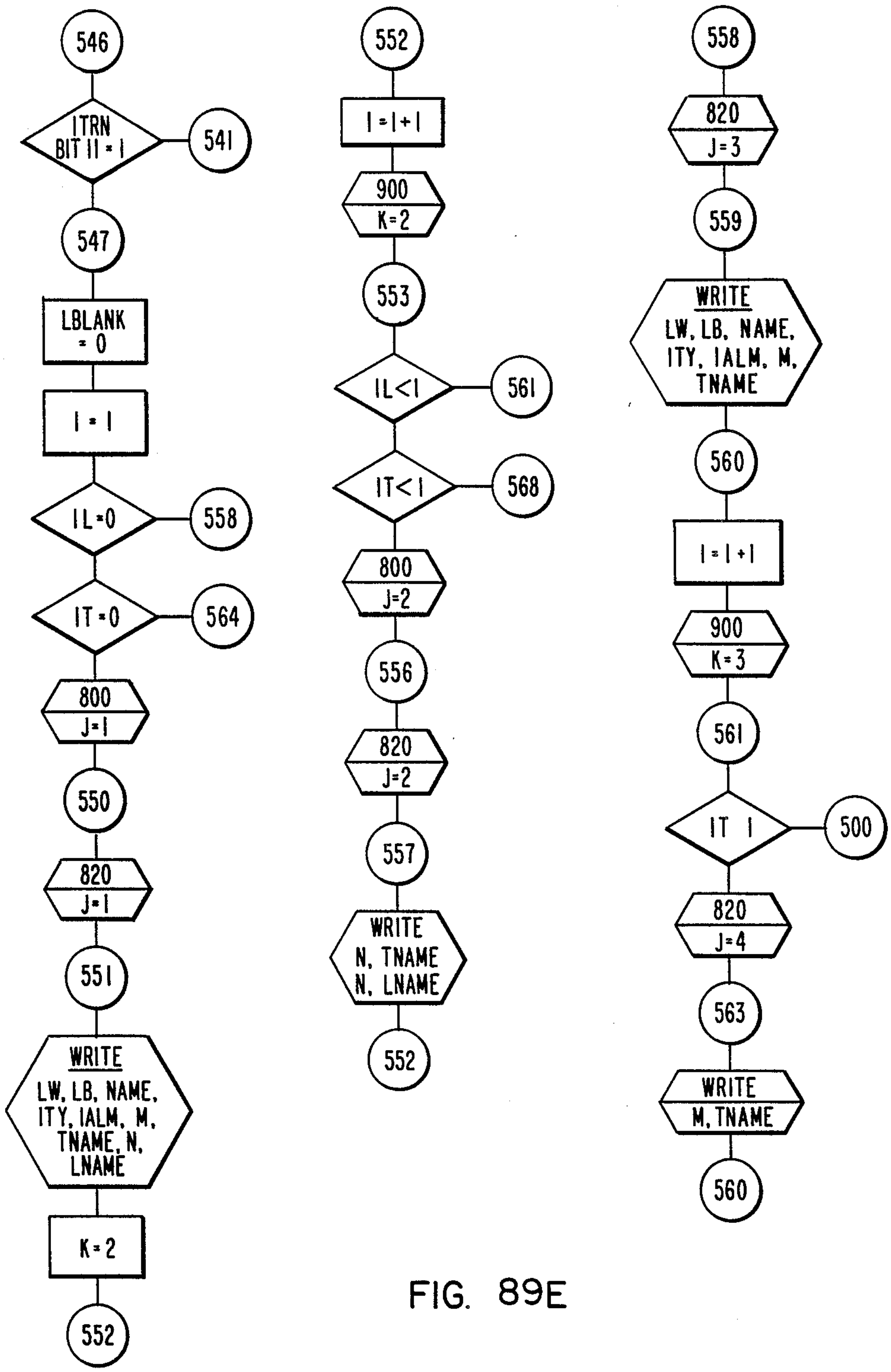
Figure 89F:
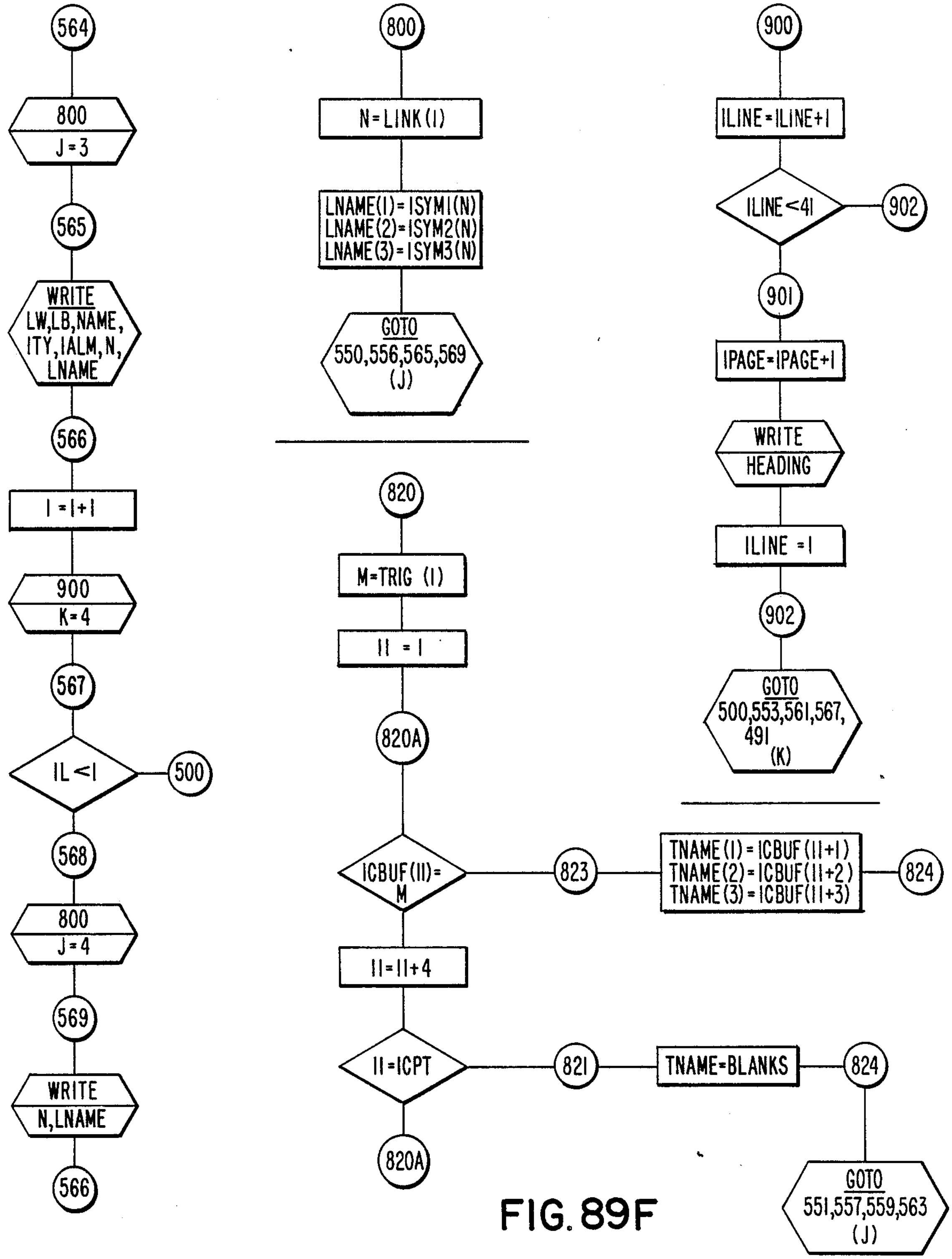
Figure 90A:
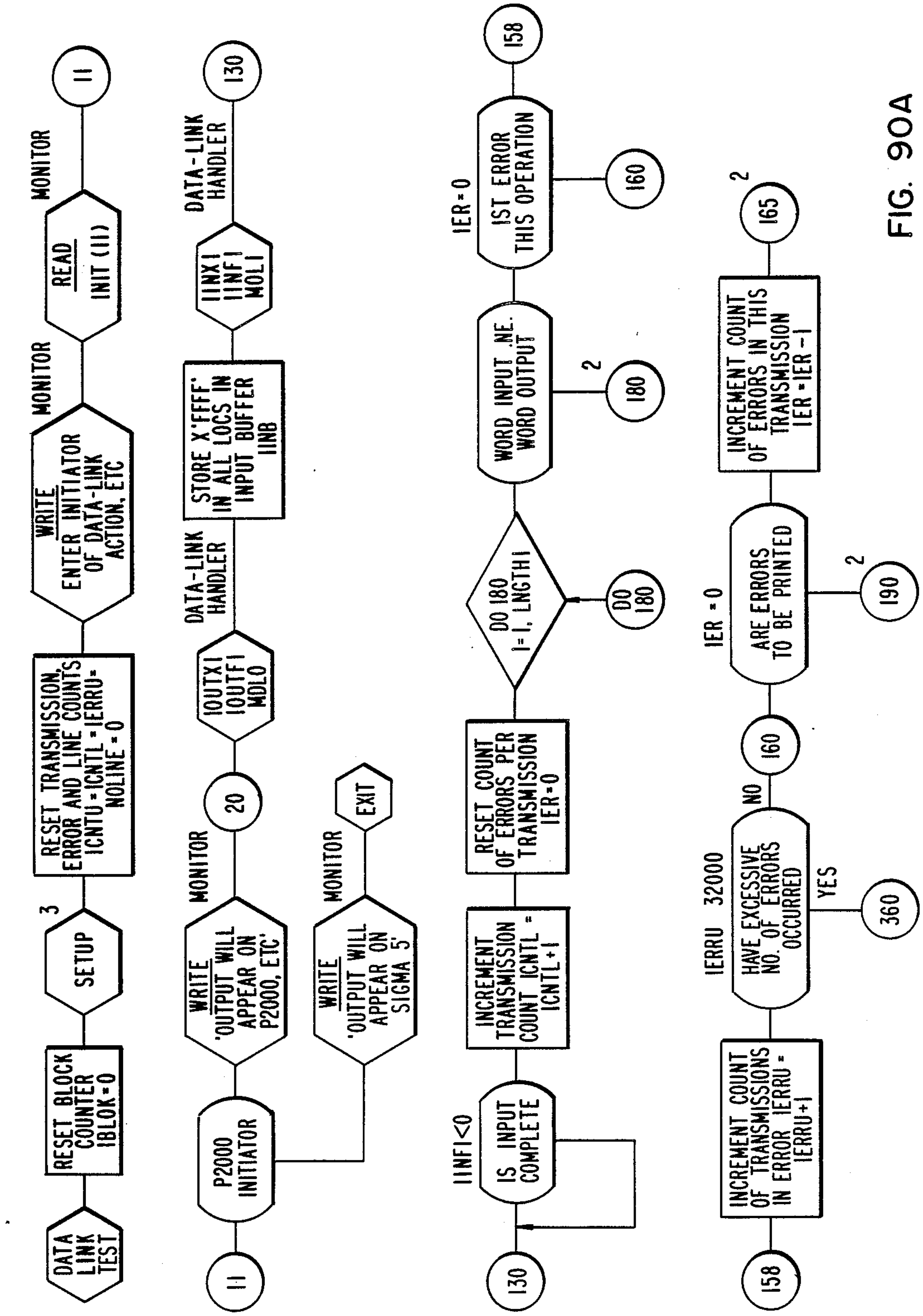
FIGS. 90A through 90D inclusive illustrates the flow chart for the data link test program for the B machine.
Figure 90B:
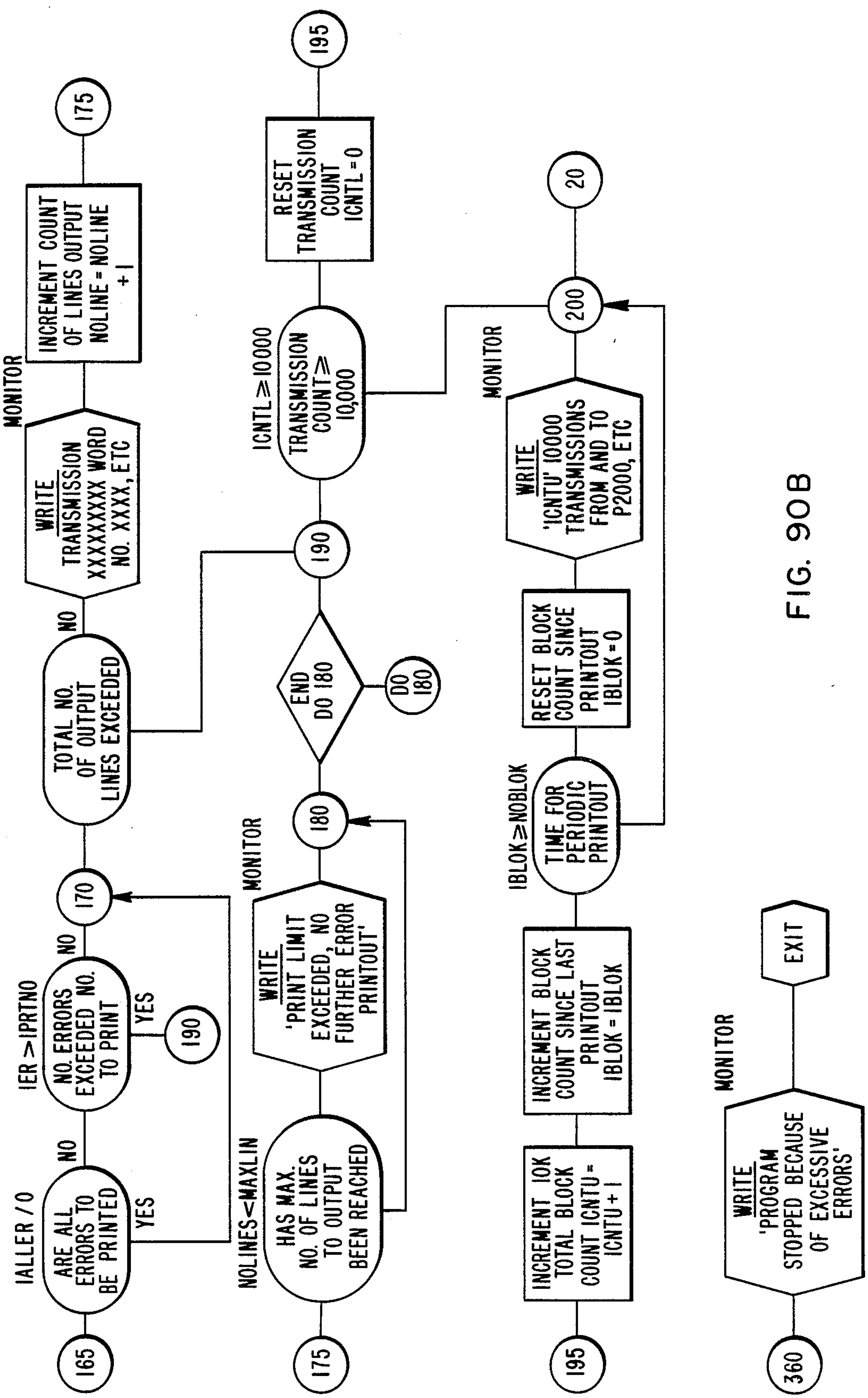
Figure 90C:
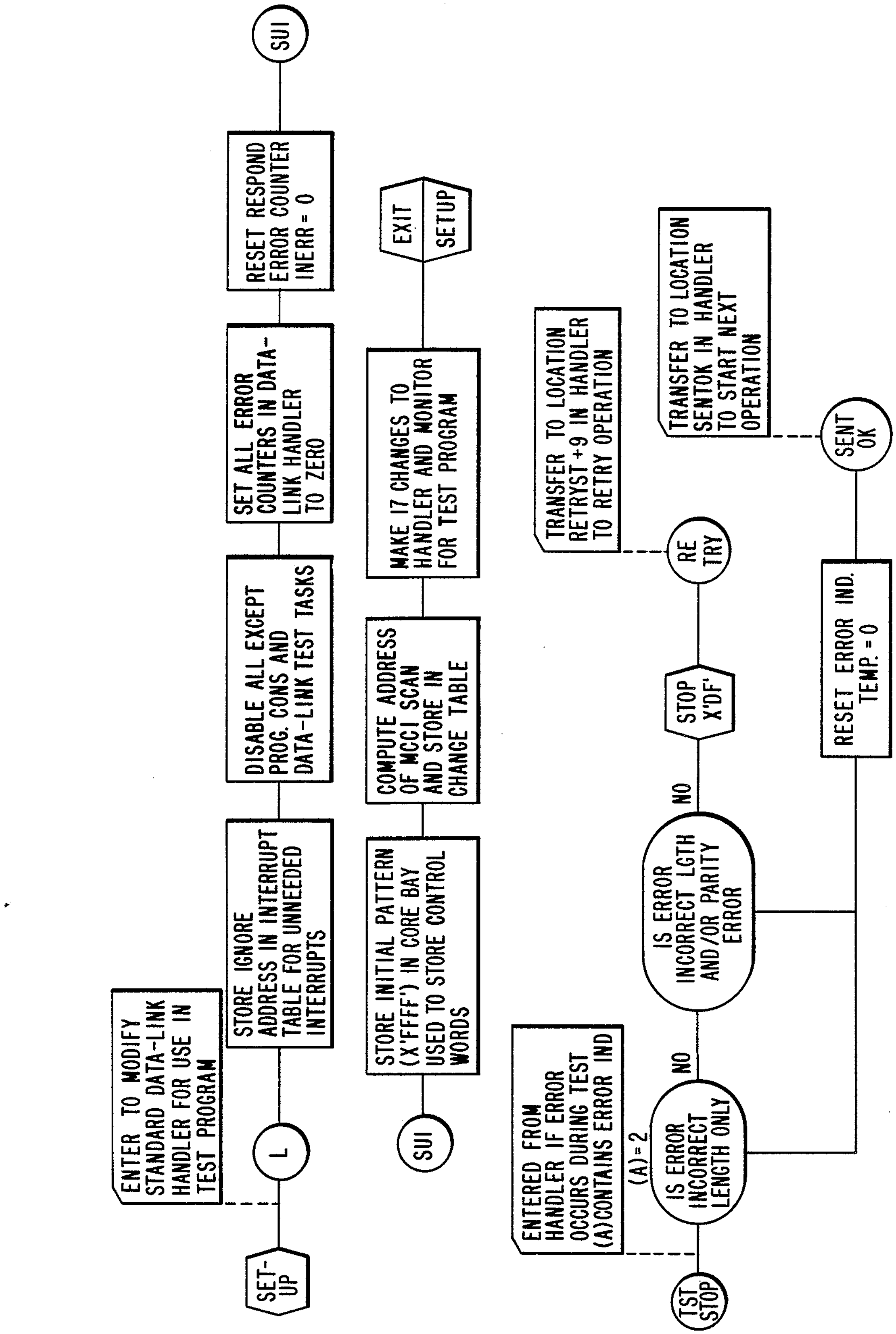
Figure 90D:
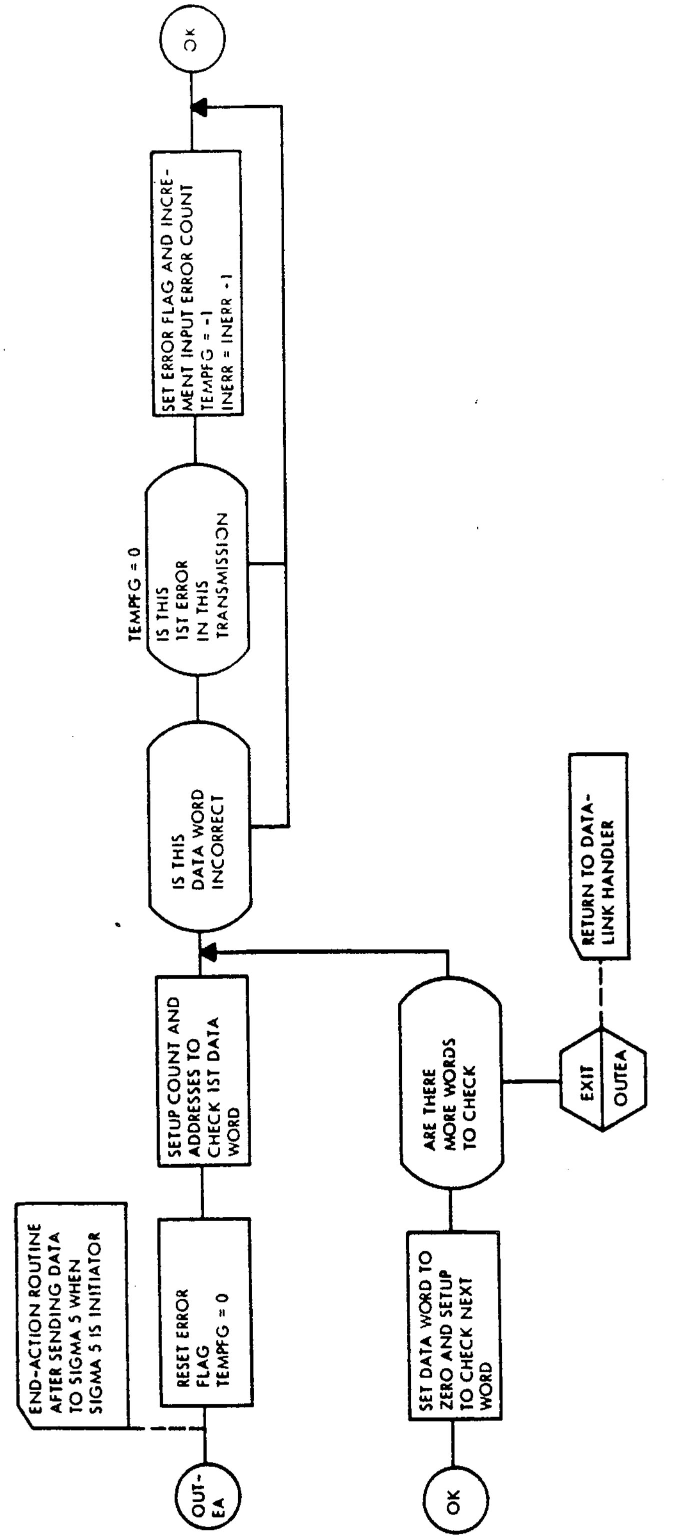

The off-line software for the B machine, which is classified as utility software and is executed off-line when the simulation is not running is similar to the off-line software described in connection with the A machine. Reference is made to the description in connection with the A machine and the flow charts of FIGS. 84A and 84B; FIGS. 85A and 85B; FIGS. 87A and 87B; FIGS. 84/1 and 84/2; FIG. 88; and FIGS. 89A through 89F are a specific functional description of the off-line software for the B machine. The data link test program for the B machine is like the data link test program for the A machine, and reference is made to FIGS. 90A through 90D for a functional description of this program.

Referring to the flowcharts of FIGS. 94A through 94D, the "display/print value" routine provides for displaying or printing the value of any one of a maximum of 200 parameters that are in the C machine. These values can be either real or integer. Thus, the instructor's console can display independently any one of the 200 parameters which are indicated on the operator's control panel. The address which must be entered to display or print the value of such a parameter is of the form "VXXXXX" where the X's can be any number from 1 through 9. The V stands for value, and the remaining characters must be a number in the range of 1 to 200. This routine is called using the "print value" pushbutton, or the "display" value pushbutton. In addition, the program is called periodically from the two per second end action routine whenever the value of a parameter is being displayed periodically.

Associated with the display/print routine are three tables. The first table is 200 words long and each entry in the table is an index to identify where within the specified common block, the value is located. The numeral 1 indicates the first value in the block, 2 indicates the second, etc. This table is ordered by parameter or variable number. The second table immediately follows the first table and consists of 56 words which are used to start up 28 floating point multipliers. These multipliers are provided to scale the variables prior to display or printout. If the variable is an integer, it can still be scaled by these multipliers. The third table is 200 words long and each entry in this table is of the format 100**MULT+INDEX, where MULT is an index to the desired multiplier. A numeral 1 equals first, 2 equals second etc. If MULT is zero, the value is displayed or printed as received from the C machine. INDEX is an index to identify the common block in which the value is located. If the value to be displayed or printed is an integer, the negative of the above value is entered in the table. Provision is made in the C machine for up to 25 common blocks.

When the routine display/print value is called, it checks to see what sublevel is running to determine the source of the call. If it is the print value request, the routine proceeds to determine the address entered. If it is a display value request, the routine sets a flag, cancels any currently existing periodic display, and saves the address which was entered. The address must be saved in order to display it periodically along with the value, if a periodic display is requested.

A check is then made to see if this a start or stop request. If it is a stop request, no further action is taken and exit is made from the function program. If it is a start request, the routine proceeds to determine the address entered, and the address is then checked for validity. The first character must be a V, and the index entered must be between 1 and 200. If either of these conditions is not met, a diagnostic message is printed and the function cancelled. The index entered is then used to access the first and third tables previously described, and a zero entry in either table means that the address in the C machine has not been defined. A diagnostic message is printed and the function cancelled. The entry to the third table is then checked to see if the value to be accessed is an integer or real. If it is an integer, a flag is set. The index to the multiplier table, if any, is determined, and then the index identifying the common block is determined. At this point, a type zero transmission is made to the C machine, the data is received in the type zero receiving buffer in the C machine, and the first word is numeral 6 which identifies the requested display or print value. The second word is the index to the value within its common block and the third word is an index to identify the common block. The fourth word is a zero if this is a print value request, or a 1 if this is a display value request. The function program then goes into a time delay, checking periodically for a completion acknowledgement from the C machine.

The end action routine in the C machine uses the second and third words of received data, in conjunction with a table of common block starting addresses, to locate the value to be sent back for display or printing. This value is sent back to the B machine by way of a type zero data link transmission. In addition, if the fourth word is 1 indicating display value, the address is stored in a common location in the C machine and just prior to the two per second transmission to the B machine, the value is stored with the two per second data. This is done in level LEV6 of the C machine. Thus, every one-half second, the current value of the variable in question is sent to the B machine with the two per second model data. This is accomplished whether or not periodic display has been requested. Periodic display always results unless some entry is made for VALUE 1. The fact that an entry is made indicates that the display is to be single shot as compared to periodic.

In addition to setting up for periodic transmission of the value with two per second data, the end action routine transmits back to the B machine the value at the time of the request. Upon receipt of this type zero transmission after the acknowledgement has been received, a check is made to see if this is the display level. If so a check is then made to see if the model is running. If the model is running and if no VALUE 1 entry has been made, the integer flag and the multiplier index +1 are stored in common. The integer flag is now checked, and if the value is an integer, it is converted to P2000 integer format. If a multiplier is to be applied, the value is converted to floating point. After the multiplier is applied, the value is converted back to integer. The value is then either displayed or printed.

If the integer flag is zero, that is the value is floating point, the value received from the C machine is converted to P2000 floating point format, the multiplier, if any, is applied, and the value is either displayed or printed. In the case of display, the address VXXX is also displayed. Return is then made from the function program. When the display/print value function program is called, it is determined that a periodic display is called if neither the print nor display levels are running. The bid is made by the two per second end action routine; and is called approximately every three seconds. This program then picks up the value transmitted in the two per second data and displays it just as though it had been received from the type zero transmission previously described. The multiplier and integer flags are picked up from common where they were stored when the display value request was made.

The print control function program functions in response to action initiated by the "print control" pushbutton and it provides for inhibiting or enabling alarm printout in both the A and B machine. The function can be called in either the "start" or "stop" mode. When called in the "stop" mode, printout is inhibited in both the A and B machines and a message to this effect is printed on the B machine alarm typewriter. The action taken is to suppress any further alarm calls to the message writer from the digital scan or the analog scan programs in both the A and B machines. Any messages already in the message writer QUEUE are printed. The "start" mode of this function simply enables all calls to the message writer from the digital scan or analog scan. When printout is enabled, a message to this effect is printed on the B machine alarm typewriter.

When the print control function is called, a check is made to see if the start or stop request has been made. If the stop request has been made, a single word of data, which is a jump instruction to jump around the calls to the message writer, is sent to the C machine and from the C machine to the A machine. If the start request has been made, the word sent is the SST instruction to call the message writer. The end action routine in the A machine stores this word in the three places where alarm calls to the message writer are made. The appropriate word for start or stop is also stored in the B machine in the three calls where alarm calls are made to the message writer. The appropriate acknowledging message is printed, and an exit is made from the function program.

Referring to the flow diagrams of FIGS. 89/1 to 89/6 inclusive, the local operator program LCOPAC is triggered by pressing the "local operator action" pushbutton on the instructor's console. This feature of the simulator provides the instructor with the capability of operating components in the described embodiment of the plant being simulated which are not controlled from the central control panels. Thus, the student operator must not only consider those components of the plant which are operated remotely from the control consoles, but also those that are operated locally apart from the central office. Specifically, the program LCOPAC provides the instructor with the capability of changing constants for the simulated plant in the C machine; setting or resetting logicals for the simulated plant in the A or B machines; and opening, closing, or modulating simulated valves by way of the valve handler in the C machine.

To change the constants in the C machine, a C'N' is entered where N' identifies the constant to be changed and varies from 1 to MAXCON. Then, NNNN is entered as value 1 where NNNN varies from LIM(1, INDEX) to LIM(2, INDEX). To execute, the "start" pushbutton is operated.

To set or reset logicals, the address L'N' is entered, where N varies from 1 to MAXLOG. To commence operation the "start" pushbutton is operated to set the logical; and the "stop" is operated to reset the logical.

To operate non-modulated valves, an address is entered V'NN', where NN identifies the valve and varies from 1 to 42. Then, the "start" pushbutton is operated to open the valves; and the "stop" pushbutton is operated to close the valves.

To operate modulated valves, an address V'NN' is entered, where NN identifies the valve and varies from 51 to 68. The value V1 is entered where NNN identifies the desired position of the valve and varies from 0 to 100%. To execute the "start" pushbutton is operated to start the valve. In modulating valves, the actual valve position, which is calculated and transmitted periodically two times per second from the C machine, is compared with the desired position indicated by V1. If they are different, a counter ACTIVE is incremented and the appropriate raise or lower logical is set in the data transmission buffer for the valve handler to start movement. A message is printed out indicating the direction, that is the opening or closing of the valve movement.

A program INCVLV runs every one-half second and checks the counter ACTIVE. If it is non-zero, the program then checks the actual position of every valve being modulated, which is indicated by the raise-lower logicals, with its desired setpoint. The program INCVLV services V51–V68. It also services V70–V74 that are initiated by malfunction M28 and malfunction M36.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A and B machines. The panel interface logic and the plant protective logic are contained in both the A and B machines as hereinbefore mentioned. The control consoles permit the student operator to control and monitor the operation of the plant in the same manner as the operator of an actual plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see realistically in real-time the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it will aid in understanding the simulation of the system.

In the software modeling aspects of the plant simulator, various plant parts are modularly designated as individual "models". With respect to the various plant system models, system variables are designated herein by using a maximum six character reference designation. The first two characters correspond to the system concerned; the next one or two characters correspond to the particular physical variable; and the final one or two characters correspond to a particular location, subscript, or description of the device.

The individual systems of the simulation which correspond to the first two characters are as follows:

| System | Designation |
|---|---|
| Boric Acid Makeup | BA |
| Boron Recycle | BR |
| Component Cooling | CC |
| Condenser | CD |
| Charging Flow System | CH |
| Containment | CN |
| Circulating Water | CW |
| Letdown Flow System | DW |
| EH Governor | EH |
| Electrical Power | EP |
| Excess Letdown | EX |
| Auxiliary Feedwater | FA |
| Feedwater Pumps | FP |
| Feedwater | FW |
| Generator | GN |
| Heater Drain System | HD |
| High Pressure Turbine | HP |
| Low Pressure Turbine | LP |
| Main Steam (Secondary Plant) | MS |
| Plant Protective Logic | PL |
| Pressurizer | PR |
| Startup Models | SU |
| Pressurizer Relief Tank | PT |
| Reactor Coolant System | RC |
| Reheaters | RE |
| Residual Heat Removal | RH |
| Radiation Monitoring | RM |
| Reactor | RT |
| Safety Injection - (1) Accumulator | SA |
| (2) SIS | SI |
| Steam Generator | SG |
| Service Water | SW |
| Turbine Auxiliary Systems | TS |
| Waste Disposal | WD |

The physical variables, which are represented by the third or the third and fourth characters in the description of the plant system models are as follows:

| System | Designation |
|---|---|
| Area | A |
| Boron Inventory | B |
| Boron Concentration | CB |
| Specific Heat | CP |
| Radiation | CR |
| Density | D |
| Enthalpy | E |
| Admittance (Fluid or Electrical) | G |
| Specific Enthalpy | H |
| Current | I |
| Inertia, Inductance | J |

-continued

| System | Designation |
|---|---|
| Constant | K |
| Length, Level | L |
| Mass | M |
| Speed | N |
| On-Off Status | O |
| Pressure | P |
| Heat Flow | Q |
| Specific Volume | S |
| Temperature | T |
| Power | U |
| Total Heat Transfer Coefficient | UA |
| Voltage | V |
| Volume | V |
| Flow Rate | W |
| Steam Quality | X |
| Escape Variable | Z |
| (None of the above) | |

The rate of change cf a physical variable is represented by the insertion of the character "R" as the fourth or fifth character as appropriate; and a differential change in a physical variable is represented by the character "D" inserted as the fourth or fifth character as appropriate. Also, the fourth or fifth character, as appropriate, represents any necessary subscript in the mathematical model of the system; and the fifth and/or sixth character is a number or letter referring to the location in the specific system or a specific description of the situation.

With respect to the various valve parameters, the third and fourth characters corresponding to such valve parameters are as follows:

| Parameter | Designation |
|---|---|
| Valve-Close (Logical) | VC |
| Valve-Open (Logical) | VO |
| Valve Position Increment (Integer) | VI |
| Valve Position (Integer) | VP |
| Valve Fully Open (Logical) | FO |
| Valve Fully Closed (Logical) | FC |
| Valve Not Fully Open (Logical) | NO |
| Valve Not Fully Closed (Logical) | NC |
| Valve Coefficient (Real) | CV |
| Valve Controller Output (Real) | OC |
| Valve Controller Auto/Manual (Logical) | AU |

In the six character format for set points, the first two characters represent the set point as follows

| Set Point | Designation |
|---|---|
| Level | SL |
| Pressure | SP |
| Temperature | ST |
| Flow | SV |

For temporary variables, the first character is a "T"; and the second character represents the type of temporary variable as follows:

| Type | Designation |
|---|---|
| F | Fixed Point |
| I | Integer |
| L | Logical |
| R | Real or Floating Point |

For malfunctions, the initial character code is "M", and the second and third characters are numerals which specifies the particular malfunction in accordance with the malfunction list.

In the described embodiment of the invention, the control and indication panels and the various simulator devices thereon are arranged functionally.

Figure 91:
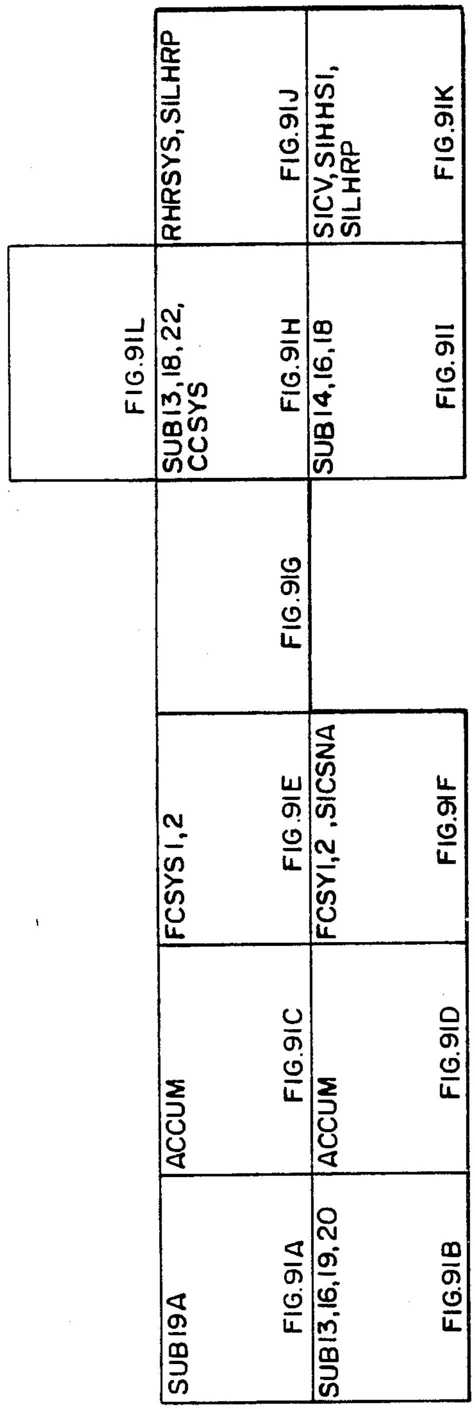
FIG. 91 illustrates the arrangement of the drawings FIGS. 91A through 91L inclusive for the engineered safeguards panel of the simulator.

The engineered safeguards panel arrangement which is represented by the FIGS. 91A through 91L inclusive is illustrated in its overall form in FIG. 91.

Figure 91A:
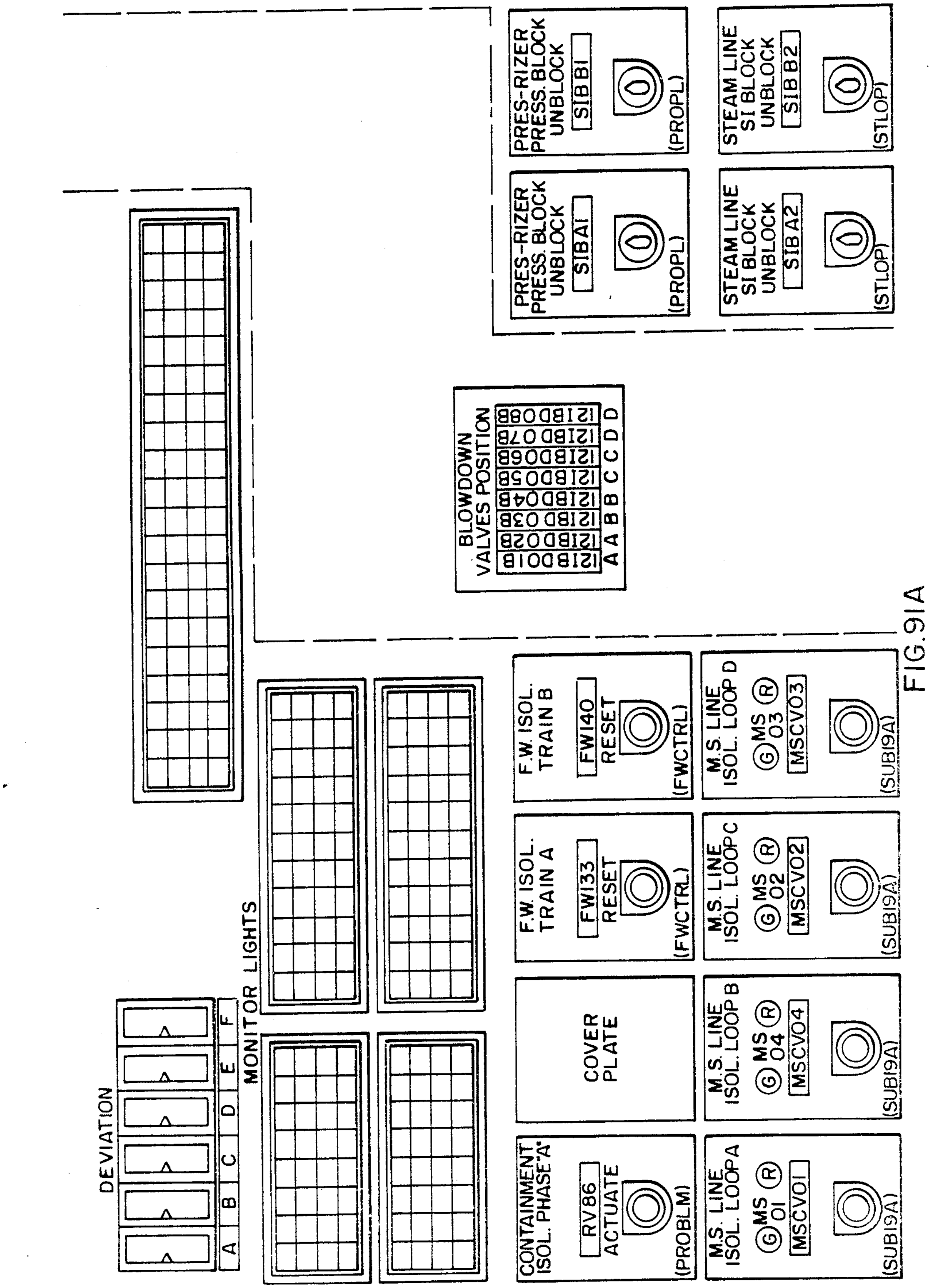
Figure 91B:
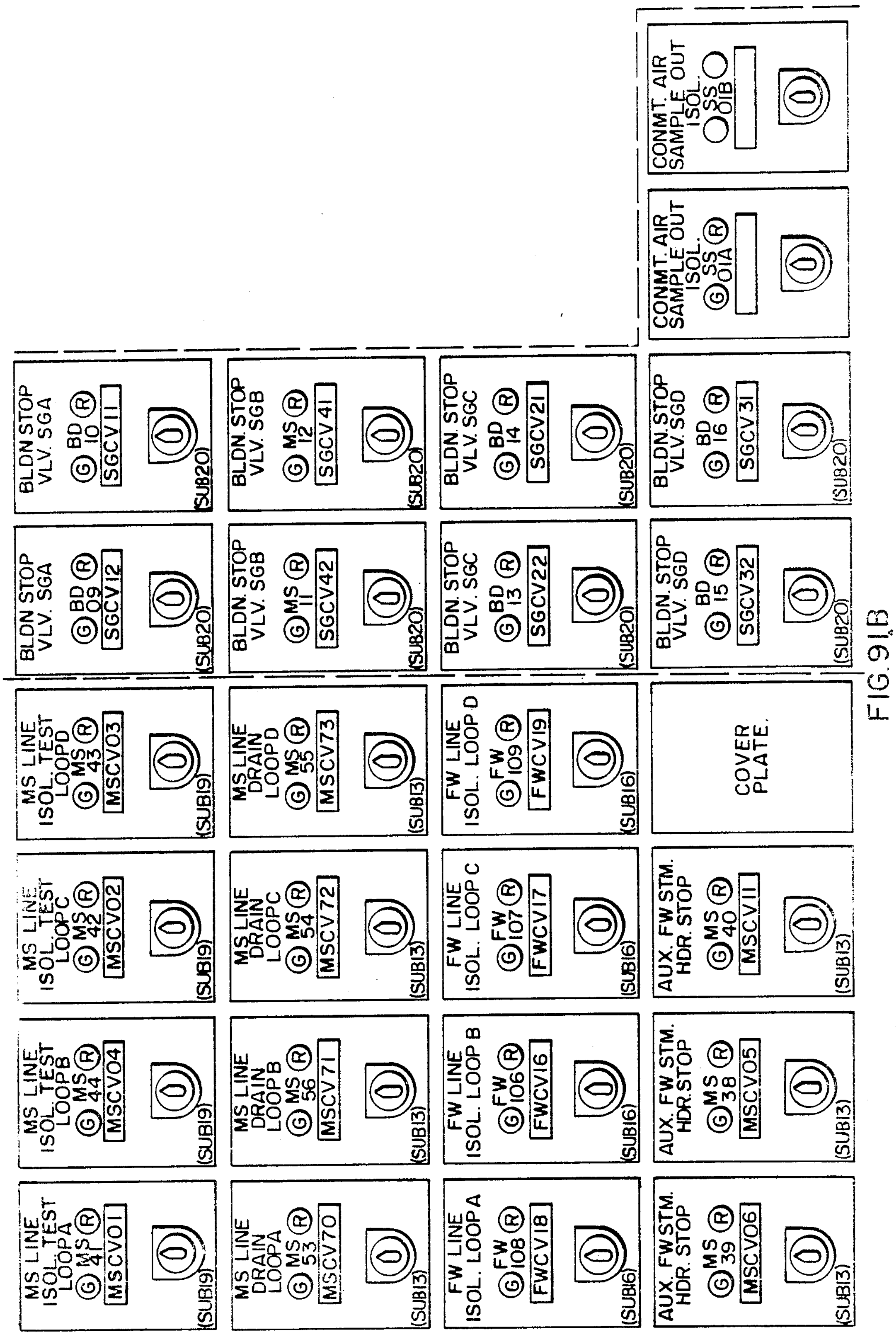
Figure 91C:
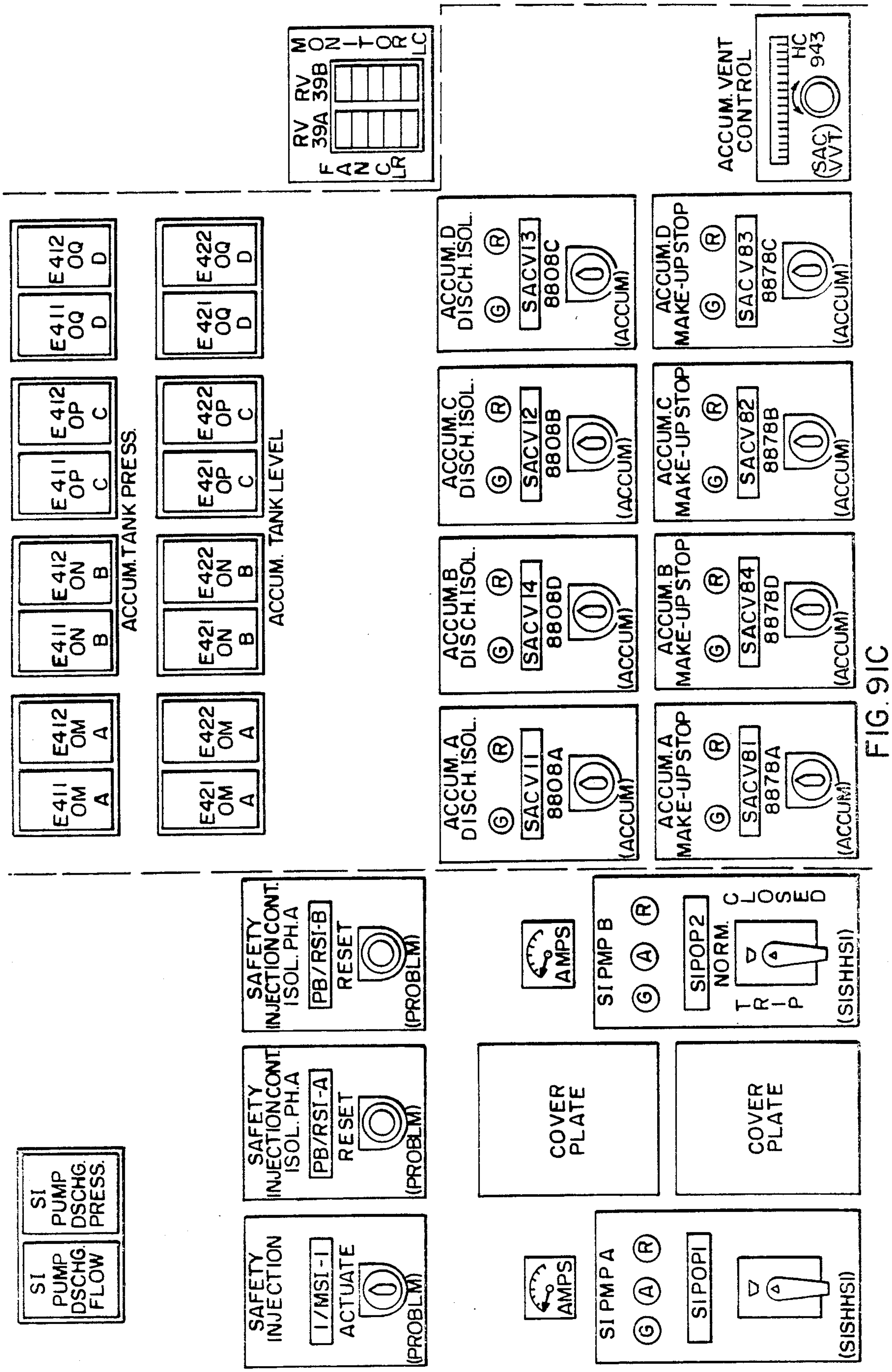
Figure 91D:
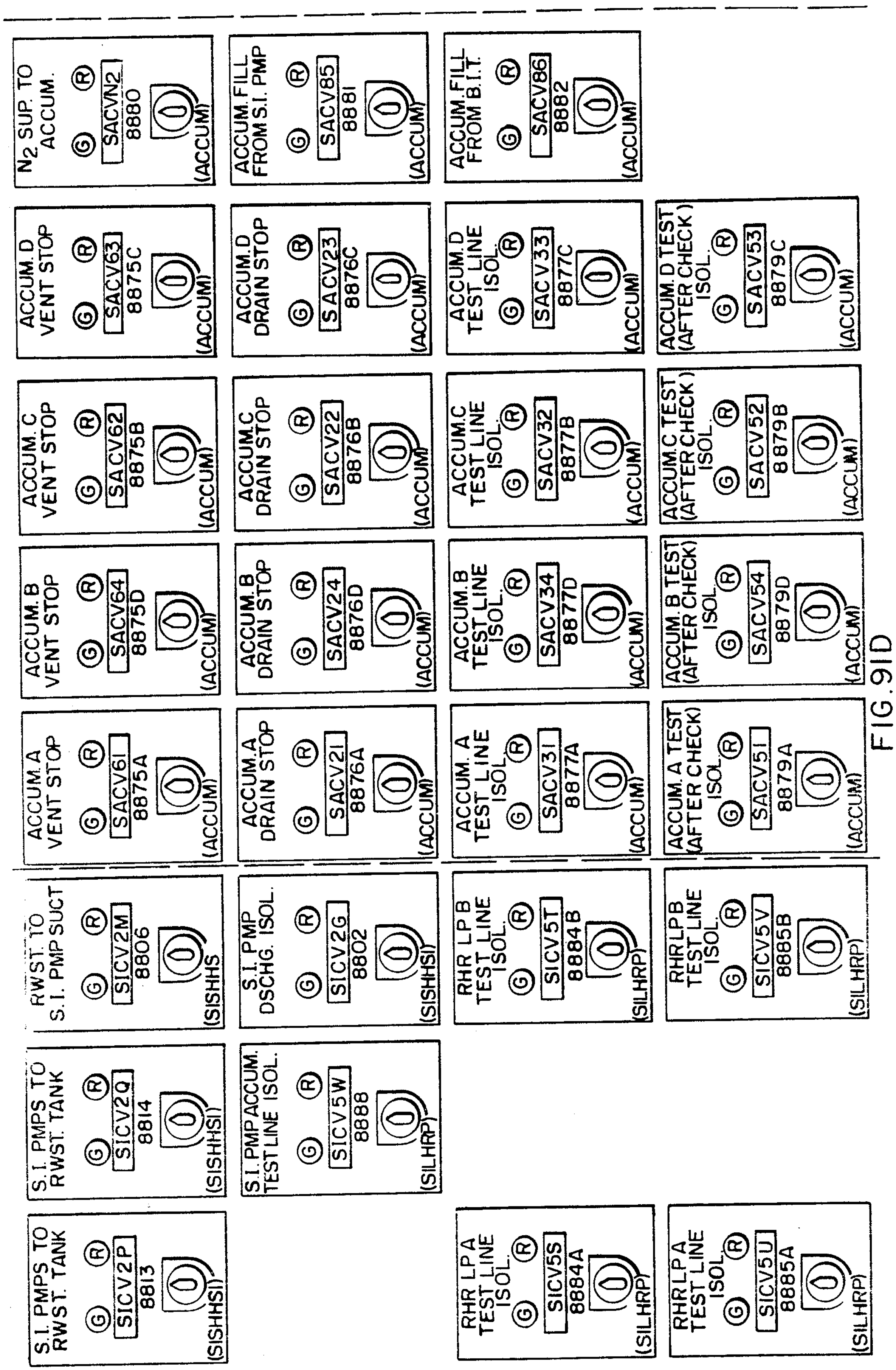
Figure 9I:
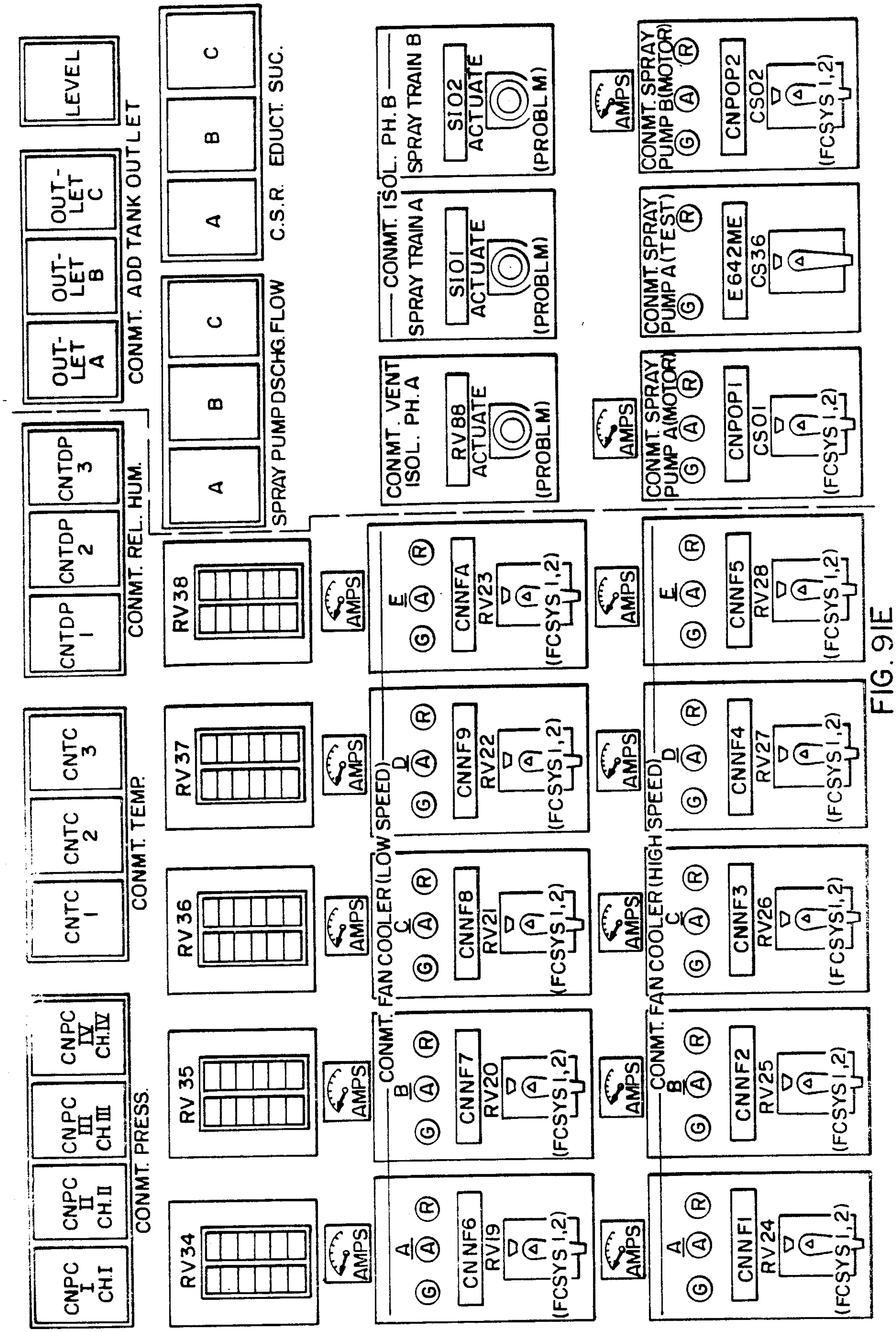
Figure 91F:
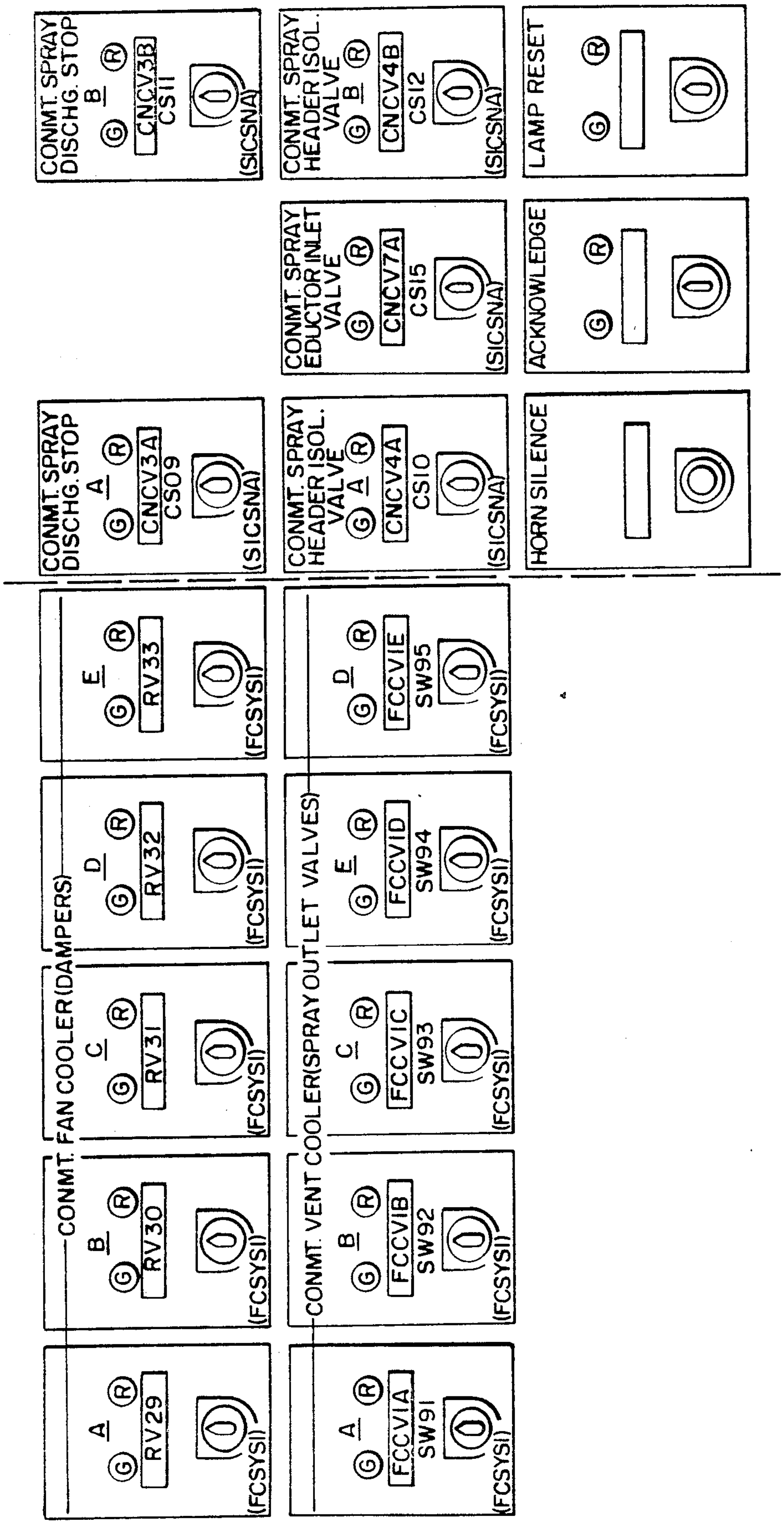
Figure 91G:
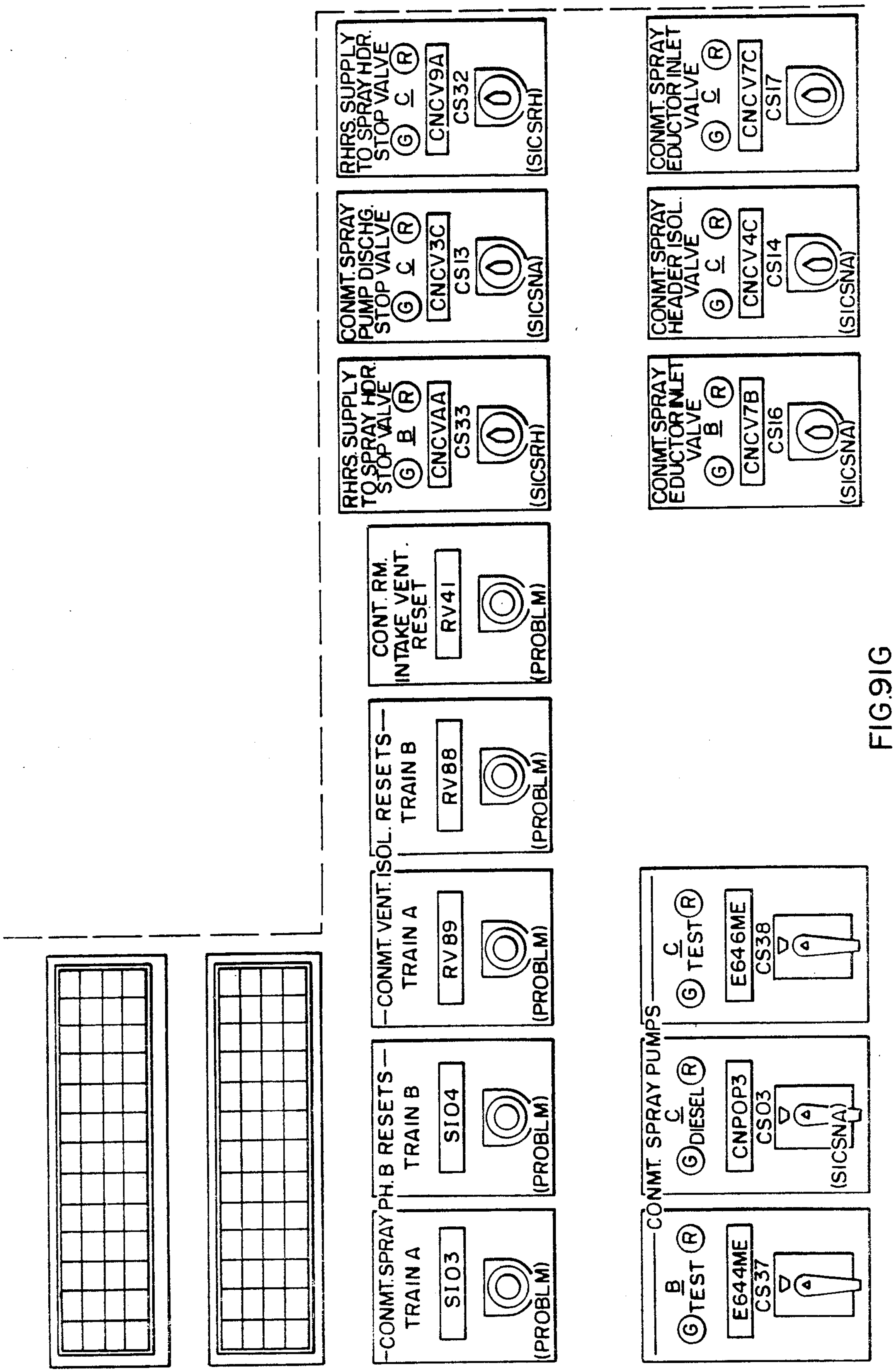

The feedwater system and the containment isolation system is included in FIGS. 91A and 91B. The safety injection system and the accumulator system are included in FIGS. 91C and 91D. The fan cooling system for the containment is included in FIGS. 91E and 91F. The containment spray system is included in FIGS. 91E, 91F, and 91G. The remainder of the auxiliary feedwater system, and the component cooling system is included in FIGS. 91H and 91I; and the residual heat removal system is included in FIGS. 91J and 91K of the engineered safeguards panel.

Figure 92:
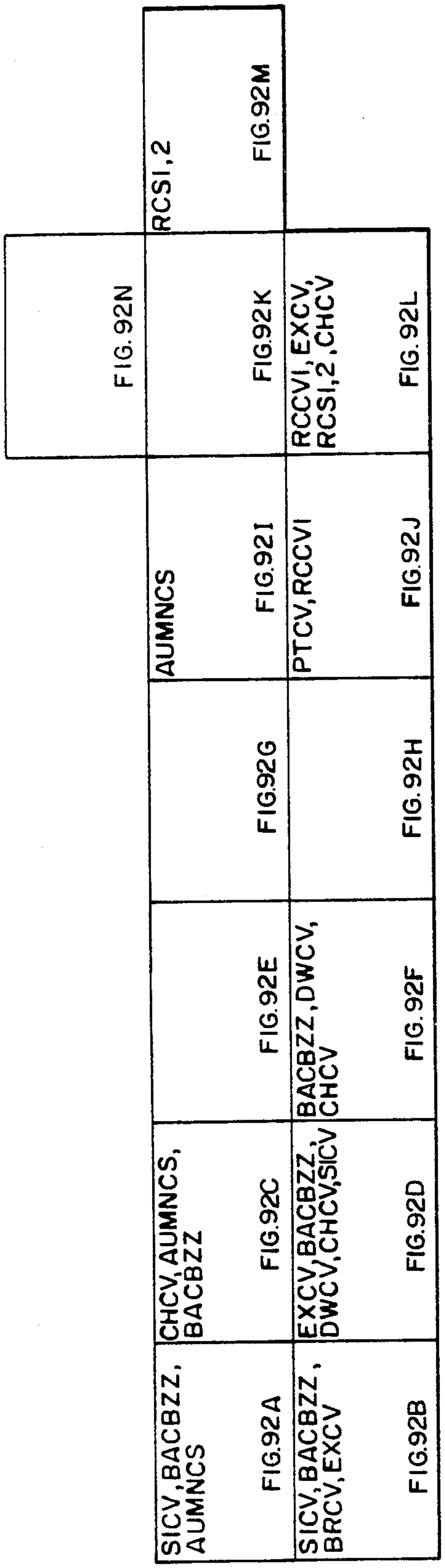
FIG. 92 illustrates the arrangement of FIGS. 92A through 92N for illustrating the reactor coolant system panel of the simulator.
Figure 92A:
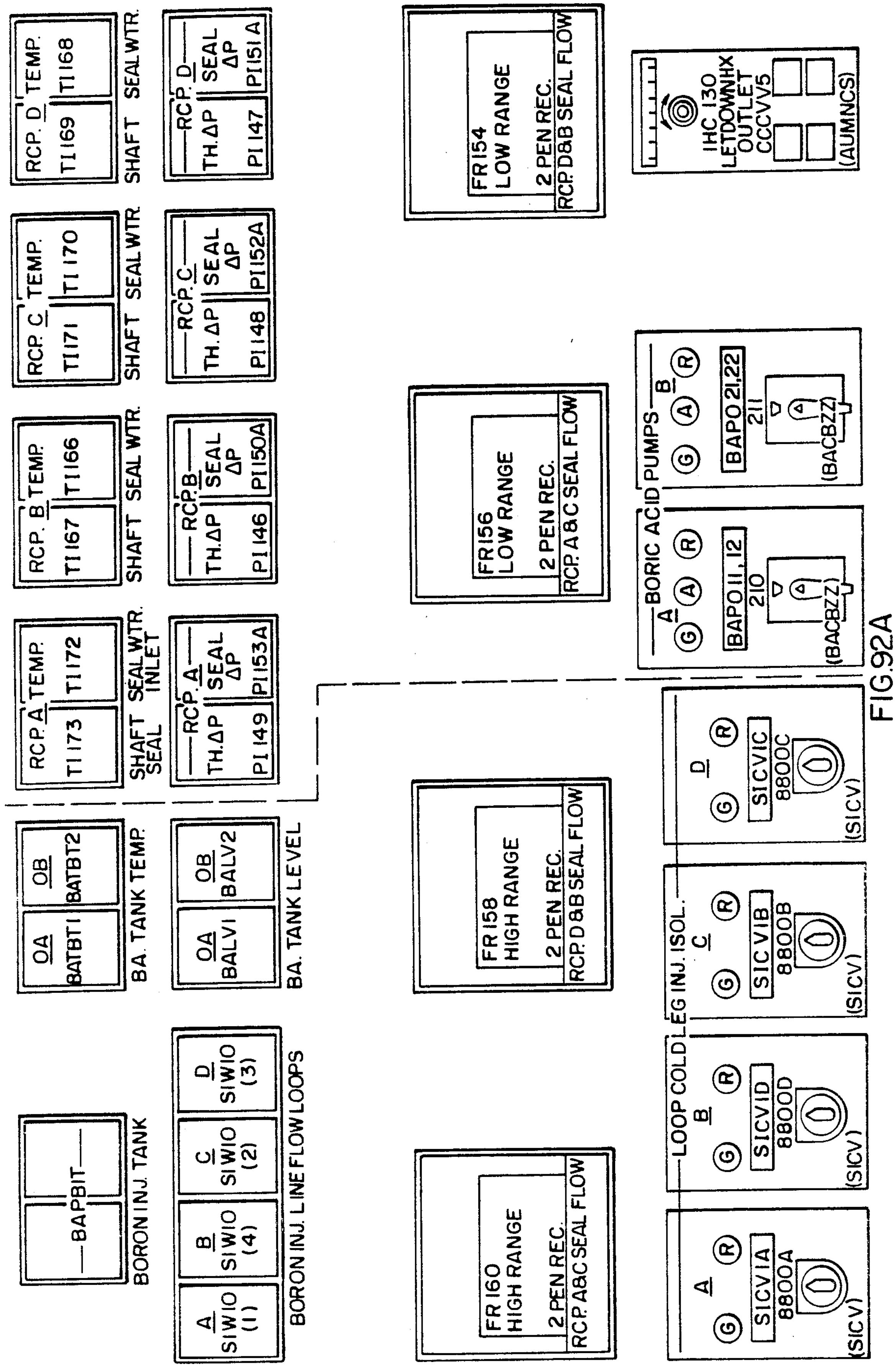
FIGS. 92A through 92N inclusive when arranged according to FIG. 92 illustrates the front view of the reactor coolant system portion of the control panels of the simulator.
Figure 92B:
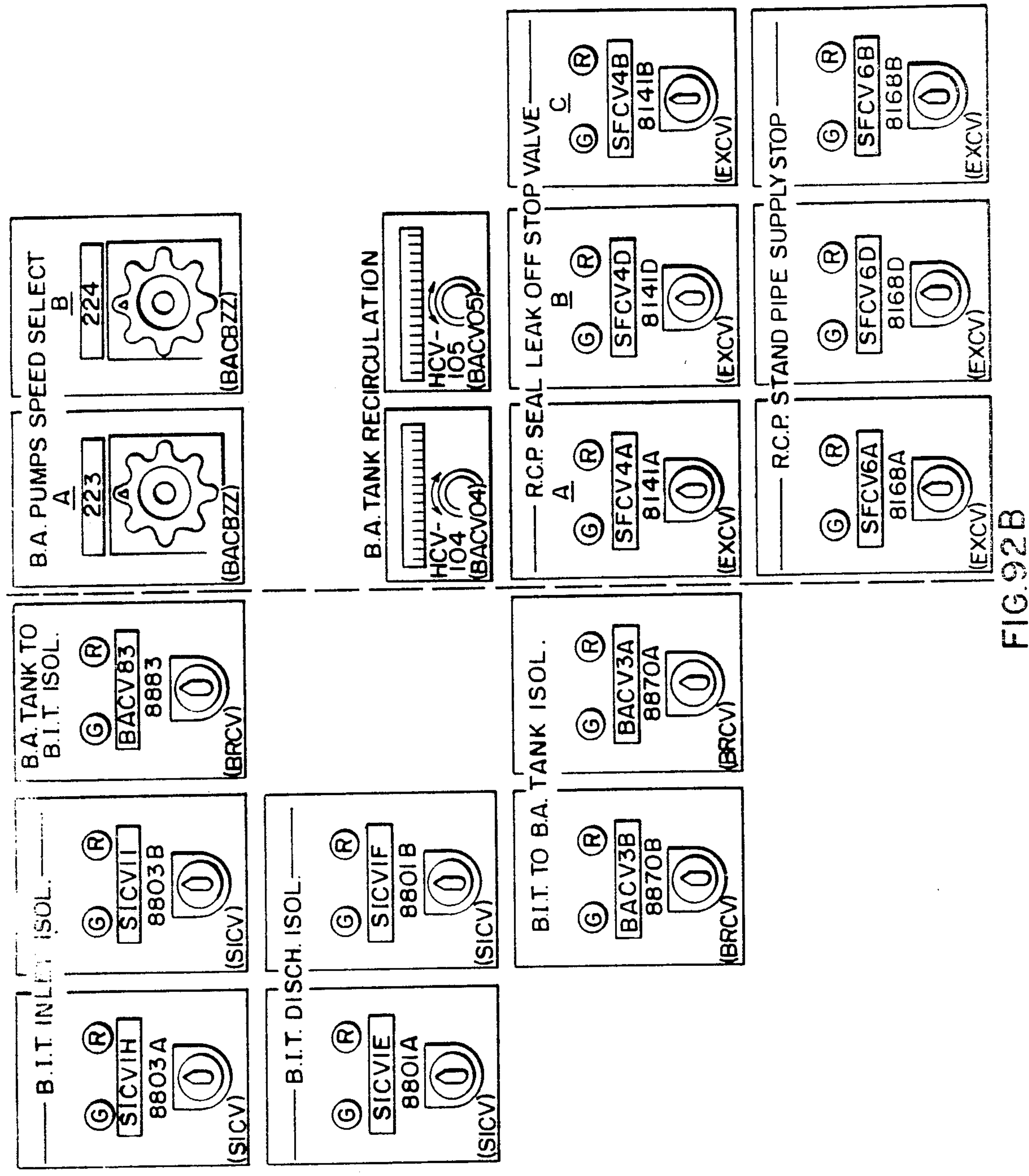
Figure 92C:
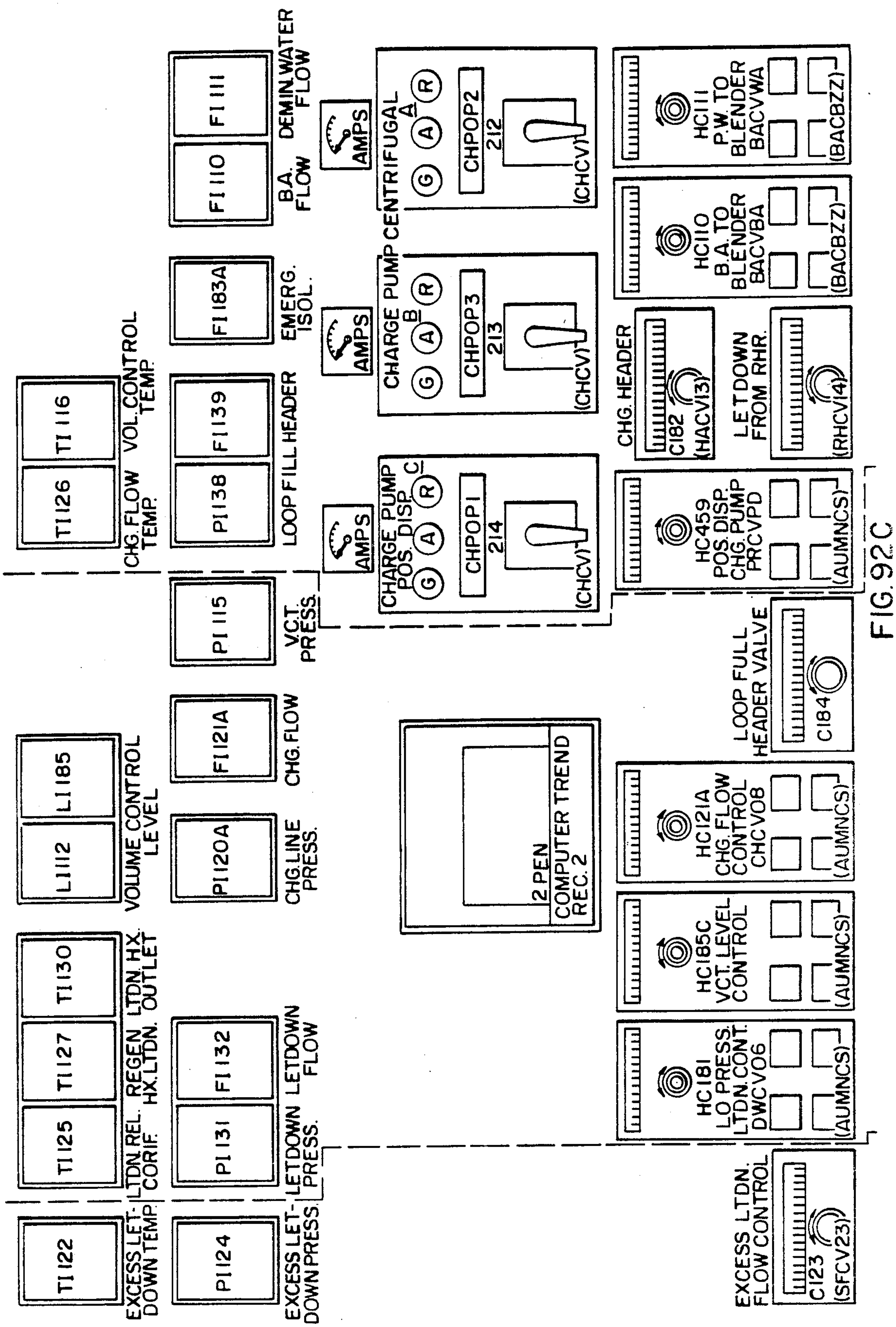
Figure 92D:
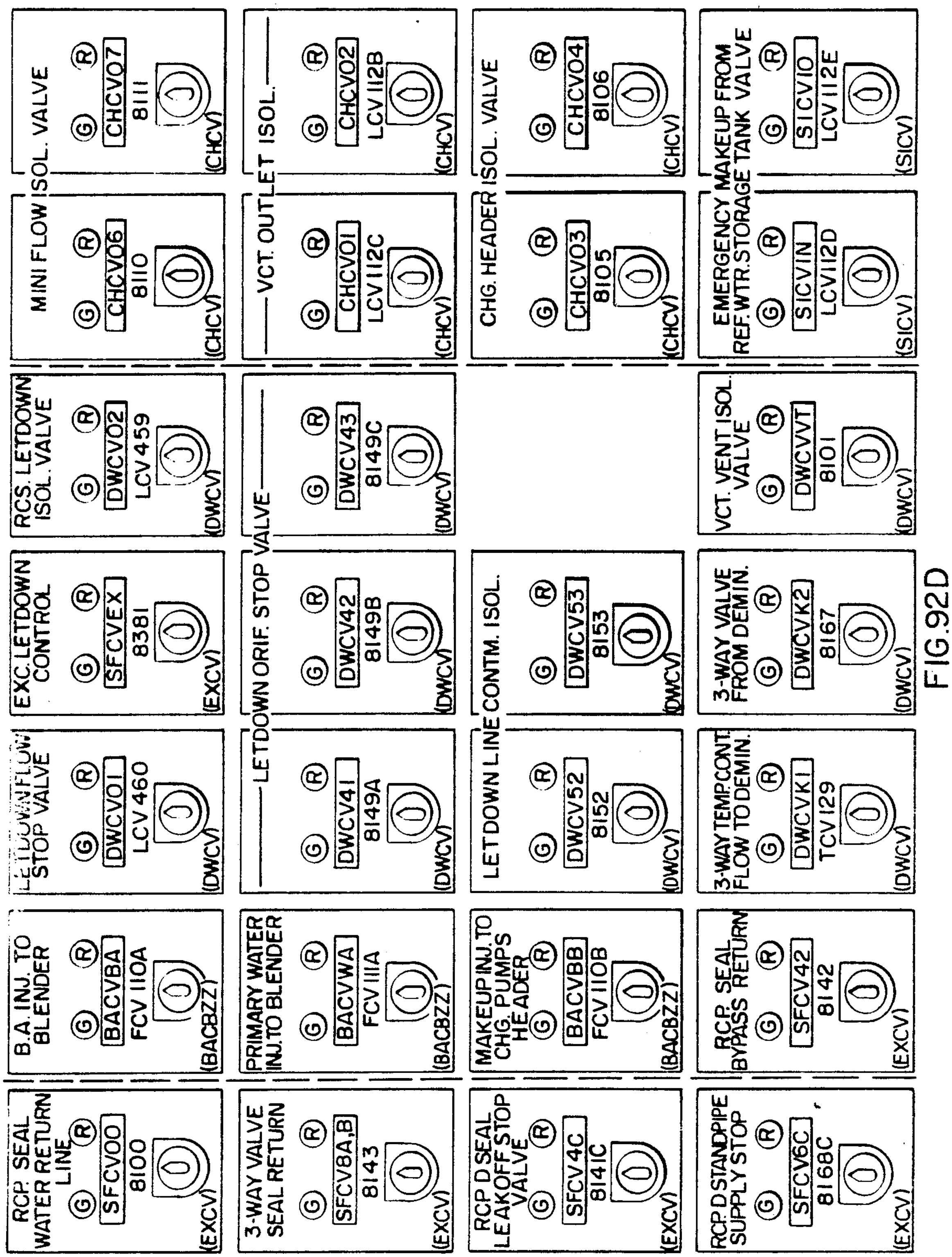
Figure 92E:
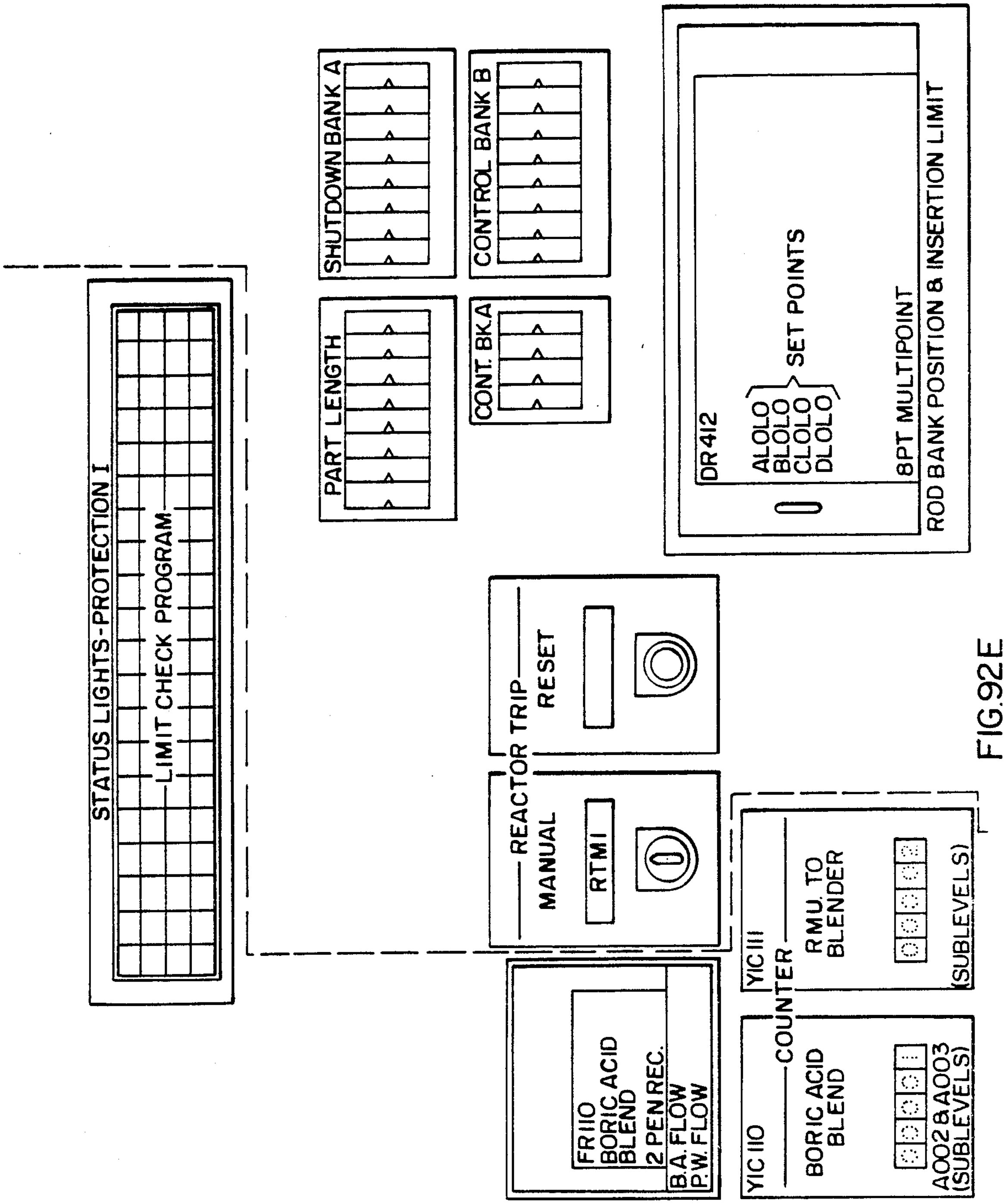
Figure 92F:
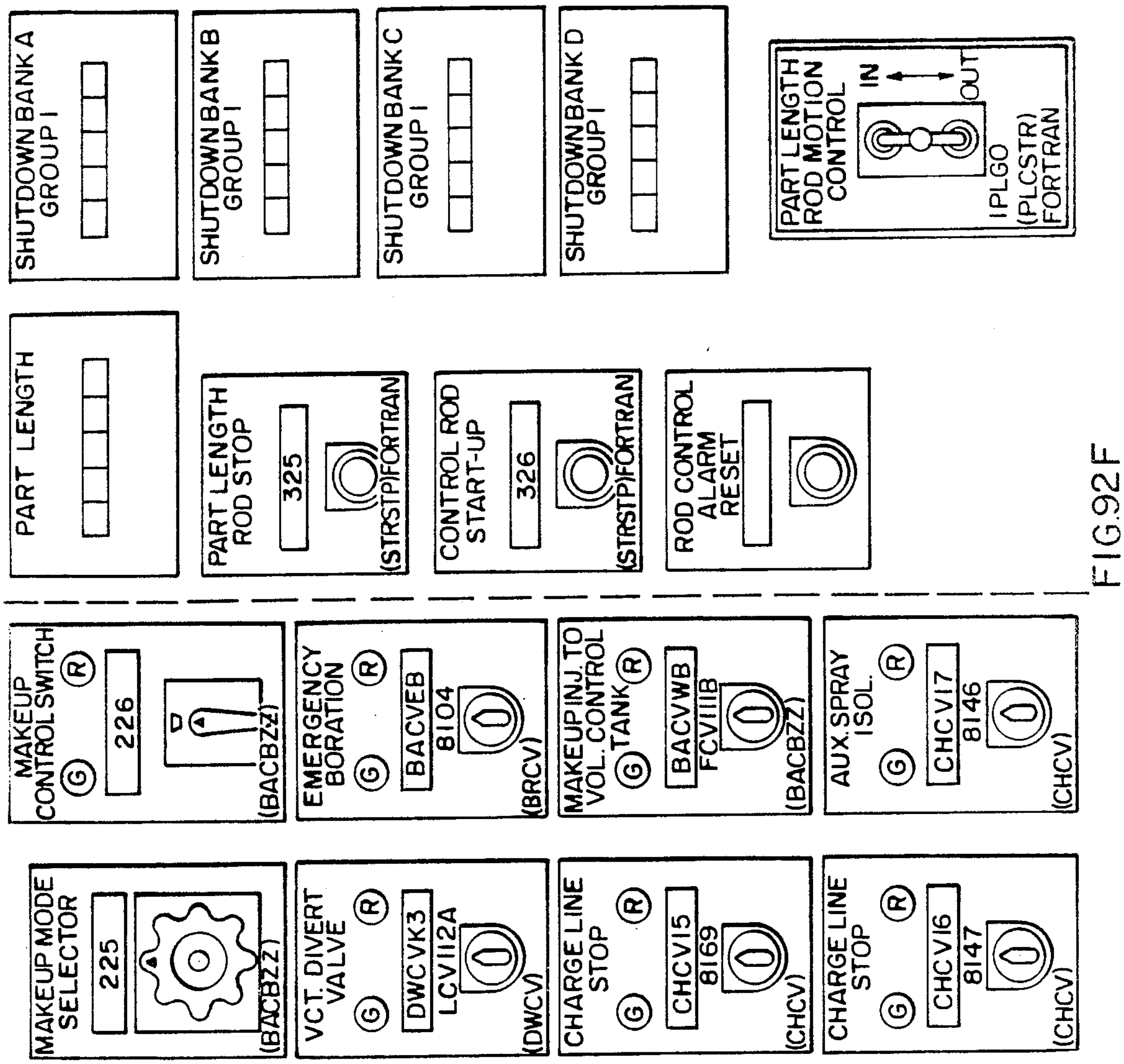
Figure 92:
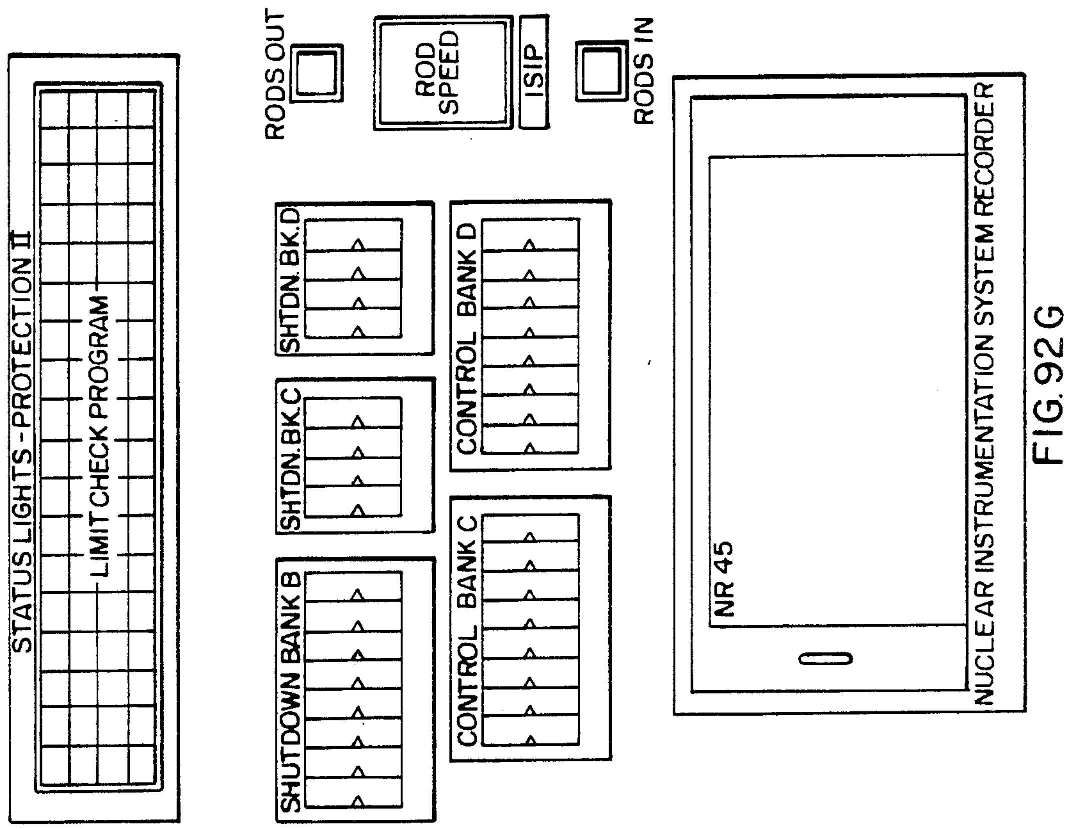
Figure 92H:
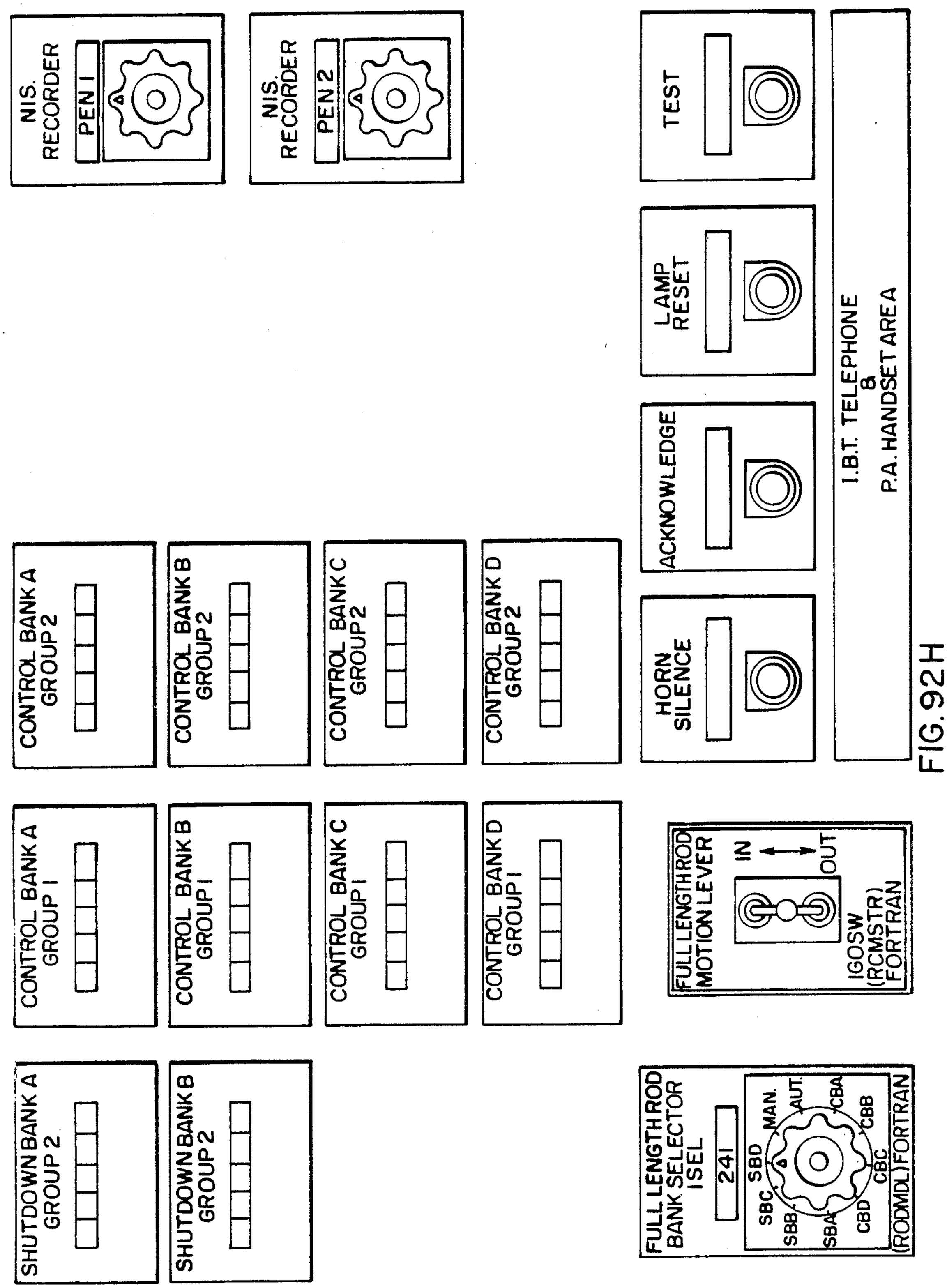
Figure 921:
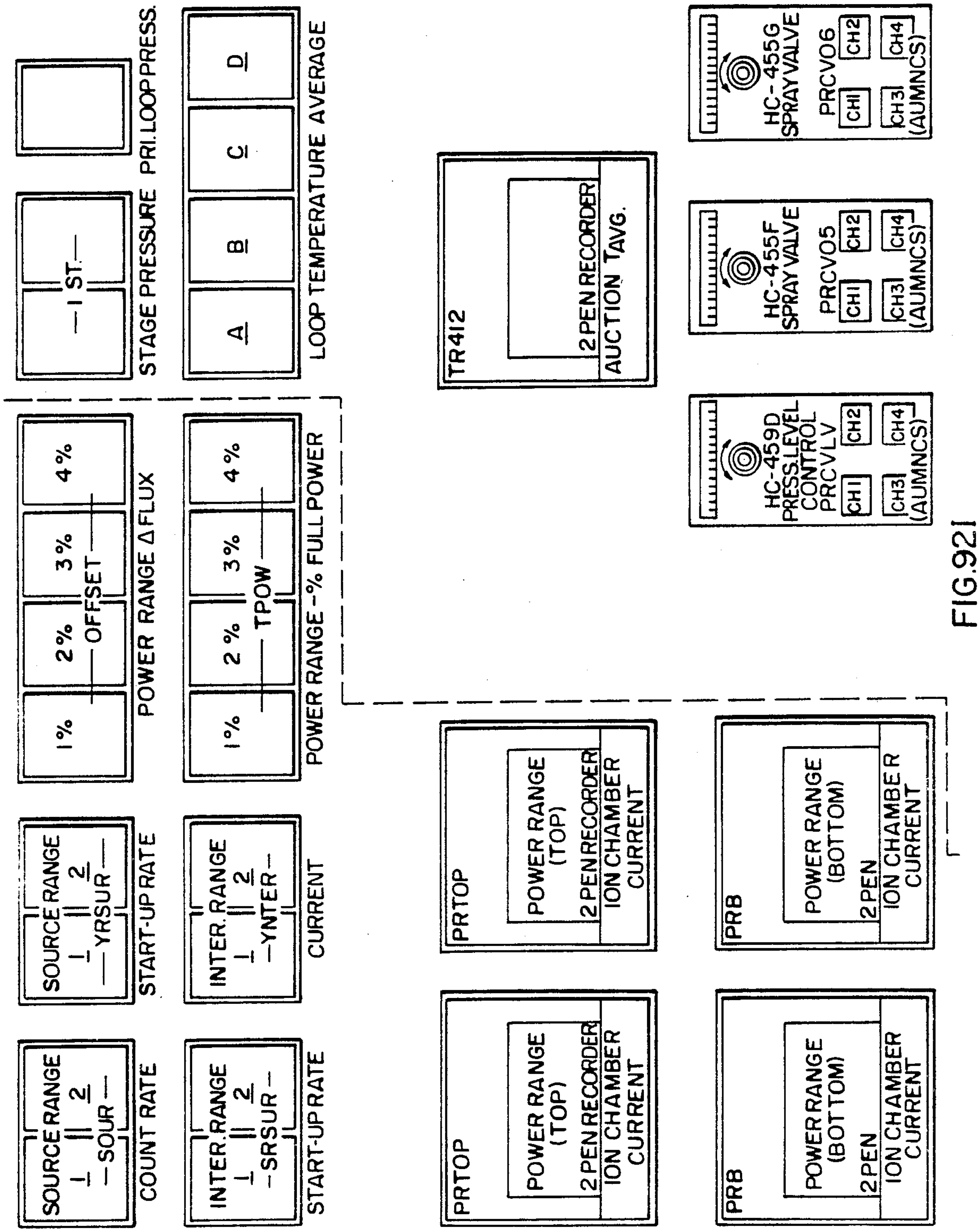
Figure 92J:
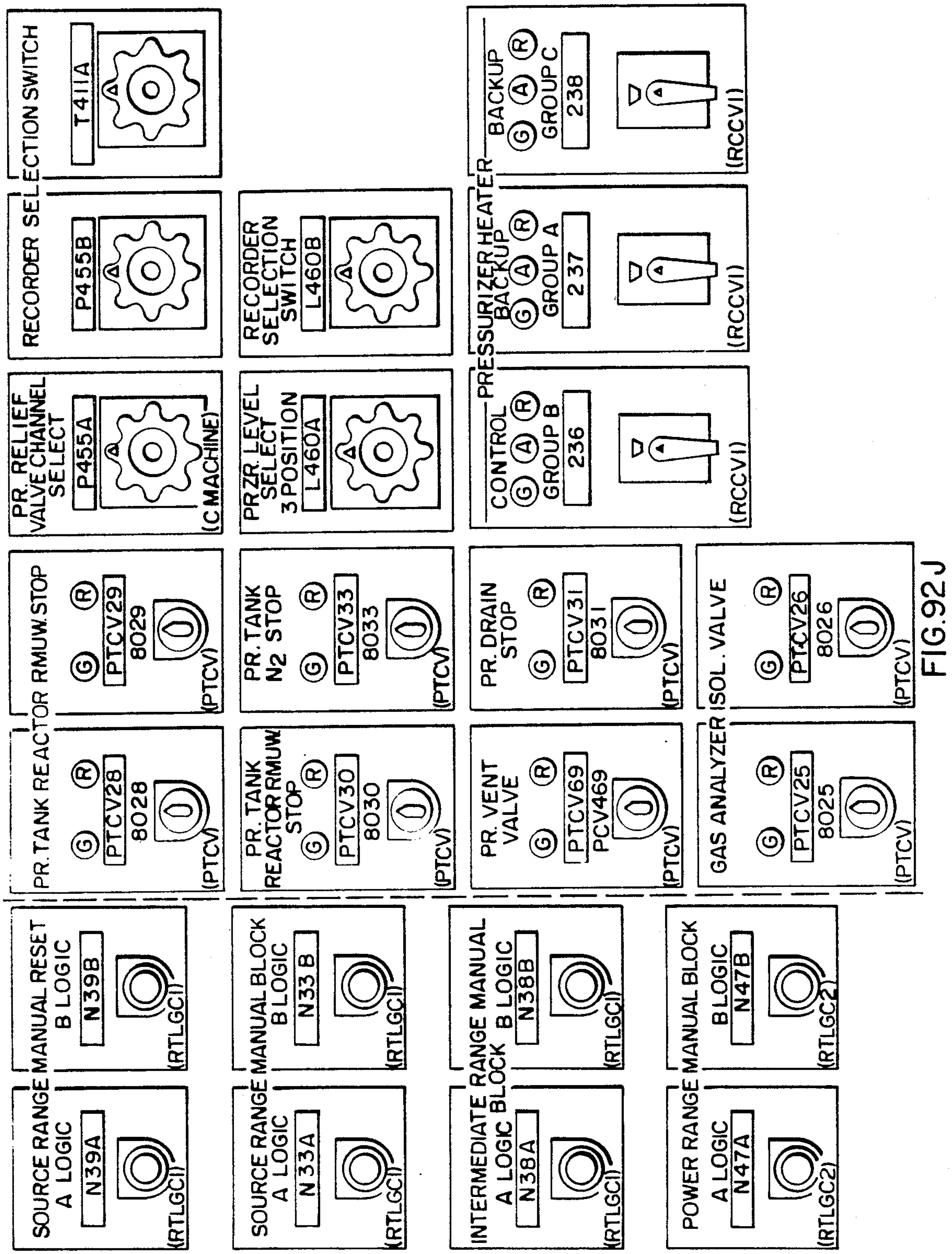
Figure 92K:
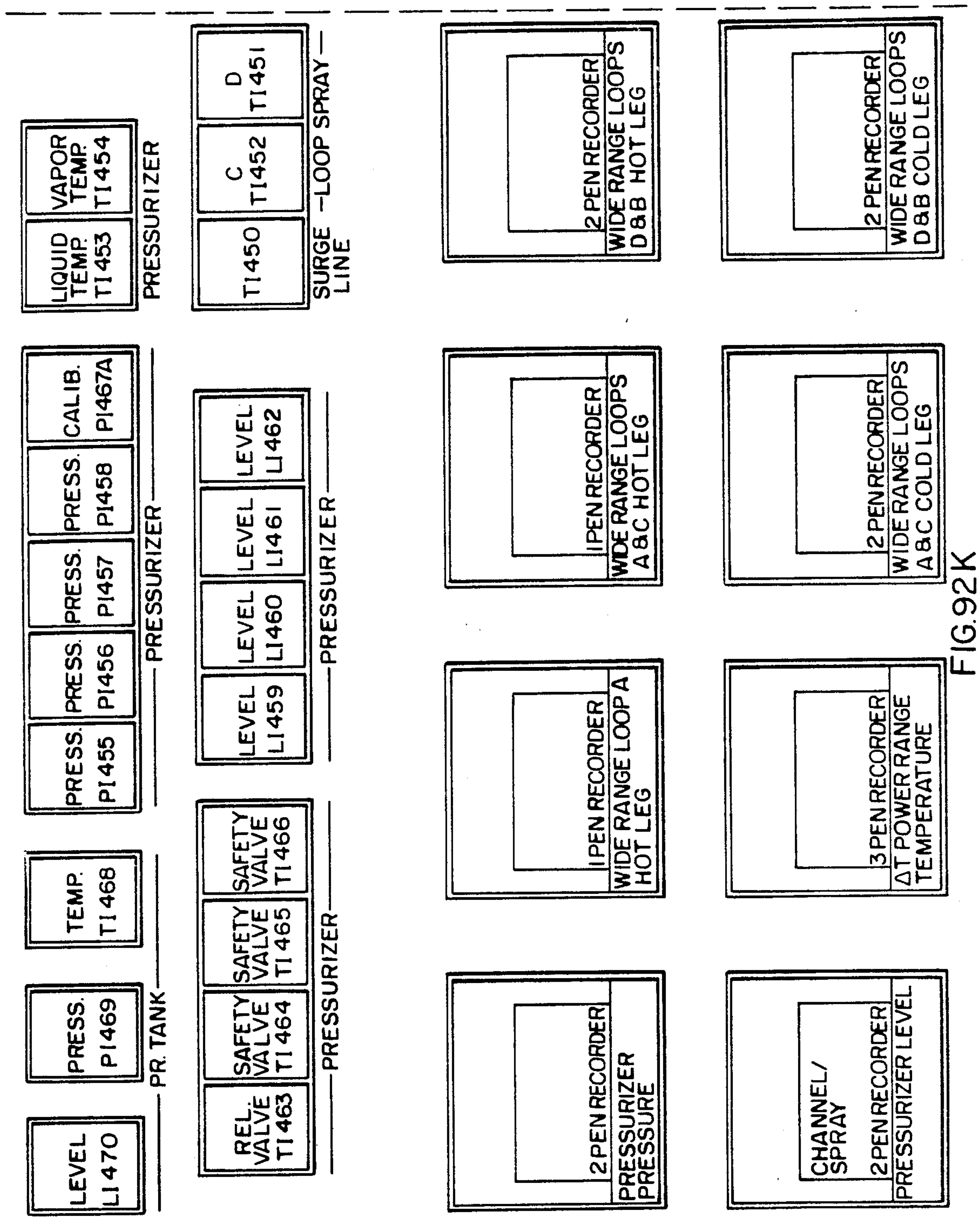
Figure 92L:
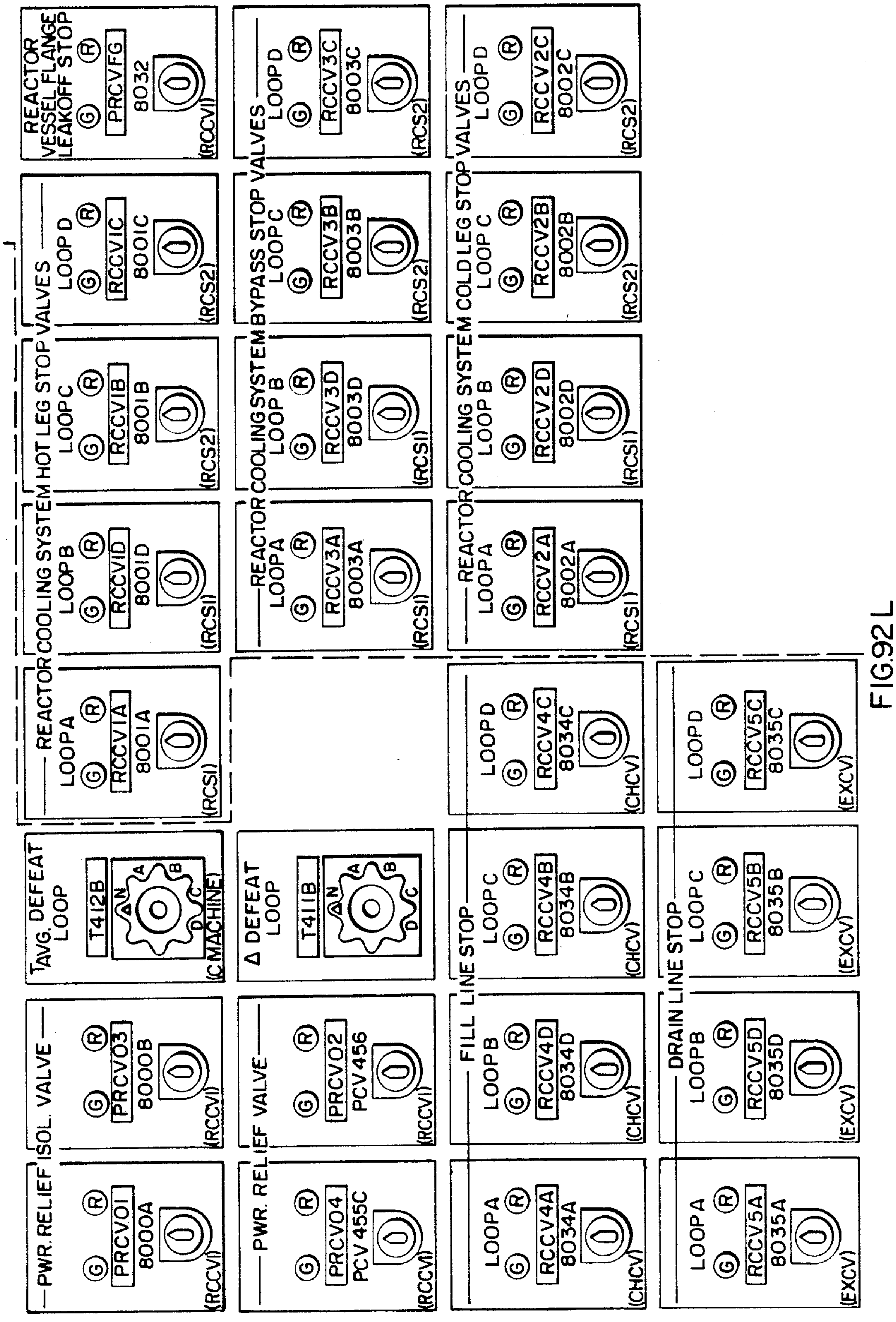
Figure 92M:
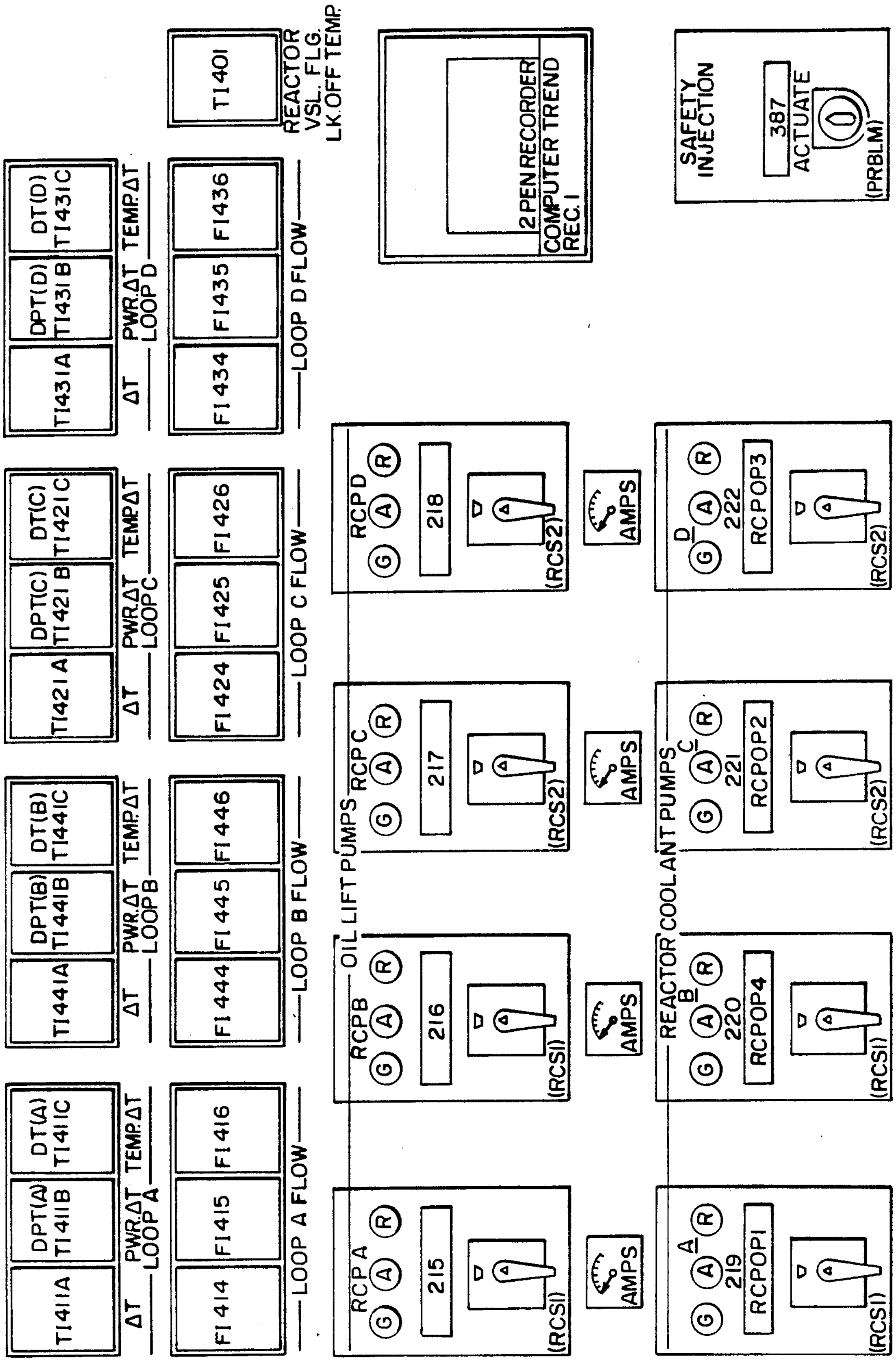

The reactor coolant system panel is represented by the arrangement illustrated in FIG. 92 and in more detail in FIGS. 92A through 92N inclusive. The boron injection system is included in FIGS. 92A and 92B. The reactor coolant pump seal system is included in FIGS. 92A, 92B, 92C, and 92D. The excess letdown system and the letdown system are included in FIGS. 92C and 92D. The makeup water system is included in 92C, 92D, 92E, and 92F. The nuclear instrumentation system and rod control for the reactor is included in FIGS. 92E through 92J inclusive. The pressurizer system is included in the panels 92I through 92L inclusive, and the reactor coolant loop control is included in FIGS. 92K, 92L, and 92M.

Figure 93A:
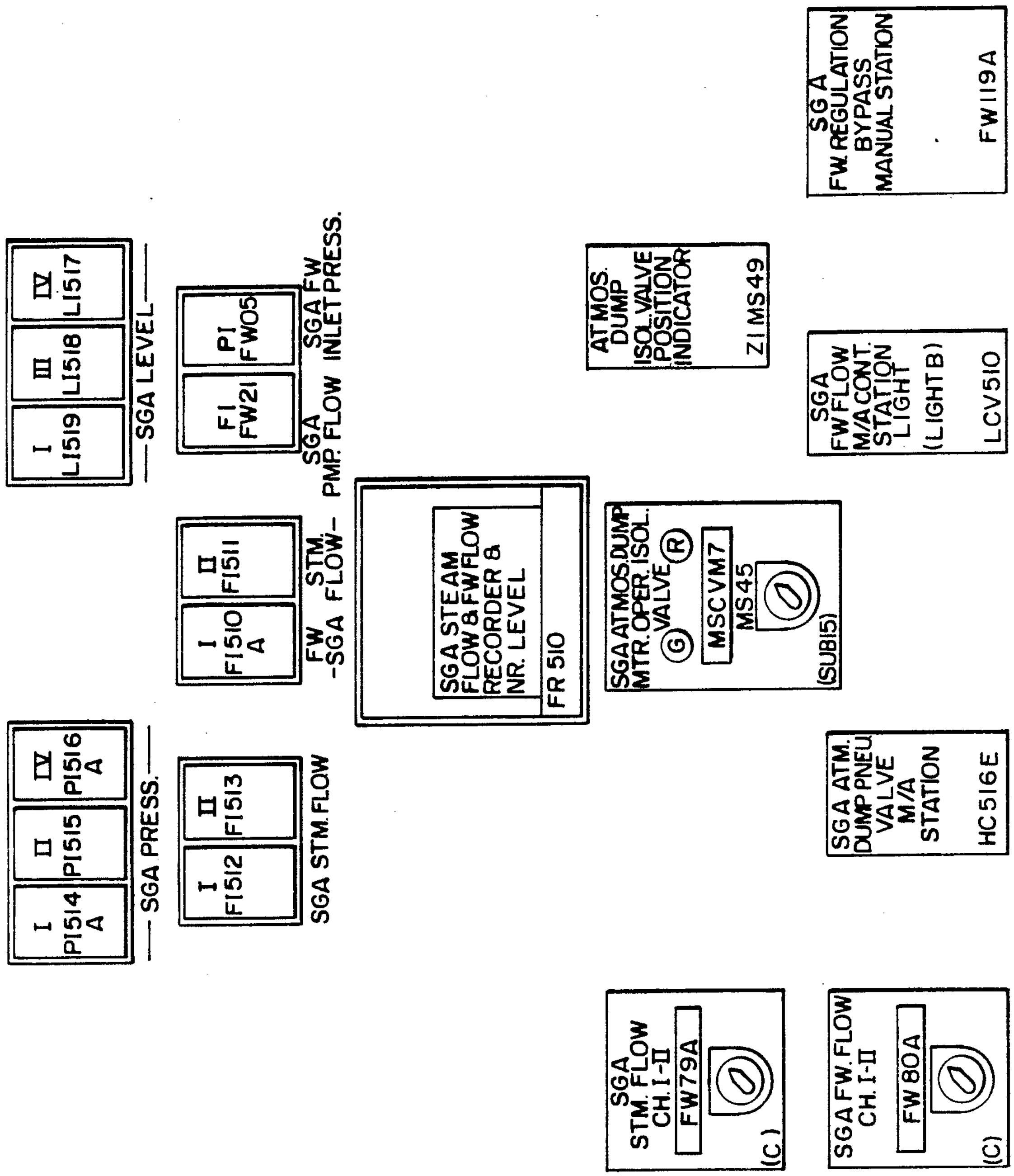
FIGS. 93A through 93D, and FIGS. 93F through 93Z when arranged according to FIG. 93 illustrate the front view of the panels for controlling and monitoring the Balance of Plant (BOP) of the simulator.
Figure 93B:
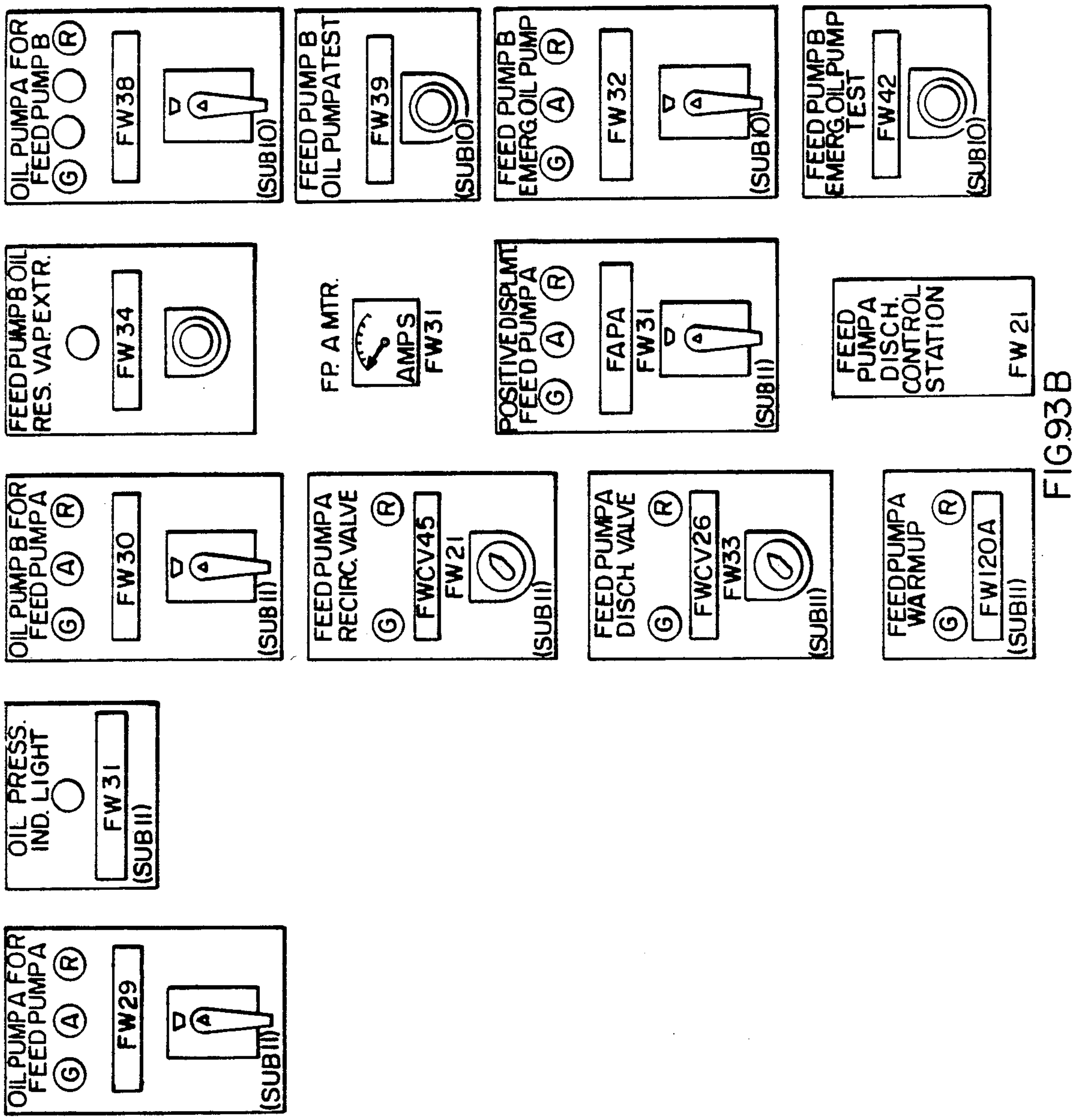
Figure 93C:
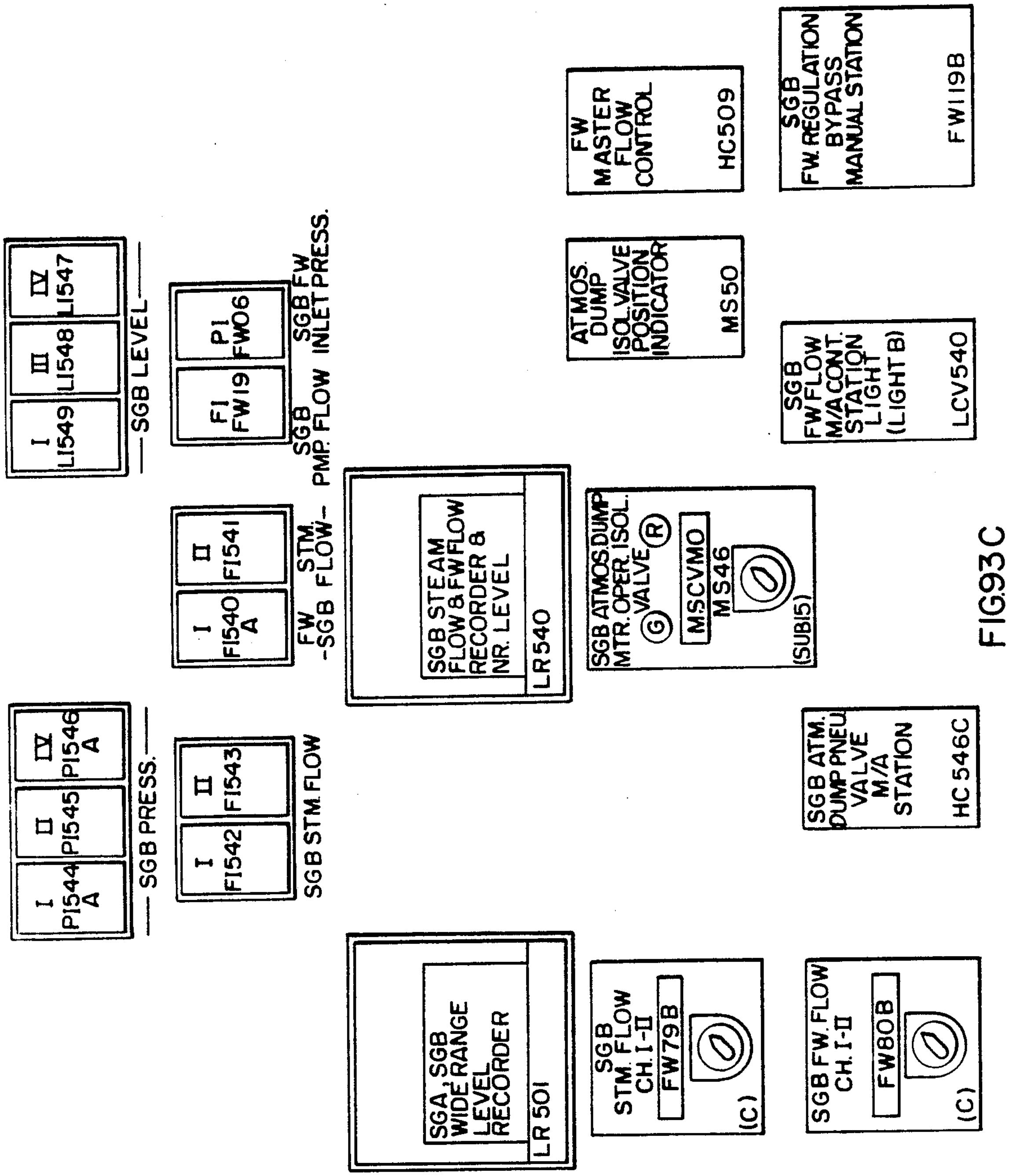
Figure 93:
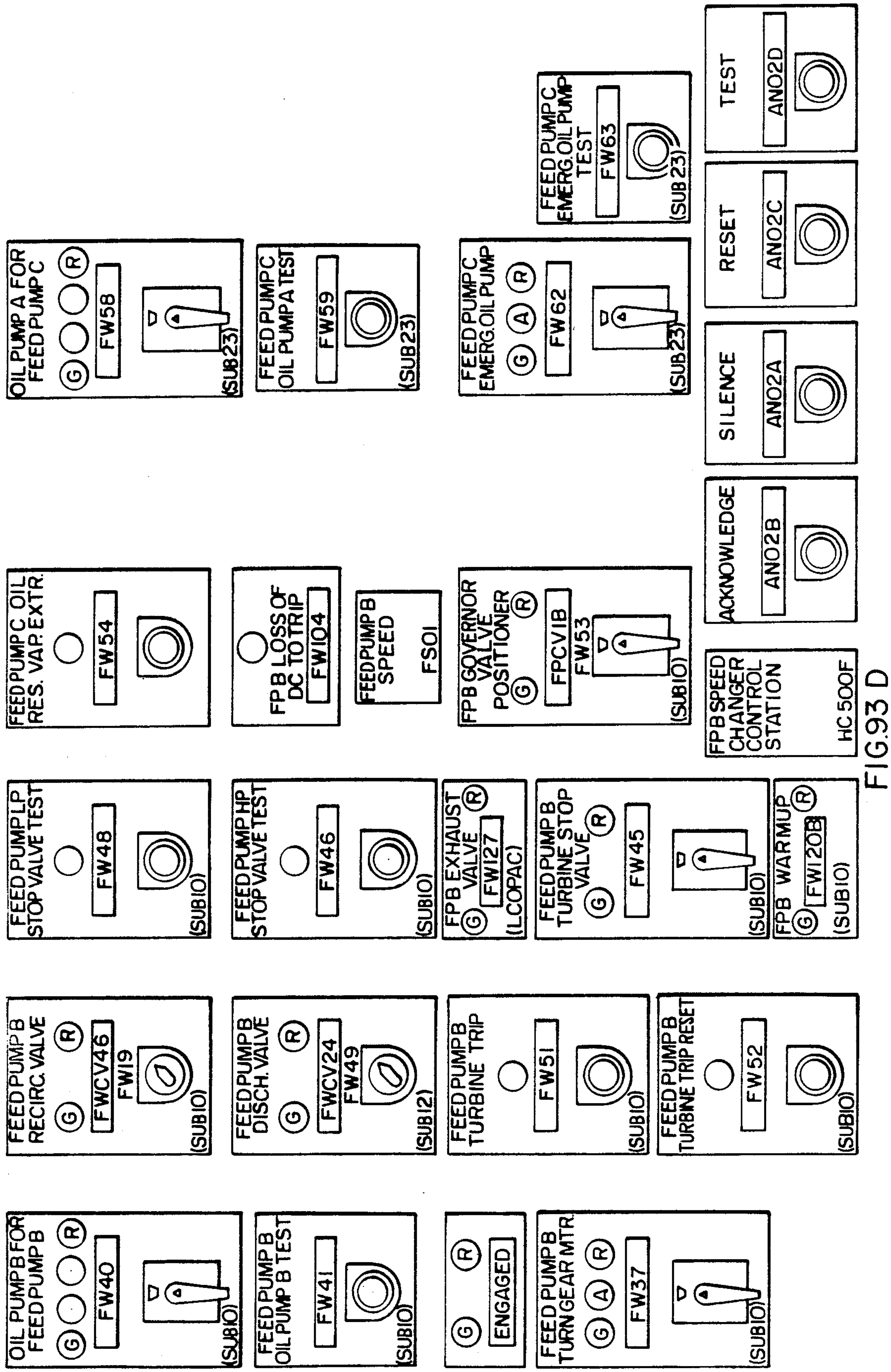
FIG. 93 illustrates the arrangement of FIGS. 93A through 93D, and FIGS. 93F through 93Z for illustrating the Balance of Plant portion of the control panel.
Figure 93F:
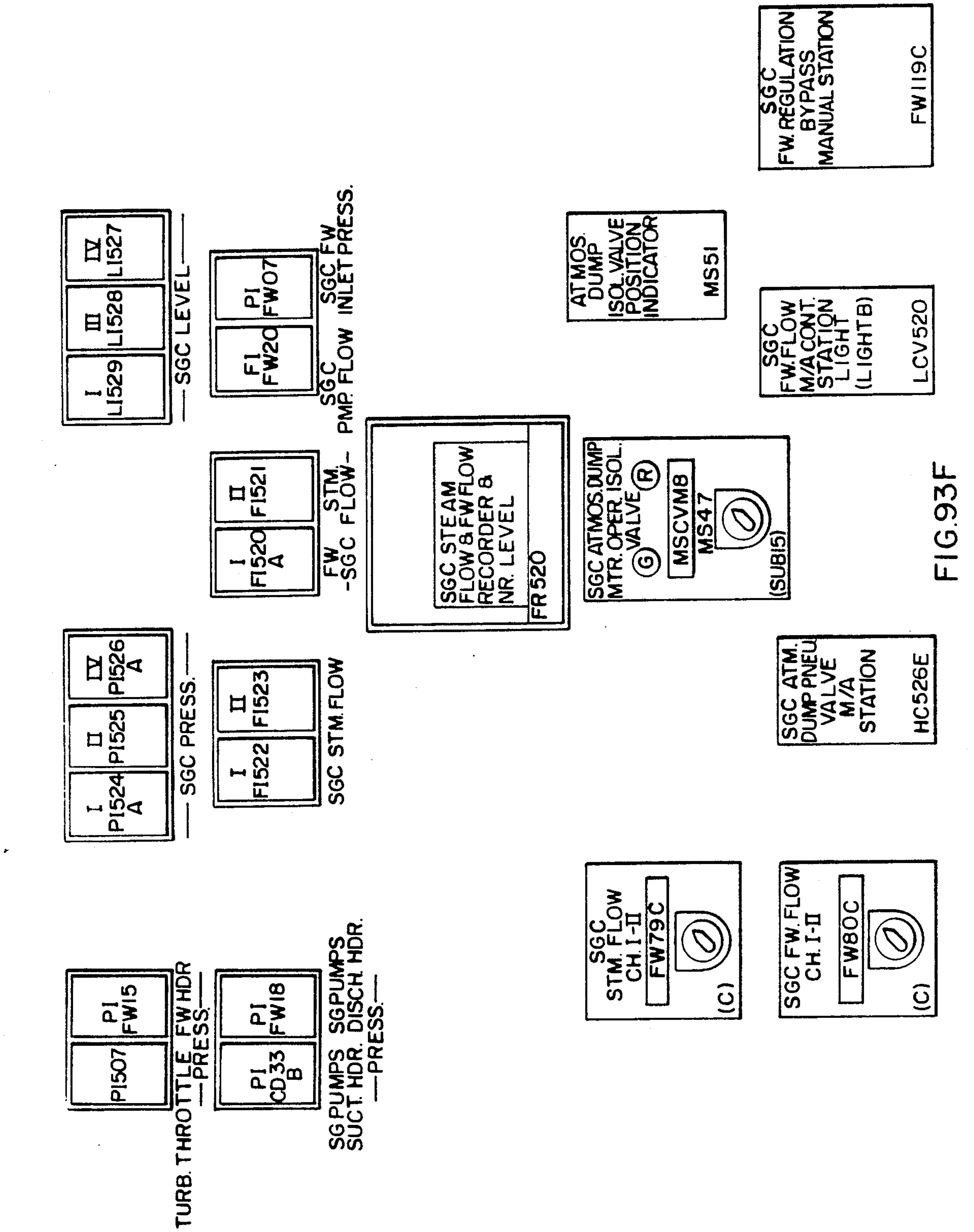
Figure 93G:
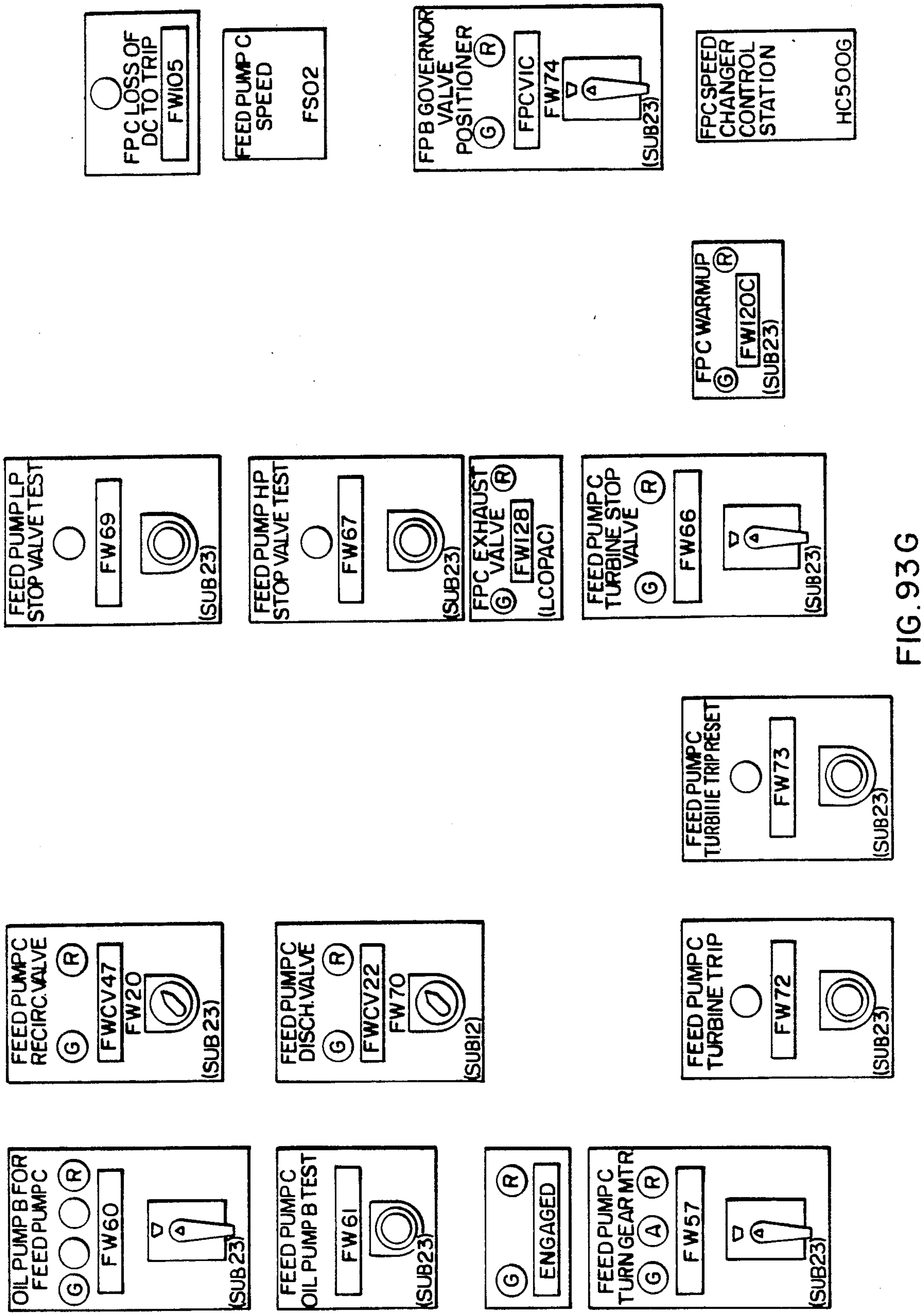
Figure 93H:
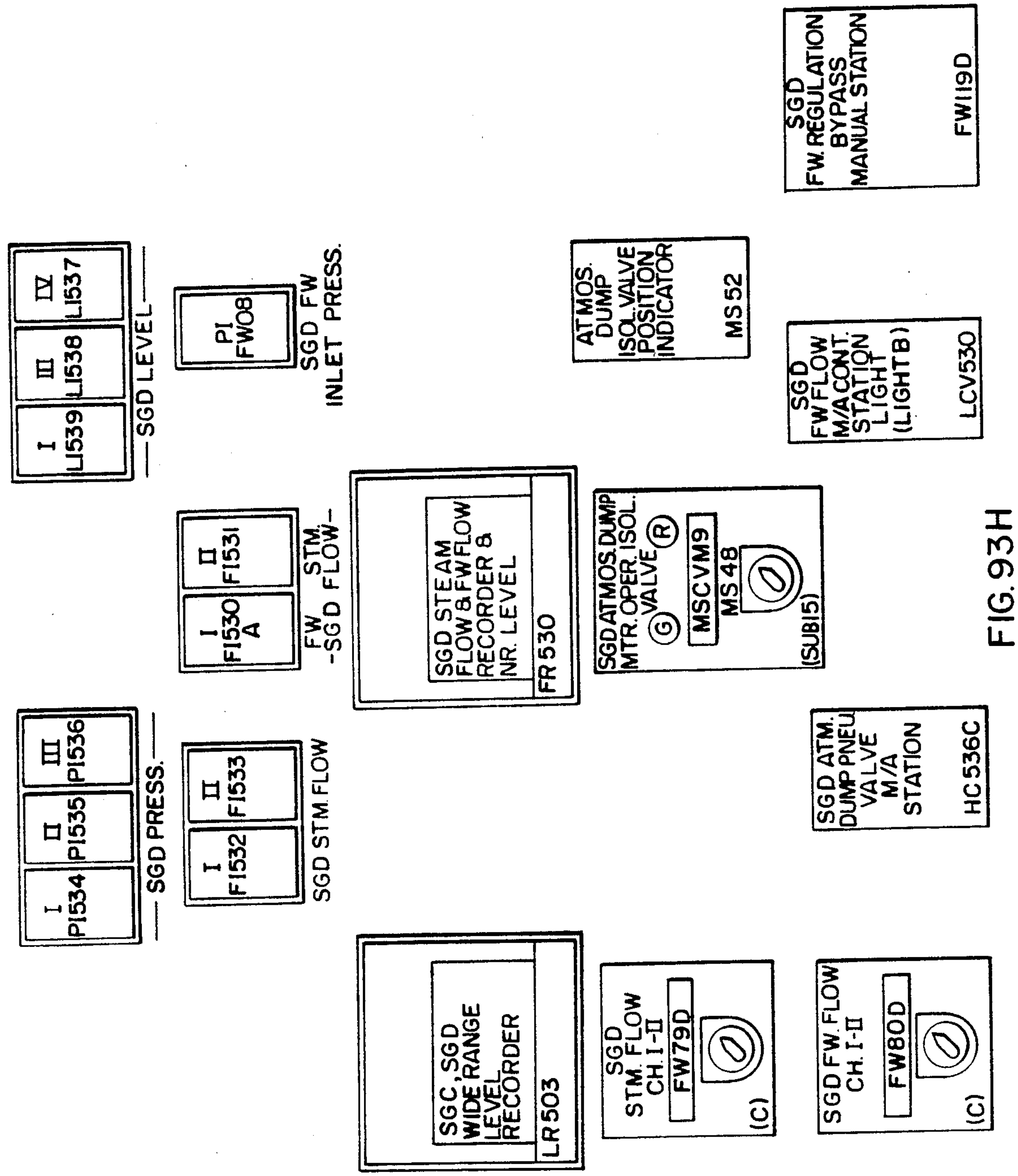
Figure 931:
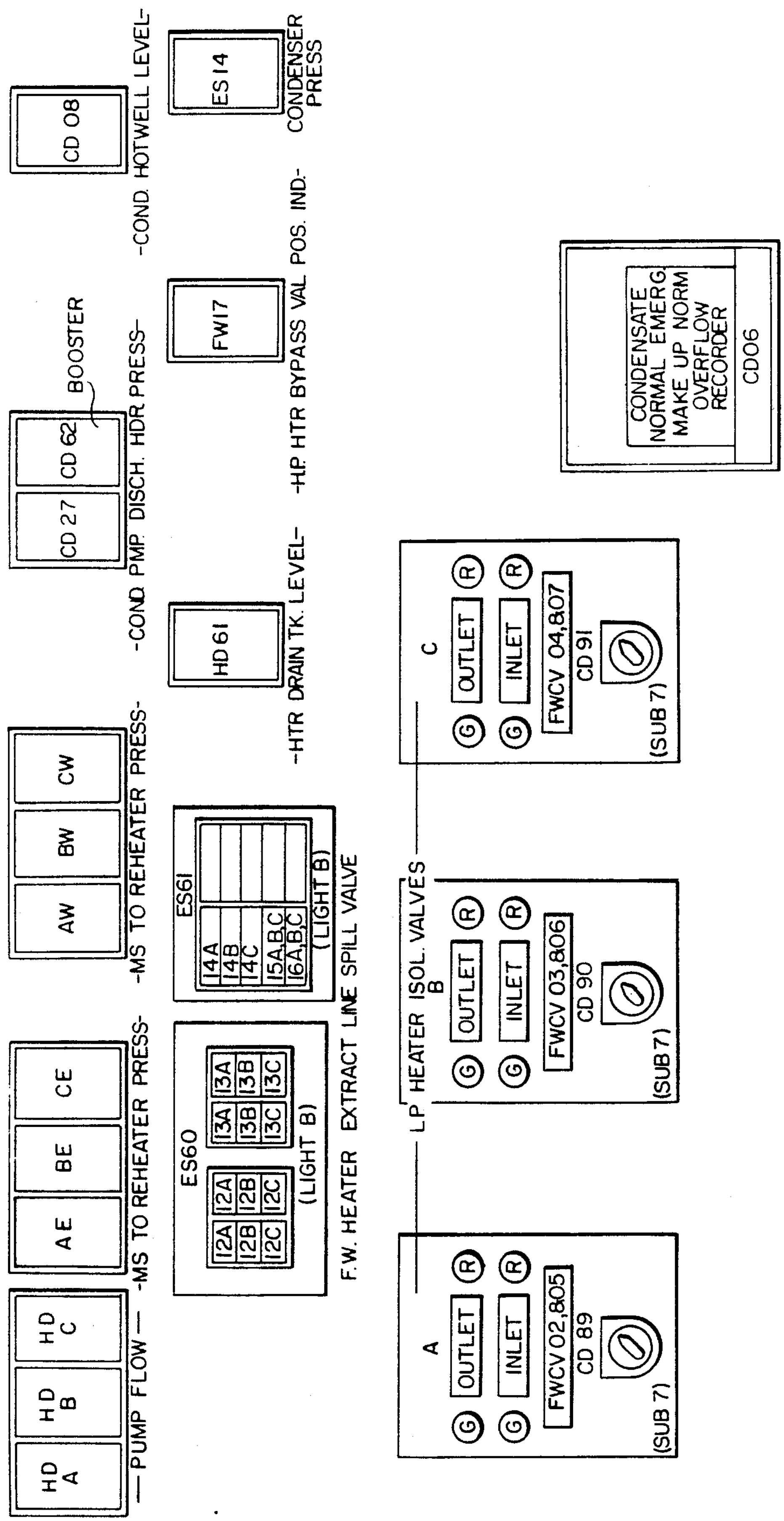
Figure 93:
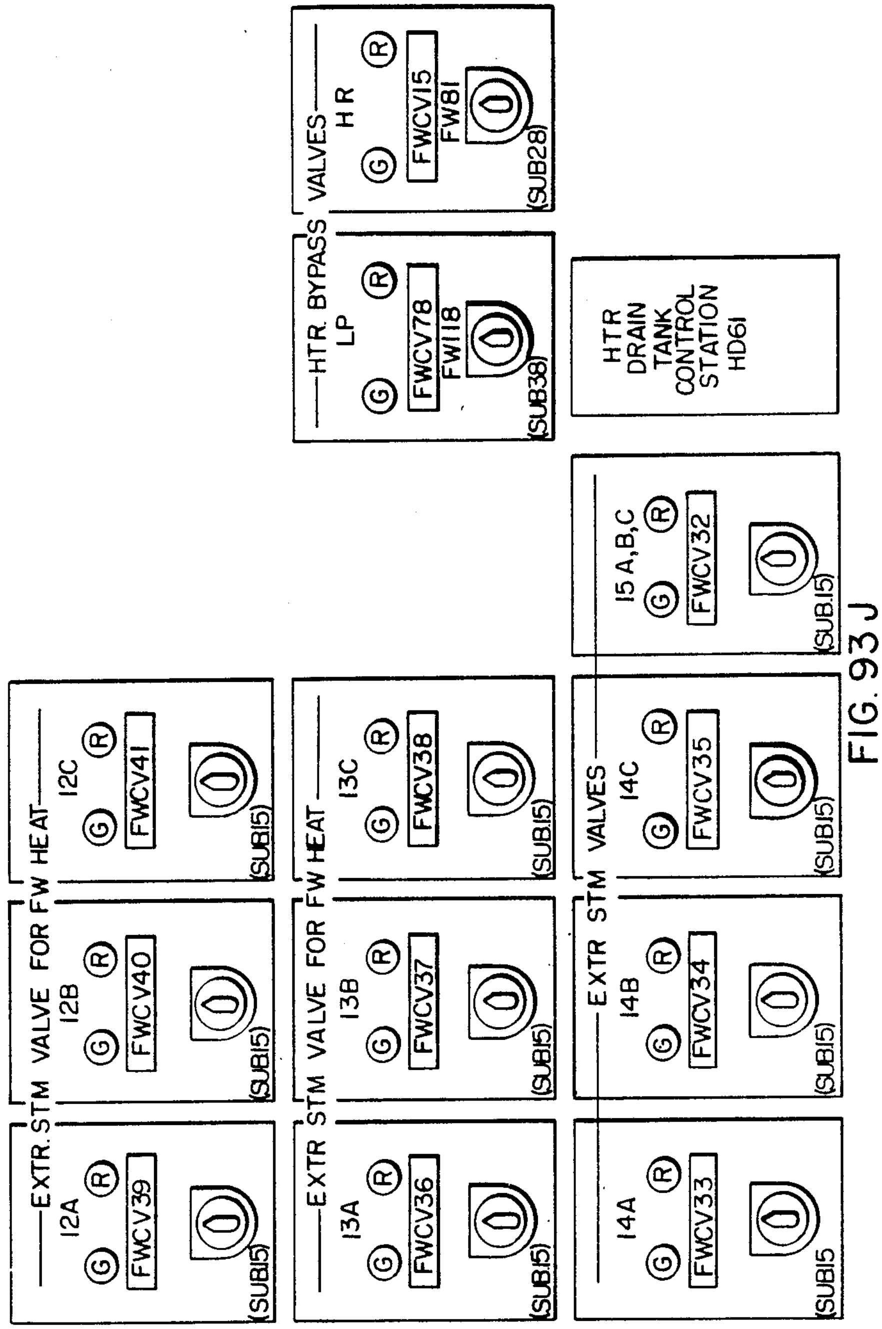
Figure 93:
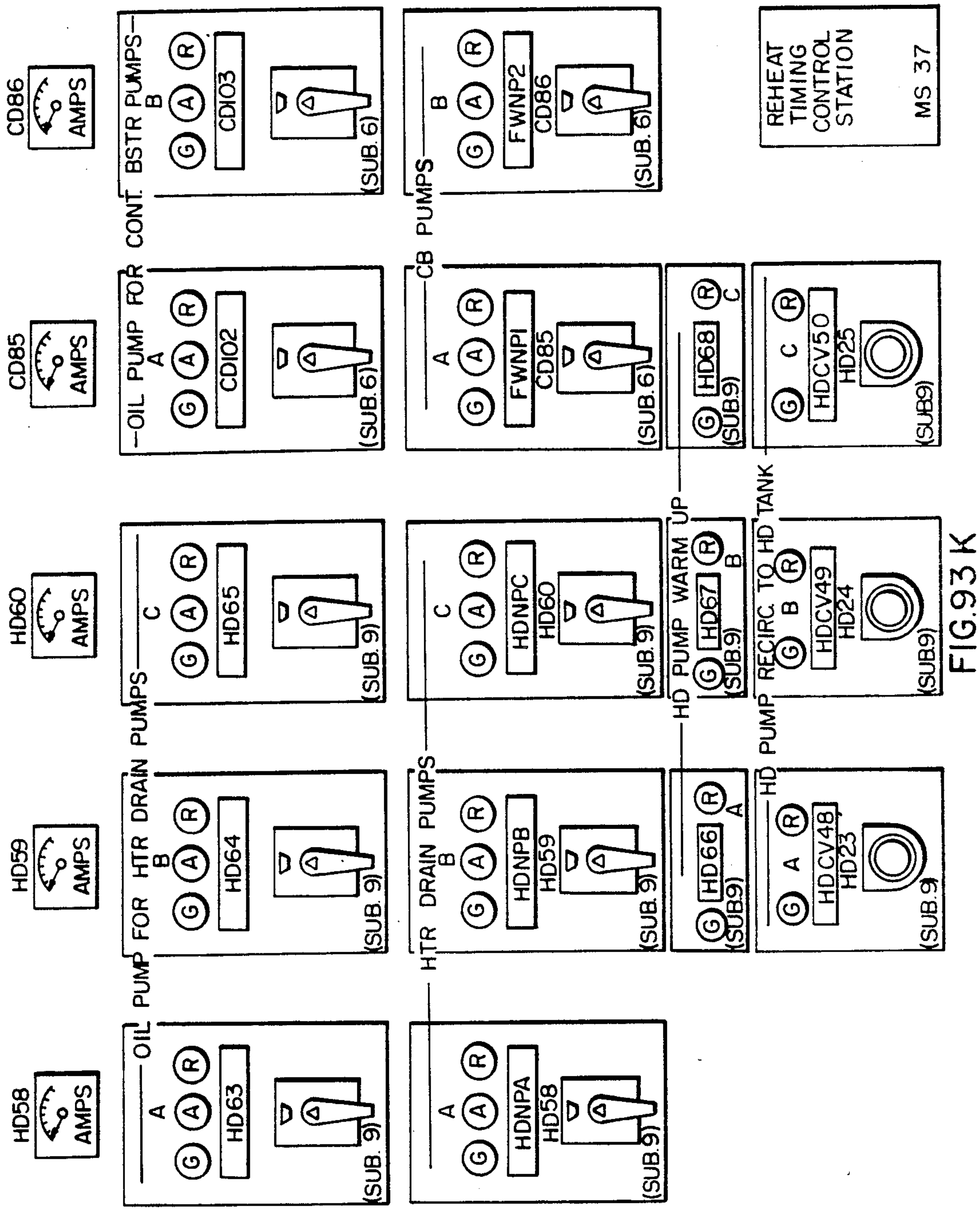

The control and monitoring devices of the secondary portion of the plant as well as the electrical panel and emergency Diesel Generator panel is part of the Balance Of Plant panel (BOP) which is represented by the arrangement of FIGS. 93A through 93Z (except 93E which is omitted) as shown in FIG. 93. For example, the main feedwater system is controlled and monitored by that portion of the balance of plant panel illustrated in FIGS. 93A through 93D inclusive, and 93F, 93G, and 93H. The condensate system is included in FIGS. 93I through 93N inclusive. The turbine control system is included in FIGS. 930, 93P, 93Q and 93R. The electrical panel including both the system and unit auxiliary portions thereof are included in the panels of FIGS. 93S through 93X inclusive; and the Diesel panel is represented by FIGS. 93Y and 93Z.

The control devices located on the panels of the simulator include manually operable electrical switches for selecting and controlling the individual components included in the various models. Such switches, with few exceptions are connected by their contacts to the "A" and "B" machines; and they include analog input, bidirectional contact inputs, direct contact inputs, multiplexed contact inputs, and hardware components not directly connected to the computer. The monitoring devices on the panels include meters, counters, recorders, and lamps which are connected to the "A" or "B" machines or the hardware; and are either analog output, two wire contact output, or three wire contact output.

In the real plant the operation of the panel control devices are implemented through relay arrangements. In the simulator, control panel interface programs are utilized to simulate the relay logic. Although the control panel interface logic has a protective nature, it is separate and distinct from the plant protective logic. The programs that simulate the control panel logic are called chains which are written in the PROGEN language and are similar to FORTRAN subroutines. Each chain is a small program that performs a specific function usually on a demand basis rather than periodically. In general, the chains are organized to form self-contained subsystems such that a minimum of interconnection between chains is required.

The control panel arrangement illustrated in FIGS. 91, 92 and 93 bear legends corresponding to the individual chains that are associated with the devices on the corresponding panels. The devices illustrated in FIGS. 91A through 91K inclusive, 92A through 92M inclusive and 93A through 93Z inclusive (except 93E), where appropriate, bear legends designating the particular chains in which such devices perform control actions.

FIGS. 95A through 95E are logic diagrams relating to various control devices on the control panels. These logic diagrams together with their associated control devices are described by way of example and have been selected to represent the various types of control devices that are located on the control panels of the simulator. For example, referring to FIG. 95A, the logic is shown for the feed pump B low pressure stop valve control test pushbutton FW48 renders the bi-direct contact input B168BP "true"; and the non-operated condition of the reset pushbutton FW52 renders the contact output B1942T "false" to provide an input through the "NOT" gate P2 to satisfy two out of the three inputs to the "AND" gate P3 which are required to provide a positive or "true" output B1682T for the test pushbutton of the steam generator feed pump turbine B low pressure stop valve to the B machine. When the contact output B1873V, which is the contact output for the "stop valve" control switch for the steam generator feed pump turbine B is "true", all three inputs to to the "AND" gate P3 which are required to provide a positive or "true" output B1682T for the test pushbutton of the steam generator feed pump turbine B low pressure stop valve to the B machine. When the contact outpu B1873V, which is the contact output for the "stop valve" control switch for the steam generator feed pump turbine BV is "true", all three inputs to the AND gate P3 are true to provide the previously mentioned output for computer entry. However, this "true" condition does not occur unless the switch for the feed pump turbine B stop valve FW45, which is a two position switch that has a spring return to the off position, is in its raised position to render bi-direct input B187BA "true", which is one of the four inputs to AND gate P3. The conditions of the AND gate P3 are not satisfied unless one condensate pump is running which is represented by the input FWZCDX; contact output B1672O is true; and contact output B1862O is true. The output B1672O is true when the steam generator B recirculating valve FW19 is open; and B18620 is true when turbine exhaust valve for the feedwater pump B FW127 is open. With all four conditions for the AND gate P3 satisfied a temporary logical variable TLO769 is "true" which causes the flip-flop gate P4 to provide a "true" output for the stop valve FW45.

Figure 95B:
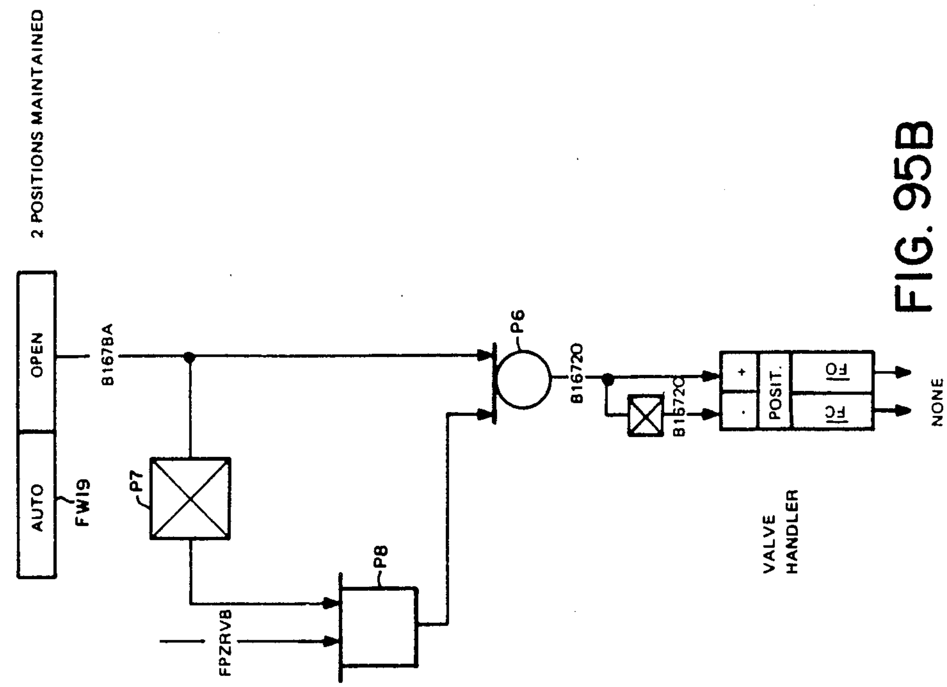
FIGS. 95A through 95E illustrate logic diagrams relating to control panel devices.
Figure 95A:
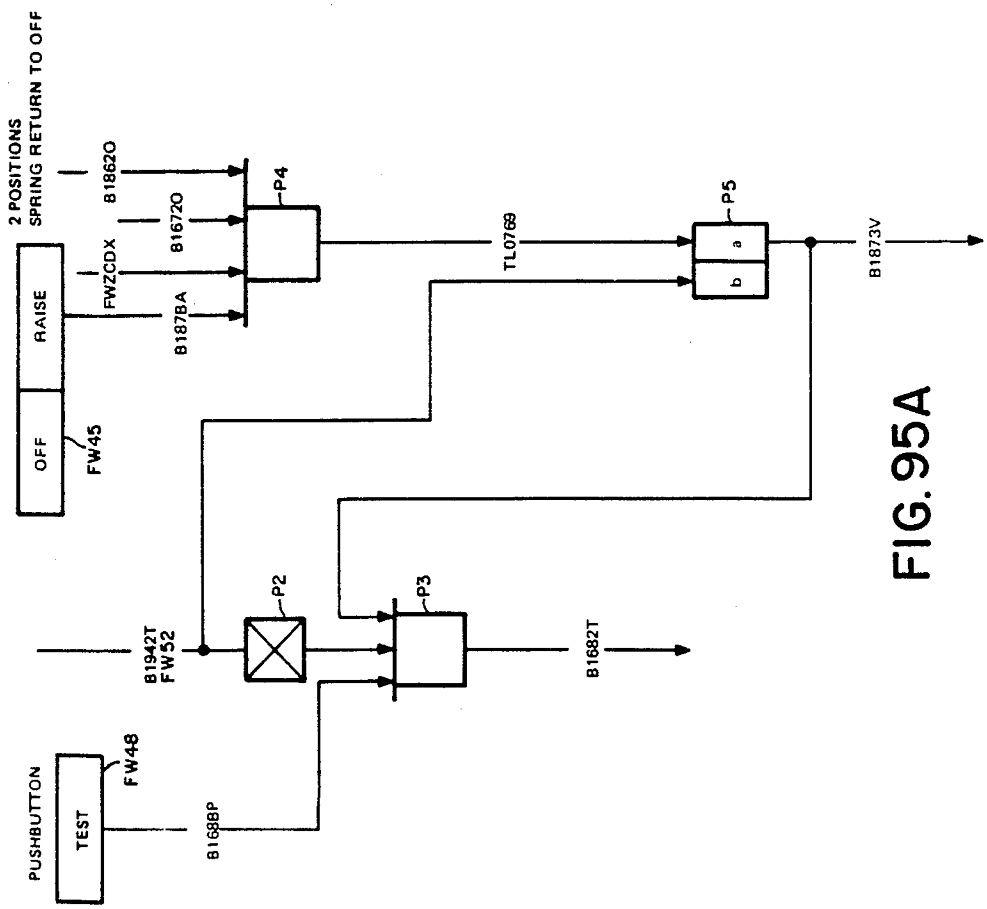

Referring to FIG. 95B, as another example of control panel interface logic, a two position maintained switch FW19 for the feed pump B recirculating valve is diagrammed. When the switch FW19 is operated to its open position, the bi-direct contact input B167BA for the steam generator B recirculating valve is "true", which provides an input to OR gate P6 to render contact output B1672O "true". This operates the valve handler program VCHAND to position the valve to its fully open OF position. If the contact output B1672O is false or minus, the valve handler program is operated to its fully closed FC position. When the switch FW19 is in its "auto" position, B167BA is "false", which causes an input through NOT gate P7 to AND gate P8. If the input FWZRVB which is the symbol for opening the recirculating valve feed pump B is true, then the gate P8 causes the valve handler to operate in the same manner as when it is manually operated to its open position.

Figure 95C:
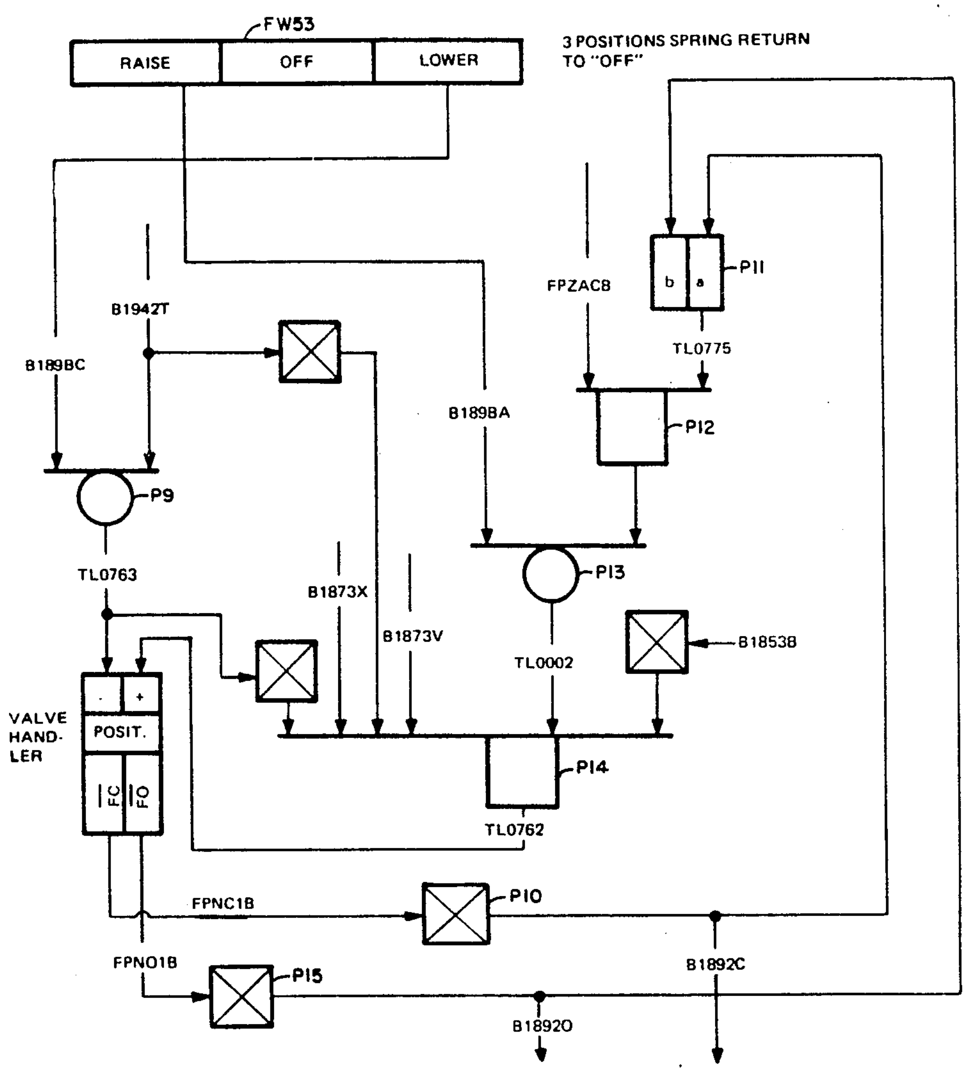

An example of another type of switch utilized on the main control board is a three position switch with a spring return to its "off" position. Referring to FIG. 95C, which diagrams the control panel interface logic for the feed pump B governor valve positioner FW53, the operation of the switch to its "lower" position causes bi-direct contact input B189BC to be "true" that results in the temporary logical TLO763 to operate the valve handler towards its closed position FC. If the valve FW53 is fully closed, nothing further happens. If it isn't fully closed FPNC1B is "false" and NOT gate P10 results in a temporary logical TL0775 through flip-flop P11 to be input to AND gate P12. If the feed pump B is on, automatic control variable FPZACB is true which causes an input to OR gate P13 through AND gate P12. This provides a temporary logical TL0002 as one of the inputs to AND gate P14, which causes temporary logical TL0762 to operate the valve handler for raising the governor valve FW53. When the feed pump valve is fully open, FPN01B is in its "false" condition resulting in NOT gate P15 to cause the flip-flop P11 to operate to prevent the output of the logical TL0775. Also, when it is fully open a contact output B18920 is "true" to indicate the position of the valve on the control panel. Similarly when the valve is fully closed, output B1892C causes the indications on the panel to represent the valve as being closed. The AND gate P14 has a number of inputs which must be satisfied in order to operate the valve handler to open the governor valve FW53. The output B1873X and B1873V must be "true" which indicates that a special condition must exist for the feed pump turbine B stop valve; also, that the switch FW53 is not operated to its "lower" position, that the output contact B1942T for the feed pump turbine B reset button is not operated. Further, the contact output B1853B for the steam generator feedwater turbine turning gear must be unoperated.

Figure 95D:
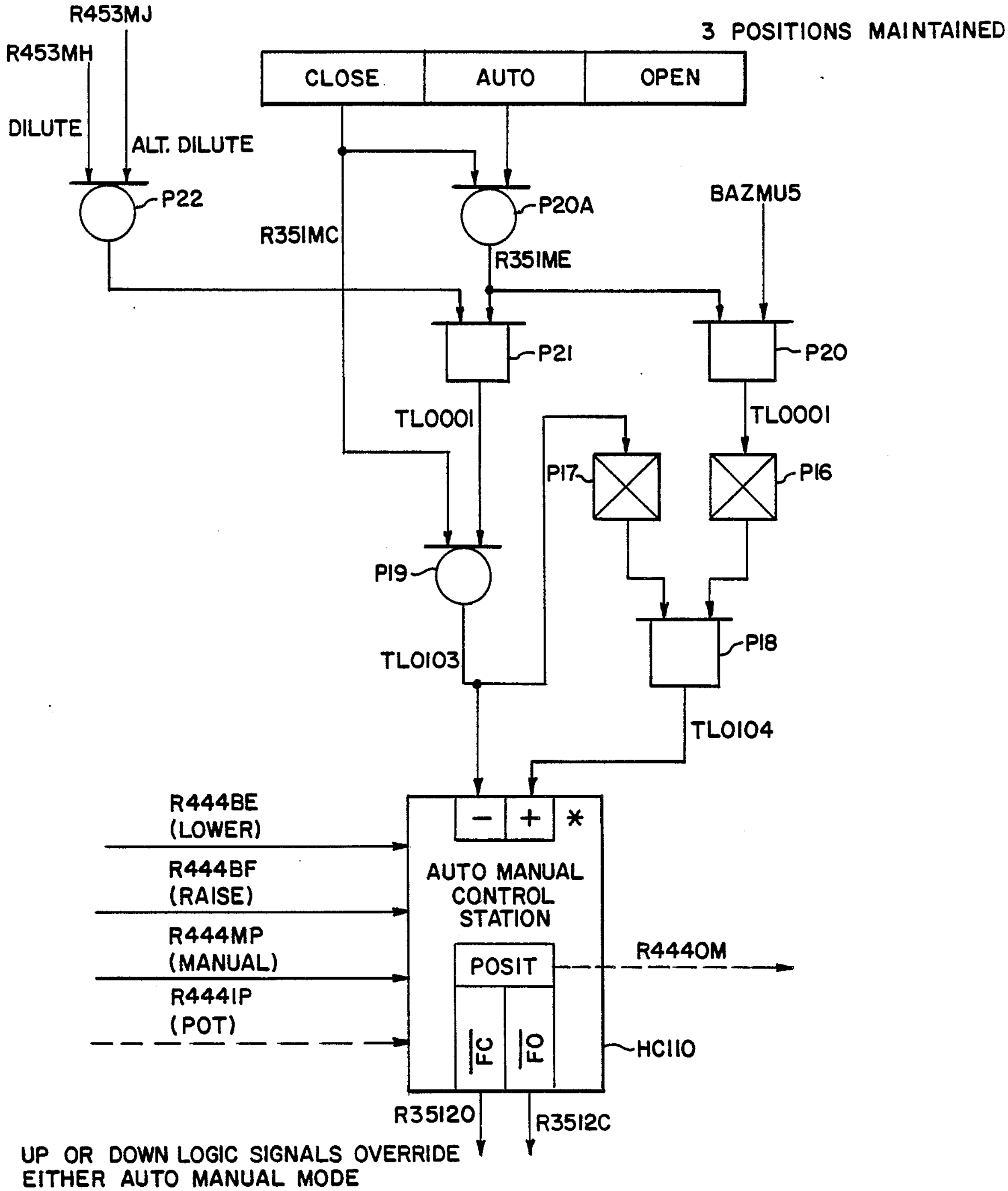
Figure 95E:
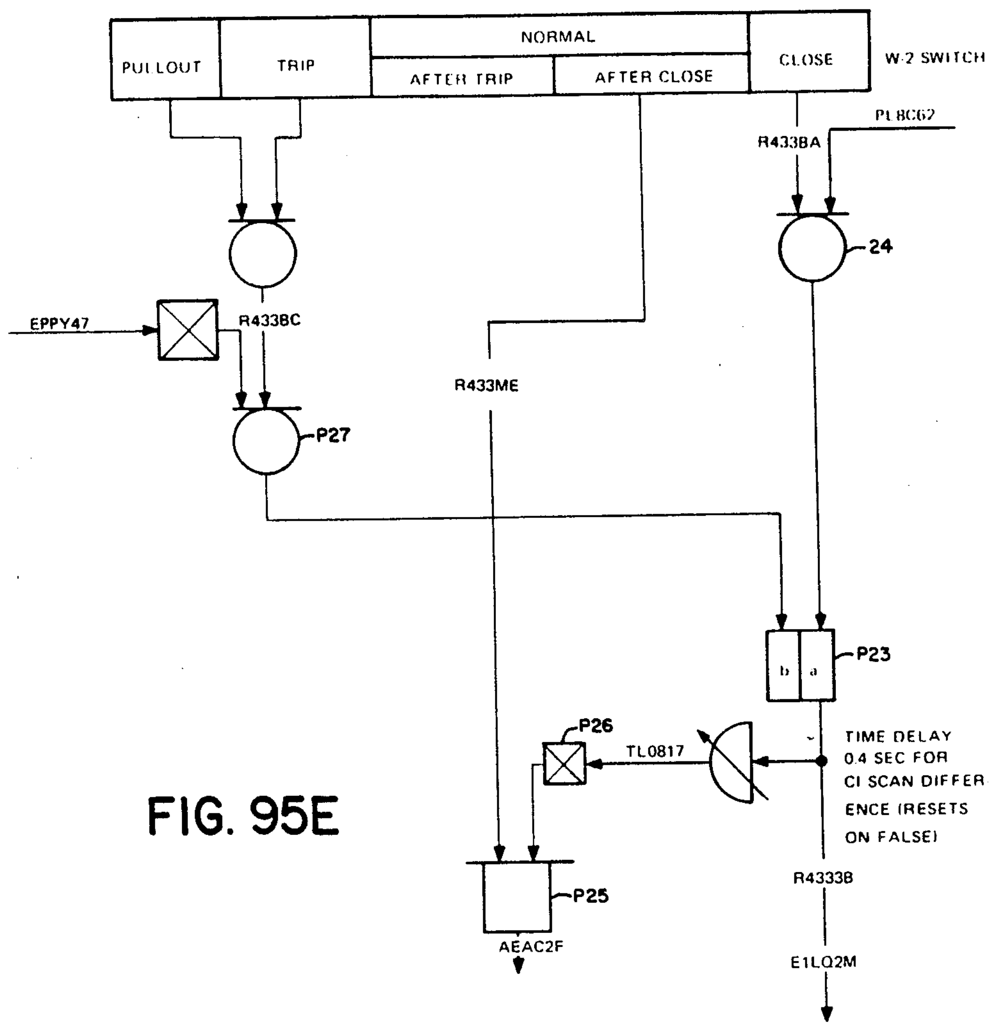

Referring to FIG. 95D, an example of a three position maintained switch together with an auto-manual control station where the up or down logic signals override either the automatic or manual mode of control is diagrammed and relates to a switch for an air operated valve FCV110A (see FIG. 92D) for controlling boric acid injection to the blender. The logic is also concerned with the operation of the auto-manual control station HC110. When the valve is in its "open" position, and NOT gates P16 and P17 do not have an input thus satisfying the condition for AND gate P18 which provides a temporary logical TL0104 to auto-manual control station for valve HC110 (see FIG. 93C).

When the valve switch is operated to its "close" position, multiplexed contact input R351MC is true resulting in an input to OR gate P19 to produce temporary logical TL0103 for operating the valve handler through the auto-manual to its closed position. Also, this temporary logical TL0103 blocks the AND gate P18 through the NOT gate P17. Further, the position of this valve to the "close" position causes an input to OR gate P20 for rendering R351ME which is the logical for the boric acid injection to the blender for automatic close "true" which, together with an input from BAZMU5, which is a reactor coolant makeup control, results in deactivation of temporary logical TL0001 to block the input to AND P18 through NOT gate P16.

When the lever is moved to the "auto" position, multiplexed contact input R351ME is "true" for AND gate P21 as well as P20. This renders the valve subject to the control of variable BAZMU5 previously mentioned and the output of OR gate P22. The gate P22 provides an output in response to the multiplex contact input R453MH which is the dilute makeup mode selector switch and R453MJ which is the makeup mode selector switch for alternate dilute. When the auto-manual control station HC110 is in its auto position, it is under control of bi-direct input contacts R44BE and R444BF which are the logicals for lowering and raising the boric acid blend respectively. The logical R444MP is a multiplexed contact input for effecting the control station in its manual position. The logical R44IP is an analog to digital control which is responsive to the input of the potentiometer on the auto-manual control stations. The output from the valve handler portion of the auto-manual control station represented by logical R440M is a digital to analog logical.

Referring to FIG. 94/5, a switch for the centrifugal charging pump B (see FIG. 92C) has a lever which is operable to three physical positions, trip, normal, and close. The pulling out of the lever indicates that the pump is out of service and the switch is then unable to operate it. The normal position actually includes two positions, an after trip and an after close. When the lever is released after a trip, its condition is normal "after trip"; and when the lever is released after close, its position is normal "after close". Upon operating the switch to its closed position, for starting the centrifugal charging pump B bi-direct contact input R433BA is "true" which operates the flip-flop P23 through OR gate P24. This renders contact output R433B true which renders contact output EILQ2M "true" to indicate that the centrifugal charging pump B is operating. One input of AND gate P25 is satisfied when there is no temporary logical TL0817 input to the NOT gate P26. For 4/10 of a second after the switch is returned to its normal position, P26 is blocked. After this period of time contact output AEAC2F trips the charging pump C. This is caused by the multiplexed contact input 433ME to be "true" when the switch is in its normal, "after close" position. When the lever is operated to its "trip" position, bi-direct contact input R433BC is "true" to operate the flip-flop P23 through OR gate P27 which results in the temporary logical TL0817, R4333B and EILQ2M to be false. The flip-flop P23 is also operated to its b position when there is no power through bus 47 as indicated by the input EPPY47.

Associated with the control panels of FIGS. 91 through 93 are several illuminable monitoring or annunciator panels for informing the operator of specific existing conditions in the plant, as well as status lights for switches, valves, pumps and so forth.

For example, in referring to FIG. 91L, the engineered safeguards panel ESS is an annunciator panel for guard system and reactor protection, the individual lights for which illuminate when the condition exist corresponding to the legend thereon. In addition to the annunciator lights of FIG. 91L, there are annunciators for auxiliary systems, steam generators, and miscellaneous devices which not shown in detail.

Also, by way of example, the reactor coolant system panel of FIG. 92 includes an annunciator panel 92N for conditions relating to nuclear instrumentation and rod control. In addition, and associated with the panel of FIG. 92 are annunciators for the reactor coolant system and the reactor coolant makeup system; as well as first out annunciators, which are not shown in detail herein. Associated with the balance of plant panel BOP are annunciators for steam generators, feedwater, condensate, turbine, main generators and auxiliary power similar to those associated with FIGS. 91L and 92N for the systems concerned with such panel. The annunciators are illuminated and audible warning devices sounded through closed contact outputs CCO's from the A or machine and are operated through panel interface logic in a manner similar to the panel interface logic for the control devices.

BALANCE OF PLANT LIMIT CHECKS (SECLIM)

The status and monitor lights, annunciators, and plant limit switches that are associated with the secondary side of the nuclear steam generating system of the particular plant simulated by the present embodiment or that plant portion termed BOP are simulated with use of a subroutine SECLIM. In this subroutine, the BOP process variables are limit checked for the purpose of annunciation and protection. The inputs to this program include plant pressures, flows, levels, temperatures, and speeds. The outputs are the logical variables that indicate a high or a low condition in the plant. The annunciation function performed on the control panel arrangement and the protection function is performed in response to the logical variables within the simulator.

The limit checks are updated either once or twice per second depending on where the particular limit check is located in the program. A temporary logical variable FGOFLP is used to permit the latter sections of the program to be updated every other half second. In nearly all instances, the limit checking of a given variable can be performed once per second. However, those variables that require a faster scan are checked every half second in the first portion of the program. In general, the limit checks are self-explanatory.

The feedwater system for the secondary side has controllers (LCV520, LCV530 and LCV540) that maintain a net positive suction head NPSH at the suction to their respective feed pumps. If the actual suction head FWNPSH falls below the required suction head of any one of the pumps, the plant logic takes corrective action. The need for corrective action is indicated by setting the logical variables FWPSLO to TRUE. The assumed required net positive suction head curve NPSH in the present embodiment of the invention is 100 feet when the pump flow is zero and 300 feet when the pump flow is 18.5 times $10^3$ in gallons per minute.

When the simulated generator's terminal voltage is greater than 70% of the nominal value, it is indicated by the variable GNOVLT. This limit check is used to determine if there is sufficient voltage to drive the synchroscope during synchronization.

If the feed pump high pressure governor valves FW53 and FW74 are open, two limit checks FPZGCB and FPZGCC are open. At plant loads less than 25%, which is indicated by normalized turbine impulse pressure, the feed pump turbines draw steam from the main steam header. Above 25% load, they draw steam from the reheat exhaust header. Thus, the feed pump high pressure governer valves are assumed open below 25% power if the pump turbine is not tripped.

The reverse power relays that prevent the simulated generator from absorbing power from the simulated 345 KV network are represented by the limit check GNZURV When the generator power is less than −1% of rated conditions, the result of the check is true and the main generator circuit breakers are tripped.

If at least one high pressure turbine governor valve (See FIG. 93R) is open, this is indicated by the limit check MSOGV. This variable is used by the turbine supervisory system TURSUP to determine if steam is flowing in the turbine.

Control Systems (BOPCTL) For Secondary Steam System

The nuclear power plant being simulated according to the present embodiment of the invention includes several auto/manual control stations, remote set point stations, on the control panels, and internal controllers which are used to operate various subsystems and components. The auto/manual controllers are simulated by the control station handler CONHAND that resides in the C machine The inputs for the control station handler are constructed in subroutine BOPCTL and made available to the handler through COMMON. The remote set point stations are simulated by reading the set point potentiometers via analog inputs and simulating their associated valves with first order lags. Internal controllers do not require communication with the control panels, and they are simulated with FORTRAN statements in subroutine BOPCTL. Several of the controller outputs drive control valves which are simulated by first order time lags whose time constants are estimated.

The error signal to the various controllers is normalized to a range of minus 1.0 to plus 1.0 and limited to these values. The effect of saturation that would occur in the analog circuits is considered when these limits are applied. One of two possible normalization constants is used. If an error signal is composed of the same type of signal, such as two flows rather than a flow and a pressure, the normalization constant is the proportional band of the particular controller. If two different types of signals are involved, the maximum value of the respective instrument channel is used to normalize each signal. The output of the controller is a normalized value that varies from 0 to plus 1.0, and the integrator is limited to the range of 0 to plus 1.0. In some cases, the controller outputs are used directly and in other cases, a controller operated valve admittance is employed.

Figure 96:
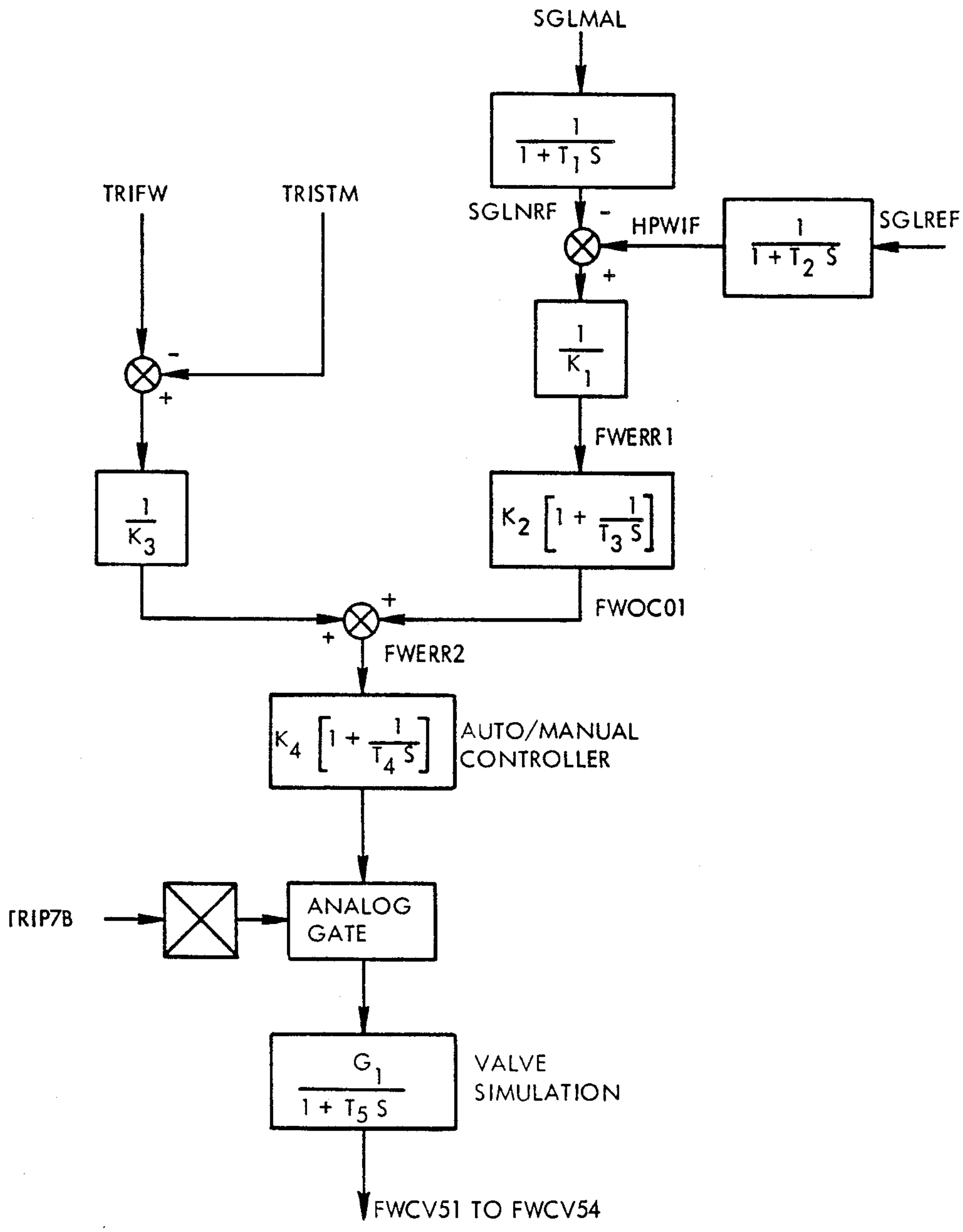
FIG. 96 illustrates in block diagram the control system for one of the steam generators being simulated.

Referring to FIG. 96, the control scheme for one of the four steam generators SG is illustrated. The steam generators in the remaining three loops of the simulated four loop reactor plant are similarly controlled. The steam flow HPWIF and the feed pump control output or feedwater flow FWOC01 are normalized by 5 lbs/hrs/$10^6$ which is the maximum value of the instrument channels. The level error signal FWERR1 and FWERR2 is divided by the span of the narrow range level tap. The analog gate simulates the solenoid valves that disable the air supply to the control valve; and if the logical input to the analog gate is set, the analog input to the gate is linked to the output. A valve time constant of 5 seconds is used in accordance with the parameters of the system being simulated. The valve trip constant is negative and causes the valve to travel full stroke in 5 seconds. The level controller FWOC01 zeros the integrator when the associated auto/manual controller is in the manual mode.

Figure 97:
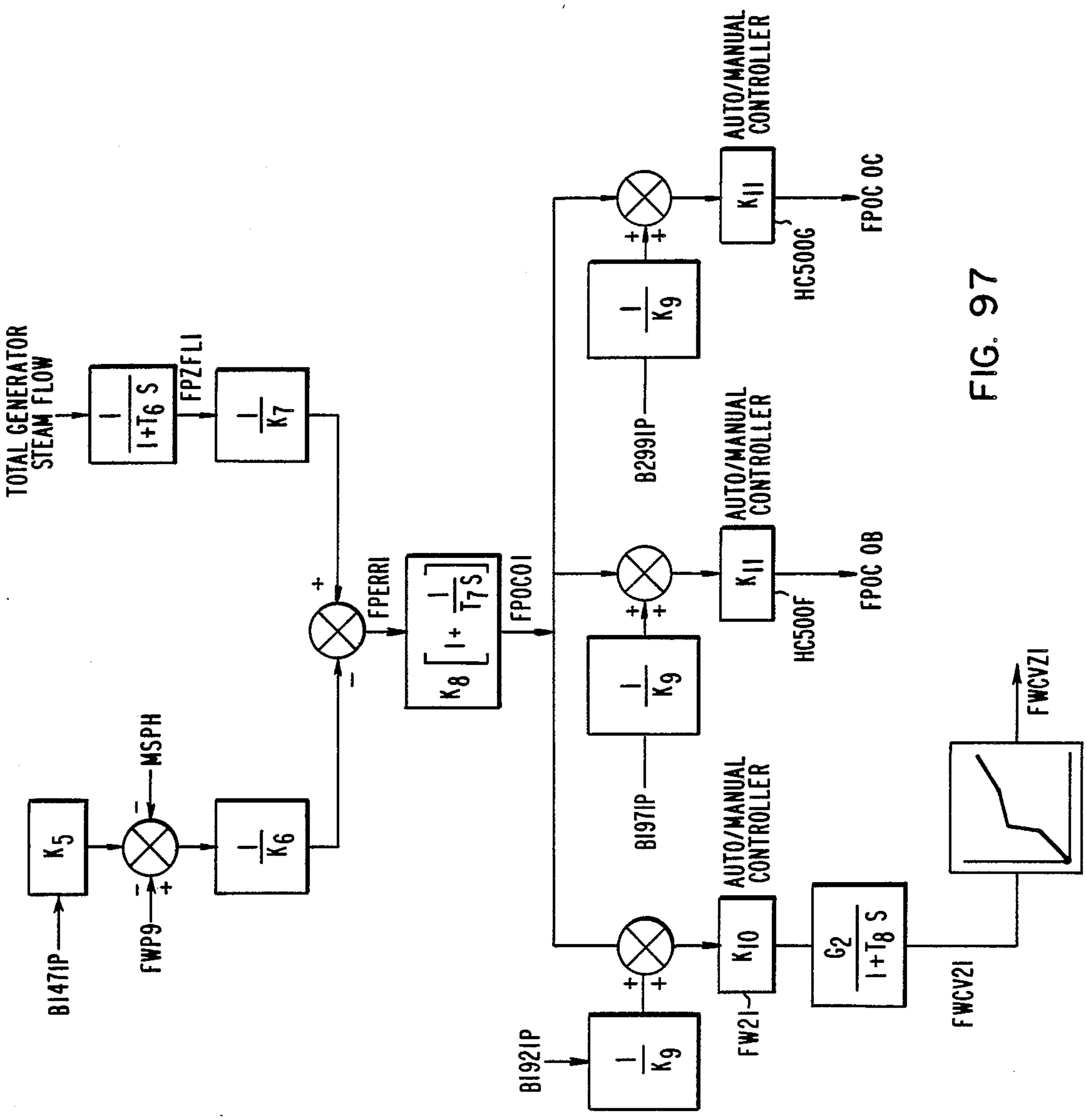
FIG. 97 illustrates diagrammatically the feedwater pump control system of the simulation.

Referring to FIG. 97, which diagrammatically illustrate the secondary feedwater pump control system, a no load differential pressure is maintained according to the master feedwater flow potentiometer located on the HC509 panel (See FIG. 93C) having an analog to digital contactor to input B1471P. The potentiometer range is 0 to 500 psid, with a suggested value of 40 psid. The pressure channels FWP9 and MSPH are normalized by 500 psia, the maximum value of the instrument channels. The total steam flow signal is normalized by 14 lbs/hr/$10^6$, the value at rated flow, and an additional 60 psid is added to the no load set point FPZFL1. The effective proportional gain of the feedwater master flow controller is 10 rpm/(psi). The master feed pump control FPOC01 is connected to the individual pump controllers, which are proportional devices that increase the flexibility of the system. The operator may select either manual or automatic control. In the automatic mode, the master potentiometer on the control panel can be used to bias the master feedwater flow control signal FPOC01. It is assumed that the potentiometer can increase the proportional controller output from 0 to 100% of the maximum output. The simulated feed pumps have a speed range of approximately 2750 to 5200 rpm when the controller signal is in control. The control station FW21 for feed A or FWP0P1 affects the pump's discharge valve FW33. This valve has an unusual relationship between the flow coefficient FWCV21 and valve position, thus the maximum valve admittance is specified as 1 so that it becomes identical to the valve position. This valve position is used in a function generator to simulate valve characteristics to provide an admittance FWCVZ1. The control stations HC500F and HC500G for the feedwater pumps B and C having analog to digital contact inputs B1971P and B2991P which affect speed control FPOCOB and FPOCOC, respectively.

Figure 98:
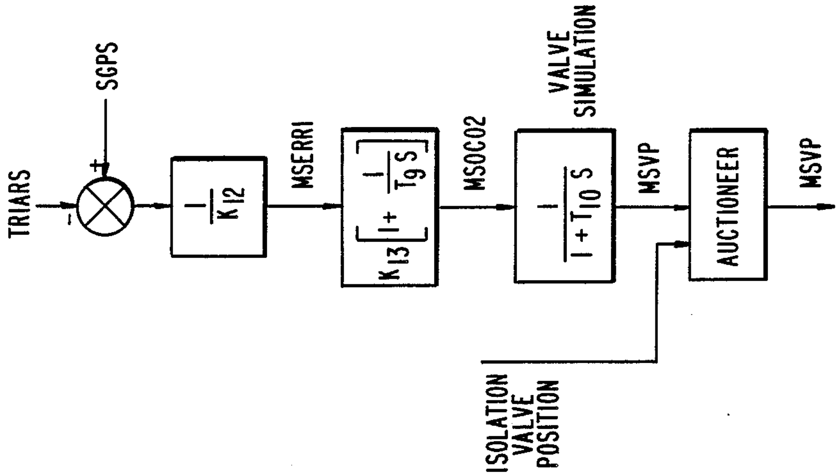
FIG. 98 illustrates diagrammatically the steam generator atmospheric relief valve control system of the simulation.

Referring to FIG. 98, the simulated steam generator atmospheric relief valve control system is generalized to apply to all four reactor coolant loops. The pressure set point and the generator pressure signals have been normalized by the proportional band of a controller. The controller output drives the simulated air operated control valves. In the actual plant being simulated the pneumatic actuator also has a motor operator that can raise the valve against its closing spring. Thus if control air is lost, the motor operated or "isolation" valve is used to raise the valve. In effect, the isolation valve position becomes a lower limit for the pneumatic valve. Thus, if the normalized atmospheric relay valve position MSVP is less than the normalized isolation valve position MSVP01-04, the new control valve position becomes the isolation valve position Such isolation valves are referred to on the control panel as MSCVM7, 8, 9, 0.

Figure 99:
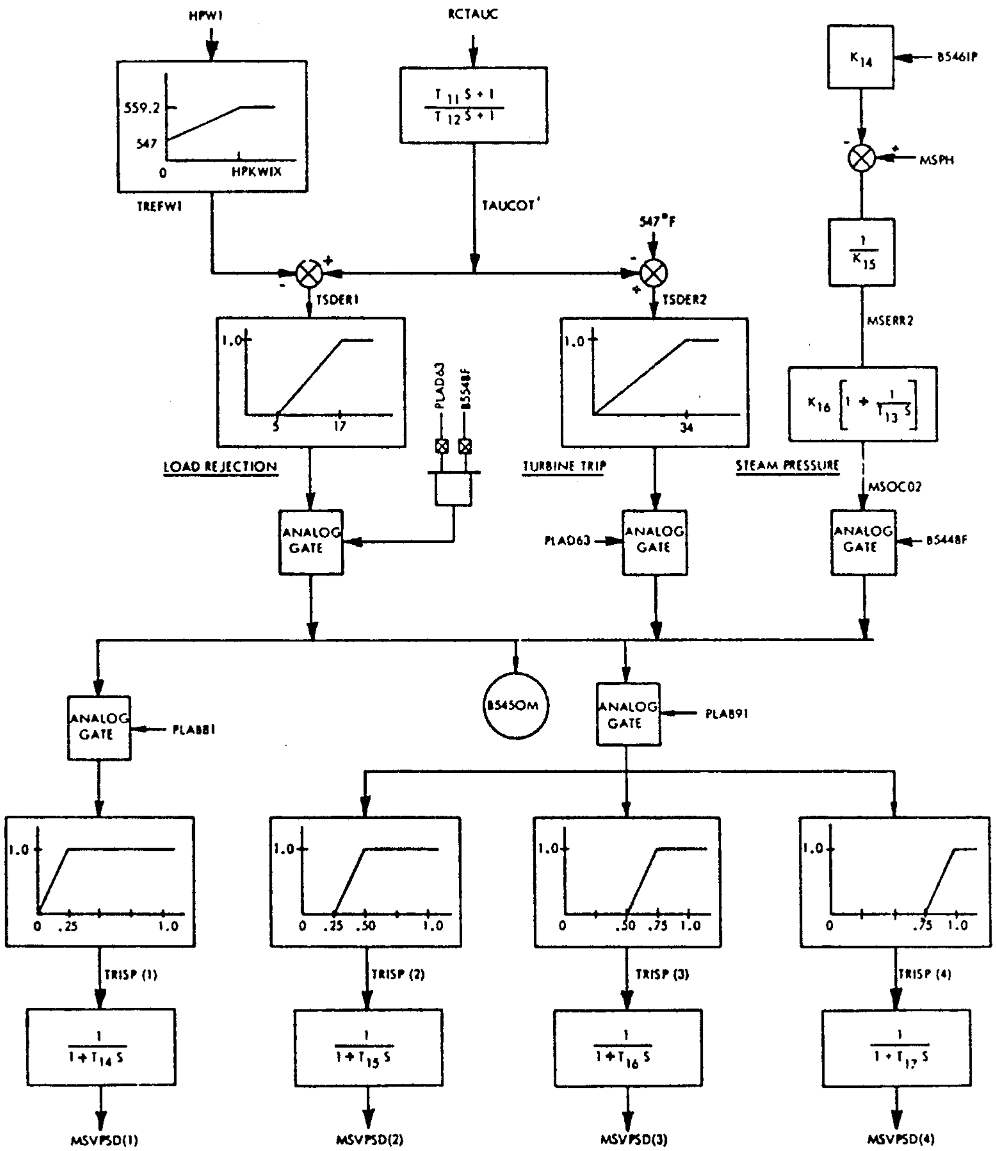
FIG. 99 illustrates diagrammatically the steam dump control system of the simulation.

Referring to FIG. 99, the simulated secondary steam dump control system has three modes that can be used to control the electric power plant: load rejection, turbine trip, and steam pressure. The load rejection and turbine trip modes are based on T average temperature deviations BCTAUC, and turbine inlet flows HPW1, while the steam pressure mode maintains a given pressure MSOC02 at the main steam header. All three systems are continuously active in the simulator and the analog gates having bi-direct contact input B544BF for the mode control selector switch and protective logic variables PLAD63 determine which system will drive the twelve simulated steam dump valves. The steam pressure controller potentiometer has a range of 1200 psig. This signal and the main steam header pressure are normalized by the proportional band of the controller The 12 steam dump valves are divided into four, three valve groups TRISP(1)-(4). They are open sequentially so that the first group TRISP(1) is modulated when the controller output is 0 to 25%, the second group TRISP(2) is modulated when the output is 25 to 50%, the third group TRISP(3) is modulated when the output is 50 to 75%, and the fourth group TRISP(4) when the output is 75 to 100%. The four groups produce steam dump valve position MSVPSP(1)-(4). If the demand signal exceeds the maximum modulating signal for a particular group, the group is tripped open quickly. The modulating time constant is 10 seconds which is based on a ramp time of 20 seconds. The assumed trip time constant is 3 seconds.

The reheater flow control MS37 (See FIG. 93/T) system utilizes the actual controller on the control panel, used in the plant being simulated except that the input amplifiers are modified to permit a 0 to 5 volt DC signal; and the output is modified to be a 0 to 10 volt DC signal. The 3 turbine inlet temperature inputs are wired in parallel so that one analog output is sufficient. The controller's output signal is the control valve demand signal; and the valve position REZAMS is simulated in the computer with a two second time lag.

Referring to FIGS. 93A, C, F, and H, of the control panels, the simulated vernier bypass valves FW119A through FW119D inclusive in the main feed system and the auxiliary feedwater flow control valves are controlled from four remote set point stations, one for each coolant loop. The set point potentiometers are read as analog inputs and pass to the C machine. The vernier bypass valves are simulated with 5 second time lags, and they are tripped closed by an analog gate when required.

Figure 100:
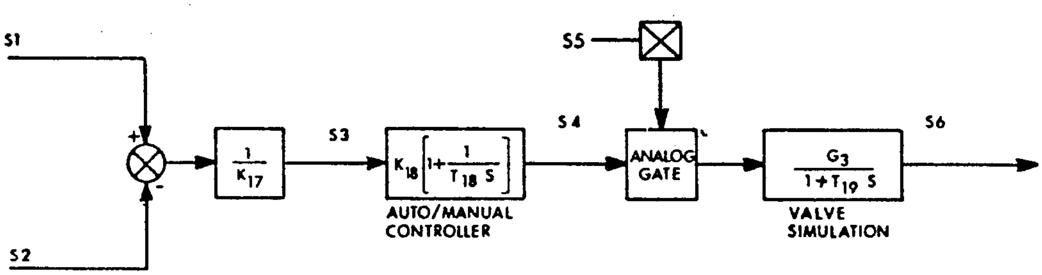
FIG. 100 is a functional diagram of the several remaining control systems of the simulator.

In the embodiment for the particular nuclear plant being simulated, four additional control systems exist to control the heater tank level, the condensate pump recirculation flow, the gland steam condenser bypass flow, and the generator's hydrogen cooling system temperature. Reference is made to FIG. 100 which provides a general description of these control systems. All four systems are similar in that the controllers have proportional plus integral action, and a controller modulator valve. In the implementation, all the proportional gains in the controller handler are 1. The error signal is normalized by the controller proportional band in all cases.

Organization Of Models

Figure 101:
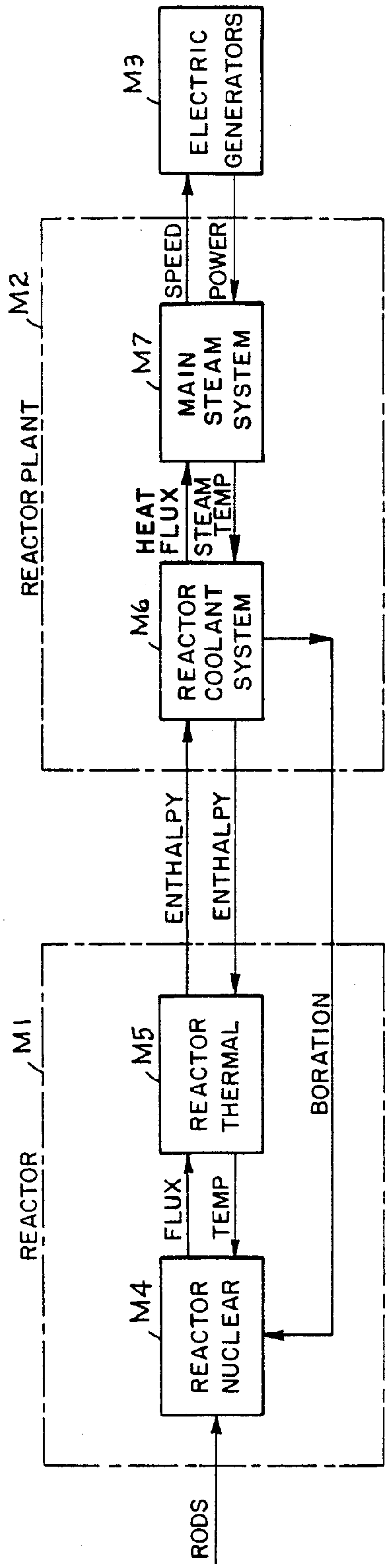
FIG. 101 is a functional block diagram showing the interconnection of the reactor, the primary, and secondary system of the simulation.

To provide realistic simulation in an efficient manner while providing for manufacturing and operating flexibility, the simulated nuclear electrical generating plant is preferably modularly organized and it includes road components. As shown in Fig. 101, the first category M1 includes the reactor per se, the second category M2 includes the reactor plant, and the third category M3 includes the electrical generators. The reactor category M1 is further modularly segregated into two interacting models, a reactor nuclear model M4 and a reactor thermal model M5. The reactor plant category M2 is further modularly segregated into two interacting models, a reactor coolant system model M6 and a main steam system model M7.

Broadly, in this embodiment of the simulator and with reference to the pressurized water type of nuclear plant being simulated in this case, the reactor nuclear model M4 calculates the neutron flux, as governed by the position of the simulated neutron absorbing control rods M5 and the output coolant temperature of the reactor thermal model M5. The reactor thermal model M5 operates on factors related to heat generation and heat flow to calculate the enthalpy of the reactor as well as the primary coolant temperature. The coolant temperature is output to the reactor nuclear model M4 since coolant temperature affects reactivity and the reactor enthalpy is output to the reactor coolant system model M6 since the reactor enthalpy affects heat transfer to the coolant. The reactor thermal model M5 performs its calculations as governed by the output coolant enthalpy of the reactor coolant system model M6, since the coolant enthalpy affects heat flow from the reactor to the coolant as well as the temperature of the coolant, and the neutron flux of the reactor nuclear model M4, since the flux level is a determinant of the reactor heat generation.

In the reactor plant simulation, the reactor coolant system model M6 calculates coolant enthalpy and secondary heat flux as governed by the reactor enthalpy from the reactor thermal model M5 and the steam temperature from the main steam system M7. The main steam system model M7, which includes the turbine, calculates the main steam temperature and the speed of the turbine, which is governed by the heat flux from the reactor coolant system M6 and the power output of the electric generators M3. The power output of the electric generators is calculated in accordance with the speed of the turbine from the main steam system M7. The reactor coolant system model M6 also calculates the boration concentration which is utilized as an input to the reactor nuclear model M4 to modify the flux calculation. The simulation is further modularized in accordance with the succeeding discussion.

Figure 102A:
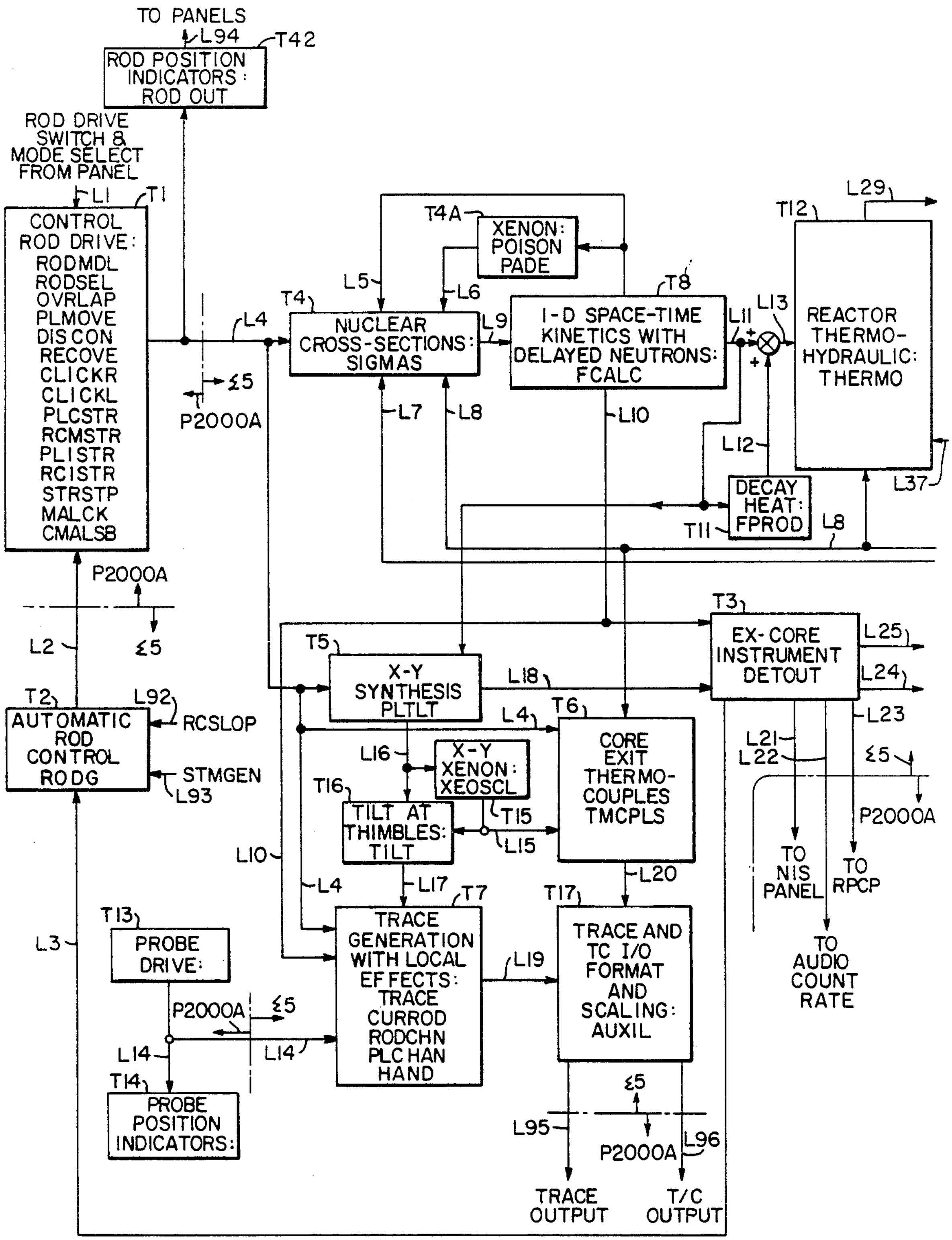
FIGS. 102A, 102B and 102C is a functional block diagram illustrating the interconnections of the various individual modules that make up the simulator.
Figure 102B:
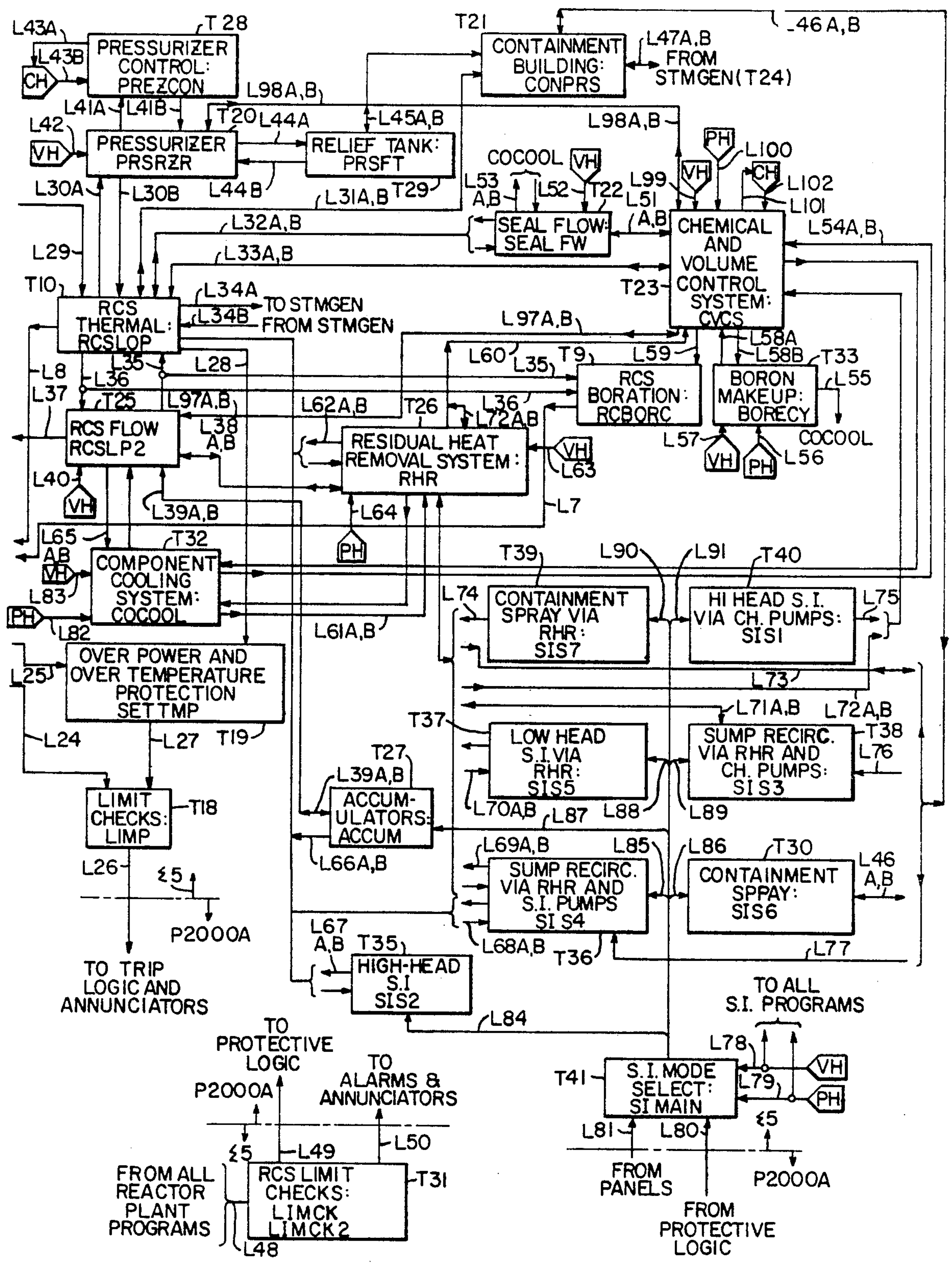
Figure 102C:
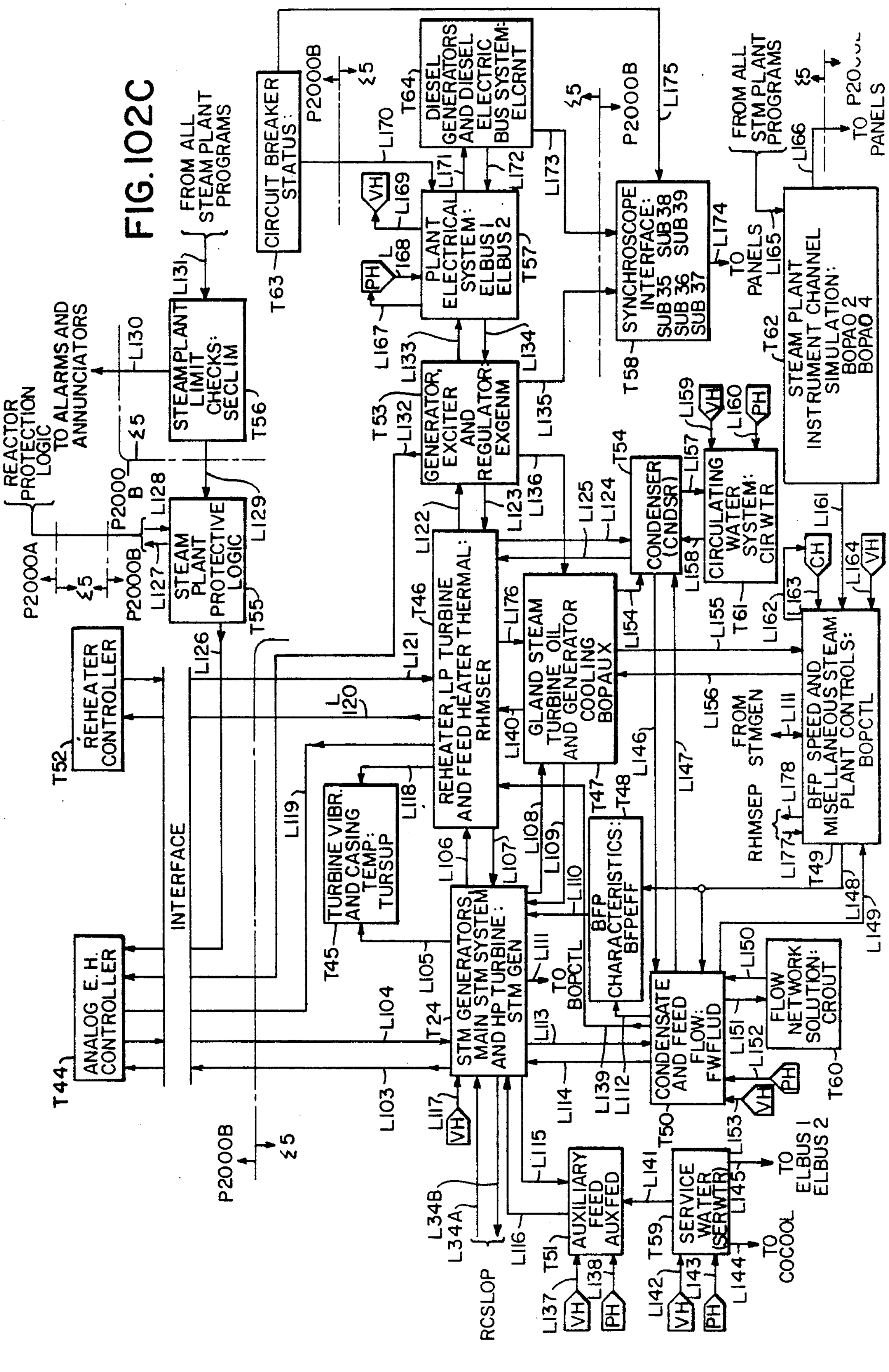

Referring to FIGS. 102A, 102B, and 102C which provide greater detail for the arrangement of FIG. 101, each of the various models of the modularized simulator system according to the present embodiment of the invention is shown as an individual block having identified therein the computer subroutine o subroutines which structurally and functionally constitute the model or system module. The models generally correspond to functional parts of the simulated plant and they are appropriately interconnected to form the overall model, and they are coupled externally of the computer to the control panels by inputs and outputs referenced in such Figures as L1 through L178 inclusive to provide for instructor and operator interfacing. A list of the various models together with reference numerals are contained in the Appendix.

The blocks bearing the designation VH represent the valve handler program VCHAND that responds to the manipulation of the panel controls for operating the valves of the system. The blocks bearing the designation CH represent the controller handler program CONHAN that responds to the operation of the auto-manual controllers on the panels; nd the blocks PH represent the pump handler program PHAND that is governed by the pump control switches on the panels. Thus, the programs VCHAND, CONHAN and PHAND provide simulation elements, i.e., valves, controllers and pumps, which are distributed throughout the model organization for interaction with the various system modules in accordance with their functional roles.

The appropriately labeled dashed lines intersecting the input and outputs L designate those functions that occur or are calculated in the Sigma 5 digital computer or C machine or one of the P2000 computers A or B as the case may be. As previously described, certain of the models are calculated four times per second or every cycle; other models are calculated two times per second or every other cycle; and some are calculated on demand or in response to the manipulation of an appropriate control. In this section of the specification, the individual models and their interaction are described and the reasons for the presence of such models and that interaction are made more apparent elsewhere herein.

Referring to FIG. 102A, control rod drive model T1 (A machine), which provides a continuous variable truncation approximation for neutron absorbing control rod positions and indications, operates in response to inputs L1 which include the full length and part length rods in and out panel switches, the rod control mode select position, the rod start up reset pushbutton, the trip and trip reset pushbuttons, permissive interlock pushbuttons, (see RCS panels FIG. 92) and rod disconnect switch positions. Input L2 is also applied to the model L1 and, it comprises rod speed and direction in the automatic mode from an automatic rod control model RODGO(T2), which calculates a transform approximation of the Automatic Rod controller.

Automatic Rod Control model T2 operates in response to input L3 comprising the nuclear power rate which is the output from the EX-CORE instrument model DETOUT, which calculates the meter output from the Ex-Core nuclear chambers, referred to at model T3. The 15 rod bank and/or group positions, and the 10 malfunction rod positions, which are calculated in the model T1, form an input L4 from T1 to the nuclear cross-section model (SIGMAS) T4, which provides the $1\frac{1}{2}$ energy group cross-sections.

L4 is also applied as an input to the X-Y synthesis model PLTLT, which calculates neutron flux vector components, referred to as T5; core exit thermocouples model TMCPLS, which calculates the average channel with local tilt and rod factors, referred to as T6; and the trace generation model T7 which provides the numerical flux fit for In-Core traces. The model T4 responds to the neutron flux input (22 mesh points) L5 which is calculated in the one dimension space time kinetics with delayed neutrons model FCALC referred to at T8. The T8 output L5 is also the input to the xenon model (POISON, PADE) T4A which provides the analytic solution for Xenon for input L6 to the model T4. Also, the model T4 has applied to it the reactor boron concentration represented by input L7 from the output of the model RCS boration (RCBORC) referred to at T9, which integrates boron inflow and outflow to obtain net boron concentration in the RCS and isolated loops. The model T4 also receives the output L8 from model RCS thermal (RCSLOP) T10, which calculates enthalpy distribution around the RCS loops, the reactor core inlet enthalpy and the average exit enthalpy. The model T4 acts on inputs L4, L5, L6, L7, and L8 to produce 22 diffusion coefficients, 22 absorption cross-sections, 18 neutron yields, 18 energy yields, and 22 neutron velocities which are input as L9 to the one dimension space time model T8.

In addition to the output L5, the model T8 provides 22 neutron flux calculations over output L10 to the input of the models T3 and T7. Also, the model T8 produces the total fission power (output L11) which is used in the calculation of the X-Y Synthesis model T5 and the decay heat (FPROD) model T11, which calculates the eight fission products one node heat generation. The total fission power at output L11 is summed with the calculated decay heat power at output L12 from the model T11 to produce the total core power as an input L13 to the reactor thermal hydraulic (THERMO) model T12. The latter model calculates reactor flow and heat transfer.

The probe drive model T13 provides output L14 to the probe position indicators on the NIS panel (see FIG. 90) and also provides an input to the model T7 which comprises thimble selection and the probe position in the thimble, of which there are six maximum. The X-Y xenon (XEOSCL) model T15 provides an output to the model T6 and the planar tilt at the thimbles (TILT) model T16 which comprises two X-Y xenon tilt component factors. The calculations of the model T16 and the model T15 operate on two X-Y gross flux tilt component factors from the output L16 of the model T5. The model T16 in response to the inputs L15 and L16 calculates the X-Y tilt factor at each thimble location for output on L17 to the model T7. The model T5 also provides X-Y tilt factors at each Ex-Core chamber location (output L18) for the model T3.

The Trace Generation model T7 in response to the inputs L17, L4, L10, and L14 produces output L19 the flux trace at each selected thimble up to 6 maximum for input L19 to the trace and TC input/output format and scaling (AUXIL) model T17. The points on each trace are output at L19 sequentially; that is, one point at a time corresponding to the probe position. A total of 120 points is supplied for each complete trace. The model T6 in response to the inputs L8, L4, and L15 produces at its output L20 the temperature at a selected thermocouple which is input into the model T17.

The model T3 calculates the flux at the Ex-Core chamber location for the source, intermediate, and power range meters on the NIS panel over output L21; the source range reciprocal count rate for the auto count rate meter over output L22, which reciprocal is coded as a 16-bit binary number and is output on 16 output contacts; and on output L23, the total neutron and delta flux for each long ion chamber location for the power range control panel. The model T3 also calculates over output L24 the total neutron flux for each long ion chamber location and the rod drop differentiator signal for the limit check (LIMP) model T18 which checks the limits of the parameters for the trip logic and annunciators on the control panel. Also, the flux at each half chamber location, which there are a total of eight, is applied from T3 as an input L25 to the overpower and overtemperature protection (SETTMP) model T19, which model calculates Z-transforms approximations for DNB protection. The output of the limit checks model T18 comprises alarm and annunciator actuation signals, reactor plant permissive signals, reactor protection trip signal, and reactor rod stop signal represented at L26. The model T19 responds to the input L25 and the input L28 which comprises the loop average temperatures, loop delta temperatures, and system pressures to produce the overpower and overtemperature protection trip signals L27 for input to the limit checks model T18.

The inputs L8, and L13 previously described and the input L37, which represents reactor core fluid flow, are applied to the reactor thermal hydraulic model T12 which in turn generates output L29, i.e., the core outlet fluid enthalpy, for input into the RCS thermal model T10.

The RCS thermal model T10 provides an output L30A which comprises surge flow, surge enthalpy for flow into the pressurizer, spray enthalpy, saturation pressure of the reactor vessel dome, saturation pressure of the reactor outlet, and cold leg pressure at the spray tap point. The output L30A is utilized in the pressurizer (PRSRZR) model T20. The model T20 in turn calculates the simulated coolant branches for normal condition (steam bubble above liquid), solid water condition, empty condition, and special conditions for major loss of coolant. The model T20 produces an output L30B which comprises pressure, and surge enthalpy for flow out of the pressurizer to the RCS thermal model T10.

The RCS thermal model T10 further produces an output L31A to the input of the containment building (CONPRS) model T21 which comprises the reactor coolant system heat loss, the loss of coolant accident outflow and outflow enthalpy. The model T21 calculates containment temperature and pressure based on flow and energy released to the containment building, and it provides an input L31B, which comprises containment temperature and pressure, to the model T10

The RCS thermal model T10 also produces an output L32A which comprises four pressures at the reactor coolant pumps, four cold leg temperatures of the reactor coolant loops for instances in which the labyrinth seal flow reverses, pressure at the drain header tap points, and the excess letdown enthalpy for use in the seal flow (SEALFW) model T22 which calculates the flows and pressures and temperature distribution in the seals of the reactor coolant pumps. The seal flow model T22 produces an output to the RCS thermal model T10 which comprises four labyrinth seal flows, seal water enthalpy, and the excess letdown flow. The model T10 also produces output L33A, which comprises two letdown tap pressures, and letdown enthalpy to the chemical and volume control system (CVCS) model T23, which calculates the chemical and volume control system pressures, temperatures, enthalpies, and flow distribution.

The RCS thermal model T10 also provides an output 34A, which comprises the steam generator primary average temperatures (4) and four primary pressures for tube leak malfunctions, to the steam generators, main steam system and high pressure turbine (STMGEN) model T24 which simulates the operation of the four steam generators FGA, through SGD. The model T10 receives an input L34B from the model T24 which comprises the steam generator heat flux for the four steam generators and a leak flow for tube leak malfunction. Model T10 also receives inputs L35 which comprise the reactor coolant system loop flows for all locations and produces an output L36 which comprises the reactor coolant specific volumes for all locations from and to RCS flow (RCSLP2) model T25, which calculates the pressure and flow distribution around the RCS loops. The previously described model T9 also receives inputs L35 and L36 from the models T25 and T10, respectively.

The RCS flow model T25 produces an output L37 which comprises the reactor core flow to the previously described model T12. Model T25 also produces an output L38A which comprises the residual heat removal system pressures at selected tap points; and receives inputs L38B which comprise the residual heat removal flows to and from residual heat removal system (RHR) model T26, which in turn simulates the behavior of the residual heat removal system in its normal use. Inputs L39A to the model T25 comprises safety injection tap point pressures and output L39B from the model T5 comprises the safety injection flows L39A and L39B couple the model T25 with the accumulator (ACCUM) model T27, which simulates the accumulator dump during safety injection, pressurization or depressurization of the accumulators with nitrogen, the accumulator drain to the volume control tank and drain tank, and the filling of the accumulators. The model T25 also receives input L40 which comprises 8 main turbine stop valve admittances and 4 bypass valve admittances from the valve handler program VH.

The previously described pressurizer model T20 provides output L41A which comprises the pressurizer level and pressurizer pressure to prssurizer (PREZCON) model T28, which calculates protection logic and control signals, spray flow, pressurizer heater power, and relief flow with associated malfunctions. In turn, the model T28 provides output L41B which comprises the pressurizer heater power to the model T20. The valve handler provides input L42 which comprises 3 spray valve admittances, relief valve admittance, and safety valve admittance to the model T20.

When the pressurizer control model T28 is on automatic, an error is fed to the controller handler (not shown), which in turn feeds valve commands to the valve handler. The resulting spray valve admittances are sent to the model T20. The controller handler receives from the model T28 the pressurizer level error and the pressurizer pressure error 43A. Bifurcated control is employed; that is, low pressure actuates the pressurizer heaters while high pressure actuates the spray.

The control handler provides an input L43B to the pressurizer control model T28 which comprises the heater power control signal. The spray valve control output goes direct from the controller handler to the valve handler; and the level control output goes directly to the positive displacement pump speed calculation or to the charging flow valve controller, depending on whether the positive displacement or centrifugal charging pumps are in use. The model T20 provides an output L44A which comprises relief line flows and relief fluid enthalpy to the relief tank (PRSFT) model T29 which simulates the pressurizer relief tank. The model T29 in turn provides an output L44B which comprises the pressurizer relief tank pressure to the model T20.

The relief tank model T29 provides an output L45A which comprises the relief tank rupture disk flow and the relief tank rupture disk flow enthalpy to the previously mentioned containment building model T21. The model T21 in turn provides an output L45B which comprises containment pressure and containment temperature for heat loss to the relief tank model T29.

The model T21 provides an output L46A which comprises containment pressure to the containment spray safety injection system (SIF6) model T30. The model T30 in turn provides an output 46B which comprises containment spray flow and containment spray enthalpy to the model T21. Also, the model T21 provides an output 47A to the steam generator model T24 which comprises the containment pressure. The steam generator model T24 provides an output 47B to the model T21 which comprises the steam break flow, steam break enthalpy, feedwater line break flow, and feedwater line break enthalpy.

Outputs L48 comprises all plant variables in the simulator for which limit checks are to be performed. Also, output L49 from RCS limit checks (LIMCK, LIMCK2) model T31 provides all limit check logicals from the reactor coolant system to the protection logic. The model T31 further provides output L50 which comprises all limit check logicals from the reactor coolant system to the alarms and annunciators on the control panel.

The chemical and volume control system model T23 previously mentioned provides an output 51A which comprises pressure at the seal header on the charging line, enthalpy at the seal header on the charging line, and the charging pump suction line pressure below the valve LCV112C to the previously mentioned seal flow model T22. In turn, the model T22 provides output L51B which comprises the seal header flow, the seal return flow including excess letdown flow, and the temperature of the seal water return flow to the model T23.

The seal flow model T22 receives input L52 which comprises all seal flow system valve admittances from the valve handler program. The model T22 provides an output 53A which comprises the component cooling water return temperature from the seal water heat exchanger and the component cooling water return temperature from the excess letdown heat exchanger to component cooling system (COCOOL) model T32, which calculates the flow and pressure distribution in the component cooling system as well as the thermal dynamic behavior of the residual heat removal heat exchangers. Also, in the model T32 the component cooling surge tank level is calculated based on water density changes. The model T32 provides an output L53B which comprises the component cooling water flow and temperature to the seal water heat exchanger, and the component cooling water flow and temperature to the excess letdown heat exchanger for input to the seal flow model T22.

The chemical and volume control model T23 provides an output L54A which comprises the component cooling water return temperature from the letdown heat exchanger to the model T32. In return, the model T32 provides an output L54B which comprises the component cooling water flow and temperature to the letdown heat exchanger for input to the model T23.

The boron makeup (BORECY) model T33, which simulates the systems associated with boric acid makeup, including the boron evaporators, boric acid storage tanks and transfer pumps, and the boric acid blender and associated valves and piping, provides an output L55 which comprises the component cooling water heat load from the boron evaporator condenser to the component cooling system model T32. Also, the pump handler provides an output L56 which comprises the boric acid pump shutoff heads for fast and slow speeds to the model T33. The valve handler provides an output L57 for the model T33 which comprises admittances for all boron makeup system valves. The model T33 also has an output L58A, which comprises the boric acid blender outflow to the charging pump suction, the blender boron concentration, the blender outflow to the volume control tank spray line, direct boration flow to the charging pump suction by way of valve

8100 (concentration is assumed to be 20,000 PPM), and evaporator water flow to the refueling water storage tank, for input to the chemical and volume control system model T23. In return, the model T23 provides an output L55B which comprises charging pump suction pressure and pressure at the volume control tank spray line to the boron makeup model T33. The model T23 also provides an output L59 to the model T9 which comprises the charging flow total into the reactor coolant system for all paths, the charging boron concentration, the fill header flow for each isolated loop, the total letdown flow for all paths from the reactor coolant system, the drain header flow for each isolated loop, and the flow through the deborating demineralizer.

The previously mentioned model T26 provides an output L60 which comprises the pressure at the residual heat removal system letdown line and the temperature at the residual heat removal letdown line to the chemical and volume control model T23. The model T26 also provides an output L61A which comprises the component cooling water return temperatures from the two residual heat removal heat exchangers for input to the component cooling system model T32. In return, the model T32 provides an output L61B which comprises the component cooling water flows and temperature to the two RHR heat exchangers for input to the residual heat removal system model T26. The model T26 includes an output L62A which comprises the residual heat removal enthalpy to the reactor coolant system for input to the previously mentioned RCS thermal model T10. The model T10 in turn provides an output L62B which comprises the reactor coolant system tap point enthalpy returning to the residual heat removal system for input to the model T26. The valve handler has an output L63 which comprises all residual heat removal system valve admittances to the model T26; and the pump handler has an input L64 to the residual heat removal model T26 which includes the two residual heat removal pump heads.

The component cooling system model T32 provides an output L65A to the reactor coolant system flow model T25 which the component cooling water flow to the reactor coolant pump thermal barrier and bearing coolers, and the component cooling water temperature to the reactor coolant pump cooling. The model T25 in turn provides an output L65B to the model T32 which consist of the reactant cooling pump thermal barrier and motor heat load to the component cooling water.

The accumulator model T27 has an output L66A which comprises the accumulator flows to the reactor coolant system and the accumulator flow temperatures which are assumed fixed to the reactor coolant system for the input to the RCS thermal model T10. The accumulator boration if assumed fixed in calculating the change in reactor cooling system boration. The model T10 provides output L66B which comprises the safety injection system tap point pressures for input to the model T27. The model T10 also has an input L67A which comprises the high head safety injection flows and temperature to the reactor coolant system from the high head safety injection (SIS2) model T35, which mechanizes the high head safety injection through the safety injection pumps and the portion of the accumulator fillings. In return, the model T10 provides an output L67B which comprises the safety injection tap point pressures through the model T35. The RCS thermal model T10 also has an input L68A which comprises the safety injection flows and temperatures to the reactor coolant system from the sump recirculation via the residual heat removal and safety injection pumps (SIS4) model T36, which mechanizes recirculation from the sump using the residual heat removal pump, containment pressure, and safety injection pumps. Also, the model T10 provides an output L68B which comprises reactor coolant system pressures to the model T36. The model T36 also provides output L69A which comprises the safety injection pump suction pressure to the residual heat removal system model T26; and the model T26 provides an input L69B to the model T36 which comprises the residual heat removal flow to the safety injection system and the residual heat removal heat exchanger outlet temperature.

The RHR model T26 has an input L70A which comprises tap point pressures from the low head safety injection system via the residual heat removal system (SIS5) model T37, which model mechanizes the low head safety injection through the residual heat removal pumps. The model T26 also provides an input L70B which comprises the residual heat removal to safety injection system flows and the residual heat removal heat exchanger outlet temperatures for input to the model T37. The RHR model T26 also has an input L71A which comprises tap point pressures from the sump recirculation via the residual heat removal and charging pumps (SIS3) model T38 which mechanizes recirculation from the sump using containment pressure, one residual heat removal pump and the charging pump. The model (SIS3) T38 provides an output L71B which comprises residual heat removal flow to the safety injection system and the residual heat removal temperature to the safety injection system. The model T26 provides an output L72A which comprises the residual heat removal pump discharge pressure to the model T23 and an input L72B which comprises the charging pump suction pressure from the model T23. The model T26 also has an output L73A which comprises the residual heat removal system flow and temperature to the containment spray system T21.

The model T26 has an input L74 which comprises spray line pressures to the containment spray by way of the residual heat removal system (SIS7) model T39, which mechanizes the containment spray through the residual heat removal system. The model T23 has an input L75 which comprises the pressure at the boron injection tank inlet from the high head safety injection system via the charging pumps (SIS1) model T40, which recognizes the high heat safety injection through the two centrifugal charging pumps and a portion of the accumulator filling. In this model the boron injection tank initial boron concentration is assumed fixed. The containment building model CONPRS T21 also provides an output L76 which comprises containment pressure, containment sump enthalpy, and containment sump level to indicate if the sump is dry for input to the model T38 previously mentioned. The model T21 also has an output L77 which comprises containment pressure, containment sump enthalpy and level to the previously mentioned (SIS4) model T36.

The valve handler has an output L78 to all the safety injection models and to the safety injection mode select (SIMAIN) model T41, which is the safety injection calling program. The model T41 also has an input L79 from the pump handler which comprises the safety injection pump heads; an input L80 from the protective logic which comprises the safety injection actuation signal; and an input L81 which comprises the manual safety injection actuation signal and reset signal from the control panels. The manual operation of the safety injection pumps and valves is handled through the pump handler and valve handler respectively, which includes the safety injection test function.

The model T32 receives an input from the pump handler L82 which comprises the component cooling pump heads and an input L83 which includes all component cooling system valve admittances from the valve handler. The model T41 has outputs L84, L85, L86, L87, L88, L89, L90, and L91 to the accumulator model T27 and the safety injection system models T30, and T35 through T40 which comprises an operation bit to the respectively safety injection models. The individual safety injection system models are not computed when inactive. Therefore the outputs L84 through L91 from the model T41 comprises a logical signal to initiate operation of their respective routines whenever the safety injection select model T41 determines that the proper condition, either automatic or manual, has been set up to commence their operation.

Referring to the automatic rod control model T2 (RODGO) (see FIG. 102A), at input L92 which comprises the $T_{AVG}$ for auctioneering is input from the model T10. Also, the model T2 has an input L93 which comprises the turbine impulse pressure from the steam generator model T24 (see FIG. 102C). The output L4 from the model T1 is also input to the rod position indicators (RODOUT) model T42, which processes all the information to set up the control board outputs. The panels receive input L94 from the rod position indicator model T42 which comprises the rod counter drive pulses, the trigger rod position signals and the rod bottom light signal. The trace model T17 previously mentioned provides an output L95 which comprises the in-core traces of which there are six maximum to the recorders on the NIS panel. The model T17 also produces an output L96 which comprises the thermocouple voltage for a selected thermocouple.

Referring again to the model T25, at input L97A which comprises pressure at the letdown line, pressure at charging line, pressure at fill header, and letdown enthalpy for input to the model T23. The chemical volume control system model T23 has an output L97B which comprises charging flow, charging enthalpy, and fill header flow to the model T25. The CVCS model T23 also has an output L98A which comprises the auxiliary spray flow and enthalpy for input to the pressurizer model T20. In return, the pressurizer model T20 has an output L98B which is the pressurizer pressure for input to the model T23. The model T23 has an input L99 from the valve handler which comprises all chemical volume control system valve admittance; at an input L100 from the pump handler which comprises the centrifugal charging pump heads. The positive displacement pump is calculated separately within the CVCS model T23. The model T23 has an output L101 to the controller handler which comprises an error output for the letdown pressure controller, an error output for the boric acid flow controller, an error output for the seal water flow controller, and an error output for the letdown temperature controller. The error output related to pressurizer pressure and level control are on L43A previously mentioned. The controller handler has an input L102 to the model T23 which comprises the controller output signal for letdown pressure control, boric acid flow control, seal water flow control, and letdown temperature control.

Referring to FIG. 102C, the STMGEN model T24 has an output L103 which comprises turbine impulse pressure for use in the analog electrohydraulic controller model T44; and the model T44 has an output L104 which comprises the governor valve positions for input to the model T24. The model T24 has an output L105 which comprises governor valve positions, high pressure turbine inlet temperature, and high pressure turbine exit temperature for input to the turbine vibration and casing temperature (TURSUP) model T45, which model calculates rotor eccentricity, turbine vibration, vibration and eccentricity phase angle, rotor position, casing position differential expansion, rotor temperature, turbine casing temperature, and roll up and roll down residences.

The model T24 provides an output L106 which comprises the high pressure turbine exit temperature, exit pressure, exit flow, shafts power, extraction flow, and extraction temperature that is input to reheater, LP turbine, feed heater thermal (RHMSER) model T46. The model T46 calculates the low pressure turbine steam flow and acceleration. The model T46 provides an output L107 which is the reheater inlet pressure and turbine shaft speed that is input to the model T24.

The STMGEN model T24 provides an output L108 which is line steam pressure and turbine impulse pressure that is input to the gland steam, turbine oil and generator cooling (BOPAUX) model T47, which simulates the gland steam seal system, the oil pressures in the turbine oil system, and the electrical generator hydrogen cooling system. Output L109 which comprises the gland steam pressures and turbine oil pressure is output from the model T47 to the model T24.

The model T24 has an input L110 which is the turbine feed pump steam flow that is output from the boiler feed pump characteristics (BFPEFF) model T48. The model T48 calculates the total steam flow to the feed pump turbines by considering the hydraulic horsepower requirements and the efficiency of the pump and turbine units. The model T24 has an output L111 which comprises four steam generator level error outputs and the steam dump controller error output that is input to the boiler feed pump speed and miscellaneous steam plant control (BOPCTL) model T49. The model T49 simulates the panel mounted control systems as well as several internal control systems.

The condensate and feed flow (FWFLUD) model T50 which calculates the feedwater systems pressures and flows, has an output L112 that comprises the feedwater flows through the boiler feed pump turbines to determine the turbine load that is input to the model T48. The model T50 has an input L113 from the model T24 which comprises the steam generator pressures; and an output L114 to the model T24 that comprises steam generator feed flows and feed enthalpies.

The auxiliary feed (AUXFED) model T51, which model simulates the auxiliary feedwater systems pressures and flows has an input L115 from the model T24 which comprises auxiliary feed line pressures. The model T51 has an output L116 to the STMGEN model T24 which comprises the auxiliary feedwater flows and enthalpies. The valve handler has an output L117 to the model T24 which comprises all the main steam system valve admittances except the governor valves.

The RHMSEP model T46 previously mentioned has an output L118 which comprises the turbine speed, low pressure turbine steam temperatures (inlet and exit); and the low pressure turbine losses which is input to the model T45. Also, the model T46 has an output L119 to the analog EH controller model T44 that comprises low pressure turbine pressures, inlet temperature, and turbine speed. The output L20 from the model T46 which comprises the reheater temperature is input to the reheater controller T52 on the control panel. The reheater controller T52 has an output L121 to the model T46 which comprises the reheat steam valve position.

The turbine speed output L122 from the model T46 is input to the generator exciter and regulator (EXGEMM) model T53, which model simulates the electrical generator and exciter. In turn, the model T53 has an output L123 to the model T46 which comprises the generator shaft power which is utilized for turbine acceleration calculation in the model T46. Also, the model T46 has an output L124 which comprises the low pressure turbine exit steam flow and enthalpy for input to the condenser (CNDSR) model T54, which model simulates the main condenser in the steam plant. In turn, the model T54 has an output L125 to the model T46 which comprises the condenser pressure and the condenser air quantity which is utilized for windage loss calculation.

The steam plant protective logic in the B machine shown as block T55 has an output L126 to the analog controller T44 which comprises the turbine trip signal and the turbine run back signal. The block T55 also has an output L127 from the B machine which comprises the turbine trip signal for the reactor trip that is input to the reactor protection logic of the A machines. In turn, the reactor protection logic in the A machine has an input through the B machine to the steam plant protective logic T55 which comprises the reactor trip signal and the turbine run back signal (L128). The input L129 to the block T55 which comprises all steam plant limit check signals for the protective logic is output from the steam plant limit checks (SECLIM) model T56, which model checks the limit of the plant process variable for the purpose of annunciation and protection.

The model T56 has an output L130 which comprises the alarm and annunciator inputs from the steam plant limit checks. This output activates the B machine output contacts. The input L131 from all steam plant program to the model T56 includes all steam plant variables for limit checking.

The generator, exciter, and regulator model T53 has an output L132 to the analog controller T44 which comprises the generator megawatt signal and trip signal. Also, the model T53 has an output L133 which comprises the generator terminal voltage that is input to the plant electrical system (ELBUS1, ELBUS2) model T57, which model calculates the logical variables denoting power status in the busses based on the position of the circuit breakers. In turn, the model T57 has an output L134 to the model T53 which comprises the generator megawatt and megavar load. The model T53 also has an output L135 which comprises the generator frequency; that is, shaft speed, for driving the synchroscope that is input to the synchroscope interface represented at block T58. The model T58 comprises logic chains in the B machine that select the correct frequency difference and drives the synchroscope hardware when it is in use. The model T53 also has an output L136 to the previously mentioned model T47 that comprises the generator heat losses for hydrogen cooling.

The inputs 137 from the valve handler to the model T51 are all the auxiliary feed system valve admittances; and the input L138 from the pump handler to the model T51 comprises the motor driven auxiliary boiler feed pump heads.

Referring to the previously mentioned condensate and feed flow model T50, the output L139 to the model T46 comprises the feed and condensate system flows for the calculation of heat energy balances. The input L140 comprises the gland steam pressures and turbine oil pressures for the low pressure turbine to the model T46 is output from the model T47.

The service water (SERWTR) model T59, which simulates the service water system according to the demands on the system and the number of pumps that are running has an output L141 which comprises the service water flow and temperature that is input to the auxiliary feed model T51. The input L142 to the model T59 from the valve handler comprises all service water system valve admittances; and the input L143 from the pump handler comprises the service water pump head.

The service water model T59 has an output L144 to the component cooling system model T32 (see FIG. 95/1D) that comprises the service water flow to the component and temperature to the component cooling heat exchanger. Also, the output L145 from the service water model T59 which comprises the service water pump motor electrical load is input to the model T57.

The condenser model T54 has an output 146 to the model T50 which comprises condenser pressure and hot well temperature. In turn the model T50 has an output L147 to the model T54 which comprises constant condensate flow and hot well level control flow (feed-drain). The model FWFLUD T50 also has an input L148 which comprises the boiler feed pump speed command that is output from the model T49. This boiler feed pump speed command L148 is also input to the model T48. The model T50 also has an output L149 which comprises the hot well level control signal and the condensate pump recirculation flow control signal that is input into the model T49. The input L150 to the model T50 comprises the feed network flows which are obtained from the flow network solution (CROUT) model T60. The model T60 mechanizes the solution of the feedwater network. In turn, output L151 which comprises the feed flow network pressure drop coefficients which are determined from valve admittances is output from the model T50 to the model T60. Inputs L152 and L153, respectively to the model T50 comprises the condensate pump heads and motor driven boiler feed pump heads, and all feed and condensate system valve admittances from the pump handler and the valve handler. The feed valves are commanded directly from the controller handler to the valve handler, which connection is not shown.

Referring to the model T47 previously mentioned, the output L154 which comprises gland steam flows to determine air leakage of the glands is input to the condenser model T54. Also, T47 has an output L155 to the model T49, which output comprises the gland steam condenser pressure and the generator hydrogen temperature. In turn, the BOPCTL model T49 has an output L156 which comprises the gland steam condenser bypass flow control signal and the generator cooling temperature control signal that is input into the gland steam model T47. The condenser model T54 includes an output L157 that comprises the condenser heat load to the circulating water that is input to the circulating water system (CIRWTR) model T61, which model contains the pressure and flow calculations of the circulating water system. In turn, the circulating water system model T61 has an output L158 which comprises the circulating water flow and temperature to the condenser that is input to the model T54. The valve handler and pump handler inputs L159 and L160 comprises all circulating water system valve admittances and circulating water pump heads respectively.

Steam plant instrument channel simulation (BOPA02, BOPA04) model T62 calculates the redundant measurements of process variables within the other models. The subroutine BOPA02 calculates the redundant analog outputs that are updated twice a second while BOPA04 calculates the four per second redundant analog outputs. Output L161 from the model T62 comprises the feed pump speed signal, steam generator level signals, steam header pressure signal for steam dump control, and steam generator pressure signal for atmospheric relief valve control that is input into the previously mentioned BOPCTL model T49. The model T49 in turn has an output L162 to the controller handler that includes the water feed pump speed error, the steam generator water level control error, steam dump control error, relief valve control error, heater drain tank level error, condensate pump recirculation controller error, gland steam condenser bypass control error, and the generator hydrogen temperature control error. The controller handler has an input L163 to the model T49 which comprises the controller output corresponding to the input L162. L164 is the valve admittances for the miscellaneous steam plant control valve from the valve handler.

The steam plant instrument channel model T62 previously mentioned includes the input L165 that comprises all steam plants variables having instrument outputs. As previously mentioned, the redundant measurements are not included. The redundant instruments outputs are generated within the model T62 from single variables received from the steam plant dynamic programs. The model T62 also has an output L166 which comprises all instrument both meter and recorder outputs to the balance of plant panels. These outputs are scaled.

The plant electrical system model T57 has an output L167 to the pump handler which provides the bus energize status for all electrical busses supplying pumps; and an input L168 from the pump handler which comprises all pump motor load current. The output L169 from the model T57 to the valve handler comprises the bus energize status for all electrical busses supplying motor operated valves.

The model T57 has an input L170 from the circuit breaker status referred to as T63 in the B machine which comprises the circuit breaker open-close status for all plant bus circuit breakers. The model T57 has an output L171 which comprises the diesel-electric megawatt and megavar load to the input of the diesel generator and diesel electric bus system (ELCRNT) model T64.

The diesel generators model T64 simulates three loads of diesel generator operation; that is, not tied to the load, tied to the load, and sharing the load with the main network. The modes of diesel generator operation depend on the breaker position. The model T64 has an output L172 which comprises the diesel generator operating status; that is, running or stopped, thus the voltage available or not for each of the three generators for input to the model T57. Also, the model T64 has an output L173 which comprises the frequency for each generator for the synchroscope drive model T58.

The synchroscope interface model T58 has an output L174 to the panels which comprises four synchroscope frequencies. The frequency is scaled and supplied as an analog output voltage. The voltage is applied to a voltage control frequency generator whose output is amplified to drive the synchroscopes. Contact outputs are set up according to synchroscope status; that is, synchroscope "connected" or "disconnected" and bus breaker open or close. On the diesel panel, contacts also select which of the three synchroscopes is active.

The model T46 has an output L176 to the gland steam model T47 which comprises turbine speed and the turning gear oil pump status. The model T46 also has an output to the model T49 comprising heater drain tank level (L177); and an input L178 from the model T49 which comprises the heater drain tank level control signal.

The reactor model initialization and simulation is described in detail in U.S. Pat. No. 3,916,444, issued Oct. 28, 1975, entitled "Training Simulator for Nuclear Power Plant Reactor Monitoring", which is incorporated herein by reference.

ACCELERATD XENON CALCULATION

(XELEAP, TSTEP)

Once a reactor power change occurs, a long time is necessary to achieve equilibrium of xenon. For example, if the reactor is at zero power and is brought to full power approximately two days is required for the xenon to be in equilibrium or steady-state. For training purposes therefore it is obvious that the instructor needs to have intermediate points and/or the equilibrium point to train at without waiting an extended period of time to achieve it.

In accomplishing the xenon simulation in this aspect, it is necessary to provide a solution to the non-linear flux-xenon system while maintaining a critical reactor. Such a problem is termed non-linear because the flux is dependent on the xenon and similarly the xenon is dependent on the flux. Thus, a clean analytic solution is less satisfactory than an approximate iterative solution. Also, as time proceeds, the amount of the decay heat changes; and therefore, the amount of fission power, which is proportional to flux, varies to maintain a specified power level.

The program XELEAP is used in the model by first changing the reactor power to some new value either by rod movement or boron change; and then if the instructor wishes to illustrate the long term effects of xenon several hours later he interrupts the computer to stop the simulation. He then enters the value of the time step that he wishes to take. To aid in the accuracy of the solution, without greatly reducing the speed, the time step which is specified is internally divided into five hour segments. However, the instructor sees only the full step which he specified. Then, the program XELEAP is called in from disk and the decay heat using average parameters is iterated until the fission power equals the total power minus the decay heat power. Then, a time function is used for total flux, thermal flux and fission cross-section and each space node G. Then these linear functions are used to integrate the xenon and iodine differential equation using rates of change and time step. Next an estimate of the compensating change in boron is made, which estimate is used in the calculation of the multiplication and flux. The boron is iterated until the multiplication is one or critical. The flux produced from this critical reactor condition is then used to reapproximate the linear function which produces a new xenon and iodine function. Then when the flux is converted to xenon and the last five hour time step is reached, the delayed neutrons, detector outputs, and the xenon and iodine index are set. The results are then printed and control is returned to the computer to commence simulation.

The time step taken need not produce an equilibrium solution but only a critical one. Thus, an instructor can get to any point of the xenon oscillation, power startup, or partial shutdown in a few minutes.

If it is only desired in the simulation to provide for an accelerated xenon solution only at shutdown where no fission flux is utilized to calculate iodine, xenon and fission products decay heat for a time, the routine TSTEP can be utilized which provides analytic time steps for fast xenon and decay heat at shutdown. This program or subroutine is run on-line from the programmer'console of the C computer and allows large time steps to be taken.

Reactor Core Thermal Hydraulic Simulation (THERML)

The thermo-hydraulic model T12 provides for simulating the flow of coolant (in this case pressurized water) through the reactor and the heat transfer from the reaction to that coolant input is the reactor inlet enthalpy of the coolant and the coolant flow. The output of the T12 model is the outlet enthalpy of the coolant.

The core coolant thermal-hydraulic simulation is based on a one dimensional model. The coolant negative temperature reactivity effects, utilized in the previously described reactor space-time kinetics model, are obtained from the average one dimensional simulation of the reactor core thermal-hydraulic model. This is accomplished by supplying the core inlet and outlet enthalpy to the space-kinetics model, where the enthalpy rise is subdivided and allocated to the mesh points in proportion to the power being generated by the reactor. Two phase flow in the pressurized water reactor core of the present embodiment is not represented, however the negative reactivity effect from boiling voids is simulated on a gross basis by equivalent absorption (the boron equivalent of 95%) for malfunction or accident conditions which lead to a two phase core flow. An actual fuel rod has a tubular cladding that forms the outer cylindrical surface with fuel pellets packed inside to form a single rod of fuel.

The fuel rod thermal calculation is based on a two radial node $T_{f1}$ and $T_{f2}$ model with a fixed fuel gap coefficient. This coefficient is coupled to a single average point $T_{cw}$ in the coolant channel. The time dependent mixing effects are represented by single first order time lag functions, with the time lag being inversely proportional to volumetric flow rate at full power. As shown in FIG. 96/8, the cylindrical fuel rod is simulated in two lumps, an inner lump $T_{f1}$ to represent pellets and an outer fuel rod lump $T_{f2}$ to represent the cladding. The outer fuel rod lump $T_{f2}$ contains one-half of the total fuel mass, the entire cladding material, and the fuel cladding gap. The equations describing the heat transfer from the fuel rod to the water are as follows:

$$(Mc)_{f1}\frac{dT_{f1}}{dt} = K_1 f q_t k_f - (UA)_{f1f2}(T_{f1} - T_{f2})$$

$$(Mc)_{f2}\frac{dT_{f2}}{dt} = K_2 f q_t k_f + (UA)_{ff}(T_{f1} - T_{f2}) - (UA)_{fcw}(T_{f2} - T_{cw})$$

-continued $$(Mc)_{cw}\frac{dT_{cw}}{dt} = K_{cw} f q t + (UA)_{f2cw}(T_{f1} - T_{cw}) - (1 - k_b)W(Hcw_i - Hcw_i)$$

where $f_1$ and $f_2$ represent the two fuel lumps, f represents the power in watts, T is the temperature, $M_c$ is the mass and specific heat, qt is the power, and $C_w$ is the coolant water.

The reactor core fluid transport model uses the "inherent delay" description. Thus, a spline fit function is utilized herein with $H_{cw}$ equivalent to $f(T_{cw})$ where $T_{cw}$ is the transport time through the fuel section and:

$$\left(H_j\left(t - \frac{\tau cw}{2}\right)\right) = \tfrac{1}{2}[H_{j-1}(t - \tau cw) + H_{j+1}(t)]$$

Solving for the outlet enthalpy $H_{j+1}(t)$ the above equation produces:

$$H_{j+1}(t) = 2H_j\left(t - \frac{\tau cw}{2}\right) - H_{j-1}(t - \tau cw)$$

The transport time is approximated by first order lags, and two new state variables, $H_1$ and $H_2$ (corresponding to $H_{j+1}$ and $H_j$ respectively) are introduced. In this case, $H_{j-1}$ corresponds to $T_{cw}$ and these equations are $$\frac{\tau cw}{2}\ \frac{dH_1}{dt} = H_{cw} - H_1$$

$$\tau cw\frac{dH_2}{dt} = H_{cwi} - H_2$$

$$H_{cwo} = 2H_1 - H_2$$

These equations are calculated by linear approximations to alleviate roundoff error problems at zero power.

Overpower and Overtemperature Protection (SETTMP)

To maintain fuel rod structural integrity and prevent the release of fission products in a real reactor, the fuel cladding of the reactor fuel rods must be prevented from overheating under all operating conditions. This is accomplished by preventing departure from Nucleate Boiling (DNB), because DNB causes a large decrease in the rate of heat transfer from the fuel cladding to the coolant, resulting in high fuel cladding temperatures. The measure of insurance that DNB will not occur is the DNB ratio, which is defined as the ratio of the predicted DNB heat flux to the actual local heat flux.

Both the heat flux associated with DNB and the location of DNB are important. Thus, the overall power distribution peak should not exceed either the linear power density limit or the minimum DNB ratio at any time during a fuel cycle. The limiting axial power distribution, that is along the Z-axis, may not occur simultaneously with the maximum radial power peak (X-Y axes). Given a radial distribution, the limiting condition on power is determined by the shape of the axial (Z) distribution, and not by a fixed peak to average ratio of power density. For example, a small peak in the top of the core on a relatively flat power distribution may be DNB limited. In the bottom of the core, a much greater peak is allowable and may be limited by linear power density.

In simulating the overpower and overtemperature protection, Z-transform approximations are utilized for DNB protection. The inputs to the program SETTMP in the model T19 include the average coolant temperature, the coolant pressure, and the reactor flux offset hereinbefore described.

Automatic trip set points are provided such that the DNB ratio is less than 1.3. These trip set points are derived by Z-transforming the transfer functions of the calculator. Also, a limit on the depth of insertion of the rods is provided for each control rod bank. The overtemperature t trip is in accordance with the following equation:

$$\text{Setpoint} = K_1 - K_2\frac{1 + T_1S}{1 + T_2S}\,\text{Tave} + K_3P - f(\Delta q)$$

where $K_1$ and $\tau_i$ are constants, P is the RCS pressure and f(Δq) is a function of reactor power offset. The overpower Δtrip is in accordance with the following equation:

$$\text{Setpoint} = K_4 - K_5\frac{T_3S}{1 + T_3S}\,\text{Tave} - [K_6(\text{Tave} - \overset{c}{\text{Tave}})] - f(\Delta q)$$

and Tave is the programmed Tave at full power.

The control rod bank insertion limits are algebraic functions of relative Δt across the reactor. These low limits and low-low limits set off alarms if the rods go in further than the set point limit for that particular bank.

Referring to the control panel of FIG. 92I, the meter SOUR indicate the count rate of the source range detectors. The meters YRSUR indicate the startup rate of the two source range detectors. The meters SRSUR indicate the startup rate of the intermediate range detectors and the meters YNTER indicate the current which is representative of the amount of flux in the intermediate range detectors The meters OFFSET and the meters TPOW represent the power range detectors and indicate the axial offset between the top and bottom power range detectors A and power range detectors B, respectively to guide the operator in positioning the part length rods. Also, the recorder PRTOP records a current in the ion chamber for each one of the top or power range detectors A and the recorders PRB record the ion chamber current for the bottom or power range detectors B The panel illustrated in FIG. 92G has a recorder NR45 which records overtime the flux of the source range detectors in the simulator. The recorders are wired directly to the meters so that they follow the indication on the meters.

The ex-core detectors are simulated in the model T3 by the program DETOUT. This simulation calculates the flux in the ion chambers for the source range, intermediate range and power range from the flux shape, and the time-in-life of the fuel rods. The source range randomizing for the meters and the audio output is included. Also, the malfunction of nuclear instruments is included in this routine. The inputs to this routine DETOUT include the reactor flux shape, and the status of the control power contacts HV for each of the detectors. Also, the range switch, operation selection, for the source range and intermediate range detectors are input to the program. The outputs of the program DETOUT are coupled to the nuclear meters on the control panel in FIG. 92I, the meters on the control panel and the audio count rate position.

Each of the power range detectors represents spatial flux power for one octant of the reactor core. The output of the X-Y synthesis model is applied to each quadrant of the core. The average flux for each of the power range detectors A and B respectively is calculated for its particular octant with an overlap in a vertical direction of 10% of the top detector reading coming from the bottom of the core and 10% of the bottom of the core going to the top of the core. The conversion is made from the flux to the meter output by normalizing at full power for each instrument range at each point in fuel rod life.

The source range and intermediate range kinetics are calculated for each point G in the previously described space-time kinetics model T8. The axial flux distribution is calculated from the X-Y synthesis simulation, and the small source term now becomes dominant The radical (X-Y) flux tilt from the previously described X-Y synthesis simulation is multiplied by the intermediate range detector readings; and a small constant difference is applied between the two detectors in each of the intermediate and source ranges to provide realism.

In the source range, stochastic variations in the count rate are prominent, both on the visual meters or indicators and the audio count rate meter. In order to provide absolute realism in both the visual and audio meters, it is necessary in the source range that the power output be randomized. Otherwise, there will be a sequence or rhythm to such pulses thus indicating to the student that such readings differ from the actual nuclear instrumentation system. The stimulation of the output to the audio and visual meters from the source range detector is a hybrid arrangement whereby an average count output rate from the model is an input to a randomizing hardware device external to the computer that produces a random output pulse train varying according to the average input. The startup rate meters SRSUR and YRSUR are calculated as the log of the output at the present time step divided by the output at the previous time step. Because of the rapid variation in source level between subsequent time steps, a twelve second filter is used on the source range SRSUR.

The reciprocal of the source range nuclear power level, which is calculated in the subroutine DETOUT, is scaled for input to the randomizing count rate equipment. The input data for the count rate equipment is transmitted from the sigma 5 computer via the high speed data link to the P2000A computer where the bit pattern for the scaled 16 bit number is used to set up 16 corresponding contact outputs, which outputs are updated four times per second.

To completely simulate the nuclear power plant operation at zero power and during startup, it is necessary to drive the nuclear instrumentation system source range with pseudo random pulses representing neutron radiation ranging in count from 10 to $10^5$ cycles per second. In the sigma 5 computer 100 random numbers are provided to vary the power level and convert it to 16-bits for application to the buffer 102. Thus, each quarter of a second the input number or control word is randomized slightly to provide further random characteristics that are input to the counter 100.

Reactor Control Rod Simulation Software

The control rods in a nuclear reactor govern the fission in a reactor. When the control rods are fully inserted, the reactor is shut off and as they are withdrawn from the reactor, the fission rate and hence the heat of the reactor increases. The actual system also includes an automatic rod control system that responds to the load demand of the power plant, so that as the load demand increases or decreases, the control rods are operated accordingly.

The reactor control rods of the type being simulated are controlled by a latch assembly, consisting of gripper latches and armatures. Gripper latches engage a grooved drive shaft of the assembly to lift, lower and hold the shaft. The armatures are actuated by operating coils which are energized in a latch, lift and hold sequence for stepping the shaft upwardly or downwardly in the core. The rod sequence is simulated in the model T1 in the B machine by continuous variables which are truncated to integers for a position indication under the constraint of automatic or manual control, bank overlapping, rod disconnects, and the rod stop and trip logic. This model also includes rod malfunctions; and such malfunctions include rods that fail to move on demand, continuous rod outward or upward movement without actuation of the in-out lever, failure of the shutdown or control bank to overlap, failure of the automatic controller a dropped full length rod, actual position meter failure, part length rod or bank moved in opposite direction from that demanded, a complete group of a bank drops into the core, and a complete group slips 100 steps into the core.

For a complete description of the simulation of the reactor control rod mechanism reference is made to U.S. Pat. No. 3,914,794, issued Oct. 21, 1975, entitled "Training Simulation for Nuclear Power Plant Reactor Control Model and Method" which is incorporated by reference herein.

VALVE HANDLER (VCHAND)

A valve handler subroutine, VCHAND, is executed in the C machine to handle the movement of the majority of simulated valves according to input commands from the control panels when the operator moves the various switches, and calculates valve coefficient CV values for the valves for calculating admittances in the simulator models. Also, the subroutine VCHAND provides the display of the states of some valves on meters and lights where appropriate.

The subroutine VCHAND examines raise or lower commands and power bus logicals, compares them with the present state of the valves, and then updates the state of the valves according to certain specified rules. The rules for the subroutine VCHAND provide that, if the power supply to a valve has failed, the valve will remain stationary and all other commands will be ignored. If the valve should have open/closed lights associated with it, both lights are turned off. Also, the raise or lower command of a valve is dispatched from the A or B machine without any knowledge of the valve position. If a valve is either fully opened or fully closed, the command to open or to close the valve further is ignored. If a valve has not reached its limit position, the command to raise or lower is accepted, and the valve ramps up or down by a pre-assigned rate of movement. The CV value will then be updated. Further, the CV value of the valve is calculated by linear interpolation from the values of the maximum CV for a respective valve and valve position.

If a valve has open and closed lights associated with it, the status of the lights is updated when the valve position has changed. The open or closed light is turned on when the valve is fully open or fully closed. Both open and closed lights are turned on when the valve is between the two limit positions. Finally, if a valve has a meter attached to it, the meter display is updated when the valve position has changed; and if the valve position of a group of selected valves is required by the instructor's console, the appropriate value is dispatched.

The valves to be handled are grouped according to service requirements. As mentioned above a valve can have lights and/or a meter attached to it. An option number is assigned to each group to identify the service required. Valves with no lights or analog outputs have an option 0, valves with lights but no analog outputs have an option 2, valves with both lights and analog outputs have an option 3. The option number is derived from a binary bit combination of 1 bit for analog output and 1 bit for lights.

The raise and lower commands for valves from the A and B machines, are packed bit logicals. The raise bit logical and the lower bit logical for any given valve are separated by 31 bits; that is, one whole Sigma 5 or C machine word apart, and they are grouped according to the option number. The raise bit-logical word always precedes the lower bit-logical word. It is organized in the A and B machines such that the bit logical for the first valve of any option always starts at the first bit location of an A or B machine word. Because of the difference in the word size between the A and B machines and the C machine, the first raise or lower bit logical can be located in either the first or the second half word of a C machine word. Referring to the appendix, the bit structure of these two possibilities is illustrated. The bit number corresponds to the valve number in the option. A half word displacement is used to indicate the starting location of the raise command.

The raise/lower command signals are triggered by either control panel switches or by the instructor's console. The command signals are not normally removed when the valve has reached its limit position. One way to remove the command when the valve has already reached its limit position is to maintain a valve open/-closed status table. The valve open/closed tables are located in the labeled COMMON/VPOSB. They are grouped according to the option number and the computer from which they come. The valve open/closed table structure is exactly the same as the raise/lower table structure such that logical operations can be performed on 32 bit words. The fully open status bit for a given valve is located in the same bit location as the raise command for the same valve. Similarly, the fully closed bit location corresponds to the lower command. When a valve has reached its limit position, either the open or the closed bit will be set; if the valve has not reached either of its limit positions, both bits will be reset. The open and closed bits are mutually exclusive. Two logical operations are required to remove the command when the valve has already reached its limit. These operations are expressed by the following equation:

$$Raise=(Raise.OR.Open).EOR.Open$$

where raise and open are used to denote the bit status of raise and open. The same expression is applied to lower and close bits.

Figure 17A:
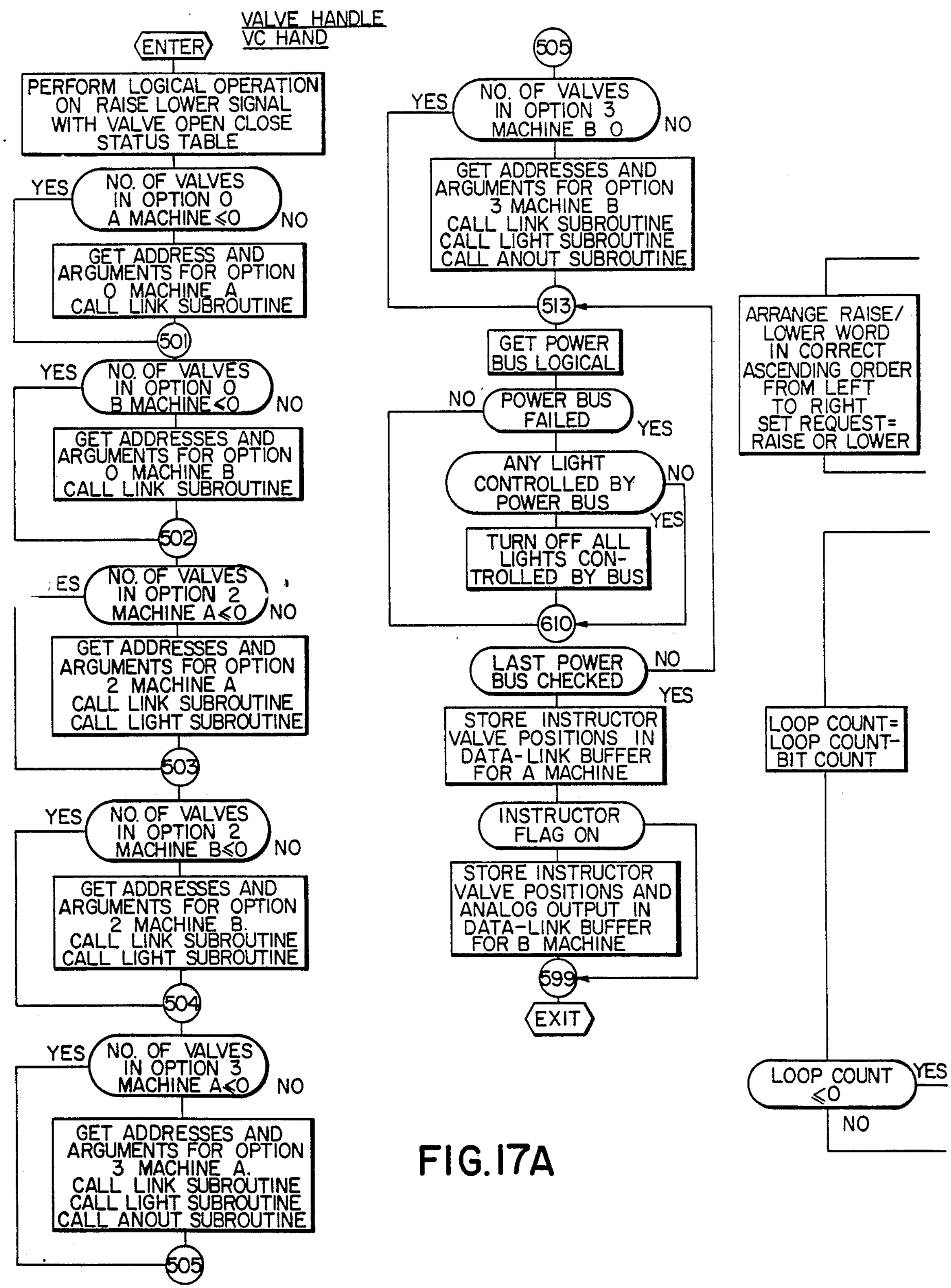
FIGS. 17A through 17D consecutively, illustrates the flow charts for the valve handler program VCHAND.
Figure 17B:
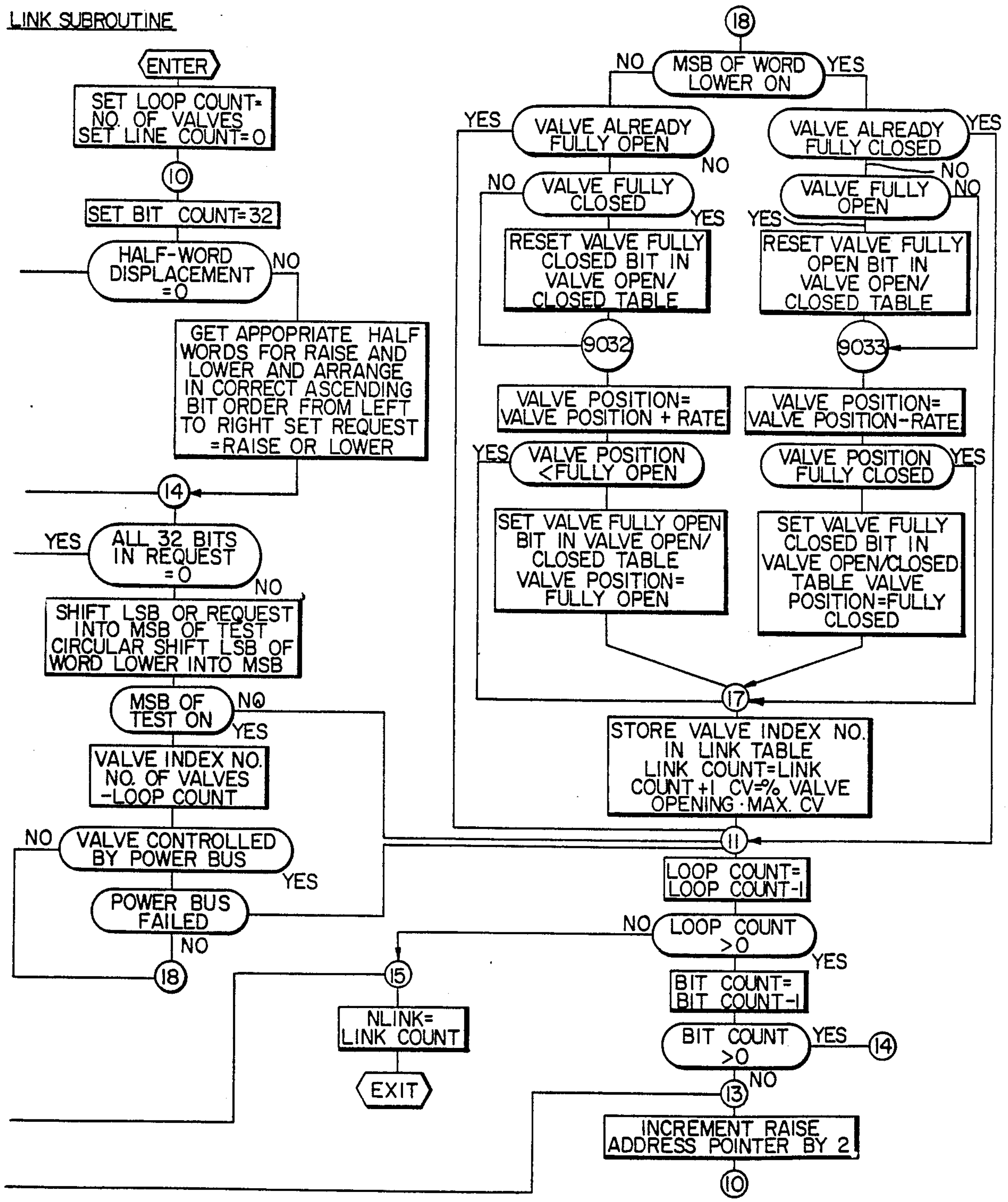
Figure 17C:
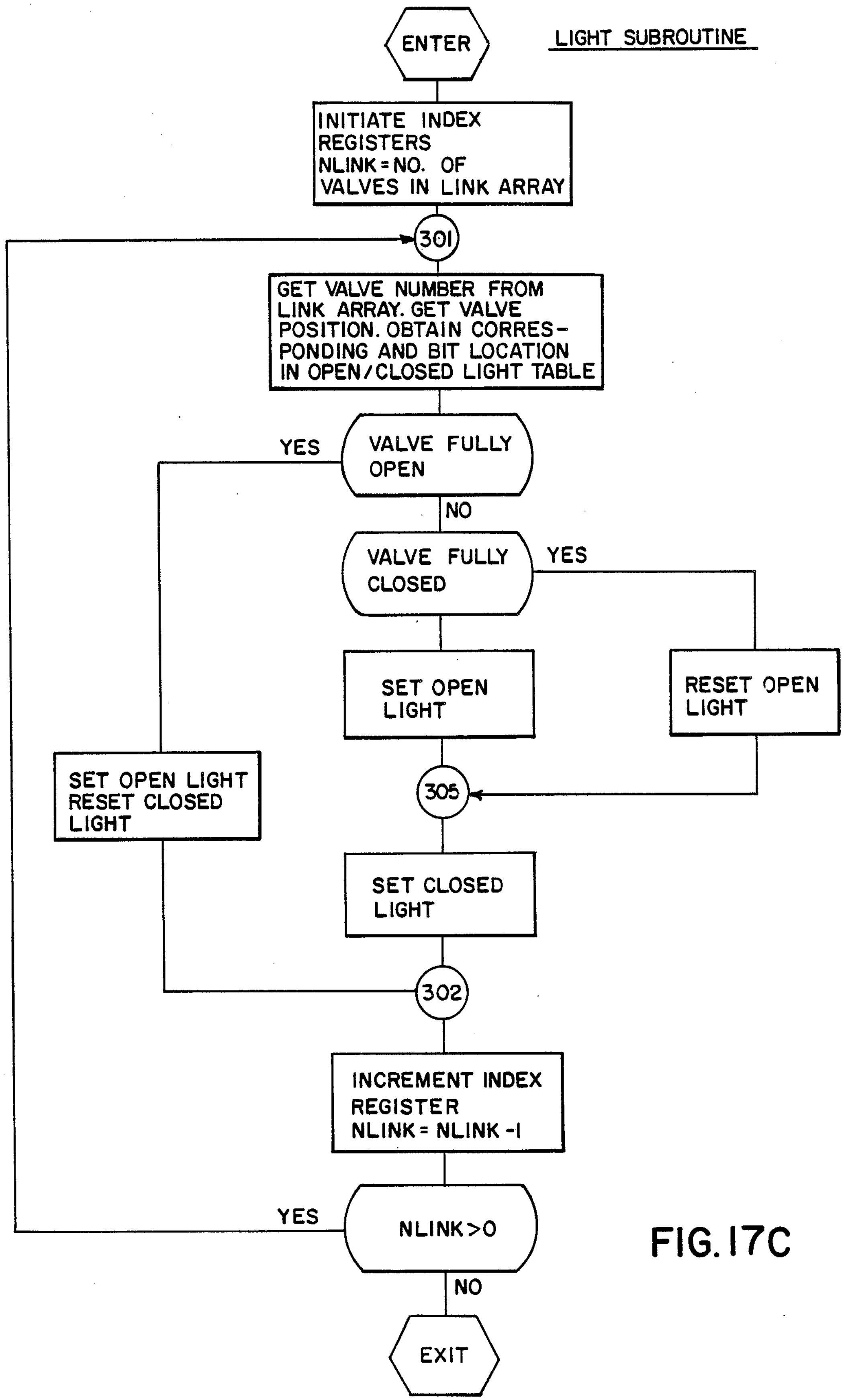
Figure 17D:
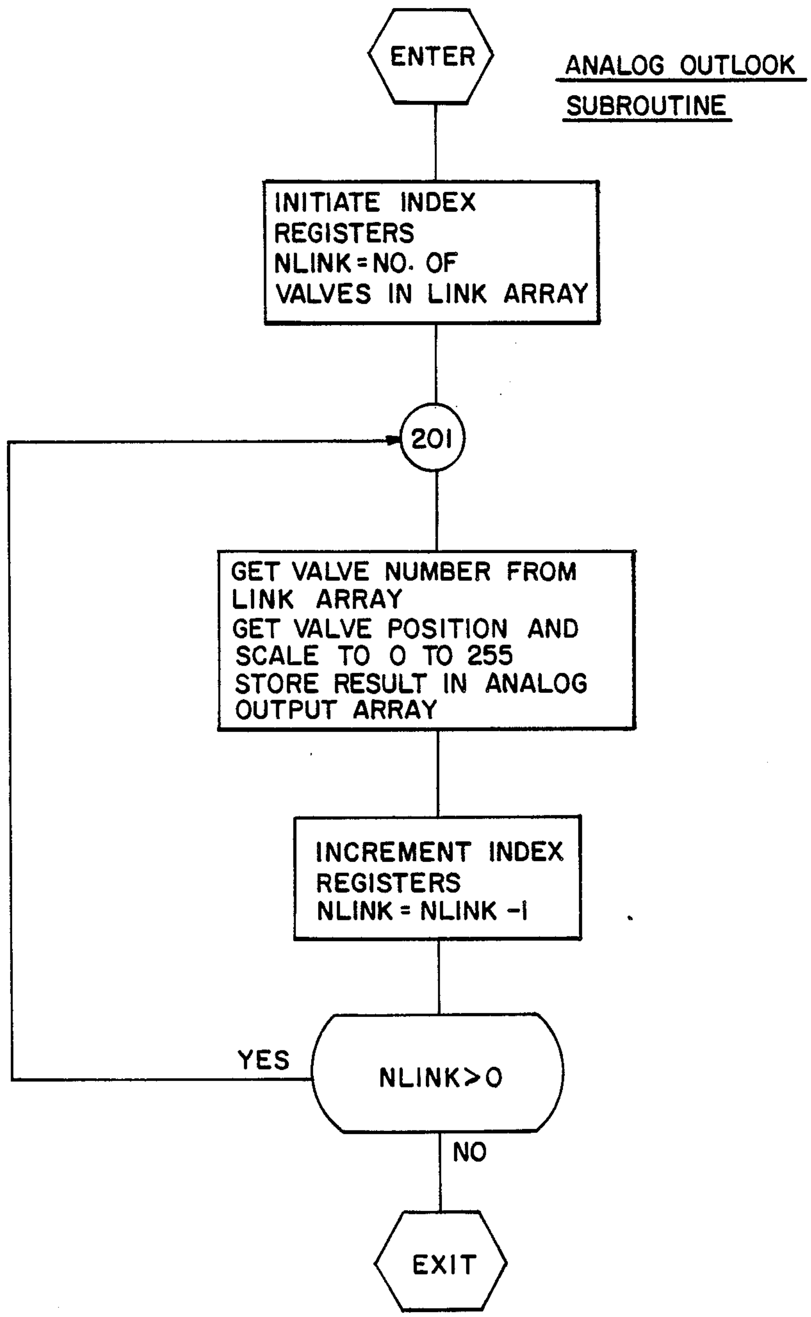

With reference to the flow chart of FIGS. 17A and 17B, the subroutine VCHAND has several internal subroutines; Each internal subroutine is written to serve a particular function. A LINK table is set up after the raise/lower command and the power bus logical has been examined. This LINK table contains all the valves, within a given option and given computer, that will require moving. Each valve index occupies one-half of a word. The number of valves in the table is contained in the variable NLINK. The LINK table is utilized by the various subroutines called by the valve handler program. The particular subroutine that is to be called will depend on the option number that is being served. The same LINK table is used by the different options and computers, which conserves core space. However, the content of the LINK table is initialized every time when a given option and computer is processed.

The valve-to-bus reference table is a byte table containing the power bus index which supplies the power to a given valve, which is controlled by the auxiliary power portion of the simulator. The order of the table is the same as the order of the valves in the given option and computer. The names of these reference tables are VTBA1, VTBA2, and TBA3 for options 0, 2, and 3 for computer A. The names of the reference tables for option 0, 2, and 3 for computer B are VTBB0, VTBB2, and VTBB3. The power bus index is different from the power bus number. The power bus logicals are located in the fourth to the nineteenth word location in the COMMON/ALB7/.

For indexing purposes, the index numbers 3 to 18 are used in lieu of the power bus numbers. Thus, power bus logical 3 corresponds to power bus number 32, power bus number 6 corresponds to power bus number 35, and so on consecutively up to power bus index 18, which corresponds to power bus number 49.

The valve-to-bus reference table is initiated by the program VCINIT during the initialization phase. The table is used by the valve handler VCHAND to examine whether the controlling power for a valve is on or off.

When a power bus bas failed, by the throwing of a switch or instructor operated malfunction, all the associated open/close lights of valves are turned off. This function is performed by the valve handler via the power bus-to-light reference table. This table consists of two individual subtables. The first subtable is the pointer table. There are 16 half word pointers, one for each power bus. Each of these pointers contains the relative starting location, start zero, from the beginning of the second subtable a half word flag "FFFF" is used to denote that the given power bus does not control any open/closed light. The order of these pointers corresponds to the order of the power bus index from 3 through 18 consecutively as described above.

The second subtable of the bus-to-light reference table is the location subtable. This location subtable contains a set of half word tables which provide the word and bit locations of all the valve fully open lights that are controlled by a given power bus. The list of light locations for a given bus is terminated by the aforementioned half word flag "FFFF". The word and bit location of a light in the list will provide the bit location for the open light in the first word location for light. The bit location for closed light is exactly 32 bits or one word behind.

Since the same power bus may control lights on panels controlled by the A machine and/or the B machine, two bus-to-light reference tables of the same structure are used. One table applies to the A machine, the other to the B machine. These tables are located in the COMMON/VBUS/ and have the array names of HWDISA, HWDISB, BTLMA, and BTLMB for half word displacement pointer and bus-to-limit switch lights for the A and B machine respectively.

When a particular power bus has failed, the handler VCHAND will examine the appropriate pointer for the A machine. If the pointer contains "FFFF", the program will not reset any light. If the pointer contains no other values, VCHAND will use the pointer as half word index and proceed to pick up the word and bit location of the first open light and the closed light in the limit switch light output table. The processing is repeated for the other word and bit locations within the list until the terminating flag "FFFF" is encountered. The same procedure is repeated for the B machine.

The option 2 and option 3 valves, which have open and closed lights attached to them, are bit-packed logicals in the data link buffer. They follow the same convention of the raise/lower bit logical. The open bit logical is exactly 1 Sigma 5 or C machine word ahead of the closed bit logical. These bit logicals are grouped according to the option number and the computer. The order of the bit logicals within a given option and computer follows the same order as the raise/lower command of all other associated variables. The first bit logical may start in any bit location within a word. To facilitate this, a bit displacement constant for lights for each option and computer will be read by VCINIT during the initialization phase.

The format of the analog output array for option 3 valves is the same as that for the analog output handler ANHAND. The analog output for each valve contains the analog card and point number, with a quantized integer output such that 8192 corresponds to the fully open position. The valve ramp rate table is a half word integer array. Each half word contains the ramp rate of the valve, in quantized steps per sample time.

With reference to the flow chart of FIGS. 17A and 17B, the VCHAND subroutine sequence is summarized as follows. First, it performs the logical operation on the raise/lower command with the valve open/close table such that when a valve is fully open or closed, the corresponding raise or lower command is reset. Then, option 0 valves for the A machine and the B machine are processed by calling the routine LINK. The routine LINK examines the raise/lower commands and the power bus logicals from the A and B machines. Any valve which is still moving and has not reached its limit position or desired position is placed into the LINK array. Any valve which has an associated power bus failure, or is not required to be raised or lowered, will not be placed in the LINK array. For those valves in the LINK array, the routine also updates the valve positions, the valve open/close table, and the CV value.

Next, the option 2 valves for the A and B machine are processed by calling the LINK routine and the routine for function 2. The latter routine updates the open/-closed lights according to the LINK array and the valve position. Then, option 3 valves for the A and B machines are processed by calling the LINK routine, the routine for function 2 and the routine for function 1.

The function 1 routine updates the analog output values of the valve positions according to the LINK array. Next, the power bus logicals are checked. If any power bus has failed, the attached lights controlled by the power bus are turned off. Then, the instructor flag INSFLG is checked. If the flag is on, the selected valve positions are transferred to appropriate data link buffers for conversion to analog outputs. The valve numbers in this category are contained in the valve position-to-P2000 reference table. Finally, control is returned to the synchronization and control program.

The subroutine VCINIT initializes the reference tables and constants requires by VCHAND during the initialization phase. The items that are initialized during this phase are, the number of valves in each option and machine, the valve ramp rate table, the CV maximum table, the valve-to-power bus table, the analog card and point numbers in the output array, the half word displacement in raise/lower word, the power bus-to-light reference table, the valve position-to-P2000 table. In addition to the foregoing items, VCINIT also initializes all the dynamic states of a valve to correspond to the steady state as dictated by the CV value. The CV values are initialized by the model programs prior to the execution of the initialization subroutine VCINIT. The associated valve states are the valve position, the valve open/close table, the limit switch output lights, and the analog output. This approach minimizes the initial transients due to mismatch in the states of the various systems. Although the present embodiment preferably operates with the described valve handling functions and methods, many features of the invention can be implemented with alternative valve handlers which are configured to handle valve motion and display and valve calculations differently from the manner described herein.

CONTROLLER HANDLER (CONHAN)

The controller handler subroutine CONHAN handles the operation of the auto/manual controllers and their associated valves such as in the feedwater system, for example. CONHAN also displays the output of the controllers on meters and lights where appropriate. The controllers are situated on various control panels associated with the particular subsystems that are controlled and are supervised by the A and B machine. The mode of operation of a controller is determined by various input commands from the associated models.

The function of the subroutine CONHAN is to examine the input commands from the control console and/or the interlocking circuitry, and update the controllers accordingly. Such controllers are simulated to operate in the following manner. If a controller has malfunctioned, the auto/manual and raise/lower commands are ignored. The controller moves according to some predetermined ramp rate to the malfunction position as given by the instructor via the instructor's console. The controller does not adjust its internal values to prepare for bumpless transfer. If the auto/manual command is in auto, the raise/lower command is ignored.

The three term controller action with the transfer function of $$(K(1+\tau_D S+1/\tau_I S)$$

where K, $\tau_D$, and $\tau_I$ are the gain, derivative time constant, and integral time constant, respectively, is simulated. To eliminate wind-up, the reset value is pegged at the saturated value of the controller.

If the auto/manual command is in manual, the controller either remains stationary or ramps up or down according to the raise/lower commands. The ramp rate is the same predetermined value as the malfunction rate. The internal variables of the controller in this instance are adjusted to prepare for bumpless transfer from manual station to auto station. Also, the simulator converts the controller output into a format suitable for analog output. The valves associated with the controller are operated by CONHAN instead of VHAND, the valve handler, because the simulated controllers operate on a time step of 4/5 while valve handler operates on time step of $\frac{2}{3}$ for example. For controllers with valves, the normal input into the valves comes from the controller output instead of the associated levers. However, if the valve is tripped, the input into the valve becomes a preassigned constant called the valve trip constant. The magnitude of the constant is chosen so as to simulate the trip-safe mechanism in a valve to either fully open or fully closed at some predetermined rate. A first-order lag is used to simulate the dynamics of a valve. The CV value of a valve is calculated by linear interpolation from the values of the maximum CV and the current valve position. If there are open/closed lights attached to a control valve, the status of the appropriate lights are updated according to the valve position.

The controllers to be handled by the subroutine CONHAN are divided into four groups, two groups for the A machine and two groups for the B machine. The two groups in each computer are assigned option numbers according to the service required. The option numbers are derived from binary bit combinations of one bit for analog output, one bit for lights, and one bit for controllers, in the same manner as valve option numbers previously described. With respect to the controller handler, option five is for controllers with analog output, and option seven is for controllers with analog output and open/close lights. An option seven controller always has a valve attached to it.

The auto/manual command for controllers are dispatched from the A and B machines as packed bit logicals. The command is in auto when the bit is set, and manual when reset. The bit and word correspondence between the C machine and the A and B machines has been described in connection with the FANPAK program. The first auto/manual bit logical may be located anywhere within the Sigma 5 or C machine word. For this reason, there will be a bit displacement constant and a half word displacement associated with each group of auto/manual bit logicals. The total bit displacement is the sum of the two displacements. The half word displacement is introduced for programming purposes. The order within each group of bit logicals is preassigned such that the same order is used in all the other associated variables.

The raise or lower commands for controllers come from the A and B machines as packed bit logicals. The raise bit logical for any controller is 32 bits in front of the lower bit logical. The organization is the same as the raise/lower command for valves in the valve handler VCHAND. The grouping of the raise/lower bit logicals follows the same organization as the auto/manual bit logicals. The first raise/lower bit is also in the same bit location as the first auto/manual bit. Thus, the bit and half word displacements for auto/manual commands are also the bit and half word displacements for raise/lower command.

Associated with each controller which can be malfunctioned, there is a malfunction logical in the malfunction table. The relative location, start zero, of the malfunction logical is contained in the controller-to-malfunction reference table. This table contains a group of byte pointers, and a byte flag, FF, is used to denote that the particular controller has no malfunction assigned to it. The grouping and the ordering of the byte table is organized in the same way as the controllers. This table is initialized during the initialization phase.

The malfunction table contains the malfunction information as given by the instructor. The table is divided into tables of equal dimension. The malfunction logical variables are contained in the first table, and the desired valve positions are contained in the same relative location in the second table. The desired valve positions are quantitized integers between the range of 0 and 8192. The value of 8192 is used to denote the fully open position.

The format of the analog output array is the same as that for the analog output handler, ANHAND. The analog output for each controller contains the cards and point numbers, with a quantitized integer output value between 51 and 255. This range is used because all the controllers meters have the meter range of 1 to 5 volts. The information is packed into one-half of a word. The first analog output for any given option, option 5 or option 7, may start with a displacement of a certain number of half words. To accommodate this, each group of controllers has an analog output displacement constant which is read during the initialization phase.

The option 7 control valves have open and closed lights associated with them. When the valve is either fully open or fully closed, the open or closed light is turned on. When the valve is between the two limit positions, both the open light and the closed light is turned on. Such lights are packed bit logicals in the data link buffer. The format is the same as that for option 2 and option 3 valves handled by VCHAND. The bit displacement constants for lights is initialized during the initialization phase.

The function of the controllers to be simulated may consist of any combination of the proportional, integral, and derivative action of a three term controller. A PID indicator table is used to specify the action of each controller. The PID indicator is a byte flag, 8 bit, with one bit each assigned for the proportional, integral, and derivative action. A controller may or may not have a valve attached to it. A controller type indicator is used to differentiate between the two types of controllers. Such indicator is a bit logical flag. When the bit is set, the associated controller has a valve attached to it. This bit flag is located within the PID byte indicator described above. The flag is masked out of the byte indicator when required.

In addition to the previously described tables, there are several other tables associated with the controllers to provide the parameters needed for controller functioning in the simulator. Each table is grouped in the same order as the auto/manual command, according to the option number and the computer. The names and formats of these controller associated tables are, input error to the controller in normalized floating point value, gain value of the controller in floating point, reset coefficient in floating point, rate coefficient 1 in floating point, and rate coefficient 2 in floating point. Also, a table is provided with the controller ramp rate in normalized value per sample time and stored as floating point, past reset value in floating point format (the adjective past being used to denote one sample time prior), past rate value in floating point format, past error value in floating point format, and controller output in normalized floating point value.

The gain value, reset coefficient, rate coefficients, past reset, and past rate values are used to calculate the three term controller action. The controller output is a normalized value between 0 and 1 with saturation at 1. The input error into the controller is calculated by the model. It is assumed that the input error value is correctly scaled together with the gain constant, such that the controller output is a normalized value. The controller ramp rate is the rate value which the controller has in the manual modes.

The three term controller algorithm used by the controller handler CONHAND is expressed as:

$$\text{Controller Output} = \text{Gain} * \text{Error} + \text{Reset} + \text{Rate}$$

where the reset algorithm is given by:

$$\text{Reset} = \text{Reset Coefficient} * \text{Error} + \text{Past Reset}$$

where:

$$\text{Reset Coefficient} = (\text{Gain} * \text{Sample Time})/\text{Reset Time}$$

and the rate algorithm is given by $$\text{Rate} = \text{Rate Coefficient } \mathbf{1} * \text{Past Rate} + \text{Rate Coefficient } \mathbf{2} * (\text{Error} - \text{Past Error})$$

where:

$$\text{Rate Coefficient 1} = \frac{(2 * \text{Rate time} - \text{Sample Time})}{(2 * \text{Rate Time} + \text{Sample Time})}$$

and $$\text{Rate Coefficient 2} = \frac{2 * \text{Rate Time} * \text{Gain}}{(2 * \text{Rate Time} + \text{Sample Time})}$$

The various constants and the initial values of the past reset, past rate, and past error are calculated by the initialization subroutines VCINIT.

The various tables associated with the controllers are organized under the assumption that every controller has a valve attached to it. With this assumption, the grouping and ordering of each valve table is arranged in the same manner as for controllers. This structure permits the same index number to be used for a controller as well as its associated valves The names and the format of the valve tables are, CV table in floating point format, maximum CV table in floating point format, valve trip constant table in floating point format, valve trip logical table in word logical format, valve dynamic coefficient 1 table in floating point format, and valve dynamic coefficient 2 table in floating point format. The valve coefficient CV value is calculated using a linear interpolation formula Thus, the CV value and the valve position have the same significance. Since the specific valve position is not required by any other program, the valve position table for controller associated valves is not maintained by the controller handler CONHAN.

The CV value is calculated directly from the valve input value and the last CV value as given by:

$$CV = \text{Dynamic Coefficient 1} * \text{Valve Input} + \text{Dynamic Coefficeint 2} * \text{Past CV}$$

where:

$$\textit{Dynamic Coefficient } 1 = (1.0 \text{ EXP } (-S.T./\tau) + CV\ max$$

and $$\text{Dynamic Coefficient } 2 - \text{EXP } (-S.T./\tau)$$

where S.T. and $\tau$ are the sample time and the valve dynamic time constant, respectively. Using the formula as shown above, the valve position calculation can be bypassed.

The valve input value can originate from either the controller output or the valve trip constant. The valve trip logical word determines which input is used.

Figure 18A:
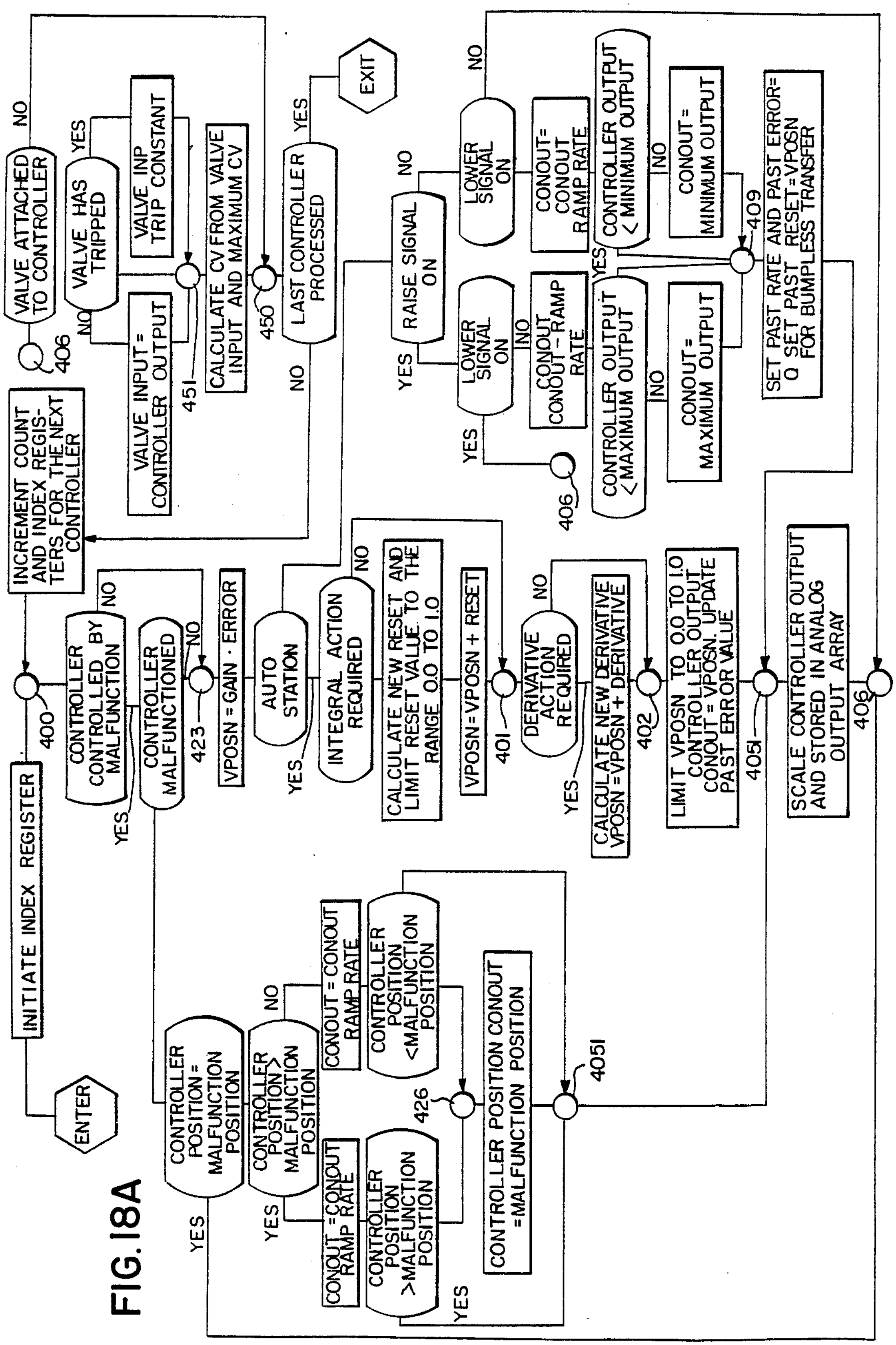
FIGS. 18A and 18B illustrate the flow chart for the controller handler subroutine C(NHAN.
Figure 18B:
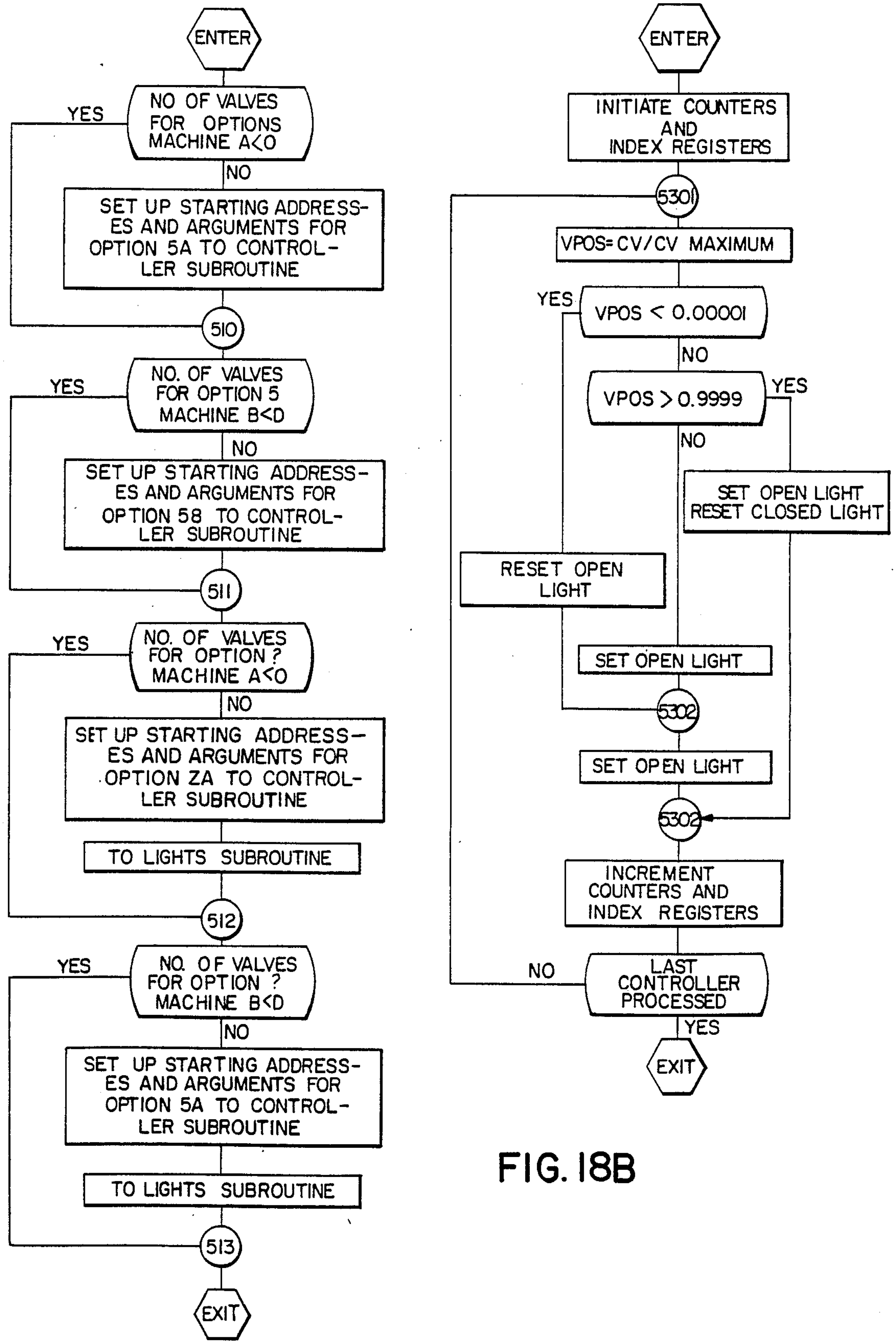

Referring to FIGS. 18A and 18B, the main sequence of the controller handler program CONHAN, which is called upon by the synchronization and control program after the execution of the models and before the transmission of the data link buffer, includes first, the processing of the option 5 (analog output) controllers for the A machine by calling the controller subroutine. This subroutine examines the malfunction logical, auto/manual command, and the raise/lower command, and then updates the option 5 controller outputs according to the rules of operation previously specified. Each controller output is then converted into an analog output. If there is a valve attached to the controller, the CV value is updated accordingly.

Next, the option 5 controllers are processed for the B machine by the controller subroutine in the same manner described for the option 5 controllers for the A machine. Then, the option 7 controllers for the A machine are processed by first calling the controller subroutine and then the light subroutine. The light subroutine updates the status of the open/closed lights, according to the CV value. Next, the same process is accomplished for the option 7 controllers supervised by the B machine. Finally, control is returned to the synchronization and control program.

During the background initialization phase the subroutine VCINIT initializes the reference tables and constants required by the controller handler CONHAND. The specific items that are initialized by VCINIT are the number of controllers in each option and machine, controller ramp rate in normalized steps for quarter second, maximum CV value of valves, card and point numbers for analog output, PID indicator, controller type indicator, reset coefficient, rate coefficients 1 and 2, valve dynamic coefficients 1 and 2, controller gain value, valve trip constants, reset malfunction logicals, reset valve trip logicals, bit displacement for auto/-manual word, half word displacement for raise/lower word, and bit displacement for open/closed light word.

In addition to the foregoing constants, VCINIT also initializes the dynamic variables of the controllers to correspond to the steady state as dictated by the CV values. The CV values are precalculated by the model program. Such dynamic variables are controller input error and past input error, controller reset and past reset values, controller rate and past rate, controller output, analog output, and open/closed lights When the controller handler program CONHAND calls the controller subroutine to process a given option number and computer, a large number of arguments are passed on. These arguments are the starting addresses of the various tables, displacement constants, and number of items involved. To minimize execution time, this constant information is grouped together for each option and computer. The information can then be passed over to the subroutine as a block of data, using relatively few instructions.

Since the label COMMONS are relocatable, the initialization of the absolute starting address of tables is performed by a program called by LEV31. Program LEV31 is a foreground initialization program called by the synchronization and control program before the first execution of any model. The program CONHAND is core resident and is called by the synchronization and control program every one quarter second.

It is preferred that controllers in the simulator be structured and handled on a group basis in the manner described. In alternative embodiments, various features of the invention can be implemented with modified controller structures and/or controller handler structures and methods.

PUMP HANDLER (PHAND)

The subroutine PHAND examines the logical status; that is, whether or not the pump is in an off-on or an off position, during each on-quarter second time period. The control panel logic generates an analog time period. The current algorithm and a contact output for the indicating lights so that the operator can determine whether or not the pump is in an on or off condition; and also determines whether the pump is able to start or stop.

The pump handler calculates for the use of the models a data value corresponding to pump head and also pump speed. It further calculates the pump current and the bus current for transmission to the A or B machine for operating the appropriate meters and indicating devices.

In the actual plant, upon the operation of the pump lever on the control console, the current immediately goes up to 100% and then gradually reduces to the actual amount of current the pump is drawing. In simulating this feature, the operation of the manual pump lever on the control console triggers an interrupt for the panel logic, and a current value generated by the panel logic through the analog output handler, operates the pump current meter. Then, this current value is replaced by the current generated by the pump handler in a subsequent time step.

If a decision is made that a pump should change its state of operation, either through automatic or manual modes, it changes the status of the logical associated with the particular pump in the 4 per second logical data transfer buffer. Then, when the pump handler is called, it reacts to a change of logical status of each pump. If the status of the pump has changed during the time period, the program determines whether or not it has changed from an off to an on or from an on to an off condition. If it has changed to an off position, it sets the $K^{th}$ to "Tdown". It then sets the pump current to zero, clears the "direction" bit and sets the "in transient" bit.

If the pump is changing states from an off to an on condition, the "direction" bit is set and the "in transient" bit is set. The "in transient" bit determines whether or not the pump has operated in a previous time step; and this bit will be set until the total run-up time or run-down time has been completed. The total run-up br run-down time for a pump in the present embodiment of the invention is determined to be approximately 8 seconds, thus once the status logical has changed, the pump handler will compute a new pump speed every quarter of a second until such time has expired.

When the run-up time for a pump has elapsed, the "in transient" bit is cleared and the pump speed is set to 100%. If the run-up time has not elapsed, the new pump speed is calculated and stored during each time step. Also, during each time step a new pump head is calculated and stored. Then, the pump current is calculated and stored during each time step and scaled until the run-up time has been completed. The current is a floating point number which is scaled by the analog output.

When the pump is going from an on to an off condition the pump speed and pump head is calculated during each time step until the coastdown time for a particular pump has elapsed. When the coastdown time is completed, the pump speed is set to zero. The pump head is calculated during each time step based on the speed.

The speed is calculated during each time step when the pump is running up to full speed in accordance with the following formula:

$$N_T = N_{T\text{-}1} + K_3$$

where:

$$K_3 = \frac{\text{Maximum Speed}}{\text{Time} - \text{Step}}$$

$N_T$=Calculated speed and T is current time step

The speed of the pump is calculated when it is coasting to a stop position in accordance with the following formula:

$$N_T = N_{T-1}\left(1 - \frac{1}{T}\right)$$

The pump head is calculated in accordance with the following formula:

$$Pump\ Head_T = K_1(N_T^{K_2})$$

where:

$$K_2 = 1 \text{ or } 2$$

$$K_1 = \frac{\text{Maximum Pump Head}}{(\text{Max. Speed})^{K_2}}$$

When the pump is operating to a run-up condition, the pump current is calculated depending upon the percentage of maximum speed that it has obtained during the time step in which the calculation occurs. When the pump is less than 80% of maximum speed the pump current is calculated in accordance with the following formula:

$$I_T = I_o - K_{11} N_T$$

where:

I is the current $I_o$ is the inrush of current at 0% of maximum speed $I_1$ is the current at 80% of maximum speed $$K_{11} \text{ is } \frac{I_o - I_1}{80\% \text{ of Max. Speed}}$$

When the speed of the pump is greater than 80% of maximum speed, the pump current is calculated as follows:

$$I_T I_1 - K_{12}(N_T - 0.8\ Max.\ Speed)$$

where:

$$K_{12} = \frac{I_1 - \text{current at 100\% Max. Speed}}{20\% \text{ of Max. Speed}}$$

When the pump is switched to an off condition, the current on that pump immediately goes to zero. The bus current during each time step is calculated at 4160 volts The bus currents are calculated by converting the pump current to 4160 volts and summing the current for each bus.

REACTOR COOLANT SYSTEM

The reactor coolant system RCS, which transports heat from the nuclear reactor to the primary side of the steam generators SG, is shown and the simulation thereof is described in detail in U.S. Pat. No. 3,916,445, issued Oct. 28, 1975, entitled "Training Simulator for Nuclear Power Plant Reactor Coolant System and Method" which is incorporated by reference herein.

CHEMICAL AND VOLUME CONTROL SYSTEM

The Chemical and Volume Control System is designed to provide services to the Reactor Coolant System that include; maintenance of programmed water level in the pressurizer in order to maintain the required water inventory in the reactor coolant system (RCS); maintenance of seal water injection flow to the reactor coolant pumps; control of water chemistry conditions, activities level, boron concentration and makeup; and processing of effluent reactor coolant to effect recovery and reuse of boron absorber and makeup water; filling, draining, and pressure testing.

Charging, Letdown And Seal Water

The charging and letdown functions of the system are employed to maintain a programmed water level in the reactor coolant system pressurizer PZR and to maintain proper reactor coolant inventory during all phases of plant operation.

The simulation of the engineered safeguard systems is described in detail in U.S. Pat. No. 4,064,392, issued Dec. 20, 1977, entitled "Engineered Safeguards Systems and Method in Nuclear Power Plant Training Simulator" which is incorporated herein by reference.

INITIALIZATION

With respect to the reactor model, it is initialized from stored data as part of the whole plant, which can be generated for steady state critical conditions by an off-line initializer calculation. The Reactor Model initializer is called whenever the overall plant initializer is used. The operating power level, turbine load or generator megawatts, when calculated back to the reactor, leads to plant $\Delta T$ and average temperature. These temperatures, along with flow, boration, and rod positions, drive the initializer. Results are stored in a standard data buffer as a snapshot to be used to later initialize the Space-Time-Kinetics model on the control panels. The subroutines used are INIT, ASIGMA, FLXSET, POISET, SETPTS, DETECT, and TEMPS.

With respect to the primary system initialization, subroutines RCSINN, CVCSIN, and SISINN are used to calculate off-line initial conditions for the reactor coolant system, chemical and volume control systems, and other auxiliary systems. These routines initialize at 100% load level, with other initial conditions obtained by manipulating the plant from control consoles and taking snapshots when required.

In subroutine RCSINN, initial conditions for the reactor coolant system and pressurizer are calculated based on power level, reactor power, steam generator power, reactor coolant flows and pressurizer pressure. The subroutine CVCSIN which is called by RCSINN sets steady state condition for the chemical and volume control system model, including Boron Recycle Seal flow and Boration routines and Component Cooling and residual heat removal system. The conditions are read in directly from cards or set directly in the program; and include flows, enthalpies, maximal values of admittances, and set points for the limit checks and controllers. The subroutine CVCSIN calls SISINN which sets variables such as flows, enthalpies, and maximum admittances from cards or set directly in the program for safety injection system, containment system, and containment spray systems.

The initialization program for the steam plant provides an approximate initialization for electrical plant load levels from 40 to 100% of rated plant load. Several curve fits, approximations, and average values are used in establishing the necessary initial values. The subroutine BOPDAT initializes constants and some dynamic variables that can be assigned nominal values. The subroutine GETGO initializes the dynamic variables that require complex calculations. The inputs to the program include the power level in megawatts for which the initialization is desired; and the outputs include all the plant variable that must be initialized.

When an initialization is performed, subroutines BOPDAT and GETGO are executed. BOPDAT establishes the values for all the balance of plant constants. In addition, it reads from cards the initial positional values for several valves and all the balance of plant pump shutoff pressures, and establishes preliminary values for some dynamic, as compared to constant, variables. GETGO initializes the steam plant dynamic variables for load levels from 40 to 100%. The desired load level EHZMEG in megawatts is read from a card by the initialization calling program. BOPDAT is executed and the GETGO is executed. The subroutine OUTPUT is called from GETGO to print many of the initialized variable on the line printer.

The main steam system pressures and flows are initialized by assuming normal plant conditions and by establishing the pressure and admittance inputs through curve fits. Steam generator pressure are established by a curve fit for generator temperature versus load, and then using a spline fit that relates steam pressure and temperature. The variables reheater pressure REPS, feedwater heater pressure FWPH2, 3, feed pump turbine steam flow FPWST, governor valve admittance MFGGOV, and reheater live steam flow admittance MFGSRH are fitted as a function of normalized load level. Then the main steam network is solved with condenser pressure at its normal value of 0.75 psia, all the main steam isolation valves open, and the reheater flow control valves REVAMS fully open. The main steam network is solved in the same manner as in the model described herein. The reheater cold steam exhaust enthalpy REH4 is a linear function of load level. The live steam exhaust enthalpy REH3 and the associated temperature REF1 are calculated from a heat balance. The reheater specific volume RESS and mass REMS are based on the fitted reheater pressure REPS and the fitted cold steam exhaust enthalpy REH4.

Low pressure turbine flows and generator megawatt output are calculated from the reheat pressure REPS, the condenser pressure CDP, and the feed heater pressure FWPH1. The feed heater pressure is assumed to be identical to the condenser presssure. All the intercept valves are assumed to be opened. Since the high pressure turbine flows are initialized from the main steam system initialization, only the power output is necessary. The power is based on an instantaneous energy balance involving the flows and their respective enthalpies. The turbine speed is assumed to be 1800 rpms. As mentioned above, the steam generator temperatures are initialized though a function that depends on load. The specific volume of the generator's water SGSW is calculated from the temperature and used in the water mass calculation. The steam generator level FGLWR is assumed to be equal to its set point. The steam and liquid volume SGVW is calculated by incorporating the table that relates generator level to volume. The contribution to generator volume of the shrink swell steam bubbles SGZFWL is determined from the generator steam flow FGWST. The mass of water that must be in the generator is now determined by inverting the function that relates steam generator volume to shrink swell effects and water mass. All steam generators are assumed to be identical. The air mass in the generator is assumed to be 0 and feed flow FWWSG is set equal to total steam generator steam flow SGWST.

The feedwater system is initialized by an iterative process. First, the pressures in the network FWP1 to FWP9 are initialized such that all the check valves will be open. The pumps and valves have been initialized in the subroutine BQPDAT. The feed pump turbine speeds are assumed to range from 3800 rpm to 4920 rpm depending on generator steam flow. The feedwater control valves FWCV51 to FWCV54 are incremented until the feed flows FWWSG(1) to FWWSG(4) match the desired steam generator feed flow. The desired feed flow is equal to the generator's initialized steam flow FGWST. During initialization, the thermal model of the feedwater system is valid for 100% load only. However, it can be used at lower loads, and the result is a transient when the real time model uses this data. The condenser steam enthalpy CDHS is initialized to 1102 Btu's/lbs. which correspond to 0.75 psia. The steam temperature and pressure in the fluid enthalpy are calculated through spline fits on the steam enthalpy. Two circulating water pumps are assumed to be on, and the outlet water temperature CWTO is initialized from the heat that must be transferred.

The automatic controllers that are simulated in the control station handler are initialized, such that if the controller has an associated valve, such as the feedwater control valve FWCV51 the control handler initializes the controller integrator and output by dividing the valve $C_v$ by the maximum $C_v$. However, even if the controller does not have a valve associated with it, such as the feed pump proportional controller FPOCOV, the same procedure is used. A valve is assumed to be associated with every controller during initialization.

STEAM GENERATORS

Figure 103:
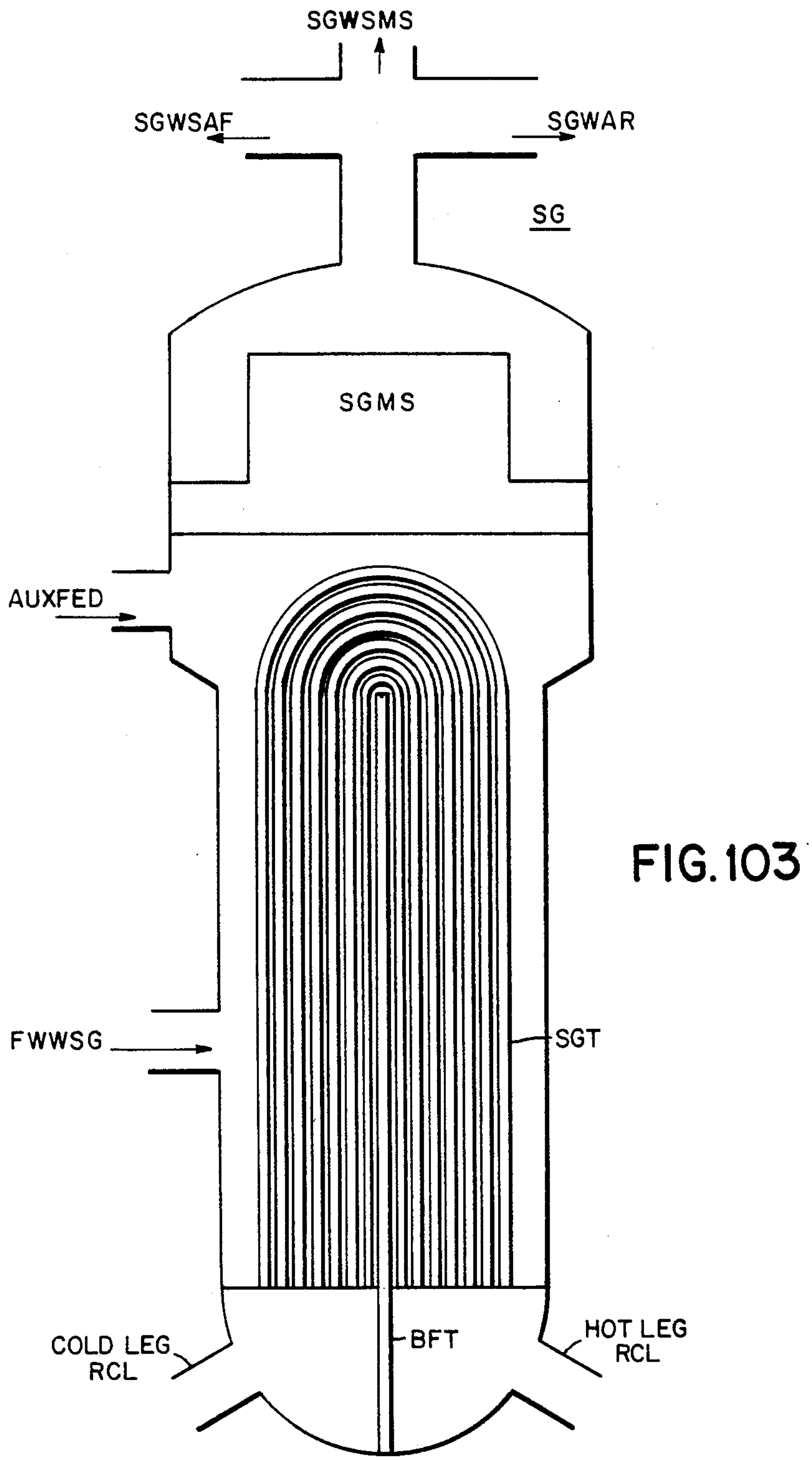
FIG. 103 is a schematic diagram of the main steam system of the type being simulated.

Referring to FIG. 103, a U-tube steam generator SG is mounted in each loop of the reactor coolant system RCS to produce steam for turbine operation. Each generator comprises two integral sections: an evaporator section, and a steam drum section. The evaporator section comprises a U-tube heat exchanger SGT for transferring heat from the reactor coolant to the secondary fluid, while the steam drum section includes moisture separating equipment SGMS.

In the steam generator for which the preferred simulator embodiment is implemented, high temperature reactor coolant flows into the opening from the hot leg of the reactor coolant loop RCL through the tubes SGT on one side of the baffle BFT and out of the tubes SGT on the opposite side of the baffle through the opening into the cold leg of the loop RCL. Feedwater enters the generator SG through FWWSG on the cold leg side of the U-tubes SGT and flows counter current to the reactor coolant flow. Feedwater flows directly into the preheater section and is heated almost to saturation temperature before entering the boiler section near the top of the preheater SGMS. Subsequently, a water and steam mixture flow upward through the tube bundle, and into the steam drop section. The preheater moisture separators SGMS recirculate flow through the annulus formed by the shell of the generator SG and the tube bundle wrapper on the hot leg side of the baffle BFT. An emergency feedwater inlet AUXFED is provided at the top of the tube bundle for feedwater addition in the event of a failure of the main feedwater pumps.

Steam having a moisture content of approximately one quarter of 1% leaves the top portion SGWSMS of the steam generator to provide the motive fluid for turbine operations.

Steam Generator Simulation STMGEN

The steam generator model T24 (STMGEN) is capable of simulating plant operations that preferably include fill up and heat up of the generators SG, including the effect of air in the generators; the normal and malfunction operation of the generators SG; and the loss of reactor coolant system flow through any or all of the generators.

For a detailed description of the simulation of the steam generators and steam system, reference is made to U.S. Pat. No. 3,914,795, issued Oct. 21, 1975, entitled "Fluid Distribution Network and Steam Generators and Method for Nuclear Power Plant Training Simulator" which is incorporated herein by reference.

REHEATER-MOISTURE SEPARATORS

Referring to FIG. 103, after the steam passes through the high pressure turbine, it is conveyed directly to six reheater and moisture separators AE, AW, BE, BW, CE, and CW. The wet steam enters the reheater shells and flows through the shell where moisture is removed from the wet steam, and it then passes over the tube bundle; becomes superheated, and continues out of the reheater into the three stages of the low pressure turbine 1A, 1B and 1C.

U.S. Pat. No. 4,042,813, issued Oct. 31, 1974, entitled "Secondary System Modeling and Method for a Nuclear Power Plant Training Simulator", which is incorporated herein by reference, describes in detail the simulation of the secondary system.

For a detailed description of the simulation of the feedwater system, reference is made to U.S. Pat. No. 3,936,885, issued Feb. 3, 1976, entitled "Training Simulator and Method for Nuclear Power Plant Heater and Non-Linear Modeling", which is incorporated herein by reference.

Figure 104:
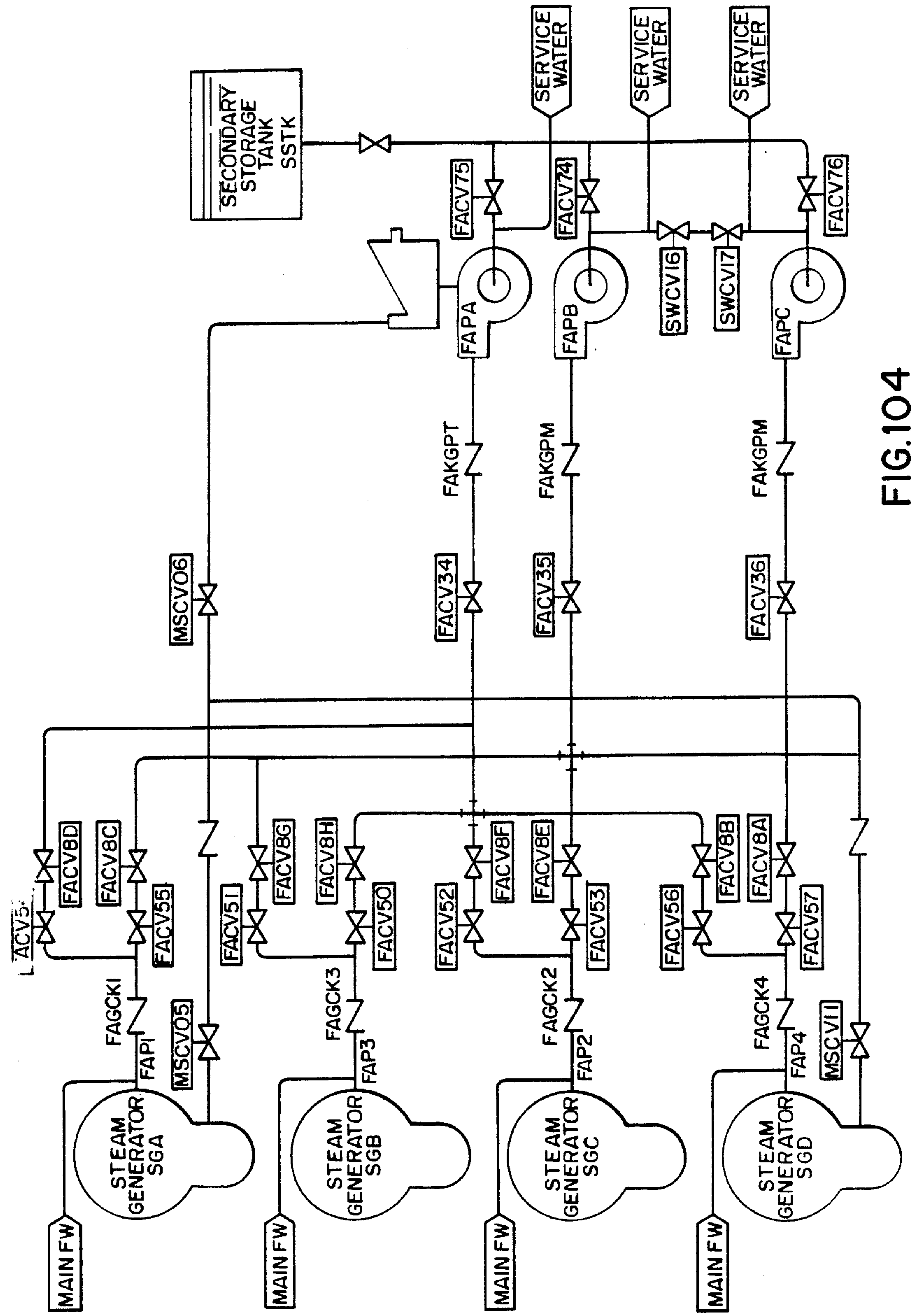
FIG. 104 is a schematic diagram of an auxiliary feedwater system of the type being simulated.

Referring to FIG. 104, the auxiliary feedwater system comprises two subsystems, one of which utilizes a single turbine driven pump FAPA, the other consisting of employing two motor driven pumps FAPB and FAPC. Each of the two subsystems can deliver feedwater to all four steam generators SG(A), SG(B), SG(C) and SG(D).

The auxiliary feedwater pumps FAPA, FAPB and FAPC normally take their suction from the secondary storage tank SSTK through suction valves FACV74, FACV75, and FACV76, respectively The pumps then discharge through locally controlled discharge valves FACV34, 35 and 36. The auxiliary feedwater is delivered to the steam generators SGA, SGB, SGC, and SGD through stop valves FACV54 and FACV8D, FACV50, and FACV8H, FACV52 and FACV8F, and FACV57 and FACV8A, respectively The motor driven auxiliary feedwater pumps FAPB and FAPC discharge into all four steam generators through valves FACV55 and FACV8C, FACV51 and FACV8G, FACV53 and FACV8E, and FACV57 and FACV8A An emergency source of water is also provided to the auxiliary feedwater pumps from the service water system.

When in use, such as dump cool down, for example, the auxiliary feedwater pumps are capable of delivering feedwater to the steam generators regardless of the pressures of the steam generators In an actual embodiment of the invention, these pumps have a total output of approximately $9\times10^5$ lb/hr; and one of the two motor driven pumps FAPB and FAPC which supply two of the steam generators is capable of providing enough feedwater to safely cool the steam generator unit down to the temperature at which the residual heat removal system (RHR) can be utilized. The single turbine driven auxiliary feedwater pump FAPA has twice the capacity of either one of the motor driven pumps.

Auxiliary Feedwater System Simulation (AUXFED)

The inputs to the model T51 (AUXFED) include steam generator steam pressures SGPS(1) through SGPS(4) inclusive, the auxiliary feedwater pump shutoff pressures FAPOPB, FAPOPC, and FAPOP1, and the valve admittances for all the valves in the feedwater system from the valve handler simulation VCHAND. The outputs of the simulation include the auxiliary feedwater flows FAWSAG1(1) to FAWSAG5(4) to the steam generators.

The auxiliary feedwater simulation is capable of simulating the operation of any or all of the pumps FAPA, FAPB, and FAPC and the manipulation of all of the valves related to the system the levers for which are on the panel control board. The three instructor controlled valves SACV34, 35, and 36 of the steam supply for operating the auxiliary feed pump FAPA, and the effect of such isolation on the pumps capacity is also simulated.

In the preferred simulation AUXFED, all valves in the system are assumed to have a linear admittance and this linearity is assumed to vary linearly with the valve position. Also, the pump capacity curves that relate pump head to capacity are assumed to be linear. A constant specific volume is assumed for the water in the system which permits the translation of the head versus capacity curves to pressure versus mass flow curves. The auxiliary feed pump governor system is simplified, because pump speed, although not simulated directly, provides for the effect of a low speed on the system.

Figure 105:
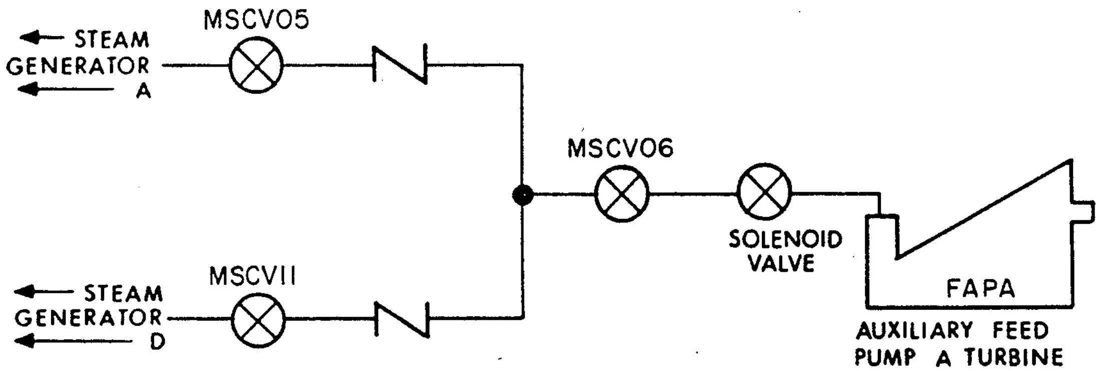
FIG. 105 is a schematic diagram illustrating the steam supply to the turbine driven auxiliary feed pump.
Figure 106:
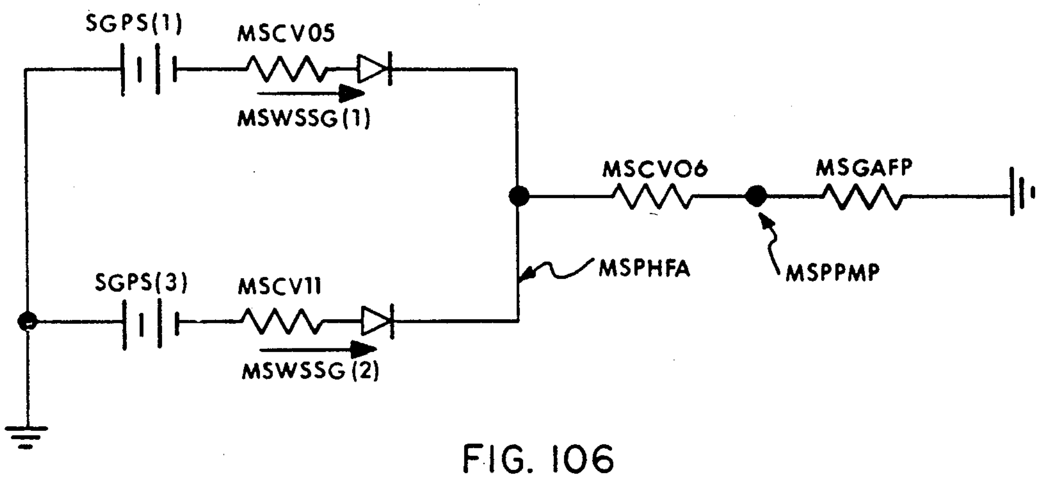
FIG. 106 is the electrical network analogy for the supply system shown in FIG. 105 utilized in the simulation

Referring to FIGS. 104 and 105 and the electrical analogy of FIG. 106, the auxiliary feedwater pump FAPA is driven by a turbine which obtains its steam from either or both of the steam generators SG(A) and SG(D). In the simulation, the valves MSCV05 and MSCV11 simulate three distinct functions which are the effect of steam resistance, the effect of the valve resistance, and the effect of the check valves in the system. The maximum admittance of all three valves MSCV05, MSCVll, and the shutoff valve MSCV06 (see FIG. 91B) is one. The steam admittance MSGAFP of the feed pump turbine is variable, and depends on the fluid flow FAWPA through the pumps. This permits consideration of the increase in steam flow when the pump load increases. Assuming that the pump FAPA has a maximum horsepower of 1125, a heat flow of $2.87\times10^{6}$ Btu/hr. is required; the incoming steam is assumed to have an enthalpy of 12,000 Btu/hr. the exhaust enthalpy is assumed to be 11 to 5 and, the maximum required flow is $3.82\times10^{31\ 2}$ lb/hr/10 $^{6}$. With the pump steam admittance MSGAFP being a linear function of the pump flow FAWPA, then:

$$MSGAFP=GO+K_1(FAWPA)$$

where GO is a constant admittance and $K_1$ is a slope. The constant GO is estimated to be 10% of the maximum admittance value which is determined from the maximum steam flow, with a header pressure of 605 psia for example and a pump fluid flow of $4.95\times10^{-1}$ lb/hr/$10^{-6}$. Therefore the expression for the admittance MSGHFP becomes:

$$MSGAFP=8.3406\times10^{-6}+1.5148\times10^{-4}\ FAWPA$$

The turbine admittance MSGAFP, the pump shutoff head FAPOPA and the pump status logical variable FAOP1 all interact to determine the pump status. If the pump shutoff head FAPOPA or the pump status logical variable FAOP1 which resides in the common data ALB10, is greater than 100 psi for example, the pump is considered to be on. If the pump is off, the admittance MSGAFP is set to zero.

The steam header pressure MSPHFA is calculated by writing its node equation. The pressure at the inlet to the turbine admittance MSPPMP is calculated to determine the effect of the shutoff valve MSCV06. The calculated pressure MSPPMP is then used to determine if the turbine is capable of obtaining its rated capacity. For example, if the steam pressure is greater than or equal to 125 psia the governor system can maintain a shutoff head of 4400 ft. (1950 psid.) If the pump FAPA is on, and the inlet pressure MSPPMP is less than 125 psia, the shutoff'head FAPOZA is then a fractional value of the normal shutoff head FAPOPA.

Figure 107:
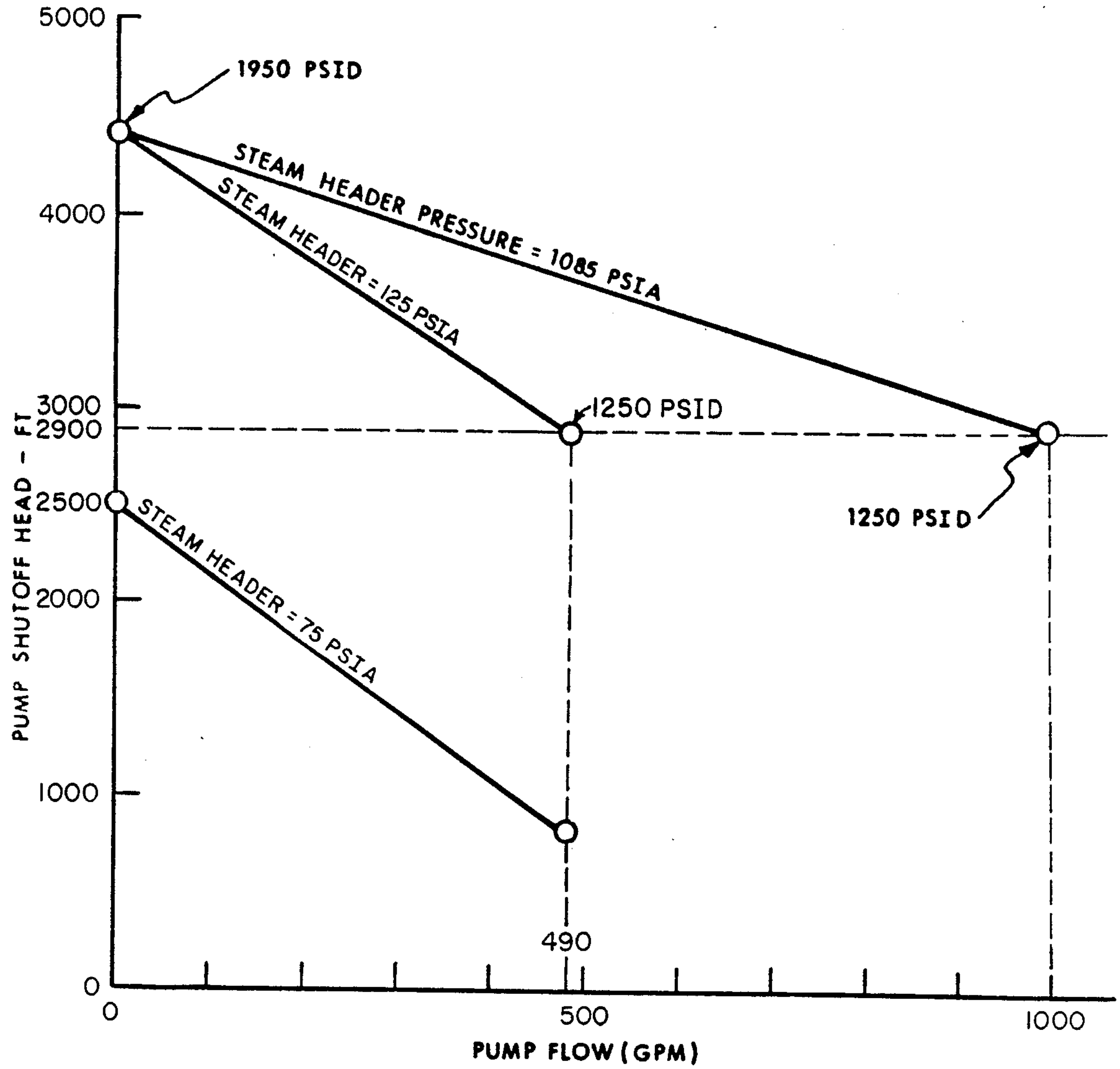
FIG. 107 is a graphical illustration of the simulated auxiliary feed pump capacity for several steam header pressures.

Referring to FIG. 107, the pump FAPA develops 2900 ft. (1250 psid) with a flow of 405 GPM when the header pressure is 125 psia. When the header pressure is 1085 psia, the pump develops 2900 ft. of head with a flow of 990 GPM. When the header pressure drops below 125 psia, the shutoff head pressure falls below 4400 ft. In the example given with the header pressure at 75 psia, the pump shutoff head is approximately 2500 ft. The feed pump internal admittance FAGPT, is made a function of the steam inlet pressure MSPPMP which takes into consideration the effect of the steam inlet pressure MSPPMP on the characteristic curves of the pump.

Figure 108:
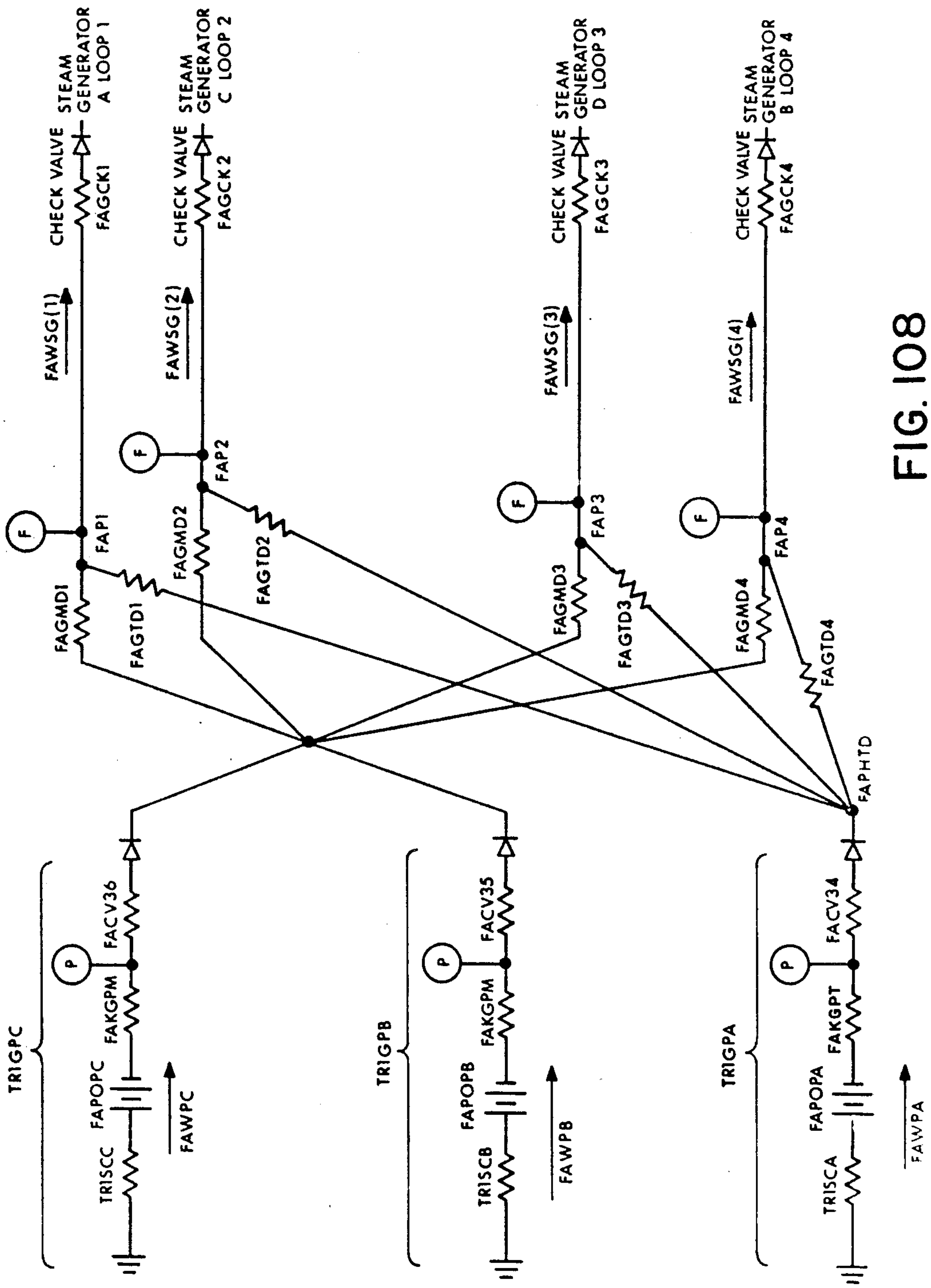
FIG. 108 illustrates an analogous electrical network for the simulation of the auxiliary feedwater system.

Referring to FIG. 108, the check valves in the FIG. 106 have been replaced by diodes in the analogous electrical network for the auxiliary feedwater system. Those valves that are in series in the system are replaced by a single admittance. Each auxiliary feedwater pump is simulated as an ideal voltage source with an internal admittance. First with respect to the simulation of the feedwater pumps FAPA, FAPB, and FAPC, the standard head versus capacity curves for all three pumps are translated into pressure versus mass flow curves assuming a density of 62.4 lbs/cu/ft.

For example at full speed, the motor driven pumps FAPB and FAPC have a shutoff head pressure FAPOPB and FAPOPC, respectively of 1560 psid with a rating of 495 GPM at a pressure of 1322 psid. When the volumetric flow is converted to mass flow, the pump admittance FAGPM becomes $1.0411\times10^{-3}$ (lb/sq.in.)/(hr/$10^{6}$/lb).

As previously described, the pump capacity of the turbine driven pump FAPA depends on the steam supply pressure. For example, at a steam header pressure of 125 psia, the pump can deliver 490 GPM at a pressure of 1250 psid with a shutoff pressure of 1950 psid. In this example, the pump admittance FAPOPA is $3.5386\times10^{-4}$ (lb/sq.in.)/(hr/$10^{6}$/lb). In the second example, at a steam pressure of 1085 psia, the pump can deliver 990 GPM at the same pressure, and with the same shutoff pressure as in the former example. In this second example, the pump admittance FAPOPA is $7.0795\times10^{-4}$ (lb/sq.ins.)/(hr/$10^{6}$/lb). A linear relation is assumed between the steam supply pressure MSPPMP and the pump capacity FAGPT such that:

$$FAGPT=3.5386\times10^{4}+3.6882\times10^{-7}[MSPPMP--125.0]$$

When the steam supply pressure drops below 125 psia the shutoff head drops below 2500. Thus, in the simulation the steam supply pressure MSPPMP is compared to 125 psia. If the pressure is less than 125 psia, the shutoff head supplied by the pump handler routine PCHAND is multiplied by the steam gauge pressure and divided by $125-14.7=110.3$ psig. Because the turbine for the pump AFAPA exhausts to atmosphere gauge pressure is utilized. The result of the above is a fraction that reduces the shutoff head of the pump.

Suction admittances TRISCA, TRISCB, and TRISCC are dependent on the service water valves SWCV12, SWCV14, and SWCV15 and the position of the secondary storage tank SSTK valves (rot shown) which permit the suction to be drawn from the secondary storage tank. The suction admittances use either the service water or the secondary tank valve admittances depending on which admittance is larger. Normally, the secondary water tank valves are used since the service water valves are closed. However, if the level in the secondary storage tank SSTK drops and the secondary tank valves are closed, suction will be maintained on the auxiliary feedwater pumps if the service water valves are opened. The admittance for all service water valves is one.

The three discharge valves FACV34, FACV35, and FACV36 are controlled by the instructor. The maximum admittance for these valves is 0.10. The flow control valves for the auxiliary feedwater pump system are controlled by remote set point stations on the feedwater control panel. For these flow control valves, the maximum admittances are calculated on the basis of a flow coefficient rating of 22 for example.

The rated flow of the control valves (900 GPM for total or 225 GPM for each valve) occurs when the valve coefficient is 90% of the rated value. Further:

$$W^2 = \frac{KC_v^2}{S}\,\Delta P$$

where:

W=mass flow (lb/hr/$10^6$),
K=a conversion constant,
ΔP=the pressure drop across the valve, and
S=the specific gravity Thus, the pressure drop that occurs under the above situation is calculated as follows:

$K=(500\times 10^{-6})^2$,

S=1.0, and $W=1.1261\times 10^{-1}\ lb/hr/10^6$

225 GPM $$\frac{(1.1261\times 10^{-1})^2\,(1)}{(500\times 10^{-6})^2\,(0.9\times 22.)^2} = 129.384\,\frac{\text{LB}}{\text{IN}^2} = \Delta P$$

admittances TRIGPA, TRIGPB, and TRIGPC incorporate the effect of the pump discharge check valves FAKGPM and FAKGPT.

The auxiliary feedwater system network comprises six nodes FAPHMD, FAPHTD, FAP1, FAP2, FAP3, and FAP4 (see FIG. 108). The six node equations are a symmetric A-matrix that consist of admittances, an X-matrix of pressures and a B-matrix that is the product of a pressure source and its series admittance. The solution of the matrix equation is incorporated within the subroutine AUXFED and does not represent a subroutine in and of itself. To solve the matrix equation, the CROUT algorithm is used as it is used in the main feedwater network equations previously described. As in the main feedwater network equations, the elements of the upper triangular matrix $T_{ij}$ are obtained from the formula stated in connection with the feedwater matrix. However, because of the size and symmetry, it is possible to eliminate explicit calculation of $L_{ij}$. The $L_{ij}$ are incorporated in T(5,6) and K(5) and K(6). Thus, $$T(1,5) = \frac{A(1,5)}{A(1,1)} \qquad T(1,6) = \frac{A(1,6)}{A(1,1)}$$

$$T(2,5) = \frac{A(2,5)}{A(2,2)} \qquad T(2,6) = \frac{A(2,6)}{A(2,2)}$$

$$T(3,5) = \frac{A(3,5)}{A(3,3)} \qquad T(3,6) = \frac{A(3,6)}{A(3,3)}$$

$$T(4,5) = \frac{A(4,5)}{A(4,4)} \qquad T(4,6) = \frac{A(4,6)}{A(4,4)}$$

By calculating intermediate variables:

$$\begin{bmatrix} A(1,1) & & & & A(1,5) & A(1,6) & B(1) \\ & A(2,2) & & & A(2,5) & A(2,6) & B(2) \\ & & A(3,3) & & A(3,5) & A(3,6) & B(3) \\ & & & A(4,4) & A(4,5) & A(4,6) & B(4) \\ A(1,5) & A(2,5) & A(3,5) & A(4,5) & A(5,5) & & B(5) \\ A(1,6) & A(2,6) & A(3,6) & A(4,6) & & A(6,6) & B(6) \end{bmatrix} = \begin{bmatrix} L(1,1) & & & & & \\ & L(2,2) & & & & \\ & & L(3,3) & & & \\ & & & L(4,4) & & \\ L(1,5) & L(2,5) & L(3,5) & L(4,5) & L(5,5) & \\ L(1,6) & L(2,6) & L(3,6) & L(4,6) & & L(6,6) \end{bmatrix} * \begin{bmatrix} 1 & & & & T(1,5) & T(1,6) & K(1) \\ & 1 & & & T(2,5) & T(2,6) & K(2) \\ & & 1 & & T(3,5) & T(3,6) & K(3) \\ & & & 1 & T(4,5) & T(4,6) & K(4) \\ & & & & 1 & T(5,6) & K(5) \\ & & & & & 1 & K(6) \end{bmatrix}$$

$$C(1) = \sum_{i=1}^{4} T_{i5} * A_{i6}$$

$$C(2) = \sum_{i=1}^{4} T_{i6} * A_{i6}$$

$$C(3) = \sum_{i=1}^{4} T_{i5} * A_{i5}$$

$$C(4) = \sum_{i=1}^{4} T_{i5} * B_i$$

$$C(5) = \sum_{i=1}^{4} T_{i6} * B_i$$

In calculating the admittance G:

$G=W/\Delta P$ then $$G = \frac{1.1261\times 10^{-1}}{125.384} = 8.723\times 10^{-4}\ (\text{lb/hr}/10^6)/(\text{psi})$$

Thus the admittance G represents the maximum value that the flow control valves can have.

Check valves FAGCK1 through FAGCK4 at the steam generators SG(A) through SG(E) have an admittance that can have a value of either 0.10 or 0. If reverse flow is found to occur, the check valves are closed. The we can now write $$T(5,6) = -\frac{C(1)}{A(5,5) - C(3)}$$

and $$K(1) = \frac{B(1)}{A(1,1)}$$

$$K(2) = \frac{B(2)}{A(2,2)}$$

$$K(3) = \frac{B(3)}{A(3,3)}$$

-continued $$K(4) = \frac{B(4)}{A(4,4)}$$

$$K(5) = \frac{B(5)C(4)}{A(5,5) - C(3)}$$

$$K(6) = \frac{B(6) - [C(5) - K(5) * C(1)]}{A(6,6) - C(2) + T(5,6) * C(1)}$$

$$\begin{array}{cccccc} 1 & FAZT15 & FAZT16 & & FAP1 & & FAZK1 \\ & 1 & FAZT25 & FAZT26 & FAP2 & & FAZK2 \\ & & 1 & FAZT35\ FAZT36 & * \ FAP3 & = & FAZK3 \\ & & & 1\ FAZT45\ FAZT46 & FAP4 & & FAZK4 \\ & & & 1\ \ FAZT56 & FAPHTD & & FAZK5 \\ & & & 1 & FAPHMD & & FAZK6 \end{array}$$

By the use of the back substitution, elements of the vector x are calculated starting with the last entry, yielding:

$$FAPHMD = K(6)$$
$$FAPHTD = K(5) - T(5,6) * FAPHMD$$
$$FAP4 = K(4) - [T(4,5) * FAPHTD + T(4,6) * FAPHMD]$$
$$FAP3 = K(3) - [T(3,5) * FAPHTD + T(3,6) * FAPHMD]$$
$$FAP2 = K(2) - [T(2,5) * FAPHTD + T(2,6) * FAPHMD]$$
$$FAP1 = K(1) - [T(1,5) * FAPHTD + T(1,6) * FAPHMD]$$

The nomenclature used here and in the program is self-explanatory.

The check valves in the system may require repeated solution to the equations where reverse flow if found. In such an event, the proper admittance is set to zero and the network is recalculated.

Steam Flow Calculations For The Turbine Driven Steam Pumps (BFPEFF)

Steam driven pumps FWPB and FWPO are driven by steam that comes directly from the steam generators SGA through SGD and by reheated steam from the reheaters AW, BW, and CW. At full load, with both feedwater pumps FWPB and FWPC in operation, approximately 1-2/10% of the total steam flow from the steam generators is consumed in operating the pumps The amount of this steam flow is dependent upon the pump flows, the pump efficiency and the mechanical losses in the turbine. Since the pump efficiency varies from nearly 0 to 85% at rated speed, the pump efficiency must be simulated in order to provide an accurate simulation of the effect of the feedwater pump on the entire system. The pump load is determined from the total development of head and flow; and the turbine mechanical losses are computed from turbine speed.

In simulating the feed pump steam flow requirements in the model T48, the subroutine BFPEFF is utilized. The inputs to this calculation are the feed pump speeds FPNPB and FPNPC, the feed pump fluid density FWDH24, the feed pump suction and discharge pressures FWP4, FWP6 and FWP7, and the feed pump flows FPWPB and FPWPC.

The calculation provides a single output, which is the total steam flow FPWST that is required to operate both pumps FWPB and FWPC.

The steam flow calculation assumes that the required steam flow is available and that sufficient steam pressure and valve admittances are available so that the steam flow that results from the pump conditions is possible. The feed pump speeds FPNPB and FPNPC are assumed to follow the demand signals that are developed in the simulation subroutine BOPCTL. If the steam header pressure should drop to a low value, the demand signals are limited. The efficiency calculation is used over the entire speed range of the pump.

Figure 109:
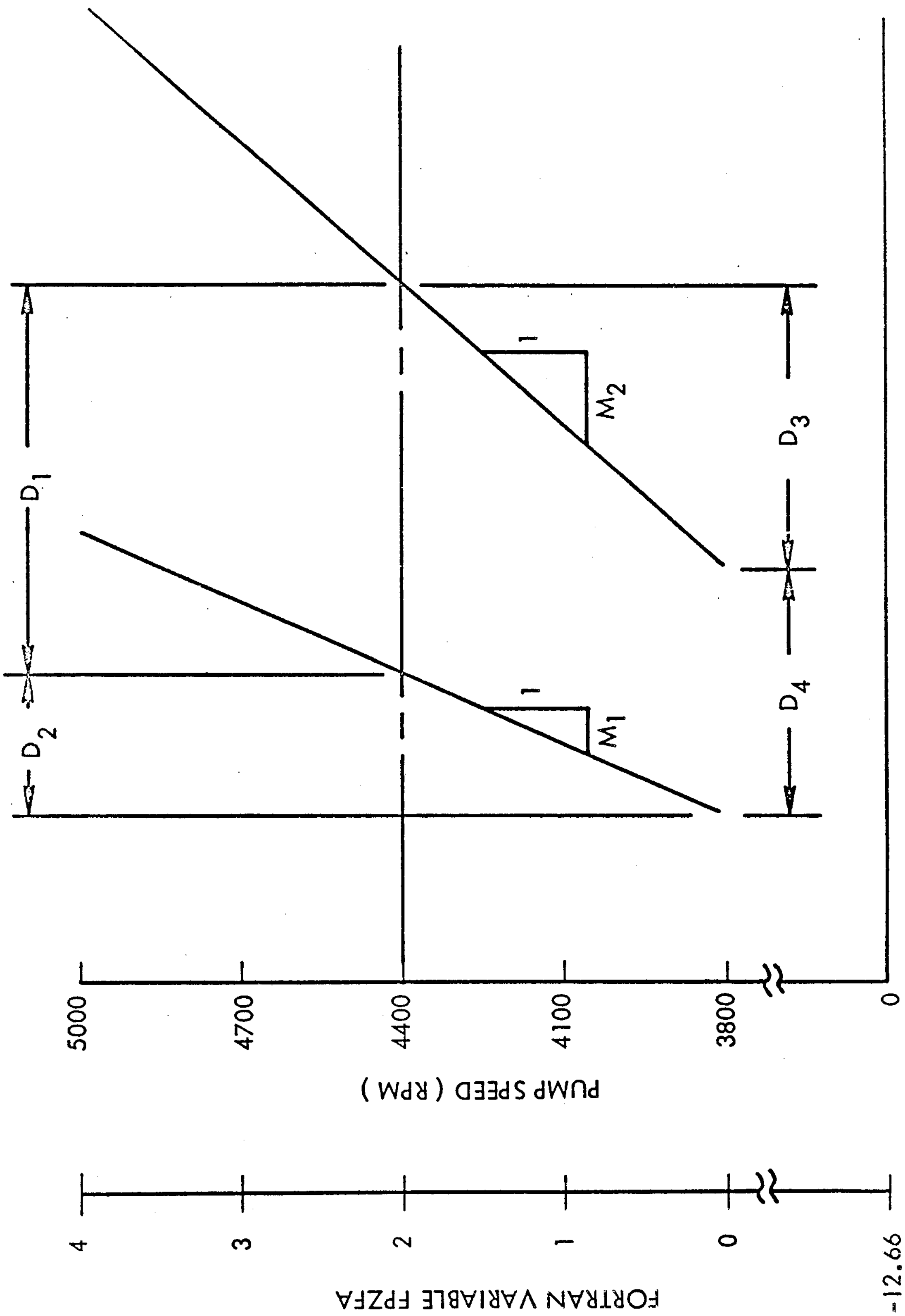
FIG. 109 is a graphical illustration of the pump efficiencies of a function of pump flow and speed for a pump of the type simulated.

Referring to FIG. 109, a graph is plotted showing the efficiencies as a function of pump flow and pump speed for the entire speed range, which efficiencies are typical for a pump of the type simulated. In simulating the steam flow, the efficiency information shown on the graph of FIG. 109 is used in the manner illustrated in FIG. 110 where the normalized pump speeds FPNPB and FPNPC are transformed into a new variable FPZFA which is the turbine efficiency intermediate the calculation. The transformation is such that:

$$RPZFA = \left[ \frac{FPNB(4920) - 3800}{300} \right]$$

This transformed speed FPZFA, which is the new ordinate, equals 4.0 at 5,000 rpms for example and is equal to −12.666 at 0 rpms. Since the pump speed is known, the solution should exist on the horizontal axis of FIG. 110. By knowing the pump flow FPZG, the efficiency can be determined.

Referring to FIG. 111, the implementation of the efficiency calculation is accomplished through an incremental method. The array of constants FPKE3 are incremental differences between successive values of efficiencies. For example, the change in efficiency 0.05 is between efficiency 0.60 and efficiency 0.65. The array of constants FTKE1 are incremental differences in flow at 3800 rpms. For example, the flow 4.3 at 3800 rpm shown in FIG. 111 when subtracted from the flow 3.5 at 5000 rpms a change in flow of 0.80 is obtained. The constants FTKE2 illustrate incremental differences in the slope of adjacent efficiency lines. For example, the slope of the efficiency line for efficiency 0.60 (See FIG. 110) is approximately 4.5 on the horizontal line of the graph less 3.5 divided by 4.0–0. This is equal to 0.25 which is equal to the slope minus flow versus the transform speed FPZFA. The efficiency line for 0.65 is 5.8 minus 4.3 divided by 4.0 minus 0 which is equal to 0.375 as shown in FIG. 111 under the column 4 FPZFA. Therefore, the difference or the change in slope FDKE2 between the efficiency 0.60 and 0.65 is equal to 0.125.

The technique for determining the incremental flow between two efficiencies at a given speed is illustrated in FIG. 109. The distance D1 is found by subtracting the distance D2 from the sum of the distances D4 plus D3 because D2 and D3 are related in speed, therefore:

$$D_1 = D_4 + M_2(FPZFA) - M_1FPZFA)$$

or:

$$D_1 = D_4 + FPZFA\ (M_2 - M_1)$$

So that:

$$FPZDG = FPKE1 + FPZFA * FPKE2$$

Figure 110:
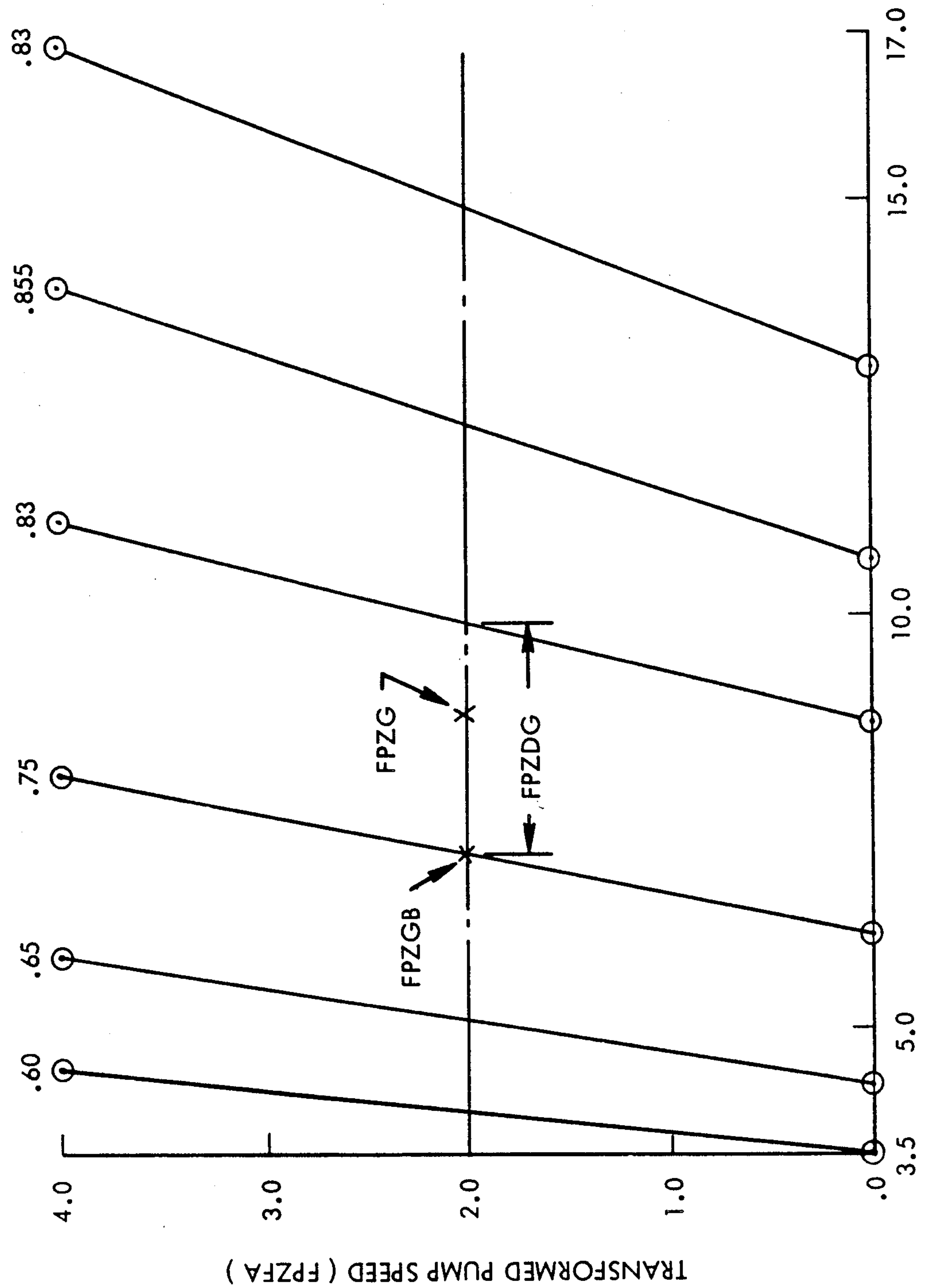
FIG. 110 is a graphical illustration of simulating the steam flow for the pump in accordance with the efficiency information of FIG. 109.

This incremental flow permits the determination of the amount of increased efficiency that must be added to the existing efficiency in the example in FIG. 110. The efficiency FPZE, which is an intermediate calculation, is determined as follows:

$$FPZE = 0.75 + \frac{FPZG - FPZGB}{FPZDG}(0.83 - 0.75)$$

The pump load is calculated from the pump differential and the mass flow in millions of pounds per hour. This pump load is converted to units of horsepower and added to the turbine mechanical power loss term FPUML. This turbine loss term FPUML is a second order function of pump speed. From the total horsepower, the steam flow to the pumps is calculated. The total horsepower is divided by a constant MSKFP1 which provides accurate simulation at all load conditions. In the constant MSKFP1, which is a steam flow constant for the turbine, a conversion from horsepower to thermal units and an assumed enthalpy decrease which for example has a value of $10^5$ power, are inherent.

Circulating Water System Simulation (CIRWR)

Figure 93L:
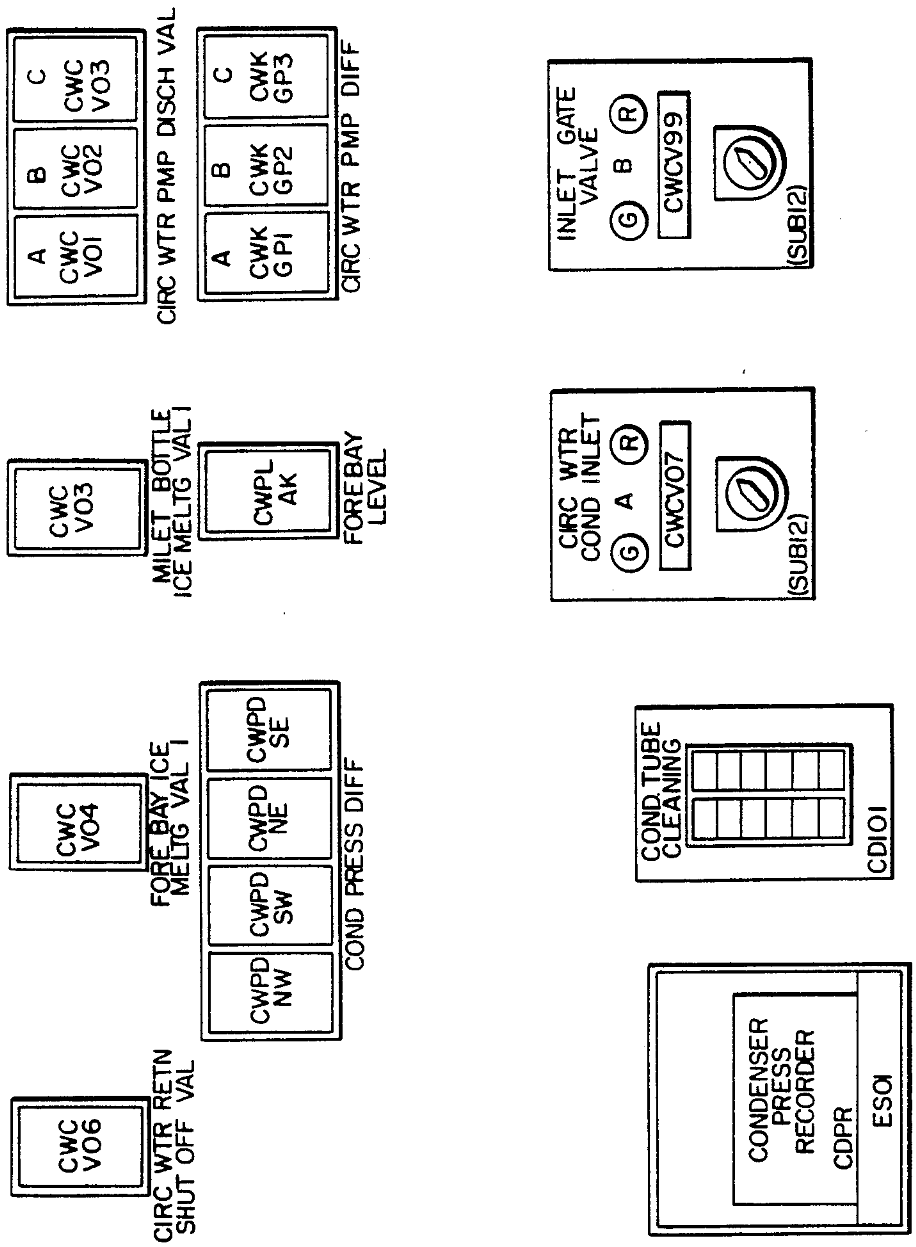
Figure 93M:
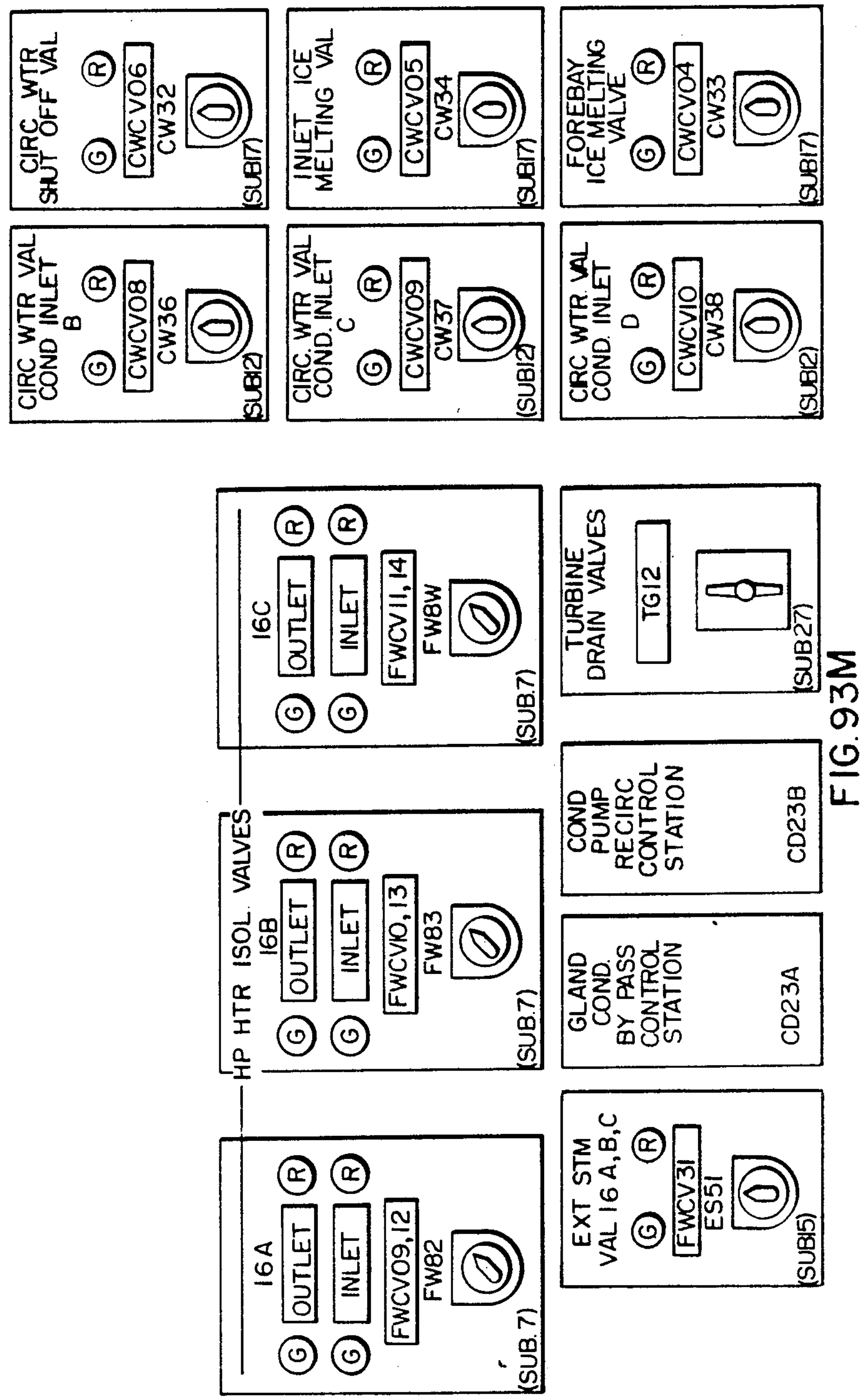
Figure 93N:
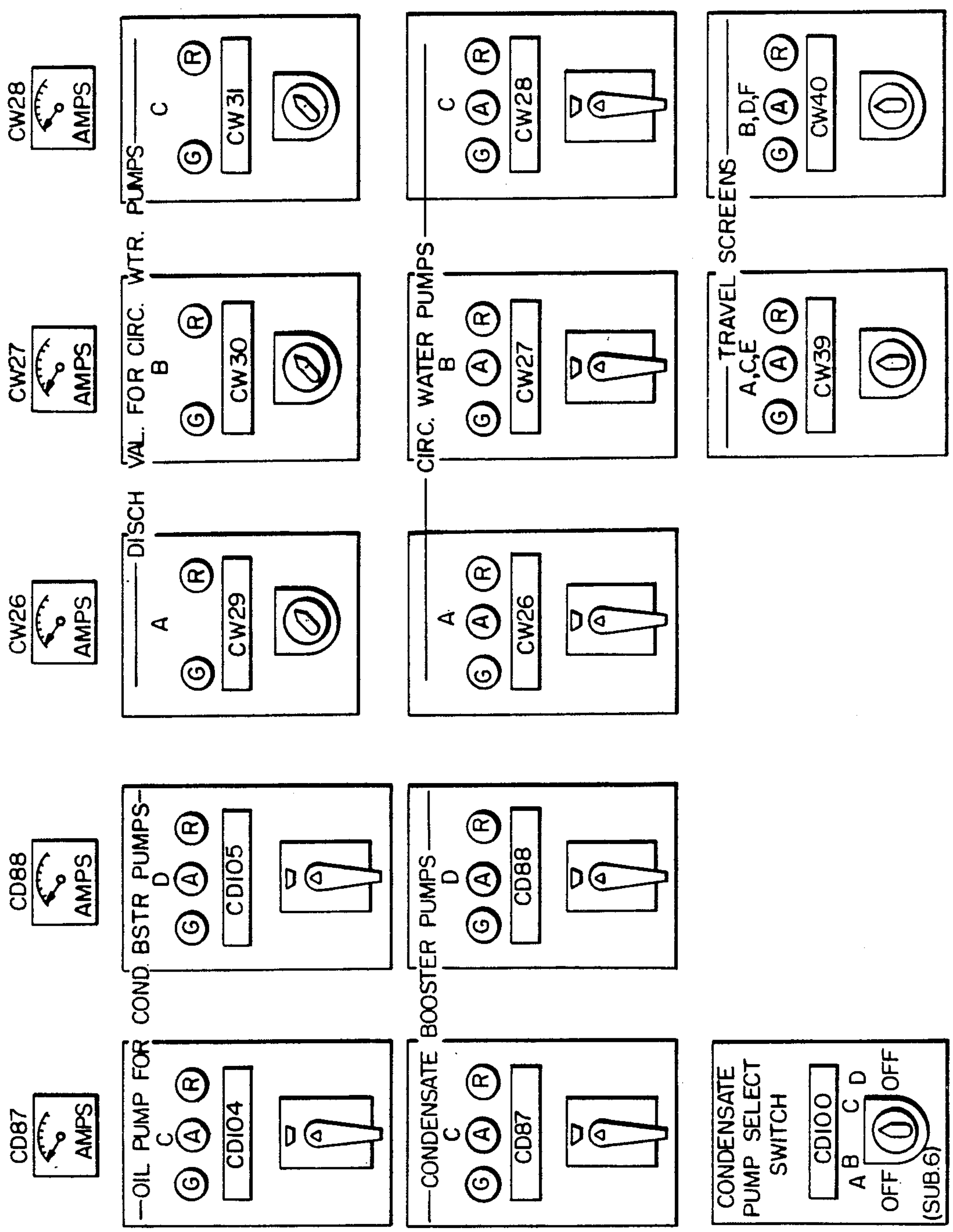

Referring to FIGS. 93L, 93M and 93N of the control consoles, and FIG. 107 the circulating water system simulation T61 will be described in connection with the analogous electrical network of FIGS. 107/1 and 107/2. The system CIRWTR is capable of simulating the operation of any or all valves in the circulating water system, the operation of any or all of the pumps CWPP(A), (B), (C) in the system, and the closure of the inlet gate valve and its effect on the level of the water in the fore bay structure.

The inputs to the simulation are the pertaining valve admittances and pump speeds from the valve handler program and the pump handler program hereinbefore described. The total circulating water flow CWWT to the condenser CNDSR is the only output of this system that is used by other models or programs. In the control panels there are outputs that provide for the various valve position indications, the fore bay level structure and the circulating water pump differential pressures.

Referring to FIG. 107/2, each pump CWPPA, CWPPB, and CWPPC is simulated as an ideal voltage source with an internal admittance, while piping pressure drops and valve effects are simulated with linear admittances. The network is solved by a node equation for the pump discharge header CWWT. It should be noted that the pump header node can be isolated by closing all the pump discharge valves CWCV01, CWCV02 and CWCV03 and all the condenser water box valves CWCV07, CWCV08, CWCV09 and CWCV10. In this event, the header pressure CWPHD1 is permitted to decay rapidly and all flows are set to zero. The condenser water box discharge header CWPH may also be isolated by the closing of the condenser water box valve CWXV07 through CWCV10, and it is treated in a similar manner.

Referring to FIG. 107 under normal conditions the main water intake from the lake is through the inlet gate valve CWCV99; but under winter operating conditions for example, it is sometimes desirable to close the inlet gate valve CWCV99, and recirculate warm water out to the inlet structure to valve CWCV05 rather than discharge the water from the condenser directly to the lake through CWCV06. The fore bay is a tank that is represented by a capacitance CWPLAK (See FIG. 107/7). The static pressure or head at the inlet structure is assumed constant. The pressure or head at the fore bay structure inlet is a function of the water level in the fore bay structure. This level is determined by a mass balance of the inflows and outflows. For example, should the inlet gate valve CWCV99 be closed, the flow contribution of one inlet line to the four bay structure is lost, resulting in a reduction in level.

The circulating water pump CWPPA, CWPPB, and CWPPC are simulated according to head versus capacity curves inherent in the pump operation. The parabolic nature of these curves is simulated by two straight line segments. The head versus capacity curves are converted to pressure versus mass flow curves by assuming a constant specific gravity; and the segments pass through the following points when the pump is at a particular rated speed:

| PRESSURE | FLOW |
|---|---|
| 25.50 | 0.00 |
| 18.20 | 122.64 |
| 0.0 | 195.00 |

The two shutoff pressures for the segments are 25.5 and 48.95 PSID while the corresponding internal admittances are 16.846 and 3.9835 ($lb_m - In^2$)/hr$-10^6-lb_f$). The inner section of the two straight line segments is located at a flow of $122.64 \times n$(lb/hr/$10^6$), where n is the normalized pump speed.

The shutoff pressures for the two straight line segments vary linearly with pump speed, while the internal admittance remain constant. The determination of which shutoff pressure and associated admittance should be used depends upon the break point flow. The break point flow is that flow of the pump where the line segments intersect. At rated pump speed this flow is 122.64 lb/hr/$10^6$. When the actual pump flow is greater than the break point flow, the second segment is used to simulate the pumps. A more detailed description of the pump simulation is given in connection with the description of the main feedwater system simulation FWFLUD.

As previously mentioned, the piping pressure drops and all the values in the system are simulated as linear admittances, with the exception of the three valves CWCV01, CWCV02, and CWCV03. The last mentioned valves are used for throttling and their valve positions are displayed in the central office. The admittance of these valves is made proportional to the flow area, and the flow area is determined by the following trigonometric equation:

$$A = (1 - \text{COS}(x))A_{max}$$

where

A=area $A_{max}$=maximum area x=valve position (0 to $\pi/2$).

The function $G = (1 - \text{COS}(x))\,G_{max}$ where

G=valve admittance ($lb_m - IN^2$/hr/$10^6$/$lb_f$)

$G_{max}$=maximum admittance

The maximum admittance is simulated by three straight line approximations. The pump discharge valves CWXV(01), (02), (03) are assumed to have a 3 PSID pressure drop at the pump design flow of 122.64 lb/hr/$10^6$. This assumption results in a maximum admittance of 40.80 ($lb_m - IN^2$)/(hr$-10^6-lb_f$). The total resistance downstream of the pump header CWWT comprises the condenser tubes and the valves CWCV07 through CWCV10, and the circulating water return line and its valve CWCV06.

The design conditions for the preferred embodiment specify two circulating water pumps CWPP in operation, with each pump providing a flow of 122.64 (lb/hr/$10^6$), at a discharge pressure of 18.2 PSID. The total pressure drop from the pump header CWPHD1 to the lake discharge must be (18.2−3.0) equals 15.2 PSID at a total flow of 245.28 (lb/hr/$10^6$). Under these design conditions, the admittances of the individual downstream components have been produced. A drop of 2 PSID is assumed for the circulating return valves CWC05 at the above flow. The resulting maximum admittance 122.64 $(lb_m-IN^2)/(hr-10^6-lb_f)$, the piping pressure loss is lumped with the valve pressure loss. The remaining pressure drop of 13.2 PSID is lost across the four sets of condenser tubes and their associated valves CWCV07-10 inclusive. The admittances of one set of condenser tubes and its associated valve is:

$$4.65\ (lb_m-IN^2)/(hr-10^6-lb_f).$$

The network is given an admittance that ranges from 0 to 4.65, depending on the valve position. The flow through the tubes depends solely on this admittance. Referring to FIG. 4A49, the differential pressure across the condenser tubes is displayed on the control console. This value is generated by utilizing the flow and dividing it by the estimated constant admittance. This method effectively multiplies the valve admittance and the tube admittance. The constant for the estimated admittance results from an assumed differential pressure of 6.5 PSID at a flow of (245.28/4.0)=61.32 (lb/hr/$10^6$).

The inlet bottle ice melting valves CWCV05 and the four bay inlet ice melting valve CWCV04 have admittances that are deduced from the circulating water return valve. Estimates of these maximum admittances are obtained by multiplying the return valve admittance by the ratio of the valve areas. The inlet bottle valve is a 12 foot valve, and the return valve is a 14 foot valve. Therefore the maximum valve admittance is 90.0 $(lb_m-IN^2)/(hr-10^6-lb_f)$. The fore bay ice melt valve is an 8 foot valve and similarly has an admittance of 40.0 $(lb_m-IN^2)/(hr-10^6-lb_f)$.

The inlet lines to the fore bay structure CWPLAK have an assigned admittance. A head loss of 8 feet or 3.46 PSID provides a total flow of 366.0 lblb/hr/$10^6$. The admittance of one inlet pipe is therefore 105.577 $(lb_m-IN^2)/(hr-10^6-lb_f)$. For the specific electric power plant being simulated, the lake is assumed to have a constant level of 583 feet and the inlet pipes are located at 553 feet. The effective pressure at the inlet pipe is therefore equal to 12.999 PSIG.

SERVICE WATER SYSTEM (SERWTR)

Figure 91H:
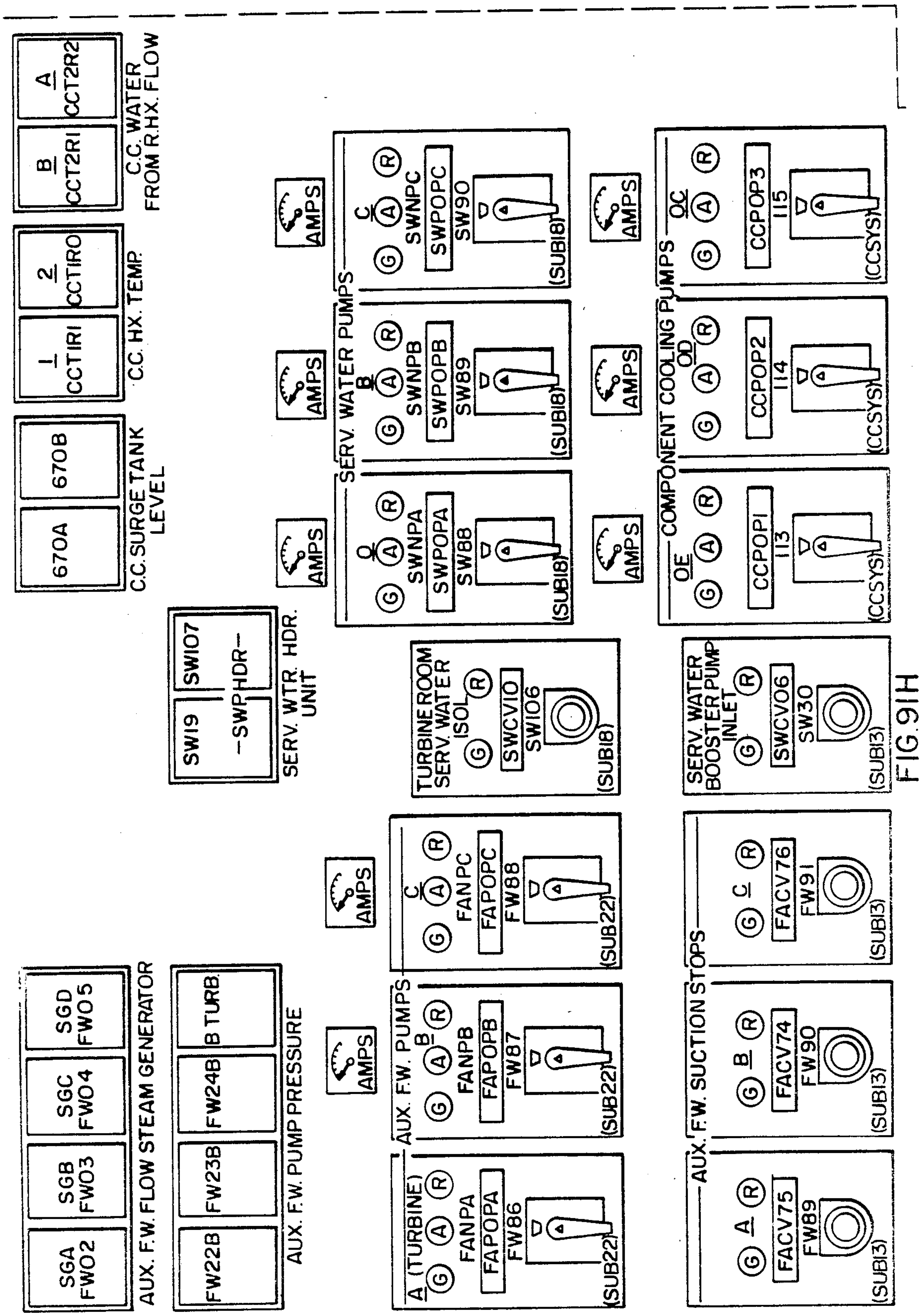
Figure 911:
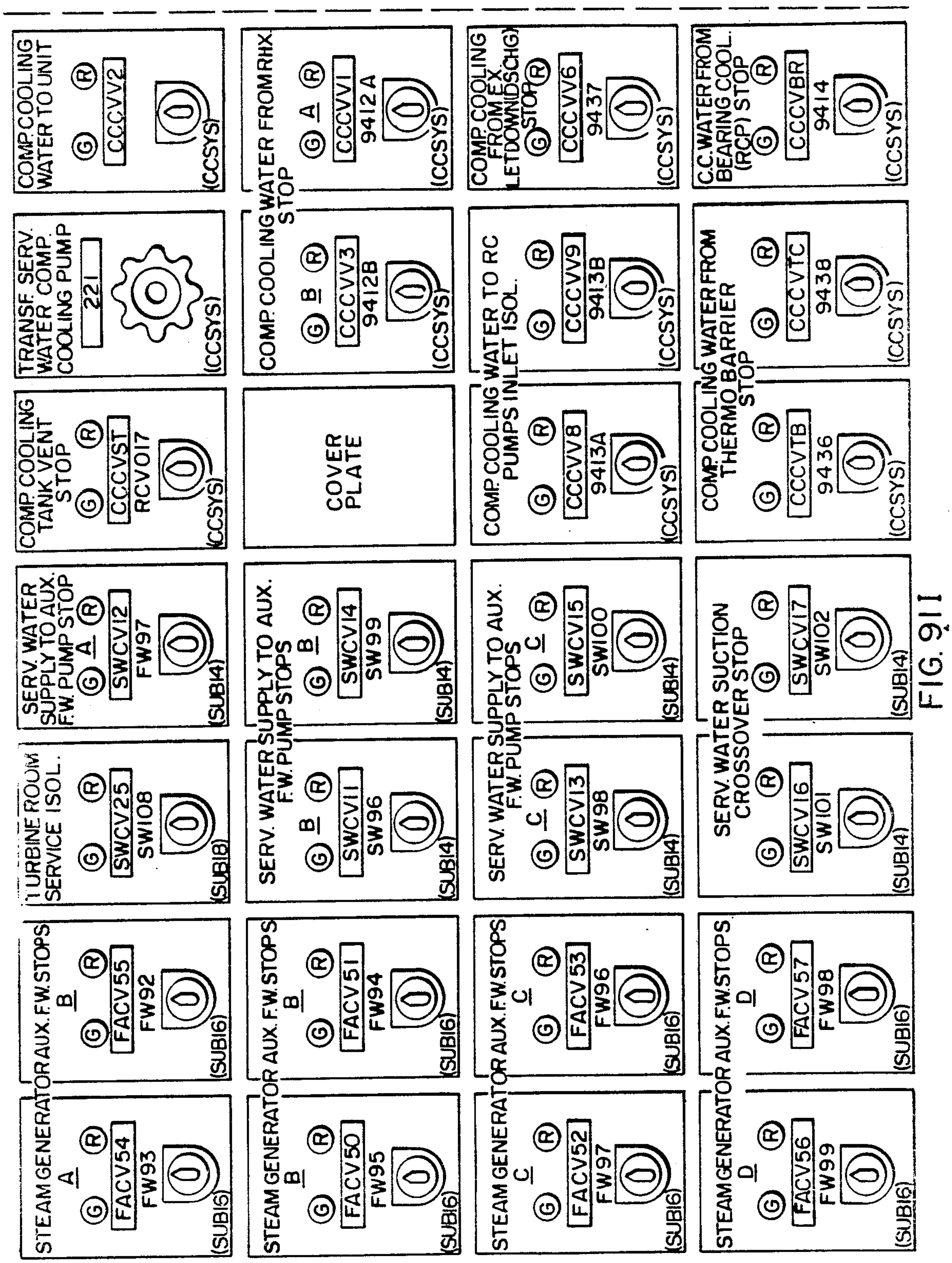
Figure 9I:
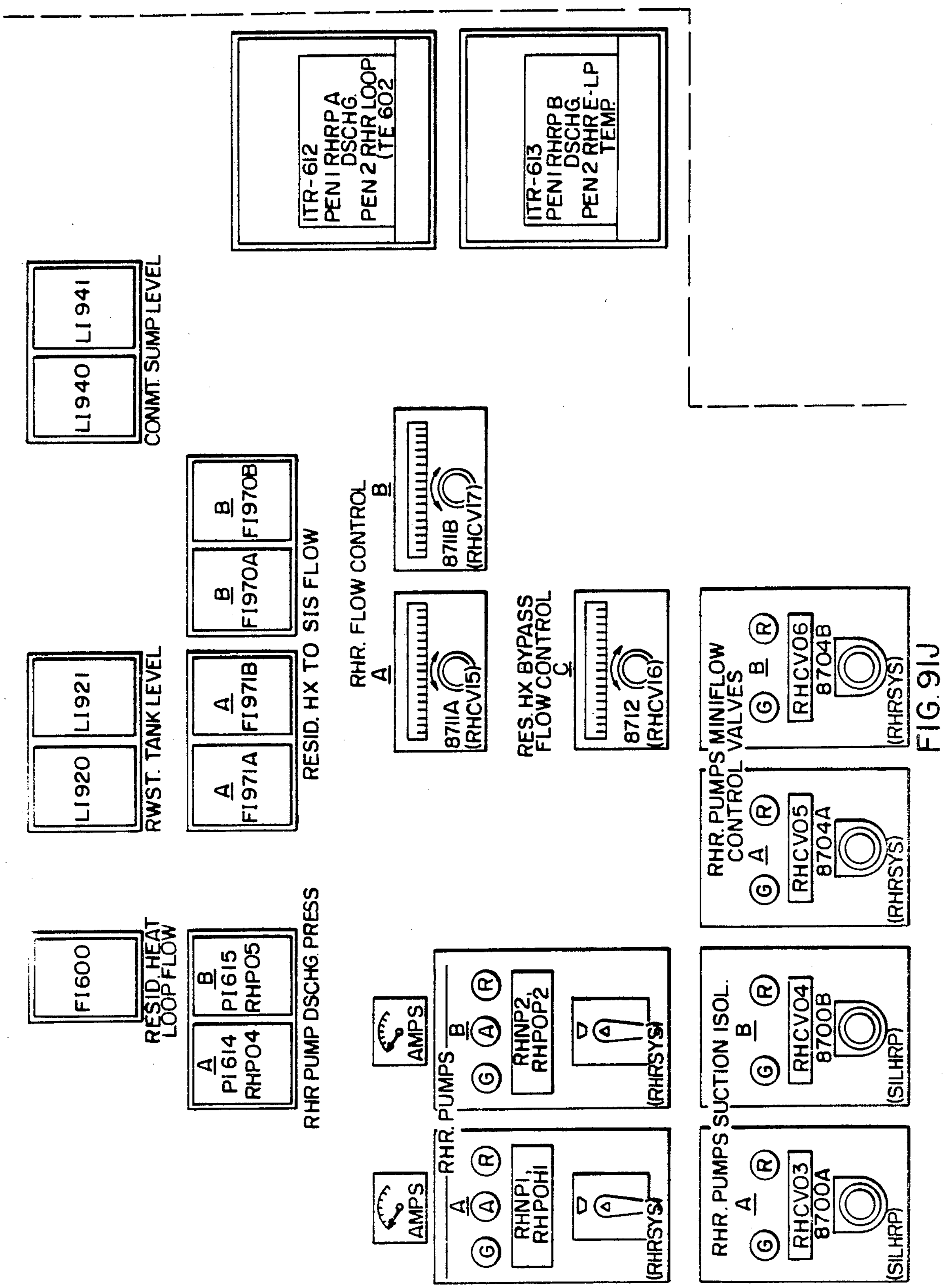
Figure 91K:
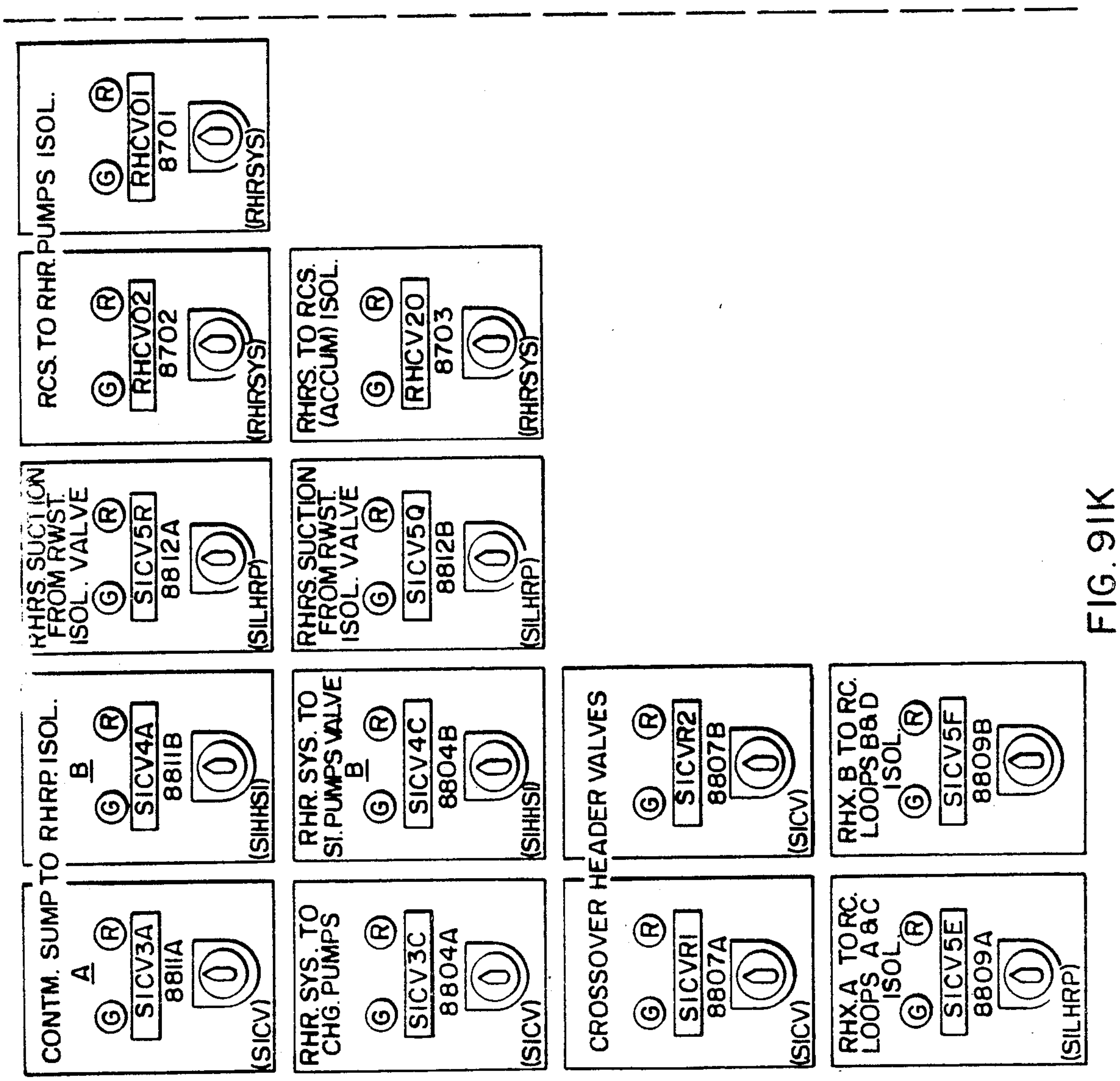

Referring to FIG. 108, and that portion of the control panel illustrated in FIGS. 91H and 91I, the service water system provides cooling water to various components throughout the entire plant, such as the Diesel generator heat exchangers for Diesel generators DGO, DGB, and DGC and the auxiliary feedwater pumps FAPA, FAPB, and FAPC as well as other miscellaneous components of the plant. The service water system includes three motor driven pumps SWPA, SWPB and SWPC, and a service water booster pump SWPBP. All of the valves in the system SWCV06 through SWCV19 are either in an open or a closed condition. The header pressure of the service water pumps is indicated on a meter on the control panel of FIG. 91H and 91I.

The simulation T59 of the service water system is executed by the subroutine SERWTR, and it embraces the service water pumps SWPA, SWPB, SWPC, or SWPBP, which are operational in response to the movement of corresponding levers on the control panels and the position of the various valves in the service water system including the turbine room isolation valves SWCV10 and SWCV25. The model SERWTR also provides simulation of the flow requirements, including backup for the Diesel generator heat exchangers, and the varying flow requirements of the primary plant component cooling system.

The service water system model SERWTR responds to the electrical load of the plant, and it has a related input MFWST which is the total steam flow to the high pressure turbine. The pump handling and the valve admittances are received from the pump handler PHAND and the valve handler VCHAND.

The simulation of the service water pumps SWPA, SWPB, and SWPC, and the service water booster pump SWPBP are modeled in the same manner as the auxiliary feedwater pumps FAPA, FAPB, and FAPC. Referring to the electrical analogy illustrated in FIG. 108/1, the internal voltage of the pumps is analogous to the pump's shutoff head, and the internal admittance is a linear approximation of the pump head versus flow characteristic. Such approximation utilizes a pressure coordinate $P_1$ of 126 psig, $P_2$ of 88.5 psig, and a flow $W_1$ of 0, and a flow $W_2$ of 10.68 millions of pounds per hour.

The three service water pumps SWPA, SWPB, and SWPC are combined into a single effective source, and the effect of the individual check valves is included in a manner similar to the other systems.

In simulating the fluid networks, the admittances SWKGDG, SWKGTR, SWKGCC, which represent the Diesel generator heat exchangers, the turbine room supply, and the component cooling water supply, are sized by assuming a pressure difference of 1.25 psid for example and a flow of 1.5 for the Diesel generator heat exchangers, 2.5 for the turbine room flow, 0.60 for the auxiliary feedwater, 6.5 for the components cooling of in millions of pounds per hour. The admittances of the valves are set at a maximum of 1 and the effect of the shutoff valve is accomplished by multiplying the admittance of a particular system with the valve in series with it.

In solving the electrical network analogy, continuity equations are utilized.

GLAND STEAM SEAL SYSTEM

Figure 93O:
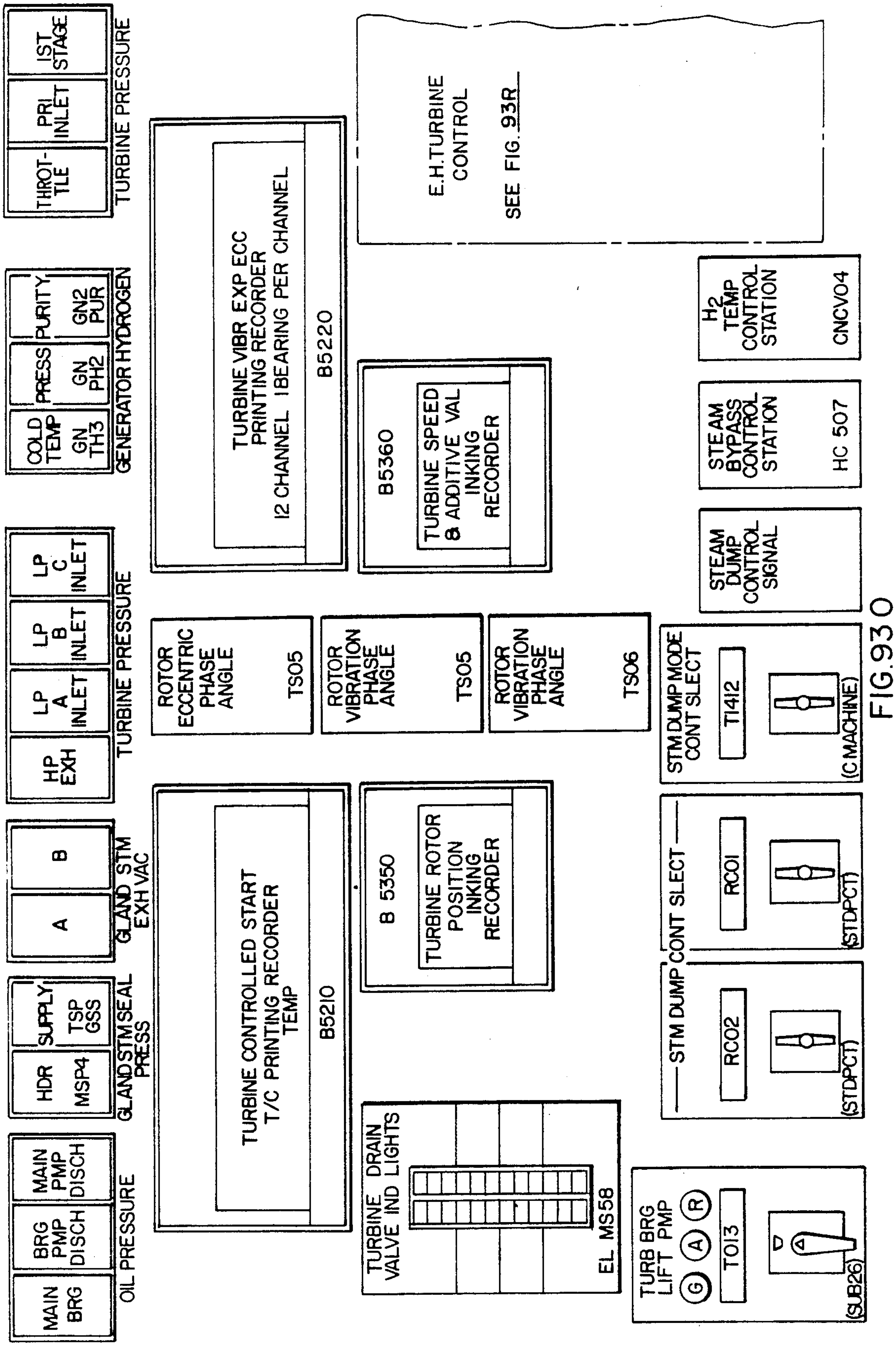
Figure 93P:
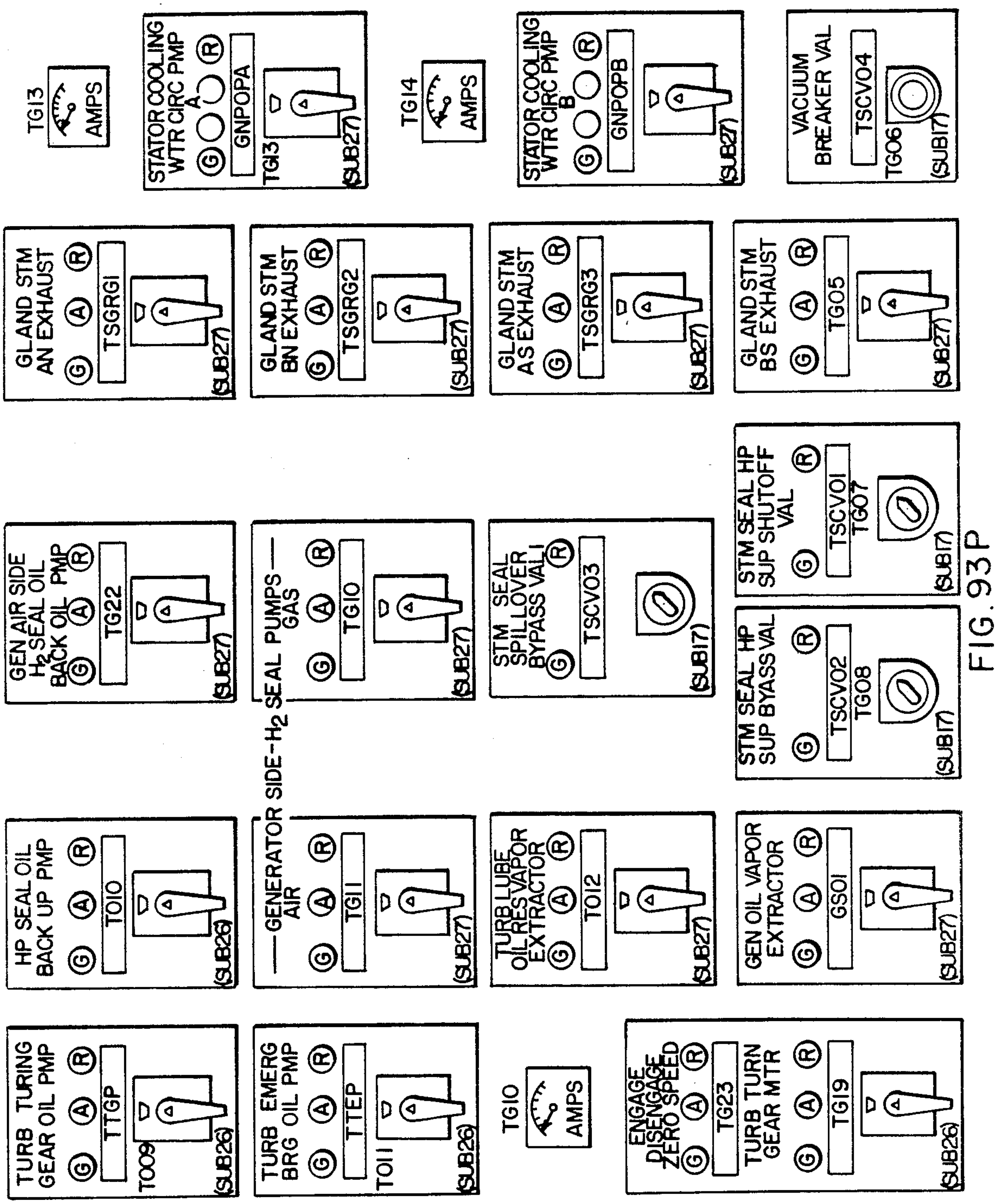

Referring to FIG. 109, and that portion of the control console illustrated in FIGS. 93O and 93P, the gland seal system conducts steam from the main steam header through supply valve TSCV01, regulator valve TSGRG1, and the low pressure and high pressure labyrinth seals on the rotors of the main steam turbines. The gland seal system prevents the leakage of air into, or steam from the turbine cylinders along the rotor ends. After sealing the labyrinth seals, the steam goes to a gland condenser. The purpose of a gland steam seal system is well known and needs no further description.

Gland Steam Seal System Simulation (BOPAUX)

The gland steam system which is included in model T47 (BOPAUX) is capable of simulating manipulation of all the motor operated bypass and shutoff valves in the seal system; (see FIG. 93P), the effect of main steam header pressure variations on seal system pressures as indicated in the meters in FIG. 93O, and the effect of the high pressure turbine internal pressure on the seal system pressures.

The inputs to the model BOPAUX include main steam header pressure MSPH, and normalized turbine impulse pressure HPWIN. The system has two outputs, gland steam seal supply pressure TSPGSS, and gland steam header pressure TSPGSH.

In simulating the system, the assumption has been made that a total design steam seal flow of 1000 pounds per hour applies. This assumed flow could be any appropriate value because the gland seal steam flow is not considered in the steam plant balance.

Referring to FIGS. 109/1 and 109/2, the model BOPAUX is formed by two parts. In FIG. 109/1, the first part shows the electrical analogy of the valves and piping that reduce the main steam header pressure MSPH and establish a supply pressure TSPGSS at approximately 140 psia for example. Referring to FIG. 109/2, the second portion of the system is the combination of piping and valves that maintain the required pressure, such as 16 to 20 psia, for example, in the high pressure turbine seals. The sizes of the individual valves have been estimated on manufacturer's information.

In FIG. 109/1, the constant load is represented by the admittances TSKG1. Because the design considerations require a 140 psia pressure and a flow of $1.0\times10^{-3}$ lb/hr/$10^6$, the load admittance TSKG1 is calculated in accordance with the following:

$$SKG1 = \frac{1.0\times10^{-3}}{(140-0)} = 7.15\times10^{-6}\left[\frac{\text{lb/hr/}10^6}{\text{psi}}\right]$$

A main steam header pressure MSPH of 185 psia will permit a supply pressure TSPGSS of 140 psia to be maintained. If the shutoff valve TSCV01 admittance is assumed to be ten times greater than the regulator TSGRG1 admittance, and the assumed flow as previously described is used, the maximum regulator admittance is as follows:

$$\frac{10[TSGRG1_{max}]^2}{[1+10]TSGRG1_{max}} = \frac{1.0\times10^{-3}}{185-140}$$

$$TSGRGI_{max}=2.44\times10^{-5}(lb/hr/10^6)/(lb\ psi/IN^2)$$

and:

$$TSCV\mathbf{01}_{max}=2.44\times10^{-4}(lb/hr/10^6)/psi).$$

The bypass valve TSCV02 is assumed to have the same maximum admittance as the regulator admittance TSGRG1.

The regulator valve is assumed to have a proportional-plus-integral transfer function. The proportional band is assumed to be 75 psia, the reset time is assumed to be 30 seconds, and the set point is 140 psia. The regulator valve TSGRG1 is assumed to have a time constant of five seconds. A single node equation applies to the supply header node.

Referring to FIG. 109/2, the gland steam seal header pressure TSPGSH involves the high pressure turbine seals exclusively. The header pressure TSPGSH is influenced by both the supply pressure TSPGSS and the internal pressure of the high pressure turbine TRIPHP. When the high pressure turbine pressure TRIPHP is low, the regulator TSGRG2 maintains the pressure at approximately 16 psia. When the turbine pressure is greater than 16 psia, the regulator TSGRG3 controls the pressure. The admittance TSKG2 represents the piping resistance; and the bypass valve TSCV03 is utilized if there is a failure of the regulator TSGRG3.

A value for the regulator admittance TSGRG2 is calculated by assuming that ¼ of the assumed flow of 1000 pounds per hr. for example, is used to seal the high pressure turbine. For a header pressure of 16 psia, a supply pressure of 140 psia, a flow of 250 pounds per hr., and a regulator that is half open, the maximum admittance for TSGRG3 as follows:

$$TSGRG3_{max} = \left[\frac{2.50\times10^{-3}}{140-16.0}\right]2 = 1.56\times10^{-5}\left[\frac{\text{lb/hr/}10^6}{\text{psi}}\right]$$

The constant admittance TSKG2 can be deduced by considering the instance when the turbine pressure is zero and the header pressure is 16 psia. For a flow of 250 pounds per hours, the admittance TSKG2 is as follows:

$$TSKG2 - \frac{2.50\times10^{-3}}{160-0} = 1.56\times10^{-5}\left[\frac{\text{lb/hr/}10^6}{\text{psi}}\right]$$

The turbine internal pressure TRIPHP is known to vary with load. Since the turbine is an axial flow machine, the internal pressure that effects the rotor seals is nearly the exhaust pressure of the steam In actuality this pressure exceeds 20 psia at 10 to 15% of the load. Assuming that such internal pressure TRIIHP is 21 psia for example at 15% of the load, and that the normalized impulse pressure HPWIN is the indication of load, then TRIPHP is calculated as follows:

$$T21PHP = \frac{21.0}{0.15}(HPWIN) = 140.0(HPWIN)$$

The spillover regulator maximum admittance TSGRG3 can be determined from the 100% load condition of the turbine. The turbine pressure at 100% is 140 psia, the header pressure is in the neighborhood of 20 psia, and regulator admittance TSGRG2 is zero. The node equation can be written to solve for the required value G that will yield a header pressure of 20 psia as follows:

$$20 = 140\frac{TSKG^2}{TSKG2+G}$$

$$G = 9.36\times10^{-5}\frac{\text{lb/hr/}10^6}{\text{psi}}$$

Assuming that the regulator TSGRG3 is half opened, the maximum admittance would be as follows:

$$TSGRG3_{max} = 2[9.36\times10-5] = 1.872\times10^{-4}\frac{\text{lb/hr/}10^6}{\text{psi}}$$

TURBINE OIL SYSTEM (BOPAUX)

Figure 112:
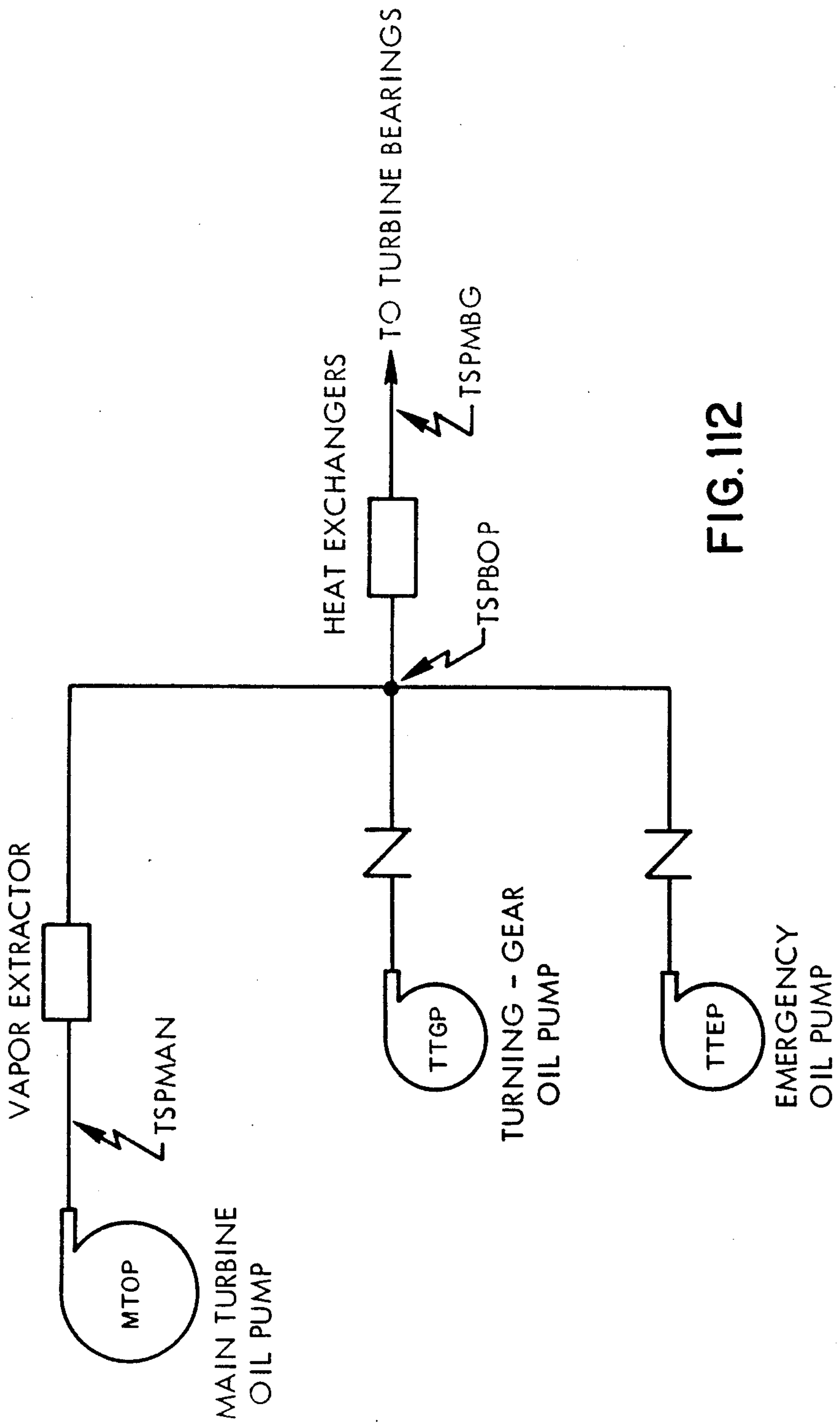
FIG. 112 is a schematic diagram of the turbine oil system that is simulated in accordance with the present embodiment of the invention.

Referring to FIG. 112 and the portion of the control panel as illustrated in FIGS. 93O and 93P, the turbine oil system supplies low pressure lubricating oil to the main turbine bearings. Main turbine oil pump MTOP operates off the shaft of the main turbine to force the oil through a vapor extractor and heat exchanger to the turbine bearings. At low rpm, when the pressure is insufficient to lubricate the bearings a turning gear oil pump TTGP is operated to deliver oil to the turbine bearings at the proper pressure. An emergency oil pump TTEP is provided in the event of malfunction of either of the other two pumps The simulation of the turbine lub oil system is contained in the model T47 (BOPAUX), and includes three inputs: the speed of the turbine GNN, the status TGOTGP of the turning gear oil pump TTGP, and the status of the emergency oil pump TEP.

The outputs to the simulation include the main turbine oil pump discharge pressure TSPMAN, the bearing header pressure of the oil pumps TSTBOP, and the bearing supply pressure TSPMBG. The turbine lub oil simulation is capable of simulating the variation in main oil pump discharge pressures in response to a variation of turbine speed, the operation of the motor driven turning gear oil pump TTGP and the emergency oil pump TEP.

The simulation of the lubrication system has been simplified, and yet provides for accurate indications on instrumentation in the central control room, by assuming that the pump TTGP and TEP obtain full speed instantly, that the check valves for these pumps act instantly and without leakage, and that the flow demand on the pump is assumed to be constant regardless of equipment. At a rated speed of 1800 rpm for the main turbine, the pump MTOP discharge pressure TSPMAN has a value of approximately 350 psig, for example. A parabolic relationship is assumed between the pump pressure TSPMAN and the turbine speed GNN as follows:

$$TSPMAN = 350\left[\frac{GNN}{1800}\right]^2$$

As the oil passes through the vapor extractor (see FIG. TOS1) the oil pressure drops to approximately 19.44 psig at 1800 rpms. If the auxiliary oil pumps TTGP and TEP are off, the bearing oil pressure TSPBOP is calculated as follows:

$$TSPBOP = \frac{19.44}{350}\ TSPMAN = \frac{TSPMAN}{18}$$

The turning gear and emergency pumps TTGP and TEP, respectively are simulated to develop 15 psig at the bearing oil pressure header. If the main oil pump MTOP establishes a pressure that is greater than 15 psig, the check valves insure that the highest pressure prevails. Main bearing supply pressure TSPMBG is that pressure which occurs after the turbine oil heat exchanger. Thus, the pressure TSPMBG is somewhat lower than the bearing oil pump header pressure TSPMAN due to piping and heat exchanger pressure drops. Thus, with the pressure TSMAN at 19.44 psig, the supply pressure TSPMBG is 16.66 psig so that the main bearing supply pressure TSPMBG is as follows:

$$TSPMBG = \frac{16.66}{19.44}\ TSPBOP = 0.857\ TSPBOP$$

TURBINE CONTROLLER SYSTEM

Figure 93Q:
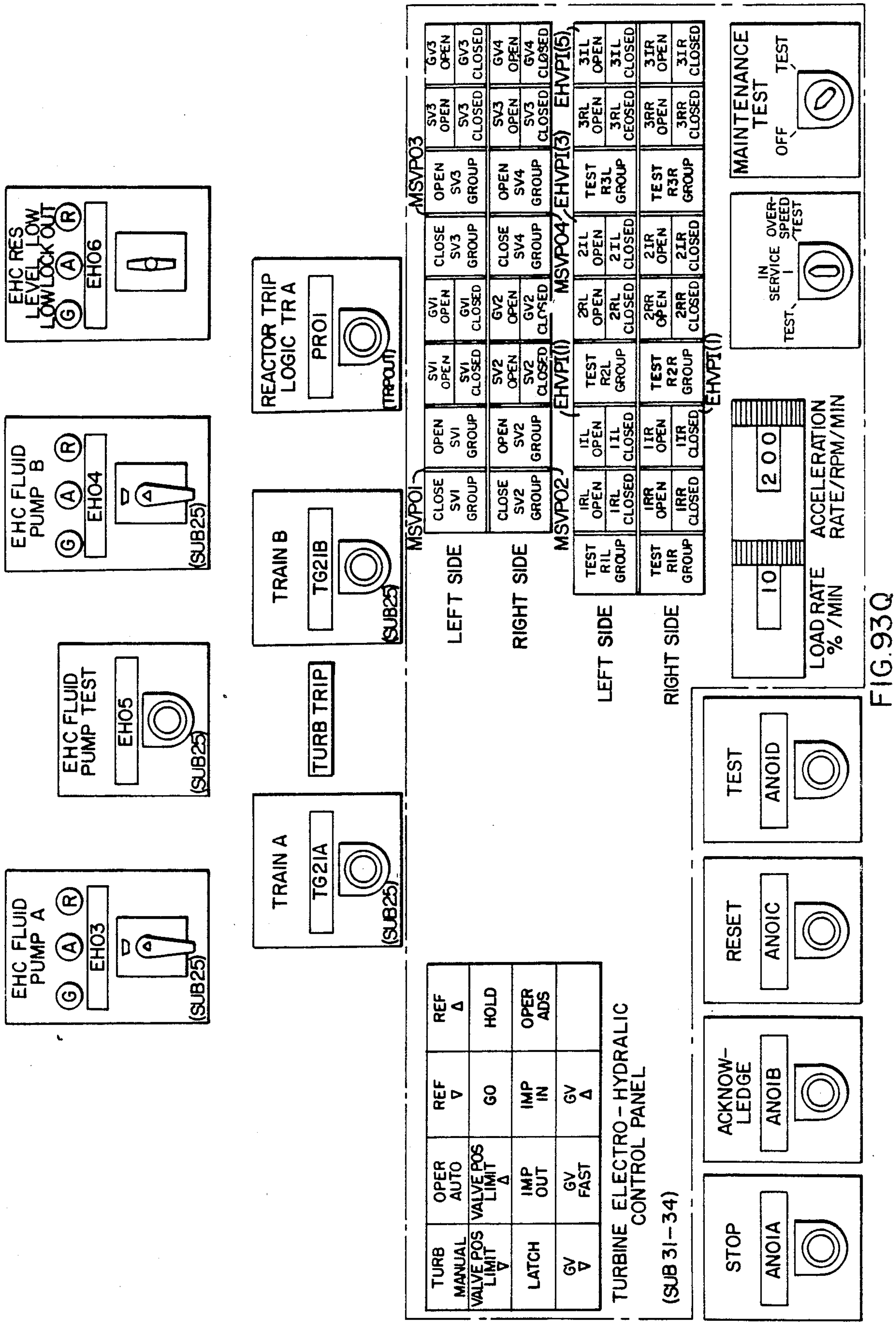
Figure 93R:
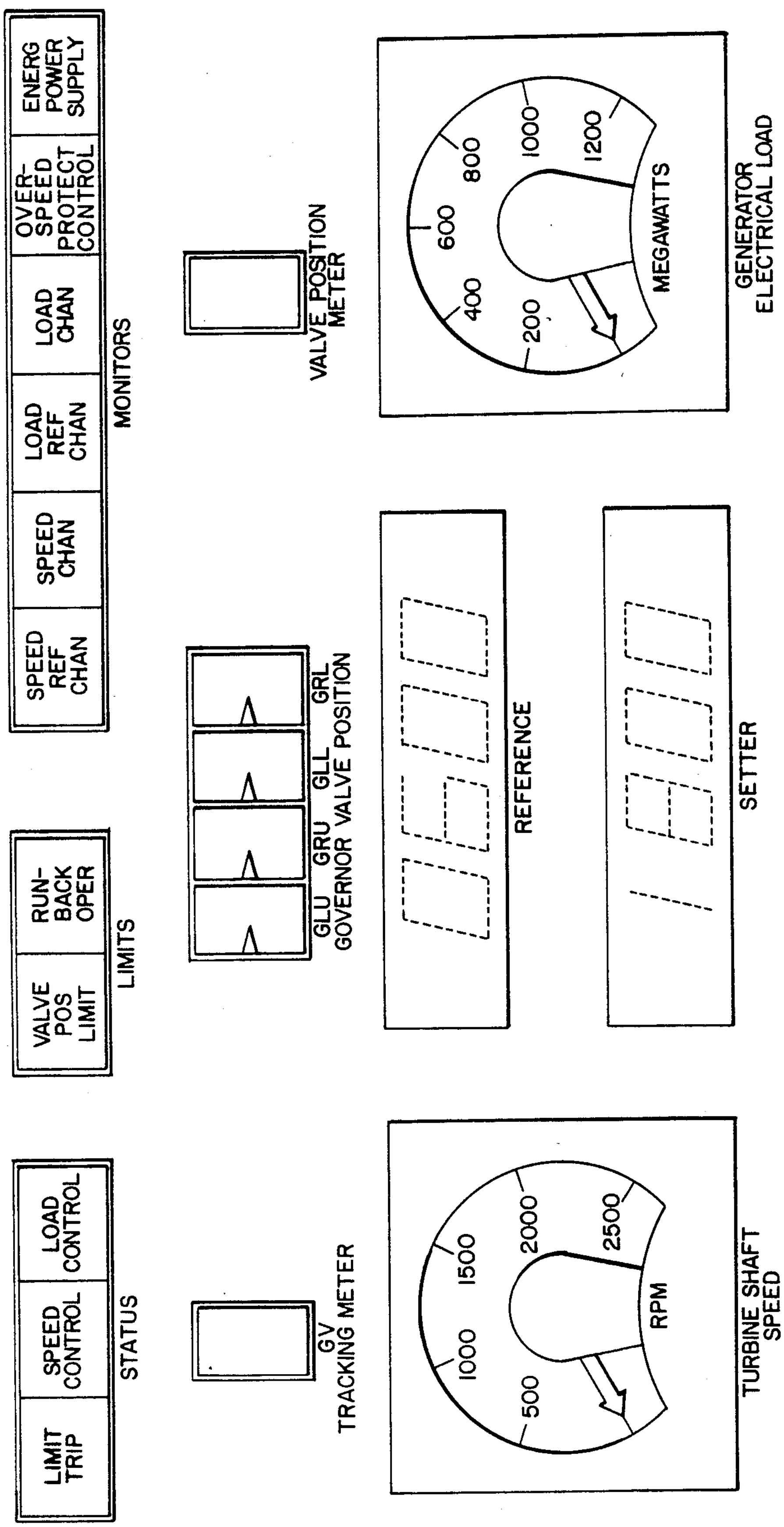
Figure 113:
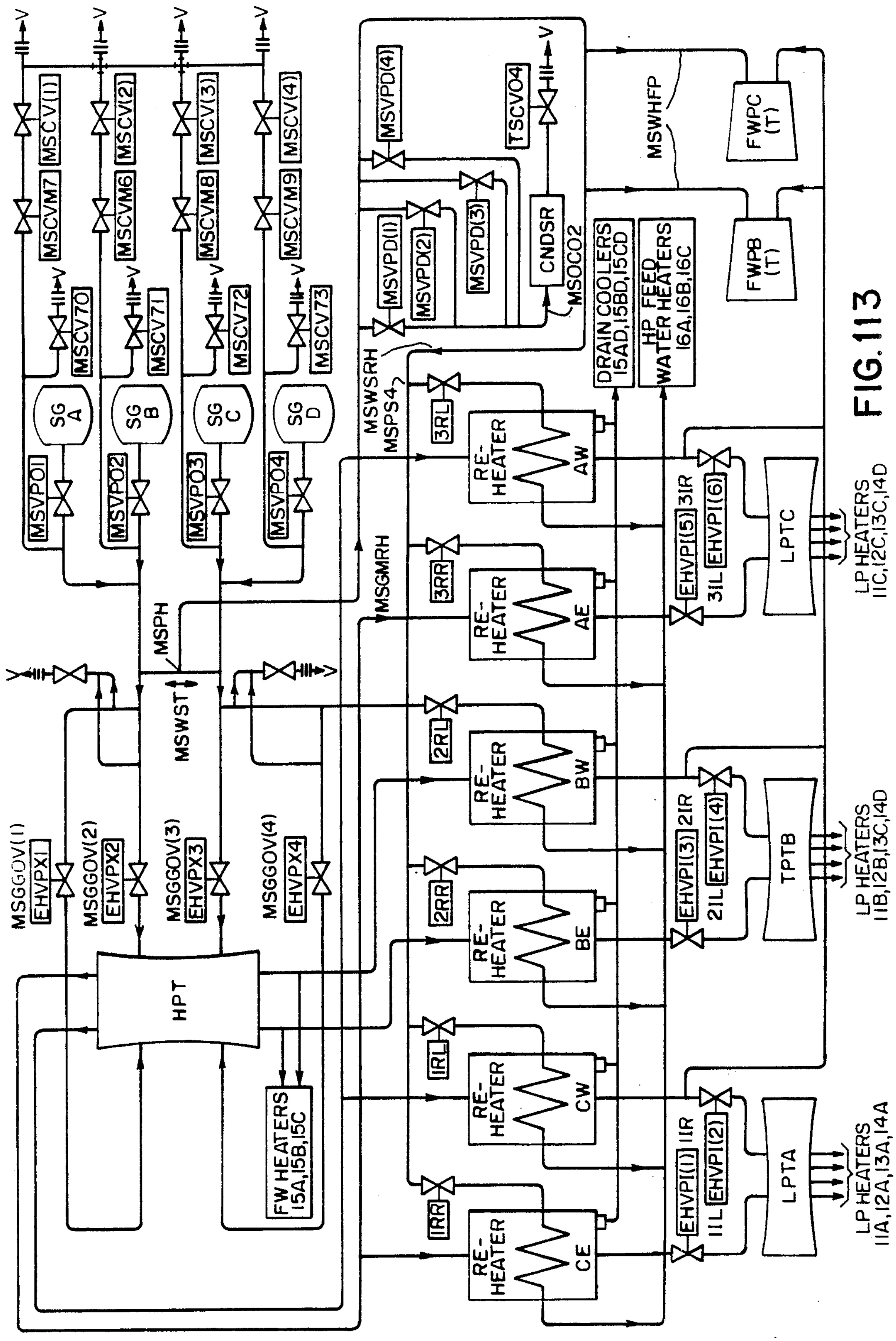
FIG. 113 is a schematic diagram of a U-tube steam generator of the type being simulated.

In the system being simulated and referring to FIG. 113, and the control panel illustrated in FIGS. 93Q and 93R, stop valves MSVP(01), 02, 03, (04), and governor valves EHVPX1, 2, 3, 4, in the four high pressure steam inlet lines provide the prime steam control for the system. The stop valves MSVP(01), (02), (03), (04) provide limited startup steam flow control and provide a safety function to abruptly cutoff turbine inlet steam flow if the turbine protection sensors detect a condition that could damage the turbine. In the plant being simulated in the present case, the modulating governing valves EHVP(X1), (X2), (X3), (X4) are under servo control of the analog electro-hydraulic EH control system T44, and are used to bring the turbine up to synchronous speed and substantially to maintain control speed as the turbine meets varying electrical load demands. In other plant simulations, the particular manner in which the governor valves are operated under closed loop control can vary without affecting the applicability of most invention features disclosed herein.

Reheat stop valves 1RR, 2RR, 3RR, and 1RL, 2RL, and 3RL, and the intercept valves EHVP(I1), (I2), (I3), (I4), (I5), and (I6) for each of the six low pressure inlet lines regulate the flow from the high pressure steam stored in the high pressure turbine and moisture separator reheater system. The open-close intercept valves IR and IL function to limit the turbine overspeed following an electrical load rejection. The governor valves EHVP(X1), (X2), (X3), (X4), in this situation close to reflect the new load requirement, but even with inlet steam flow cut off the steam already stored in the high pressure turbine and moisture separator reheaters would continue to drive the low pressure turbines and the turbine system would tend to speed up under the decreased electrical load. The intercept valves IR and IL trigger closed at 103% overspeed setting, and begin to reopen slowly after the turbine returns to synchronous speed. If the stored steam again causes an overspeed condition, the intercept valves IR and IL trigger closed again and the cycle is repeated until the stored energy is dissipated. The open-close reheat valve RR and RL operate in conjunction with the stop valves (02), (03), (04) to abruptly secure steam flow to the turbine in the event of a turbine trip and prevent damage to the turbine system.

The hydraulically actuated valves are manipulated by an electrohydraulic high pressure fluid control system. The electrohydraulic pumping system maintains the high pressure on a common header supplying the piston actuators through an inlet control valve system. The return lines to the EH reservoir are secured by back pressure on ball check valves until trip signals open in-line block valves unseating the ball checks, releasing the high pressure hydraulic fluid back to the reservoir, and causing the valves to close abruptly.

The governor valves are positioned by a servo system in response to signals from the EH controller and are tripped closed by hydraulic action. The stop valves MSVP01, (02), (03), (04), reheat valves RR and RL and intercept valves IR and IL are opened by hydraulic pressure below the actuator piston and are tripped closed by a compression spring above the piston when the hydraulic pressure is removed. The governor valves EHVPX1, (X2), (X3), (X4) and intercept valves IR and IL are tripped by solenoid valves in response to a signal from the auxiliary governor to minimize turbine overspeed and prevent a total turbine trip. They are reopened upon loss of the overspeed signal to stabilize the turbine and synchronous speed. All valves would be tripped by a solenoid valve tied to the reactor trip and steam generator high HI-HI level sensors or by the diaphragm operated valve linking the EH system to the turbine lube oil and automatic stop oil safety system. This action would cause a total turbine trip and effect an associated generator trip. Thus, control of the turbine valves in the system being simulated is accomplished by two interrelated systems: a high pressure fluid system which provides the means to move all the valves; and an electronic controller EH that comprises an analog control system and a protective system of logic.

According to the present embodiment of the invention and referring to FIG. 110/5, a fraction of the load reference R(S) is added to the impulse pressure signal I(S) instead of reducing the load reference gain $K_{REF}$. Thus when the load reference is 100% and the impulse pressure is 100% the error signal E(S) is zero. The transfer function is shown as follows:

$$I(s) = \left[ \frac{KG(s)}{1 + KG(s)} \right] R(s)$$

Referring to FIG. 110/6, the diagram of FIG. 110/5 is implemented as follows: Signal CZ1 is the load reference signal and signal LZ1 is the impulse pressure signal. Resistors R5C, R11C, R2C have fixed resistances of 118.8, 90.9, and 602 kilohms respectively. The resistor R11C also has a 10 kilohm variable resistance. When signals CZ1 and LZ1 are 10 volts, the output signal AZ1 should be 10 volts. The current at the summing junction SJ should be zero. Thus, $$I_1 + I_2 = I_3$$

$$\frac{10}{R2C} + \frac{10}{R5C} = \frac{10}{R11C}$$

for the previously stated values of R2C and R5C, the resistor R11C is 99.5 kilohms. The gain K is therefore $$\frac{R11C}{R5C} = \frac{99.5}{118.8} = 0.843$$

Thus, in setting the gain properly, the potentiometer R11C is set by establishing a 100% impulse pressure in the C machine according to the visual display at the instructor's console. After stopping the model, a 100% load reference is established with the "IMP IN" mode in service on the EH control panel. The potentiometer R11C is adjusted so that the signal AZ1 matches the signal CZ1.

TURBINE SUPERVISORY SYSTEM

In a real electric power plant, the physical dimensions of the turbine generator system are monitored during heat up, speed up and operation to prevent rubbing and vibration. The turbine generator system incorporates a number of extremely massive independent systems moving relative to each other under very close tolerances; and any bearing wear, differential thermal expansion, or thermal warping could cause binding, wear, or destructive vibrations. The very long, very heavy turbine shaft is closely monitored for any sag that could develop during cool down. This eccentricity could move the high speed rotating blades relative to the stationary blades to cause rubbing or could induce destructive vibrations in the high speed shaft. Metal temperatures of the turbine shaft and casing are monitored during heat up to prevent differential transverse or longitudinal expansion and subsequent binding. The supervisory instrumentation that monitors these temperatures, clearance and eccentricity values are observed by the operator during start up and are monitored and alarmed during power operation.

Turbine Supervisory Model (TURSUP)

In the present plant simulator, the turbine supervisory model T45 calculates rotor eccentricity, turbine vibration, vibration and eccentricity phase angle, rotor position, turbine casing position differential expansion, rotor temperature, turbine casing temperature, and roll up and roll down resonances. The inputs to the model include rotor speed and steam temperature; and the outputs are connected to the meters, recorders, and alarms on the control panel.

Figure 93S:
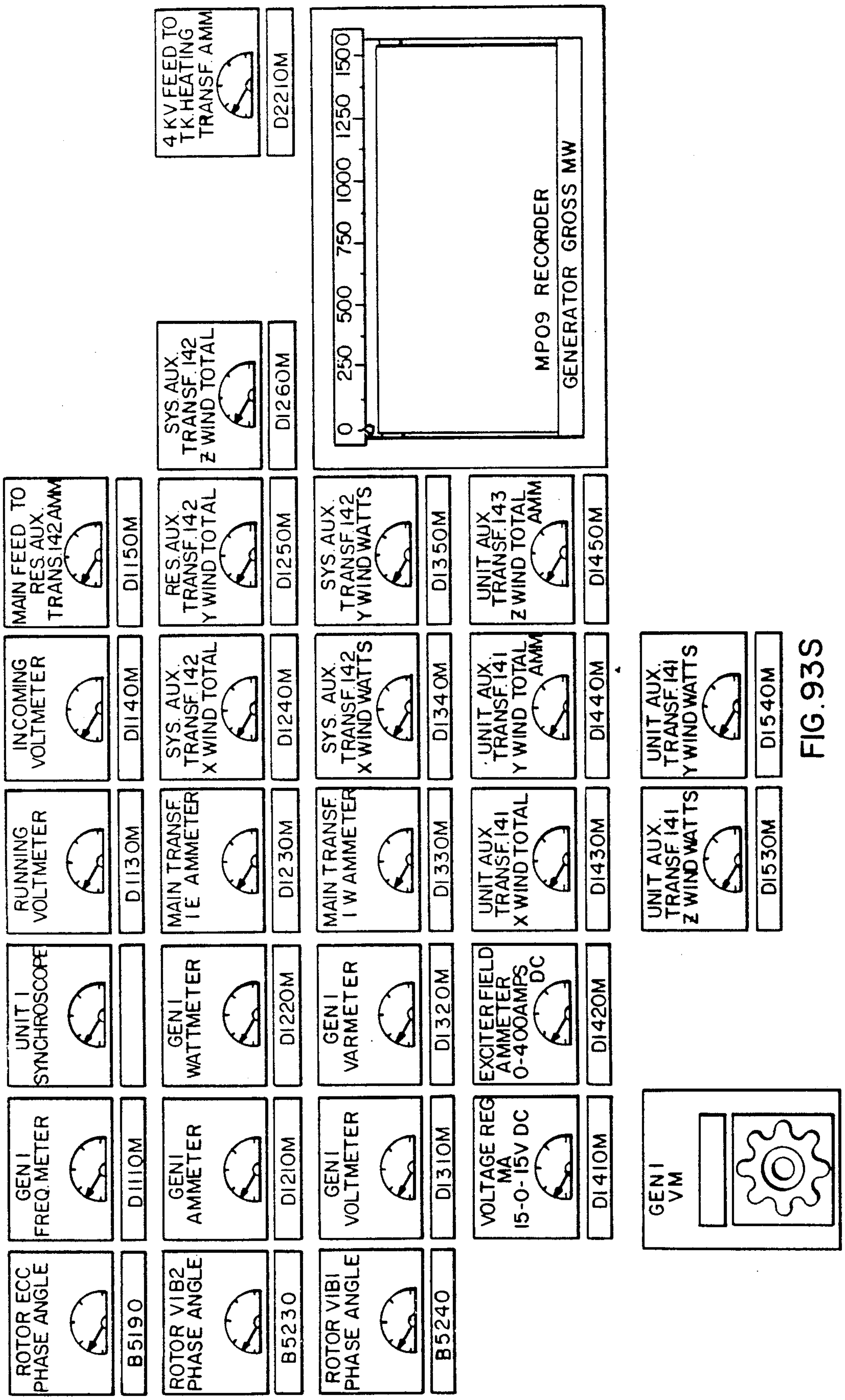
Figure 93T:
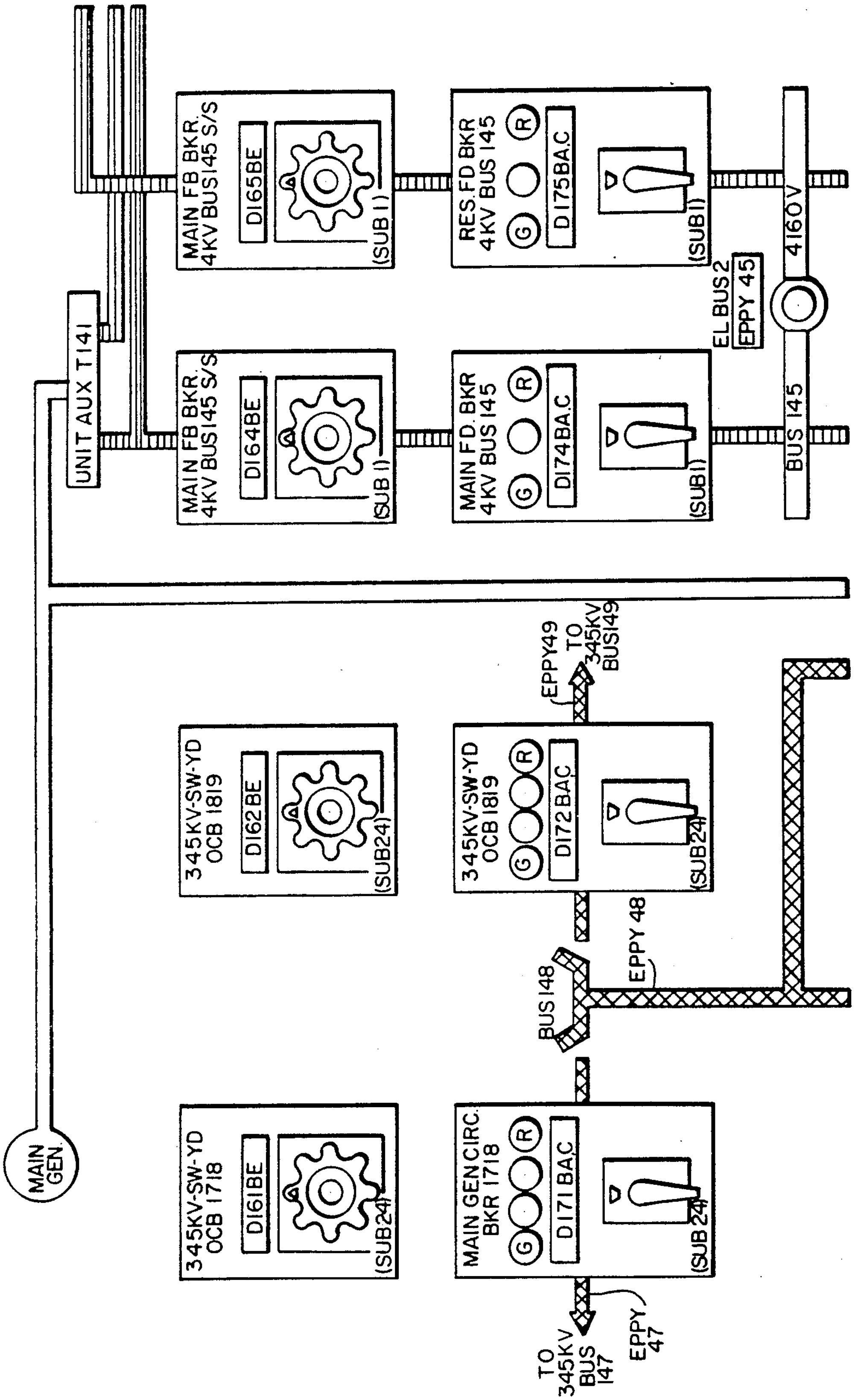
Figure 93U:
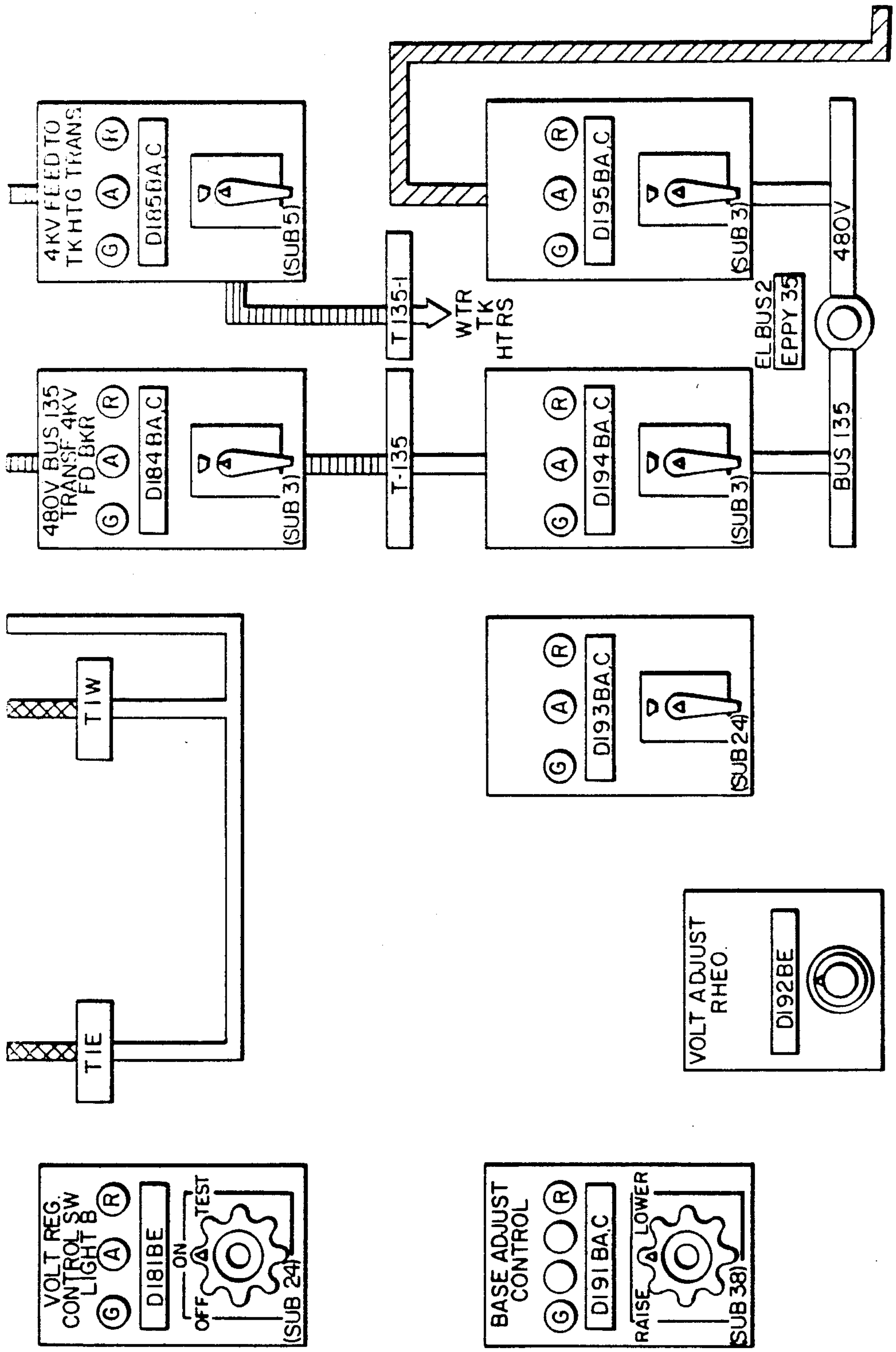
Figure 93:
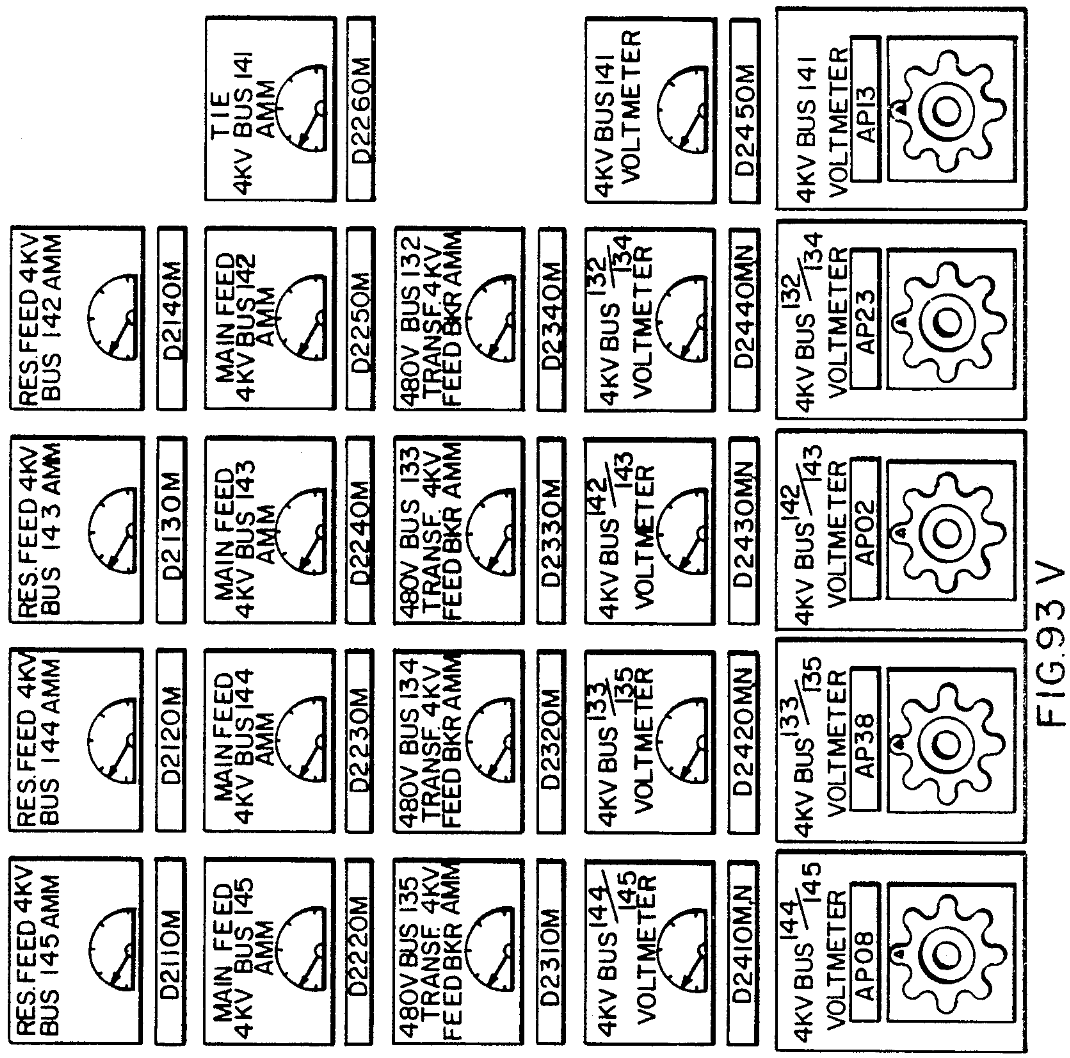
Figure 93W:
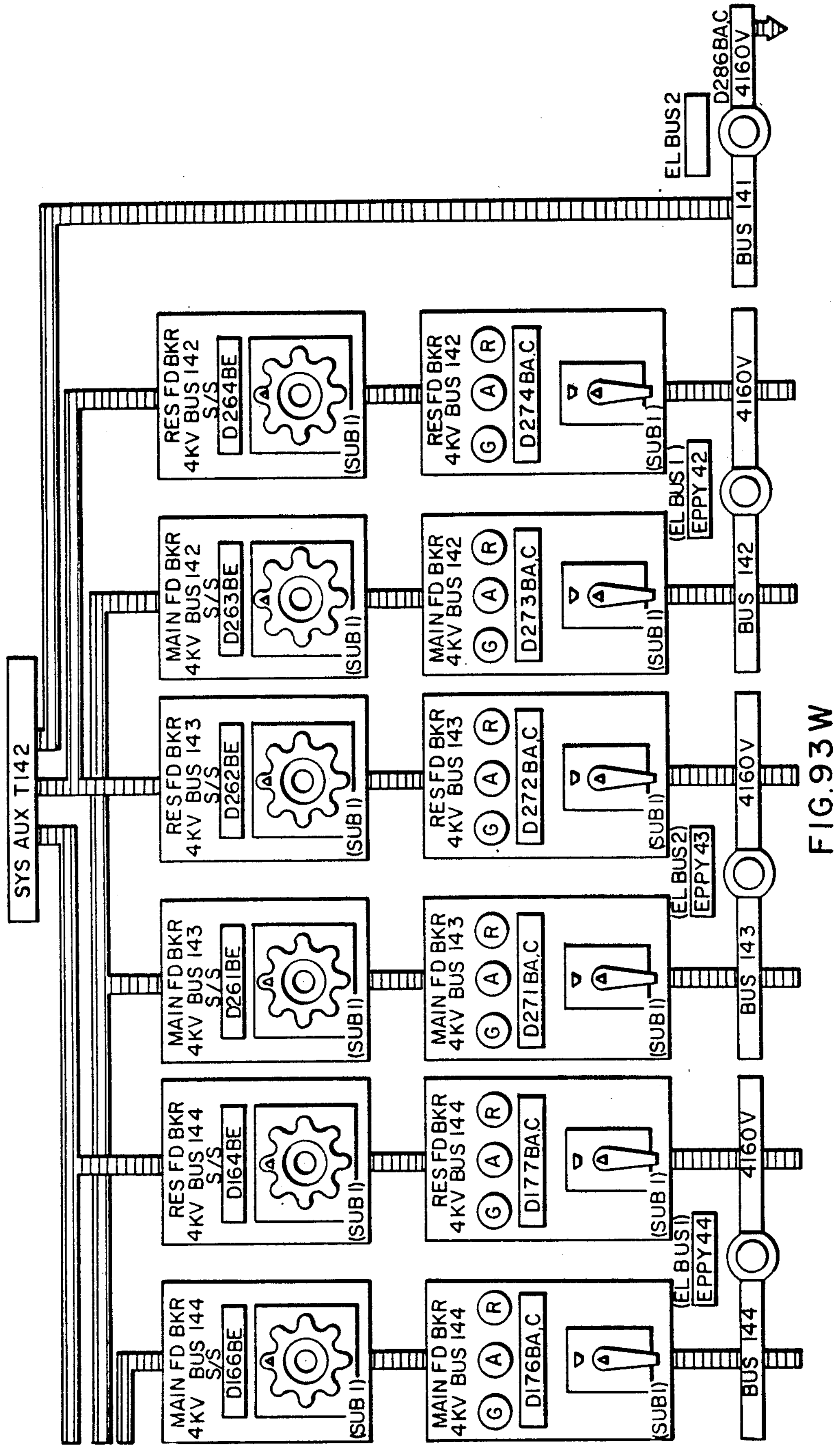
Figure 93X:
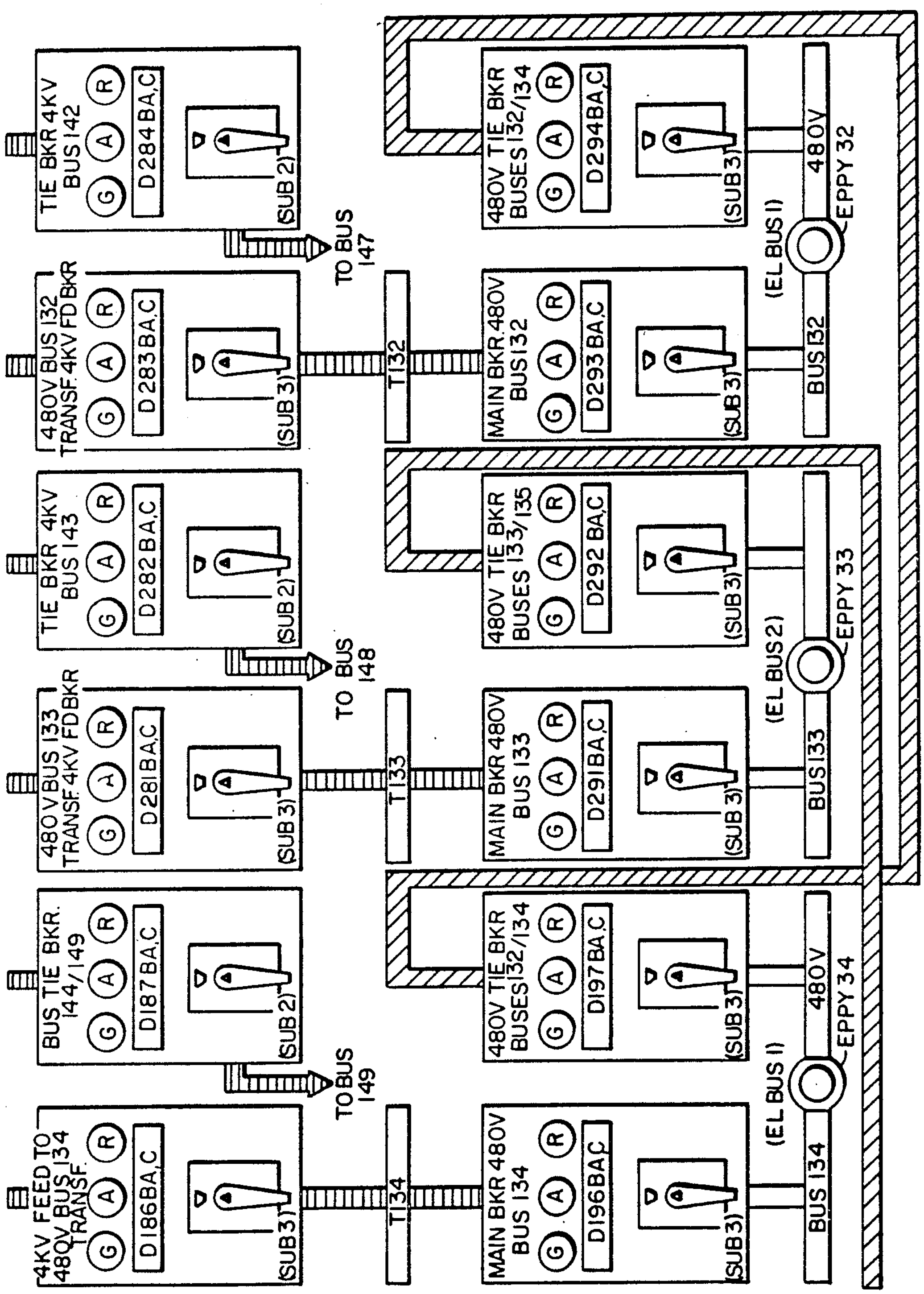
Figure 93Y:
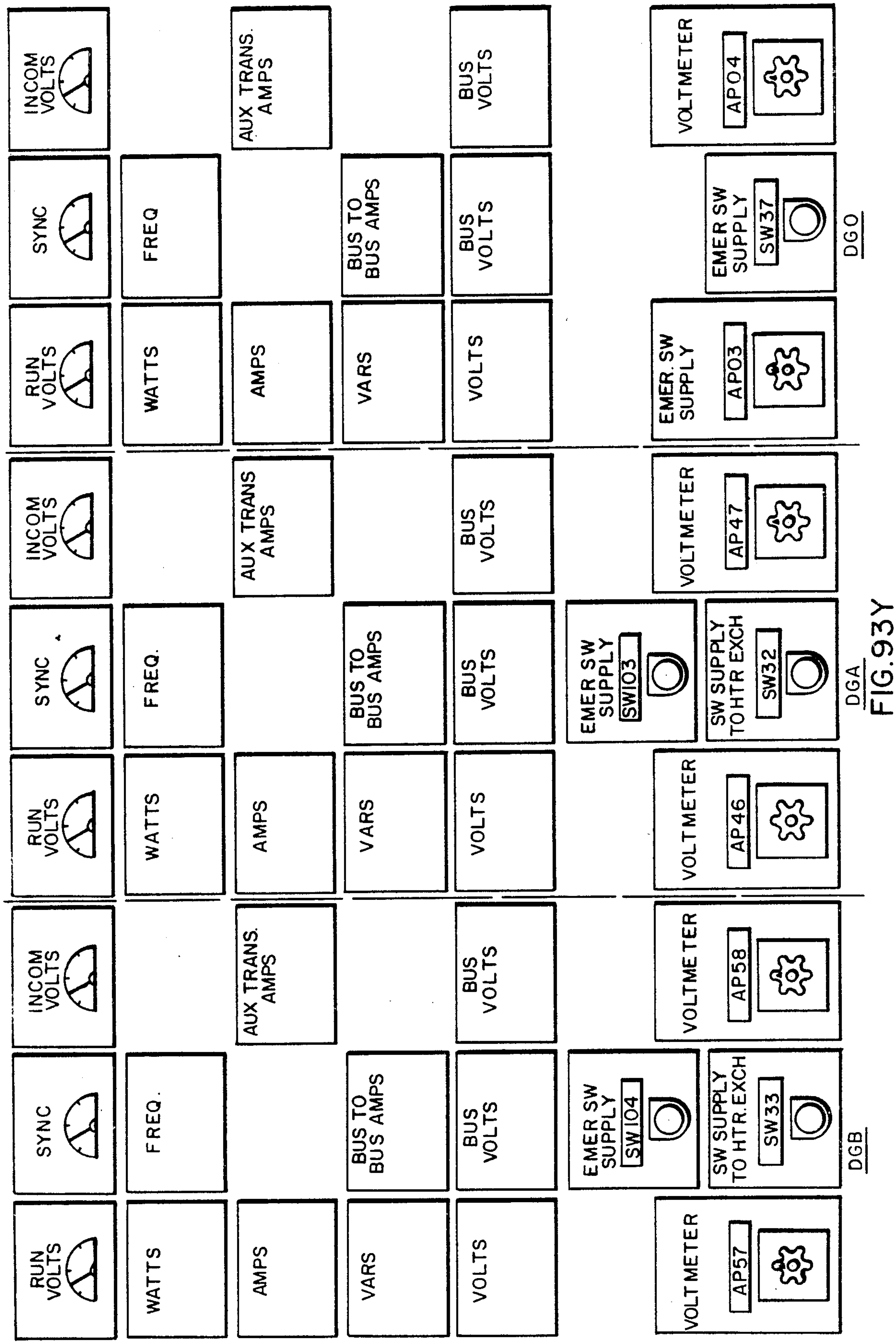
Figure 94A:
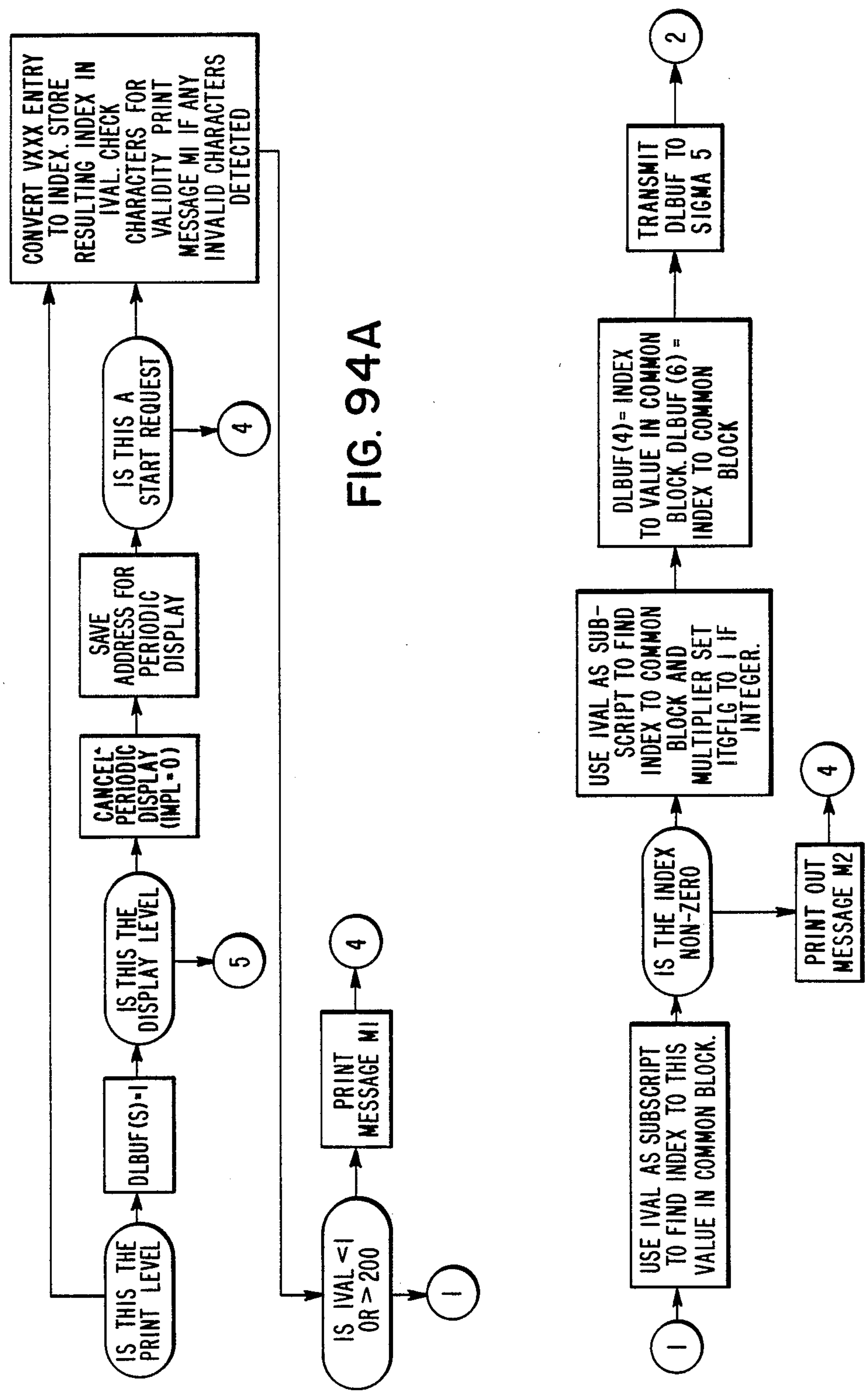
FIGS. 94A through 94E illustrate the flow chart for the display/print value routine.
Figure 94B:
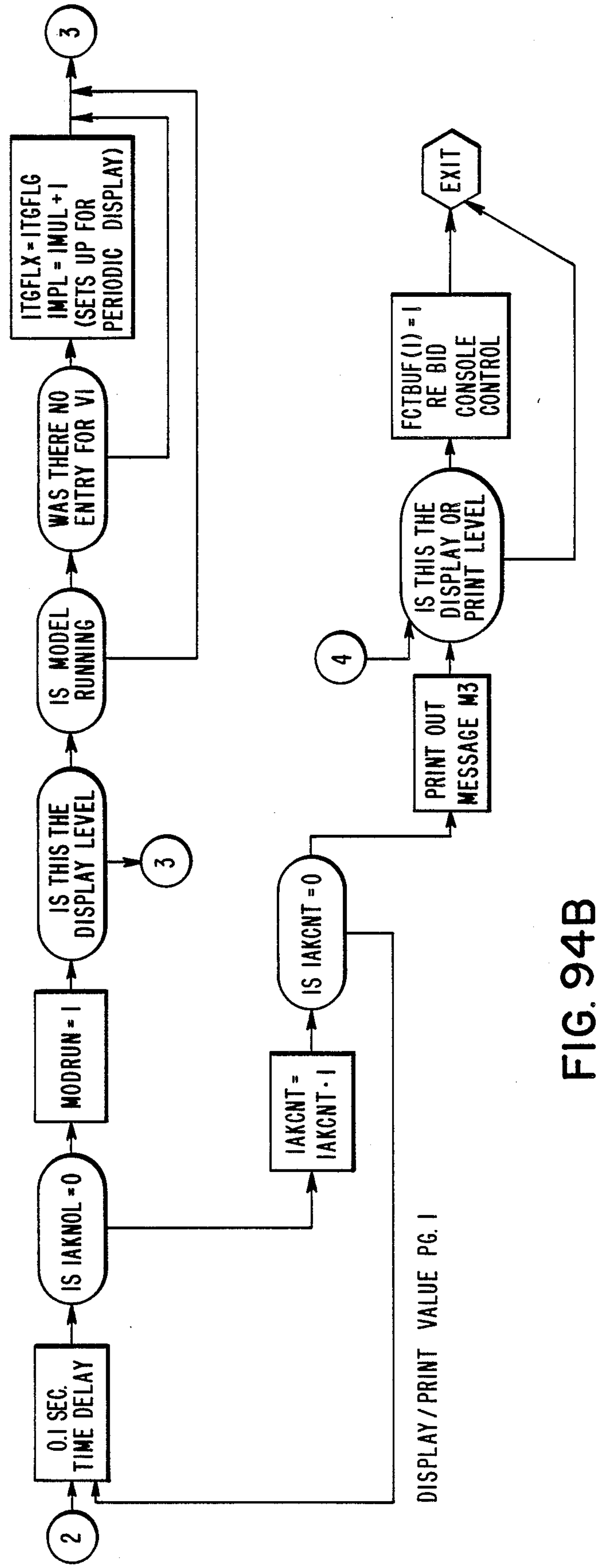
Figure 94C:
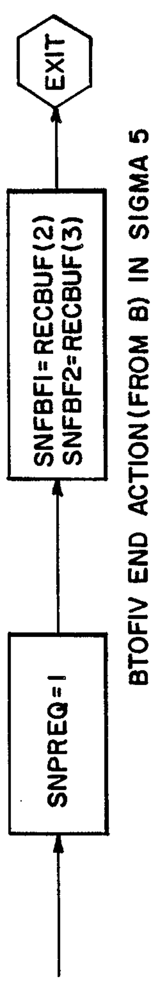
Figure 94D:
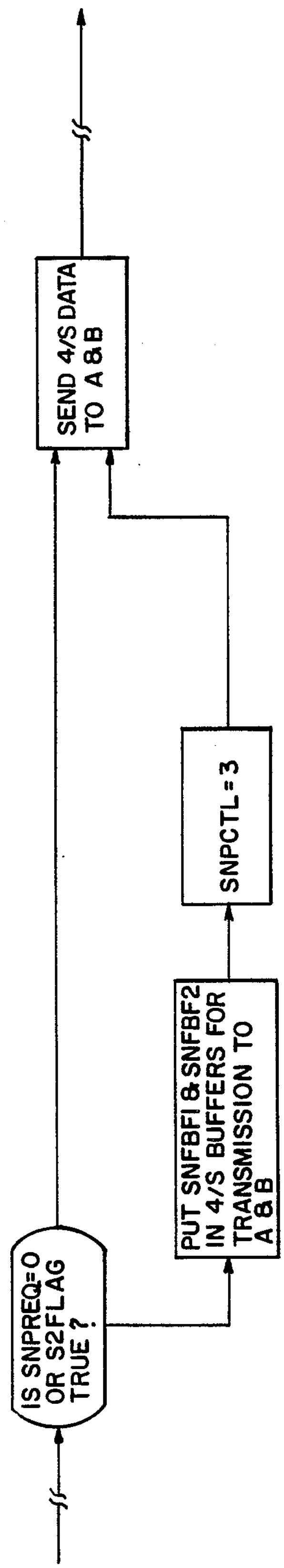
Figure 94E:
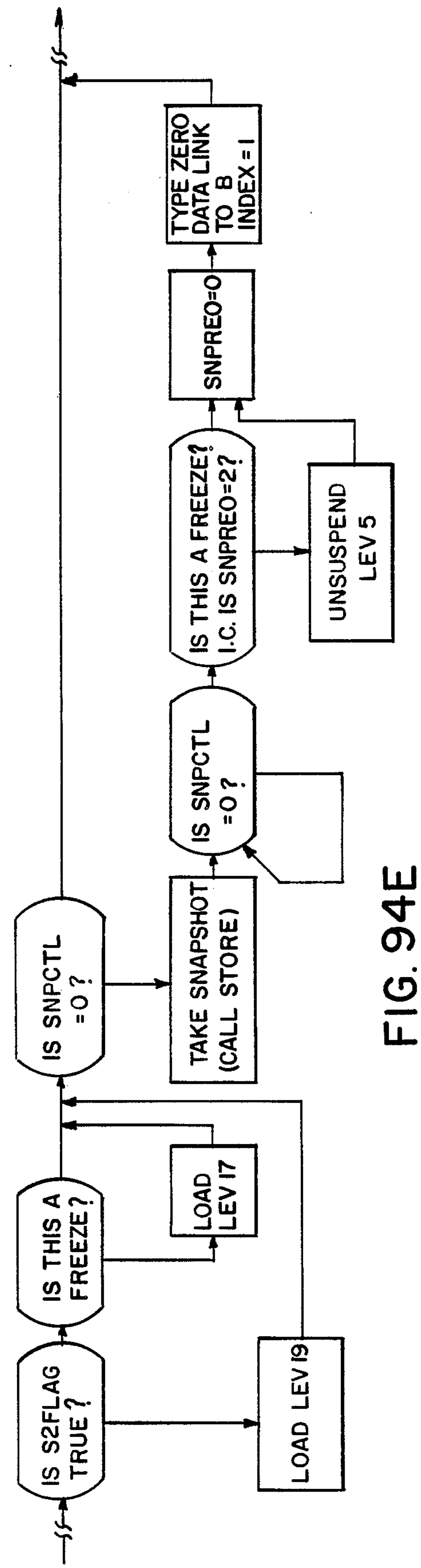
Figure 115:
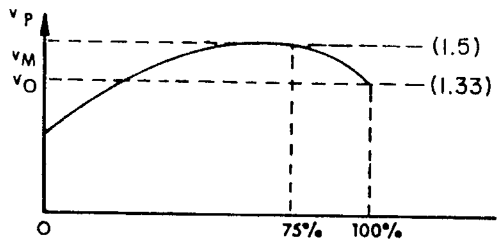
FIG. 115 is a graphical representation of the coefficient of vibration as a function of power.

Referring to that portion of the control panel shown in FIGS. 93O and 93S a printing recorder B5210 records the various temperatures detected by thermocouples placed at various points in the turbine; printing recorder B5220 records turbine vibration, expansion, and eccentricity; and inking recorder B5350 records the axial position of the turbine rotor. Inking recorder B5360 records the speed of the turbine and the additive valve positions in one recorder. The recorder B5220 records the vibrations for a plurality of the turbine bearings in one recorder. Meters B5190, B5230, and B5240 monitor the phase angle of rotor eccentricity, rotor vibration 2 and rotor vibration 1, respectively. Referring to FIG. 115A, which illustrates a fragmentary view of a typical rotor supported at opposite ends by bearings, r equals the radius of the rotor and E is the rotor sag. Neglecting the acceleration and assuming a large visco elastic restraining force when the rotor is not turning, $$\frac{dE}{dt} + \frac{K_s}{R} = \frac{Mg}{r}$$

or $$\frac{dE}{dt} = \frac{K_sE - Mg}{R} = \frac{K_s}{R}\left(\frac{Mg}{K_s} - E\right)$$

where $K_s$ is the spring constant and R is the internal damping, such that $$\frac{R}{K_s}$$

is the time constant of the structural system. Inasmuch as R is a function of temperature as follows:

$$R = R_o - R_1 T$$

where T is the normalized rotor temperature, that is, $\overline{T}$ equals $T_r/T_o$. The time constant for the rotor sag is:

$$\tau_E = \frac{R}{K_s} \quad \frac{R_o - R_1 T_1}{K_s}$$

Thus, the higher the temperature the smaller the time constant for sagging. To include roll out of the eccentricity when the shaft is turning, a force equal to $$\frac{Mg}{K}$$

is subtracted from $(R_o - R_1\overline{T})$ ) or:

$$\frac{dE}{dt} = \frac{K_s}{R}\left[\frac{Mg}{K_s}(1-s) - E\right]$$

where:
- $s=0$ if $W_s=0$, and
- $s=1$ if $W=0$.

If a temperature difference exists between the top of the turbine casing $T_u$ and the bottom of the turbine casing $T_L$, additional stresses are developed which lead to bowing or sagging. This effect is included in the first mentioned equation by adding a bowing term as follows:

$$a = K_T|T_u - T_L|$$

This yields the following equation:

$$\frac{dE}{dt} + \frac{K_s}{R}E = \frac{Mg}{R} + \frac{K_T}{R}T_u - T_L$$

It is assumed that the rotation of the shaft does not roll out the thermal strains; therefore, the eccentricity of the shaft is modeled by the following equation:

$$\frac{dE}{dt} = \frac{K_s}{R}\ \frac{Mg}{K_s}(1-S) + \frac{K_T}{K_s}T_u - T_L - E$$

Above 600 revolutions per minute, the eccentricity recorder is disabled and only vibration information is presented. The value of E at 600 rpm sets the background vibration level for speeds above 600 rpm.

The vibration level of the shaft is modeled as the sum of vibration stemming from power ($V_p(P)$); vibration due to normal resonances in the high pressure, low pressure turbines, and generator shaft ($V_s$); and the background vibration set by the eccentricity model (KjE). This is represented by the following equation where $V_t$ represents the total vibration:

$$V_T = KjE + V_s + V_p(P)$$

Referring to FIG. 115A, a parabolic type variation on the vibration coefficient is shown where the vibration increases with increasing power to approximately 75% power. Then the vibration decreases due to increasing symmetry in the steam flow through the governor valves. Thus, such calculations are as follows:

try:

$$V_p(p) = K_1P + K_2P^2$$

set:

$$V_o = 0,\ v_m = 1.5\times10^{-3} \text{ at } P_m = 75$$

and:

$$\frac{dv_p}{dP} = K_1 + 2K_2P_m = 0$$

$$P_m = -\frac{K_1}{2K_2} = 75,\ K_2 < 0$$

then:

$$1.5\times10^{-3} = 75K_1 + (75)^2K_2,$$

$$K_2 = -\frac{K_1}{2(75)} = 75K_1 - K_1\times\frac{75}{2}$$

or:

$$K_1 = \frac{1.5\times10^{-3}\times2}{75} = \frac{3}{75}\times10^{-3} \approx 4\times10^{-5}$$

then:

$$K_2 = -\frac{4\times10^{-5}}{2\times75} = -\frac{2}{75}\times10^{-5} = -2.67\times10^{-7}$$

and consequently:

$$V(P) = 4\times10^{-5}P - 2.67\times10^{-7}p^2$$

At P=100, we have:

$$V(100) = 4\times10^{-3} - 2.67\times10^{-3} = 1.33\times10^{-3}$$

at P=75, we have:

$$V_p = 1.498\times10^{-3}$$

As a result of the above, vM and $v_o$ equal 1.5 and 1.33 respectively.

With respect to the vibration due to resonances $V_s$, such vibrations are calculated in accordance with the following formula:

$$V_s\frac{1}{(W_L - W_s)^2 + A_1} + \frac{1}{(W_2 - W_s)^2 + A_2} + \frac{1}{(W_3 - W_s)^2 + A_3}$$

where $W_s$ represents the revolutions per minute of the rotor, and where $W_1$, $W_2$, and $W_3$ are the critical speeds for the high pressure turbine, low pressure turbine and generator shafts respectively. $1/A_n$ are the resonance peaks for each unit.

In an actual embodiment of the invention, the following rpm resonances together with the amplitude are utilized:

| RPM Resonances | Amplitude |
|---|---|
| $W_1$ = 1300 rpm | $A_1$ = .3 |
| $W_2$ = 1440 rpm | $A_2$ = .5 |
| $W_3$ = 1600 rpm | $A_3$ = .375 |

To estimate the parameters for steady state eccentricity, the following equations are utilized:

$$V = K_v E$$

$$E = 10^{-2} = \frac{M_R g}{K_s},\ M_R = 10^6 \text{ lb}$$

therefore:

-continued $$K_s = \frac{10^6 \times 32}{10^{-2}} = 3.2 \times 10^9 \approx 10^{10}$$

then, since $R/K_S \approx 15$ min:

$$R_o = 3.2 \times 10^9 \times 15 = 4.8 \times 10^{10}$$

therefore:

$$R_o\ 5 \times 10^{10},\ R_1 \approx 8 \times 10^7$$

also:

$$K_T = \frac{E_t K_s}{\Delta T} = \frac{5 \times 10^{-3} \times 3.2 \times 10^9}{10^2}$$

or:

$$K_T = 1.5 \times 10^5 \text{ and } \frac{K_T}{K_S} = 5 \times 10^{-5}$$

and finally:

$$K_V = \frac{V_i}{E} = \frac{10^{-3}}{10^{-2}} = 10^{-1}$$

Figure 116:
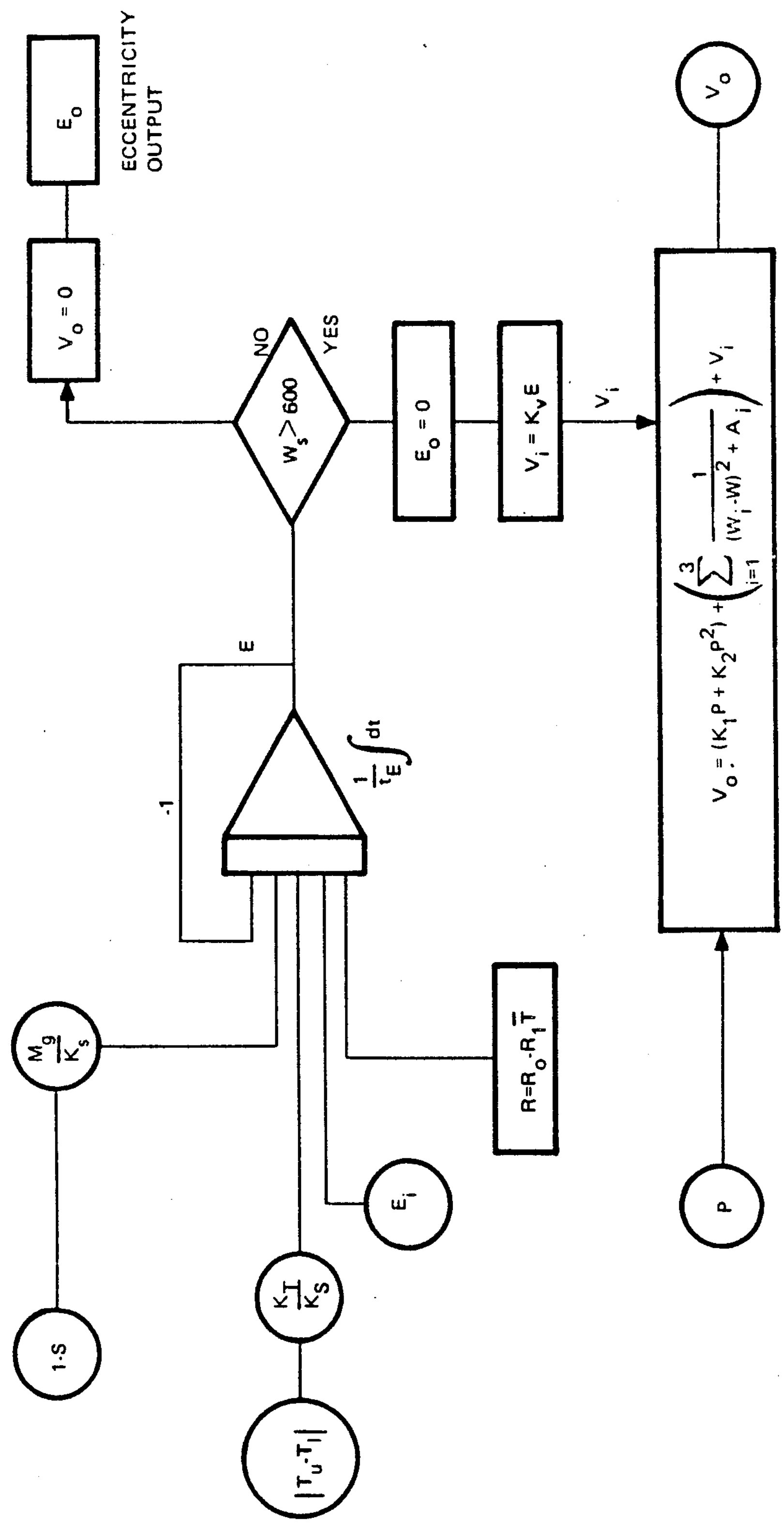
FIG. 116 illustrates a flow chart illustrating the interactions in implementing procedure for obtaining eccentricity and vibration output simulation.
Figure 117:
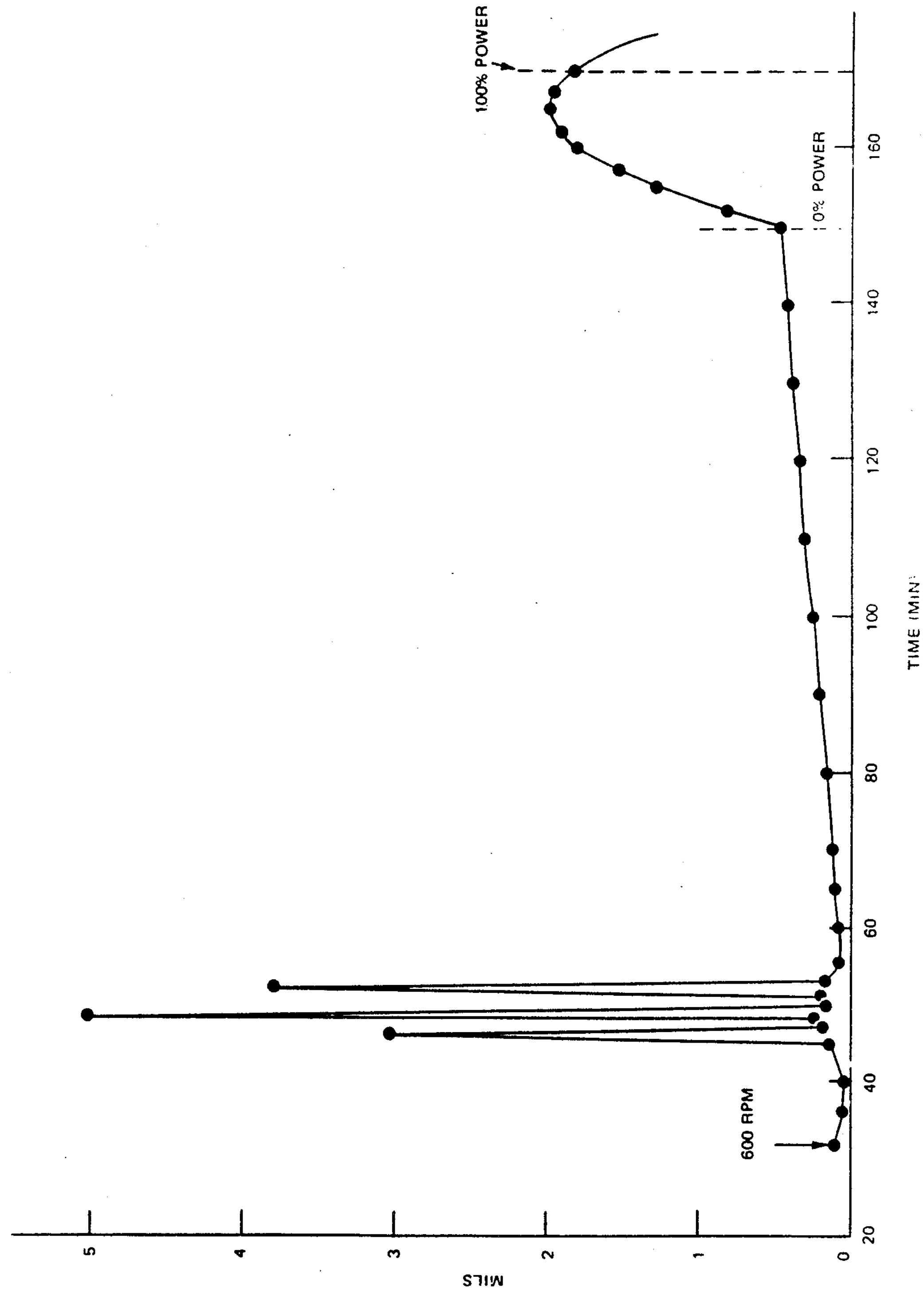
Figure 114:
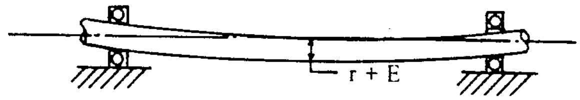
FIG. 114 is a fragmentary view of a typical rotor supported at opposite ends by bearings, the physical characteristics of which are simulated.

Reference is made to FIG. 116 which illustrates the functional flow chart and interactions in implementing the program for obtaining the eccentricity of the rotor and the vibration output. The vibration output $V_o$ is of the form shown in FIG. 117.

The phase angle for the eccentricity meter and vibration monitors is modeled by using the value for eccentricity E and the vibration output $V_o$ as follows:

$\phi_E = 10^{-4}E - 50$ in degrees and for the vibration monitor $\phi_V$ use $$\phi_{V1} = (V_o + 0.01) \times 10^4 \text{ in degrees}$$

$$\phi_{V2} = (V_o \times 0.8 \times 10^4 - 25 \text{ in degrees.}$$

The axial position of the turbine rotor is assumed to vary linearly with speed at no load conditions. As the load is increased at synchronous speed however, it is assumed that the rotor position decreases linearly with increasing power. Both of these variations of rotor position are due to windage effects on the generator and turbine which gives rise to a thrust on the rotor shaft. At full power, thrust on the rotor shaft is a minimum. Therefore, the rotor position is modeled as follows:

$$r = K_1 W_s (K_2 - P)$$

The maximum clearance is on the order of 20 mils (0102 in.). This occurs at sync speed, no load. Then:

$$K_1 K_2 = \frac{20}{1800} = \frac{1}{9} \times 10^{-1} \approx 10^{-2}$$

At full load, P=100 percent, r=10 mils. Therefore:

$$10 = \frac{10^{-2}}{K_2} \times 1800\,(K_2 - 100)$$

or:

$$K_2(10 - 18) = -1800$$

or:

$$K_2 = \frac{1800}{8} = 225$$

then:

$$K_1 = \frac{10^{-2}}{225} = 5 \times 10^{-5}$$

and use:

$$K_2 \approx 200$$

Figure 118:
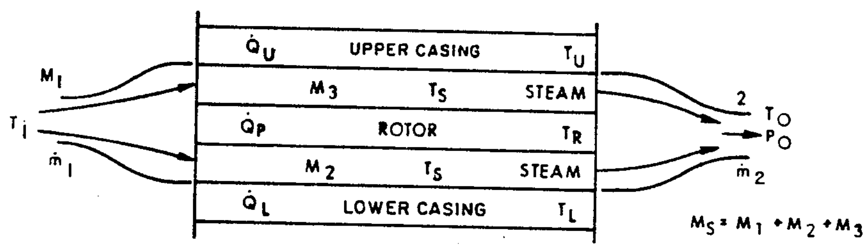

In the modeling of turbine casing position and differential expansion, reference is made to FIG. 118, illustrating a physical representation of the turbine heat up. As the unit is taken from its cold condition to its hot condition and loaded state, the thermal changes in the casing causes it to expand. Because one end of the unit near the center line of the low pressure turbine is secured to the foundation, the casings expand axially away from this anchored point. The opposite end of the turbine unit, which is the governor pedestal, is designed to move freely along lubricated longitudinal keys. If the free end is hampered from sliding smoothly along the guide keys as the casings expand, serious damage may result. The casing expansion recorder measures the movement of the governor pedestal relative to a fixed point (the foundation). It indicates expansion and contraction of the casings during starting and stopping periods and for changes in load, steam temperatures, etc. The turbine heat up model is derived from the following equation:

$$\frac{dE_s}{dt} = -Q_u - Q_r - Q_L + h_i m_1 - h_2 m_2 - W_s \quad (1)$$

or in terms of temperature:

$$M_s C_s \frac{dT_s}{dt} = G_c(T_s - T_u) - G_R(T_s - T_R) - G_c(T_s - T_L) + m(h_i - h_2) - W_s \quad (2)$$

Assuming that the steam exits to $T_o$, (2) can be written as (work done is in $C_p(T_s - T_u)$).

$$M_s C_v \frac{dT_s}{dt} = -G_c(T_s - T_u) - G_R(T_s - T_R) - G_c(T_s - T_L) + mC_p(T_i - T_s) \quad (3)$$

where:

$$mC_p(T_s - T_o) - W_s = 0$$

where $Q_u$, $Q_r$, $Q_L$ represent the heat flow rates of the upper casing, rotor, and lower casing respectively; $M_1$, $M_2$ and $M_3$ represent the mass of the steam; $T_s$ represents the temperature of the steam; $T_u$, $T_r$, and $T_L$ represent the temperature of the upper casing, rotor, and lower casing respectively; $T_i$ and $T_o$ represent the temperature of the input and output respectively; and $P_o$ represents the output power.

Figure 119:
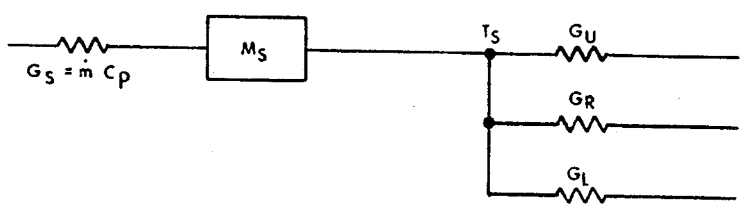

The above calculations are equivalent to the representation shown in FIG. 119. An additional conduction direct from the steam header to the rotor is added to account for heat loss directly from the header to the rotor.

Referring to FIG. 120, in the thermal model for the rotor and turbine casing, one in the following equations, the turbine casing and rotor are assumed to be lumped masses, $M_c$ and $M_R$, connected to the inlet temperature point $T_i$, through thermal conductances $G_c$ and $G_R$, and the ambient through $T_o$. The thermal path between the rotor, upper, and lower halves of the casing is provided by GB. The differential equations for this system are as follows:

$$\frac{M_c}{2} C_v \frac{dT_u}{dt} = G_c(T_i - T_u) - G_B(T_u - T_R) \quad (1)$$

$$M_R C_v \frac{dT_R}{dT} = G_R(T_i - T_R) + G_B + T_u - T_R) - G_B(T_R - T_L) + G_{Ri}(T_i - T_r) \quad (2)$$

$$\frac{M_c}{2} C_v \frac{dT_L}{dt} = G_c(T_1 - T_L) + G_B(T_R - T_L) - G_o(T_L - T_o) \quad (3)$$

and difference equation for steam flow:

$$\frac{dT_s}{dt} = \left\{ - [G_c(T_s - T_u) + G_R(T_s - T_R) + G_c(T_s - T_L)] + 10^4\left(\frac{1+P}{4}\right)(T_i - T_s) \right\} \times \frac{1}{M_s C_v}$$

Pick $G_c = 2.5 \times 10^4$, $G_o - 10^3$, and $(C_v M_s) = 10^6$ (where P is present power).

The linear expansion of the casing is assumed to be proportional to the mean casing temperature or:

$$\delta 1_c = K_c \frac{(T_u + T_L - T_o)}{2}$$

The linear expansion of the rotor is proportional to the rotor temperature or:

$$\delta 1_R = K_R(T_R - T_o)$$

The differential expansion is then:

$$\Delta = \delta 1_r - 1_c$$

The approximate value of impulse chamber metal temperature $T_{icm}$ is 450° F., and is modeled by $T_u$, the upper half casing temperature. Therefore, $T_{icm}$ equals $T_u$. The approximate value of impulse chamber steam temperature $T_{ics}$ is 500° F., and is modeled by $T_s$, the steam temperature. Thus, $T_{ics}$ equals $T_S$. The approximate range of the high pressure cylinder, bolt, flange, and mid-span temperatures is 350° to 400° F. They are modeled by taking weighed averages of the lower casing temperature and the ambient. The rotor temperature $T_R$ and the upper and lower casing temperature are output to the eccentricity and vibration monitor.

The representative values of the constants and conductances in the present embodiment of the invention are as follows:

$$Mu, L = \frac{M_c}{2} = 10^6$$

| | |
|---|---|
| $G_c = 5 \times 10^4$ btu/min °F. | $T_o = 100°$ F. |
| $G_R = 10^5$ Btu/min °F. | $M_r = 10^6$ lb |
| $G_o = 10^3$ Btu/min °F. | $\frac{M_c}{2} = 10^6$ lb |
| $G_B = 10^6$ Btu/min °F. | $K_c = 2.5 \times 10^{-3}$ in/°F. |
| $T_i = 500°$ F. | $K_R = 3.7 \times 10^{-3}$ in./°F. |
| $G_U, L = 2.5 \times 10^4$ | $M_s = 5 \times 10^5$ |

In arriving at these constants, the following calculations were considered. The time constant for the rotor in the upper casing is approximately:

$$\frac{1}{\tau_R} = \frac{G_R}{M_R C_v}, \frac{1}{\tau_{c1}} = \frac{G_E}{M_{c1} C_v}$$

Taking $C_v = 1$ and $\tau_R = 10$ min, $\tau_{cl} = 15$ min, also $M_R = 10^6$ these values yield:

$$G_R = \frac{10^6}{10} \frac{\text{Btu}}{\text{min °F.}} = 10^5 \frac{\text{Btu}}{\text{min °F.}}$$

$$G_c = \frac{1}{2} \frac{10^6}{125} = \frac{6.7}{2} \times 10^4 \frac{\text{Btu}}{\text{min °F.}}$$

Take $G_B = 10^6$, $G_o = 10^3$ $$K_c = \frac{\delta 1_c}{\Delta T} = \frac{1 \text{ in.}}{400° \text{ F.}} = 2.5 \times 10^{-3} \text{ in/°F.}$$

$$K_R = \frac{1.5 \text{ in}}{400° \text{ F.}} = 3.7 \times 10^{-3} \text{ in/°F.}$$

During a typical turbine startup, the casing expansion and differential expansion follow approximately the curves shown in FIG. 121.

MAIN GENERATOR AND EXCITATION

The main electrical generator being simulated according to the present embodiment of the invention is a hydrogen inner cooled synchronous generator with a water cooled stator. It has a power factor of 0.9 and has a three-phase 60 cycle output voltage of 22 to 25 kV. The rotating field of the generator is energized by an air cooled brushless exciter driven on the turbine generator shaft. Referring to FIG. 122, a permanent magnet pilot exciter G100 is a high frequency permanent magnet generator which provides power to a voltage regulator G11 which in turn controls a stationary field G12 of alternating current exciter G13. The output from the rotor of the AC exciter is fed along shaft G15 to silicon diodes G16 mounted on the shaft. The rectified diode output in turn controls field winding G17 of the main generator G18.

The portion of the control panel illustrated in FIGS. 93S through 93X inclusive illustrates the controls and the indication for the main generator.

In simulating the exciter generator, referred to in FIG. 122, the generator megawatt output MW is assumed to be equal to the total turbine power when the generator breaker is closed. Further, the exciter is assumed to affect the generator terminal voltage directly, rather then controlling the voltage behind transient reactance. Also, in solving the dynamic electrical equations of the generator field, flux linkages are assumed proportional to the terminal voltage, rather than the voltage behind the transient reactance. Finally, when the voltage regulator is in service, the terminal voltage is set equal to the voltage adjustment setting. This assumption is based on the premise that the voltage regulator exerts rapid and precise control over the terminal voltage.

The exciter generator model T53 (program EXGENM) simulates the electrical characteristics of the electrical generator, as well as the control functions of the exciter. The model comprises a voltage source behind a synchronous reactance with negligible armature resistance. The equations for the exciter generator model are derived on a per unit basis. The equations that are utilized are programmed in their normal electrical units.

The inputs to the subroutine EXGENM include total turbine power GNUM which is calculated in the subroutine RHMSEP; the base adjuster position GIECV01 (see FIG. 93U) which is received from the valve handler VCHAND; the generator breaker status (see FIG. 93T), which is received from the B machine; the regulator mode logicals that indicate "not off" and "on" (D1813Y and D1813Y) which are received from the B machine; and the voltage adjustment potentiometer GE06 setting D192IP which has a range of from 0 to 8192 which is also received from the B machine.

The outputs of the program EXGENM include the electrical megawatts (GNUE) that are generated and the electrical megavars (GNUR) that are generated. Also, the outputs include the generator terminal voltage GNVT, and the voltage regulator GE04 output GNVR.

The exciter generator model according to the present invention is capable of simulating the operation of the generator with the generator breaker TT01 either opened or closed; the operation of the generator with the voltage regulator GE04 in either the off, test, or on modes; the manipulation of the base adjustment GE05 control and voltage adjuster GE06 control; and the generator output changes due to turbine load variations.

The generator terminal current (in per-unit) I at rated power is determined from the rated power factor of 0.9 according to the following equation:

$$I = 0.9 \times 1.0 - j\sqrt{1.0 - (0.9)^2} = 0.90 - j\,.436$$

Using the rated terminal current I, the equivalent system infinite bus voltage $V_S$ (in per-unit) is found as follows:

$$V_S = V_T - jX_eI$$

$$V_S = 1.0 - j(0.15)(0.90 - j\,0.436)$$

$$V_S = 0.9346 - j.135$$

$$V_S = 0.948 < -8.22°$$

Using the synchronous reactance $X_d$ and the rated current I, the rated internal generator voltage $V_{hd\,I}$ is calculated as follows:

$$V_I = |V_T| + j\,X_dI$$

$$V_I = 1.0 + j\,X_d[0.90 - j\,0.436]$$

$$V_I = 2.58 < +43.9°$$

The generator megawatt output is assumed to be equal to the total power that is developed by the turbine so that GNUE equals GNUM. The generator reactive power output Q (in per-unit) is determined from the generator terminal current I and the equivalent system infinite bus voltage $V_S$ as follows:

$$I = \frac{P - jQ}{|V_T|}$$

$$V_S = V_T - jX_eI$$

Combining the two equations and solving for Q:

$$Q = \frac{|V_T|^2}{X_e} - \frac{|V_T|\,|V_S|}{X_e}\sqrt{\frac{1. - P^2X_e^2}{|V_t|^2\,|V_S|^2}}$$

Using an approximation for the square root operation:

$$\sqrt{1 - X} = 1 - \tfrac{1}{2}X$$

$$Q = \frac{V_T^2}{X_e} - \frac{|V_T|\,|V_S|}{X_e} + \tfrac{1}{2}\frac{P^2X_e}{|V_T|\,|V_S|}$$

Since the following conversions are true:

$$GNUE = P(MVA_R)$$

$$GNUR = Q(MVA_R)$$

$$GNVT = V_T(KV_R)$$

The equation that is used in the model EXGENM is as follows:

$$GNUR = \frac{GNVT^2}{\frac{KV_R^2X_e}{MVA_R}} - \frac{GNVTV_SMVA_R}{X_eKV_R} = \tfrac{1}{2}\frac{GNUE^2X_eKV_R}{GNVTV_SMVA_R}$$

where:

$$\frac{KV_R^2X_e}{MVA_R} = \frac{(25)^2\,.15}{1220} = 0.0771$$

$$\frac{V_SMVA_R}{X_eKV_R} = \frac{(0.948)1220}{0.150(25)} = 306.0$$

$$\frac{X_eKV_R}{V_SMVA_R} - \frac{(0.15)25}{(0.948)1220} = 1.64 \times 10^{-3}$$

WHERE GNVT is the generator terminal voltage, $MVA_R$ is the generator rated megavars, $KV_R$ is the generator terminal voltage at rated condition, $X_e$ is the external reactance to infinite bus, in per-unit.

Utilizing the previously stated equation for terminal current I, $$|I| = \sqrt{\frac{P^2 + Q^2}{|V^T|}}$$

for the simulation program the following expression is used where GNITRM is the generator terminal current. The voltage behind the synchronous reactance $V_I$ is solved by combining the two equations as follows:

$$V_I = |V_T| + jX_d I$$

and $$I = \frac{P - jQ}{|V_T|}$$

Then, in combining the two equations and separating the real and imaginary components, the voltage behind the synchronous reactance $V_I$ is as follows:

$$V_I = \left(|V_T| + \frac{QX_d}{|V_T|}\right) + j\frac{PX_d}{|V_T|}$$

$$|V_I| = \sqrt{|V_T|^2 + 2QX_d + \frac{X_D^2(P^2 + Q^2)}{|V_T|^2}}$$

$$|V_I| = \sqrt{|V_T|^2 + 2QX_d + |I|^2 X_d^2}$$

For the simulation program EXGENM, the following equation is used where the voltage behind the transient reactance is termed VINT:

$$VINT = \sqrt{\frac{GNVT^2}{KV_R^2} + GNUR\frac{2X_d}{MVA_R} + GNITRM^2\frac{KV_R^2 D_d^{23}}{MVA_R^2}}$$

or:

$$VINT = \frac{1}{KV_R}\sqrt{GNVT^2 + GNUR\frac{2KV_R^2 X_d}{MVA_R} + GNITRM^2\frac{3KV_R^4 X_d^2}{MVA_R^2}}$$

where:

$$\frac{2KV_R X_d}{MVA_R} = \frac{2(25)^2 1.998}{1220.0} = 2.05$$

and $$\frac{3KV_R^4 X_d^2}{MVA_R^2} = \frac{3(25)^4(1.998)^2}{(1220)^2} = 3.16$$

The generator and exciter has saturation characteristics that cause a non-linear relation between the terminal voltage $KV_R$ the generator field current $I_F$. The saturation characteristic takes the form as follows:

$$I_F = V_I + K_S V_I^2$$

The fact that the deviation of the saturation line from a linear relationship is of higher order than the assumed square law, is partially compensated by the use of the voltage behind synchronous reactance $V_I$. This voltage overstates the flux that causes saturation rather than the more conventional use of voltage behind Potier reactance The constant $K_S$ is found by considering this relation and rated condition where $I_F$ and $V_I$ known. On a per unit basis, the actual field current at rated conditions $I_{FR}$ the field current at rated conditions divided by the field current for rated terminal voltage on the air gap line as follows:

$$I_{FR} = \frac{8945}{2779} - 3.23$$

Solving for $K_S$: Thus, to find the generator field current saturation constant $K_S$, the following is used:

$$K_S = \frac{I_{FR} - V_I}{V_I^2} = \frac{3.23 - 2.58}{2.58^2} = 0.098$$

For the purposes of display, the exciter field current $I_{FX}$ is assumed proportional to the generator field current $I_X$. In actual operation, the generator field current lags behind the exciter field current during operation. However, this simplification eliminates the need for an additional equation; and thus a constant can be determined to relate exciter field current to generator field current. The exciter field current that corresponds to rated conditions is 245A. Hence, the exciter field current for rated voltage on the air gap line $I_{FXR}$ is as follows:

$$I_{FXR} = \frac{2779}{8945} 245 = 76.5\ A$$

so that $$GNIF = VINT(1.0 + 0.098\,VINT)76.5$$

The generator has a time lag that exists between the excitation voltage and the internal generator voltage that results from it. The transient field current relation is:

$$T_{do}\frac{dV'_1}{dt} = V_x - I_F$$

For simplicity, $V_t$ is substituted for $V'_I$ to avoid the computation of another equation When the generator breaker is open, $V'_I$ equals $V_t$. When the breaker is closed, a small error results. $V_x$ is the exciter voltage, in per-unit, that produces a generator field current. This voltage is replaced by the per unit exciter field current $I_{FX}$. Thus the transient field current relation is rewritten as:

$$T_{do}\frac{d|V_t|}{dt} = I_{FX} - I_F$$

When the voltage regulator GE04 is in either the "off" or "test" mode, the exciter field current $I_{FX}$ is determined by the base adjuster GE05 setting. Since GNCV01 represents the base adjuster setting, with the range of 0 to 1, it must be multiplied by a constant to obtain the per unit exciter field current to the generator as follows:

$$I_{FX} = GNCV01\left(\frac{I_{FXM}}{I_{FXR}}\right)$$

The generator field current $I_F$ is also in per-unit, and since the variable GNIF is proportional to generator field current:

$$I_F = \frac{GNIF}{I_{FXR}}$$

The transient field current differential equation for $V_T$ becomes a difference equation for GNVT in the simulation program:

$$GNVT_K = GNVT_{K-1} + KV_R\left[GNCV01\left(\frac{I_{FXM}}{I_{FXR}}\right) - \frac{GNIF}{I_{FXR}}\right]\frac{\Delta T}{T'_{do}}$$

or $$GNVT_K = GNVT_{K-1} + \left(GNCV01 \frac{GNIF}{I_{FXM}}\right)\frac{KV_R\, I_{FXM}\Delta T}{I_{FXR}\, T'_{do}}$$

where:

$$\frac{KV_R\, K_{FXM}\Delta T}{I_{FXR}\, T'_{do}} = \frac{25(400)0.25}{76.5(6.12)} = 5.339$$

The regulator output meter (see FIG. 93S) displays the difference between the voltage adjuster setting and the generator terminal voltage $V_T$. The regulator multiplies the error by a gain of 1/0.005 to maintain an error of less than 0.5%. The regulator output or null meter is located after this gain as illustrated in FIG. 123 to which reference is made. This per unit signal is converted to a voltage by multiplying it by the maximum regulator output $V_{RM}$ as follows:

$$V_R = \frac{(V_{REP} - V_T)}{SPN}$$

$$VRTMP = 22.50 + 5.0\left(\frac{D192IP}{8192}\right) = 25\ (V_{REF})$$

so that $$GNVR = \left[\frac{VRTMP - GNVT}{KV_R(SPN)}\right]V_{RM} = (VRTMP - GNVT)\text{GAIN}$$

$$\text{GAIN} = \frac{V_{RM}}{KV_R(SPN)} = \frac{10}{25(.05)} = 8.0$$

The terminal voltage error required for maximum regulator output termed $V_{RM}$ has a value of 0.05 to allow reasonable control of the generator during balancing operation.

When the voltage regulator is in service, it is assumed that the generator field current is controlled such that the generator terminal voltage follows the voltage adjuster setting exactly. The gain of the regulator is quite high, and the closed loop system reduces the significance of the generator's time delay. Therefore, GNVT is equal to VRTMP. The regulator output meter is driven more effectively by looking at the regulator output current and the base adjuster current, rather than the voltage error. The voltage error is quite small (less than 0.5%) but it is multiplied by a large gain. The following method is used in determining the field current that is contributed by the regulator, and inferring the voltage error and gain: the regulator output meter in per unit is follows:

$$V_R = I_F - GNCV01\frac{I_{FXM}}{I_{FXR}}$$

The output voltage in volts can be determined by multiplying the per-unit value by the maximum voltage of 10 V ($V_{RM}$). This maximum voltage will occur when $I_F = 0$ and $GNCV01 = I_{FXR}$ so that $$GNVR = V_R\, V_{RM}\frac{I_{VXR}}{I_{FXM}}$$

$$GNVR = \left(\frac{GNIF}{I_{FXR}} - \text{GNCV01}\frac{I_{FXM}}{I_{FXR}}\right)V_{RM}\frac{I_{FXR}}{I_{FXM}}$$

or $$GNVR = \left(\frac{GNIF}{I_{FXM}} - GNCV01\right)V_{RM}$$

with $I_{FXM} = 400.0$ $V_{RM} = 10.0$

During normal operation, electromechanical transients are sufficiently rapid and well damped to justify the assumption that generator electrical power GNUE is equal to mechanical power GNUM. Special consideration is required in the situation where field weakening is to the point where steady-state stability is lost and the generator pulls out of step. This can be effected by too low a voltage regulator setting if the regulator is on, or too low a base setting with the regulator off, or the loss of the permanent magnet pilot exciter. If the terminal voltage falls below 22.4 kV, the generator behavior is unstable. During operation with the voltage regulator on, the minimum setting is 22.5 kV. However, if the permanent magnet generator is tripped or the base adjuster is set below a value of 22.4 kV with the regulator off, the generator loses synchronism. Then, the simulator sets the generator megawatt output to −25 MV. The reverse power relay detects this condition and trips the generator.

PLANT ELECTRICAL NETWORK

The plant electrical network comprises a main power system and an auxiliary power system. The main power system comprises the main generator and the associated circuitry necessary to transmit the developed electrical power to and off-site distribution grid. The auxiliary power system comprises sources of power from the off-site main distribution grid and a supply from the main generator when the main generator is in operation. The source of power from the off-site grid in the auxiliary power system is termed system auxiliary power; and the supply of power from the main generator when the main generator is in operation is termed unit auxiliary power. To provide for plant startup, power is taken from the system auxiliary power system; and when the plant is operating and the main generator is supplying power to the main distribution grid, half of the power is supplied by the unit auxiliary power system and the other half supplied by the system auxiliary power system. The auxiliary power system provides a reliable source of power to all the electrical operated devices required during any normal or emergency mode of plant operation. In the event of a total loss of auxiliary power from off-site sources, during plant shutdown for example, power is supplied from on-site Diesel generators.

Referring to that portion of the control panel illustrated in FIGS. 93S through 93X inclusive, which, in addition to the various switches and circuit breakers for controlling the electrical network, there is shown diagrammatically the interconnection of the various busses and circuit breakers together with indicator lights so that the operator can visualize diagrammatically the flow of power in the system at any time. Also, FIGS. 93S and 93V includes meters to inform the operator of the various power parameters throughout the electrical network.

Referring to FIG. 124 the station bus configuration is illustrated which includes ammeters A, wattmeters W and various switches and transformers throughout the network. In describing the system, reference will be made to the above referred to control panels, and the station electrical network bus configuration wherein the initial letter and the first three digits of the legends in the FIG. 124 correspond to the circuit breakers on the control panel and the legends on the various meters correspond to the meters on the control panel. In describing the general layout of the electrical system, being simulated, the references on the control panel will be used.

The 25 KV output from the main generator is connected to the primary of transformers T1E and T1W, the secondary winding of which is connected to bus 148 (EPPY48) and through circuit breakers D171 and D172 to the 345 kV bus 147 (EPPY47) and 345 kV bus 149 (EPPY49), respectively. The unit auxiliary power system receives the 25 kV output of the main generator which is stepped down to 4 kV by the unit auxiliary transformer T141 and connected to bus 145 (EPPY42) bus 144 (EPPY44), bus 143 (EPPY43), and bus 142 (EPPY42)) through synchronous switches D164, D166, D261, and D263; and circuit breakers D174, D176, D271, and D273, respectively.

A system auxiliary system which receives its power from off-site is transformed to 4 kV through system auxiliary transformer T142 and connected to the same busses 145, 144, 143, and 142 through synchronous switches D165, D164, D262, and D264 respectively; and through circuit breakers D175, D177, D272, and D274 respectively. The power from bus 145 is connected to the 480 volt bus 135 through step down transformer T135, the primary of which is controlled by the circuit breaker D184 and the secondary of which is controlled by the circuit breaker D194. The 4 kV power on bus 145 is also connected to the water tank heaters through a similar step down transformer T135-1, the primary of which is connected through circuit breaker D185. The 480 volt bus 134 receives its power from the 4 kV bus 144 through the transformer T134, the primary of which is connected to circuit breakers D186 and the secondary of which is connected to circuit breaker D196. Similarly, the 480 volt busses 132 and 133 receive their power from bus 142 and bus 143 respectively through transformers T132 and T133 respectively. Circuit breakers D281 and D291 are connected to opposite sides of the transformer T133; circuit breakers D283 and D293 are connected to opposite sides of the transformer T132.

Bus 144 is connected through circuit breaker D187 to bus 149; bus 143 is connected to bus 148 through circuit breaker D282; and bus 142 is connected to bus 147 through circuit breaker D284. Also, bus 135 is connected to bus 133 through circuit breaker D195 and D292; bus 132 is connected to bus 134 through circuit breakers D197 and D294. The various pumps, fans and heaters of the power system are connected to busses 132, 133, 134 and 135 through suitable transformers connected to the individual components.

Electrical Network Simulation
(ELBUS1, ELBUS2, ELCRNT)

In modeling the plant electrical network, three programs ELBUS1, ELBUS2, and ELCRNT are utilized in the models T57 and T64. The inputs to these programs include breaker positions, and pump currents. The outputs of the system include the ammeter, voltmeter and wattmeter readings on the panels 93S and 93V. The logical variables denoting power status in the various busses are calculated in the PROGEN chains ELBUS1 and ELBUS2, which calculations are based upon the positions of the various circuit breakers. With this information, the current distribution is calculated; and where required, power in the bus is calculated. The chains ELBUS1 and ELBUS2 are contained in the B machine and follow the logic diagrams illustrated in FIGS. 125 and 126. The program ELCRNT is contained in the C machine and covers current distribution which is based on the status of the busses, voltages and power as well as the Diesel generator model, which model will be described hereinafter.

The chain ELBUS1 has as inputs the status of breakers and logical variables denoting the status of the busses and the lights for the panels. Referring to FIG. 125 the system auxiliary network and the unit auxiliary system each form a separate line of logic; and such logic is followed for the chain ELBUS1. In general, every bus can be powered from the main transformer T141 and/or the system auxiliary transformer T142 through the various circuit breakers previously described. Also, a hierarchy of busses can be distinguished; those directly tied to the transformers T141 and T142 and those tied to another bus. Thus, a hierarchy of circuit breakers is developed; those which influence only one bus, and those which influence a chain of busses. The combination of circuit breaker status and power bus status on the higher level, that is a higher voltage, defines the power status of the bus on the lower level or lower voltage. The power status on busses 142 and 144, for example, is obtained directly from the transformers 142 and T141 respectively; while the power on busses 132 and 134, for example, is obtained from the status of the applicable circuit breakers and the power on the busses 142 and 144.

"Double breakers" are formed for use in the chain ELBUS1 and in the subroutine ELCRNT. A double breaker comprises two breakers in series; thus implying that both breakers must be closed to close the "double breaker". Status lights for the busses such as EPPY35 for bus 135, and EPPY45 for bus 145 for example are set at the end of the chain and are based on the actual status of the bus.

The chain ELBUS2 (See FIG. 126) is like the chain ELBUS1 with the exception of the difference in trigger variables.

The subroutine ELCRNT has two portions; the electrical distribution of the network, and the Diesel generator model hereinafter described. The subroutine ELCRNT obtains its information on the circuit breaker status and the availability of power in the electrical busses from the chains ELBUS1 and ELBUS2. Additional input to the subroutine ELCRNT comes from the pump handler PHAND. The outputs from the subroutine ELCRNT are displayed directly from the meters on the control board.

From the pump handler PHAND, the currents for the various busses are obtained. Every bus also contains a constant load which represents non-simulated units in the plant, such as lighting, cranes, and elevators, for example. This enables changes of current to be seen by the operator as soon as the pump or fan changes status, thus giving the operator a realistic picture. For each bus, a test is made to determine if it has power on it, and if associated circuit breakers leading to a particular ammeter are closed. The current is calculated from the currents on the busses below the one treated, and from the constant load on the bus. The equation is of the form:

```
IF (EPPYXX.AND.DBRKR)
  IBUS2=(IBUS1+IPUMP)/RAT
```

where:

EPPYXX=the logical variable, obtained from chain ELBUS1 or ELBUS2, representing power on the bus, DBRKR=the breaker status (can be single breaker, double breaker, or an open/closed combination of two breakers to obtain proper current distribution), JBUS2=the tie current between two buses, IBUS1=the tie current to the bus on lower voltage, IPUMP=the constant load on the particular bus, and RAT=the transformation ratio.

When the load is placed between the main transformer T141 and the reserve transformer T142, it is assumed that it divides equally to both sources. Here the calculation starts at the low voltage (480V) busses and advances toward the higher voltage (4.16 kV) busses. Current in the transformers is obtained by summing all the currents in this mode of operation. The voltage is assumed to be constant, so that, based on the power status in the bus, the bus voltage is set to nominal. The tie power is calculated in watts for a particular mode, taking into account the scale of the meters on the control board, and is based on the equation of the form:

$$DWATTS = DCURR*4.16*3*10^{-6}$$

where:

DWATTS=the power to be displayed,

DCURR=the current (in KA) at this point, and 4.16=the voltage (in KV) in the bus.

GENERATOR HYDROGEN SYSTEM

The generator hydrogen system, removes heat from the generator due to electrical losses. Hydrogen gas is maintained under pressure within the generator casing and circulates through a heat exchanger in a closed loop. Heat is transferred from the generator windings to the gas, which gas is then circulated to the heat exchanger; and the heat in the gas is then transferred to cooling water the flow of which is regulated by a gas temperature control valve GNCVC4. Referring to FIG. 93O, the control valve GNCV04 is controlled from the central control office, and the hydrogen pressure GNPH2, temperature GNTH2, and purity GNZPUR is indicated by meters on the control panels. In operation, the generator heat losses, which enhance the heat input to the system, varies as the electrical load varies. A high gas temperature indicates insufficient heat transfer through the heat exchanger; and a low hydrogen gas pressure indicates a loss of gas. Either of these conditions necessitates a reduction in the generator's electrical output to compensate for the lack of heat removal by the hydrogen. The pressure regulator GNCV04 is designed to maintain a hydrogen gas pressure in the generator as approximately 75 psi under operating conditions.

Generator Hydrogen System Simulation (BOPAUX)

The hydrogen cooling system model T47 which employs the subroutine BOPAUX, responds to variations in generator electrical output, and the manipulation of the control valve GNCV04. The inputs to the model include the electrical output GNUE of the generator and the admittance of the hydrogen temperature control valve GNCV04. The outputs from the model which are indicated in the central office include the hydrogen temperature GNTH2, and the hydrogen pressure GNPH2. The purity of the hydrogen GNZPUR in the simulation is a constant.

In simulating the hydrogen system, the hydrogen gas is considered as a single lump without transport delays during the heat transfer process, and the heat exchanger is simulated by treating the heat that is absorbed by the cooling water as being removed directly from the hydrogen gas. The hydrogen gas temperature GNTH2 is simulated to be 5° F. greater than the temperature of the cooling water GNTOSW. The heat input GNQ to the hydrogen is simulated to be proportional to the electrical output of the generators GNUE. The hydrogen gas system is assumed to dissipate two-thirds of the total heat losses of the generator. The remaining one-third is assumed to be removed by the stator cooling system.

In simulating the gas temperature, an energy balance is performed on the water in the heat exchanger. In such energy balance, the heat input GNQ is simulated as proportional to the generator megawatt output GNUE and the heat is removed by the flow GNWZOL. Because of the relationship in the simulation between the gas temperature GNTH2 and the service water outlet temperature GNTOSW, the gas temperature can be obtained whereby the heat input GNQ and the heat absorbed by the service water are balanced according to the following equation:

$$GNTH2 = GNTOSW +$$

-continued $$\frac{[GNWCOL(70.0 - GNT0SW) + GNQ]\Delta T}{2.02 \times 10^{-3}}$$

In the system being simulated, the generator losses at rated operation are approximately 14.243 megawatts, and the hydrogen gas is simulated to absorb two-thirds of the total generator heat losses. Thus, the maximum heat input GNQ for the system is as follows:

$$GNQ = \frac{2\,(14.243 \times 10^6)(3.413)}{3\,(10^6)} = 32.4 \text{ Btu/hr}/10^6$$

With the heat loss input GNQ being proportional to the electrical output GNUE, then:

$$GNQ = 32.4\,\frac{GNUE}{1085} = 2.98 \times 10^{-2}\,GNUE$$

The amount of cooling water flow GNWCOL is controlled by the hydrogen temperature control valve GNCV04. Such flow is constant except when being adjusted during plant startup to permit an effective control range for the valves. A constant flow of 0.3 millions lb/hr of cooling water is necessary to dissipate the required heat from the hydrogen gas. The controlled flow is made proportional to the valve admittance GNCV04 resulting in a maximum flow of 1.3 millions of pound per hour with a maximum control valve admittance of one. The service water inlet temperature is simulated at 70° F. A constant, such as $2.02\times10^{-3}$ hrs., is selected to provide a seven second time constant which represents an effective mass of gas and its specific heat.

In simulating the hydrogen system pressure GNPH2, the ideal gas loss, PV=NRT is applied. The enclosed volume of gas in the generator is of course subject to temperature variation which results in pressure variation. The pressure regulating apparatus compensates for temperature variation by adding to or removing from the mass of gas. In simulating the effect of the regulator the derivative of the ideal gas loss PV=MRT is utilized as follows:

$$dp = \frac{R}{V}\,[Tdm + MdT]$$

Any deviation in temperature dt is offset by a change in the mass dm. A simulation program uses a derivative lag circuit to simulate the effect of temperature change on pressure.

The effect of the generator temperature is eliminated by the pressure regulator. The effect of the pressure regulating system GNZFLI is assumed to have a thirty-second time delay. The output of the derivative lag circuit is multiplied by a gain of 0.75. Thus a 20° step change in temperature causes a 15 psi change in pressure. The output of the derivative lag circuit represents only transient responses. The total pressure is calculated by adding the set point value GNKTSP (75 psi) to the transient output (ΔP).

SYNCHRONIZING SYSTEM

The synchronizing system of the power plant being simulated includes a synchroscope and two 120 volt indicator lamps. The three-phase voltages on either side of a circuit breaker are compared by this system to determine if they are in phase and have the same amplitude. The indicator lamps are dark when the voltages are equal in phase and amplitude, and have a maximum intensity when they are completely out of phase. The synchroscope is actually a phase meter, with the pointer indicating the phase difference between two voltages. The pointer position (0° to 360°) corresponds directly to the electrical phase difference. When the pointer is motionless, the voltages have the same frequency. If the frequencies are different, the pointer rotates in the "fast" or "slow" direction, depending on the relative frequency of the "incoming" and the "running" voltages. A frequency difference of 3 Hertz for example, causes a 3 revolutions per second pointer speed. This speed is about the limit of the synchroscope; that is, greater frequency differences cause the pointer to chatter. When the incoming and running voltages are in phase and have the same frequency, the pointer is motionless and located at the twelve o'clock position.

When starting up the main circuit beaker is open. When the generator reaches synchronous speed and the synchroscope indicates that main generator voltage and outside voltage is synchronized the main circuit breaker can be closed.

Synchronizing System Simulation

Referring to FIG. 127 the simulation of the synchronization system is accomplished through a hybrid combination of hardware and software. The hardware provides a variable frequency signal to a synchroscope and synchronizing lights identical to those in the plant (see FIG. 93S). This variable frequency is produced by a voltage controlled signal generator VCG that is controlled by the C machine software. Furthermore, several relays that disable, switch, or fix the input signals to the synchroscope (see FIG. 128) are controlled by software logic in the B machine. A phase difference at the synchroscope is produced by providing a constant 60 Hertz signal as one input, and the output of the voltage controlled generator as the other input. The variable frequency signal has a range of from 55 to 65 Hertz for example. When the running and incoming frequencies are equal, the hardware provides a 60 Hertz signal.

The voltage control signal generator VCG output frequency is determined by a dial setting on the VCG which determine the minimum frequency, and a positive DC voltage input from an analog output on the B machine increases the frequency. Since a one volt input causes a change of 40 Hertz, a one-fourth volt input is required for a span of 10 Hertz. A voltage divider converts a 0 to 5 volts DC analog output to the required 0 to the one-fourth volt DC signal.

FIG. 127 shows the numerical calculations in the C machine, and the analog signal flow that produces the variable frequency signal. The incoming and running frequencies ($F_1$ and $F_2$, respectively) are compared and normalized by 10 Hertz. This normalizing factor corresponds to the maximum frequency range that the hardware can produce. A normalized bias of 0.50 is added to establish a 60 Hertz signal when $F_1$ equals $F_2$. The B machine analog output converts this normalized number to a voltage that ranges from 0 to 5 volts DC. A voltage divider converts this voltage signal to a 0 to one-fourth volt DC signal. The VCG produces a variable frequency signal that ranged from 55 Hertz to 65 Hertz, and this signal is amplified by a power amplifier to drive the variable phase input of the synchroscope.

FIG. 128 illustrates the relay contacts $B_1$ and $B_2$ which perform the switching. After a breaker that is being synchronized is closed, the frequencies $F_1$ and $F_2$ are precisely equal. The VCG is providing a 60 Hertz signal, and the pointer should be motionless. However, the output of the VCG is subject to drift which causes the pointer to wander. To eliminate this undesirable drift, the software synchroscope logic in the B machine disconnects the VCG and connects 60 Hertz power to both inputs of the synchroscope. The synchronization simulation considers only the frequency of the two signals that it is comparing. The amplitudes of the voltage signals are assumed to be either normal or zero. If one of the voltages is zero, as determined by logic in the B machine, or if the system is not in use, both the inputs to the synchroscope are disconnected by the relay contacts $A_1$ and $A_2$. The frequency difference is correct at all times, but the actual phase difference is not. The electrical phase differences are not calculated because of limitations imposed by the existing hardware.

In a real plant, when a breaker is opened, the phase difference theoretically should be initially zero. However, in the simulated system, the phase difference depends on the drift of the VCG frequency. This means that when the breaker is opened, the pointer will snap to a non-zero reading. This action is realistic since, in a real plant, the phenomenon is caused by a momentary lag of the associated speed control of the rotating machinery.

Although the main control board has one set of simulation hardware that is connected to one synchroscope, the three Diesel synchroscopes share a single set of hardware through a switching system. The Diesel switching relays C and D (see FIG. 128) select the Diesel generator synchroscope A or B. When relay C is false, Diesel generator B synchroscope is selected; and when relay C is true and relay D is false, Diesel generator A synchroscope is selected. When relays C and D are true, Diesel generator 0 synchroscope is selected. This is in addition to the relays discussed above.

Figure 129:
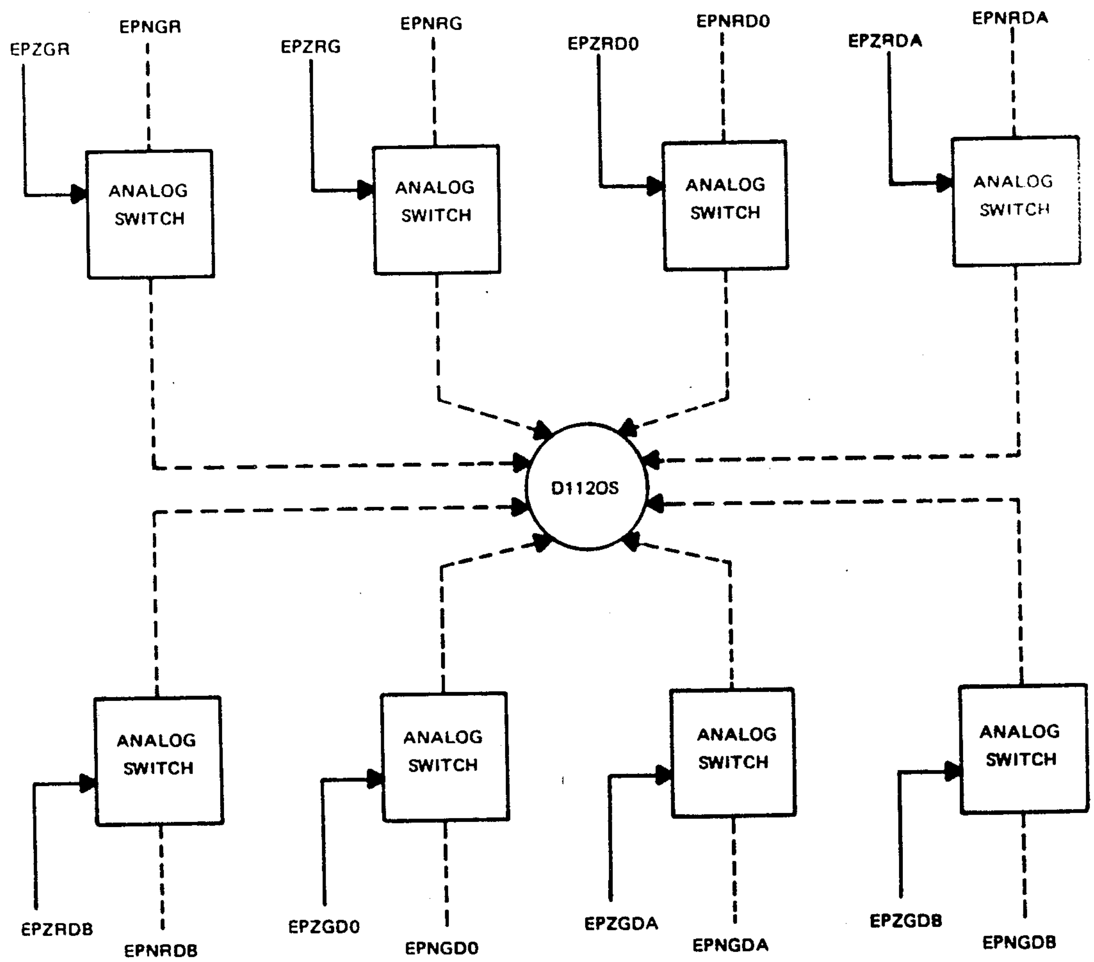
Figure 130:
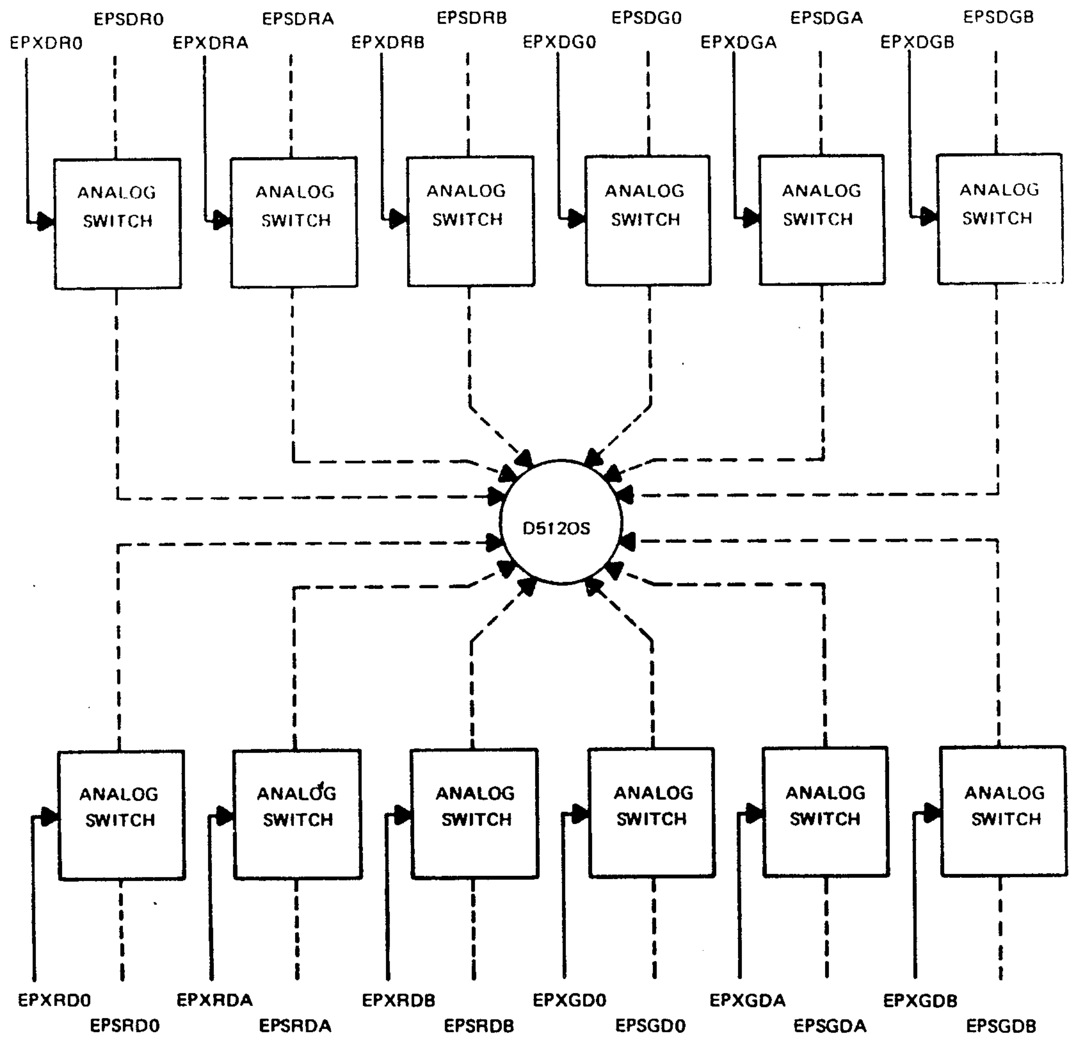

Referring to FIGS. 129 and 130, all the relays that have been discussed are controlled by software logic in the B machine. In addition, the correct VCG input signal is selected, according to the source of the frequencies that are being synchronized. For rapid response, all the possible combination of frequency differences are continuously transmitted from the C machine to the B machine. A special algorithm allows logical signals to select any one value from the following frequency difference tables and output that value on an analog output.

| Incoming Voltage | Running Voltage | Frequency Difference Symbolic Name |
|---|---|---|
| MAIN CONTROL BOARD FREQUENCY DIFFERENCES | | |
| 1. Main Generator | Reference | EPNGR |
| 2. Reference | Main Generator | EPNRG |
| 3. Reference | Diesel Generator 0 | EPNRDO |
| 4. Reference | Diesel Generator 1A | EPNRDA |
| 5. Reference | Diesel Generator 1B | EPNRDB |
| 6. Main Generator | Diesel Generator 0 | EPNGDO |
| 7. Main Generator | Diesel Generator 1A | EPNGDA |
| 8. Main Generator | Diesel Generator 1B | EPNGDB |
| 9. Reference | Reference | None |
| DIESEL GENERATOR PANEL FREQUENCY DIFFERENCES | | |
| 1. Main Generator | Diesel Generator 0 | EPSGDO |
| 2. Main Generator | Diesel Generator 1A | EPSGDA |
| 3. Main Generator | Diesel Generator 1B | EPSGDB |
| 4. Reference | Diesel Generator 0 | EPSRDO |
| 5. Reference | Diesel Generator 1A | EPSRDA |
| 6. Reference | Diesel Generator 1B | EPSRDB |
| 7. Diesel Generator 0 | Main Generator 0 | EPSDGO |
| 8. Diesel Generator 1A | Main Generator 1A | EPSDGA |
| 9. Diesel Generator 1B | Main Generator 1B | EPSDGB |
| 10. Diesel Generator 0 | Reference 0 | EPSDRO |
| 11. Diesel Generator 1A | Reference 1A | EPSDRA |
| 12. Diesel Generator 1B | Reference 1B | EPSDRB |
| 13. Reference | Reference | None |

Through normal synchronizing operations, frequency differences can occur on the main control and Diesel generator panel. The voltages termed "reference" is the 60 Hertz voltage that is assumed to be always present on the 345 KV system. If a bus is connected to the 345 KV system, it is assumed to have this reference frequency.

In order that a certain frequency difference may be displayed on the synchroscope, the associated logical variable must be true. For example, the main control board synchroscope displays the difference between the main generator frequency and the 60 Hertz (EPNGR) if the logical variable EPZGR is true. There are nine separate logical conditions on the main control board simulation, and they are mutually exclusive. If one logical is true, all others are false.

To determine which condition if any, is true there are four requirements that must be satisfied. The first is that the synchronizing switch for the circuit breaker that is being considered must be set. Also, there must be an incoming voltage. In order to have this voltage, an electrical path must be available and the voltage already established on that path. There must be a running voltage that satisfies the same requirements as the incoming voltage. Finally, there must be phase difference between the incoming and running voltages. If the circuit breaker that is being synchronized is closed, or if there is any parallel path that connects the running and incoming voltages, this requirement is not satisfied.

Figure 131:
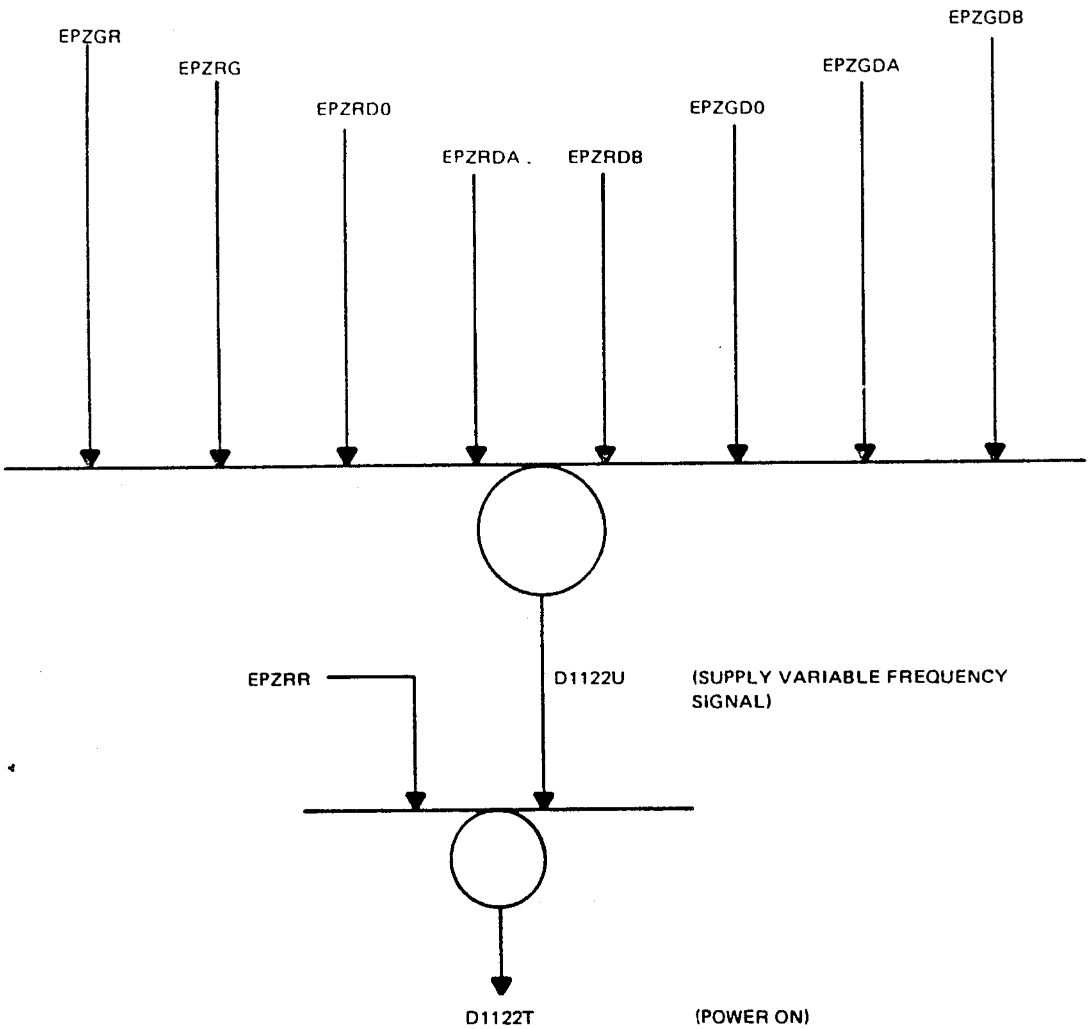
Figure 132:
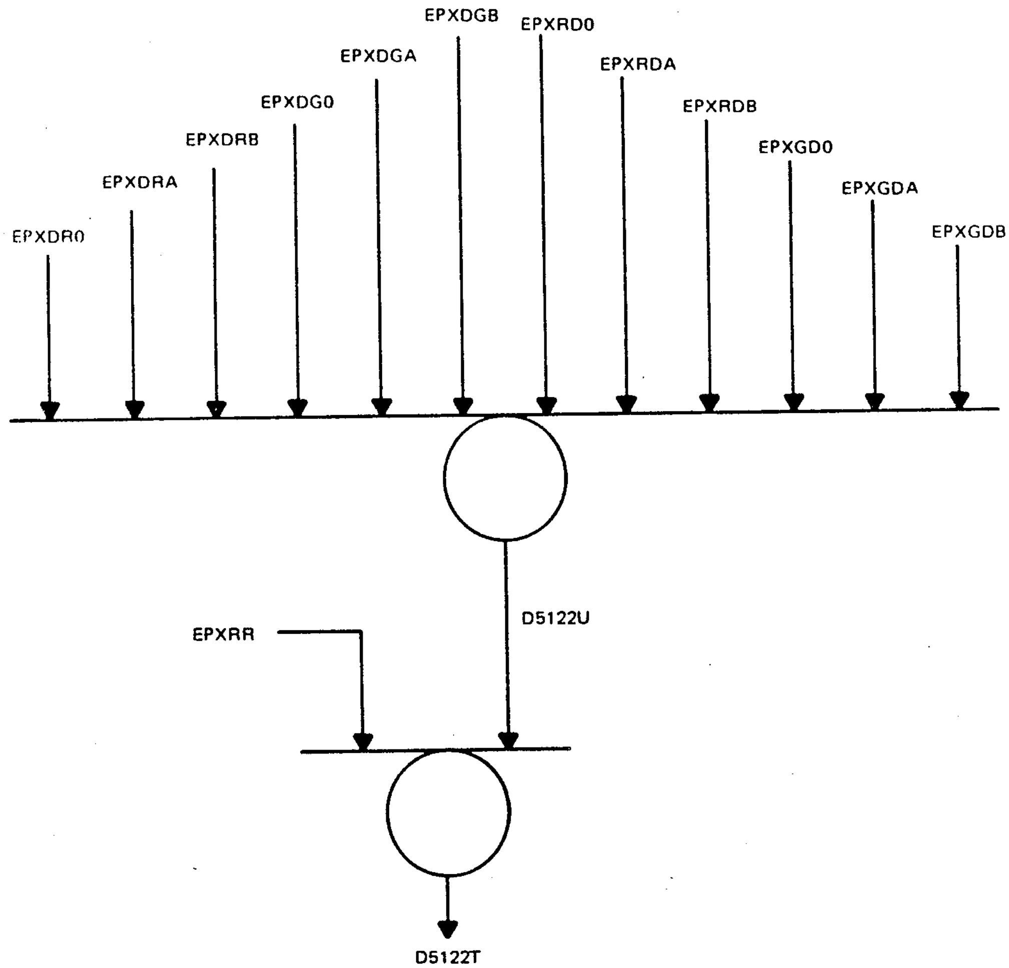

FIGS. 129 through 148 are representative of the synchroscope logic of the present embodiments and reference is made thereto as an aid to understanding the invention. Referring to FIG. 131, one of the main control board eight variable frequency lgoicals is true, and contact output D1122U is set to enable the variable frequency signal to drive the synchroscope. Also, the contact output D1122T is set to enable power to reach the synchroscope inputs. These contacts are shown as relays B and A respectively in FIG. 128. The twelve variable frequency logicals on the Diesel generator panel enable D5122U and D5122T. If a synchronizing operation satisfies the first three requirements above, but fails the phase difference test, the operation will probably satisfy another test which indicates that these are two voltages that are in phase. Referring to FIGS. 131 and 132, the reference versus reference logical condition (EPZRR) is true; D1122T is set true (D1122U is false) and the synchroscope will indicate a zero phase angle.

Figure 133:
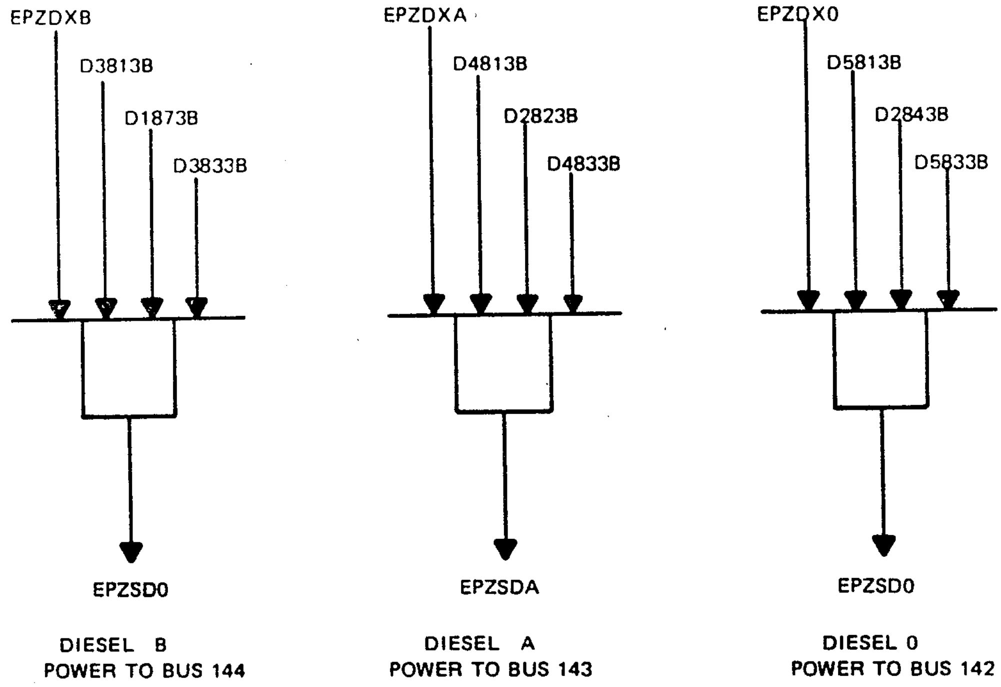
Figure 134:
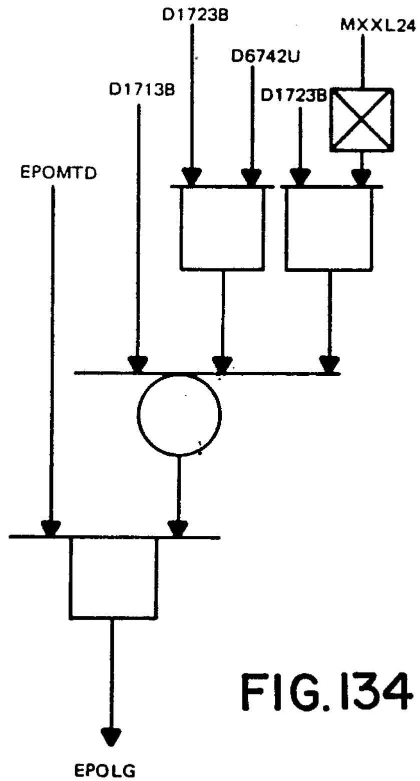
Figure 135:
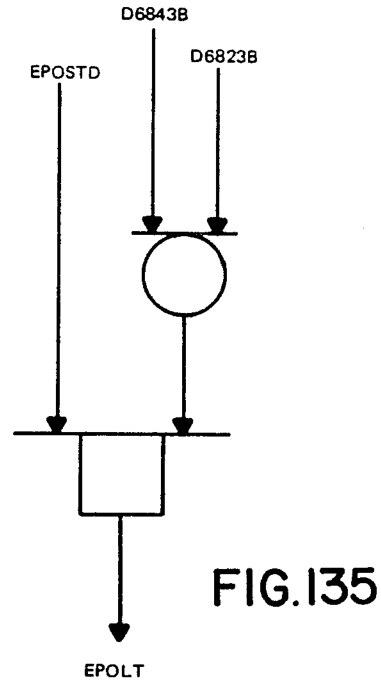
Figure 136:
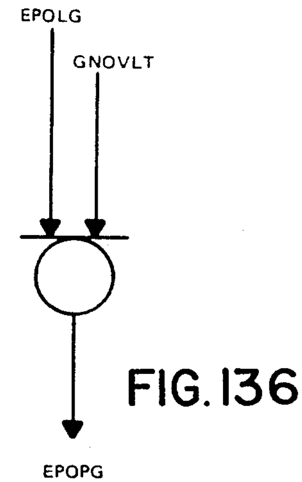
Figure 137:
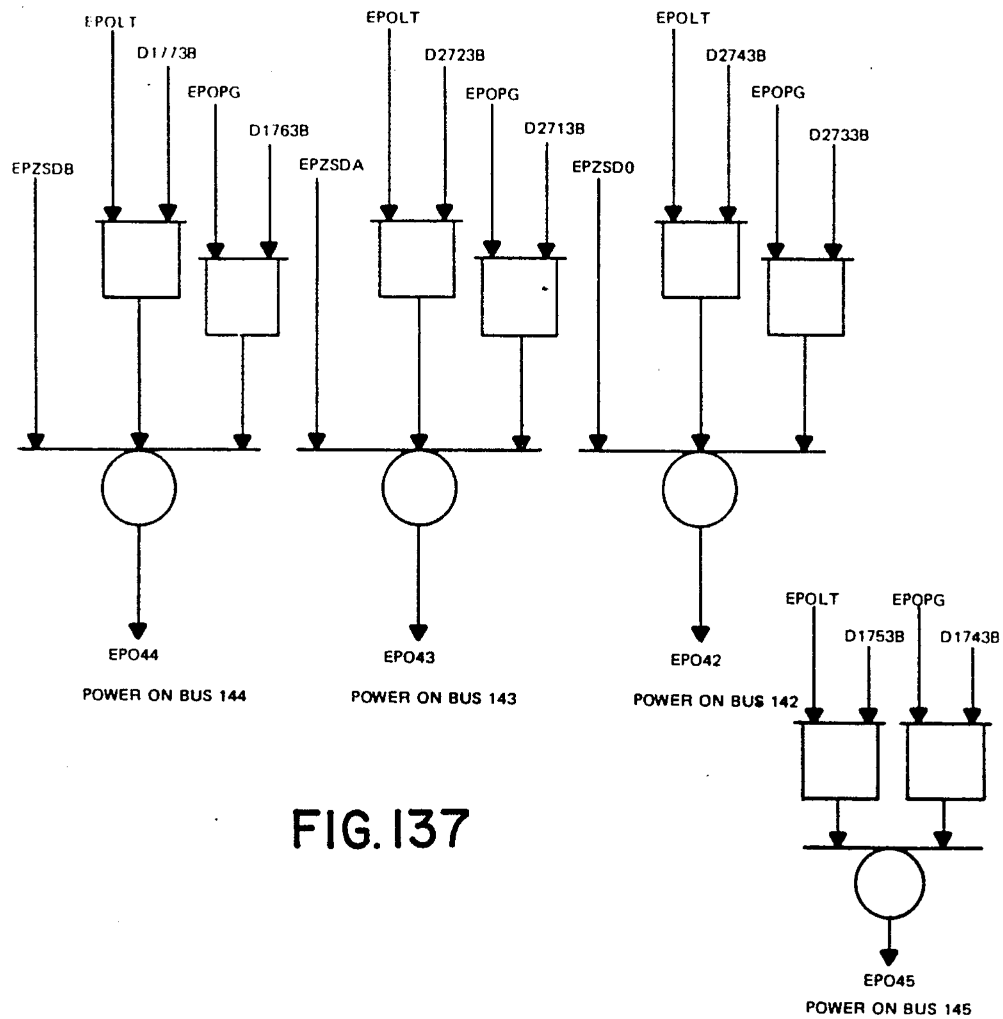

In explaining the B machine synchroscope logic, the main control board synchroscope logic is utilized as exemplary; and referring to FIG. 147, a single line diagram illustrates the possible synchronizing operation that can occur on bus 142 for example. This figure designates the electrical breakers and disconnects in the system. There are ten logical conditions that are found to recur throughout the logic. These have been calculated and established for use wherever required. Referring to FIG. 133, the logical variables (EPZSDO, EPZSDA, EPZSDB) indicate the Diesel generator O, A, and B, respectively are running and the tie breakers are closed so that they are feeding the associated non-essential four kilovolt busses. The logical variable on FIG. 134 (EPOLG) is true when the main generator is linked synchronously to the 345 KV ring bus and hence the generator's frequency is 60 Hertz. Similarly, the variable EPOLT FIG. 135 is true when the system auxiliary transformer is linked to the ring bus. The variable of FIG. 136 (EPOPG) indicates that power is available at the terminals of the generator because either the generator is producing voltage, or the generator is linked to the 345 KV ring bus. The four logical variables EPO42, EPO43, EPO44, and EPO45 of FIG. 137 indicate that power is available from some source on the four non-essential 4 KV busses 142, 143, 144, and 145.

Figure 138:
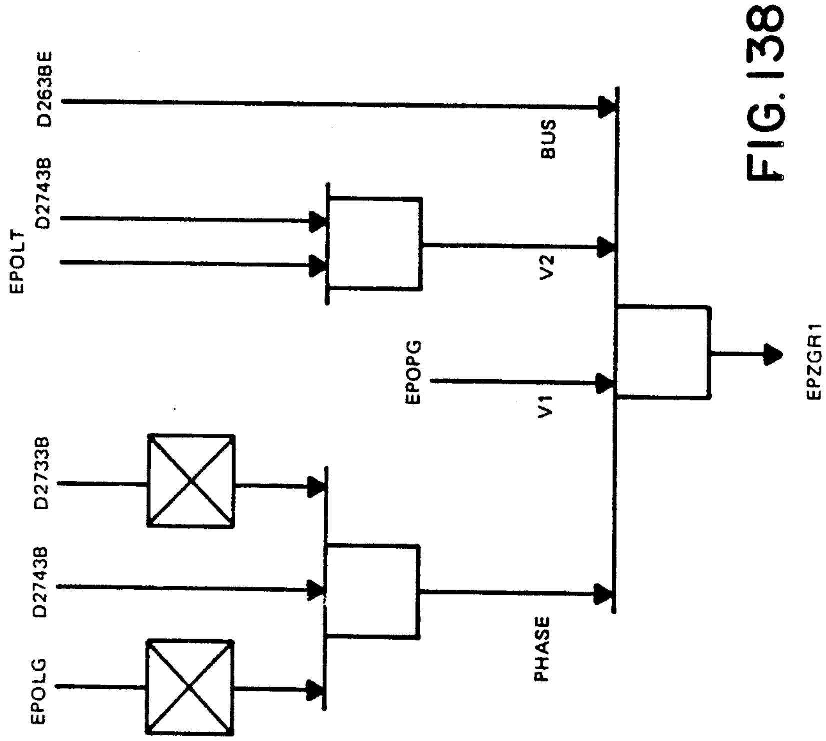

FIG. 138 shows the main control board synchroscope logic which determines if the main generator output is being compared to the 60 Hertz reference voltage at the main feed breaker EPZGR1. To first determine what breaker, and hence which bus, is being considered, the main feed breaker synch switch must be closed. The generator voltage V1 is incoming and non-zero if EPOPG is true. Bus 142 has a 60 Hertz frequency and a running voltage for V2 if EPOLT is true and the reserve feed breaker is closed. In order to have the assumed phase difference, the reserve feed breaker must be closed, the main feed breaker must be opened, and the generator output must not be linked to the 345 KV system (EPOLG). If EPOLG is true, or the main feed breaker is closed, a path connects the incoming voltage to the running voltage is established. Hence, there cannot be a frequency difference.

Figure 139:
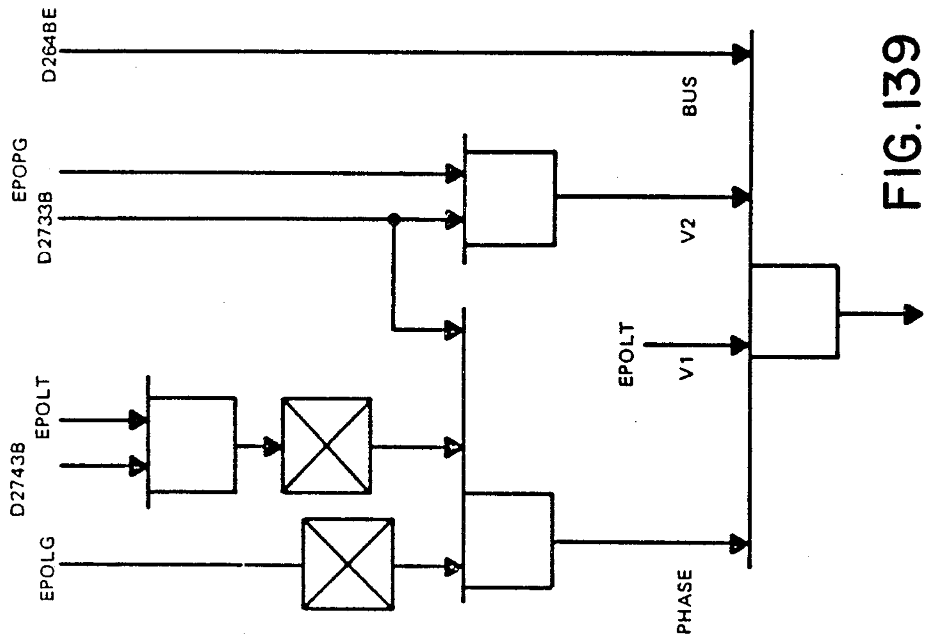
Figure 140:
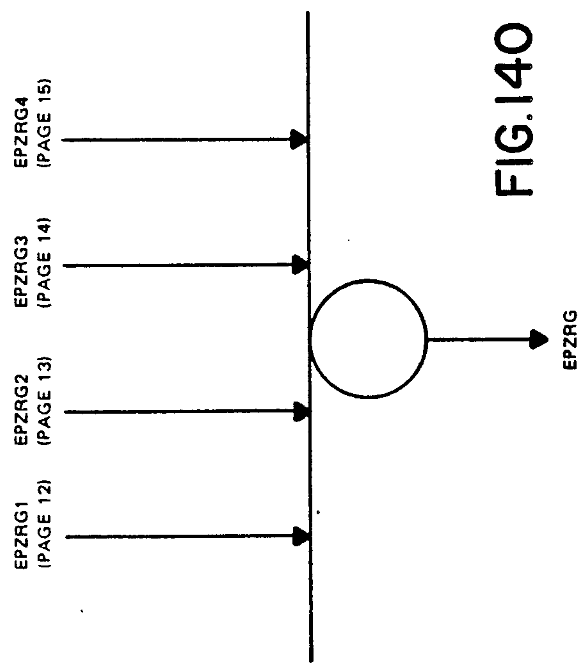

Since there are five other ways that the main generator and reference frequencies can be compared, the output of this comparison EPZGR1 is logically ORed with them (EPZGR2-EPZGR6) to determine if EPZGR1 is true. FIG. 139 of the logic determines if the reference frequency is being compared with the generator frequency. The incoming voltage must be present; that is, EPOLT is true. The running voltage must be due to the main generator. Moreover, the generator frequency must be different from the 345 KV system frequency as indicated by the lack of a connection between the generator and the ring bus. There are three other ways that the same frequency difference is displayed on the synchroscope as shown in FIG. 140 of the synchroscope logic which shows the result EPZRG.

Figure 141:
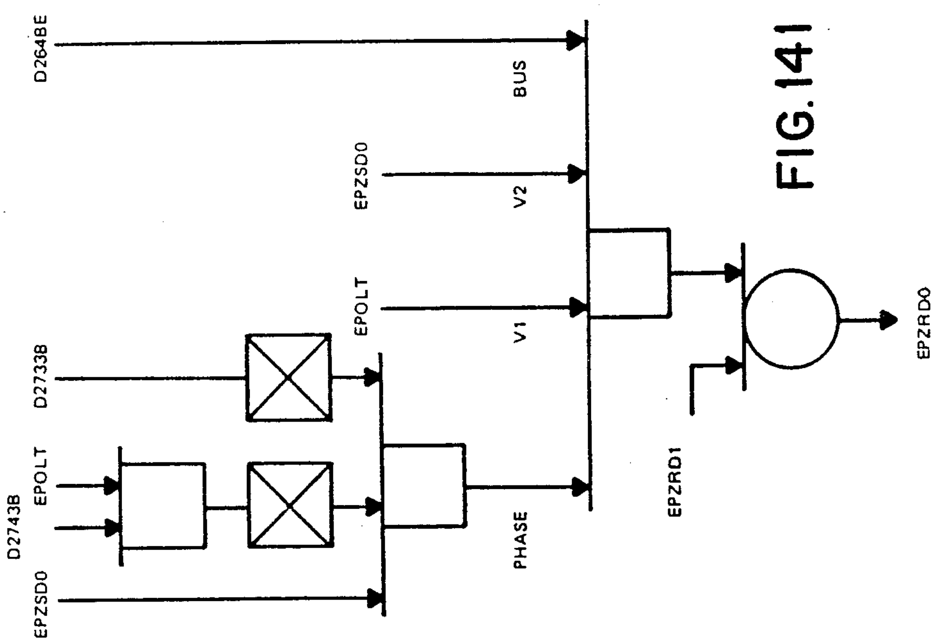
Figure 143:
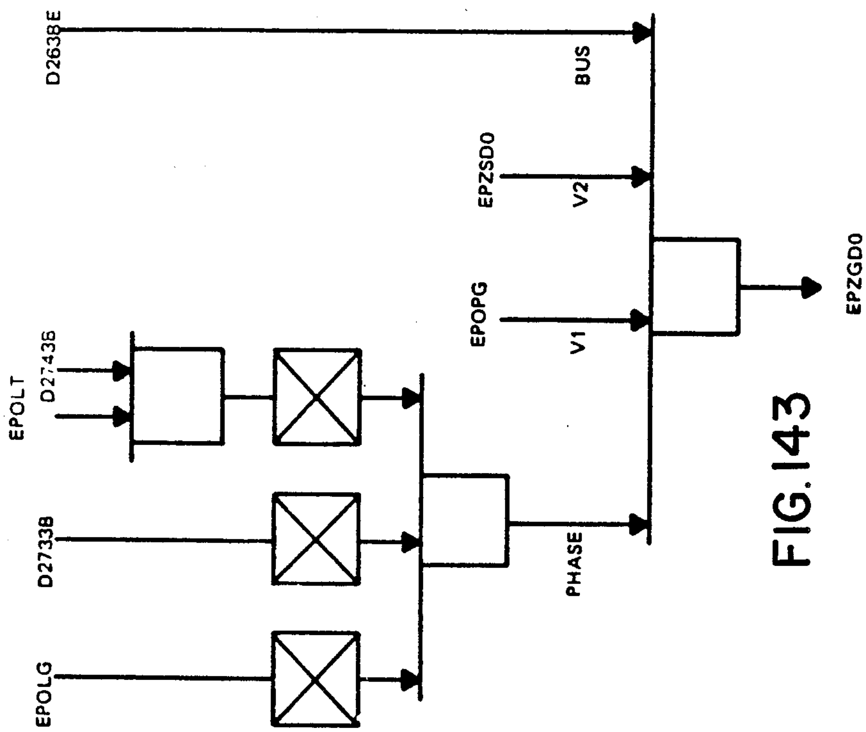
Figure 142:
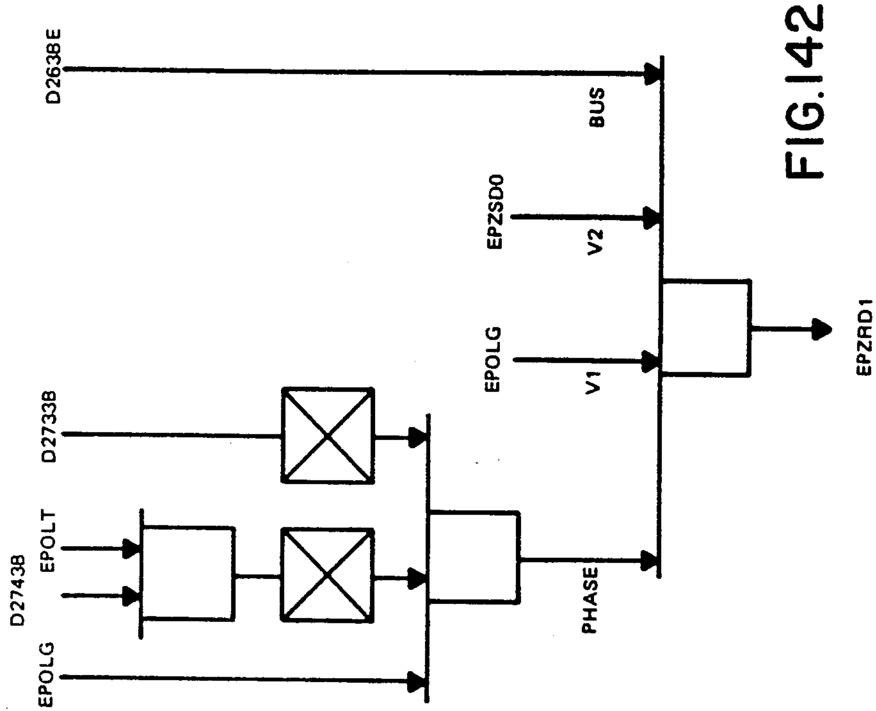

FIGS. 141 and 142 show how the reference frequency 60 Hertz can be compared with the Diesel frequency. This situation is extremely unlikely; however it is included for completeness. This frequency difference occurs when synchronizing the reserve feed breaker to the bus when the bus is supplied solely by the Diesel. It can also occur when the main feed breaker is being synchronized, the generator is linked to the ring bus, and the bus is supplied solely by the Diesel. The result is shown in FIG. 141 (EPZRD0). FIG. 143 shows how the main generator frequency can be compared with the Diesel frequency. Again, this condition, although unlikely, is included for completeness. When the main feed breaker is being synchronized and the main generator is not connected to the 345 KV system, and the bus is supplied solely by the Diesel generator, the logical variable EPZGD0 is true.

Figure 145:
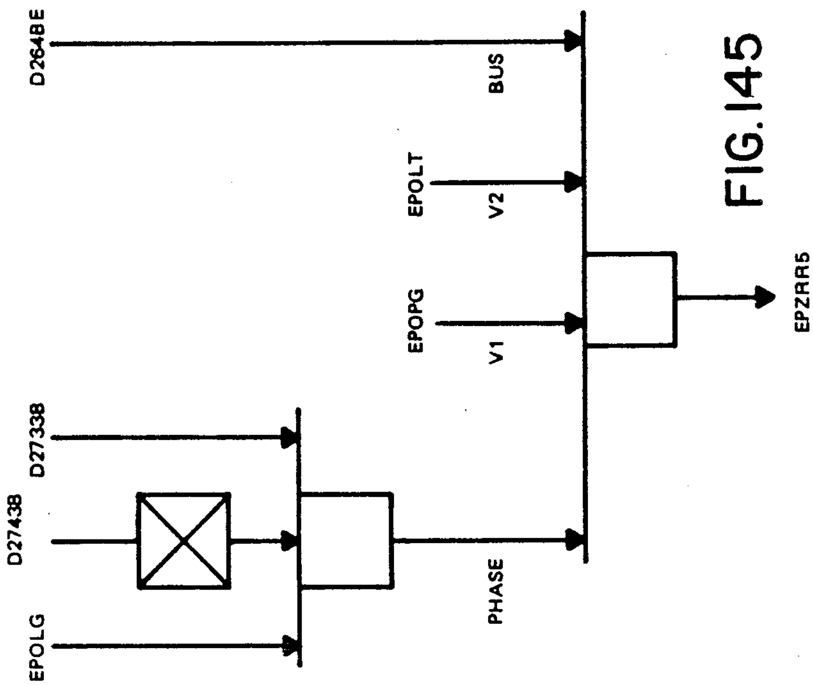
Figure 144:
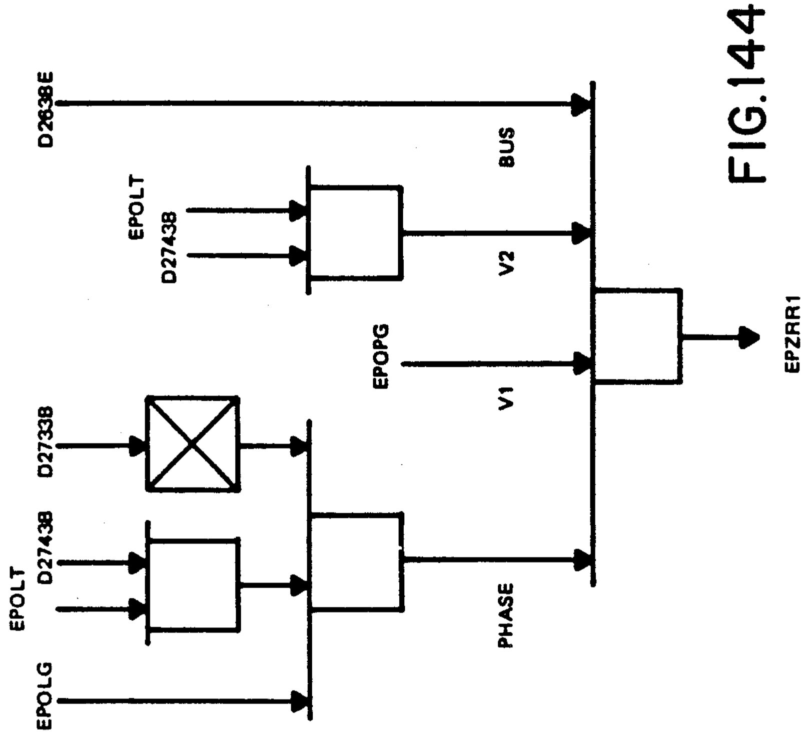
Figure 146:
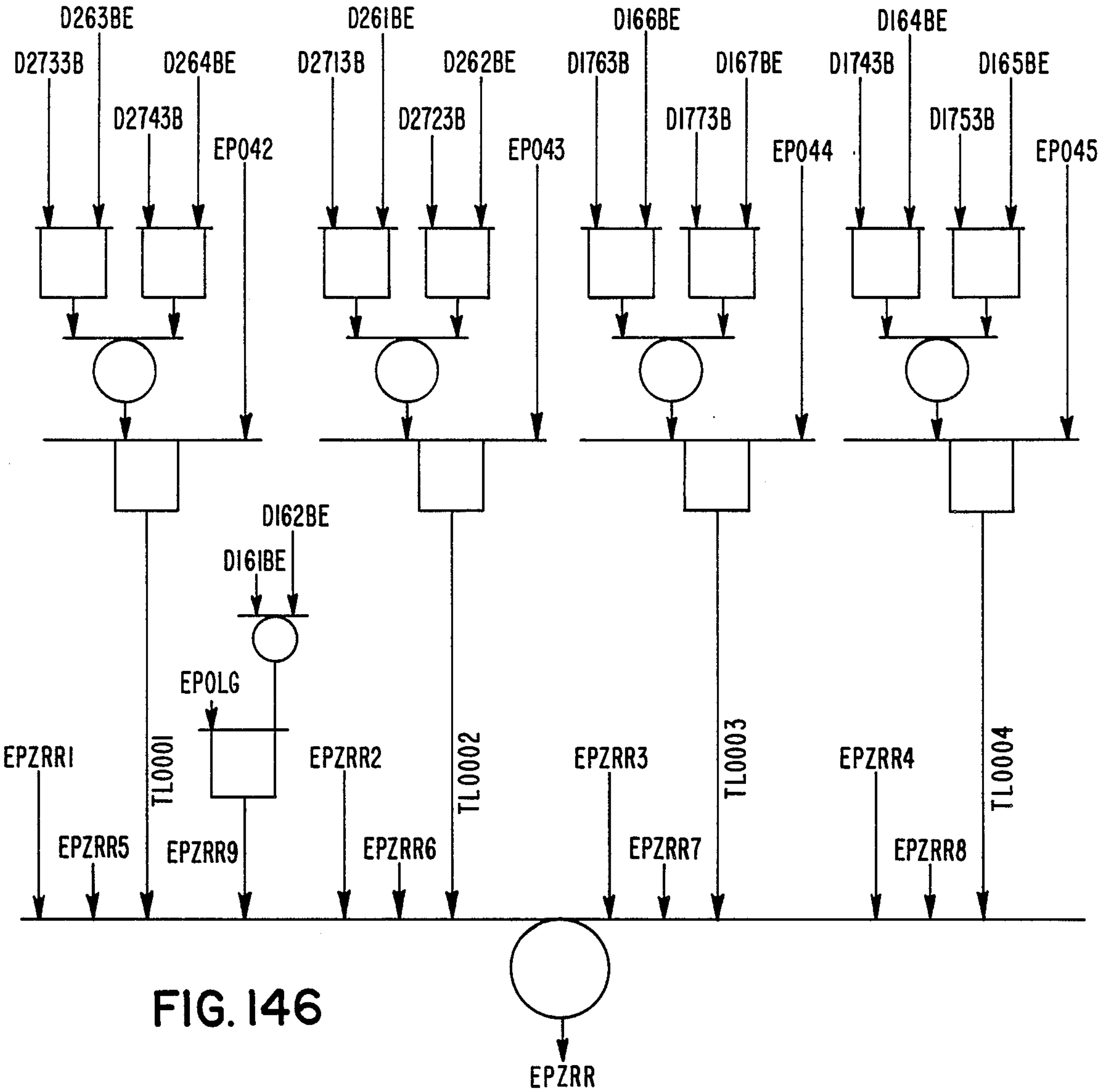

There are several ways in which the synchronization of the main and reserve feed breakers on bus 142 cause the comparison of a frequency signal with itself. If the 60 Hertz reference voltage occurs on both sides of a breaker to be synchronized, this condition is true. FIGS. 144 and 145 show this condition for the main and reserve feed breakers. Referring to FIG. 146, another way that the incoming and running frequencies are identical is when a breaker that is being synchronized is closed and power is present. FIG. 140 previously mentioned, details the logic which ultimately controls the variable frequency signal and the power enable relay. These relays have been discussed previously and are shown in FIG. 128.

To tune the voltage controller generator VCG, it must be set to produce a 60 Hertz output when the electrical input signal consists of the bias signal only. This establishes the relationship such that the VCG produces a 60 Hertz output for a numerical value of 0.50 in the C machine. A software logical variable TSTSW9 in the C machine stores only the normalized bias in the locations EPNGR and EPNDRO. By using either the C machine maintenance panel or programmer's console, this test switch which is contained in the COMMON BOPTST must be set to true while the model is running. The subroutine BOPAO4 contains the executable instructions. With TSTSW9 set, the B machine programmer's console is used to set the logicals EPZGR and EPXDRO true. This will enable the synchroscopes, and the pointers will turn. By adjusting the coarse and vernier frequency potentiometers on each VCG, the pointer can be made to stop, and the VCG output frequency is then 60 Hertz. During the tuning process the model should be running and all circuit breakers and synchronizing switches inactive.

DIESEL GENERATOR SYSTEM

In the event that the normal off-site generated auxiliary power is lost, the plant auxiliaries which are essential to safe shutdown are powered by the diesel driven generators. Each diesel generator is installed to provide a reliable source of redundant on-site generated auxiliary power and is capable of supplying the engineered safety feature loads assigned to the engineered safety feature electrical system bus which it feeds. The diesel generators can run in a standby condition without being tied to the load, or supply the auxiliary power solely when connected to the load. Synchronizing equipment is provided to permit parallel operation of each diesel with the normal auxiliary power source during testing and exercising, when the diesel generators are sharing the load.

Referring to FIGS. 93Y and 93Z, the main control board includes controls for remotely controlling the governor, voltage regulator, synchronizing, and the generator breaker for each of the three diesel generators simulated in accordance with this embodiment of the invention.

The diesel generator system simulation T64 is executed by the subroutine ELCRNT. The input to this system includes the breaker position on the control panels, and the outputs include the diesel generator voltage, power (real and reactive), and current and frequency). In the simulation, three modes of diesel generator operation are distinguished depending on the position of the circuit breakers. The three modes of operation are: not tied to the load, sharing the load with the main network as above mentioned, and tied to the load. A model is implemented for each of the above modes of operation. In the embodiment described, there are three diesel generators which have identical mathematical models.

In the first mode of operation, where a diesel generator is operated alone without being tied to a bus, the current to the bus and the real and reactive power are zero. Output voltage is made a function of the reference voltage, which simulates the action of the voltage controller, the input to which is from the voltage adjust rheostat (See FIG. 93C) on the control board. A controller range for the generator is taken to be plus or minus 10% of the nominal voltage (4.16 KV); that is, 3.744 to 4.576 KV. The frequency is made a function of speed. Therefore, a change in the diesel generator governor's feed control changes the frequency for +5% of 60 Hz.

In the second mode of operation, where the diesel generator is tied to the bus which is also a part of the main network, the Diesel Generator is tied to such bus after synchronization. Thus, it has nominal voltage and nominal frequency at its output. The output power is simulated as a function of the speed of the diesel generator as follows:

$$POWER=10000.*(V1-0.5)$$

where POWER is the output power and V1 is the per-unit speed control. For the moment when synchronization is achieved, V1~0.5 and the power is zero.

Referring to FIG. 148, the reactive power as well as the current in the tie bus is calculated in accordance with such circuit. $x_e$ represents the equivalent reactance between main network voltage $V_N$, and $x_i$ represents the generator internal reactance. Thus, in accordance with such Figure:

$$VREFF = VSET - x_i{*}I_{BUS}$$

$$I_{BUS} = \frac{VREFF - V_N}{x_e}$$

which yields:

$$I_{BUS} = \frac{VSET - V_N}{x_e\left(1 + \frac{x_i}{x_e}\right)}$$

In the above equation the denominator is estimated to be 20%; and circulating reactive power CVAR is defined as follows:

$$CVAR = \frac{VREFF - V_N}{V_N} * \frac{P_{NOM}}{0.85{*}0.2}$$

where, $P_{NOM}$ is nominal power, 0.85 is the power factor, and 0.2 is the per-unit reactance, With $V_N$ being 4160 and $P_{NOM}$ being 5000, the constant terms grouped together yield:

$$\frac{P_{NOM}}{V_N{*}0.85{*}0.2} = 7$$

Thus, in the program ELCRNT, CVAR=(-VREFF−4160.)*7.

The reactive power of the load is calculated as follows:

$$XLWATT=(I_{TRF}+I_{LOAD}){*}3{*}V_N{*}0.85$$

where $I_{TRF}$ is the current to the 480V bus, and $I_{LOAD}$ is the current of the load tied directly to the bus. The constant terms are precalculated, which yields the following equation:

$$\sqrt{3}\ {*}4160.{*}0.85 \times 10^{-3} = 6.12453$$

The total reactive power is represented as follows:

$$P_{VAR} = CVAR + \frac{\sqrt{1 - 0.85^2}}{0.85} {*}XLWATT$$

where the constant term is precalculated yields the following:

$$\frac{\sqrt{1 - 0.85^2}}{0.85} = 0.62235$$

and $P_{VAR}$ is the total reactive power. The tie watts are defined as TWATT=XLWATT−POWER, which yields field current to the bus in accordance with the following equation:

$$I_{FEED} = \frac{\sqrt{(\text{POWER})^2 + (P_{VAR})^2}}{4160{*}3}$$

In the last-mentioned equation the constant term is precalculated, which together with the scale factor yields $\sqrt{3}{*}4160.{*}10^{-3}=7.20533$. The tie current, which is normally calculated from the current distribution is calculated in this simulation as follows:

$$I_{TIE} = \frac{\sqrt{(TWATT)^2 + (CVAR)^2}}{4160.{*}3}$$

The third mode of operation, where the diesel generator is connected to the auxiliary system load, occurs after the generator is synchronized and after it has picked up its load; that is, when the tie current is compensated to zero; and then the tie breaker is disconnected. The feed current to the bus is a function of the voltage as follows:

$$I_{FEED} = (I_{TRF} + I_{LOAD})^* \frac{VREF}{4160}$$

The output voltage is equal to the reference voltage VREF, and the voltage in the 480V bus is a function of the Diesel output voltage in accordance with the following equation:

$V_{480}$ bus=0.115384 * VREF, where 0.115384 is the tranformation ratio.

Now, the diesel generator output power POWER is calculated as follows:

$$\text{POWER} = I_{FEED}{}^* VREF^* 0.85^* \sqrt{3}$$

Thus, in the final implementation:

$$3 * 0.85 * 10^{-3} = 1.47224 * 10^{-3}$$

The diesel generator output reactive power is determined in accordance with the following equation:

$$P_{VAR} = \frac{\sqrt{1 - 0.85^2}}{0.85} {}^*\text{POWER}$$

The generator frequency is made the function of speed and power, as follows:

$$\text{FREQ} = 57 + 6^* \left( V1 - \frac{\text{POWER}}{10000} \right)$$

If the speed of the diesel generator is not set so that its frequency is 60 Hertz, generator drifting is simulated by ramping the frequency in the appropriate direction. In the case of reverse power, a logical variable is set and used further in the protection logic in the A machine. The protection for each diesel generator is as follows:

*EPZURA=POWER.LE.* −50.

Plant Instrument Channels (BOPA02. BOPA04)

Within the electrical power plant, there are several redundant measurements of the same process variable. The various models calculate one value of the process variables and the model T62 employs the subroutine BOPA02 and BOPA04 to calculate the redundant measurements. The subroutine BOPA02 calculates the redundant analog outputs that are updated twice a second while the BOPA04 calculates the four per second redundant analog outputs. The inputs to the program include plant pressures, temperatures, flows, and levels. The outputs of the program includes duplicate or malfunctionable channels.

Referring to the control panel illustrated in FIGS. 93A, 93C, 93E, 93H, for example, there can be several measurements of a process variable by different instrument channels; and the BOP models calculate a single status variable to represent a process variable. The instrument channels are simulated by establishing additional symbolic names that are related to the process variable. Some of these instrument channels can be malfunctioned, while others are merely duplicate values. For example, switch FW79A selects either instrument channel I or II to display the steam flow on meters FI512 or FI513. These channels I and II are simulated by symbolic names SGWSINX1 and SGWSINX2. The X is used to define the particular RCS loop designation. These channels can be used for feedwater control and mismatch alarms with feedwater channels I, and II. The selector switches for each loop, such as FW79A, and FW80A, determine which channel is used for control and display on the recorder. The steam flow measurements are affected by the steam generator pressure channels I and II.

In the plant, steam density is calculated from steam pressure to determine the mass flow rate. Both steam flow channels can be malfunctioned by increasing the steam flow measurement and simultaneously increasing the respective pressure channel. The malfunction implementation is performed in the subroutine BOPA04 and SECLIM. The steam generator feedwater is also measured by channels I and II. These channels are simulated by symbolic names SGWFINX1 and SGWFINX2 where X designates the particular loop number or letter. These channels are used for feedwater control and mismatch alarms with the steam flow channels I and II.

The steam generator narrow range level is measured by channels I, III, and IV. Channel I is simulated by the symbolic name SGLNRX where X designates the loop. The channel is used for alarming high and low flow of level. Channel III is simulated by the symbolic name SGLNRDX where X designates the particular loop number. Channel III is also used for alarming high level, low level, and low low level. Channel IV is simulated by the symbolic name SGLMALX where X designates the loop. In addition to alarming high level, low level, and low low level, this channel is used for level control. Channels I and III can be malfunctioned with this arrangement even though in the present embodiment they are not so constituted. Channel IV is capable of being malfunctioned either high or low so that the feed control system is affected. This channel is the only level channel for control in the present embodiment of the invention.

The steam generator wide range level is measured by two channels, which are simulated by the symbolic names SGLWRX and SGLWRDX. SGLWRD is capable of being malfunctioned; and SGLWR is not functioned because it is the process variable for the model. The steam generator pressure is measured by channels I, II, and III. Channels I and II are simulated by the symbolic names SGPSINX1 and SGPSINX2 for each of the loops. Channel III is represented by the actual process variable SGPSX where X indicates the loop number. Channel I is used to alarm steam line differential pressure and is associated with steam flow channel I. Channels I and II are capable of being malfunctioned; and channel II is also used for steam line differential pressure and is associated with steam flow of channel II. Channel III is used for atmospheric relief valve control, steam line differential pressure alarms, low steam line pressure, and low steam pressure annunciation. This channel is not malfunctionable.

The auxiliary and main power systems (See FIGS. 93S through 93X inclusive) have instrument channels that are constructed by the panel wiring. A single analog output that represents a certain bus voltage can drive more than one meter and be a portion of a large system of selector switches in other analog outputs. The main control board running voltmeter D1130M can display either the 345 kV system voltage or any one of the 4 kV non-essential bus voltages. (See FIG. 93S) The correct analog output is selected by the associated synchronizing switch VM. The incoming voltmeter on the main control board can display either the generator voltage or the 345 kV system voltage depending on the synchronizing switch that is closed. When the system voltage D1140N is displayed on the incoming meter, the operator must be synchronizing an auxiliary reserve breaker. The system voltage will be present if the system auxiliary transformer T142 is connected to the ring bus; that is, if EPOLT equals TRUE. In the subroutine ELCRNT, this check is performed when the analog output D1140N is set to zero or to 25 kV which is the generator nominal voltage. When the generator voltage D1140M is displayed on the incoming meter, the operator must be synchronizing an auxiliary main breaker or the generator to the 345 kV system.

When the auxiliary main breakers are synchronized, the incoming voltmeter will always display the generator terminal voltage. However, when the main generator circuit breakers are being synchronized, the incoming voltmeter can display either the generator voltage, the system voltage, or zero. If the generator breaker is open and the main transformer disconnect is closed, the incoming voltmeter displays the generator voltage; that is, EPZGNV is TRUE. If the main generator breaker is closed, however, and a main generator synchronizing switch is closed, the meter will display the 345 kV system voltage; that is, EPZ345 is TRUE. If neither of these conditions is met; that is, EPZGNV and EPZ345 equal FALSE the incoming meter display zero.

To implement the generator voltage simulation, an algorithm in the B computer is used, and it acts as a software switch because several values can be stored in a table and any one of them selected for display. The value which will be displayed is selected by setting an associated logical variable to TRUE. In effect, this algorithm is an analog gate. And the variable EPZGNV is TRUE, the generator terminal voltage D1140M is displayed. When the variable EPZ345 is TRUE, the system voltage D1140Z is displayed; and if neither condition is TRUE, the meter displays zero.

SUMMARY

In summary, there is provided an improved simulator for the real-time dynamic operation of a nuclear power plant for training purposes which is stable, accurately realistic, flexible, and economical in its use of computer time and space.

A duplicate of the control console that is used in the real plant is provided which includes all levers, switches, controllers, and dials for controlling, and meters, indicators, and recorders for monitoring, the operation of the simulated plant from the central office. An instructor's console is provided to initialize, backtrack, take snapshots, freeze, introduce malfunctions and start and stop the simulator. A plurality of digital computers handles the input/output data between the operator's and instructor's console and perform simulation calculations.

From the student's standpoint he can start the plant up, shut it down, and do anything else that the operator of an actual plant can do from the central office. In response to the operation of the controls he can watch in real time the entire plant operation through the various meters and indicating devices; and the simulator is so constituted that it provides realism, stability and flexibility throughout its entire range of operation.

The instructor is able to initialize the plant to any one of 20 pre-selected steady state conditions. He can select or preselect for later execution up to one hundred different malfunctions of plant components and up to ten malfunctions at any one time. Further, these malfunctions can be of varying degree for the same component; and the malfunctions can be terminated, depending on the type, either by the operator, the instructor, or at the end of a predetermined period of time. In addition, the simulator takes a snapshot of the state of the plant at five minute intervals, so that the instructor can go back in time up to thirty minutes; and the instructor can take a snapshot of the entire physical state or freeze the plant at a moment of time at any time he wishes.

Moreover, the instructor through the console can provide for the effect on the simulated plant, of the operation of simulated plant components that are not controlled from the central office and when he initializes or backtracks, the simulator prints out the various levers on the control console which do not conform to the position in which they should be for the selected operational state.

From the viewpoint of the student operator, he can monitor the reactor portion of the plant in real-time and in three dimension on the ex-core detector meters, the fuel temperature indicators, and the flux mapping panel, for all ranges of operation and degrees of rod control malfunction. In the operation of the reactor control rods and the reactor, the completeness and realism of the simulation includes in real-time the operation of the rod clickers, and the random flux rate of the reactor that is heard in the actual plant control office; as well as the travel of six in-core flux detectors simultaneously in any of over 50 positions in the reactor core. Although the build-up of decay heat and xenon oscillations extend over a long period of time, their effect is simulated in real-time. Additionally, the xenon effect can be accelerated to accommodate training requirements.

The completeness, flexibility and realism of the coolant loops is manifest in that the operator can isolate any of the loops in the plant, as well as shut down any or all of the reactor coolant pumps and monitor natural circulation as well as reverse flow. The pressurizer and its effect is included in the simulation in all of its states of operation, both solid and bubble and the transitions therebetween. Also, the moderating effect of the cooling water temperature and boron concentration is simulated, as well as the cooling system for the seals of the reactor coolant pumps, for example.

The engineered safeguards systems, such as the residual heat removal system, accumulator injection system, safety injection system, and chemical and volume control systems can be controlled by the student operator in all phases of their intended functions.

The complete secondary system is completely simulated for the complete range of operation including the temperature control of reheaters, the electro-hydraulic turbine controller, the effect of air in the condenser, circulating water system, and gland steam seal system, as well as the feedwater heater systems, and electrical portion of the plant including the diesel generator. For completeness the turbine supervisory system is also simulated so that the operator can monitor vibration, bearing wear, and shaft eccentricity of the turbine, for example.

Even with such a full scope simulation, involving thousands of calculations, the data is handled by the computer system so that no calculations will be missed, even under extreme dynamic conditions. On the other hand, high speed computers time steps are not required for stability and realism in simulation, which saves on computer hardware cost and computer calculations. The economy and flexibility is further augmented by an efficient overlap of calculations and data transmission, event-oriented simulation calculations, and utilization of the same instructions for different data. Moreover, even with a calculation and transmission time that in isolated instances may be slower than real time, there is provision for instantaneous response in these instances. In a plural computer configuration, there is also the further economy by the pre-processing and post processing of data so that only bit logicals and integer data is transmitted between computers.

Further flexibility and efficiency of the simulation is obtained by the modular organization of the models and the physical values upon which the data values are dependent that constitute inputs and outputs of the individual modules.

For example, in the real-time simulation of the reactor and its controls, wherein the neutron flux and its distribution is simulated with respect to the cause and effect of practically every known aspect of its physics through all ranges of operation, is modularized into several different models. These include, the rod drive and mode select models which simulate the various reactor control rod functions, a model for automatic rod control (RODGO) that furnishes data for speed and direction of rod movement, and a model that simulates the bank, group, and malfunction of rod positions (RODOUT). In the first mentioned model, the simulation provides an immediate response to the touch of a rod lever and simulates the time interlocks of the real plant. Also, even though the computer time steps and the incremental travel of the actual controls are of different direction, provision is made for real-time clicker response in the simulator.

The physical operation of the reactor is modularized into several different models to provide for three dimensional simulation. One model is a nuclear cross sections model (SIGMAS) that calculates diffusion coefficients, absorption cross sections, neutron yield, energy yield and neutron velocities for the one dimension, kinetics with delayed neutrons and the doppler effect of fuel temperature model (FCALC) that simulates the total fission power for still another model that simulates the reactor thermo-hydraulic (THERMO) to produce data relating to the outlet enthalpy of the reactor core. A model for simulating the effect of decay heat (FPROD) provides the decay heat power in real-time to the (THERMO) model; and a model (POISON, PADE) simulates the xenon concentration for the model (SIGMAS). The three dimensional aspect is introduced by the model PLTLT which is influenced by the previous models, to simulate the flux tilt distribution for the individual models that simulate the nuclear instrumentation, for monitoring the flux in the simulated three dimensional core. The model PLTLT also furnishes data for the calculation of xenon oscillations by still another model (XEOSCL).

The flux mapping instrumentation is simulated by a separate model having a plurality of programs to provide approximately 250 mesh points sequentially to another model (AUXIL) for operating the continuous recorders. The in-core detectors for detecting the nuclear flux is simulated by the model probe drive, which also indicates the detector positions by another model.

The random audio count rate is simulated by both calculation and circuitry. The physical operation of the reactor is also influenced by the coolant water the the boron concentration in the reactor coolant loop, which is simulated by data furnished from other models.

The reactor coolant system RCS is simulated by several modularized models to provide economy and flexibility of operation. The RCS system flow is simulated by the model (RCSLP2), which in addition to providing such flow information to the reactor model (THERMO) also provides it to another model (RCSLOP) for simulating the thermal aspects of the RCS system. This model in turn provides information relating to specific volume to the model (RCSLOP) for its simulation calculations.

The pressurizer arrangement for the RCS is simulated by three separate models (PRZCON) for calculating pressure error to another model (PRSZR) that receives data relating to flow enthalpy, and pressure in the RCS system to simulate the pressure contribution and its transitional states for empty, solid water, and bubble conditions. The pressurizer relief tank is modeled (PRSFT) separately for the interchange of data to the model (PRSPZR). For overpower and overtemperature protection, a separate model SETTEMP obtains data from the previous models to provide information to another model LIMCK, LIMCK2), which receives data from all the other models for which limit checks are to be performed to provide output data for operating console alarms and annunciators.

Most of the engineered safeguards systems are each modularized individually and interconnected with the reactor coolant system models. Since the containment building houses the entire plant from the reactor to the system generators, its simulation is included in a separate model CONPRS which receives data indicative of normal and malfunction operations so that the operator can monitor an inordinate change in temperature, pressure and humidity in the contaminant building. The accumulator system that projects the reactor in the event of a loss-of-coolant accident is modeled separately. However, in order to simplify the simulation because of the many and varied paths, as well as the use of common apparatus, the safety injection system is modeled according to its individual mode of operation with a separate model to select such modes.

The secondary portion of the plant is modularized in such a manner to provide for economy, flexibility, and stability into several models that correspond to the individual systems. For example the auxiliary feedwater, service water and circulating water are each simulated by individual models. However, one model (STMGEN) simulates the steam generators, main steam system and high pressure turbine. This model as well as other fluid distribution networks of the secondary system calculates the dynamic operations by a simultaneous solution of differential equations utilizing a passive electrical network analogy with each steam generator being molded individually. Its simulation calculations receive input data from the models (RCSLP2) and (RCSLOP) relating to temperature and pressure in the primary side of the steam generator and provide output data relating to heat flux, and flow for malfunction leaks in the steam generators. The steam generators are further simulated to account for shrink-swell characteristics of the steam and water.

The model STMGEN interchanges data relating to turbine speed and generator shaft power with a model RHMSEP that simulates the reheaters, low pressure turbine and thermal aspects of the feedwater heaters. The condensate and feedwater flow system simulation is provided by another modular model FWFLUD. The feedwater heater calculations are lumped into equivalent feedwater heaters to provide simplicity, and the windage loss in the low pressure turbine is simulated. Feedwater heater energy balance is supplied by the model FWFLUD; and the separate model calculates flow network data for the model FWFLUD.

An individual model (TURSUP) is controlled by the models STMGEN and RHMSEP for simulating turbine vibration, rotor eccentricity, and turbine casing temperature; and a separate model is provided for the condenser that includes the effect of air, and the simulation of its introduction and removal therein.

The model RHMSEP has data interconnection with a model (EXGENM) for simulating the generator exciter and regulator which includes turbine speed and generator shaft power.

The turbine controller simulation is a separate model that converts the demand signal of the actual controller to a governor valve position which operates on real time by limiting the velocity by circuit means to the operating time of the valve which is faster than the computer time steps. It receives its operational data from the models (STMGEN), (RHMSEP), and (EXGENM) and provides output data to the model (STMGEN). The steam generator feed pump characteristics are modeled separately and obtain its input data from a model that simulates its speed and other miscellaneous steam plant controls. The gland steam model is simulated in the same module with the generator cooling on turbine oil simulation and utilizes a two network calculation for economy. The synchroscope simulation, which determines the phase relationship of generator voltage and other voltage sources is modeled separately from the electrical network, in a realistic and accurate manner. Separate models are also provided for the status of the circuit breakers and the various operational states of the diesel generators. Further, separate models are provided for the steam plant instrument channel and the steam plant protective logic. The steam plant limit check model SECLIM is a separate model that provides the input data to the protective logic and the annunciators on the control panels.

Finally, the major portion of the valves, pumps and the controllers are modeled separately to provide economy and stability of simulation. The more active model calculations occur on quarter-second time steps, for example, and others, occur on half-second time steps, while still others are only executed when certain levers are operated or under certain conditions of emergency operation.

Briefly, the method and system in the simulation of the individual models results in realism over the entire range of operation, in addition to flexibility, and economy of calculations. For example, with respect to non-linear functions a spline fit curve of steam and water properties is used to provide accuracy and simplicity. The node points on such a spline curve are positioned by a method that permits an extreme degree of accuracy with respect to the fit. The flow distribution systems are linearized and simultaneously solved in accordance with an analogous electrical network with passive elements. Pumps having non-linear characteristics are segmented for different states of operation into linear segments, with such segment being selected depending on pump operation. In the majority, the valves provide linear admittances to the model calculations.

With respect to the plural computer arrangement, the method and system for the transfer of data between computers, provides for synchronous communication of the computers with different word lengths and different speeds of operation. The data link includes a programmable sequencer with a read-only memory that is flexible and reliable in its operation.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. Also some features are applicable to fossil-fired power plants. It is further understood, that with respect to the individual models, that the changing of one or more models in the simulator does not affect the system, method, or operation of other models in the simulator; and that the data link may be used in plural computer configurations for purposes other than data communications for a simulator, or may be used to transfer data between computers of a type different than those used in the simulator.

Reference is hereby made to the Appendix A, which is attached hereto and made a part hereof.

Reference is also made to Appendix C which briefly describes the contents of the microfiche of Appendix B.

APPENDIX A

P2000 A AND B HARDWARE

| | Quantity 'A' | Quantity 'B' |
|---|---|---|
| Computer | | |
| P2000 CPU | 1 | 1 |
| 65K High-Speed Memory | 1 | 1 |
| DMA Card | 1 | 1 |
| HSM Card | 1 | 1 |
| Fixed Head Disc 1048K | 1 | |
| Fixed Head Disc 524K | | 1 |
| Peripheral Equipment | | |
| Programmer's Console with 735 Selectric | 1 | 1 |
| 112 cpm Card Reader | 1 | |
| 735 Selectric with Stand | 1 | 1 |
| Instructor's Console | | 1 |

SIGMA 5 HARDWARE SYSTEM

| Model | Quantity | Description |
|---|---|---|
| 8201 | 1 | Sigma 5 CPU |
| 8213 | 1 | Power Fail Safe |
| 8214 | 1 | Memory Protect |
| 8218 | 1 | F.P. Arithmetic |
| 8221 | 1 | Interrupt Control Chassis |
| 8222 | 3 | Priority Interrupts, 2 Levels |
| 8261 | 4 | Memory Bank, 8K Words |
| 8262 | 3 | Memory Increment, 8K Words |
| 8270 | 1 | External Interface Feature |
| 7201 | 1 | RAD Control |
| 7204 | 1 | RAD Storage Unit, 3MB |
| 7012 | 1 | Keyboard Printer/Controller |
| 7650 | 2 | Channel Interface Unit |
| 7140 | 1 | Card Reader, 1500 cpm |
| 7160 | 1 | Card Punch, 300 cpm |
| 7441 | 1 | Line Printer, 1100 1 pm |
| 7361 | 1 | 20kc Mag Tape Control |
| 7362 | 1 | 20kc Mag Tape Unit |

APPENDIX A

T1 - Rod Drive Switch and Mode Select from Panel
T2 - Automatic Rod Control (RODGO)
T3 - Ex-Core Instrument (DETOUT)
T4 - Nuclear Cross Sections (SIGMAS)
T4A - Xenon (POISON)(PADE)
T5 - X-Y Synthesis (PTLT)
T6 - Core Exit Thermocouples (TMCPLS)
T7 - Trace generation with local effects (TRACE)(CURROD)(RODCHN) (PLCHAN)(HAND)
T8 - 1 Dimension Space-Time Kinetics with Delayed Neutrons (FCALC)
T9 - RCS Boration (RCBORC)
T10 - RCS Thermal (RCSLOP)
T11 - Decay Heat (FPROD)
T12 - Reactor Thermo-Hydraulic (THERMO)
T13 - Probe Drive
T14 - Probe Position Indicator
T15 - X-Y Xenon Oscillations (XEOSCL)
T16 - Tilt at Thimbles (TILT)
T17 - Trace and Thermocouple 1/0 Format and Scaling (AUXIL)
T18 - Limit Checks (LIMP)
T19 - Overpower and Overprotection (SETTMP)
T20 - Pressurizer (RRSRZR)
T21 - Containment Building (CONPRS)
T22 - Seal Flow (SEALFW)
T23 - Chemical and Volume Control System (CUCS)
T24 - Steam Generators, Main Steam System and HP Turbine (STMGEN)
T25 - RCS Flow (RCSLP2)
T26 - Residual Heat Removal System (RHR)
T27 - Accumulators (ACCUM)
T28 - Pressurize Control (PREZCON)
T29 - Relief Tank (PRSFT)
T30 - Containment Spray (SIS6)
T31 - RCS Limit Checks (LIMCK)(LIMCK2)
T32 - Component Cooling System (COCOOL)
T33 - Boron Makeup (BORECY)
T35 - High-Head Safety Injection System (SIS2)
T36 - Sump Recirculating via RHR and Safety Injection Pumps (SIS4)
T37 - Low-Head Safety Injection System via RHR (SIS5)
T38 - Sump Recirculating via RHR and Charging Pumps (SIS3)
T39 - Containment Spray via RHR (SIS7)
T40 - Hi-Head Safety Injection via Charging Pumps (SIS3)
T41 - Safety Injection Mode Select (SIMAIN)
T42 - Rod Position Indicators (RODOUT)
T44 - Analog E.H. Controller
T45 - Turbine Vibration on Casing Temp
T46 - Reheater, L.P. Turbine and Feed Heater Thermal (RHMSEP)
T47 - Gland Steam Turbine Oil and Generator Cooling (BOPAUX)
T48 - BFP Characteristics (BFPEFF)
T49 - BFP Speed and Miscellaneous Steam Plant Controls (BOPCTL)
T50 - Condensate and Feedwater Flow (FWFLUD)
T51 - Auxiliary Feedwater System (AUXFED)
T52 - Reheater Controller
T53 - Generator, Exciter, and Regulator (EXGENM)
T54 - Condenser (CNDSR)
T55 - Steam Plant Protective Logic
T56 - Steam Plant Limit Checks (SECLIM)
T57 - Plant Electrical System (ELBUS1)(ELBUS2)
T58 - Synchroscope Interface (SUB35 through SUB39)
T59 - Service Water System (SERWTR)
T60 - Flow Network Solution (CROUT)
T61 - Circulating Water System (CIRWTR)
T62 - Steam Plant Instrument Channel Simulation (BOPA02)(BOPA04)
T63 - Circuit Breaker Status
T64 - Diesel Generators and Diesel Electric Bus System (ELCRHT)

APPENDIX C

PRINTOUT FOR NUCLEAR POWER PLANT SIMULATOR

The printout in this appendix comprises a listing of A, B, and C machine programs, A and B machine PROGEN files, initialization data and programs for the A, B, and C machines, and information concerning system variables and computer outputs for a specific nuclear electric power plant accordance with the principals disclosed herein. The various parts of the printout are now on microfiche and included in APPENDIX B.

1. Concordance Index

This index lists many system variables used in the A, B, and C machines in the manufactured plant simulator, and accordingly it serves as an aid in interpreting other parts of the printout. Various symbols are defined at the beginning of the index. In the body of the index, the variables are identified with information in eleven columns as follows:

| Column | Content |
|---|---|
| 1 | Sequential Number In List |
| 2 | Name |
| 3 | Type Of Variable |
| 4, 5 | Further Definition On Type Of Variable (Global Variable, Process Variable, PROGEN Trigger Variable, etc.) |
| 6 | A, B, or C Machine |
| 7 | Name Of Program Where Variable Is Located |
| 8 | Relative Position In Machine Common |
| 9 | Name Of Labeled Common |
| 10 | Units Of Measure Or Abbreviation Designating Units Of Measure |
| 11 | Comments On Variables |

2. A and B input/output Lists

In these lists, contact closure inputs, contact closure outputs, analog inputs and analog outputs are listed for the A and D machines in the manufacture plant simulator. The first column gives the symbol for the input or output. The tag and item numbers are plant and panel identification numbers. The next seven columns provide an interface hardware designation. In the last column, a description of the input or output is set forth.

3. A and B Machine Monitors

In these sections, a printout is provided in correspondence to the card decks used to initialize the P2000 monitor for the A and B machines in the manufactured plant simulator.

B Monitor Initialization Deck
Systems Library References

A Monitor Initialization Deck
Systems Library References

4. A and B Machine Off-Line Routines

The programs listed here were written in assembly or FORTRAN language for debugging and initialization purposes in the manufactured plant simulator.

A Progen Variable List
A Copy Binary

B Progen Variable List
B Link: Progen Variable List
B Copy Binary
B Link Process/Logl Variables
B Link: Link P/L Variables
B List Cards
B Link Summary
B Link: Link Summary
B Link Update
B Link: Link Update
B Map
B Snapshot Modifications's
B Unlink Process/Logl. Variables 5. A and B Machine PROGEN Data Center The Data Center listing defines certain common system routines written in assembly language and certain common system data needed in various on-line routines and programs in the manufactured plant simulator. The listing is generated from A and B decks of cards.

B Invert Table

B Data Center Initialization
Progen Data Center - Master

Program Definition
Operators Console Definitions
File Systems Def. - D/C (Disc/Core) Version
Analog Scan Initialization
Auxiliary Synchronizer Def.
Digital Scan Definitions
Sublevel Processor Definitions Core and Disc Versions
Data Center Permanent Storage
Operators Console Def. and Tables
Size of Function Tables
Analog Scan Def. and Tables
Auxiliary Synch. Def. and Tables
Digital Scan Bit Image and Status Tables
Tables of Start Registers For Each Scan Entry
Pointer For Starting Address Table Length Table
The Core Buffer Start Address Table
Data Center Loaded Linked Storage
Data Center Dynamic Storage A Invert Table A Data Center Initialization
Progen Data Center Master Program Def.
Operators Console Def.
File Systems Def. - D/C (Disc/Core) Versions
Analog Scan Initialization
Auxiliary Synchronizer
Digital Scan Definitions
Sublevel Processor Def. (Core and Disc) Versions
Data Center Permanent Storage
Operator's Console Definitions and Tables
Size of the Function Tables
Analog Scan Definitions and Tables
Auxiliary Synch. Def. and Tables
Digital Scan Bit Image and Status Tables
Table of Start Registers For Each Scan Entry
Pointer for Starting Address Table Length Table
The Core Buffer Start Address Table
Data Center Loaded Linked Storage
Data Center Dynamic Storage 6. A and B Machine Data Files This list defines various PROGEN data files implemented in the manufactured plant simulator with use of the PROGEN data file generator in the A and B machines. It provides information corresponding to data file source cards and in some instances data file generator intermediate 7. A and B Machine PROGEN Algorithms tape.

The algorithm listing identifies certain algorithms written is assembly language especially for PROGEN implementation in the manufactured plant simulator.

8. A and B Machine PROGEN Chains

This list defines various PROGEN chain files implemented in the manufacture plant simulator with use of the PROGEN Control Chain Generator in the A and B machines to actualize certain simulator tasks. It provides information corresponding to source cards prepared for chain generation on intermediate tape. Reference is made to the chain listing for titles and other information concerning the various chains.

9. A and B Machine On-Line Programs

Programs listed here were written in assembly language and are used for various on-line purposes in the A and B machines in the manufactured plant simulator.

A Initialize From Disc
A Initialize Training Exercise
A Link Process/Log Variables
A List Cards
A Link Summary
A Link: Link Update
A Map
A Snapshot Modification
A Store Conditions On Disc
A Unlink Process/Log. Variables
Analog Input Scan
Analog Output Handler 4/Sec
Analog Outout Handler 2/Sec
Flow Counters (IPACS)
Data Link End Action
Task 9 Header
Task 6 CO - Model Off.
Task 8 Print Variable Change
AO Channels Integer Buffer
Timing Task
Programmer's Console
Link: System Library W/Patch
System Library Patch to Enc. Dec B Initialization From Disc
B Store Condition on Disc
Console Control
Initialize
Display/Print Valve
Initialize Training Exercise
Print Start/Stop
Model Control
Snapshot
Sub-S5 to P2
Sub-Bitrtn
B Display/Print Valve Data
P2Klnk: Inst. Console Functions
Task 9 Header
AD Handler 2/sec
AD Handler 4/sec AI Scan
Data Link End Action
C.O. For Model Off.
Anmal TBL Annun Malfnc Tables
AD Channels Integer Buffers
Type O. End Action
Link: Type O End Action
Timing Task
Programmer's Console
System Library with Patch 10. A Machine Rod Programs These programs were written in FORTRAN and are related to the reactor control rod simulation function described herein and implemented in the manufacture plant simulator. Reference is made to the listing for the program titles.

11. A and B Machine Function Programs

This listing defines certain simulator functions related primarily to the operation of the Instructor Console System in the Manufactured plant simulator. Reference is made to the listing for a more detail table of contents for the listing.

12. C Machine Initialization Data

This listing provides initialization data for model reactor primary and secondary parameters in the manufactured plant simulator.

13. C Machine Care Deck For Initialization Routine And Reactor Plant Model Programs Section 1 Section 2

This listing represents a sequential identification of cards in a binary deck generated from FORTRAN statements. Section 1 includes initialization data for the C machine analog output handler, valve handler and controller handler. Section 2 includes those load deck binary cards which define the C machine Foreground Programs for the simulator system. Each line in the listing corresponds to a card, and the list column provides the card title, if any. The material printed to the left of the last column represents the interpretation of a particular printout program to the codings on the binary cards, and it may not have any particular significance. The balance of the C machine programs not included in the Foreground System are based on standard software obtainable from the C machine supplier (P250 or Xerox Sigma 3).

14. C Machine Foreground System Disk Dump

This listing provides the hex coding for a disk dump on the entire Foreground System employed in the C machine in the manufactured plant simulator.

What is claimed is:

1. An automated training simulator for the real-time dynamic operation of a nuclear power plant having a plurality of fluid control devices for governing the fluid behavior throughout the plant; said simulator comprising a plurality of command devices to generate an input signal corresponding to the desired operational state of each of a respective plurality of representative fluid control devices;

calculating means including sequence controlling means having components operative to generate repetitively during successive time intervals data values relating to fluid behavior for the representative plant, said sequence controlling means including (a) first means to generate during each said time interval data values relating to the operation of the plurality of representative fluid control devices in accordance with the input signals, (b) second means to generate during each said time interval data values relating to fluid behavior in accordance with the data values relating to fluid control device operation that are generated during each preceding said time interval, and a plurality of indicating devices governed by data values relating to fluid physical values for several portions of the representative plant to monitor representative plant operation.

2. An automated training simulator according to claim 1 wherein predetermined ones of the command devices are representative of valves, and the data values generated by the first means relate to valve admittance.

3. An automated training simulator according to claim 1 wherein predetermined ones of the command devices are representative of pumps.

4. An automated training simulator according to claim 1 wherein the sequence controlling means is structured in a programmed digital computer means.

5. An automated training simulator for the real-time dynamic operation of a nuclear power plant; said simulator comprising a plurality of command devices manually operable to selected positions to generate input signals corresponding to the operational state of representative plant control devices;

calculating means including sequence controlling means governed by the input signals to generate data values relating to the operational state of the representative plant, said sequence controlling means including the following components (a) storage means for storing a plurality of data values relating to a distinct steady-state operating condition of the representative plant independent of the input data, (b) first indicating means governed by the stored data values to indicate said distinct operating condition, (c) means to detect the actual operated position of the manually operable command devices, (d) means governed by the position detecting means and the stored data values to generate a position data value at least for each of the manually operable command devices in a position out of correspondence with said distinct steady-state condition; and second indicating means governed by said position data values to indicate the individual command devices required to be operated for the input signals to correspond to said steady-state condition data values.

6. An automated training simulator according to claim 5 wherein the sequence controlling means is structured in a programmed digital computer means.

7. An automated training simulator according to claim 5 wherein the storage means includes a plurality of data values relating to different distinct steady-state operating conditions; said sequence controlling means further includes means to select predetermined ones of said stored data values relating to one of said operating conditions, and the position data values are generated in accordance with the selected stored data values.

8. An automated training simulator according to claim 5 wherein the second indicating means is an automatic typewriter.

9. An automated training simulator for the dynamic operation of a nuclear power plant, comprising a plurality of manually operable command devices to generate input data corresponding to the operation of respective representative plant control devices, calculating means including sequence controlling means having the following components (a) means to initiate a scan of the generated input data repetitively at periodic time intervals to detect a change in the operated position of a first plurality of predetermined command devices during each said time interval, (b) means to initiate immediately a scan of the input data relating to the position of a second plurality of predetermined command devices in response to the operation of one of the second plurality of predetermined command devices, (c) means to initiate during each predetermined time interval the generation of data values relating to physical values for a first portion of the representative plant, (d) means to initiate the generation of data values relating to physical values for a second portion of the representative plant in response to a detected change in one of the second plurality of predetermined command devices; and indicating devices responsive to the generated data values relating to physical values to monitor the operation of the representative plant.

10. An automated training simulator according to claim 9 wherein the time interval for initiating the scan of the input data for the command devices and the initiation of the generation of physical data values are synchronous.

11. An automated training simulator according to claim 9 wherein each time interval for initiating the scan of the command devices and for initiating the generation of physical data values is of a different duration.

12. An automated training simulator according to claim 9 wherein the first plurality of the command devices corresponds to representative valves only, and the first portion of the physical data value generation means corresponds only to the operation of representative valves, said valve data generation means being initiated repetitively during successive time intervals separate from the second portion of the physical data value generation means.

13. An automated training simulator according to claim 9 wherein the first plurality of the command devices corresponds only to representative pump and the first portion of the physical data value generating means corresponds only to the operation of representative pumps, said pump data value generation being initiated repetitively during successive time intervals separate from the second portion of the physical data value generation means.

14. An automated training simulator according to claim 9 wherein predetermined ones of the indicating devices correspond to analog meters for monitoring the speed of representative pumps; and said simulator further comprises means to generate data values corresponding to pump energization immediately in response to the operation of a corresponding command device.

15. An automated training simulator for the real-time dynamic operation of a nuclear powered electrical generating plant, comprising a plurality of manually operable command devices corresponding to representative plant control devices to generate input data, calculating means including sequence controlling means having the following components (a) first buffer means to store input data in accordance with the operation of the command devices, (b) second buffer means to store data values relating to physical values in the operation of the representative plant, (c) means to generate data values relating to physical values in the operation of the representative plant in accordance with data values stored in the second buffer means, (d) means to initiate repetitively a scan of the first buffer means at periodic time intervals to detect a change in data values stored therein caused by the operation of selected ones of the command devices, (e) means to transfer data values from the first buffer means to the second buffer means during each said periodic time intervals, (f) means to initiate in sequence at periodic time intervals the generation of predetermined ones of the physical data values, (g) means to initiate the generation of other predetermined physical data values in response to a change of a data value stored in the first buffer means, (h) third buffer means to store output data values for monitoring the operation of the representative plant, (i) means to transfer data values from the second buffer means to the third buffer means during each said periodic time interval; and indicating devices responsive to the output data values to monitor the operation of the representative plant.

16. An automated training simulator according to claim 15 wherein the sequence controlling means further includes means to initiate a scan of the first buffer means at times other than the periodic time interval in response to the operation of selected ones of the plurality of command devices.

17. An automated training simulator according to claim 15 wherein the periodic time interval for initiating the scan of the first buffer means and the initiation of the generation of physical data values are asynchronous.

18. An automated training simulator according to claim 15 wherein each periodic time interval for initiating the scan of the first buffer means and the periodic time interval for initiating the generation of the physical data values are of different duration.

19. An automated training simulator according to claim 15 wherein a portion of the first buffer means includes stored input data corresponding only to the position of representative valves, selected ones of the plurality of generated physical data values relate only to the operation of representative valves, and said sequence controlling means further includes means to initiate the generation of the physical data values relating to valves during each said time interval at a time other than the initiation of the generation of the other physical data values.

20. An automated training simulator according to claim 15 wherein a portion of the first buffer means includes stored input data corresponding to the status of representative pump operation, selected ones of the plurality of generated physical data values relate only to the operation of representative pumps, and said sequence controlling means further includes means to initiate the generation of the pump physical valve data values during each time interval at a time other than the initiation of the generation of the other physical data values.

21. An automated training simulator according to claim 20 wherein selected ones of the indicated devices are analog instruments to indicate the speed of a respective representative pump, and the sequence controlling means further includes means to generate data in the third buffer means corresponding to representative pump energization, whereby the indicating means displays an indication that the representative pump motor is drawing current prior to the initiation of the generation of the other physical data values.

22. An automated training simulator according to claim 15 wherein the indicating means includes a permanent recorder and said sequence controlling means includes means to record the operation of the plurality of command devices in response to the detection of a change of input data in the first buffer means.

23. An automated training simulator according to claim 15 further comprising an instructor's console having a plurality of malfunction command devices to generate data corresponding to respective malfunctions of the representative plant, and said sequence controlling means further includes means to transfer data values to the first buffer means independent of the periodic time intervals in response to the operation of said malfunction command devices.

24. An automated training simulator according to claim 15 wherein the sequence controlling means is structured in a programmed digital computer means.

25. An automated training simulator according to claim 24 wherein the data values stored in the second buffer means are word logicals, and the data values stored in the first and third buffer means are bit logicals, and the sequence controlling means further includes means to convert the data values from bit to word logicals and vice versa, said means initiate repetitively said conversion subsequent to the completion of the generation of the physical data values during each periodic time interval.

26. An automated training simulator for the dynamic operation of a nuclear power plant: comprising a plurality of manually operable command devices to generate input data corresponding to the operation of representative plant control devices;

calculating means including sequence controlling means having the following components (a) first buffer means to store input data corresponding to the operation of command devices and to store output data values for operating the indicating devices, second buffer means to store data values relating to physical values in the operation of the representative plant, (b) first means to detect repetitively at periodic time intervals changes in first predetermined stored input data of the first buffer means, (c) second means when activated to detect changes in second predetermined stored input data of the first buffer means, (d) third means to activate the second means in response to the operation of selected ones of the command devices, (e) modeling means when activated to generate the data values relating to physical values in the operation of the representative plant in accordance with the input data relating to the operation of the command devices, (f) fourth means to activate the modeling means repetitively during distinct periodic time intervals to change the physical data values stored in the second buffer means in accordance with the change of input data in the first buffer means, (g) fifth means activated subsequent to the completion of each generation of the physical data values by the modeling means during each periodic time interval to detect a change in the output data stored in the first buffer means; and indicating devices responsive to the output data of the first buffer means for monitoring the physical state of the representative plant and the operated condition of the command devices.

27. An automated training simulator according to claim 26 wherein the sequence controlling means is structured in a programmed digital computer means.

28. An automated training simulator according to claim 26 wherein the sequence controlling means includes (a) means activated in response to a selected change of input data stored in the first buffer means to change predetermined output data stored in the first buffer means, and (b) means responsive to the activation of the last named means to change selected ones of the indicating devices in accordance with the change in stored output data.

29. An automated training simulator according to claim 27 wherein the first buffer means includes bit logicals and word logicals, and the first means is activated to detect a change in the but logicals and word logicals sequentially during each periodic time interval.

30. An automated training simulator according to claim 26 wherein the second buffer means includes data values relating to permanent physical values of the representative plant, and also includes data values relating to a temporary operative state of the representative plant, and the modeling means when activated is operative to change the temporary data values only.

31. An automated training simulator according to claim 30 wherein the sequence controlling means further includes means governed by the second predetermined stored input data corresponding to selected ones of the command devices to change corresponding permanent data values in the second buffer means to correspond to predetermined times in the life of representative fuel in the representative plant.

32. An automated training simulator according to claim 30 wherein the sequence controlling means includes (a) fourth buffer means for storing data values relating to a predetermined operative condition of the representative plant, and (b) means activated in response to selected ones of the second plurality of command devices to change the data stored in the first and second buffer means to correspond to the data values stored in the fourth buffer means.

33. An automated training simulator according to claim 32 wherein the sequence controlling means further includes means responsive to a change of input data in the first buffer means to record the manually operable command devices in an operable position which is out of correspondence with the stored input data in the first buffer means.

34. An automated training simulator according to claim 7 wherein the sequence controlling means is structured in a programmed digital computer means.

35. An automated training simulator according to claim 9 wherein the sequence controlling means is structured in a programmed digital computer means.

36. An automated training simulator according to claim 12 wherein the data generation means is structured in a programmed digital computer means.

37. An automated training simulator according to claim 13 wherein the data generation means is structured in a programmed digital computer means.

38. An automated training simulator according to claim 15 wherein the sequence controlling means is structured in a programmed digital computer means.

39. An automated training simulator according to claim 16 wherein the sequence controlling means is structured in a programmed digital computer means.

40. An automated training simulator according to claim 19 wherein the sequence controlling means is structured in a programmed digital computer means.

41. An automated training simulator according to claim 20 wherein the sequence controlling means is structured in a programmed digital computer means.

42. An automated training simulator according to claim 21 wherein the sequence controlling means is structured in a programmed digital computer means.

43. An automated training simulator according to claim 23 wherein the sequence controlling means is structured in a programmed digital computer means.

44. An automated training simulator according to claim 25 wherein the sequence controlling means is structured in at least two programmed digital computers, and the first and third buffer means are structured in one said computer and the second buffer means is structured in another said computer.

45. An automated training simulator according to claim 28 wherein the sequence controlling means is structured in a programmed digital computer means.

46. An automated training simulator according to claim 29 wherein the sequence controlling means is structured in a programmed digital computer means.

47. An automated training simulator according to claim 31 wherein the sequence controlling means is structured in a programmed digital computer means.

48. An automated training simulator according to claim 32 wherein the sequence controlling means is structured in a programmed digital computer means.

49. An automated training simulator according to claim 33 wherein the sequence controlling means is structured in a programmed digital computer means.

* * * * *